US005557776A

United States Patent [19]

Brown et al.

[11] Patent Number: 5,557,776

[45] Date of Patent: Sep. 17, 1996

[54] APPARATUS WHICH ALLOWS DATA SHARING AMONGST COMPUTER PROGRAM FROM DIFFERENT PROGRAM ENVIRONMENTS

[75] Inventors: Marsha A. Brown, Manassas, Va.; Richard A. Demers; James A. Diephuis, both of Rochester, Minn.; Lorenzo Falcon, Jr.; Thomas E. Frayne, both of San Jose, Calif.; Sunil S. Gaitonde, Rochester, Minn.; Elaine S. Patry; William A. ReMay, both of Warrenton, Va.; Kenneth M. Sissors, Centreville, Va.; Ejuana D. Vasquez, Raleigh, N.C.; David J. Weber, Rochester, Minn.; Koichi Yamaguchi, Los Gatos, Calif.

[73] Assignee: International Business Machines Corporation, Armonk, N.Y.

[21] Appl. No.: 286,498

[22] Filed: Aug. 4, 1994

Related U.S. Application Data

[63] Continuation of Ser. No. 885,086, May 18, 1992, abandoned.

[51] Int. Cl.$^6$ .......... G06F 3/00

[52] U.S. Cl. .......... 395/500; 395/700; 364/280.4; 364/DIG. 1

[58] Field of Search .......... 395/800, 700, 395/600, 500; 364/280.4, DIG. 1

[56] References Cited

U.S. PATENT DOCUMENTS

| | | | |
|---|---|---|---|
| 4,141,005 | 2/1979 | Bonner et al. | 340/347 |
| 4,202,040 | 5/1980 | Whitworth et al. | |
| 4,205,371 | 5/1980 | Feather | 395/600 |
| 4,667,290 | 5/1987 | Goss et al. | 395/700 |
| 4,949,291 | 8/1990 | Saini | 364/715.03 |
| 5,083,262 | 1/1992 | Haff, Jr. | 395/500 |
| 5,179,703 | 1/1993 | Evans | 395/700 |
| 5,187,787 | 2/1993 | Skeen et al. | 395/600 |

*Primary Examiner*—Alyssa H. Bowler
*Assistant Examiner*—John Harrity
*Attorney, Agent, or Firm*—Steven W. Roth

[57] ABSTRACT

The ADL system provides a way in which computer programs written in different programming languages can share data. The ADL system comprises the ADL language and the facilities necessary to perform the data sharing function. The ADL language uses the concept of a data description and conversion module. A data description and conversion module, or more simply, an ADL module is composed of declarations and plans. Each declaration is an ADL description of how a particular program environment represents data. The plan portion of the ADL module contains ADL statements that instruct the computer system to convert the data representations of the source program environment into the data representations of the target program environment.

3 Claims, 18 Drawing Sheets

```
source: DECLARE
          BEGIN;              300
    301   X: SEQUENCE
               BEGIN;
               A: BINARY LENGTH (16);          305
               B: CHAR LENGTH (6);             310
               C: FLOAT FORM (FB32);           315
               D: ENUMERATION (red, blue, green);   320
               END;
          END;
```

```
target: DECLARE
          BEGIN;              330
    331   X: SEQUENCE
               BEGIN;
               D: ENUMERATION (red, blue, green);   335
               B: CHAR LENGTH (6);    340
               A: BINARY LENGTH (16);    350
               END;
          END;
```

FIG. 3

```
source: DECLARE——400
          BEGIN;
          X:SEQUENCE——405
              BEGIN;
              A: BINARY——410
              B: CASE——415
                   BEGIN;
      420——B1: WHEN A = 1 THEN C: CHAR LENGTH (4);
      430——B2: WHEN A = 2 THEN D: FLOAT FORM (FB32);
      440——B3: WHEN A = 3 THEN E: BINARY LENGTH (3);
      450——B4: OTHERWISE         F: ASIS LENGTH (4);
                   END;
              END;
          END;

target; DECLARE——452
          BEGIN;
          X:SEQUENCE——453
              BEGIN;
              A: BINARY——454
              B: CASE——455
                   BEGIN;
      460——B1: WHEN A = 1 THEN C: CHARPRE LENGTH (4);
      470——B2: WHEN A = 2 THEN D: ASIS LENGTH (4);
      480——B3: WHEN A = 3 THEN E: BINARY LENGTH (3);
      490——B4: OTHERWISE         F: ASIS LENGTH (4);
                   END;
              END;
          END;
```

FIG. 4

TO DATA TYPES

| FROM DATA TYPES | ARRAY | ASIS | BINARY | BIT | BITPRE | BOOLEAN | CASE | CHAR | CHARPRE | CHARSFX | ENUMERATION | FLOAT | PACKED | SEQUENCE | ZONED |
|---|---|---|---|---|---|---|---|---|---|---|---|---|---|---|---|
| ARRAY | X | X | | | | | | | | | | | | | |
| ASIS | X | X | X | X | X | X | X | X | X | X | X | X | X | X | X |
| BINARY | | X | X | | | | | | | | X | X | X | | X |
| BIT | | X | X | X | X | | | | | | | | | | |
| BITPRE | | X | | X | X | | | | | | | | | | |
| BOOLEAN | | X | | | | X | | | | | | | | | |
| CASE | | X | | | | | X | | | | | | | | |
| CHAR | | X | | | | | | X | X | X | | | | | |
| CHARPRE | | X | | | | | | X | X | X | | | | | |
| CHARSFX | | X | | | | | | X | X | X | | | | | |
| ENUMERATION | | X | X | | | | | | | | X | | X | | X |
| FLOAT | | X | X | | | | | | | | | X | X | | X |
| PACKED | | X | X | | | | | | | | X | X | X | | X |
| SEQUENCE | | X | | | | | | | | | | | | X | |
| ZONED | | X | X | | | | | | | | X | X | X | | X |

ADL Data Type Conversion Table.

X Conversion supported by ADL blank Conversion not supported by ADL

FIG. 5

APPARATUS WHICH ALLOWS DATA SHARING AMONGST COMPUTER PROGRAM FROM DIFFERENT PROGRAM ENVIRONMENTS

This application is a continuation of Ser. No. 07/885,086, filed May 18, 1992, and now abandoned.

FIELD OF THE INVENTION

This invention relates to the data processing field. More specifically, this invention relates to the sharing of data amongst computer programs written in different programming languages for different types of computer systems.

BACKGROUND OF THE INVENTION

As with the world itself, typical computer systems include a variety of separate entities which use different languages. The difference is, of course, that computer systems use programming languages instead of spoken languages. Different programming languages are needed because the variety of tasks which are performed on today's computer systems are usually implemented best when the language used is one designed for the particular purpose at hand. To facilitate the use of several languages, computer systems include programs called compiler programs. Compiler programs are responsible for reducing a human readable computer language into machine readable form. Generally, for each type of computer system there is one compiler program per computer language. Since different computer systems use different machine languages, each compiler program is responsible for reducing a particular programming language into an internal form which is understood by that particular computer system. Individuals skilled in the use of a particular programming language use the language to write computer programs which are translated into the appropriate internal form by the appropriate compiler program. A particular programming language and the internal form generated by the compiler program for use by the computer system can be said to make up a program environment.

As stated, the ability of a computer system to support multiple program environments is desirable in that each program environment can be tailored to perform a different task. In pursuit of this flexibility, computer system manufacturers are designing their computer systems to accommodate more and more program environments. Indeed, critical to the commercial success of a particular computer system is how many program environments it can support. Modern day computer systems can support a number of program environments. For example, the IBM Personal System/2 model 80 can support the C, PASCAL, FORTRAN, COBOL, and BASIC programming languages with the OS/2 and DOS operating systems. This flexibility is not without cost, however. The negative side of supporting a variety of program environments is the difficulty of sharing information. Information sharing is significant in that it eliminates the need to redundantly create or obtain information that already exists. Time and expense are saved whenever the information of one program environment can be used by the computer programs of another program environment.

However, information sharing amongst computer programs of different program environments is more easily said than done. As computer systems become more and more open and flexible, information sharing becomes more and more difficult. Associated with the addition of each program environment is a new way of handling data. Computer programmers may spend a great deal of time and expense writing computer programs which can accommodate the data handling method of a different program environment. In addition to writing or modifying computer programs which can themselves share data, computer programmers also write separate computer programs which have as their sole purpose the conversion of data from one program environment into a form understandable by the computer programs of another program environment.

The problem with solutions of this type is that they are constrained to the view of their own program environment. That is, all computer programs must describe the data in the way prescribed by their own native computer language. This causes several problems. First, since different programming languages are designed to create computer programs which perform different categories of tasks, the methods used to describe data in one program environment seldom correlate directly to the methods used to describe data in another program environment. The problem becomes more acute when one remembers that program environments differ based on computer systems as well as programming languages. Hence, even though two program environments have the same programming language, the way in which data is represented will probably be different if the program environments reside on different computer systems.

The second problem associated with existing data sharing implementations is that computer programmers must intimately understand how data is described in their own program environment, how data is described in the program environment from which the data is to be converted, and how the subject computer systems represent the data. This complexity makes for a difficult, cumbersome, and costly effort.

The third problem associated with existing data sharing implementations is that the programming languages of existing program environments are not designed for writing computer programs to facilitate data sharing. Hence, the ways in which a particular programming language describes data are not readily adaptable to describing how another language may describe data, or for that matter, how another computer system may represent data.

These problems leave computer programmers between the proverbial "rock and a hard place." It is extremely inefficient to write computer programs to create or obtain data which already exists, but attempting to write a computer program which can share data may in the end prove to have been more costly than simply "starting from scratch."

SUMMARY OF THE INVENTION

It is a principal object of this invention to provide an enhanced programming language which describes the data types and internal representations of various other programming languages for various computer systems.

It is another object of this invention to provide an enhanced method and apparatus for creating computer programs which facilitate data sharing amongst computer programs of different program environments.

It is still another object of this invention to provide an enhanced method and apparatus for using computer programs designed to facilitate the sharing of data amongst computer programs of different program environments.

These and other objects are accomplished by the data language disclosed herein.

ADL is defined in the IBM document "Distributed Data Management Architecture, Specifications for A Data Language" which is attached as Appendix 1. This document was unpublished as of the filing date of the patent application. Although the acronym ADL stands for "A Data Language," the invention disclosed herein involves more than the language itself. The disclosed invention includes those facilities necessary to fully utilize the power of the ADL language. For this reason, the acronym ADL is often used within this description to refer to the ADL system or environment as a whole.

The ADL system provides a way in which computer programs written in different programming languages can share data. As stated, the ADL system comprises the ADL language and the facilities necessary to perform the data sharing function. The ADL language uses the concept of a data description and conversion module. A data description and conversion module, or more simply, an ADL module, is composed of declarations and plans. Each declaration is an ADL description of how a particular program environment represents data. Since ADL has been designed for this purpose, data descriptions are more clearly and efficiently defined. Each ADL module will contain one data declaration for the source program environment and one data declaration for the target program environment. That is, an ADL module will contain an ADL description of how each program environment represents data for the subject computer system. These ADL data descriptions can also be thought of as intermediate data descriptions since they ultimately provide a bridge between different program environments.

The plan portion of the ADL module contains ADL statements that instruct the computer system to convert the data representations of the source program environment into the data representations of the target program environment. A plan does not, however, specify how to perform the conversions. Instead, the ADL compiler infers the requisite conversions from the ADL source and target declarations contained in the ADL module.

There are two ways in which an ADL module can be created. The ADL module can be constructed through user input (i.e., A computer programmer, knowledgeable in the subject program environments and ADL, can write the ADL module using the ADL language) or through automatic translation of an existing data description. Creating the ADL module through user input requires the programmer to have detailed knowledge about both program environments and ADL. Further, since internal representations vary from computer system to computer system, the programmer must also understand how each computer system represents the data of each programming language. It is for this reason that the ADL system includes a "parse" mechanism which converts the data descriptions of a particular program environment into an ADL data description. In addition, the ADL system includes a "translate" mechanism and a "generate" mechanism. The "translate" mechanism translates an ADL data description for one program environment into an ADL data description for another program environment while the "generate" mechanism generates a data description for a particular programming language from an existing ADL data description. These capabilities add efficiency to the ADL system in that it is not necessary for a programmer to have particularized knowledge regarding each language and how data is represented by the subject computer system.

Once the ADL module has been created, it is compiled into an executable ADL conversion program. These ADL conversion programs are used to allow data sharing amongst computer programs from different program environments. To use data from another program environment, a computer program can call an ADL conversion program directly or the function may be incorporated into lower level utilities which automatically use the correct ADL conversion program whenever it is necessary to share data amongst computer programs from different program environments. In either case, ADL allows computer programs to share data regardless of the program environments involved. Examples include the ability to: obtain data created and stored by other computer programs, exchange messages with other computer programs, invoke the procedures of other computer programs, and invoke the procedures of computer programs which reside on different computer systems.

BRIEF DESCRIPTION OF THE DRAWINGS

FIG. 3 shows an example of the use of the ADL SEQUENCE statement.

FIG. 4 shows an example of how the ADL SEQUENCE statement and the ADL CASE statement can be used together within the declaration section of an ADL module.

FIG. 5 shows a conversion grid for ADL data types.

FIGS. 10A-1 and 10A-2 show a flow diagram of how a particular program environment's data description is converted into an ADL data description.

FIGS. 10C-1 and 10C-2 show a flow diagram of how an ADL data description for a particular program environment is converted back into that program environment's own data description.

DESCRIPTION OF THE PREFERRED EMBODIMENT

Figures 1, 10A:
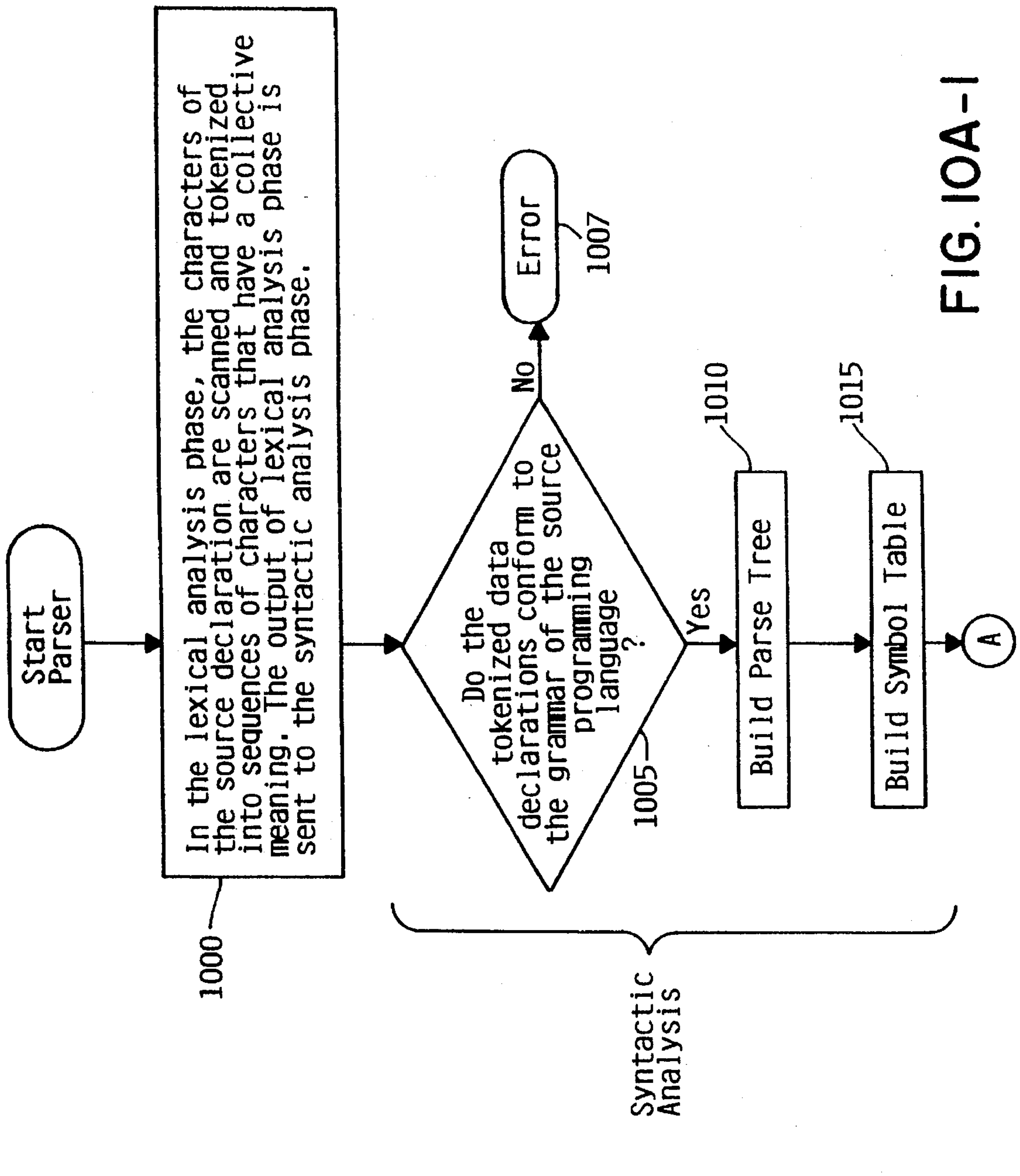

FIG. 1 shows a block diagram of the computer systems of the present invention. The computer systems of the preferred embodiment are IBM Personal System/2 Model 80 computers. However, any computer system could be used. Examples of other applicable computer systems include: the IBM AS/400 mid-range computer system and the IBM 3090 mainframe computer system. FIG. 1 shows an exploded view of computer system A, in block 100. Computer system A comprises main or central processing unit (CPU) 110 connected to data storage 130. Storage 130 can be primary memory such as RAM, secondary memory such as a magnetic disk drive, or a combination of different data recording devices. CPU 110 is also connected to user interface 115 and network interface 135. User interface 115 allows developers and users to communicate with computer system A, normally through a programmable workstation. Network interface 135 allows computer system A to utilize the resources of the other computer systems of the preferred embodiment (i.e., computer system B 140 and computer system C 145). Although three computer systems are used in the preferred embodiment, it should be understood that the present invention applies to modern day computer networks which often include anywhere from two to many separate computer systems. In the preferred embodiment, the computer systems are connected via a token ring network; however, any connecting means could be used (e.g., Ethernet, SNA, etc.). Associated with modern day computer networking, are a plethora of resource sharing techniques; examples include: remote file sharing, remote procedure invocation, and message passing.

Data storage 130 contains operating system 127, file system 128, computer programs (shown by program blocks 120) and files (shown by file blocks 125) from various program environments. While storage 130 is shown as a monolithic entity, it should be understood that it may comprise a variety of devices, and that not all programs and files shown will necessarily be contained in any one device. For example, computer programs 120 will typically be loaded into primary memory to execute, while files 125 will typically be stored on magnetic or optical disk storage devices. Additionally, while the operating system 127 is IBM's OS/2 Operating System, any operating system could be used.

Figures 2, 10A:
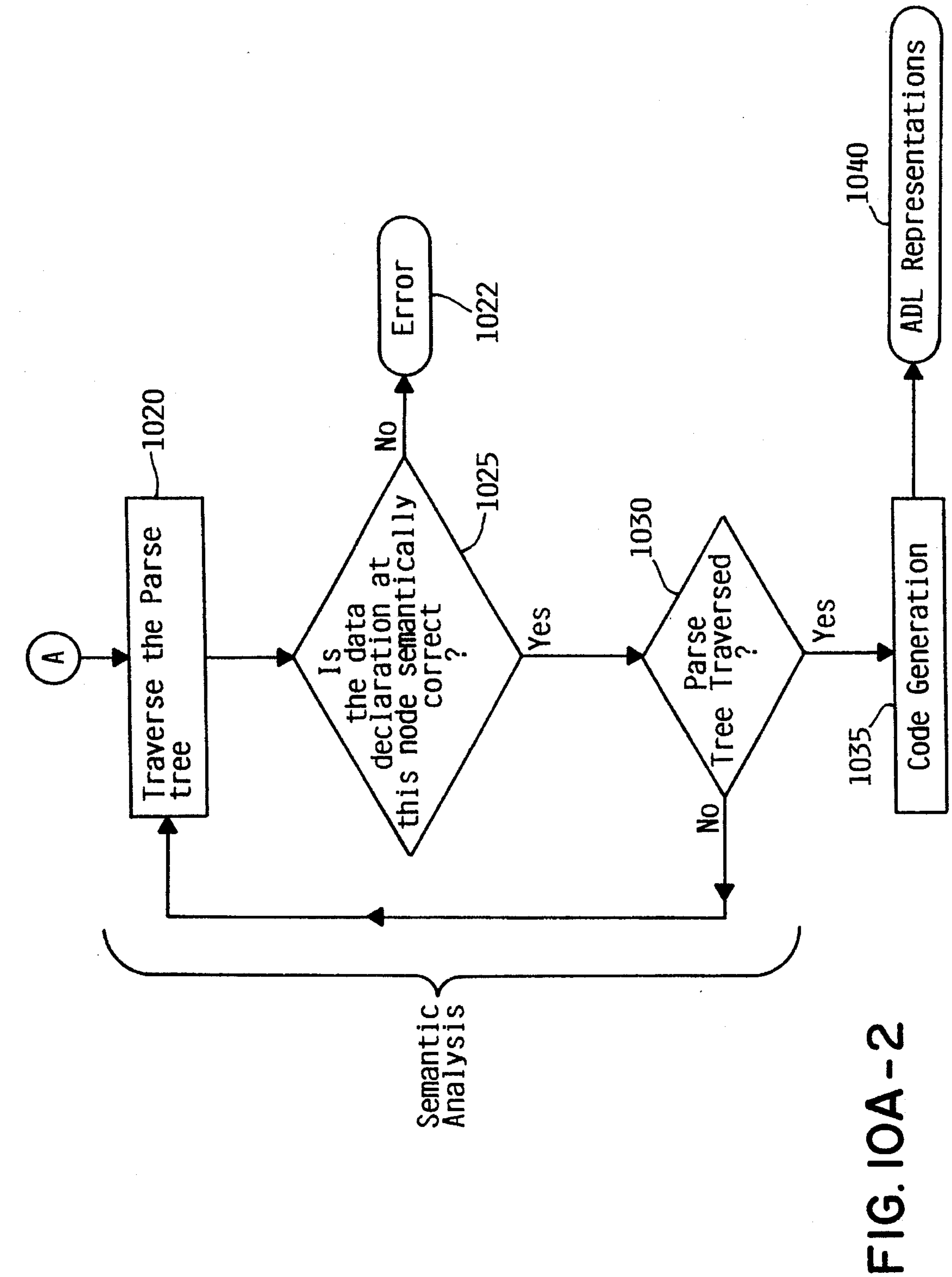

At the center of tke ADL design is a data description and conversion module. Throughout this specification, the phrase "data description and conversion module" and the phrase "ADL module" are to be considered interchangeable. FIG. 2, which shows an example of an ADL module, will be used to first point out and explain various ADL constructs and second to describe an example conversion. ADL module 201 includes declaration sections 200 and plan section 250. Contained within ADL declaration sections 200 and plan section 250 are: ADL statements (e.g., DECLARE 220, BEGIN 225, PLAN 255, and assignment statement 275), statement elements (e.g., constant value "10" 236), ADL data types (e.g., BINARY 242, ARRAY OF CHAR 244, and ARRAY OF CHARPRE 249), and data type attributes (e.g., RADIX 243).

As with many programming languages, the ADL language provides for the use of comments 215 and some basic programming statements (e.g., BEGIN and END statements 225, and CONSTANT statement 235). However, the ADL language also includes statements which have specific importance to ADL. Of primary importance are the DECLARE statement (e.g., DECLARE 220) and the PLAN statement (e.g., PLAN 255).

Typical ADL modules include a DECLARE statement for the source program environment (205 in FIG. 2) and a DECLARE statement for the target program environment (210 in FIG. 2). Stated another way, the DECLARE statements delineate the intermediate data descriptions that will ultimately be used to facilitate data sharing between different program environments.

Although most programming languages commonly provide what are known as "declaration statements", ADL DECLARE statements are significant in that they delineate the section of the ADL module which describes how data is represented by the subject program environments. The ADL statements used in the declaration sections are made up of one or more elements. Beyond standard programming language elements such as characters, literals, and conditions, ADL statements include specialized elements which lend themselves to the data sharing task of the ADL language. Examples of such elements are predicate expressions. The syntax of ADL predicate expressions is identical to those of the Structured Query Language (SQL). (Since SQL is well known in the art, its details will not be described further). As with SQL, ADL predicate expressions include comparison predicates, the BETWEEN, IN and LIKE predicates, and Boolean Operators. For a more thorough treatment of these and other ADL statement elements, refer to Chapter 3 of Appendix 1.

Two important ADL statements that are used within the DECLARE statement are the SEQUENCE and CASE statements. SEQUENCE statements are used to group data statements together while CASE statements are used to describe multiformat data.

The ADL SEQUENCE statement is used to group entities of different data types to form compound data types. FIG. 3 is an example of how the SEQUENCE statement of the target DECLARE statement can be used to define a subset of the fields described by the SEQUENCE statement of the source DECLARE statement. FIG. 3 also shows how the SEQUENCE statement of the target DECLARE statement can be used to reorder the fields of the source SEQUENCE statement. Source SEQUENCE statement 300 is used to group fields A 305, B 310, C 315, and D 320 to form compound data type "source.X" 301. Similarly, target SEQUENCE statement 330 is used to group fields D 335, B 340, and A 350, to form compound data type "target.X" 331. When a PLAN statement is used to assign source.X 301 to target.X 331, the fields A, B, and D will be converted into the target program environment and reordered into the order specified by the SEQUENCE statement of the target DECLARE statement. Field C will be ignored. (Plan statements will be described in forthcoming paragraphs)

FIG. 4 shows an example of how the ADL SEQUENCE statement and the ADL CASE statement can be used together within one ADL DECLARE statement. SEQUENCE statement 405 is used to group BINARY data type 410 with the multiformat data elected by CASE statement 415. CASE statement 415 uses the variable A (described as binary by BINARY data type statement 410) to select whether variables C, D, E, or F will be declared. For example, when variable A is equal to 1, then variable C is declared to be of data type CHAR with a length of 4 (i.e., via attribute LENGTH(4)) 420. However, when variable A is equal to 3, variable E is declared to be of data type BINARY with a length of 3 (i.e., via attribute LENGTH(3)) 440. When A is not equal to 1, 2, or 3, variable F is declared to be of data type ASIS with a length of 4 (i.e., via attribute LENGTH (4)) 450.

To understand how the declarations of FIG. 4 could be used in practice, assume that a PLAN statement is used to assign source.X to target.X. (The PLAN statement and data type attributes will be discussed in greater detail in forthcoming paragraphs). The example shown by FIG. 4 is particularly applicable to the conversion of multiformat files. A multiformat file is one which contains more than one record format. The order and frequency of these records is unpredictable, but each record has a discriminant field that serves to identify its format. Source.X.A is an example of a discriminant field. Since multiformat files and discriminant fields are well known in the art, their details will not be described further. Returning to FIG. 4, the assignment of source.X to target.X will cause source.X.A to be compared to the constants 1, 2, 3 specified in source CASE statement 415. If, for example, source.X.A has a value of 1, then when statement B1 of CASE source.X.B is selected as the description of the data following source.X.A. In this case, the data described is variable source.X.B.C, a CHAR of length 4. When source.X is assigned to target.X, CASE target.X.B is searched for a WHEN statement that also has an identifier of B1. This, then, yields a declaration of target.X.B.C, a CHARPRE field of length 4. Then, the data of source.X.B.C is assigned to target.X.B.C with conversion from the CHAR data type to the CHARPRE data type. Once the conversion is complete, the discriminator field represented by target.X.A is evaluated to ensure that the target discriminator selects the correct declarations. In this example, ADL requires that when discriminator field target.X.A is equal to 1, variable target.X.C is described as being of type CHARPRE.

A WHEN clause may also be used outside of a CASE statement in a data declaration statement. The predicate expression of the WHEN clause is evaluated whenever data is assigned to the declared variable. If the predicate evaluates to FALSE, the conversion is terminated. This capability is in place for two reasons. First, the conversion program that is created using the subject WHEN clause can be used as a filter. That is, only data that satisfies the criteria of the WHEN clause(s) of the target declaration is actually converted and made available to the requesting computer program. The second reason for this capability is to validate data as it is being written to a file. In other words, only data that meets the criteria of the WHEN clause(s) in the target declaration is actually converted and written to the file.

FIG. 5 shows a conversion grid of the ADL data types. These data types are used within the declaration section of the ADL module to describe how the data of the subject program environments is represented on a particular computer system. The data types that are included in the source DECLARE statement describe how data is represented in the source program environment while the data types of the target DECLARE statement describe how data is represented in the target program environment. An "X" on the grid diagram of FIG. 5 indicates that the conversion between the particular data types is supported while the absence of an "X" indicates that conversion between the data types is not supported. For example, the grid shows that the ADL PACKED data type can be converted to any of the following ADL data types: ASIS, BINARY, ENUMERATION, FLOAT, PACKED, and ZONED. In contrast, the absence of an "X" shows that the ADL PACKED data type cannot be converted to the ADL BIT, BITPRE, BOOLEAN, CASE, CHAR, CHARPRE, CHARSFX, and SEQUENCE data types. It should be understood that while some conversions were not supported in the preferred embodiment, these choices do not restrict the capability of the ADL system. For a more thorough treatment of the ADL data types, refer to Chapter 5 of Appendix 1. For a discussion of the data conversions allowed by ADL, see Chapter 8 of Appendix 1.

Since the purpose of the ADL language is to facilitate the creation of conversion programs, the ADL data types are designed to accommodate the data types of a broad spectrum of programming languages as implemented on a variety of computer systems. To accomplish this, each ADL data type is generalized by a set of attributes. For example, the ADL BINARY type has attributes that allow binary encodings of numbers to be: signed or unsigned, real or complex, byte reversed, scaled to base 2 or base 10, or range constrained. In FIG. 2, the BINARY data type of the source program environment's var_1 has been defined to be of base 10 through use of RADIX attribute 243. It is also important to note that not all ADL data types and not all the attributes of any one ADL data type are required for all program environments. For a more thorough treatment of the attributes which modify ADL data types, refer to Chapter 6 of Appendix 1.

ADL PLAN statements are used in ADL to delineate the section of the ADL module which instructs the computer system to perform a particular data conversion or series of data conversions. In FIG. 2, PLAN statement 255 delineates other ADL statements which instruct the computer system to convert the way in which data is represented in the source type domain (as described by DECLARE statement 220) to the way in which data is represented in the target type domain. (as described by DECLARE statement 245). Although the ADL module of FIG. 2 shows only plan section 250, ADL modules often contain multiple plan sections.

In addition to the PLAN statement, the ADL plan section can include: a parameter list, one or more assignment statements, and one or more CALL statements. The PLAN statement defines the calling interface of the plan. The name specified for each parameter must be the name of a variable declared in one of the declaration sections of the ADL module. For INPUT parameters (e.g., INPUT 260 on FIG. 2.), the data passed by the calling computer program to the plan is assumed to be represented as described by the named declaration (e.g., 257 on FIG. 2). Similarly, OUTPUT parameters (e.g., OUTPUT 264 on FIG. 2) expect that the data which is to be returned to the calling computer program is represented as described by the named declaration (e.g., 262 on FIG. 2).

The ADL CALL statement is used to invoke other computer programs. Generally, ADL CALL statements are used for two purposes. First, ADL CALL statements can be used to perform conversions not otherwise available through ADL. For example, if it is necessary to perform a non-supported conversion (i.e., ADL CHAR to ADL BINARY), a special purpose computer program can be written and called directly from the ADL conversion program. The second use of ADL CALL statements is to allow otherwise incompatible computer programs to invoke one another's procedures. Under this scenario, an ADL conversion program is acting as an intermediary between the two incompatible computer programs. The conversion program first performs any necessary conversions of input parameters. Once this is accomplished, the conversion routine calls the appropriate procedure using the converted input parameters. When the invoked procedure returns, the conversion program converts the return parameters back into the form understood by the calling computer program. For a more thorough treatment of these and other ADL statements, refer to Chapter 4 of Appendix 1.

Taken as a whole, ADL module 201 of FIG. 2, represents an "un-compiled" conversion program. The representation of the source program environment data (described by SEQUENCE statement 240) is to be converted to the form of the target program environment data (described by SEQUENCE statement 247). Using the conversion grid of FIG. 5, it can be seen that the conversion between the BINARY data type of the source program environment's var_1 to the BINARY data type of the target program environment's var_1 is supported by ADL. Similarly, the conversion between the CHAR data type of the source program environment's var_2 array to the CHARPRE data type of the target program environment's var_2 array is also supported by ADL. Using assignment statement 275 of plan section 250, the internal form of Source.structure_A is converted to the internal form of Target.structure_A. In operation, this would be accomplished by invoking plan Read 270 and supplying the correct arguments (i.e., an actual structure having the form of Source.structure_A and an actual location for Target.structure_A).

Figure 1A:
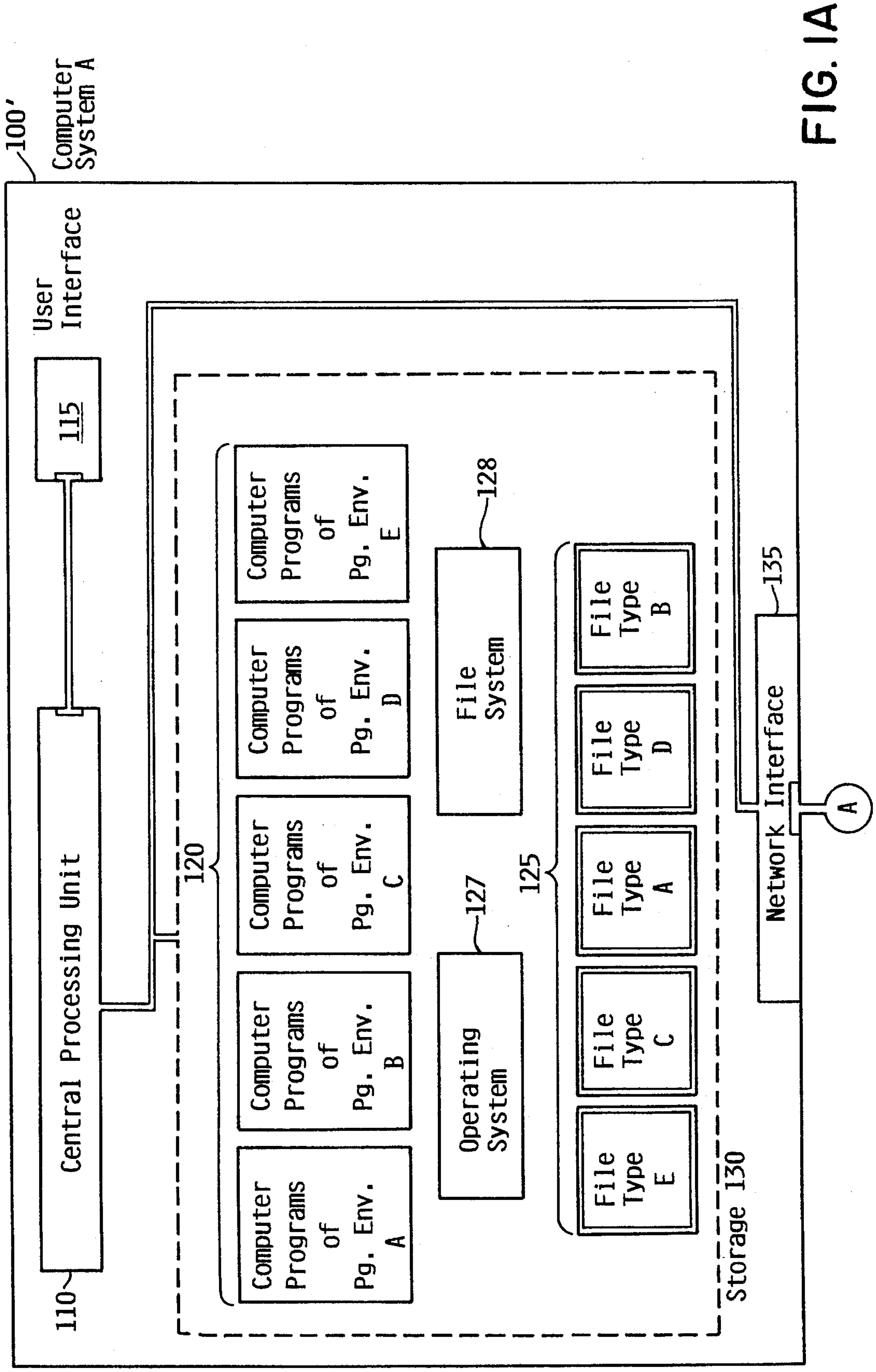
FIG. 1 shows the computer systems of the invention.
Figure 1B:
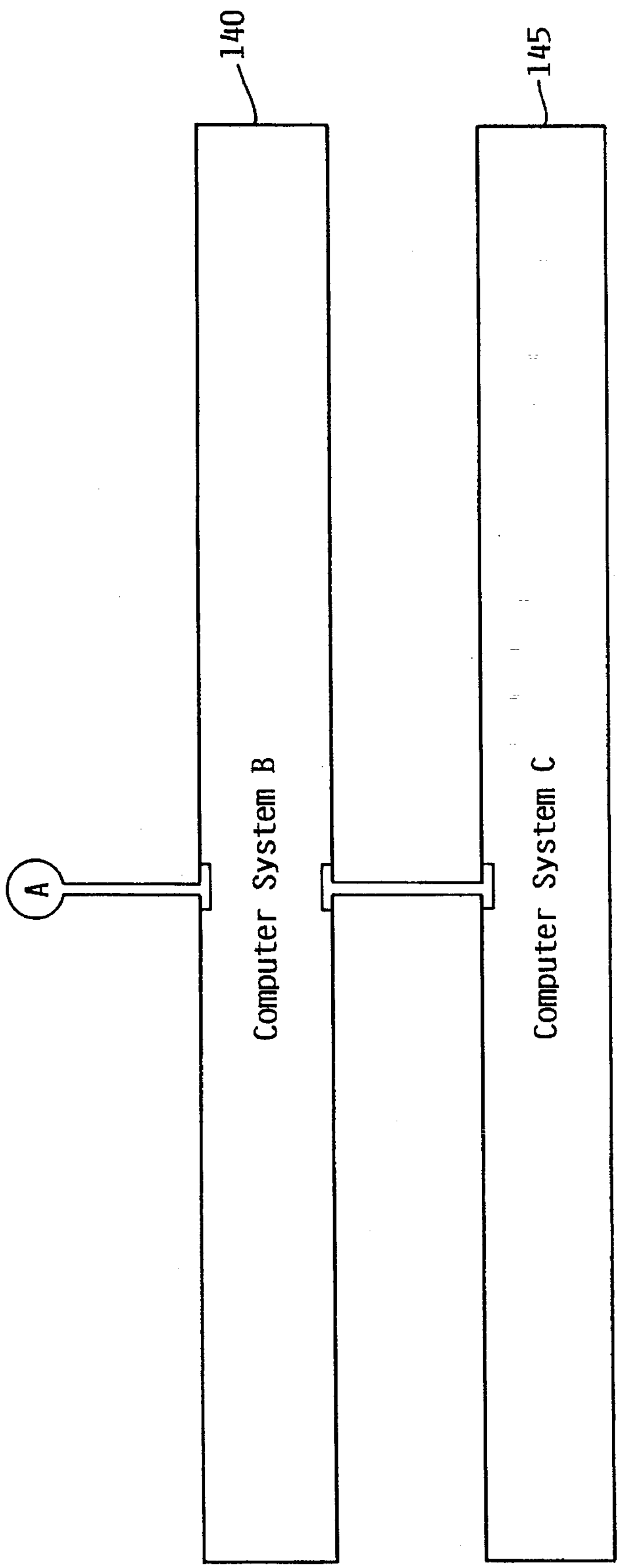
Figure 2A:
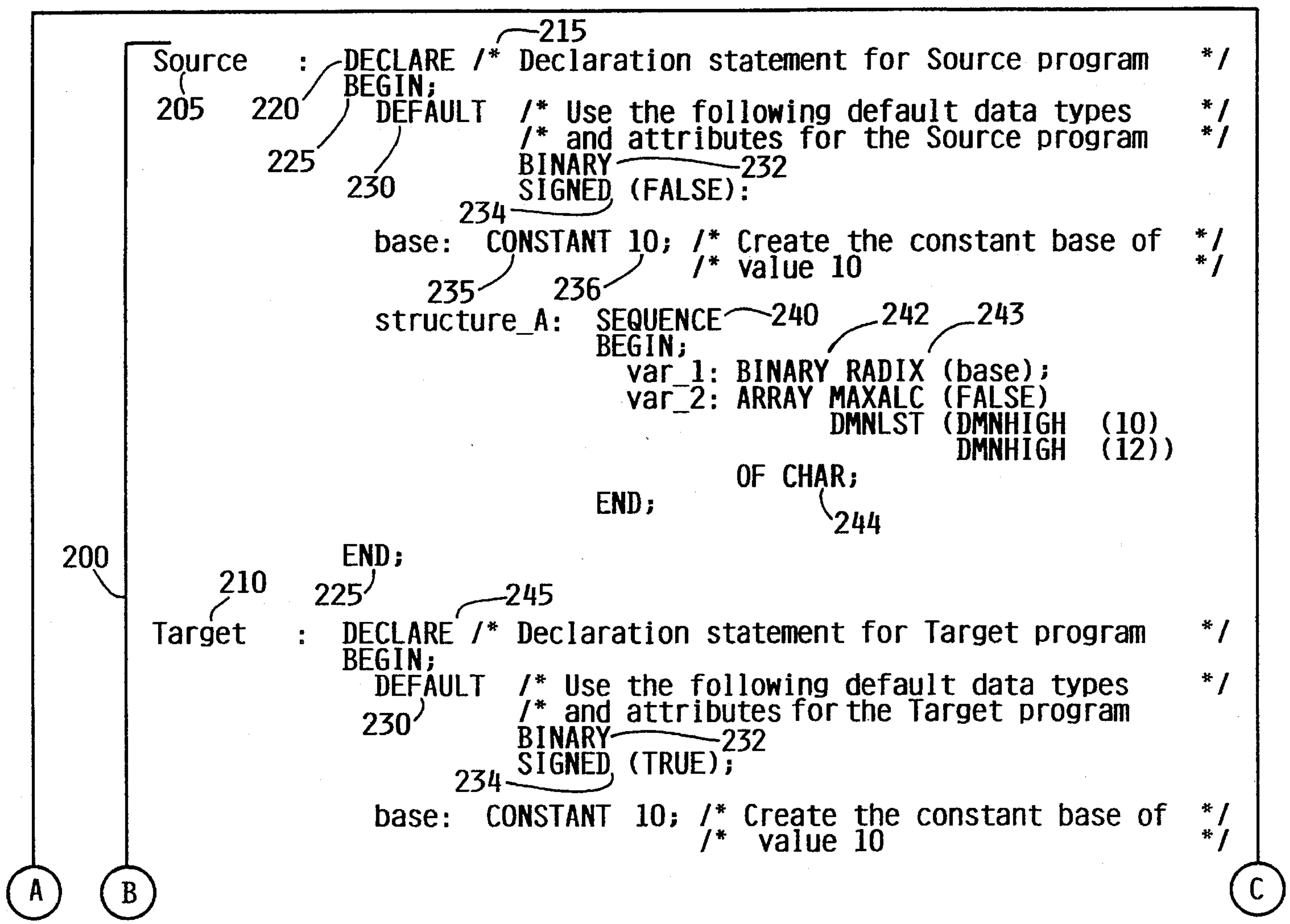
FIG. 2 shows an example ADL module.
Figure 2B:
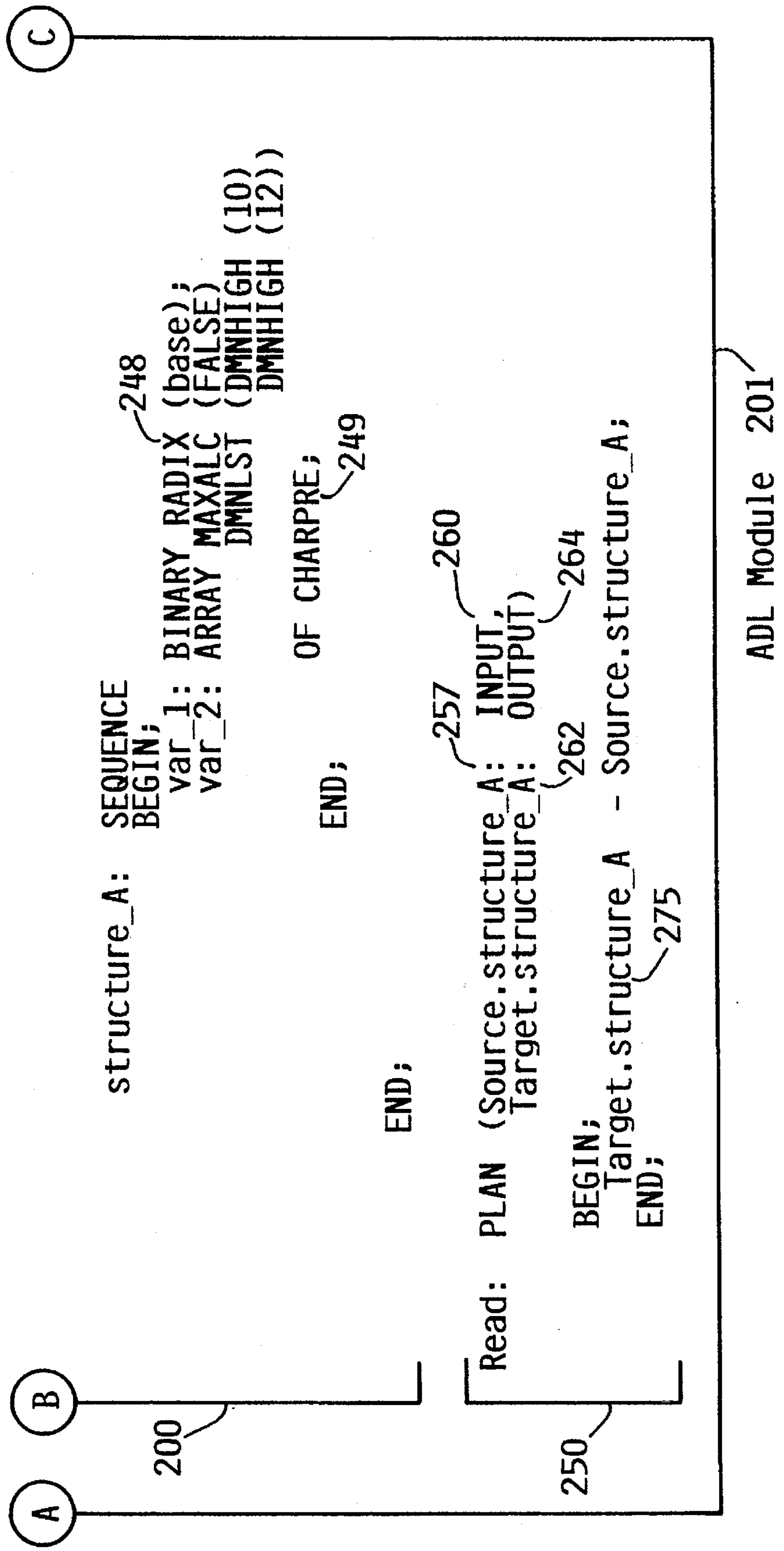
Figure 6:
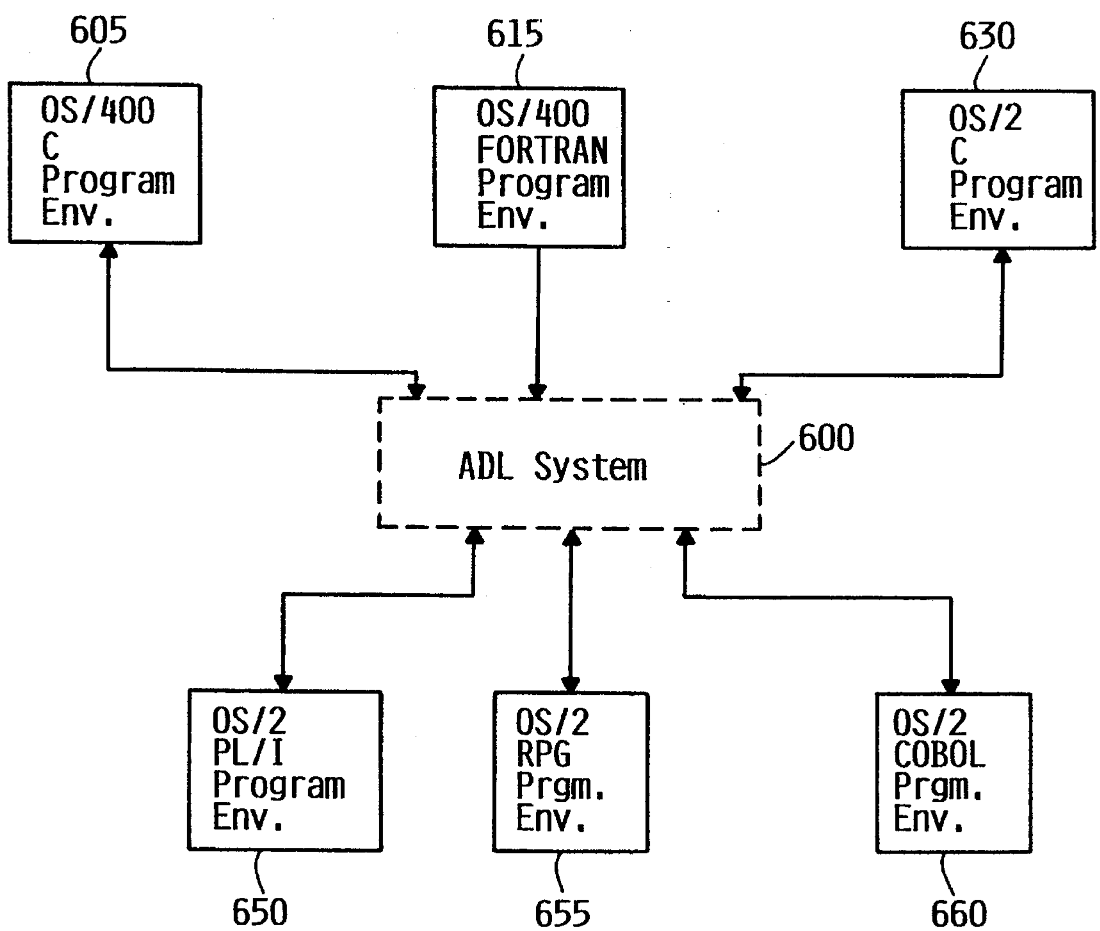
FIG. 6 shows an example of how the ADL system plays the role of an intermediary between program environments.

FIG. 6 shows an example high level flow diagram of how ADL system 600 plays the role of an intermediary by allowing different program environments to share data. Program environments 605, 615, 630, 650, 655, and 660 can all use ADL system 600 to share data amongst one another. For example, OS/2 C program environment 630 can use ADL system 600 to share data stored or created with OS/2 COBOL program environment 660. Similarly, OS/400 FORTRAN program environment 615 can use ADL system 600 to share data stored or created within OS/2 PL/I program environment 650.

Figure 7:
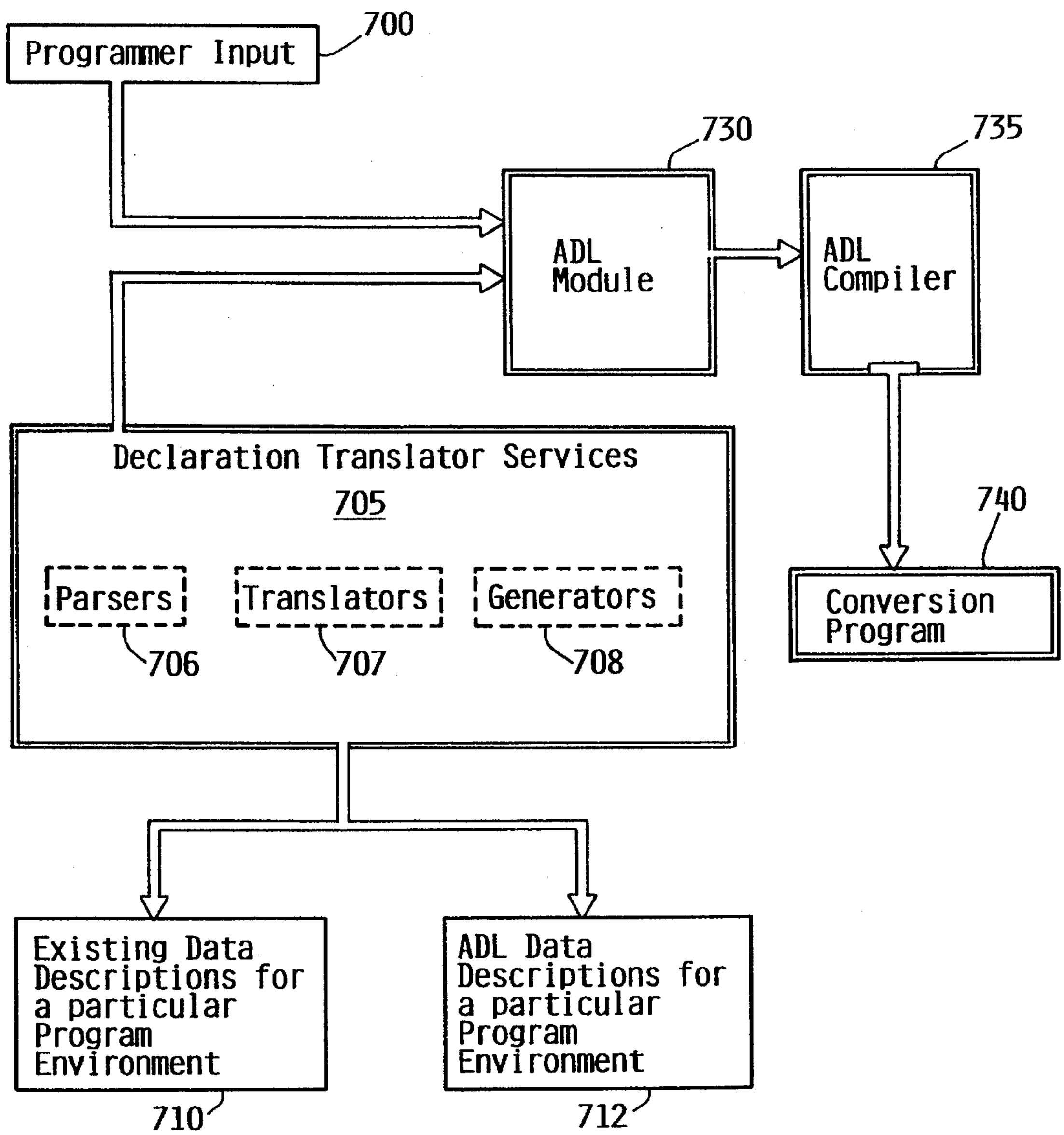
FIG. 7 shows the process by which an ADL conversion program is created.

FIG. 7 shows an exploded view of ADL system 600. ADL module 730 may be created manually through programmer input 700 or automatically through declaration translator services 705. Declaration translator services is described in greater detail in the discussion associated with FIGS. 8 through 10C. Since ADL provides user friendly statements, data types, and elements that can be mastered by those skilled in the computer programming art, a computer programmer can manually write an ADL module to perform the requisite conversion. However, it may in some circumstances be less effort to create ADL module 730 from existing data description 710. For this reason, ADL provides declaration translator services 705. Declaration translator services 705 comprises parsers 706, translators 707, and generators 708. Parsers 706 are used to create an ADL data description from the data descriptions of a particular program environment (e.g., an OS/2 C program environment). Translators 707 are used to translate an ADL description for a different program environment (e.g., an OS/2 COBOL program environment) into an ADL description of the required program environment (e.g. an OS/2 C program environment). Generators 708 are used to generate a data description for a particular program environment (e.g. an OS/2 C program environment) from an existing ADL data description.

Once ADL module 730 has been created by either programmer input 700 or declaration translator 705, it is compiled by ADI, compiler 735 into executable conversion program 740. The design of ADL compiler 735 is dependent upon the computer system involved. For a thorough treatment of the ADL syntax necessary to construct an appropriate ADL compiler, refer to the document incorporated as Appendix 1.

Figure 8A:
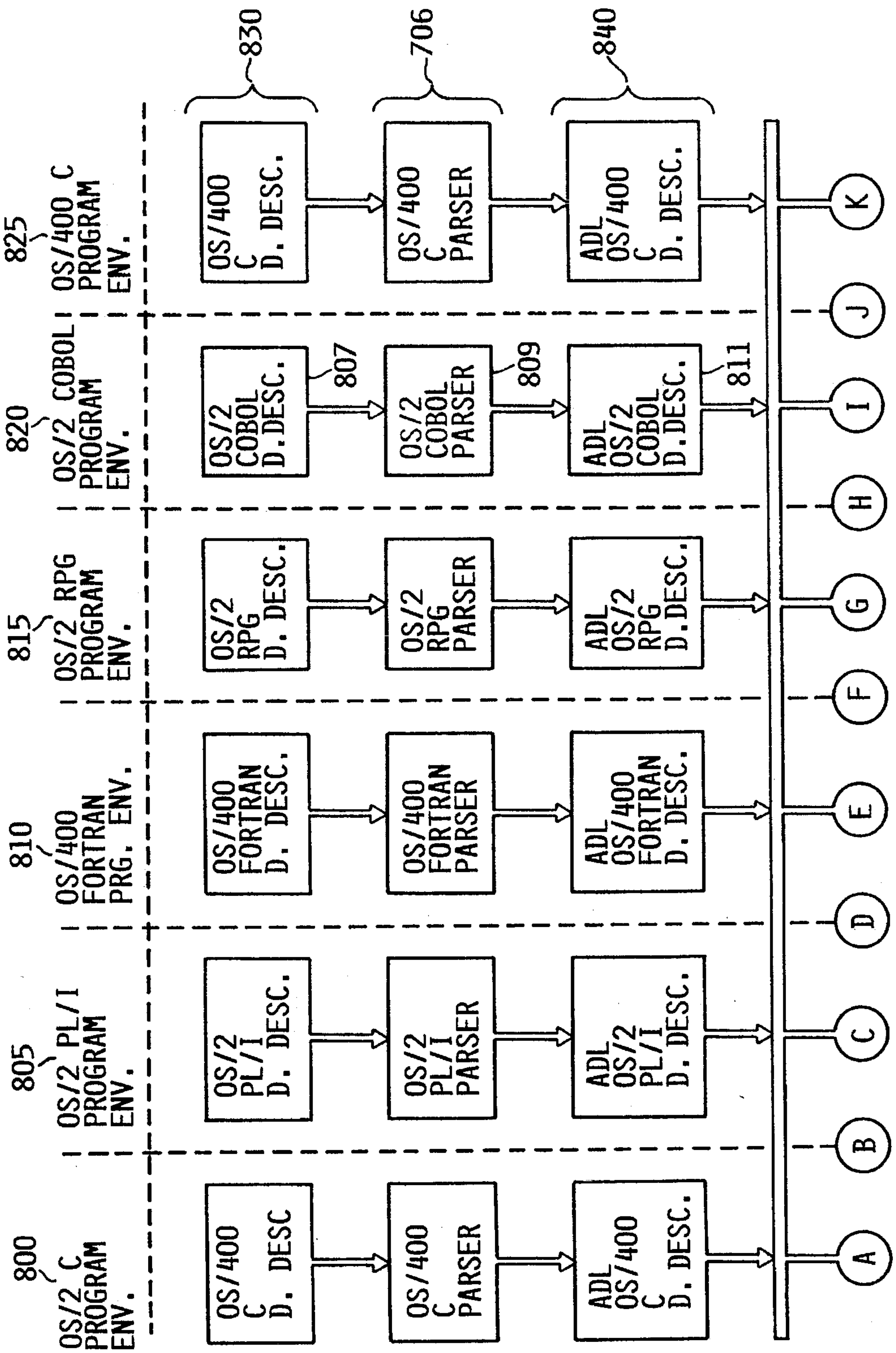
FIG. 8 shows the interaction of various declaration translators.
Figure 8B:
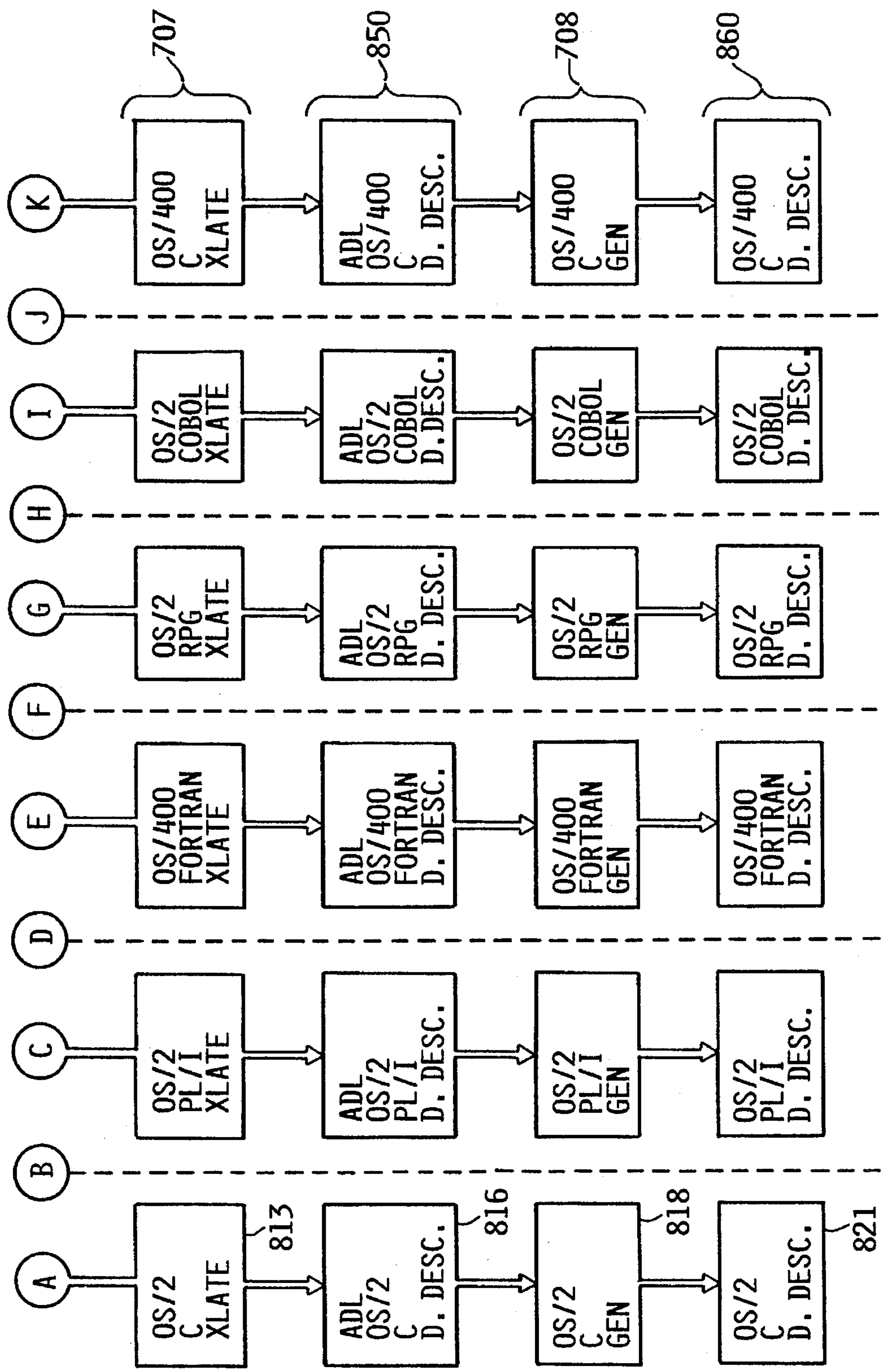

FIG. 7 shows that declaration translator services 705 is made up of parsers 706, translators 707, and generators 708. In operation, a parser, translator, and generator exist for each program environment. In other words, parsers 706, translators 707, and generators 708 of declaration translator services 705 are partitioned into individual declaration translators. FIG. 8 shows how declaration translators interact within declaration translator services 705.

Each declaration translator supports a particular program environment. Examples of program environments which could be supported in the ADL system of the preferred embodiment are shown as columns in FIG. 8. From left to right the following program environments are shown: 800 (OS/400 C), 805 (OS/2 PL/I), 810 (OS/400 FORTRAN), 815 (0S/2 RPG), 820 (OS/2 COBOL), and 825 (OS/400 C). Also shown in row form on FIG. 8 are parsers 706, translators 707, and generators 708.

Parsers 706 are used to create the intermediate data descriptions (shown as row 840) from native data descriptions (shown as row 830). (The word "native," when used to describe a data description, should be understood to mean the normal manner with which data is described by the language of the subject program environment.) Translators 707 form the bridge between the subject program environments. Once an intermediate data description is created for one program environment, translators 707 can be used to translate it into an intermediate data description for another program environment (shown as row 850). To complete the cycle, generators 708 can be used to generate native data descriptions (860 or 830) from an intermediate data description. It is important to note that while generators 708 are shown to operate on intermediate data descriptions 850, generators 708 can only operate on intermediate data description, appropriate to their own program environment, including those shown by row 840.

For an example of how the declaration translators of declaration translator services 705 would operate in practice, consider the need to share data between OS/2 COBOL program environment 820 and OS/2 C program environment 800. Native OS/2 COBOL data description 807 is first parsed by OS/2 COBOL parser 809 to create ADL OS/2 COBOL data description 811. ADL OS/2 COBOL data description 811 could then be used as the source data description by ADL system 600. The translator for the OS/2 C program environment (i.e. translator 813) then translates data description 811 into a target data description (shown as ADL OS/2 C data description 816). If necessary, OS/2 C generator 818 could be used to generate native OS/2 C data description 821 from intermediate ADL OS/2 C data description 816.

Figure 9A:
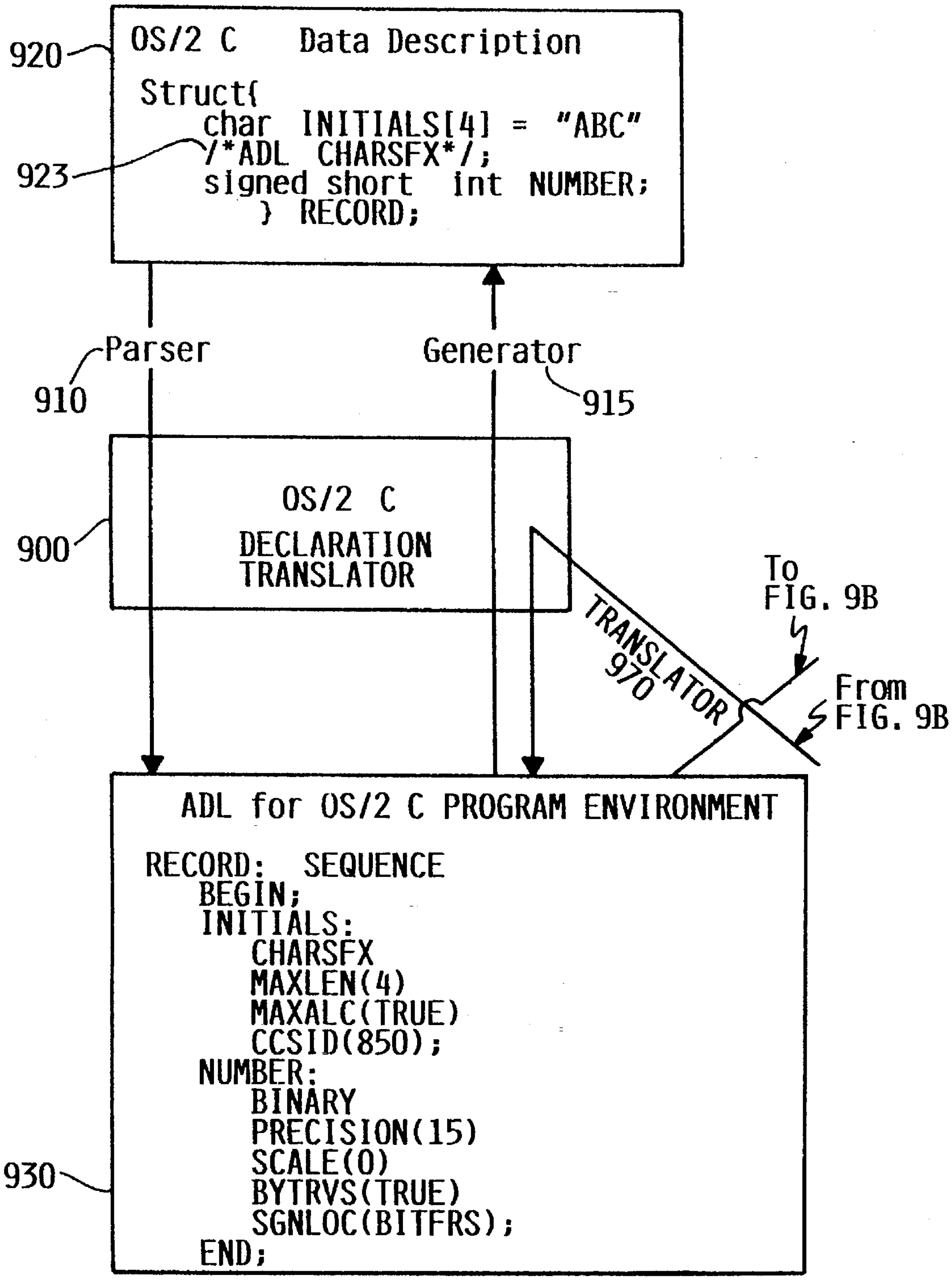
FIG. 9 shows how ADL declaration translators interact with data descriptions.
Figure 9B:
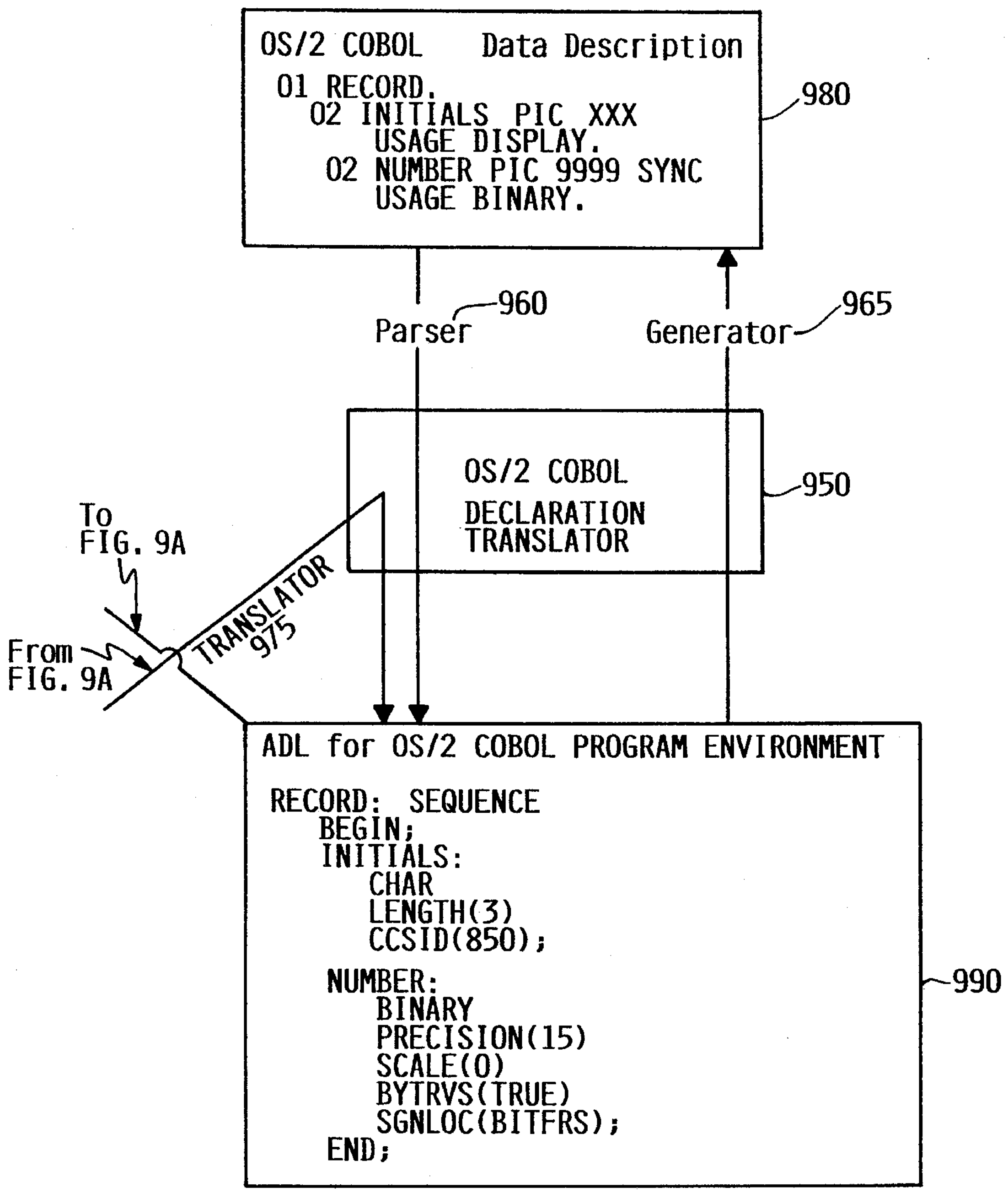

FIG. 9 expands upon this last example to show how individual declaration translators are used to create ADL modules, and eventually, conversion programs. Each declaration translator understands the following things about its programming environment: the syntax of the programming language used by programmers for describing data, the data types supported by the programming language, the attributes of the programming language used to qualify the data types, the representations used by the compiler for each data type, the method used by the compiler for aligning data in memory, and the methods used by the compiler for mapping constructor types to memory.

OS/2 C declaration translator 900 and OS/2 COBOL declaration translator 950 are used to manipulate data descriptions 920, 930, 980, and 990. Parser 910 of OS/2 declaration translator 900 is used to parse native OS/2 C data description 920 to create intermediate ADL OS/2 C data description 930. ADL OS/2 C data description 930 could then be used as a source or target description within an ADL module. Similarly, parser 960 is used to parse OS/2 COBOL data description 980 to create ADL OS/2 COBOL data description 990. ADL OS/2 COBOL data description 990 could likewise be used as a source or target description within an ADL module.

Since declaration translators 900 and 950 each contain a translator (970 and 975), ADL OS/2 C data description 930 can be translated into ADL OS/2 COBOL data description 990 and vise versa. As before, either ADL data description (i.e., 930 and 990) can then be used as a source or target description within an ADL module.

Generators 915 and 965 are used to create native data descriptions 920 and 980 from ADL data descriptions 930 and 990. This capability is valuable in that it allows programmers to make changes to ADL modules using the programming language with which they are most familiar. Once the programmer uses his or her preferred programming language to make the requisite change, a parser can be used to parse the data description back into an ADL data description. For example, assume that ADL OS/2 C data description 930 is a source data description from an ADL module. A programmer who is familiar with the C programming language could use Generator 915 to create OS/2 C data description 920. Since our hypothetical programmer is familiar with the C programming language, he or she can then make any necessary changes to OS/2 C data description 920 directly. Once the changes have been made, the programmer can use parser 910 to parse C data description 920 back into ADL OS/2 C data description 930.

FIG. 10A shows the operation of parsers 710 and 760 in greater detail. The operation is similar to that involved in the construction of a high level language compiler. Parsers 710 and 760 read the data declarations in the syntax of the program environment's programming language and group them into sequences of characters that have a collective meaning (i.e., lexically analyze) 1000. The groups, or tokens, are fed into the syntactic analysis part of the operation 1005. This component analyzes the syntactic structure of the source data declarations to ensure that it conforms to the grammar of the programming language. If the data declarations are grammatically incorrect, an error condition is signalled 1007. During syntactic analysis operation, parse trees which are "tree form" representations of the source data declarations are built 1010. In addition to the parse trees, symbol tables of identifiers are constructed. Included within the symbol tables are attributes used in the source data declarations 1015. The result of the syntactic analysis operation is fed into the semantic analysis phase of the operation 1020. This phase involves semantic actions associated with each node of the parse trees generated 1025. This is done to ensure that the source data declarations are semantically correct. If the declarations are not semantically correct, an error condition is signalled. When the parse tree has been completely traversed 1030, the ADL data descriptions that correspond to the source data descriptions are generated 1035.

Figure 10B:
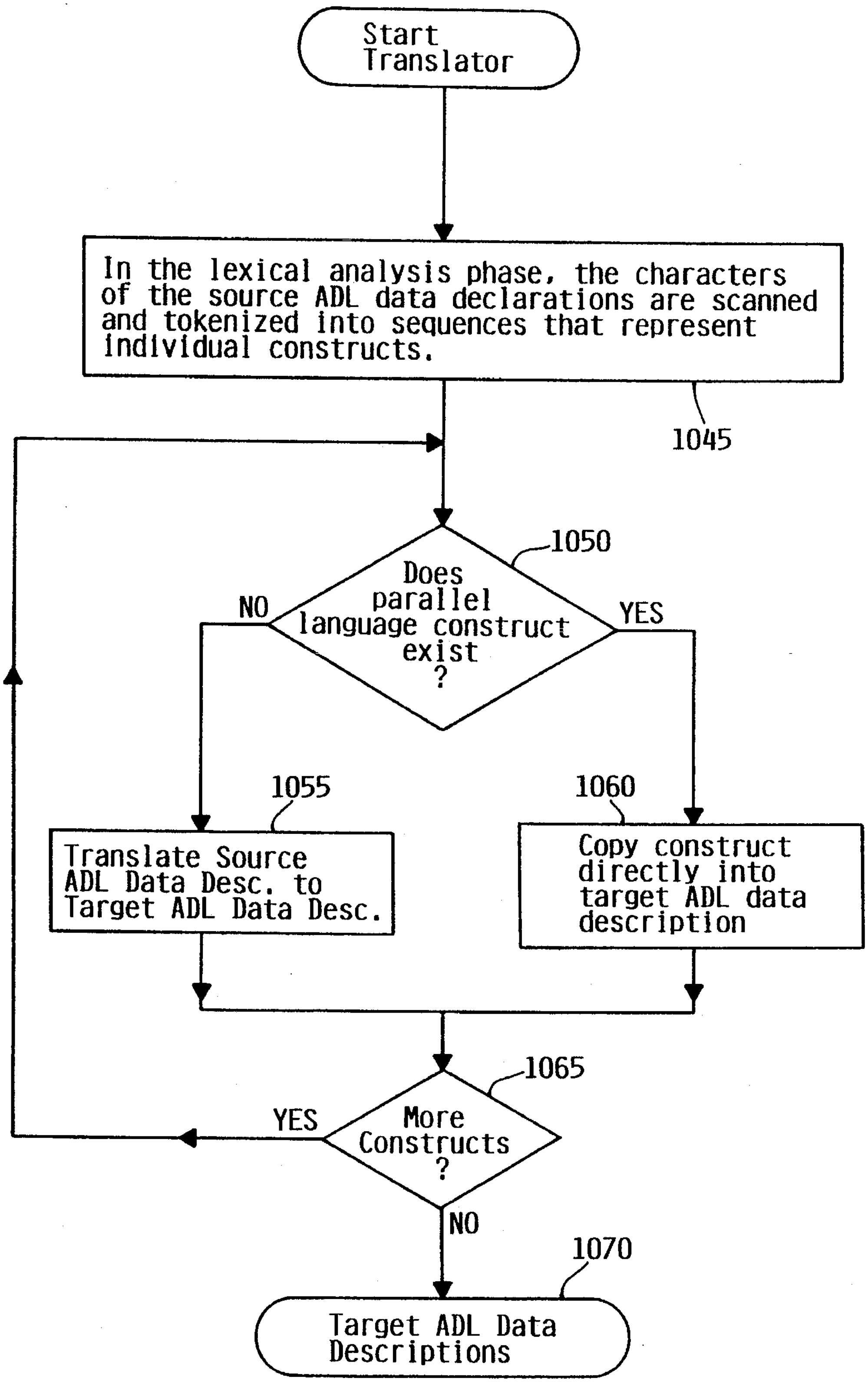
FIG. 10B shows a flow diagram of how an ADL data description for one program environment is translated into an ADL data description for another program environment.

FIG. 10B shows the operation of translator 770 in greater detail. Translator 770 first reads and tokenizes the data descriptions in ADL syntax. The translator then analyzes the ADL syntax to determine the structure of the source ADL data descriptions 1045. The operation starts at the highest level structure and continues to lower level constructs. For each structure identified, the translator determines whether a parallel language construct exists within the target declaration translator's programming environment (i.e., whether the language construct is supported in the target declaration translator's programming environment) 1050. If a parallel language construct does exist, no translation of the structure is required. The structure is copied directly into the target ADL descriptions 1060. If the language construct is nonparallel (i.e., not supported in the target declaration translator's programming environment), the structure is translated into the most comparable language construct that is supported by the target declaration translator 1055. For example, this translation would occur when a singular, nonparallel language construct can be translated into a composite language construct. This process continues until the lowest level of the source data descriptions (i.e., field level descriptions) are analyzed and their data types and attributes are either copied or translated 1065. When all of the source ADL declarations are processed, the translation is complete 1070.

Figures 1, 10C:
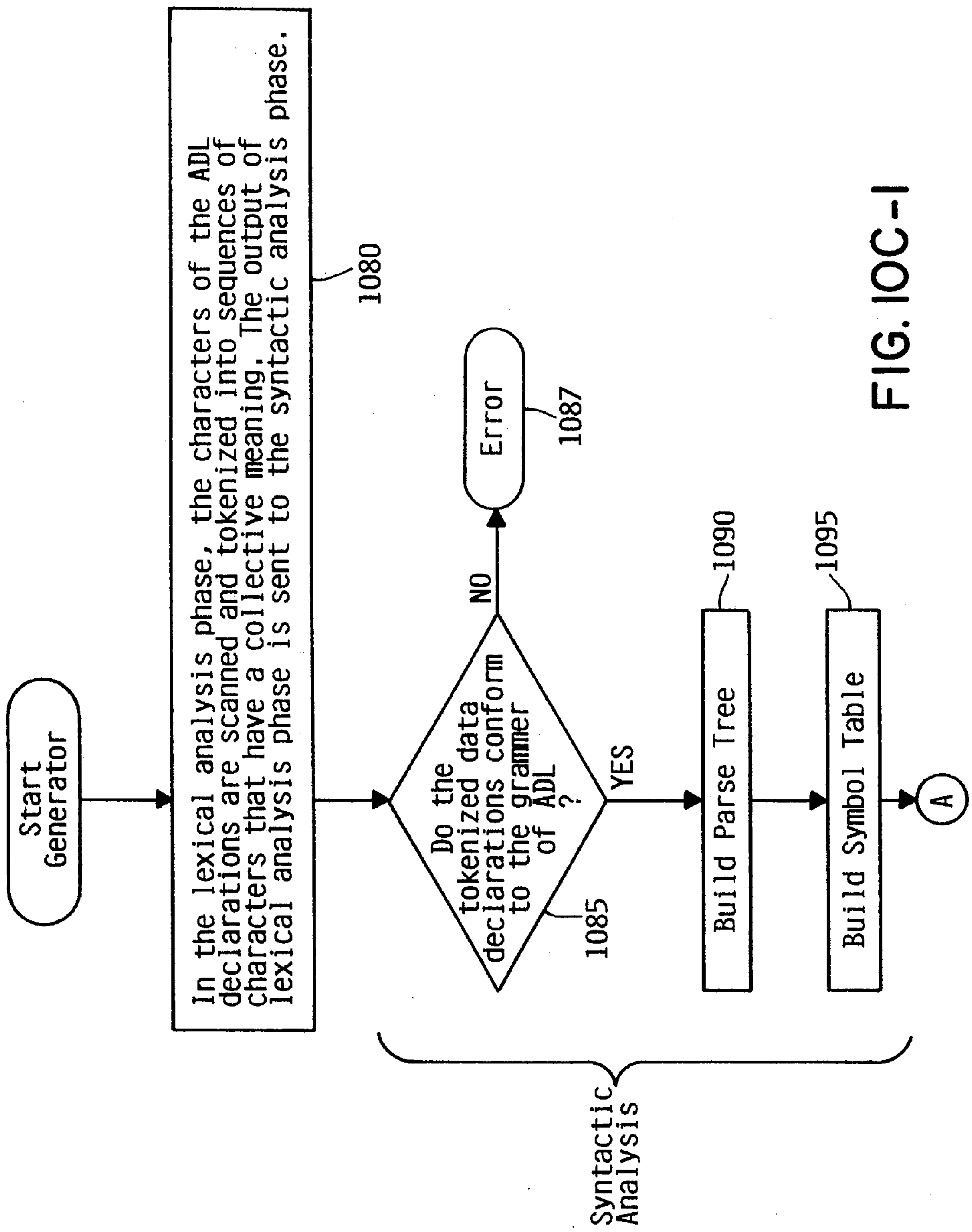
Figures 2, 10C:
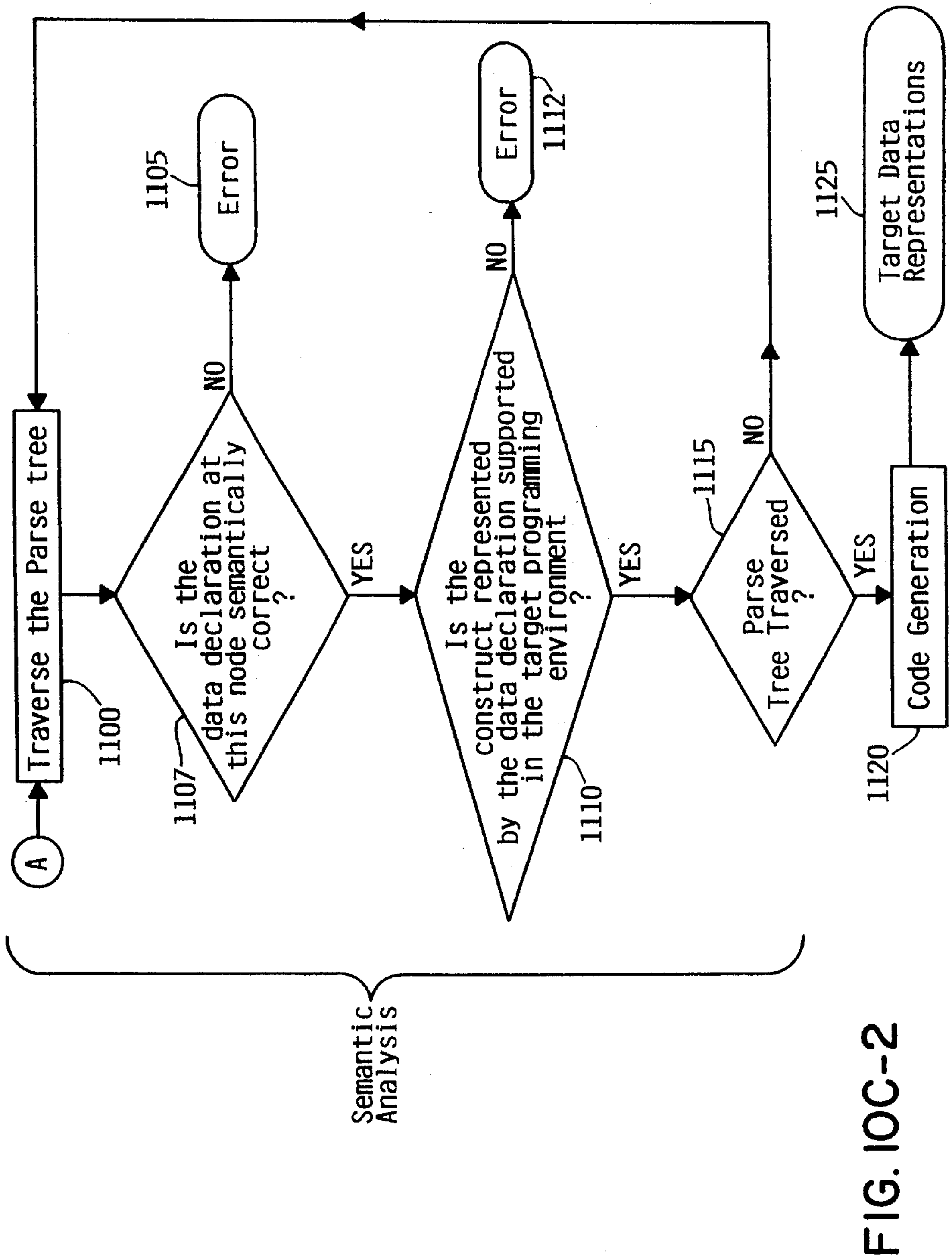

FIG. 10C shows the operation of generators 715 and 765 in greater detail. The operation is conceptually inverse to the operation of the parsers 710 and 760. Parsers 710 and 760 map programming language descriptions into ADL data descriptions while generators 715 and 765 map ADL data descriptions into programming language data descriptions. Generators 715 and 765 read the data descriptions in ADL syntax and group them into sequences of characters that have a collective meaning (i.e., lexically analyze) 1080. The groups, or tokens, are fed into the syntactic analysis part of the operation 1085. This component analyzes the syntactic structure of the source data declarations to ensure that it conforms to the ADL grammar. If the data declarations are grammatically incorrect, an error condition is signalled 1087. During syntactic analysis operation, parse trees which are "tree form" representations of the source data declarations are built 1090. In addition to the parse trees, symbol tables of identifiers are constructed. Included within the symbol tables are attributes used in the source data declarations 1095. The result of the syntactic analysis operation is fed into the semantic analysis phase of the operation 1100. This phase involves semantic actions associated with each node of the parse trees generated 1107. This is done to ensure that the ADL data declarations are semantically correct. If the ADL data declarations are not semantically correct, an error condition is signalled 1105. Next, generators 715 and 765 determine whether the subject construct is supported in the target programming environment 1110. If the construct is not supported, an error condition is signalled 1112. When the parse tree has been completely traversed 1115, the ADL data descriptions that correspond to the source data descriptions are generated 1120.

For examples of declaration translators, refer to the declaration translator document for the OS/2 C declaration translator which is included as Appendix 2 and incorporated herein. This document was unpublished as of the filing date of the patent application.

As seen at 923 on FIG. 9, data descriptions can be annotated to include information intended for the ADL compiler. This capability is important in that it allows a programmer to augment the power of a particular programming language. A programmer may wish to add an information field to a record (e.g., a title) or a programmer may wish to override a conversion normally provided by ADL. For more information regarding ADL annotation, refer to the document "Data Description and Conversion Architecture" which is included as Appendix 3 and incorporated herein.

One of the best examples of the power of ADL and the ADL declaration translators is the ability to access data stored by computer programs from different program environments. To access data stored in different program environments, ADL conversion programs can be created on an as needed basis. In the preferred embodiment, however, ADL is incorporated into file system 128 of FIG. 1. Whenever a file is created, file system 128 creates an ADL description of how data is represented in the original program environment by using the parser included in the original program environment's declaration translator. This ADL description becomes the source ADL data description. File system 128 then appends the source ADL data description to the file itself.

When a computer program from a second program environment wishes to access the data stored by the original program environment, file system 128 will first use the translator of the second program environment's declaration translator to create an ADL data description of how the data will be represented in the second program environment. This ADL description becomes the target ADL data description. File system 128 will then combine the two ADL data descriptions with default plans. File system 128 then submits this combination of ADL descriptions and plans (i.e., the ADL module) to an ADL compiler. The result of the compilation is an ADL conversion program which allows a computer program from the second program environment to access data stored by a computer program from the original program environment.

Beyond the use of ADL conversion programs to access data stored by computer programs from different programming environments, ADL conversion programs can be used to exchange messages between computer programs from different program environments, invoke the procedures of a computer program which exists in a different program environment, and invoke the procedures of a computer program which exists in a different program environment and on a different computer system. For a detailed treatment of the various uses of ADL and the ADL declaration translators, refer to Appendix A of the attached Appendix 1.

Although a specific embodiment of the invention has been disclosed, it will be recognized by those skilled in the art that additional variations in form and detail may be made within the scope of the following claims.

Distributed Data Management Architecture Specifications for A Data Language

Document Number SC21-8286-0

Distributed Data Management Architecture

SC21-8286-0

Specifications for A Data Language

IBM

Distributed Data Management Architecture

SC21-8286-0

Specifications for A Data Language

First Edition (March 1992)

This edition is the first version of the Specifications for A Data Language and to all subsequent modifications until otherwise indicated in new editions. Make sure you are using the proper edition for the level of the product.

Order publications through your IBM representative or the IBM branch serving your locality. Publications are not stocked at the address given below.

A form for readers' comments is provided at the back of this publication. If the form has been removed, address your comments to:

Attn Department 245
IBM Corporation
3605 Highway 52 N
Rochester, MN 55901-7899 USA When you send information to IBM, you grant IBM a non-exclusive right to use or distribute the information in any way it believes appropriate without incurring any obligation to you or restricting your use of it.

Contents

About This Manual . . . . . ix

Notices . . . . . xi
Trademarks and Service Marks . . . . . xi

Chapter 1. Introduction . . . . . 1
Overview . . . . . 1
Scope . . . . . 1
Notation . . . . . 1
Conventions . . . . . 2
Conformance . . . . . 3

Chapter 2. Concepts . . . . . 5
Introduction . . . . . 5
ADL Syntax . . . . . 10
Data Types . . . . . 12
Modules . . . . . 14
Declarations . . . . . 14
Plans . . . . . 17

Chapter 3. Common Elements . . . . . 21
Constants . . . . . 21
<BETWEEN predicate> . . . . . 21
<character> . . . . . 22
<comparison predicate> . . . . . 23
<condition> . . . . . 24
<identifier> . . . . . 25
<IN predicate> . . . . . 26
<LIKE predicate> . . . . . 26
<literal> . . . . . 28
<module> . . . . . 30
<positional identifier> . . . . . 30
<predicate> . . . . . 31
<qualified identifier> . . . . . 31
<token> . . . . . 33
<value expression> . . . . . 35
<when clause> . . . . . 35

Chapter 4. Statements . . . . . 37
<assignment statement> . . . . . 37
<BEGIN statement> . . . . . 37
<CALL statement> . . . . . 38
<CONSTANT statement> . . . . . 38
<data declaration statement> . . . . . 39
<DECLARE statement> . . . . . 41
<DEFAULT statement> . . . . . 41
<END statement> . . . . . 43
<INCLUDE statement> . . . . . 44
<OTHERWISE statement> . . . . . 44
<PLAN statement> . . . . . 45
<REJECT statement> . . . . . 46

<SKIP statement> . . . . . 47
<SUBTYPE statement> . . . . . 48
<WHEN statement> . . . . . 50

Chapter 5. Data Declarations . . . . . 53
<ARRAY> . . . . . 53
<ASIS> . . . . . 58
<BINARY> . . . . . 60
<BIT> . . . . . 65
<BITPRE> . . . . . 67
<BOOLEAN> . . . . . 68
<CASE> . . . . . 69
<CHAR> . . . . . 73
<CHARPRE> . . . . . 76
<CHARSFX> . . . . . 78
<ENUMERATION> . . . . . 79
<FLOAT> . . . . . 81
<PACKED> . . . . . 86
<SEQUENCE> . . . . . 88
<subtype instance> . . . . . 89
<ZONED> . . . . . 91

Chapter 6. Attributes . . . . . 95
<BLNENC attribute> . . . . . 95
<BYTRVS attribute> . . . . . 95
<CCSID attribute> . . . . . 96
<COMPLEX attribute> . . . . . 97
<CONSTRAINED attribute> . . . . . 98
<DMNHIGH attribute> . . . . . 99
<DMNLOW attribute> . . . . . 99
<DMNLST attribute> . . . . . 100
<DMNMAX attribute> . . . . . 100
<DMNSIZE attribute> . . . . . 101
<FIT attribute> . . . . . 101
<FORM attribute> . . . . . 102
<HELP attribute> . . . . . 103
<HIGH attribute> . . . . . 103
<JUSTIFY attribute> . . . . . 104
<LENGTH attribute> . . . . . 104
<LOW attribute> . . . . . 105
<MAXALC attribute> . . . . . 106
<MAXLEN attribute> . . . . . 106
<NOTE attribute> . . . . . 107
<PREBYTRVS attribute> . . . . . 107
<PRECISION attribute> . . . . . 108
<PRELEN attribute> . . . . . 109
<RADIX attribute> . . . . . 109
<SCALE attribute> . . . . . 110
<SFXENC attribute> . . . . . 110
<SGNCNV attribute> . . . . . 111
<SGNLOC attribute> . . . . . 113
<SGNMNS attribute> . . . . . 115
<SGNPLS attribute> . . . . . 115
<SGNUNS attribute> . . . . . 116
<SIGNED attribute> . . . . . 116

<SKIP attribute> . . . 117
<TITLE attribute> . . . 117
<UNITLEN attribute> . . . 118
<ZONENC attribute> . . . 118

Chapter 7. Functions . . . 121
<LENGTH function> . . . 121
<SUBSTR function> . . . 121

Chapter 8. Conversion of Data Types . . . 123
General Conversion Rules . . . 123
ARRAY-to-ARRAY . . . 125
ASIS-to-constructor . . . 126
ASIS-to-field data types . . . 126
BINARY, PACKED, ZONED-to-ENUMERATION . . . 127
BIT-to-BIT . . . 128
BIT-to-BITPRE . . . 129
BITPRE-to-BIT . . . 129
BITPRE-to-BITPRE . . . 129
BOOLEAN-to-BOOLEAN . . . 130
CASE-to-CASE . . . 130
CHARxxx-to-CHARxxx . . . 130
Constructor-to-ASIS . . . 133
ENUMERATION-to-BINARY, PACKED, ZONED . . . 133
ENUMERATION-to-ENUMERATION . . . 134
field data types-to-ASIS . . . 135
Numeric Conversions . . . 135
SEQUENCE-to-SEQUENCE . . . 154

Chapter 9. Program Calling Conventions . . . 155

Chapter 10. ADL Condition Summary . . . 157

Appendix A. Scenarios . . . 161
Calling A Conversion Plan . . . 161
Generalizing a Conversion Plan . . . 162
Calling a User Written Program from a Plan . . . 163
Converting File Records by Calling ADL Plans . . . 165
Access Method Conversion of File Records . . . 167
View File Conversion of File Records . . . 170
Selecting and Reordering Fields of Records . . . 172
Filtering a File's Records . . . 173
Validating File Input and Update Records . . . 175
Updating File Records . . . 177
Converting Record Keys . . . 179
Converting Files of Text Records . . . 181
Defining Default Plans . . . 182
Multiformat Files . . . 184
Converting Program Call Parameters . . . 185
Converting Remote Program Call Parameters . . . 187
Converting Mapped Communications Records . . . 191

Appendix B. Backus Naur Form Summary . . . 195

Glossary . . . 217

Index . . . . . . . . . . . . . . . . . . . . . . . . . . . . . . . . . . . . . . . . . . . . . . . . . . . . . . . . . 219

Figures

1. ADL Modules Bridge Differences Between Representation Domains . . . 7
2. An Example of the Diversity of Data Encodings . . . 8
3. The Role of ADL Modules . . . 9
4. Declaration Translator Functions . . . 10
5. Invoking a Plan . . . 18
6. Layout of a Signed BINARY Field . . . 61
7. Varying Length Character Strings with Length Prefixes . . . 76
8. Varying Length Character Strings with a Suffix . . . 78
9. ADL Data Type Conversion Matrix . . . 124
10. Calling a Conversion Plan . . . 162
11. Calling a User Written Program from a Conversion Plan . . . 164
12. Converting File Records by Calling ADL Plans . . . 166
13. Access Method Conversion of File Records . . . 169
14. View File Conversion of File Records . . . 171
15. Assembling an ADL Module from File and View Attributes . . . 172
16. Data Conversions During Program Calls . . . 186
17. Data Conversions during Remote Program Calls . . . 188

Tables

1. Precedence Rules for Numeric Expressions . . . 3
2. Range of Enumerated Values . . . 80
3. Hexadecimal Floating-point Formats . . . 82
4. Binary Floating-point Formats . . . 83
5. <FLOAT> Maximum Precision . . . 85
6. Target Array Dimension Considerations . . . 126
7. Determination of Target ASIS, BIT Length Fields and Length Reference Field Updates . . . 128
8. CHARxxx-to-CHAR Target Length Considerations with the LENGTH Attribute . . . 131
9. CHARxxx-to-CHAR Target Length Considerations with the HIGH and LOW Attributes . . . 132
10. CHARxxx-to-CHAR Target Reference Field Update Considerations . . . 132

About This Manual

This manual formally describes A Data Language (ADL). This language is used to describe and convert data that is exported and imported by other programming languages. The initial level of ADL focuses on the data types and representations found in the *IBM Systems Application Architecture** languages.

Notices

References in this publication to IBM* products, programs, or services do not imply that IBM intends to make these available in all countries in which IBM operates. Any reference to an IBM product, program, or service is not intended to state or imply that only IBM's product, program, or service may be used. Any functionally equivalent product, program, or service that does not infringe any of IBM's intellectual property rights may be used instead of the IBM product, program, or service. Evaluation and verification of operation in conjunction with other products, except those expressly designated by IBM, is the user's responsibility.

IBM may have patents or pending patent applications covering subject matter in this document. The furnishing of this document does not give you any license to these patents. You can send license inquiries, in writing, to the IBM Director of Commercial Relations, IBM Corporation, Purchase, NY 10577.

This publication could contain technical inaccuracies or typographical errors.

This publication may refer to products that are announced but not currently available in your country. This publication may also refer to products that have not been announced in your country. IBM makes no commitment to make available any unannounced products referred to herein. The final decision to announce any product is based on IBM's business and technical judgment.

This publication contains small programs that are furnished by IBM as simple examples to provide an illustration. These examples have not been thoroughly tested under all conditions. IBM, therefore, cannot guarantee or imply reliability, serviceability, or function of these programs. All programs contained herein are provided to you "AS IS". THE IMPLIED WARRANTIES OF MERCHANTABILITY AND FITNESS FOR A PARTICULAR PURPOSE ARE EXPRESSLY DISCLAIMED.

Trademarks and Service Marks

The following terms, denoted by an asterisk (*) on their first occurrences in this publication, are trademarks of the IBM Corporation in the United States and/or other countries:

IBM
OS/400
Systems Application Architecture
OS/2
400

Chapter 1. Introduction

Overview

This manual formally describes A Data Language (ADL). ADL provides programmers with a means of describing and converting data exported by programs so that this data can be easily imported by other programs written for a different machine architecture and/or a different programming language.

Scope

1. This manual specifies standards for:
   a. The syntax and semantics of ADL.
2. This manual does not specify standards for:
   a. How ADL descriptions of data are created or managed.
   b. How ADL is to be encoded for storage or transmission.
   c. The relationship of ADL to other programming languages.

Notation

1. The syntactic notation used in this manual to formally describe ADL is an extended BNF (Backus Naur Form), as defined by the following:
   - Angle brackets (< >) enclose the identifier of a syntactic variable.
   - ADL key words are specified in uppercase.
   - Syntactic units are specified as symbols, words, or literals.
   - The symbol ::= means "is defined as."
   - The symbol | indicates an alternative.
   - Ellipses (...) indicate elements that can be repeated one or more times.
   - Square brackets ([]) indicate a group of one or more optional elements.
   - Braces ({}) indicate a group of one or more elements.
   - The symbol m..n specifies a single integer value within the range of m..n inclusive. Using 1..3 as an example, 1 is the first valid value in the range and 3 is the last valid value in the range.
   - The symbol ! following a group (as in {A B}!) or an optional group (as in [A B]!) indicates an unordered list in which each of the elements of the group are specified once.

```
{A B}! can consist of:
    A B
    B A
```

Optional elements need not be specified.

```
{[A] [B]}! can consist of:
    A
    B
    A B
    B A
    (neither of the two elements)
```

If a list is specified within a list, all items can be specified in any order. The following are examples of BNF notation that allow `A B C D` to be specified in any order.

```
{A B {C D}! }!
{{A B}! C D}!
{{A B}! {C D}!}!
{A {B C}! D}!
{A B C D}!
```

- Expressions enclosed in brackets or braces shall be evaluated first, before they are considered in relation to surrounding expressions.
- In an expression containing ellipses, a range, or alternatives, the priority of evaluation shall be range, ellipses, and then alternatives.

2. In the BNF syntax, a production symbol <A> is defined to "contain" a production symbol <B> if <B> occurs someplace in the expansion of <A>. If <A> contains <B>, then <B> is "contained in" <A>. If <A> contains <B>, then <A> is the "containing" production symbol for <B>.
3. A production symbol <A> "immediately contains" a production symbol <B> if <A> contains <B> and if <B> occurs in the first expansion of <A>.

---

Conventions

1. The term "shall" defines conditions that are required to be true of all implementations.
2. The syntactic elements of ADL are specified in terms of:

| | |
|---|---|
| **Function** | A statement of the purpose of the element. |
| **Format** | A BNF definition of the syntax of the element. |
| **Syntax Rules** | Additional syntactic constraints not expressed in BNF that the element shall satisfy. |
| **General Rules** | Sequences of actions that define the semantics of the language. |
| **Examples** | Sample ADL descriptions of entities that illustrate the syntactic elements described. |

3. The term "space" shall refer to a contiguous sequence of memory locations in which data is represented.
4. Numeric expressions used in ADL rules or descriptions conform to the following conventions:
   a. Operators are used between two values to indicate a mathematical operation between the two. Operators cannot be placed at the end of an expression.
   b. Valid operators in numeric expressions are '+' for addition, '-' for subtraction, '*' for multiplication, '/' for division, and '**' for exponentiation.
   c. Except for the prefix operator '-', which indicates a negative value of a variable, or the prefix operator '+', which indicates a positive value, operators can not be placed as the first character in an expression.
   d. Numeric expressions are evaluated in the order left to right. The precedence rules in evaluating numeric expressions are according to the following priorities and governing rules:

| Table 1. Precedence Rules for Numeric Expressions | |
|---|---|
| PRIORITY | OPERATOR |
| 1 | **, prefix - |
| 2 | *, / |
| 3 | +, - |

- Expressions enclosed in parentheses shall be evaluated first, to a single value, before they are considered in relation to surrounding operators.
- Priority 1 has the highest priority and priority 3 has the lowest.
- All operators within the same priority level have the same priority.
- For priority level 1, if two or more operators appear in the same expression, the order of priority is right to left within the expression; that is, the rightmost exponentiation or prefix - has the highest priority, the next rightmost the next highest, and so on.
- For all other priority levels, if two or more operators in the same level appear in an expression, their order of priority is their order left to right within the expression.

e. The following additional functions are used in this specification:

CEIL The ceiling integer value of a number. The value of this function is the smallest integer value that is greater than or equal to the number.

FLOOR The floor integer value of a number. The value of this function is the largest integer value that is less than or equal to the number.

MIN The value of this function is the lowest of the arguments specified.

MOD The value of this function is the remainder of the first argument divided by the second argument.

For Y > 0 and X > = 0,

```
MOD(X,Y) = X - (Y * FLOOR(X/Y))
```

For Y > 0 and X < 0,

```
MOD(X,Y) = X - (Y * CEIL(X/Y))
```

PRODUCT The number or quantity that results from a multiplication of the arguments of the function.

5. The key word name of an attribute shall be specified whenever reference is to the current value of the attribute. For example, the current value of the <PRECISION attribute> is indicated by PRECISION in the following expression:

```
(2**PRECISION)-1
```

Conformance

All implementations shall conform to:

1. The BNF Format and associated Syntax Rules.
2. The General Rules specified for processing the ADL language.
3. The IBM Character Data Representation Architecture (CDRA) for the identification of encoded character data and the conversion thereof.
4. The program calling standards specified in *Common Execution Environment, Cross System Consistent, Stage 1 Architecture*, IBM document number CEE/CSC-FS2.

Chapter 2. Concepts

Introduction

Using ADL, a programmer can create a module that bridges the differences that exist among the data types and data encodings defined by a variety of programming languages. This concept is illustrated by Figure 1 on page 7.

A representation domain is defined by the ways in which the data types of a programming language (PL) are encoded by an implementation of the programming language for a particular machine architecture. Different implementations of a programming language, usually for different types of systems, result in different representation domains; as do implementations of different programming languages. The result, illustrated by Figure 2 on page 8, is that interlanguage and intersystem communications between programs is impossible without data conversion services.

As shown in Figure 3 on page 9, an ADL module consists of declarations and plans. Each ADL declaration provides a complete and consistent description of how data is encoded in a particular representation domain. Different declarations can exist in a module for the same data, with each description appropriate to a single representation domain. An ADL plan brings together these alternative descriptions so that a conversion program can be created.

The resulting program can be called whenever data is to be transported between the exporting and importing representation domains. The method and timing of calls to ADL plans is outside of the scope of this manual, but a number of scenarios are described in Appendix A, "Scenarios" on page 161. The data may actually be stored in a file or database between the time it is exported by one program and the time it is imported by another program. Such data can be imported by programs from different representation domains, with different conversions provided by ADL modules.

ADL is intended to be used in a programming environment that includes software engineering tools for the creation and maintenance of ADL modules. In particular, it should be possible for programmers to create ADL descriptions of data from existing programming language descriptions. This is necessary for both programmer usability and application development efficiency. For example, the ADL description of a SEQUENCE of fields can be derived from the COBOL description of a STRUCTURE. However, the representation of a COBOL STRUCTURE by a particular COBOL implementation must also be known. While ADL data descriptions can be created by programmers, a great deal of detailed knowledge is required to accurately describe the data encodings of any representation domain. Therefore, for each representation domain tools are required for relating programming language data descriptions to ADL data descriptions.

Tools called Declaration Translators are illustrated by Figure 4 on page 10. Declaration Translators provide programmers with the following three functions for using programming language data descriptions:

PARSE Parsing a PL data description to produce an ADL data description. This function fills in the details of the encodings used by the representation domain for each of the programming language's data types.

In many cases, programming language text provides sufficient information to allow an ADL description to be produced by a declaration translator without any further considerations by programmers. However, additional information is often required, especially if data is to be exported to other PLs or imported from other programming languages. This additional information can be provided as ADL annotation to programming language text. In general, ADL annotation provides additional information about data, beyond what can be expressed by the programming language or inferred from programming language implementation considerations. ADL annotation can be intermixed with PL text in whatever way is considered optimal for each programming language.

GENERATE Generating programming language text from an ADL data description. This function produces programming language data descriptions that can be included in programs, thereby facilitating program development. ADL annotation is included as required to allow a subsequent invocation of the representation domain's PARSE function.

TRANSLATE Translating an ADL data description originally created for any other representation domain to produce an ADL description of data suitable for its own representation domain. This function helps programmers to make productive use of data exported by other representation domains by examining the encoding details of the other representation domain and filling in the encoding details of the target representation domain.

Beyond the basic requirements of describing data representations, ADL includes features designed to support the PARSE, GENERATE, and TRANSLATE functions of each of the declaration translators in its initial scope.

An additional tool, a Data Description Utility (DDU) is also required in the programming environment. The DDU provides programmers with interactive facilities for using declaration translators to create, manage, and use ADL modules.

The annotation of programming language text by ADL, the specifications of declaration translator interfaces, and the design of DDU facilities are not included in this standard.

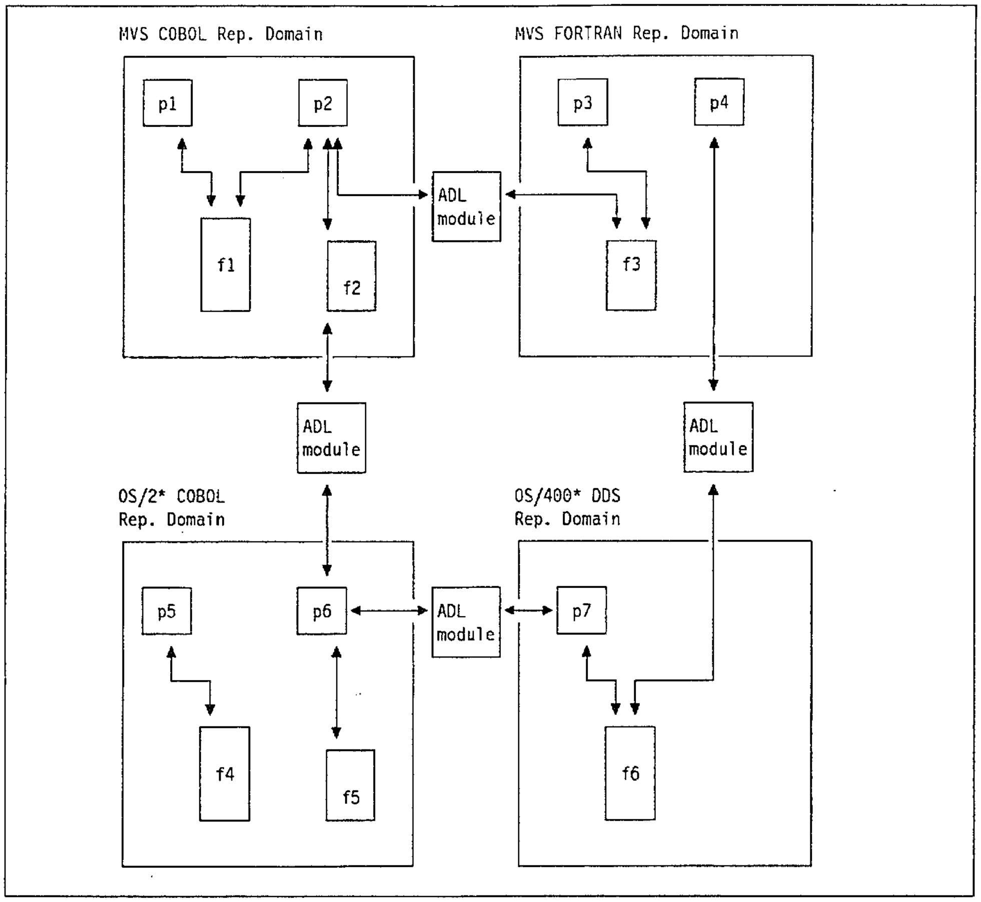

*Figure 1. ADL Modules Bridge Differences Between Representation Domains. The programs (pn) of a representation domain export and import data that is encoded as required by a single programming language implementation for a single system environment. If this data is stored in files (fn) or other media external to those programs, it remains part of its originating representation domain. For programs of different representation domains to interact, or for programs to access the externally stored data of other representation domains, an ADL module can be created to bridge the differences between representation domains.*

```
C Data Description
 struct{
    char INITIALS[4] = "ABC"
    /*ADL CHARSFX */;
    signed short int NUMBER;
       } RECORD;
OS/2 C Data Representation

 |41|42|43|00|34|12|
  INITIALS    NUMBER

MVS C Data Representation

 |C1|C2|C3|00|12|34|
  INITIALS    NUMBER
```

```
COBOL Data Description
01 RECORD.
   02 INITIALS PIC XXX
      USAGE DISPLAY.
  02 NUMBER PIC 9999 SYNC
      USAGE BINARY.
OS/2 COBOL Data Representation

 |41|42|43|34|12|
  INITIALS NUMBER

MVS COBOL Data Representation

 |C1|C2|C3|  |12|34|
  INITIALS |  NUMBER
           └pad
```

*Figure 2. An Example of the Diversity of Data Encodings. For even a simple data structure, the data encodings used by different programming languages for different systems can vary widely. Many programming languages support the declaration of much more complex data structures.*

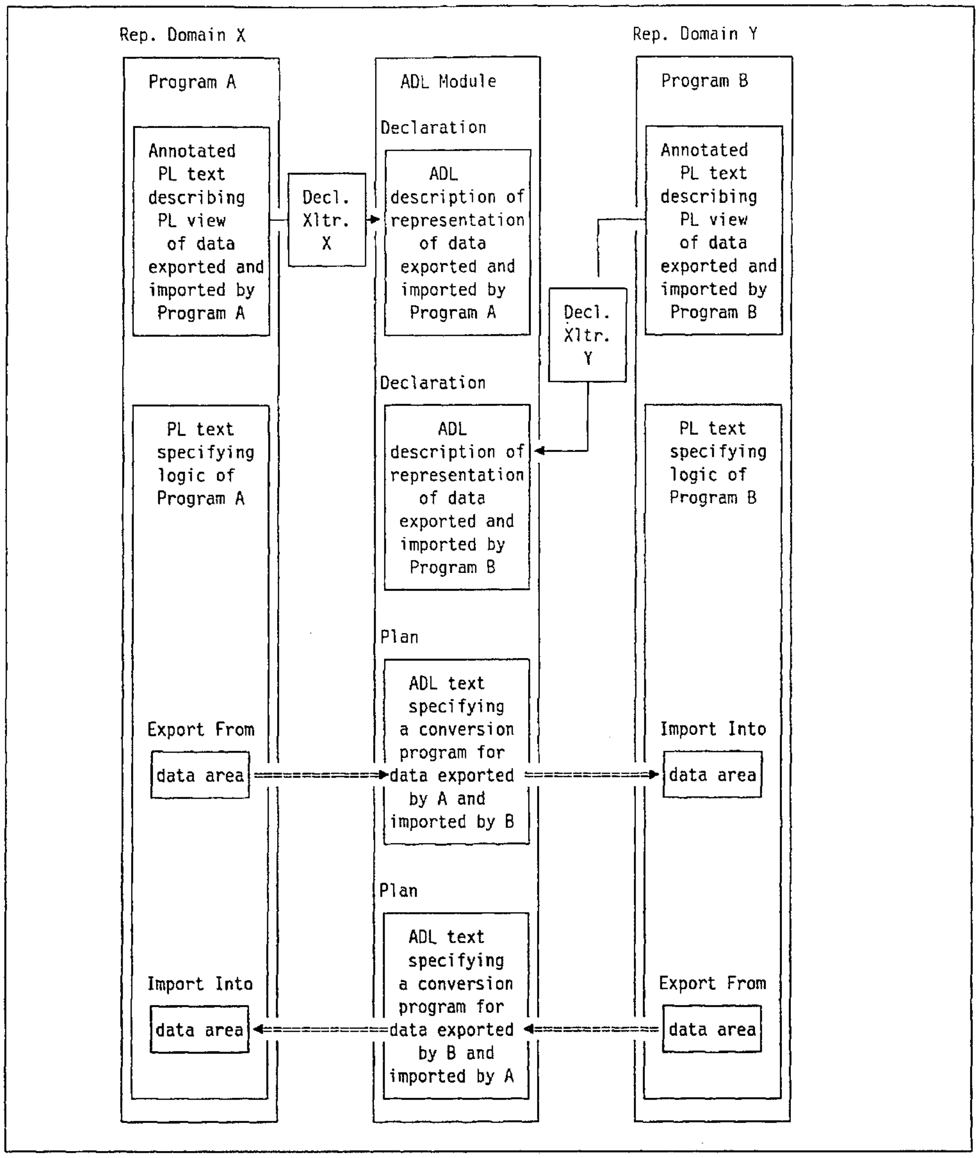
*Figure 3. The Role of ADL Modules. ADL modules bridge the data representation differences that exist between implementations of various programming languages on different types of systems.*

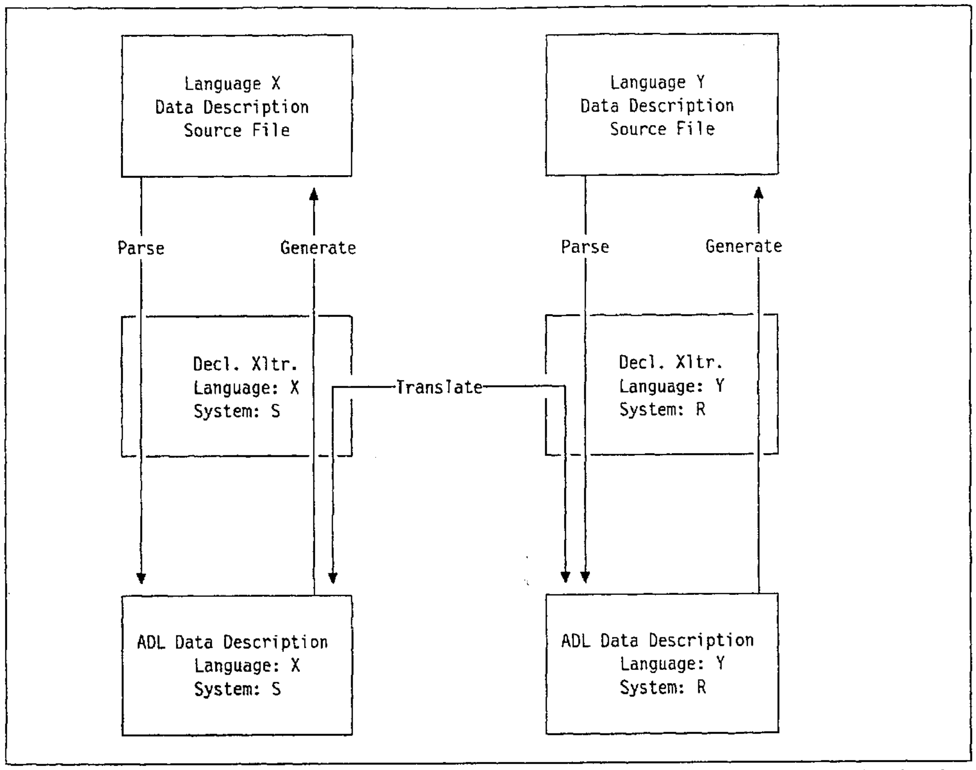

*Figure 4. Declaration Translator Functions. A Declaration Translator is required for each representation domain to provide the three capabilities of Parse, Generate, and Translate.*

ADL Syntax

An ADL module consists of declarations and plans that are specified as text in a source file. This text consists of a sequence of statements constructed according to the rules of ADL syntax. The source file can be encoded according to any Single-Byte or Mixed Coded Character Set that includes the syntactic characters required by ADL.

Statements

Each ADL statement has an identifier, a body, and a terminator. For example, in the statement

```
parts_count: BINARY PRECISION(15) SCALE(0);
```

`parts_count` is the identifier, `BINARY PRECISION(A1) SCALE(0)` is the body, and `;` is the terminator.

The identifier is required for some types of statements and is optional for others. The identifier is separated from the body of the statement by a colon (:). The body of each statement must be specified as required by the ADL syntax of the statement. Each statement is terminated by a semicolon (;). Spaces and comments can be specified between the identifiers, keywords, and punctuation of ADL statements, but are not required except when used to separate identifiers and keywords from other tokens.

Comments

Comments can be specified in ADL text anywhere a space can be specified. Comments consist of the character sequence /* followed by the body of the comment and a terminator consisting of the character sequence */. The body of the comment can include any sequence of characters allowed by the source file's CCSID (including non-syntactic characters), but the character sequence */ cannot appear except at the end of a comment.

Literals

Literals appropriate to each of the data types defined by ADL can be specified as ADL tokens, including numeric literals, boolean literals, and character literals. The body of a character literal can include any sequence of characters allowed by the source file's CCSID (including non-syntactic characters).

Identifiers

User-provided identifiers can be specified for all types of ADL statements. These identifiers assign a name to a statement so that it can be referenced by other statements. Identifiers consist of a sequence of upper or lower case letters, numbers, and the special characters ?, %, &, and _.

Each identifier must be unique within the context in which it is used, but the same identifier can be used in different contexts.

- Within a module the identifiers of all DECLARE statements and PLAN statements must be unique.
- Within a declaration the identifiers of all constants and subtypes, and the fully qualified identifiers of all data declarations must be unique.
- Within a sequence or case declaration, the identifiers of all data declarations must be unique.
- Within a plan section, the identifiers of all statements must be unique.

Some ADL statements support references to constants, subtypes, or data declarations. These references are specified in terms of the identifiers associated with the referenced entity. Whenever there is a possibility of ambiguity in a reference, an identifier must be specified with enough higher level identifiers as qualifiers to eliminate the ambiguity. The qualifiers are specified in the same sequence as the nested contexts and are separated by periods (.).

For example, given the hierarchy

```
A
  B
    C
    D
  E
    C
    F
```

if an ADL statement must refer to the first instance of C, then at least B.C needs to be specified to resolve the ambiguity with E.C.

INCLUDE Statement

An ADL INCLUDE statement can be specified wherever any other ADL statement is allowed. The ADL text contained in the file specified by the INCLUDE statement replaces the INCLUDE statement. The included ADL text must be valid for the context in which the INCLUDE statement was specified. For example, CONSTANT statements cannot be included in a plan section.

The included ADL text can itself include INCLUDE statements, but care must be taken to ensure that endless loops of INCLUDE statements are not specified.

---

Data Types

Each PL defines a set of data types that allow programmers to store and manipulate data in ways defined by the PL. Each instance of a data type is represented as an encoded string of bits. The method of encoding data in a bit string is determined by the PL type of the data and by the system environment in which the program executes.

Many different methods are used to encode numeric, character, and other types of data. ADL defines a set of abstract data types that each correspond to one of the methods of encoding data used by a variety of PLs, as implemented on a variety of systems. They are abstract in the sense that each ADL data type is defined by a generalized set of attributes. For example, the ADL BINARY type has attributes that allow binary encodings of numbers to be:

- signed or unsigned,
- real or complex,
- byte reversed,
- scaled according to base 2 or base 10,
- or, range constrained.

Not all ADL data types and not all of the attributes of any one ADL data type are required for all PLs.

Field Data Types

ADL defines the following parameterized data types for describing how field data is encoded:

ASIS A string of bits whose encoding is unknown or inconvertible by an ADL module.

BINARY A fixed-length string of bits that encodes a fixed precision number as a base 2 integer. Among the attributes that can be specified are the precision, scaling factor, and radix of the encoded number, and whether its encoding is byte reversed.

BIT A string of bits whose encoding is application defined.

BITPRE A varying-length string of bits whose encoding is application defined. The actual length of the string is specified by a length field that precedes the bit string.

BOOLEAN A bit string that encodes either TRUE or FALSE.

CHAR A string of bits that encodes characters.

CHARPRE A varying-length string of bits that encodes characters. The actual length of the string is specified by a prefix that precedes the string of bits.

CHARSFX A varying-length string of bits that encodes characters. The actual length of the string is determined by scanning for a suffix string of bits used as a terminator.

ENUMERATION The binary encoding of one of a set of integers, where each integer is associated with an identifier as a constant.

FLOAT A fixed-length string of bits that encodes an approximate number by means of a characteristic and a significand. The FORM attribute specifies the format of the encoded string, and implies its length.

PACKED A fixed-length string of bits that encodes a number by means of a sequence of hexadecimal representations of decimal digits. Among the attributes that can be specified are the precision and scaling of the field.

ZONED A fixed-length string of bits that encodes a number by means of a sequence of hexadecimal representations of decimal digits and zones. Among the attributes that can be specified are the precision and scaling of the field.

ADL Constructor Data Types

ADL defines the following constructor data types that specify how data elements come together to form more complex entities:

SEQUENCE A collection of fields and constructors each encoded according to its ADL data type.

The elements of a SEQUENCE can be of any ADL field data type or constructor data type. Also, the SKIP statement can be used to skip bits between the elements of a SEQUENCE to account for the data alignments methods of various PLs, or to account for filler fields allowed by some PLs.

ARRAY A collection whose elements are uniquely associated with one or more integer values called the dimensions of the array.

Each dimension of an array is declared in terms of either its lowest integer value and its highest integer value or its lowest integer value and the number of elements in the dimension. These values can be specified by numeric literals or by references to other variables. In the later case, the overall size of the array can vary for each instance of the array, or the array can contain slots for all possible elements with only elements within the specified bounds containing data.

The elements of an array must all be the same length, but these elements need not be of the same data type. If an ARRAY of CASE is declared, all elements of the array can be of the same data type, but varying from instance to instance of the array. Or, each element can be of a different data type if each element is a SEQUENCE containing its own discriminant field.

CASE A set of alternative data declarations, one of which determines the interpretation of a string of bits, depending on the value of one or more discriminant fields.

A CASE contains an ordered set of WHEN statements and an optional OTHERWISE statement. Each WHEN statement consists of a condition to be tested and either a data declaration or a SKIP statement. The condition to be tested is specified by predicates connected by AND, OR and NOT logical operators. The predicates allowed are the following, which are identical in syntax and semantics to their Structured Query Language (SQL) equivalents:

- Comparison predicates that compare the value of a referenced field with another value.
- BETWEEN predicates that determine if the value of a referenced field is between two other values.
- IN predicates that determine if the value of a referenced field is in a list of specified values.

- LIKE predicates that determine if a value of a referenced field contains a specified pattern of characters.

A WHEN statement or an OTHERWISE statement consists of a data declaration, a SKIP statement, or a REJECT statement. The data declaration of an OTHERWISE statement can be of any ADL field or constructor type. The SKIP statement can be specified to indicate that only filler data exists. And the REJECT statement can be specified to reject the input data and terminate the conversion plan. If an OTHERWISE statement is specified for a CASE, it is selected if no condition of a WHEN statement evaluates to TRUE. If no OTHERWISE statement is specified in a CASE, and no WHEN statement condition evaluates to TRUE, then no instance of the CASE exists.

Data Type Attributes

The attributes of each ADL data type specify how data is actually encoded by a representation domain. That is, the encoding of a data item by a representation domain is actually described by specifying an ADL data type and selected values of its attributes. For example, the byte reversal attribute (BYTRVS) of a BINARY field specifies how the bytes of the binary encoding are ordered.

A programmer can specify values for all of the attributes of a data type when declaring a field of that type, but this is both tedious and error prone. Therefore, for each data type, ADL specifies:

- Attributes that assume a default value if a value is not specified. While ADL defines default values for each of these attributes, it is also possible for programmers to change these defaults for all uses of each attribute in a declaration by using the DEFAULT statement. This makes it possible for one programmer to specify the correct set of defaults for a given representation domain and for other programmers to adopt those defaults by using the INCLUDE statement.
- Attributes that are ignored if a value is not specified.

Modules

An ADL module consists of declarations and plans. A declaration describes precisely and completely how the data exported or imported by a program is encoded. A plan specifies how data, encoded as described by one declaration, is to be converted to the encodings described by a different declaration.

Declarations

A declaration describes data in terms of the data types and encoding methods of a single representation domain. A declaration consists of a DECLARE statement that contains:

- DEFAULT statements that set the defaultable attributes of ADL types.
- CONSTANT statements that associate an identifier with an ADL literal. The identifier associated with a CONSTANT statement can be referenced by SUBTYPE statements and data declaration statements in the declaration section.
- SUBTYPE statements that declare subtypes of ADL types. The identifier associated with a SUBTYPE statement can be referenced by all SUBTYPE statements and data declaration statements in the declaration.
- Data declaration statements that describe application data. The identifier associated with a data declaration statement can be referenced by other statements in declarations and plans.

DECLARE Statements

Each declaration of a module is specified by using a DECLARE statement, such as

```
ProgramA: DECLARE
          BEGIN;
            DEFAULT statements
            SUBTYPE statements
            CONSTANT statements
            Data declaration statement
          END;
```

where ProgramA is a name assigned to the declaration and declaration statements are specified between BEGIN and END statements.

DEFAULT Statements

A value can be specified for a defaultable attribute of an ADL data type by using a DEFAULT statement, such as

```
DEFAULT BINARY
        BYTRVS(FALSE)
        RADIX(10)
        SIGNED(FALSE);
```

where default values for the BYTRVS, RADIX, and SIGNED attributes of the ADL BINARY data type are specified.

A separate DEFAULT statement must be specified for each ADL data type whose attributes are to be defaulted.

The scope of application of the defaults established by a DEFAULT statement for an attribute is the entire declaration. Only one DEFAULT statement can be specified for an ADL type. If a DEFAULT statement is not specified for an ADL type, then the default ADL DEFAULT statement for that type is used.

If a data declaration specifies an attribute or attributes that are mutually exclusive with the attributes specified in their respective DEFAULT statement, the attributes on the data declaration statement take precedence over the defaulted ones.

CONSTANT Statements

A literal is a specification of a data value in ADL text. ADL defines how literals are to be specified for numeric, character, boolean, and other ADL data types. Literals are used to specify the values of attributes, in assignment statements, and in predicates. However, it is often desirable to associate an identifier with a literal and then refer to the identifier whenever the value of the literal is required. This is accomplished by means of a CONSTANT statement, such as

```
base: CONSTANT 10;
population: BINARY RADIX(base)...;
```

where base is associated with the literal value 10, and the RADIX attribute is set to the value 10 by referring to the identifier base.

SUBTYPE Statements

A subtype is a specialization of a type, called its supertype. The SUBTYPE statement can be used to declare a subtype of an ADL type or of another subtype. A data item can then be declared to be an instance of the subtype.

Subtypes of both field and constructor types can be defined. Field subtypes allow the subtype identifier to be associated with a specific ADL type and an associated set of attributes. For example, in

```
partno: SUBTYPE OF PACKED
        PRECISION(9) SIGNED(FALSE) TITLE('Part Number');
```

some other identifier can be declared to be an instance of the partno subtype, as in

```
assembly: partno TITLE('Part Number of the whole assembly.');
```

In this case, assembly is declared to be an instance of the partno subtype and thereby of the ADL PACKED type with the PRECISION(9) attribute. However, assembly specifies its own TITLE attribute, overriding the TITLE attribute specified for the partno subtype.

Subtypes of constructors are similar, but their instances also inherit the components of the constructor subtype. In the following example, name is the identifier of a subtype of the ADL SEQUENCE constructor type. This subtype declares name to have the components last, first, and initial. namerec is a SEQUENCE consisting of a set of names, each of which includes last, first, and initial components.

```
name: SUBTYPE OF SEQUENCE TITLE('General Name Structure')
                BEGIN;
                   last: CHAR LENGTH(12);
                   first: CHAR LENGTH(12);
                   initial: CHAR;
                END;
namerec: SEQUENCE TITLE('Employee Contacts Record')
         BEGIN;
            employee: name;
            spouse: name;
            broker: name;
            attorney: name;
            parole_officer: name;
            clergy: name;
         END;
```

Two kinds of subtypes can be defined. One kind of subtype is related to the data types of other programming languages. Subtypes can be assigned identifiers similar to the data type names of a programming language, with attributes specified as required by the representation domain. For example, a subtype named short could be defined by a C representation domain to match the way a C implementation represents instances of the C short data type. A programmer specifying ADL declarations for that representation domain can then declare data to be of the short subtype, as in

```
short: SUBTYPE OF BINARY
                 BYTRVS(TRUE)
                 PRECISION(15);
counter: short;
```

All declared instances of the short subtype are represented in 16 bits and encoded with byte reversal. counter is declared to be an instance of the subtype short, and therefore of the ADL BINARY type.

Application specific subtypes can also be defined. For example, if name is declared as a subtype, then a personnel record could declare employee_name, spouse_name, and child_name to all be instances of the name subtype. If the same application subtypes are required in the declaration sections of multiple modules, then they can be specified in an ADL text file that is INCLUDEd in those modules.

Data Declaration Statements

The application data exported and imported by programs is described by data declaration statements, such as

```
retail_price: ZONED PRECISION(5) SCALE(2);
```

where retail_price is the identifier associated with all instances of the data, ZONED specifies the data is of the ADL ZONED data type, and PRECISION and SCALE are attributes of the instances.

A WHEN clause can also be specified in a data declaration statement. This clause specifies a condition that must evaluate to TRUE whenever a value is assigned to the declared variable. The condition of the WHEN clause can include any of the predicates and boolean operators allowed in the WHEN statements of CASE declarations.

Plans

A plan section specifies a program for converting data from one form to another, where both forms are described by data declaration statements. These programs can be invoked whenever data becomes available for the input parameters of the plan and converted data is required.

PLAN Statements

Each plan of a module is specified by a PLAN statement, such as

```
ReadPlan: PLAN (A: INPUT, B: OUTPUT)
          BEGIN;
            assignment statements
            CALL statements
          END;
```

where ReadPlan is a name assigned to the plan, A and B are the INPUT and OUTPUT parameters of the plan, and the assignment and CALL statements of the plan are specified between BEGIN and END statements.

The names specified in the parameter list of the plan are references to data declarations. A plan assumes that these declarations describe the data areas passed to the plan as parameters when it is called. In the simple case illustrated by Figure 5 on page 18, the caller of the plan passes a data area containing original data and a data area to receive converted data. The assignment statements of the plan move and convert data from the fields of the original data area to the converted data area.

The LENGTH and CCSID attributes can be specified as attributes of INPUT parameters, and the MAXLEN and CCSID attributes can be specified as attributes of OUTPUT parameters, These attributes provide additional information about the parameters that can be used within the PLAN. For example, the MAXLEN attribute of an OUTPUT attribute specifies the maximum length of the data that can be returned by the PLAN. These attributes can be specified as literals or as references to other parameters. This allows their values to be specified by the caller of the plan.

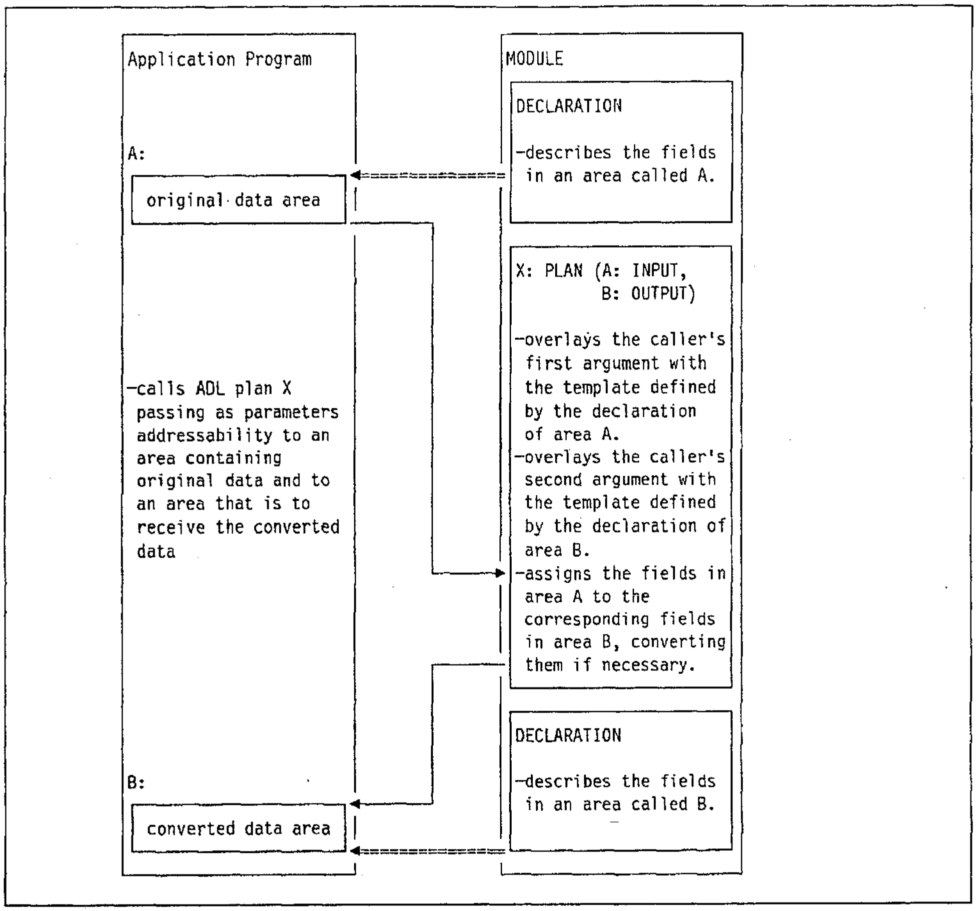

*Figure 5. Invoking a Plan. A plan uses the declarations specified in its parameter list as templates describing the data areas passed by its caller, moving and converting data as required by the assignment statements of the plan.*

Assignment Statements

The assignment statements of a plan cause data to be moved from a source variable, typically an INPUT parameter, to a target variable, typically an OUTPUT parameter. When the source and target are both fields, the data types of the source and target, along with their accompanying attributes, are compared. If necessary, the data of the source field is converted to the type and attributes of the target field.

For fields, ADL performs the following conversions:

- From source to target fields of the same type, ADL performs whatever conversions are required by different attributes of the source and target.
- Any numeric type can be converted to any other numeric type.
- ENUMERATION to or from BINARY.

- Any character type can be converted to any other character type if CDRA has defined conversions from the source CCSID to the target CCSID.
- Any data type to or from the ASIS data type. In these cases, the source and target fields are treated as simple bit strings and moved, with padding or truncation. The results may or may not be valid data for the target field.

For constructors, ADL performs the following conversions:

- When the source and target are both ARRAYs, the dimension list attributes of the source and target are compared to determine if they are conformable. Both arrays must have the same number of dimensions, and both arrays must have the same number of elements in each dimension. ADL does not require a given element to have the same subscript list in each array. Conversions are performed, if necessary, as each source element is assigned to a target element.
- When the source and target are both SEQUENCEs, the identifier of each element of the target is used to locate a matching identifier of the source. Conversions are performed, if necessary, as the data of the source element is assigned to the target element. The target elements need not be in the same order as the source elements, and not all target elements need be selected. Because of this, the target declaration can both select and reorder source elements.
- When the source and target are both CASEs, the condition clauses of the WHEN statements of the source are evaluated to determine which data declaration applies to the source data. The identifier of the selected WHEN statement is then used to locate a WHEN statement of the target CASE with a matching identifier, and its data declaration applies to the target data. Conversions are performed, if necessary, as the source data is assigned to the target. If no source WHEN statement is selected, then the OTHERWISE statement of both the source and target are selected.

If a target data declaration includes a WHEN clause, then the condition specified must be TRUE or an exception occurs, thereby causing the PLAN to be terminated. This allows the plan to act as a filter on the input data passed to it. For example, if the source data is being read from a file, then only data that passes through the filter is converted and passed to the caller of the plan. Thus, only a subset of the file's data is actually presented to the reader of the file. And if the target is a file to which data is being written, then only data that passes through the filter is written to the file.

CALL statements

A CALL statement calls a named program external to the program containing the conversion plan and passes it a list of parameters. The called program can operate on the input parameters passed to it and return values in the output parameters for further use by the conversion plan.

While CALL statements can be used for any application purpose, the anticipated use of CALL statements is to convert data that is not otherwise describable or convertible by ADL.

Storage Allocation

Associated with each data declaration statement of an ADL module is a block of storage onto which the declared variable is mapped. If the declared variable is specified in the parameter list of a PLAN statement, then the corresponding block of storage has been allocated by the caller of the plan, either as input to the plan or as an area for output from the plan. This kind of variable is called a parameter variable. Otherwise, the block is contained in a workspace allocated by the module. This kind of variable is called a workspace variable.

One module workspace is created for each application processing thread the first time a plan of the module is invoked by the thread. The workspace persists for the remaining life of the thread.

Since there is only one persisting module workspace, all references by plans or declarations to workspace variables are to the same workspace blocks. This allows workspace variables to be used for communications between invocations of different plans or between different invocations of the same plan.

Exception Handling

Exceptions can occur to a plan by a variety of conditions detected in the performance of the statements of the plan. All such exceptions result in the termination of the plan and the propagation of the exception to the caller of the plan. ADL defines a Communications Area (ADLCA), containing diagnostic information, that can be obtained by the caller of a failing plan.

Chapter 3. Common Elements

This chapter describes, in alphabetical order, the syntax and semantics of elements that are common to many ADL statements.

Constants

Function: Specify the constants used in this specification.

Format

```
<max7>  ::= 127
<max8>  ::= 255
<max15> ::= 32,767
<max31> ::= 2,147,483,647
<max34> ::= 17,179,869,176
<min7>  ::= -128
<min31> ::= -2,147,483,648
```

Syntax Rules: None.

General Rules: None.

Examples: None.

<BETWEEN predicate>

Function: Specify a range comparison.

Format

```
<BETWEEN predicate> ::=
  <value expression>
  [NOT]
  BETWEEN <value expression>
  AND <value expression>
```

Syntax Rules: The types of the three <value expression>s shall be comparable. Refer to the General Rules on page 23 for specific rules on comparable <comparison predicate>s.

General Rules: Let x, y, and z denote the results of the first, second, and third <value expression>, respectively.

- "x BETWEEN y AND z" has the same result as "x> =y AND x< =z".
- "x NOT BETWEEN y AND z" has the same result as "NOT(x BETWEEN y AND z)".

Examples

1. Salary BETWEEN 20000 AND 40000
2. Ages NOT BETWEEN 5 AND 10

---

<character>

Function: Specify character units.

Format

```
<character> ::=
  <digit> |
  <letter> |
  <special character> |
  <underscore> |
  <space>

<digit> ::=
  0 | 1 | 2 | 3 | 4 | 5 | 6 | 7 | 8 | 9

<letter> ::=
  <upper case letter> | <lower case letter>

<upper case letter> ::=
  A | B | C | D | E | F | G | H | I |
  J | K | L | M | N | O | P | Q | R |
  S | T | U | V | W | X | Y | Z

<lower case letter> ::=
  a | b | c | d | e | f | g | h | i |
  j | k | l | m | n | o | p | q | r |
  s | t | u | v | w | x | y | z

<special character> ::=
  . | , | : | ; | ? | ( | ) | ' | " |
  / | - | & | + | % | = | * | > | <

<underscore> ::= _

<source character> ::=
  See the Syntax Rule on 22.
```

Syntax Rules: A <source character> is any character allowed by the <CCSID attribute> of the ADL source file.

General Rules: None.

Examples: None.

<comparison predicate>

Function: Specify a comparison of two values.

Format

```
<comparison predicate> ::=
  <value expression>
  <comparison operator>
  <value expression>

<comparison operator> ::=
  = | < | > | <> | <= | >=
```

Syntax Rules: The data types of the first <value expression> and the second <value expression> shall be comparable. The <value expression>s shall be comparable if the result of the second <value expression> can be converted to the data types of the result of the first <value expression> as defined by the matrix in Figure 9 on page 124.

General Rules

1. Let x denote the value of the first <value expression> and let y denote the value of the second <value expression>.

"x <comparison operator> y" is either TRUE or FALSE:

"x = y" is TRUE if and only if x and y are equal.
   "x < y" is TRUE if and only if x is less than y.
   "x > y" is TRUE if and only if x is greater than y.
   "x < > y" is TRUE if and only if x and y are not equal.
   "x < = y" is TRUE if and only if x is not greater than y.
   "x > = y" is TRUE if and only if x is not less than y.

2. The result of the second <value expression> shall be converted to the data type of the result of the first <value expression> as specified in the matrix in Figure 9 on page 124.
3. If the first <value expression> is numeric, the comparison shall be performed according to the numeric values of the operands after any conversions.
4. If the first <value expression> is of BIT or BITPRE data type, then:
   a. If the lengths of the two <value expression>s are not equal, the shorter <value expression> is considered to be extended on the right with b'0' bits.
   b. The comparison is performed from left to right, comparing the individual bits of the <value expression>. If all such individual comparisons are equal, then the two <value expression>s are equal; otherwise, the result of the comparison of the <value expression>s is defined to be the result of comparing the first unequal bit encountered.
   c. A bit value of b'1' is greater than a bit value of b'0'.
5. If the first <value expression> is of BOOLEAN data type, then the comparison is performed according to their truth values.
   - A truth value of TRUE is greater than a truth value of FALSE.
6. If the first <value expression> is of CHAR, CHARPRE, or CHARSFX data type, then:
   a. For CHARPRE, only the character specified by its prefix length field shall be used. The prefix does not participate in the comparison.

b. For CHARSFX, the character preceding the suffix shall be used. The suffix does not participate in the comparison.

c. If the lengths of the two <value expression>s are not equal, then the shorter <value expression> is considered to be extended on the right with space characters defined by the <CCSID attribute> of the shorter <value expression>.

d. The comparison is performed from left to right, comparing the individual characters of the <value expression>s. If all such individual comparisons are equal, then the two <value expression>s are equal; otherwise, the result of the comparison of the <value expression>s is defined to be unequal.

e. Comparisons of individual characters shall be performed as required by CDRA.

Note: CDRA Level 1 only permits = and < > comparisons of characters.

Examples 1. empno = 123456
2. salary > 10000
3. legalspeed < = 55
4. name < > 'Elaine'

---

<condition>

Function: Specify a condition that is TRUE or FALSE depending on the result of applying boolean operators to specified conditions.

Format

```
<condition> ::=
  <boolean term> |
  <condition> OR <boolean term>

<boolean term> ::=
  <boolean factor> |
  <boolean term> AND <boolean factor>

<boolean factor> ::=
  [NOT]<boolean primary>

<boolean primary> ::=
  <boolean literal> |
  <qualified identifier> |
  <predicate> |
  (<condition>)
```

Syntax Rules: If a <qualified identifier> is specified for the <boolean primary>, the <qualified identifier> shall refer to a BOOLEAN field.

General Rules

1. The result shall be derived by the application of the specified boolean operators (AND, OR, NOT) to the conditions that result from the application of each specified <predicate> to a given field. If boolean operators are not specified, then the result of the <condition> is the result of the specified <predicate>.
2. NOT(TRUE) is FALSE, and NOT(FALSE) is TRUE.

3. AND and OR are defined by the following truth tables:

| AND | TRUE | FALSE |
|---|---|---|
| TRUE | TRUE | FALSE |
| FALSE | FALSE | FALSE |

AND Truth Table

| OR | TRUE | FALSE |
|---|---|---|
| TRUE | TRUE | TRUE |
| FALSE | TRUE | FALSE |

OR Truth Table

4. Expressions within parentheses shall be evaluated first and when the order of evaluation is not specified by parentheses, <predicate>s shall be evaluated first, NOT applied before AND, AND applied before OR, and operators at the same precedence level applied from left to right.

Examples: None.

---

<identifier>

Function: Specify an identifier for an entity.

Format

```
<identifier> ::=
  {<letter> | <digit> | <identifier character>}...

<identifier character> ::=
  ? | % | & | <underscore>
```

Syntax Rules

1. An <identifier> consists of a maximum of <max8> characters.
2. An <identifier> shall be unique within its most immediate containing entity.
3. At least one character of an <identifier> shall be a <letter> or an <identifier character>.
4. The case of a <letter> shall be significant when specified in an identifier. For example, abc and aBc are different <identifier>s.
5. ADL <key word>s can be used as application defined <identifier>s.

General Rules: None.

Examples

1. The following are valid application defined identifiers:

```
empser    EmpSer    go123     BINARY   123GO
_empser   empser_   emp%ser   &123GO   emp_ser
```

2. The following are invalid application defined identifiers:

```
empser#   #EmpSer   1234   EMPLOYEE-SERIAL-NUMBER
```

<IN predicate>

Function: Specify a quantified comparison.

Format

```
<IN predicate> ::=
  <value expression>
  [NOT]
  IN (<in value list>)
<in value list> ::=
  <value specification>
  [{,<value specification>}]...
```

Syntax Rules: The data types of the <value expression> and of all <value specification>s in the <in value list> shall be comparable. Refer to the General Rules on page 23 for specific rules on comparable <comparison predicate>s.

General Rules: Let x denote the result of the <value expression>. Let S denote the values specified in the <in value list>.

- "x NOT IN (S)" has the same result as "NOT(x IN (S))".

Examples

1. Deptno IN ('59G', 'D14', 'DC8')
2. Gradelvl NOT IN (5, 7, 9)

<LIKE predicate>

Function: Specify a pattern-match comparison.

Format

```
<LIKE predicate> ::=
  <value expression> [NOT] LIKE <pattern>
  [ESCAPE <escape character>]
<pattern> ::= <value specification>
<escape character> ::= <value specification>
```

Syntax Rules

1. The <value expression> shall reference a character <field> in the data.
2. The type of the <pattern> shall be CHAR.
3. The type of the <escape character> shall be CHAR of length 1.

General Rules

1. Let x denote the value referenced by the <value expression> and let y denote the result of the <value specification> of the <pattern>.
   a. Case:
      1) If an <escape character> is specified, then:
         a) Let z denote the result of the <value specification> of the <escape character>.
         b) There shall be a partitioning of the string y into substrings such that each substring is of length 1 or 2, no substring of length 1 is the escape character z, and each substring of length 2 is the escape character z followed by either the escape character z, an <underscore> character, or the percent sign character (%). In that partitioning of y, each substring of length 2 represents a single occurrence of the second character of that substring. Each substring of length 1 that is the <underscore> character represents an arbitrary character specifier. Each substring of length 1 that is the percent sign character (%) represents an arbitrary string specifier. Each substring of length 1 that is neither the <underscore> character nor the percent sign character (%) represents the character that it contains.
      2) If an <escape character> is not specified, then each <underscore> character in y represents an arbitrary character specifier, each percent sign character (%) in y represents an arbitrary string specifier, and each character in y that is neither the <underscore> character nor the percent sign character (%) represents itself.
   b. The string y is a sequence of the minimum number of substring specifiers such that each character of y is part of exactly one substring specifier. A substring specifier is an arbitrary character specifier, an arbitrary string specifier, or any sequence of characters other than an arbitrary character specifier or an arbitrary string specifier.
   c. "x LIKE y" is true if there exists a partitioning of x into substrings such that:
      1) A substring of x is a sequence of zero or more contiguous characters of x and each character of x is part of exactly one substring.
      2) If the i-th substring specifier of y is an arbitrary character specifier, the i-th substring of x is any single character.
      3) If the i-th substring specifier of y is an arbitrary string specifier, the i-th substring of x is any sequence of zero or more characters.
      4) If the i-th substring specifier of y is neither an arbitrary character specifier nor an arbitrary string specifier, the i-th substring of x is equal to that substring specifier and has the same length as that substring specifier.
      5) The number of substrings of x is equal to the number of substring specifiers of y.
   d. "x NOT LIKE y" has the same result as "NOT(x LIKE y)".

Examples

1. name LIKE '%SMITH%'
2. status NOT LIKE 'N'

The first example is true if 'SMITH' appears anywhere within name. The second example is true if the value of status is not N.

---

<literal>

Function: Specify a string of characters representing a value.

Format

```
<literal> ::=
  <character literal> |
  <noncharacter literal>

<character literal> ::=
  <character string>[<separator><character string>]...
  [<CCSID attribute>]

<character string> ::=
  '[<source character> | <quote representation>]...'

<quote representation> ::= ''

<noncharacter literal> ::=
  <bit literal> |
  <signed integer> |
  <positive integer> |
  <hex literal> |
  <boolean literal> |
  <encoded hex literal>

<bit literal> ::=
  {b | B}<bit string> [<separator><bit string>]...

<bit string> ::= '[0 | 1]...'

<signed integer> ::= [+ | -] <digit>...

<positive integer> ::= [+] <digit>...

<hex literal> ::=
  {x | X}<hex string> [<separator><hex string>]...

<hex string> ::= '[<hex digit>]...'

<encoded hex literal> ::= <hex literal> <CCSID attribute>

<hex digit> ::= <digit> | A | B | C | D | E | F

<boolean literal> ::= FALSE | TRUE
```

Syntax Rules

1. If the <CCSID attribute> is specified for a <character literal>, it shall match the CCSID of the source file.
2. An even number of <hex digit>s shall be specified for an <encoded hex literal>.

General Rules

1. For <bit literal>s,
   a. The data type shall be BIT with ADL defined default attributes.
   b. The length is the number of bits that the <bit literal> contains.
   c. The value is the sequence of bits that the <bit literal> contains.
   d. If a <bit literal> is specified as a sequence of <bit string>s, the <bit string>s shall be concatenated to form a single <bit string> without any intervening apostrophes (').
2. For <boolean literal>s,
   a. The data type shall be BOOLEAN with ADL defined default attributes.
   b. The value shall be TRUE or FALSE.
3. For <character literal>s,
   a. The data type shall be CHAR with ADL defined default attributes.
   b. The length is the number of bytes in the string. Each <quote representation> in a <character literal> represents a single quotation mark character in both the value and the length of the <character literal>.
   c. The value is the sequence of characters the <character literal> contains.
   d. If a <character literal> is specified as a sequence of <character string>s, the <character string>s shall be concatenated to form a single <character string> without any intervening apostrophes (').
4. For <encoded hex literal>s,
   a. The data type shall be CHAR with ADL defined default attributes.
   b. The length is the number of bytes in the string.
   c. The value is the sequence of characters the <encoded hex literal> contains.
   d. If an <encoded hex literal> is specified as a sequence of <hex string>s, the <hex string>s shall be concatenated to form a single <hex string> without any intervening apostrophes (').
5. For <hex literal>s,
   a. The data type shall be ASIS with ADL defined default attributes.
   b. The length is the number of bits represented by the hexadecimal digits the <hex literal> contains.
   c. The value is the sequence of characters represented by the hexadecimal digits the <hex literal> contains, in the CCSID specified.
   d. If a <hex literal> is specified as a sequence of <hex string>s, the <hex string>s shall be concatenated to form a single <hex string> without any intervening apostrophes (').
6. For <positive integer>s and <signed integer>s,,
   a. The data type shall be ZONED with ADL defined default attributes.
   b. The length in bytes is determined by the number of <digit>s the integer contains.
   c. A positive sign shall be assumed if a + is not specified.
   d. The numeric value is derived from the normal mathematical interpretation of signed positional decimal notation.

Examples

1. Examples of valid literals are:

```
55      'abcd'     b'0110011001'     'abcd' CCSID(500)
TRUE    'it''s'    x'A98B'           x'21' CCSID(437)
```

2. The following is a single character literal broken into segments:

```
'Whose woods these are, I think I know '
'His house is in the village, though. '
'He will not see me stopping here '
'To watch his woods fill up with snow. '
```

---

<module>

Function: Specify an ADL module.

Format

```
<module> ::= {<DECLARE statement> | <PLAN statement>}...
```

Syntax Rules: At least one <DECLARE statement> and one <PLAN statement> shall be specified in a <module>.

General Rules

1. Two classes of data storage shall be associated with a <module>:
   a. Data storage passed as arguments to the parameters of a plan, called parameter variables.
   b. Data storage allocated and managed by the <module>, called workspace variables.
2. Parameter variables shall be allocated and managed by the caller of the plan. Workspace variables shall be allocated as required by the variables declared in the <DECLARE statement>s of the <module>. For every such variable that is not referenced as a <parameter> of a plan, a single area of storage shall be allocated for each processing thread that invokes the PLANs of the <module>. All invocations of any of the plans of the <module> by the same thread shall be provided with access to this area.

Examples: See Appendix A, "Scenarios" on page 161.

---

<positional identifier>

Function: Specify an entity in terms of its position within its containing entity.

Format

```
<positional identifier> ::= " <digit>... "
```

Syntax Rules: None.

General Rules: A <positional identifier> shall be implicitly associated with all entities contained within a <DECLARE statement>, <PLAN statement>, <SEQUENCE>, or <CASE>, starting with 1 for each, and increasing by 1 for each entity it contains up to <max31>.

Examples

1. The <positional identifier> of the first entity in a DECLARE section is "1".
2. The <positional identifier> of the second entity in a module is "2".

---

<predicate>

Function: Specify a condition that can be evaluated to give a value of TRUE or FALSE.

Format

```
<predicate> ::=
  <comparison predicate> |
  <BETWEEN predicate> |
  <IN predicate> |
  <LIKE predicate>
```

Syntax Rules: None.

General Rules: None.

Examples: None.

---

<qualified identifier>

Function: Specify the qualified identifier of an entity.

Format

```
<qualified identifier> ::=
  <qualifier list> [<subscript list>]

<qualifier list> ::=
  [<qualifier>.]...<qualifier>

<qualifier> ::=
  <identifier> | <positional identifier>

<subscript list> ::=
  ()
```

Syntax Rules

1. <qualifier>s shall be specified in the order defined by the "containing" relationship of entities.
2. The highest level of <qualifier> of a <qualified identifier> is the <identifier> of a <DECLARE statement>.
3. A partially qualified name with high level <qualifier>s missing can be specified if it is unique within its containing <identifier>s.
4. A <subscript list> shall be specified only when declaring an element of an ARRAY of CASE to refer to the current element of the ARRAY.

General Rules

1. A reference to a <qualified identifier> shall refer to the value associated with the <qualified identifier>.

2. When an ARRAY OF CASE is defined such that the discriminant is contained within the element, the discriminant shall apply to each element individually. For example:

```
DEFAULT ARRAY DMNLOW(1) MAXALC(TRUE) SKIP(0);
DEFAULT BINARY BYTRVS(FALSE) COMPLEX(FALSE) CONSTRAINED(FALSE)
               RADIX(2) SCALE(0) SIGNED(TRUE) PRECISION(31)
               SGNCNV(ALGEBRAIC) FIT(ROUND);
DEFAULT CASE MAXALC(TRUE);
DEFAULT CHAR CCSID(0) LENGTH(1) JUSTIFY(LEFT) UNITLEN(8);
a: ARRAY DMNLST(DMNSIZE(3), DMNSIZE(3))
         OF CASE
              BEGIN;
                WHEN s1.d() = '1' THEN
                s1: SEQUENCE
                    BEGIN;
                      d: CHAR;
                      e: CHAR LENGTH(4);
                    END;
                WHEN s2.d() = '2' THEN
                s2: SEQUENCE
                    BEGIN;
                      d: CHAR;
                      e: BINARY RADIX(10);
                    END;
                WHEN s3.d() = '1' THEN
                s3: SEQUENCE
                    BEGIN;
                      d: CHAR;
                      e: BINARY;
                    END;
              END;
```

Note: A discriminant is contained within each <WHEN statement>. Each discriminant applies to that element in both dimensions.

Examples

1. An <identifier> must be specified with enough high level <qualifier>s to eliminate any ambiguity. For example, given the hierarchy:

```
A
  B
    C
    D
  E
    C
    F
```

if a statement refers to A.B.C, then at least B.C shall be specified to resolve any ambiguity with E.C.

2. The following are examples of <qualified identifier>s:

```
PersonnelRecord.name
PersonnelRecord.children.dateOfBirth
SoftballRecord.Team.Wins
```

3. Inventory and Desk are declared as follows:

```
DEFAULT CHAR CCSID(0) LENGTH(1) JUSTIFY(LEFT) UNITLEN(8);
DEFAULT BINARY BYTRVS(FALSE) COMPLEX(FALSE) CONSTRAINED(FALSE)
               RADIX(2) SCALE(0) SIGNED(TRUE) PRECISION(31)
               SGNCNV(ALGEBRAIC) FIT(ROUND);
Inventory: SUBTYPE OF
           SEQUENCE BEGIN;
             ItemNumber: BINARY;
             WoodType: CHAR LENGTH(20);
           END;
Furniture: SEQUENCE BEGIN;
             Desk: Inventory
           END;
The qualified names for the fields in Furniture are:
Furniture.Desk.ItemNumber
Furniture.Desk.WoodType
```

<token>

Function: Specify lexical units.

Format

```
<token> ::=
  <nondelimiter token> | <delimiter token>

<nondelimiter token> ::=
  <qualified identifier> |
  <key word> |
  <noncharacter literal> |
  <quoted key word>

<delimiter token> ::=
  <character literal> |
  <special symbol>

<special symbol> ::=
  ' | * | . | , | : | ; | = | + | - | ( | ) |
  > | < | <> | >= | <= | /* | */ | <arrow>

<separator> ::=
  {<comment> | <space> | <new line> | <tab>}...

<comment> ::=
  /* <source character>... */

<space> ::=
  See Syntax Rule #1 on page 34.

<new line> ::=
  See Syntax Rule #1 on page 34.

<tab> ::=
  See Syntax Rule #1 on page 34.
```

```
<key word> ::=
  | ALGEBRAIC | AND | ARRAY | ASIS | BEGIN |
  | BINARY | BIT | BITPRE | BLNENC |
  | BYTRVS | CALL | CASE | CCSID |
  | CHARPRE | CHARSFX | COMPLEX | CONSTANT |
  | DECLARE | DEFAULT | DGTLSTBYT | DMNHIGH |
  | DMNLST | DMNMAX | DMNSIZE | END |
  | ESCAPE | EXACT | FALSE | FB32 |
  | FB80 | FH32 | FH64 | FH128 |
  | FIT | FLOAT | FORM | FRSBYT |
  | HIGH | INCLUDE | IN | INPUT |
  | LEFT | LENGTH | LIKE | LOGICAL |
  | LSTBIT | LSTBYT | MAXALC | MAXLEN |
  | NOTE | OF | OR | OTHERWISE |
  | PACKED | PLAN | PREBYTRVS | PRECISION |
  | RADIX | REJECT | RIGHT | ROUND |
  | SEQUENCE | SFXENC | SGNLOC | SGNMNS |
  | SGNUNS | SIGNED | SKIP | SUBSTR |
  | THEN | TITLE | TRUE | TRUNCATE |
  | WHEN | ZONED | ZONENC | ZONFRSBYT |

<quoted key word> ::= " <key word> "

<arrow> ::=
  <-

<terminator> ::= ;
```

Syntax Rules

1. The encoding of all <token>s (including <space>, <new line>, and <tab>) shall be determined by the <CCSID attribute> of the ADL text. The <CCSID attribute> is specified outside of the ADL text.
2. A <token>, other than a <character literal>, shall not include a <space>.
3. Any <token> can be followed by a <separator>.
4. A <nondelimiter token> shall be followed by a <delimiter token> or a <separator>. If the syntax does not allow a <nondelimiter token> to be followed by a <delimiter token>, then that <nondelimiter token> shall be followed by a <separator>.
5. The character sequence */ shall appear within a <comment> only as the terminator of the <comment>.
6. If any use of an ADL <key word> conflicts with a user specified <constant identifier> or <subtype identifier>, a <quoted key word> shall be specified.

General Rules: All lines of input shall be considered to be a continuous string.

Examples: None.

<value expression>

Function: Specify an expression that can be evaluated to return a value.

Format

```
<value expression> ::=
  <value specification> |
  (<value expression>)
<value specification> ::=
  <literal> |
  <constant identifier> |
  <qualified identifier> |
  <LENGTH function> |
  <SUBSTR function>
```

Syntax Rules: If a <qualified identifier> is specified, it shall refer to a <field>.

General Rules: Expressions within parentheses shall be evaluated first.

Examples: None.

<when clause>

Function: Specify a condition that must be TRUE.

Format

```
<WHEN clause> ::=
  WHEN <condition>
```

Syntax Rules: None.

General Rules: None.

Examples: None.

Chapter 4. Statements

This chapter describes, in alphabetical order, the statements of ADL.

<assignment statement>

Function: Specify the assignment of a <value expression> to a variable. The result of evaluating the <value expression> is called the source of the assignment, and the variable is called the target of the assignment.

Format

```
<assignment statement> ::=
  [<identifier>:]
  <qualified identifier>
  <arrow>
  <value expression>
  <terminator>
```

Syntax Rules: The <qualified identifier> at the left of the <arrow> shall not be that of an <INPUT parameter>.

General Rules

1. If an <identifier> is specified, it shall be ignored.
2. If the data type and attributes of the source do not match the data type and attributes of the target, the value of the source shall be converted to the data type and attributes of the target.
3. Conversions shall be performed if, and only if, they are allowed by the matrix in Figure 9 on page 124.
4. The result of the assignment shall not exceed the MAXLEN of the target or of any component of the target.
5. If a <WHEN clause> is specified for the target, the condition of the <WHEN clause> shall evaluate to TRUE at the end of the <assignment statement>. Otherwise, the PLAN shall be terminated and the *0007 – Data Rejected* exception shall occur.

Examples: See Appendix A, "Scenarios" on page 161.

<BEGIN statement>

Function: Specify the beginning of a sequence of statements.

Format

```
<BEGIN statement> ::=
  [<identifier>:]
  BEGIN
  <terminator>
```

Syntax Rules: For every <BEGIN statement>, an <END statement> shall be specified to terminate the sequence of statements.

General Rules: If an <identifier> is specified, it shall be ignored.

Examples: None.

<CALL statement>

Function: Call a named program external to the program containing the conversion plan and pass arguments to its parameters. The called program can operate on the input parameters passed to it and return values in the output parameters for further use by the conversion plan.

Format

```
<CALL statement> ::=
  [<identifier>:]
  CALL
  <program name>
  <argument list>
  <terminator>

<program name> ::= <character literal>

<argument list> ::=
  (<argument>{[,<argument>]...})

<argument> ::= <value expression>
```

Syntax Rules: None.

General Rules

1. If an <identifier> is specified, it shall be ignored.
2. In addition to the arguments specified, an additional argument shall be passed by all implementations of the <CALL statement> to provide an area for a Condition Token (CTOK) to be returned, as defined by the Common Execution Environment program calling standards.
3. On return from the called program, all implementations shall test the return CTOK argument and if any exception with a severity code greater than 1 (warning) has been set by the called program, the calling plan shall be terminated.

Examples: See Appendix A, "Scenarios" on page 161.

<CONSTANT statement>

Function: Specify the declaration of a constant.

Format

```
<CONSTANT statement> ::=
  <constant identifier> :
  CONSTANT
  {<literal> | <constant identifier>}
  <terminator>

<constant identifier> ::=
  <identifier>
```

Syntax Rules: None.

General Rules

1. The value of the <literal> shall be associated with the <identifier> specified.
2. If CONSTANT(<constant identifier>) is specified, it shall not result in a loop.
3. The following constants are defined by ADL for use as attribute values:

```
LSTBIT: CONSTANT 0;       /* Value of <BLNENC attribute>  */
ROUND: CONSTANT 0;        /* Value of <FIT attribute>     */
TRUNCATE: CONSTANT 1;     /* Value of <FIT attribute>     */
EXACT: CONSTANT 2;        /* Value of <FIT attribute>     */
LEFT: CONSTANT 0;         /* Value of <JUSTIFY attribute> */
RIGHT: CONSTANT 1;        /* Value of <JUSTIFY attribute> */
DGTLSTBYT: CONSTANT 0;    /* Value of <SGNLOC attribute>  */
ZONFRSBYT: CONSTANT 1;    /* Value of <SGNLOC attribute>  */
ZONLSTBYT: CONSTANT 2;    /* Value of <SGNLOC attribute>  */
FRSBYT: CONSTANT 3;       /* Value of <SGNLOC attribute>  */
LSTBYT: CONSTANT 4;       /* Value of <SGNLOC attribute>  */
FB32: CONSTANT 0;         /* Value of <FORM attribute>    */
FB64: CONSTANT 1;         /* Value of <FORM attribute>    */
FB80: CONSTANT 2;         /* Value of <FORM attribute>    */
FH32: CONSTANT 3;         /* Value of <FORM attribute>    */
FH64: CONSTANT 4;         /* Value of <FORM attribute>    */
FH128: CONSTANT 5;        /* Value of <FORM attribute>    */
FI128: CONSTANT 6;        /* Value of <FORM attribute>    */
ALGEBRAIC: CONSTANT 0;    /* Value of <SGNCNV attribute>  */
LOGICAL: CONSTANT 1;      /* Value of <SGNCNV attribute>  */
```

Examples: Declare speedlimit to be a constant with the value of 55.

```
speedlimit: CONSTANT 55;
```

---

<data declaration statement>

Function: Specify the declaration for one or more instances of data.

Format

```
<data declaration statement> ::=
  [<qualified identifier>:]... <data>

<data> ::=
  <constructor> |
  {<subtype instance> <terminator>} |
  {<field> <terminator>}
```

```
<constructor> ::=
  <ARRAY> |
  <CASE> |
  <SEQUENCE>

<field> ::=
  <ASIS> |
  <BINARY> |
  <BIT> |
  <BITPRE> |
  <BOOLEAN> |
  <CHAR> |
  <CHARPRE> |
  <CHARSFX> |
  <ENUMERATION> |
  <FLOAT> |
  <PACKED> |
  <ZONED>
```

Syntax Rules: A <positional identifier> shall not be specified in the <qualified identifier>.

General Rules

1. If a <data declaration statement> specifies an attribute or attributes which are mutually exclusive with the attributes specified in the <DEFAULT statement> for the specified data type, the attribute(s) on the <data declaration statement> shall take precedence over the defaulted ones.
2. If multiple <qualified identifier>s are specified, the <data> declaration applies to each of them separately. If specified in the declaration of the elements of a <SEQUENCE>, the <data> declarations apply only to the elements in the order in which the <qualified identifier>s are specified.

Examples

1. Declare a character string of length 5:

```
x: CHAR LENGTH(5);
```

2. Declare a sequence of unnamed fields:

```
DEFAULT CHAR CCSID(0) LENGTH(1) JUSTIFY(LEFT) UNITLEN(8);
DEFAULT BINARY BYTRVS(FALSE) COMPLEX(FALSE) CONSTRAINED(FALSE)
               RADIX(2) SCALE(0) SIGNED(TRUE) PRECISION(31)
               SGNCNV(ALGEBRAIC) FIT(ROUND);
s: SEQUENCE BEGIN;
     CHAR LENGTH(5);
     BINARY PRECISION(15);
   END;
```

In this case, the CHAR field is assigned a <positional identifier> of

"1" within SEQUENCE s and the BINARY field is assigned a <positional identifier> of "2" within SEQUENCE s.

<DECLARE statement>

Function: Specify the descriptions of a set of data values.

Format

```
<DECLARE statement> ::=
  [<identifier>:]
  DECLARE
  <DECLARE attributes list>
  <BEGIN statement>
    {
      [<DEFAULT statement>] |
      [<CONSTANT statement>] |
      [<SUBTYPE statement>] |
      <data declaration statement>
    }...
  <END statement>

<DECLARE attributes list> ::=
  {
    [<NOTE attribute>]
    [<HELP attribute>]
    [<TITLE attribute>]
  }!
```

Syntax Rules: None.

General Rules: None.

Examples: See Appendix A, "Scenarios" on page 161.

<DEFAULT statement>

Function: Specify the default values of attributes of a particular data type. These attribute values are to be used if attributes are not otherwise specified in a <data declaration statement> of a data type.

Format

```
<DEFAULT statement> ::=
  [<identifier>:]
  DEFAULT
    {
      {ARRAY <ARRAY defaulted attributes list>} |
      {ASIS <ASIS defaulted attributes list>} |
      {BINARY <BINARY defaulted attributes list>} |
      {BIT <BIT defaulted attributes list>} |
      {BITPRE <BITPRE defaulted attributes list>} |
      {BOOLEAN <BOOLEAN defaulted attributes list>} |
      {CASE <CASE defaulted attributes list>} |
      {CHAR <CHAR defaulted attributes list>} |
      {CHARPRE <CHARPRE defaulted attributes list>} |
      {CHARSFX <CHARSFX defaulted attributes list>} |
      {ENUMERATION <ENUMERATION defaulted attributes list>} | .
      {FLOAT <FLOAT defaulted attributes list>} |
      {PACKED <PACKED defaulted attributes list>} |
      {ZONED <ZONED defaulted attributes list>}
    }
  <terminator>
```

Syntax Rules: The values of all attributes in a <DEFAULT statement> shall be specified by a <literal> or <constant identifier>.

General Rules

1. If an <identifier> is specified, it shall be ignored.
2. The scope of a <DEFAULT statement> for a data type shall be the entire <DECLARE statement>.
3. If a <DEFAULT statement> is not specified for an ADL data type, the following <DEFAULT statement> for that data type shall be used:

```
DEFAULT ARRAY   DMNLOW(1) MAXALC(TRUE) SKIP(0);
DEFAULT ASIS    LENGTH(8) UNITLEN(1);
DEFAULT BINARY  BYTRVS(FALSE) COMPLEX(FALSE) CONSTRAINED(FALSE)
                RADIX(2) SCALE(0) SIGNED(TRUE) PRECISION(31)
                SGNCNV(LOGICAL) FIT(ROUND);
DEFAULT BIT     LENGTH(1);
DEFAULT BITPRE  MAXALC(TRUE) PREBYTRVS(FALSE) PRELEN(16) MAXLEN(8);
DEFAULT BOOLEAN BLNENC(LSTBIT) BYTRVS(FALSE) LENGTH(8);
DEFAULT CASE    MAXALC(TRUE);
DEFAULT CHAR    CCSID(0) LENGTH(1) JUSTIFY(LEFT) UNITLEN(8);
DEFAULT CHARPRE CCSID(0) MAXALC(TRUE) PREBYTRVS(FALSE)
                PRELEN(16) MAXLEN(1) UNITLEN(8);
DEFAULT CHARSFX CCSID(0) MAXALC(TRUE) SFXENC(x'00') MAXLEN(1)
                UNITLEN(8);
DEFAULT ENUMERATION BYTRVS(FALSE) LENGTH(8)
                SGNCNV(LOGICAL) SIGNED(FALSE);
DEFAULT FLOAT   FORM(FB32) BYTRVS(FALSE) COMPLEX(FALSE) RADIX(2)
                FIT(ROUND);
DEFAULT PACKED  COMPLEX(FALSE) CONSTRAINED(FALSE) SIGNED(TRUE)
                SCALE(0) SGNLOC(DGTLSTBYT) SGNMNS(x'D')
                SGNPLS(x'C') PRECISION(15) FIT(ROUND);
DEFAULT ZONED   COMPLEX(FALSE) ZONENC(x'F') FIT(ROUND)
                CONSTRAINED(FALSE) SCALE(0) SGNLOC(ZONLSTBYT)
                SGNMNS(x'D') SGNPLS(x'C') PRECISION(15) SIGNED(TRUE);
```

Examples

1. In the following example, c takes on default attributes from the <DEFAULT statement> for BINARY.

```
DEFAULT BINARY BYTRVS(FALSE) COMPLEX(FALSE) CONSTRAINED(FALSE)
               RADIX(2) SCALE(0) SIGNED(TRUE) PRECISION(31)
               SGNCNV(ALGEBRAIC) FIT(ROUND);
c: BINARY PRECISION(15);
```

Thus the complete declaration of c is:

```
BINARY BYTRVS(FALSE) COMPLEX(FALSE) CONSTRAINED(FALSE)
       RADIX(2) SCALE(0) SIGNED(TRUE) PRECISION(15) FIT(ROUND);
```

Note: The value of the PRECISION attribute specified in the <data declaration statement> for c overrides the value specified in the <DEFAULT statement>.

2. For ZONED fields, the SGNLOC(ZONLSTBYT | ZONFRSBYT), SGNMNS, and SGNPLS attributes are mutually exclusive with the SGNLOC(FRSBYT | LSTBYT) and CCSID attributes.

```
DEFAULT ZONED COMPLEX(FALSE) ZONENC(x'F') FIT(ROUND)
              CONSTRAINED(FALSE) SCALE(0) SGNLOC(ZONLSTBYT)
              SGNMNS(x'D') SGNPLS(x'C') PRECISION(15) SIGNED(TRUE);
s: ZONED SGNLOC(FRSBYT) CCSID(0);
```

Thus the complete declaration of s is:

```
ZONED COMPLEX(FALSE) ZONENC(x'F') FIT(ROUND)
      CONSTRAINED(FALSE) SCALE(0) SGNLOC(FRSBYT)
      CCSID(0) PRECISION(15) SIGNED(TRUE);
```

Note: s takes on the SGNLOC(FRSBYT) and CCSID(0) attribute values while the SGNLOC(ZONLSTBYT), SGNMNS(x'D'), and SGNPLS(x'C') attributes and values from the <DEFAULT statement> for <ZONED> are ignored.

<END statement>

Function: Specify the end of a sequence of statements.

Format

```
<END statement> ::=
  [<identifier>: ]
  END
  <terminator>
```

Syntax Rules: An <END statement> shall be specified only at the termination of a sequence of statements begun by a <BEGIN statement>.

General Rules: If an <identifier> is specified, it shall be ignored.

Examples: None.

<INCLUDE statement>

Function: Include the ADL text contained in a named file.

Format

```
<INCLUDE statement> ::=
  [<identifier> :]
  INCLUDE
  <file name>
  <terminator>

<file name> ::=
  <character literal> | <encoded hex literal>
```

Syntax Rules

1. The named file shall contain only ADL text.
2. The included text may contain <INCLUDE statement>s.
3. The <file name> specified shall be the local identifier for that file.
4. The <INCLUDE statement> can appear wherever it is valid for any other ADL statements to appear.
5. Included text shall not result in a loop of included texts.

General Rules

1. If an <identifier> is specified, it shall be ignored.
2. The included text shall replace the <INCLUDE statement> in the source text of the <module>.
3. The level of nesting of <INCLUDE statement>s shall be implementation defined.
4. If the <CCSID attribute> of the included file is not the same as the including file, the included file shall be converted to the CCSID of the including file except for <source character>s contained within <character literal>s.

Examples: Include ADL text describing PersonnelRecord:

```
INCLUDE 'PERSONNEL.DCL.RECORD';
```

<OTHERWISE statement>

Function: Specify the declaration to be used or the action to be performed if no <WHEN statement> of a CASE evaluates to TRUE.

Format

```
<OTHERWISE statement> ::=
  [<identifier>: ]
  <OTHERWISE clause>

<OTHERWISE clause> ::=
  OTHERWISE
    {
      <data declaration statement> |
      <REJECT statement> |
      <SKIP statement> |
      <terminator>
    }
```

Syntax Rules: None.

General Rules

1. If an <identifier> is specified, it shall be ignored.
2. If OTHERWISE <terminator> is specified, no data exists.
3. If a <SKIP statement> is specified in the <OTHERWISE clause>, no data exists. However, if MAXALC(TRUE) is specified, space shall exist.
4. If the <REJECT statement> is specified, the *0020 – CASE rejected* exception shall occur.

Examples: See "Examples" on page 70 for an example of the <OTHERWISE statement> used in the CASE declaration.

---

<PLAN statement>

Function: Specify a plan for converting a set of data values from one representation to another.

Format

```
<PLAN statement> ::=
  <identifier>:
  PLAN
  <parameter list>
  <BEGIN statement>
    {<assignment statement> | <CALL statement>}...
  <END statement>

<parameter list> ::=
  (<parameter>[,<parameter>]...)

<parameter> ::=
  {<INPUT parameter> | <OUTPUT parameter>}

<INPUT parameter> ::=
  <qualified identifier>
    [: INPUT
      {
        [<LENGTH attribute>]
        [<CCSID attribute>]
      }!
    ]
```

```
<OUTPUT parameter> ::=
  <qualified identifier>
  : OUTPUT
    {
      [<MAXLEN attribute>]
      [<CCSID attribute>]
    }!
```

Syntax Rules: A <qualified identifier> specified in a <parameter> shall be that of a <data declaration statement>.

General Rules

1. The statements contained within a PLAN shall be executed in the order specified by the <PLAN statement>.
2. If neither INPUT nor OUTPUT is specified for a <parameter>, INPUT shall be assumed.
3. Multiple assignments to the same <qualified identifier> or its components shall result in only the final assignment being effective.
4. If the <LENGTH attribute> is specified on an <INPUT parameter>, its value shall be equal to the declared length of the data in bytes. Otherwise,
   - If the value is less than the declared length of the data, the *0016 -- Input area too short* exception shall occur.
   - If the value is greater than the declared length of the data, the excess data shall be ignored.
5. If the <MAXLEN attribute> is specified on an <OUTPUT parameter>, its value shall be greater than or equal to the declared length of the data in bytes. Otherwise, the *0017 -- Output area too short* exception shall occur.
6. For every <qualified identifier> specified in the <parameter list> of a <PLAN statement>, the caller of the plan shall specify the address of an area at which a value is located or at which a value can be returned. The <data declaration statement> associated with the <qualified identifier> provides a template that determines how this area is to be interpreted.
7. If the <qualified identifier> specified in the <parameter list> is that of a <constructor>, the value specified shall be a composite value whose components are declared by the components of the <constructor>.
8. In addition to the parameters specified in the <parameter list>, the caller of the plan shall specify the address in which the Condition Token is to be returned. The ADL Communications Area of the Condition Token is described in Chapter 9, "Program Calling Conventions" on page 155.

Examples: See Appendix A, "Scenarios" on page 161.

---

<REJECT statement>

Function: Specify the *0020 -- CASE rejected* exception shall occur when specified on a <WHEN statement> or <OTHERWISE statement>.

Format

```
<REJECT statement> ::=
  [<identifier>:]
  REJECT <terminator>
```

Syntax Rules: None.

General Rules: If an <identifier> is specified, it shall be ignored.

Examples

1. Declare a case where if the C1 is chosen, the plan is terminated due to bad data:

```
DEFAULT CASE MAXALC(TRUE);
DEFAULT BINARY BYTRVS(FALSE) COMPLEX(FALSE) CONSTRAINED(FALSE)
               RADIX(2) SCALE(0) SIGNED(TRUE) PRECISION(31)
               SGNCNV(ALGEBRAIC) FIT(ROUND);
DEFAULT CHAR CCSID(0) LENGTH(1) JUSTIFY(LEFT) UNITLEN(8);
DEFAULT FLOAT FORM(FB32) BYTRVS(FALSE) COMPLEX(FALSE) RADIX(2)
              FIT(ROUND);
  x: SEQUENCE
     BEGIN;
     a: CHAR;
     CASE BEGIN;
       c1:  WHEN a = '1'
            THEN REJECT;
       c2:  WHEN a = '2'
            THEN x: BINARY SCALE(5) PRECISION(15);
            OTHERWISE y: FLOAT;
          END;
     END;
```

2. Declare a case where if the <OTHERWISE statement> is chosen, the plan is terminated:

```
DEFAULT CASE MAXALC(TRUE);
DEFAULT BINARY BYTRVS(FALSE) COMPLEX(FALSE) CONSTRAINED(FALSE)
               RADIX(2) SCALE(0) SIGNED(TRUE) PRECISION(31)
               SGNCNV(ALGEBRAIC) FIT(ROUND);
DEFAULT CHAR CCSID(0) LENGTH(1) JUSTIFY(LEFT) UNITLEN(8);
DEFAULT FLOAT FORM(FB32) BYTRVS(FALSE) COMPLEX(FALSE) RADIX(2)
              FIT(ROUND);
  x: SEQUENCE
     BEGIN;
     a: CHAR;
     CASE BEGIN;
       c1:  WHEN a = '1'
            y: FLOAT;
       c2:  WHEN a = '2'
            THEN x: BINARY SCALE(5) PRECISION(15);
            OTHERWISE REJECT;
          END;
     END;
```

<SKIP statement>

Function: Specify the number of bits to be skipped in the data of a constructor.

Format

```
<SKIP statement> ::=
  [<identifier>:]
  SKIP({<positive integer> | <constant identifier>})
  <terminator>
```

Syntax Rules: None.

General Rules

1. If a <constant identifier> is specified, it shall be one whose value is a <positive integer>.
2. If an <identifier> is specified, it shall be ignored.

Examples

1. Declare a sequence with 16 slack bits between B and C:

```
DEFAULT BINARY BYTRVS(FALSE) COMPLEX(FALSE) CONSTRAINED(FALSE)
               RADIX(2) SCALE(0) SIGNED(TRUE) PRECISION(31)
               SGNCNV(ALGEBRAIC) FIT(ROUND);
DEFAULT CHAR CCSID(0) LENGTH(1) JUSTIFY(LEFT) UNITLEN(8);
A  : SEQUENCE BEGIN;
     B  : CHAR LENGTH(2);
          SKIP(16);
     C  : BINARY PRECISION(31);
     END;
```

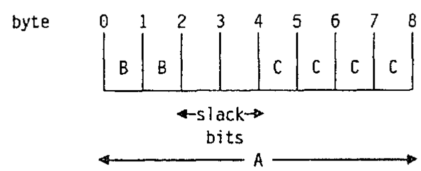

2. Declare a sequence, F1, with 6 slack bits at the beginning of the sequence:

```
DEFAULT ARRAY DMNLOW(1) MAXALC(TRUE) SKIP(0);
DEFAULT BIT LENGTH(1);
DEFAULT CHAR CCSID(0) LENGTH(1) JUSTIFY(LEFT) UNITLEN(8);
F1 : SEQUENCE BEGIN;
          SKIP(6);
     F2 : BIT LENGTH(5);
     F3 : ARRAY DMNLST(DMNSIZE(5))
          OF BIT LENGTH(1);
     F4 : CHAR;
     END;
```

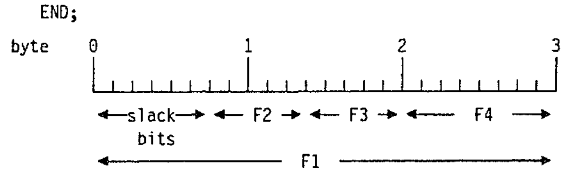

<SUBTYPE statement>

Function: Declare a subtype of an ADL type or of another subtype. A subtype specifies the attributes and components of all instances of the subtype. A subtype inherits the components and attributes of its supertype, but it can override those attributes.

Format

```
<SUBTYPE statement> ::=
  <subtype identifier>:
  SUBTYPE
  OF
    {
      <constructor> |
      {<field> <terminator>} |
      {<subtype instance> <terminator>}
    }
<subtype identifier> ::= <identifier>
```

Syntax Rules: If a <subtype instance> is specified, the referenced subtype shall not result in a loop of subtype references.

General Rules: None.

Examples

1. Specify name as a subtype of <SEQUENCE>:

```
DEFAULT CHAR CCSID(0) LENGTH(1) JUSTIFY(LEFT) UNITLEN(8);
   name:
      SUBTYPE OF SEQUENCE
      BEGIN;
        lastname: CHAR LENGTH(12);
        firstname: CHAR LENGTH(12);
        initial: CHAR;
      END;
```

2. Specify address as a subtype of <SEQUENCE>:

```
DEFAULT CHAR CCSID(0) LENGTH(1) JUSTIFY(LEFT) UNITLEN(8);
address: SUBTYPE OF SEQUENCE
         BEGIN;
            street: CHAR LENGTH(30);
            city: CHAR LENGTH(15);
            state: CHAR LENGTH(2);
            zip: CHAR LENGTH(10);
         END;
```

3. Declare card to be a sequence containing instances of name and address. If <identifier>s are specified for the name and address components of card, the <identifier>s alias and drop replace name and address in the fully qualified names of the components of name and address.

```
card: SEQUENCE
      BEGIN;
        alias: name;
        drop: address;
      END;
```

The qualified names of the fields in card are:

```
card.alias.lastname
card.alias.firstname
card.alias.initial
card.drop.street
card.drop.city
card.drop.state
card.drop.zip
```

4. Declare a subtype of a subtype:

```
DEFAULT BINARY BYTRVS(FALSE) COMPLEX(FALSE) CONSTRAINED(FALSE)
               RADIX(2) SCALE(0) SIGNED(TRUE) PRECISION(31)
               SGNCNV(ALGEBRAIC) FIT(ROUND);
fixnum: SUBTYPE OF BINARY;
partscount: SUBTYPE OF fixnum PRECISION(15);
```

5. Declare a subtype of a case:

```
DEFAULT CASE MAXALC(TRUE);
DEFAULT CHAR CCSID(0) LENGTH(1) JUSTIFY(LEFT) UNITLEN(8);
DEFAULT BINARY BYTRVS(FALSE) COMPLEX(FALSE) CONSTRAINED(FALSE)
               RADIX(2) SCALE(0) SIGNED(TRUE) PRECISION(31)
               SGNCNV(ALGEBRAIC) FIT(ROUND);
DEFAULT FLOAT FORM(FB32) BYTRVS(FALSE) COMPLEX(FALSE) RADIX(2)
              FIT(ROUND);
answer: SUBTYPE OF CASE
                  BEGIN;
                    WHEN a = '1'
                    THEN b: CHAR LENGTH(4);
                    WHEN a = '2'
                    THEN c: BINARY;
                    OTHERWISE d: FLOAT;
                  END;
x: SEQUENCE
   BEGIN;
     a: CHAR;
        answer;
   END;
```

---

<WHEN statement>

Function: Specify in a CASE declaration the conditions under which a <THEN clause> is to be selected.

Format

```
<WHEN statement> ::=
  [<identifier>:]
  <WHEN clause>
  <THEN clause>

<THEN clause> ::=
  THEN
    {
      <data declaration statement> |
      <REJECT statement> |
      <SKIP statement> |
      <terminator>
    }
```

Syntax Rules: If the <REJECT statement> is specified, the *0020 – CASE rejected* exception shall occur.

General Rules

1. If THEN <terminator> is specified in the <THEN clause>, no data exists.
2. If a <SKIP statement> is specified in the <THEN clause>, no data exists. However, if MAXALC(TRUE) is specified, space shall exist.

Examples: See "Examples" on page 70 for an example of the <WHEN statement> used in the CASE declaration.

Chapter 5. Data Declarations

This chapter describes, in alphabetical order, the data types that can be declared in ADL.

<ARRAY>

Function: An array is a collection whose elements are uniquely associated with the integer values of one or more attributes. By geometric analogy, these attributes are called *dimensions*, but their actual meaning is determined by the application.

Each element of an array has its own value, and is associated with a unique combination of dimension, or attribute, values. The array, as a whole, allows elements to exist at all possible combinations of values within the defined range of each dimension.

The elements of an array are addressable through integer values specified for each dimension. As an example, consider an array of two dimensions, where one dimension has integer values from -a to +b and the other dimension has integer values from -c to +d. A given element of the array, such as x in the following figure, is addressed by the integer values m and n, where m is in the range -a to +b and n is in the range -c to +d. Higher order arrays simply have more dimensions and their elements are addressed by more integer values.

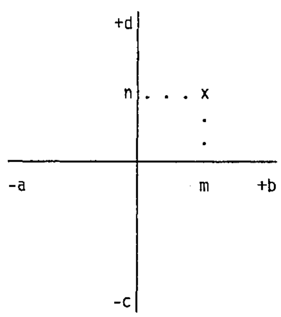

The dimensions of an array are defined and addressed as an ordered list.

The range of a dimension of an array can be described in terms of either its <DMNLOW attribute> and <DMNHIGH attribute> or its <DMNLOW attribute> and <DMNSIZE attribute>.

The total number of elements E in an array is the product of the $e_i$ of its dimensions.

$E = \text{PRODUCT}(e_i)$
where
$i = 1$ to $n$
$e_i$ = the extent of the $i^{th}$ dimension When an array is mapped onto a linear address space, the dimensions of the array must also be linearized. For a one-dimensional array X with indices in the range -1 to 2, this is straightforward. The memory mapping is X(-1) X(0) X(+1) X(+2).

Multidimensional arrays are mapped onto a linear address space by iterating the indexes of each low order dimension through their ranges for each higher order dimension.

The elements of an array are mapped to memory as contiguous fields. They are mapped such that the last dimension varies the fastest.

- A 3-element by 5-element two-dimensional array named a is stored linearly in memory as follows:

| | | | | | | | | |
|---|---|---|---|---|---|---|---|---|
| a(1,1) | a(1,2) | a(1,3) | a(1,4) | a(1,5) | a(2,1) | a(2,2) | a(2,3) | a(2,4) |

| | | | | | |
|---|---|---|---|---|---|
| a(2,5) | a(3,1) | a(3,2) | a(3,3) | a(3,4) | a(3,5) |

- A 2-element one-dimensional array, X, consisting of the sequence A,B, is stored linearly in memory as follows:

| | | | |
|---|---|---|---|
| x(1).A | x(1).B | x(2).A | x(2).B |

The <DMNLOW attribute> and <DMNHIGH attribute> or <DMNLOW attribute> and <DMNSIZE attribute> of each dimension of an array can be specified by a signed integer or by reference to a field containing a signed integer value.

When an array is defined without reference fields each program that exports or imports the array must know the values of the <DMNLOW attribute>, <DMNHIGH attribute>, and <DMNSIZE attribute> of the array.

When an array is defined with reference fields some combination of the <DMNLOW attribute>, <DMNHIGH attribute>, and <DMNSIZE attribute> values for each varying dimension can also be included in the data. Then, when the data is imported by another program, the locations of each element can be redetermined.

Thus, when describing the dimensions of an array, the following must be specified for each dimension:

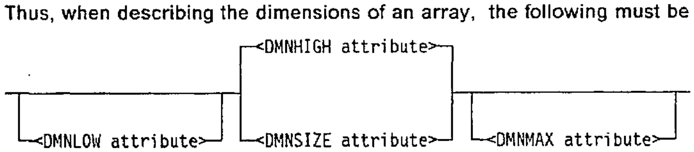

where:

- The <DMNLOW attribute> is defaulted if not specified
- Either the <DMNHIGH attribute> or <DMNSIZE attribute> is required
- Either an integer value or a field reference can be specified for the <DMNLOW attribute>, <DMNHIGH attribute>, or <DMNSIZE attribute>
- An integer value must be specified for <DMNMAX attribute> if a variable is specified for any <DMNLOW attribute>, <DMNHIGH attribute>, or <DMNSIZE attribute>.

A further consideration for arrays defined with reference fields is whether space is allocated for the maximum number of elements in each dimension, MAXALC(TRUE), or for only the actual number of elements in each dimension, MAXALC(FALSE).

- A two-dimensional, MAXALC(TRUE) array specified with reference fields is mapped into memory as follows:

```
DEFAULT ARRAY DMNLOW(1) MAXALC(TRUE) SKIP(0);
DEFAULT BINARY BYTRVS(FALSE) COMPLEX(FALSE) CONSTRAINED(FALSE)
               RADIX(2) SCALE(0) SIGNED(TRUE) PRECISION(31)
               SGNCNV(ALGEBRAIC) FIT(ROUND);
xmp1: SEQUENCE
      BEGIN;
        s: BINARY;
        t: BINARY;
        z: ARRAY  DMNLST(DMNHIGH(s) DMNMAX(4),
                         DMNHIGH(t) DMNMAX(4))
            OF BINARY;
      END;
```

| | | active | active | in-active | in-active | active | active | in-active | in-active |
|---|---|---|---|---|---|---|---|---|---|
| s = 2 | t = 2 | z(1,1) | z(1,2) | z(1,3) | z(1,4) | z(2,1) | z(2,2) | z(2,3) | z(2,4) |

| in-active | in-active | in-active | in-active | in-active | in-active | in-active | in-active |
|---|---|---|---|---|---|---|---|
| z(3,1) | z(3,2) | z(3,3) | z(3,4) | z(4,1) | z(4,2) | z(4,3) | z(4,4) |

Note: z(1,1) z(1,2) z(2,1) z(2,2) contain the active elements for this array as defined by the <DMNHIGH attribute>s. z(1,3) z(1,4) z(2,3) z(2,4) z(3,1) z(3,2) z(3,3) z(3,4) z(4,1) z(4,2) z(4,3) z(4,4) are inactive elements which exist as defined by the <DMNMAX attribute>s and MAXALC(TRUE) specified for the array.

Contrary to the above example, if MAXALC(FALSE) is specified, only the required space for a dimension of an array defined with reference fields is allocated.

- A two-dimensional, MAXALC(FALSE) array specified with reference fields is mapped into memory as follows:

```
DEFAULT ARRAY DMNLOW(1) MAXALC(TRUE) SKIP(0);
DEFAULT BINARY BYTRVS(FALSE) COMPLEX(FALSE) CONSTRAINED(FALSE)
               RADIX(2) SCALE(0) SIGNED(TRUE) PRECISION(31)
               SGNCNV(ALGEBRAIC) FIT(ROUND);
xmp2: SEQUENCE
      BEGIN;
        s: BINARY;
        t: BINARY;
        z: ARRAY MAXALC(FALSE) DMNLST(DMNHIGH(s) DMNMAX(4),
                                     DMNHIGH(t) DMNMAX(4))
            OF BINARY;
      END;
```

| | | active | active | active | active |
|---|---|---|---|---|---|
| s = 2 | t = 2 | z(1,1) | z(1,2) | z(2,1) | z(2,2) |

Note: z(1,1) z(1,2) z(2,1) z(2,2) contain active elements as defined by the <DMNHIGH attribute>s and MAXALC(FALSE) specified for the array.

An algorithm is available for addressing individual elements within an array.[1] For an array (A) with (i) dimensions (d)

[1] The basis for this algorithm comes from *Compilers - Principles, Techniques, and Tools* published by the Addison-Wesley Publishing Co., 1989.

$A(d_1, d_2, \ldots d_i)$ the algorithm for addressing individual elements within an array is:

$$((..((d_1e_2 + d_2)e_3 + d_3) e_4 + \ldots + d_{i-1})e_i + d_i) * (s + SKIP) + base - (..((DMNLOW_1e_2 + DMNLOW_2) e_3 + DMNLOW_3)e_4 + \ldots + DMNLOW_{i-1}) e_i + DMNLOW_i) * (s + SKIP)$$

where

```
d       = dimension
s       = size of element
e       = extent
base    = relative offset of start of array from start of data
DMNLOW  = low bound of subscript (obtained from DMNLOW attribute)
SKIP    = bits skipped before each element except the first element
          (obtained from the SKIP attribute)
```

The value for $e_n$ is determined according to the array type.

- For a MAXALC(TRUE) array, $e_n$ = <DMNMAX attribute>

- For a MAXALC(FALSE) or an array defined without reference fields,
  - if the high bound of the array is given, $e_n$ = <DMNHIGH attribute> - <DMNLOW attribute> + 1

- if the size of the array is given, $e_n$ = <DMNSIZE attribute> where $e_n$ = extent of the $n^{th}$ dimension n = dimension number

If, for all the dimensions, the values for the <DMNHIGH attribute>, <DMNLOW attribute>, or <DMNSIZE attribute> are signed integer or constants, the second part of the algorithm can be computed at conversion plan build time. However, if an attribute contains a reference, the referenced value is obtained at conversion time.

If DMNLOW is equal to zero, the array element address reference simplifies to:

$$((..((d_1e_2 + d_2)e_3 + d_3) e_4 + \ldots + d_{n-1})e_n + d_n) * (s + SKIP) + base$$

Format

```
<ARRAY> ::=
  ARRAY
  <ARRAY attributes list>
  [<WHEN clause>]
  OF
    {
      {<field><terminator>} |
      <CASE> |
      <SEQUENCE> |
      {<subtype instance><terminator>}
    }
```

```
<ARRAY attributes list> ::=
  {
    <DMNLST attribute>
    <ARRAY defaulted attributes list>
    <ARRAY optional attributes list>
  }!
<ARRAY defaulted attributes list> ::=
  {
    [<DMNLOW attribute>]
    [<MAXALC attribute>]
    [<SKIP attribute>]
  }!
<ARRAY optional attributes list> ::=
  {
    [<HELP attribute>]
    [<NOTE attribute>]
    [<TITLE attribute>]
  }!
```

Syntax Rules

1. The attributes of the <ARRAY defaulted attributes list> shall be specified in the ARRAY <DEFAULT statement> or the <ARRAY> <data declaration statement>.
2. An array of <subtype instance> shall not be specified if the <subtype instance> is a subtype of ARRAY.
3. All elements of an ARRAY shall be the same length.

General Rules

1. The length of an array in bits shall be the product of the number of elements in the array (E) times the length in bits of each element, plus (E-1) times the <SKIP attribute> of the array.
2. The minimum alignment of an ARRAY shall be determined by the minimum alignment of its elements.
3. If MAXALC(TRUE) is specified and any attribute of the <DMNLST attribute>s has a <qualified identifier> for a value, space shall be allocated for the maximum number of elements (as defined by the <DMNMAX attribute>) in each dimension. The actual number of active elements in each dimension is specified by the reference field.
4. If MAXALC(FALSE) is specified and any attribute of the <DMNLST attribute>s has a <qualified identifier> for a value, space shall be allocated as defined by the attributes of each dimension in the <DMNLST attribute>s.

Examples

1. Declare an array of twelve numbers for the number of days in each month in a year.

```
DEFAULT ARRAY DMNLOW(1) MAXALC(TRUE) SKIP(0);
DEFAULT BINARY BYTRVS(FALSE) COMPLEX(FALSE) CONSTRAINED(FALSE)
               RADIX(2) SCALE(0) SIGNED(TRUE) PRECISION(31)
               SGNCNV(ALGEBRAIC) FIT(ROUND);
MonthsInYr: ARRAY DMNLST(DMNSIZE(12))
            OF BINARY PRECISION(15);
```

2. Declare an array to specify which seats of an airplane have been reserved. The number of rows and the number of seats per row are specified as reference fields to account for different airplane configurations. The maximum number of rows in an airplane is 50 and the maximum number of seats in a row is 10.

```
DEFAULT ARRAY DMNLOW(1) MAXALC(TRUE) SKIP(0);
DEFAULT BINARY BYTRVS(FALSE) COMPLEX(FALSE) CONSTRAINED(FALSE)
               RADIX(2) SCALE(0) SIGNED(TRUE) PRECISION(31)
               SGNCNV(ALGEBRAIC) FIT(ROUND);
DEFAULT BOOLEAN BLNENC(LSTBIT) BYTRVS(FALSE) LENGTH(8);
PlaneReservations:
    SEQUENCE BEGIN;
      rows: BINARY PRECISION(15);
      seats: BINARY PRECISION(15);
      ReservedSeats: ARRAY DMNLST(DMNMAX(50) DMNSIZE(rows),
                                  DMNMAX(10) DMNSIZE(seats))
                     OF BOOLEAN;
    END;
```

---

<ASIS>

Function: Declare an instance of the ASIS type. The actual type of this data is unknown.

The value of the LENGTH attribute can be specified by an integer literal or by reference to another field. If specified by an integer literal, all instances of the variable are of the same length. But if specified by reference to another field, then each instance can be of a different length. In this case, however, the maximum length of the string must also be specified, along with an indication of whether storage has been allocated for the maximum length or only for the current length.

Format

```
<ASIS> ::=
  ASIS
  <ASIS attributes list>
  [<WHEN clause>]
<ASIS attributes list> ::=
  {
    <ASIS defaulted attributes list>
    <ASIS optional attributes list>
  }!
<ASIS defaulted attributes list> ::=
  [
    LENGTH({1..<max ASIS> | <constant identifier>})
    UNITLEN({1 | 8 | 16 | <constant identifier>})
  ]! |
  [
    LENGTH(*)
    MAXLEN({1..<max ASIS> | <constant identifier>})
    UNITLEN({1 | 8 | 16 | <constant identifier>})]
  ]! |
  [
    LENGTH(<qualified identifier>)
    <MAXALC attribute>
    MAXLEN({1..<max ASIS> | <constant identifier>})
    UNITLEN({1 | 8 | 16 | <constant identifier>})]
  ]!
```

```
<ASIS optional attributes list> ::=
  {
    [<HELP attribute>]
    [<NOTE attribute>]
    [<TITLE attribute>]
  }!
<max ASIS> ::=
  See Syntax Rule 4.
```

Syntax Rules

1. The attributes of the <ASIS defaulted attributes list> shall be specified in the ASIS <DEFAULT statement> or the <ASIS> <data declaration statement>.
2. A field shall be declared an ASIS field if its type cannot be expressed in ADL.
3. A field shall be declared an ASIS field if its data value is not to be converted in <assignment statement>s.
4. The LENGTH or MAXLEN of an ASIS field is specified in terms of units whose length in bits is specified by UNITLEN. The length of an ASIS field in bits is determined by (LENGTH * UNITLEN), and the greatest value that can be specified for LENGTH is determined by (<max34> / UNITLEN). The maximum length of an ASIS field in bits is determined by (MAXLEN * UNITLEN), and the greatest value that can be specified for MAXLEN is determined by (<max34> / UNITLEN).
5. If LENGTH(<qualified identifier>) is specified, the referenced field shall be BINARY, PACKED, or ZONED with SCALE(0) and COMPLEX(FALSE) and a maximum value of <max ASIS>.
6. LENGTH(*) shall be specified only for the last element of all containing <constructor>s.
7. LENGTH(*) shall not be specified for any element of an ARRAY.

General Rules

1. If LENGTH(*) is specified, the length of the ASIS field in bits shall be the number of bits from the position of the ASIS field in the data to the end of the data.
2. The minimum alignment of an <ASIS> field is bit alignment.

Examples

1. Declare a program pointer field arrptr:

Note: Since pointers cannot be declared in ADL, arrptr is defined as an <ASIS> data type.

   ```
   DEFAULT ASIS LENGTH(8) UNITLEN(1);
   arrptr: ASIS LENGTH(32);
   ```

2. Declare dontcare to be a 50-bit field in which no conversions are to take place:

   ```
   DEFAULT ASIS LENGTH(8) UNITLEN(1);
   dontcare: ASIS LENGTH(50);
   ```

<BINARY>

Function: Declare an instance of the BINARY type, a fixed-point, binary encoded numeric field.

1. A fixed-point, binary encoded number is represented as a bit string, as shown in Figure 6 on page 61.
   - For an unsigned number (SIGNED(FALSE)), all bits are used to express the binary encoding of the absolute value of the number.
   - For a signed number (SIGNED(TRUE)), the first bit represents the sign, and the remaining bits represent the binary encoding of the number. Positive numbers are represented in true binary notation with the sign bit set to zero. Negative numbers are represented in two's complement notation with a one in the sign bit position. The two's complement of a number is obtained by inverting each bit and adding a one in the low order bit position.
2. The length of the bit string is specified by the <LENGTH attribute>.
3. For RADIX(2),
   a. The maximum number of significant digits in a BINARY field is specified by the <PRECISION attribute> for CONSTRAINED(TRUE); otherwise, it is implied by the <LENGTH attribute>. Binary precision is indicated by RADIX(2).

b. Binary scaling is indicated by RADIX(2) and the scaling factor is specified as a power of 2. The actual value of a fixed-point number is given by the formula:

   ```
   Actual_Value = Stored_Value * 2**(-SCALE)
   ```

If the scaling factor is negative, then the actual value is greater than the stored value.

c. Stored_value
   - If CONSTRAINED(TRUE) is specified:
     - For signed numbers, the range is -(2PRECISION) to (2PRECISION)-1.
     - For unsigned numbers, the range is 0 to (2**PRECISION)-1.
   - If CONSTRAINED(FALSE) is specified:
     - For signed numbers, the range is -(2(LENGTH-1)) to (2(LENGTH-1))-1.
     - For unsigned numbers, the range is 0 to (2**LENGTH)-1.

d. Actual_value
   - If CONSTRAINED(TRUE) is specified:
     - For signed numbers, the range is -(2**PRECISION)*(2(-SCALE)) to ((2PRECISION)-1)*(2**(-SCALE)).
     - For unsigned numbers, the range is 0 to ((2**PRECISION)-1)*(2**(-SCALE)).
   - If CONSTRAINED(FALSE) is specified:
     - For signed numbers, the range is -(2**(LENGTH-1))*(2(-SCALE)) to ((2(LENGTH-1))-1)*(2**(-SCALE)).
     - For unsigned numbers, the range is 0 to ((2**LENGTH)-1)*(2**(-SCALE)).

e. A decimal fraction can be represented exactly in a RADIX(2) BINARY field only if it is a sum of powers of two and all its significant bits can be encoded in the stored value.
4. For RADIX(10), a. The maximum number of decimal digits that can be encoded in a BINARY field is specified by the <PRECISION attribute> for CONSTRAINED(TRUE); otherwise, it is implied by the <LENGTH attribute>.

b. Decimal scaling is indicated by RADIX(10) and the scaling factor is specified as a power of 10. The actual value of a fixed-point number is given by the formula:

```
Actual_Value = Stored_Value * 10**(-SCALE)
```

If the scaling factor is negative, then the actual value is greater than the stored value. For example, if decimal 123 is stored in RADIX(10) and it has a scaling factor of -3, then the actual value is 123000. If the scaling factor is positive, then the actual value is equal or less than the stored value. For example, if decimal 123 is stored and it has a scaling factor of 3, then .123 is the actual value.

c. Stored_value

- If CONSTRAINED(TRUE) is specified:
  - For signed numbers, the range is -((10PRECISION)-1) to (10PRECISION)-1.
  - For unsigned numbers, the range is 0 to (10**PRECISION)-1.
- If CONSTRAINED(FALSE) is specified:
  - For signed numbers, the range is -(2(LENGTH-1)) to (2(LENGTH-1))-1.
  - For unsigned numbers, the range is 0 to (2**LENGTH)-1.

d. Actual_value

- If CONSTRAINED(TRUE) is specified:
  - For signed numbers, the range is -((10**PRECISION)-1)*(10(-SCALE)) to ((10PRECISION)-1)*(10**-SCALE).
  - For unsigned numbers, the range is 0 to ((10**PRECISION)-1)*(10**(-SCALE)).
- If CONSTRAINED(FALSE) is specified:
  - For signed numbers, the range is -(2**(LENGTH-1))*(10(-SCALE)) to ((2(LENGTH-1))-1)*(10**(-SCALE)).
  - For unsigned numbers, the range is 0 to ((2**LENGTH)-1)*(10**(-SCALE)).

e. A decimal fraction can be stored exactly for RADIX(10) fields only if it is a sum of the powers of 10, and all its significant bits can be encoded in the stored value.

```
DEFAULT BINARY BYTRVS(FALSE) COMPLEX(FALSE) CONSTRAINED(FALSE)
         RADIX(2) SCALE(0) SIGNED(TRUE) PRECISION(31)
         SGNCNV(ALGEBRAIC) FIT(ROUND);
X: BINARY RADIX(10) PRECISION(7) SCALE(3) CONSTRAINED(TRUE);
```

is represented by the 32 bit, signed, <BINARY> field:

| | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| s | o | o | o | o | o | o | o | p | p | p | p | p | p | p | p | p | p | p | p | p | p | p | p | p | p | p | p | p | p | p | p |

where the bits are labeled as follows:

s = sign bit - 1 bit o = overflow bits

- 7 additional bits that can be used to increase the range of specifiable integers if CONSTRAINED(FALSE) is specified.

p = bits in which the significant digits of the value are stored as an integer.

- 24 bits required to represent a value up to 9999.999

*Figure 6. Layout of a Signed BINARY Field*

Format

```
<BINARY> ::=
  BINARY
  <BINARY attributes list>
  [<WHEN clause>]
<BINARY attributes list> ::=
  {
    <BINARY defaulted attributes list>
    <BINARY optional attributes list>
  }!
<BINARY defaulted attributes list> ::=
  {
    [<BYTRVS attribute>]
    [<COMPLEX attribute>]
    [<CONSTRAINED attribute>]
    [<FIT attribute>]
    [<PRECISION attribute>]
    [<RADIX attribute>]
    [<SCALE attribute>]
    [<SGNCNV attribute>]
    [<SIGNED attribute>]
  }!
<BINARY optional attributes list> ::=
  {
    [<HELP attribute>]
    [LENGTH({1..64 | <constant identifier>})]
    [<NOTE attribute>]
    [<TITLE attribute>]
  }!
```

Syntax Rules

1. The attributes of the <BINARY defaulted attributes list> shall be specified in the BINARY <DEFAULT statement> or the <BINARY> <data declaration statement>.
2. For RADIX(2) fields:
   - The negative of SCALE shall specify the scaling factor of the field as a power of 2.
   - If SIGNED(TRUE) is specified, PRECISION shall be in the range from 0 to the (LENGTH - 1).
   - If SIGNED(FALSE) is specified, PRECISION shall be in the range from 1 to the LENGTH.
   - LENGTH shall be greater than or equal to the PRECISION.
3. For RADIX(10) fields :
   - The negative of SCALE shall specify the scaling factor of the field as a power of 10.
   - If SIGNED(TRUE) is specified, PRECISION shall be in the range from 1 to the FLOOR((LENGTH-1)/3.32).
   - If SIGNED(FALSE) is specified, PRECISION shall be in the range from 1 to the FLOOR(LENGTH/3.32).
   - LENGTH shall be greater than or equal to the CEIL(PRECISION * 3.32).

General Rules

1. If the <LENGTH attribute> is not specified, it shall be determined from the specified PRECISION:

```
                   Unsigned BINARY Numbers
RADIX(10) PRECISION   RADIX(2) PRECISION        LENGTH
-------------------   ------------------      -----------
      1 - 4                1 - 16                 16
      5 - 9               17 - 32                 32
     10 - 19              33 - 64                 64
                    Signed BINARY Numbers
RADIX(10) PRECISION   RADIX(2) PRECISION        LENGTH
-------------------   ------------------      -----------
      1 - 4                0 - 15                 16
      5 - 9               16 - 31                 32
     10 - 18              32 - 63                 64
```

2. For RADIX(10), the number of bits required to encode the specified number of significant digits shall be determined by the CEIL(PRECISION * 3.32).
3. If BYTRVS(TRUE) is specified, the field shall be aligned on a byte boundary.

Examples: In the following examples, the bits of a BINARY field are defined by s = sign bit
o = overflow bit
p = precision bit

*RADIX(2) Examples*

1. Signed RADIX(2) BINARY field:

```
DEFAULT BINARY BYTRVS(FALSE) COMPLEX(FALSE) CONSTRAINED(FALSE)
               RADIX(2) SCALE(0) SIGNED(TRUE) PRECISION(31)
               SGNCNV(ALGEBRAIC) FIT(ROUND);
x: BINARY PRECISION(15);
bit |s|p|p|p|p|p|p|p|p|p|p|p|p|p|p|p|
    |1|1|1|1|1|1|1|1|1|1|1|1|0|0|0|0|

Field Low Bound  = -32768
Field High Bound = 32767
Scale Factor     = 2**(-0) = 1
Stored Value     = x'FFF0' = -16
Actual Value     = -16 * 1 = -16
```

2. Unsigned RADIX(2) BINARY field:

```
DEFAULT BINARY BYTRVS(FALSE) COMPLEX(FALSE) CONSTRAINED(FALSE)
               RADIX(2) SCALE(0) SIGNED(TRUE) PRECISION(31)
               SGNCNV(ALGEBRAIC) FIT(ROUND);
x: BINARY PRECISION(16) SIGNED(FALSE);
bit |p|p|p|p|p|p|p|p|p|p|p|p|p|p|p|p|
    |1|1|1|1|1|1|1|1|1|1|1|1|0|0|0|0|

Field Low Bound  = 0
Field High Bound = 65535
Scale Factor     = 2**(-0) = 1
Stored Value     = x'FFF0' = 65,520
Actual Value     = 65,520 * 1 = 65,520
```

3. Signed RADIX(2) BINARY field with precision less than length. The overflow bits in this field cannot be used to store significant digits.

```
DEFAULT BINARY BYTRVS(FALSE) COMPLEX(FALSE) CONSTRAINED(FALSE)
               RADIX(2) SCALE(0) SIGNED(TRUE) PRECISION(31)
               SGNCNV(ALGEBRAIC) FIT(ROUND);
x: BINARY PRECISION(11) CONSTRAINED(TRUE);
bit |s|o|o|o|o|p|p|p|p|p|p|p|p|p|p|p|
    |0|0|0|0|0|1|1|1|1|1|0|0|0|1|1|0|

Field Low Bound  = -2048
Field High Bound = 2047
Scale Factor     = 2**(-0) = 1
Stored Value     = x'07C6' = 1,990
Actual Value     = 1,990 * 1 = 1,990
```

4. Unsigned RADIX(2) BINARY field with precision less than length. The overflow bits in this field can be used to store significant digits.

```
DEFAULT BINARY BYTRVS(FALSE) COMPLEX(FALSE) CONSTRAINED(FALSE)
               RADIX(2) SCALE(0) SIGNED(TRUE) PRECISION(31)
               SGNCNV(ALGEBRAIC) FIT(ROUND);
X: BINARY PRECISION(11) SCALE(5) SIGNED(FALSE);
bit |o|o|o|o|o|p|p|p|p|p|p|p|p|p|p|p|
    |0|0|0|0|0|0|0|0|1|0|1|1|0|0|0|0|

Field Low Bound  = 0
Field High Bound = 2047.96875
Scale Factor     = 2**(-5) = 0.03125
Stored Value     = x'0B0' = 176
Actual Value     = 176 * 0.03125 = 5.50000
```

5. Unsigned RADIX(2) BINARY number with precision less than length and scale greater than precision. The overflow bits in this field can be used to store significant digits.

```
DEFAULT BINARY BYTRVS(FALSE) COMPLEX(FALSE) CONSTRAINED(FALSE)
               RADIX(2) SCALE(0) SIGNED(TRUE) PRECISION(31)
               SGNCNV(ALGEBRAIC) FIT(ROUND);
X: BINARY PRECISION(6) SCALE(8);
bit |s|o|o|o|o|o|o|o|o|o|p|p|p|p|p|p|
    |1|1|1|0|1|0|0|0|1|0|1|1|0|0|0|0|

Field Low Bound  = -128.00000000
Field High Bound = 127.99609375
Scale Factor     = 2**(-8) = 0.00390625
Stored Value     = x'E8B0' = -5968
Actual Value     = -(5968 * 0.00390625) = -23.31250000
```

*RADIX(10) Examples*

1. Signed RADIX(10) BINARY field with a scale less than zero.

```
DEFAULT BINARY BYTRVS(FALSE) COMPLEX(FALSE) CONSTRAINED(FALSE)
              RADIX(2) SCALE(0) SIGNED(TRUE) PRECISION(31)
              SGNCNV(ALGEBRAIC) FIT(ROUND);
X: BINARY PRECISION(3) LENGTH(16) SCALE(-4)
         RADIX(10) CONSTRAINED(TRUE);
bit
    |s|o|o|o|o|o|p|p|p|p|p|p|p|p|p|p|
    |0|0|0|0|0|0|0|0|0|1|0|0|0|0|0|0|

Field Low Bound  = -9990000
Field High Bound = 9990000
Scale Factor     = 10**(-(-4)) = 10000
If x is assigned the actual value 640000 decimal, then
stored_integer_value = actual_value * RADIX**SCALE
stored_integer_value = 640000 * 10-4 = 64
stored_integer_value = 64 = x'0040'
Actual Value     = stored_integer_value * scale_factor
Actual Value     = 64 * 10000 = 640000
```

2. Signed RADIX(10) BINARY field with scale greater than zero.

```
DEFAULT BINARY BYTRVS(FALSE) COMPLEX(FALSE) CONSTRAINED(FALSE)
              RADIX(2) SCALE(0) SIGNED(TRUE) PRECISION(31)
              SGNCNV(ALGEBRAIC) FIT(ROUND);
X: BINARY LENGTH(16) PRECISION(4) SCALE(2)
         RADIX(10) CONSTRAINED(TRUE);
bit
    |s|o|p|p|p|p|p|p|p|p|p|p|p|p|p|p|
    |0|0|0|0|0|0|0|0|0|1|1|0|0|0|1|1|

Field Low Bound  = -99.99
Field High Bound = 99.99
Scale Factor     = 10**(-(2)) = 0.01
If x is assigned the actual value 0.99 decimal, then
stored_integer_value = actual_value * RADIX**SCALE
stored_integer_value = 0.99 * 10**2 = 99
stored_integer_value = 99 = x'0063'
Actual Value     = stored_integer_value * scale_factor
Actual Value     = 99 * 0.01 = 0.99
```

<BIT>

Function: Declare an instance of the BIT string type.

The length of a BIT string in bits is specified by the LENGTH attribute. The first bit is at ordinal position 1, and the last bit is at the ordinal position specified by the LENGTH attribute. The value of the LENGTH attribute can be specified by an integer literal or by reference to another field. If specified by an integer literal, all instances of the variable are of the same length. But if specified by reference to another field, then each instance can be of a different length. In this case, however, the maximum length of the string must also be specified, along with an indication of whether storage has been allocated for the maximum length or only for the current length.

Format

```
<BIT> ::=
  BIT
  <BIT attributes list>
  [<WHEN clause>]
```

```
<BIT attributes list> ::=
  {
    <BIT defaulted attributes list>
    <BIT optional attributes list>
  }!
<BIT defaulted attributes list> ::=
  [LENGTH({1..<max34> | <constant identifier>})] |
  [
    LENGTH(*)
    MAXLEN({1..<max34> | <constant identifier>})
  ]! |
  [
    LENGTH(<qualified identifier>)
    <MAXALC attribute>
    MAXLEN({1..<max34> | <constant identifier>})
  ]!
<BIT optional attributes list> ::=
  {
    [<HELP attribute>]
    [<NOTE attribute>]
    [<TITLE attribute>]
  }!
```

Syntax Rules

1. The attributes of the <BIT defaulted attributes list> shall be specified in the BIT <DEFAULT statement> or the <BIT> <data declaration statement>.
2. If LENGTH(<qualified identifier>) is specified, the referenced field shall be BINARY, PACKED, or ZONED with SCALE(0) and COMPLEX(FALSE) and a maximum value of <max34>.
3. LENGTH(*) shall be specified only for the last element of all containing <constructor>s.
4. LENGTH(*) shall not be specified for any element of an ARRAY.

General Rules

1. If LENGTH(*) is specified, the length shall be from the current position to the end of the data.
2. The minimum alignment of a BIT field shall be bit alignment.

Examples

1. Declare a mask of 5 bits that is located in the next byte:

```
DEFAULT BIT LENGTH(1);
a: SEQUENCE LENGTH(16)
   BEGIN;
     field: BIT LENGTH(3);
     SKIP(5);
     mask: BIT LENGTH(5);
   END;
```

```
        <---------------------------- a ------------------------------>
        <- field -> <-- skipped bits --> <---- mask ---->
bit    | 0 | 1 | 2 | 3 | 4 | 5 | 6 | 7 | 0 | 1 | 2 | 3 | 4 | ... |
byte    1                               2                         3
```

2. Declare a mask of 4 bits that is located following the last bit of the preceding field:

```
DEFAULT BIT LENGTH(1);
b: SEQUENCE LENGTH(8)
   BEGIN;
     field: BIT LENGTH(3);
     mask: BIT LENGTH(4);
   END;
```

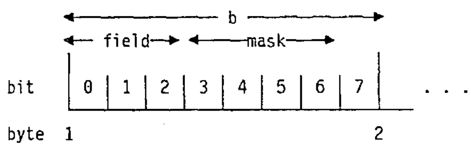

3. Declare flags of three bits that is located following the last bit of the preceding field. Note that two slack bits follow flags since the stuff field consists of characters represented by bytes.

```
DEFAULT BIT LENGTH(1);
DEFAULT CHAR CCSID(0) LENGTH(1) JUSTIFY(LEFT) UNITLEN(8);
DEFAULT BINARY BYTRVS(FALSE) COMPLEX(FALSE) CONSTRAINED(FALSE)
               RADIX(2) SCALE(0) SIGNED(TRUE) PRECISION(31)
               SGNCNV(ALGEBRAIC) FIT(ROUND);
ControlBlock: SEQUENCE
   TITLE('This is a dummy control block')
   BEGIN;
      count: BINARY PRECISION(3) LENGTH(3) SIGNED(FALSE);
      flags: BIT LENGTH(3);
      SKIP(2);
      stuff: CHAR LENGTH(8);
   END;
```

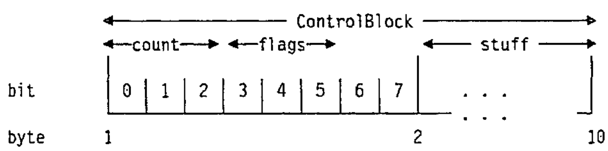

---

<BITPRE>

Function: Declare an instance of the BITPRE type, a varying-length bit string with a signed BINARY prefix.

Since each instance can be a different length, the maximum length of the BITPRE string must also be specified, along with an indication of whether storage has been allocated for the maximum length or only for the current length.

Format

```
<BITPRE> ::=
  BITPRE
  <BITPRE attributes list>
  [<WHEN clause>]
```

```
<BITPRE attributes list> ::=
  {
    <BITPRE defaulted attributes list>
    <BITPRE optional attributes list>
  }!
<BITPRE defaulted attributes list> ::=
  {
    [<MAXALC attribute>]
    [<MAXLEN attribute>]
    [<PREBYTRVS attribute>]
    [<PRELEN attribute>]
  }!
<BITPRE optional attributes list> ::=
  {
    [<HELP attribute>]
    [<NOTE attribute>]
    [<TITLE attribute>]
  }!
```

Syntax Rules: The attributes of the <BITPRE defaulted attributes list> shall be specified in the BITPRE <DEFAULT statement> or the <BITPRE> <data declaration statement>.

General Rules

1. The actual length in bits of the varying length bit string shall be specified by the length prefix integer that immediately precedes the bit string.
2. The amount of space for a BITPRE field with MAXALC(TRUE) shall be MAXLEN + PRELEN.
3. The amount of space for a BITPRE field with MAXALC(FALSE) shall be PRELEN + the actual length of the bit string.
4. The maximum length of a BITPRE field shall be ((2**PRELEN-1)-1) bits.
5. The minimum alignment of a BITPRE field shall be bit alignment.

Examples: Declare X to be a varying length bit string with a maximum length of 128 bits in which space will only be allocated for the current instance.

```
DEFAULT BITPRE MAXALC(TRUE) PREBYTRVS(FALSE) PRELEN(16) MAXLEN(8);
X: BITPRE MAXLEN(128) MAXALC(FALSE);
```

---

<BOOLEAN>

Function: Declare an instance of the BOOLEAN type.

Format

```
<BOOLEAN> ::=
  BOOLEAN
  <BOOLEAN attributes list>
  [<WHEN clause>]
<BOOLEAN attributes list> ::=
  {
    <BOOLEAN defaulted attributes list>
    <BOOLEAN optional attributes list>
  }!
```

```
<BOOLEAN defaulted attributes list> ::=
  {
    [<BLNENC attribute>]
    [<BYTRVS attribute>]
    [LENGTH({1..64 | <constant identifier>})]
  }!
<BOOLEAN optional attributes list> ::=
  {
    [<HELP attribute>]
    [<NOTE attribute>]
    [<TITLE attribute>]
  }!
```

Syntax Rules: The attributes of the <BOOLEAN defaulted attributes list> shall be specified in the BOOLEAN <DEFAULT statement> or the <BOOLEAN> <data declaration statement>.

General Rules: If BYTRVS(TRUE) is specified, the field shall be aligned on a byte boundary.

Examples: Declare `living` to be a BOOLEAN value where TRUE is encoded in a 32 bit string:

```
DEFAULT BOOLEAN BLNENC(LSTBIT) BYTRVS(FALSE) LENGTH(8);
living: BOOLEAN LENGTH(32);
```

---

<CASE>

Function: Declare an instance of the CASE type, an ordered collection of selections for the declaration of data.

Format

```
<CASE> ::=
  CASE
  <CASE attributes list>
  [<WHEN clause>]
  <BEGIN statement>
    <WHEN statement>...
    [<OTHERWISE statement>]
  <END statement>
<CASE attributes list> ::=
  {
    <CASE defaulted attributes list>
    <CASE optional attributes list>
  }!
<CASE defaulted attributes list> ::=
  [<MAXALC attribute>]
<CASE optional attributes list> ::=
  {
    [<LENGTH attribute>]
    [<HELP attribute>]
    [<NOTE attribute>]
    [<TITLE attribute>]
  }!
```

```
DEFAULT CHAR CCSID(0) LENGTH(1) JUSTIFY(LEFT) UNITLEN(8);
DEFAULT CASE MAXALC(TRUE);
DEFAULT BINARY BYTRVS(FALSE) COMPLEX(FALSE) CONSTRAINED(FALSE)
               RADIX(2) SCALE(0) SIGNED(TRUE) PRECISION(31)
               SGNCNV(ALGEBRAIC) FIT(ROUND);
DEFAULT BOOLEAN BLNENC(LSTBIT) BYTRVS(FALSE) LENGTH(8);
DEFAULT FLOAT FORM(FB32) BYTRVS(FALSE) COMPLEX(FALSE) RADIX(2)
              FIT(ROUND);
  Y: SEQUENCE
     BEGIN;
     a: CHAR;
     b: BOOLEAN;
     CASE BEGIN;
        c1: WHEN a = '1'
            THEN c: CHAR LENGTH(4);
        c2: WHEN b = 01
            THEN d: BINARY SCALE(5) PRECISION(15);
            OTHERWISE e: FLOAT;
          END;
     END;
```

3. Declare a sequence that has a discriminant field named a.

Note: There is no declaration for the first <WHEN statement>. If this first <WHEN statement> evaluates to true, c1 results in a null declaration.

```
DEFAULT CASE MAXALC(TRUE);
DEFAULT BINARY BYTRVS(FALSE) COMPLEX(FALSE) CONSTRAINED(FALSE)
               RADIX(2) SCALE(0) SIGNED(TRUE) PRECISION(31)
               SGNCNV(ALGEBRAIC) FIT(ROUND);
DEFAULT CHAR CCSID(0) LENGTH(1) JUSTIFY(LEFT) UNITLEN(8);
DEFAULT FLOAT FORM(FB32) BYTRVS(FALSE) COMPLEX(FALSE) RADIX(2)
              FIT(ROUND);
  Y: SEQUENCE
     BEGIN;
     a: CHAR;
     CASE BEGIN;
        c1: WHEN a = '1'
            THEN ;
        c2: WHEN a = '4'
            THEN d: BINARY SCALE(5) PRECISION(15);
            OTHERWISE e: FLOAT;
          END;
     END;
```

4. Declare a case with a discriminant field that is dependent on itself:

Syntax Rules

1. The attributes of the <CASE defaulted attributes list> shall be specified in the CASE <DEFAULT statement> or the <CASE> <data declaration statement>.
2. The <LENGTH attribute> shall be specified if the space occupied by the <CASE> exceeds the space occupied by any of the alternatives of the <CASE>.

General Rules

1. The <condition>s of the <WHEN statement>s of the CASE shall be evaluated in the order in which the <WHEN statement>s are specified within the <CASE>. When the evaluation of one of them returns TRUE, the <THEN clause> of that <WHEN statement> shall be selected. All subsequent <WHEN statement>s and the <OTHERWISE statement> in the CASE declaration shall be ignored.
2. If no <WHEN clause> evaluates to TRUE, the <OTHERWISE statement> shall be selected.
3. A null data declaration exists if there is no data to describe. A CASE shall result in a null data declaration if one of the following is selected:
   a. THEN <terminator>.
   b. OTHERWISE <terminator>.
   c. OTHERWISE <SKIP statement>.
   d. All <WHEN statement>s evaluating to FALSE and no <OTHERWISE statement>.
4. If MAXALC(TRUE) is specified, space shall be allocated to hold the largest variant.
5. If MAXALC(FALSE) is specified, space shall be allocated to hold the selected variant.
6. If MAXALC(TRUE) is specified, space for the largest variant is allocated which can be the number of bits specified in the <SKIP statement>.

Examples

1. Declare a sequence that has a discriminant field named a and variant fields whose declaration depends on the value of a.

```
DEFAULT CASE MAXALC(TRUE);
DEFAULT BINARY BYTRVS(FALSE) COMPLEX(FALSE) CONSTRAINED(FALSE)
               RADIX(2) SCALE(0) SIGNED(TRUE) PRECISION(31)
               SGNCNV(ALGEBRAIC) FIT(ROUND);
DEFAULT CHAR CCSID(0) LENGTH(1) JUSTIFY(LEFT) UNITLEN(8);
DEFAULT FLOAT FORM(FB32) BYTRVS(FALSE) COMPLEX(FALSE) RADIX(2)
              FIT(ROUND);
  x: SEQUENCE
     BEGIN;
     a: CHAR;
     CASE BEGIN;
       c1:  WHEN a = '1'
            THEN w: CHAR LENGTH(4);
       c2:  WHEN a = '2'
            THEN x: BINARY SCALE(5) PRECISION(15);
            OTHERWISE y: FLOAT;
          END;
     END;
```

2. Declare a sequence that has 2 discriminant fields (a and b).

<CHAR>

Function: Declare an instance of the CHAR type, a string of characters.

The length of a CHAR field can be specified directly by the <LENGTH attribute> or indirectly by the <LOW attribute> and the <HIGH attribute>. The unit of measure for a CHAR field is characters; the UNITLEN attribute specifies the number of bits per character (8 or 16).

Every character occupied by a CHAR field is assigned an ordinal number by which it can be referenced (by the SUBSTR function, for example). If LOW and HIGH are specified, they determine the range of these ordinal numbers. Otherwise, the first character has an ordinal number of 1, which is increased by 1 for successive characters, up to the value of LENGTH.

In either case, the attribute values can be specified by an integer literal or by reference to another field. If specified by an integer literal, all instances of the variable are of the same length. But if specified by reference to another field, then each instance can be of a different length. In this case, however, the maximum length of the string must also be specified, along with an indication of whether storage has been allocated for the maximum length or only for the current length.

Characters are encoded in the string as specified by the Coded Character Set Identifier (CCSID) attribute. For each CCSID, the IBM Character Data Representation Architecture (CDRA) defines what characters can be encoded and how they are encoded. A variety of Single-Byte, Double-Byte, and Mixed character sets are accommodated by CDRA.

Format

```
<CHAR> ::=
  CHAR
  <CHAR attributes list>
  [<WHEN clause>]
<CHAR attributes list> ::=
  {
    <CHAR defaulted attributes list>
    <CHAR optional attributes list>
  }!
<CHAR defaulted attributes list> ::=
  {
    [<CCSID attribute>]
    [<JUSTIFY attribute>]
    <CHAR length attributes list>
  }!
<CHAR length attributes list> ::=
  [
    <CHAR LENGTH asterisk attributes list> |
    <CHAR LENGTH fixed attributes list> |
    <CHAR LENGTH identifier attributes list> |
    <CHAR HIGHLOW1 attributes list> |
    <CHAR HIGHLOW2 attributes list> |
    <CHAR HIGHLOW3 attributes list> |
    <CHAR HIGHLOW4 attributes list>
  ]
```

```
<CHAR LENGTH asterisk attributes list> ::=
  [
    LENGTH(*)
    MAXLEN({1..<max CHAR> | <constant identifier>})
    UNITLEN({8 | 16 | <constant identifier>})
  ]!
<CHAR length fixed attributes list> ::=
  [
    LENGTH({1..<max CHAR> | <constant identifier>})
    UNITLEN({8 | 16 | <constant identifier>})
  ]!
<CHAR LENGTH identifier attributes list> ::=
  [
    LENGTH(<qualified identifier>)
    <MAXALC attribute>
    MAXLEN({1..<max CHAR> | <constant identifier>})
    UNITLEN({8 | 16 | <constant identifier>})
  ]!
<CHAR HIGHLOW1 attributes list> ::=
  [
    HIGH({1..<max CHAR> | <constant identifier>})
    LOW({1..<max CHAR> | <constant identifier>})
    UNITLEN({8 | 16 | <constant identifier>})
  ]!
<CHAR HIGHLOW2 attributes list> ::=
  [
    HIGH({1..<max CHAR> | <constant identifier>})
    LOW(<qualified identifier>)
    <MAXALC attribute>
    MAXLEN({1..<max CHAR> | <constant identifier>})
    UNITLEN({8 | 16 | <constant identifier>})
  ]!
<CHAR HIGHLOW3 attributes list> ::=
  [
    HIGH(<qualified identifier>)
    LOW({1..<max CHAR> | <constant identifier>})
    <MAXALC attribute>
    MAXLEN({1..<max CHAR> | <constant identifier>})
    UNITLEN({8 | 16 | <constant identifier>})
  ]!
<CHAR HIGHLOW4 attributes list> ::=
  [
    HIGH(<qualified identifier>)
    LOW(<qualified identifier>)
    <MAXALC attribute>
    MAXLEN({1..<max CHAR> | <constant identifier>})
    UNITLEN({8 | 16 | <constant identifier>})
  ]!
<CHAR optional attributes list> ::=
  {
    [<HELP attribute>]
    [<NOTE attribute>]
    [<TITLE attribute>]
  }!
```

```
<max CHAR> ::=
  See Syntax Rule 3 on page 75.
```

Syntax Rules

1. The attributes of the <CHAR defaulted attributes list> shall be specified in the CHAR <DEFAULT statement> or the <CHAR> <data declaration statement>.
2. HIGH shall be greater than or equal to the LOW.
3. The LENGTH or MAXLEN of a CHAR field is specified in terms of units whose length in bits is specified by UNITLEN. The length of a CHAR field in bits is determined by (LENGTH * UNITLEN), and the greatest value that can be specified for LENGTH is determined by (<max34> / UNITLEN). The maximum length of a CHAR field in bits is determined by (MAXLEN * UNITLEN), and the greatest value that can be specified for MAXLEN is determined by (<max34> / UNITLEN).
4. If a <qualified identifier> is specified for the <LENGTH attribute>, <HIGH attribute>, or <LOW attribute>, the referenced field shall be BINARY, PACKED, or ZONED with SCALE(0) and COMPLEX(FALSE) and with a maximum value of <max CHAR>.
5. LENGTH(*) shall be specified only for the last element of all containing <constructor>s.
6. LENGTH(*) shall not be specified for any element of an ARRAY.

General Rules

1. If the <CCSID attribute> is specified, it applies only to the field being described and not to the attributes of the field being declared.
2. If LENGTH(*) is specified, the length of the CHAR field in bits shall be the number of bits from the position of the CHAR field in the data to the end of the data.
3. The minimum alignment of a CHAR field is byte alignment.
4. If the <LOW attribute> and <HIGH attribute> are specified, the length in bits of the CHAR field equals

   ```
   ((HIGH - LOW + 1) * UNITLEN).
   ```

Examples

1. Declare lastname to be a character string of length (20) that is encoded as defined by CCSID 500.

   ```
   DEFAULT CHAR CCSID(0) LENGTH(1) JUSTIFY(LEFT) UNITLEN(8);
   lastname: CHAR LENGTH(20) CCSID(500);
   ```

2. Declare stretch to be a character string that begins at position 15 and ends at position 300.

   ```
   DEFAULT CHAR CCSID(0) LENGTH(1) JUSTIFY(LEFT) UNITLEN(8);
   stretch: CHAR HIGH(300) LOW(15);
   ```

3. Declare a to be a character string that begins and ends at positions defined with reference fields.

```
DEFAULT CASE MAXALC(TRUE);
DEFAULT BINARY BYTRVS(FALSE) COMPLEX(FALSE) CONSTRAINED(FALSE)
               RADIX(2) SCALE(0) SIGNED(TRUE) PRECISION(31)
               SGNCNV(ALGEBRAIC) FIT(ROUND);
DEFAULT CHAR CCSID(0) LENGTH(1) JUSTIFY(LEFT) UNITLEN(8);
ValidCase: CASE
           BEGIN;
           c1: WHEN x.a = '1'
               THEN x: SEQUENCE
                       BEGIN;
                         a: CHAR;
                         b: BINARY PRECISION(15);
                       END;
           c2: WHEN y.a = '2'
               THEN y: SEQUENCE
                       BEGIN;
                         a: CHAR;
                         b: CHAR LENGTH(2);
                       END;
           END;
```

5. The following references to x.c1.b are INVALID because they depend on the value of discriminant a to determine the value of x.c1.b:

```
DEFAULT CASE MAXALC(TRUE);
DEFAULT BINARY BYTRVS(FALSE) COMPLEX(FALSE) CONSTRAINED(FALSE)
               RADIX(2) SCALE(0) SIGNED(TRUE) PRECISION(31)
               SGNCNV(ALGEBRAIC) FIT(ROUND);
DEFAULT CHAR CCSID(0) LENGTH(1) JUSTIFY(LEFT) UNITLEN(8);
DEFAULT FLOAT FORM(FB32) BYTRVS(FALSE) COMPLEX(FALSE) RADIX(2)
              FIT(ROUND);
s: SEQUENCE
   BEGIN;
     a: CHAR;
     x: CASE
        BEGIN;
        c1: WHEN a = '1'
            THEN b: BINARY PRECISION(15);
        c2: WHEN a = '2'
            THEN c: FLOAT;
        END;
     y: CASE
        BEGIN;
        c1: WHEN x.c1.b = 1
            THEN y: SEQUENCE
                    BEGIN;
                      a: CHAR;
                      b: BINARY PRECISION(15);
                    END;
        c2: WHEN x.c1.b = 2
            THEN z: SEQUENCE
                    BEGIN;
                      a: CHAR;
                      b: CHAR LENGTH(2);
                    END;
        END;
   END;
```

```
DEFAULT BINARY BYTRVS(FALSE) COMPLEX(FALSE) CONSTRAINED(FALSE)
               RADIX(2) SCALE(0) SIGNED(TRUE) PRECISION(31)
               SGNCNV(ALGEBRAIC) FIT(ROUND);
DEFAULT PACKED COMPLEX(FALSE) CONSTRAINED(FALSE) SIGNED(TRUE)
               SCALE(0) SGNLOC(DGTLSTBYT) SGNMNS(x'D')
               SGNPLS(x'C') PRECISION(15) FIT(ROUND);
DEFAULT CHAR CCSID(0) LENGTH(1) JUSTIFY(LEFT) UNITLEN(8);
a: SEQUENCE
   BEGIN;
     b: BINARY;
     c: PACKED;
     d: CHAR HIGH(b) LOW(c) MAXLEN(100);
   END;
```

<CHARPRE>

Function: Declare an instance of the CHARPRE type, a varying length string of characters with a signed BINARY length prefix.

Figure 7 shows the possible representations of CHARPRE strings.

Since each instance can be a different length, the maximum length of the CHARPRE string must also be specified, along with an indication of whether storage has been allocated for the maximum length or only for the current length. The characters of the string are encoded as specified by the CCSID attribute.

```
Varying Length with prefix length and MAXALC(FALSE)
   previous field |lpccccccccccccccccccccccccccc|

Varying Length with prefix length and MAXALC(TRUE)
   previous field |lpcccccccccccccccccccccccccccc????????| next field

LEGEND:
   ccc... specifies a string of characters
   lp     specifies a length prefix
   ???... specifies a string of unused bytes
```

*Figure 7. Varying Length Character Strings with Length Prefixes*

Format

```
<CHARPRE> ::=
  CHARPRE
  <CHARPRE attributes list>
  [<WHEN clause>]
<CHARPRE attributes list> ::=
  {
    <CHARPRE defaulted attributes list>
    <CHARPRE optional attributes list>
  }!
```

```
<CHARPRE defaulted attributes list> ::=
  {
    [<CCSID attribute>]
    [<MAXALC attribute>]
    [
      MAXLEN
        ({
          1..<max CHARPRE> |
          <constant identifier>
        })
    ]
    [<PREBYTRVS attribute>]
    [<PRELEN attribute>]
    [UNITLEN({8 | 16 | <constant identifier>})]
  }!
<CHARPRE optional attributes list> ::=
  {
    [<HELP attribute>]
    [<NOTE attribute>]
    [<TITLE attribute>]
  }!
<max CHARPRE> ::=
  See Syntax Rule 3.
```

Syntax Rules

1. The attributes of the <CHARPRE defaulted attributes list> shall be specified in the CHARPRE <DEFAULT statement> or the <CHARPRE> <data declaration statement>.
2. The <MAXLEN attribute> shall not include the length of the prefix.
3. The MAXLEN of a CHARPRE field is specified in terms of units whose length in bits is specified by UNITLEN. The maximum length of a CHARPRE field in bits is determined by (MAXLEN * UNITLEN), and the greatest value that can be specified for MAXLEN is determined by (2**(PRELEN-1)-1).

General Rules

1. If the <CCSID attribute> is specified, it applies only to the value of the field being described and not to the attributes of the field being declared.
2. The value of the prefix shall not include the length of the prefix.
3. If MAXALC(TRUE) is specified, the actual length in bits of the data portion of a CHARPRE field shall be determined by (MAXLEN * UNITLEN). If the prefix value is less than MAXLEN, trailing bytes exist after the active data.
4. If MAXALC(FALSE) is specified, the actual length in bits of the data portion of a CHARPRE field shall be determined by the value in the prefix times UNITLEN.
5. The minimum alignment of a CHARPRE field is byte alignment.

Examples: Declare TextField to be a varying length character string with a maximum length of 32767 characters. The character string is prefixed by a length field that specifies the actual length of the character string. Only space for the actual number of characters is allocated.

```
DEFAULT CHARPRE CCSID(0) MAXALC(TRUE) PREBYTRVS(FALSE)
                PRELEN(16) MAXLEN(1) UNITLEN(8);
TextField: CHARPRE MAXLEN(32767) MAXALC(FALSE);
```

<CHARSFX>

Function: Declare an instance of the CHARSFX type, a varying length character string that is terminated by a suffix.

Since each instance can be a different length, the maximum length of the CHARSFX string must also be specified, along with an indication of whether storage has been allocated for the maximum length or only for the current length. The characters of the string are encoded as specified by the CCSID attribute.

Figure 8 shows the possible representations of CHARSFX strings.

```
Varying Length with suffix and MAXALC(FALSE)
   previous field |cccccccccccccccccccccccccccccs|

Varying Length with suffix and MAXALC(TRUE)
   previous field |ccccccccccccccccccccccccccccccs???????| next field

LEGEND:
   ccc... specifies a string of characters
   s      specifies a suffix
   ???... specifies a string of unused bytes
```

*Figure 8. Varying Length Character Strings with a Suffix*

Format

```
<CHARSFX> ::=
  CHARSFX
  <CHARSFX attributes list>
  [<WHEN clause>]
<CHARSFX attributes list> ::=
  {
    <CHARSFX defaulted attributes list>
    <CHARSFX optional attributes list>
  }!
<CHARSFX defaulted attributes list> ::=
  {
    [<CCSID attribute>]
    [<MAXALC attribute>]
    [
      MAXLEN
        ({
          1..<max CHARSFX> |
          <constant identifier>
        })
    ]
    [<SFXENC attribute>]
    [UNITLEN({8 | 16 | <constant identifier>})]
  }!
```

```
<CHARSFX optional attributes list> ::=
  {
    [<HELP attribute>]
    [<NOTE attribute>]
    [<TITLE attribute>]
  }!
<max CHARSFX> ::=
  See Syntax Rule 3.
```

Syntax Rules

1. The attributes of the <CHARSFX defaulted attributes list> shall be specified in the CHARSFX <DEFAULT statement> or the <CHARSFX> <data declaration statement>.
2. The <MAXLEN attribute> specified shall include the length of the suffix.
3. The MAXLEN of a CHARSFX field is specified in terms of units whose length in bits is specified by UNITLEN. The maximum length of a CHARSFX field in bits is determined by (MAXLEN * UNITLEN), and the greatest value that can be specified for MAXLEN is determined by (<max34> / UNITLEN).

General Rules

1. If the <CCSID attribute> is specified, it applies only to the value of the field being described and not to the attributes of the field being declared.
2. The actual length in bits of the data portion of a CHARSFX field shall be determined by the number of bytes encountered prior to the suffix times 8.
3. The minimum alignment of a CHARSFX field is byte alignment.

Examples: Declare DataLine to be a varying length character string with a maximum length of 100 characters.

Note: The storage allocation for this string is 101 bytes.

```
DEFAULT CHARSFX CCSID(0) MAXALC(TRUE) SFXENC(x'00') MAXLEN(1)
                UNITLEN(8);
DataLine: CHARSFX MAXLEN(101);
```

---

<ENUMERATION>

Function: Declare a set of identifiers to be associated with constant integers.

Format

```
<ENUMERATION> ::=
  ENUMERATION
  <ENUMERATION attributes list>
  [<WHEN clause>]
  <enumeration list>
<ENUMERATION attributes list> ::=
  {
    <ENUMERATION defaulted attributes list>
    <ENUMERATION optional attributes list>
  }!
```

```
<ENUMERATION defaulted attributes list> ::=
  {
    [<BYTRVS attribute>]
    [LENGTH({8 | 16 | 32 | <constant identifier>})&rbr  k.
    [<SGNCNV attribute>]
    [<SIGNED attribute>]
  }!
<ENUMERATION optional attributes list> ::=
  {
    [<HELP attribute>]
    [<NOTE attribute>]
    [<TITLE attribute>]
  }!
<enumeration list> ::=
  (<enumeration value>[, <enumeration value>]...)
<enumeration value> ::=
  <enumeration identifier>[:<signed integer>]
<enumeration identifier> ::=
  <identifier>
```

Syntax Rules

1. The attributes of the <ENUMERATION defaulted attributes list> shall be specified in the ENUMERATION <DEFAULT statement> or the <ENUMERATION> <data declaration statement>.
2. If a <signed integer> is not specified for the first <enumeration value>, a value of 0 is assumed.
3. If a <signed integer> is not specified for a subsequent <enumeration value>, a value of 1 plus the value of the previous <enumeration value> is assumed.
4. The range of enumerated values is:

*Table 2. Range of Enumerated Values*

| LENGTH | SIGNED | PRECISION | MINIMUM | MAXIMUM |
|---|---|---|---|---|
| 8 | TRUE | 7 | -128 | +127 |
| 8 | FALSE | 8 | 0 | 255 |
| 16 | TRUE | 15 | -32768 | +32767 |
| 16 | FALSE | 16 | 0 | 65535 |
| 32 | TRUE | 31 | -2,147,483,648 | +2,147,483,647 |
| 32 | FALSE | 32 | 0 | 4,294,967,295 |

General Rules

1. The value of each <enumeration identifier> shall be of the BINARY type with SCALE(0) and COMPLEX(FALSE).
2. The minimum alignment of an ENUMERATION field is byte alignment.

Examples

1. Declare color to be an enumeration consisting of red, green, blue, and yellow:

```
color: ENUMERATION(red, green, blue, yellow);
```

```
The values associated with each are:
red = 0, green = 1, blue = 2, yellow = 3
```

2. Declare `animals` to be an enumeration consisting of cat, dog, monkey, elephant where monkey is to take on the value of 4:

`animal: ENUMERATION(cat, dog, monkey:4, elephant);`

The values associated with each are: cat = 0, dog = 1, monkey = 4, elephant = 5

3. Declare `family` to be an enumeration consisting of grandmother, mother, me, daughter, and granddaughter, zeroed on me:

`family: ENUMERATION(grandmother:-2, mother, me, daughter, granddaughter);`

The values associated with each are: grandmother = -2, mother = -1, me = 0, daughter = 1, granddaughter = 2

---

<FLOAT>

Function: Declare an instance of the FLOAT type, a floating-point numeric field.

A floating-point number is a bit string characterized by three components: a sign, a signed exponent, and a significand. A floating-point number is represented in storage in one of the formats specified by the <FORM attribute>. Its numerical value, V, may be derived from its stored representation as follows:

```
e = C-b
V = (S*(B**e))*((-1)**s)
```

where the terms of these expressions are defined as follows:

| Term | Definition |
|---|---|
| **Sign (s)** | The high-order bit in the stored representation of the number. The value of the number is considered to be positive or negative depending on whether the sign is zero or one, respectively. |
| **Exponent (e)** | The component of a floating-point number that normally signifies the integer power to which the **base** is raised in determining the value of the represented number. The exponent is not stored directly, but is first converted to a **characteristic**. |
| **Base (B)** | The number to which the exponent is applied when determining the numerical value of a floating-point number. The base used depends on the format. |
| **Characteristic (C)** | The sum of the exponent and a constant (**bias**) chosen to make the range of the stored representation of the exponent non-negative. The characteristic is stored in the bits immediately following the sign. The length of the characteristic depends on the format. |
| **Bias (b)** | A constant that is added to the exponent in order to create the unsigned characteristic which is stored to represent the exponent. The bias used depends on the format. |
| **Significand (S)** | The component of a floating-point number that specifies the value to be multiplied by the base raised to the power of the exponent. The length and interpretation of the significand depends on the format. |

Different formats of the FLOAT data type accommodate either binary or hexadecimal representations of floating-point numbers.

HEXADECIMAL Formats:

In hexadecimal floating-point numbers, the significand consists of an implicit leading zero bit to the left of its implied binary point and a fraction field to the right. The significand is stored following the characteristic in the representation of the number.

A value that is stored in the significand can be normalized to represent it with the greatest precision possible for a given format. Normalization is done by taking the value in hexadecimal form and shifting left or right until the first digit to the right of the hexadecimal point is nonzero and all digits to the left of the hexadecimal are zero. The exponent is reduced by the number of hexadecimal digits that were shifted left or increased by the number of hexadecimal digits that were shifted right. The result is stored in the significand.

Up to three leftmost bits of the significand of a normalized hexadecimal floating-point number may be zeroes, since the nonzero test applies to the entire leftmost hexadecimal digit. Thus, the guaranteed binary precision is three less than the maximum binary precision.

There are two values that represent zero: +0 and -0. A true zero is a floating-point number with a zero sign, characteristic, and significand.

There are three formats of hexadecimal floating-point numbers:

*Table 3. Hexadecimal Floating-point Formats*

| FORMAT | SIGN | CHARACTERISTIC | BIAS | SIGNIFICAND | LENGTH |
|---|---|---|---|---|---|
| single | 1 bit | 7 bits | 64 | 6 hex digits | 32 bits |
| double | 1 bit | 7 bits | 64 | 14 hex digits | 64 bits |
| extended | 1 bit | 7 bits | 64 | 28 hex digits | 128 bits |

Single precision hexadecimal floating-point numbers, FORM(FH32), are represented as follows:

```
|sign|characteristic|significand|
0    1              8          31
```

Double precision hexadecimal floating-point numbers, FORM(FH64), are represented as follows:

```
|sign|characteristic|significand|
0    8              8          63
```

Extended precision hexadecimal floating-point numbers, FORM(FH128), are represented as follows:

```
|    |high-order    |leftmost 14 hex digits of |
|sign|characteristic|28 hex digit significand  |
0    1              8                         63

|    |low-order     |rightmost 14 hex digits of|
|sign|characteristic|28 hex digit significand  |
64   65             72                       127
```

The characteristic and sign of the high-order part are the characteristic and sign of the extended floating-point number. If the high-order part is normalized, the extended number is considered normalized. When an extended floating-point number is operated on, the sign of the low-order part is set to the same as that of the high-order part, and, unless the result is a true 0, the characteristic of the low-order part is made 14 less than that of the high-order part. If the subtraction of 14 from the high-order part is less than zero, the low-order characteristic is made 128 larger than the correct value. When an extended floating-point field is initialized, the low-order part may be set to a true zero if the low-order significand is zero. The preceding guarantees that both parts of the extended floating-point field are valid long floating-point numbers and can each be used as a long floating-point field.

BINARY Formats:

In binary floating-point numbers, the significand consists of an explicit or implicit integer bit to the left of its implied binary point and fraction bits to the right. The significand is stored following the characteristic in the representation of the number.

A value is normalized in order to represent it with the greatest precision possible for a given format. Normalization is done by taking the value in binary form and shifting left or right until a single binary one is to the left of the binary point. The exponent is reduced by the number of bits which were shifted left or increased by the number of bits which were shifted right. The resulting normalized significand is stored according to the format.

A denormalized value occurs when a normalized value would require an exponent value smaller than the minimum exponent for the format. In this case the value is shifted left until the exponent equals the minimum exponent for the format. The resulting denormalized significand is stored according to the format of the number. The integer bit is zero and the stored significand may have leading zeroes. The characteristic is set to zero to signal that this number is denormalized.

There are two values which represent zero: +0 and -0.

The following special values can also be expressed:

Infinity Infinity is indicated by a reserved characteristic of (2**b)-1 and the fraction bits of the significand equal to zero.

Not a Number (NaN) The value of the floating-point is indicated to be a NaN by a reserved characteristic of (2**b)-1 and the fraction bits of the significand not equal to zero.

There are four formats for binary floating-point numbers:[2]

*Table 4. Binary Floating-point Formats*

| FORMAT | SIGN | CHARACTERISTIC | BIAS | SIGNIFICAND | LENGTH | PRECISION |
|---|---|---|---|---|---|---|
| single | 1 bit | 8 bits | 127 | 23 bits | 32 bits | 24 bits |
| double | 1 bit | 11 bits | 1023 | 52 bits | 64 bits | 53 bits |
| extended | 1 bit | 15 bits | 16383 | 64 bits | 80 bits | 64 bits |
| OS/2 extended | 1 bit | 15 bits | 16383 | 64 bits | 128 bits | 64 bits |

Single precision binary floating-point numbers, FORM(FB32), are represented as follows:

| sign | characteristic | significand |
|---|---|---|

0 1 9 31

[2] The single and double forms are defined by the *IEEE Standard for Binary Floating-Point Arithmetic, ANSI/IEEE Std 754-1985*. The extended form is defined by the *Intel 387™ DX User's Manual, Programmer Reference*. The extended form is equivalent to the double extended format of the *IEEE Standard for Binary Floating-Point Arithmetic, ANSI/IEEE 754-1985*.

In the single format, the integer bit of the significand is implicit and not stored. The implied binary point is to the left of the first bit of the stored significand.

Double precision binary floating-point numbers, FORM(FB64), are represented as follows:

| sign | characteristic | significand |
|---|---|---|
| 0 | 1 | 12 63 |

In the double format, the integer bit of the significand is implicit and not stored. The implied binary point is to the left of the first bit of the stored significand.

Single precision binary floating-point numbers, FORM(FB80), are represented as follows:

| sign | characteristic | significand |
|---|---|---|
| 0 | 1 | 16 79 |

In the extended format, the integer bit of the significand is explicit and is the first bit in the stored significand. If the integer bit is one, the number is normalized. If the integer bit is zero, the number is denormalized. The implied binary point is to the left of the second bit of the stored significand.

OS/2 extended precision binary floating-point numbers, FORM(FI128), are represented as follows:

| sign | characteristic | significand | unused |
|---|---|---|---|
| 0 | 1 | 16 | 79 127 |

In the OS/2 extended format, the integer bit of the significand is explicit and is the first bit in the stored significand. If the integer bit is one, the number is normalized. If the integer bit is zero, the number is denormalized. The implied binary point is to the left of the second bit of the stored significand.

The <PRECISION attribute> specifies the maximum number of significant digits of interest in the field. When PRECISION is less than the implied length, the entire significand is still used. Thus, PRECISION does not affect the format or value of the stored floating-point field.

Format

```
<FLOAT> ::=
  FLOAT
  <FLOAT attributes list>
  [<WHEN clause>]
<FLOAT attributes list> ::=
  {
    <FLOAT defaulted attributes list>
    <FLOAT optional attributes list>
  }!
<FLOAT defaulted attributes list> ::=
  {
    [<BYTRVS attribute>]
    [<COMPLEX attribute>]
    [<FIT attribute>]
    [<FORM attribute>]
    [<RADIX attribute>]
  }!
```

```
<FLOAT optional attributes list> ::=
  {
    [<HELP attribute>]
    [<PRECISION attribute>]
    [<NOTE attribute>]
    [<TITLE attribute>]
  }!
```

Syntax Rules: The attributes of the <FLOAT defaulted attributes list> shall be specified in the FLOAT <DEFAULT statement> or the <FLOAT> <data declaration statement>.

General Rules

1. The default and maximum precision that can be specified shall be determined by the following table:

*Table 5. <FLOAT> Maximum Precision*

| FORMAT | RADIX(2) | RADIX(10) |
|---|---|---|
| FH32 | 24 binary digits | 6 decimal digits |
| FH64 | 56 binary digits | 16 decimal digits |
| FH128 | 112 binary digits | 33 decimal digits |
| FB32 | 24 binary digits | 7 decimal digits |
| FB64 | 53 binary digits | 15 decimal digits |
| FB80 | 64 binary digits | 15 decimal digits |
| FI128 | 64 binary digits | 19 decimal digits |

2. PRECISION shall be less than or equal to the maximum precision of the form selected.
3. The minimum alignment of a FLOAT field is byte alignment.

Examples

1. Declare ElectronCharge to be a binary floating-point number represented with a length of 64 bits.

```
DEFAULT FLOAT FORM(FB64) COMPLEX(FALSE) RADIX(2) FIT(ROUND);
ElectronCharge: FLOAT;
```

2. A normalized single precision hexadecimal FLOAT field:

```
DEFAULT FLOAT FORM(FH32) COMPLEX(FALSE) RADIX(2) FIT(ROUND);
x : FLOAT;
The stored value of x is x'41600000'
6.0 is stored as a normalized FLOAT number.
s = sign = 0
C = characteristic = x'41' = 65
e = exponent       = c - bias = 65 - 64 = 1
S = significand    = x'600000' = 0.375
x = (-1)**0 * 0.375 * 16**1 = 6.0
```

3. A normalized single precision binary FLOAT field:

```
DEFAULT FLOAT FORM(FB32) BYTRVS(FALSE) COMPLEX(FALSE) RADIX(2)
              FIT(ROUND);
x : FLOAT;
The stored value of x is x'40C00000' = 6.0
s = sign = 0
C = characteristic = b'10000001' = x'81' = 129
e = exponent        = c - bias = 129 - 127 = 2
S = significand     = b'10000000000000000000000' = 0.5
since 0 < c < 255 then the number is normalized
m = mantissa = 1 + 0.5 = 1.5
x = (-1)**0 * 1.5 * 2**2 = 1 * 1.5 * 4 = 6.0
```

<PACKED>

Function: Declare an instance of the PACKED type, a packed decimal numeric field.

1. A packed decimal field is a sequence of 4-bit strings representing decimal digits (0-9) followed by an optional 4-bit sign position. If needed, the field is extended on the left to a multiple of 8 bits length.
2. If a sign position exists, SIGNED(TRUE) is specified and the representation of the PACKED field is defined by the <SGNLOC attribute> with the <SGNPLS attribute> and <SGNMNS attribute> or the <SGNUNS attribute>.
3. If a sign position does not exist, SIGNED(FALSE) is specified and the whole field represents the number.
4. The maximum number of significant digits in a PACKED field is specified by the <PRECISION attribute>, but if PRECISION is even, the number of digits stored in a PACKED field is one greater than PRECISION.
5. Numbers are stored in PACKED fields as integers. The actual value depends on the <SCALE attribute>, as defined by:

   ```
   Actual_Value = Stored_Integer_Value*(10**(-SCALE))
   ```

If the scaling factor is negative, then the actual value is greater than the stored value. For example, if decimal 123 is stored and it has a scaling factor of -3, then the actual value is 123000. If the scaling factor is positive, then the actual value is equal to or less than the stored value. For example, if decimal 123 is stored and it has a scaling factor of 3, then .123 is the actual value.

Format

```
<PACKED> ::=
  PACKED
  <PACKED attributes list>
  [<WHEN clause>]
<PACKED attributes list> ::=
  {
    <PACKED defaulted attributes list>
    <PACKED optional attributes list>
  }!
```

```
<PACKED defaulted attributes list> ::=
  {
    [<COMPLEX attribute>]
    [<CONSTRAINED attribute>]
    [<FIT attribute>]
    [PRECISION({1..31 | <constant identifier>})]
    [SCALE({-128..127 | <constant identifier>})]
    <PACKED SIGNED attributes list>
  }!
<PACKED SIGNED attributes list> ::=
  [
    SIGNED(TRUE)
    <PACKED SGNLOC attributes list>
  ]! |
  [SIGNED(FALSE)]
<PACKED SGNLOC attributes list> ::=
  SGNLOC(DGTLSTBYT)
  {
    [
      <SGNMNS attribute>
      <SGNPLS attribute>
    ]! |
    [<SGNUNS attribute>]
  }
<PACKED optional attributes list> ::=
  {
    [<HELP attribute>]
    [<NOTE attribute>]
    [<TITLE attribute>]
  }!
```

Syntax Rules: The attributes of the <PACKED defaulted attributes list> shall be specified in the PACKED <DEFAULT statement> or the <PACKED> <data declaration statement>.

General Rules

1. The length in bits of a PACKED field shall be specified as follows:
   a. For SGNLOC(DGTLSTBYT) and an odd PRECISION, the length of the field in bits shall equal the (PRECISION+1)*4.
   b. For SGNLOC(DGTLSTBYT) and an even PRECISION, the length of the field in bits shall equal the (PRECISION+2)*4.
   c. If SIGNED(FALSE) is specified and the PRECISION is odd, the length of the field in bits shall equal (PRECISION +1)*4.
   d. If SIGNED(FALSE) is specified and the PRECISION is even, the length of the field in bits shall equal PRECISION*4.
2. The minimum alignment of a PACKED field is byte alignment.

Examples: The following legend applies to the examples below:

```
Legend:
  p = precision digit
  s = sign digit
  o = overflow digit
  f = fraction digit
```

1. A packed decimal field with scale, precision, and sign

```
DEFAULT PACKED COMPLEX(FALSE) CONSTRAINED(FALSE) SIGNED(TRUE)
               SCALE(0) SGNLOC(DGTLSTBYT) SGNMNS(x'D')
               SGNPLS(x'C') PRECISION(15) FIT(ROUND);
X: PACKED PRECISION(7) SCALE(2);
byte    0       1       2       3
                            f   f
    | p | p | p | p | p | p | p | s |
```

2. A packed decimal field with negative scaling:

```
DEFAULT PACKED COMPLEX(FALSE) CONSTRAINED(FALSE) SIGNED(TRUE)
               SCALE(0) SGNLOC(DGTLSTBYT) SGNMNS(x'D')
               SGNPLS(x'C') PRECISION(15) FIT(ROUND);
X: PACKED PRECISION(4) SCALE(-5);
byte    0       1       2          Number Stored =
    | o | p | p | p | p | s |           | 0 | 0 | 0 | 1 | 7 | C |
                                   Value = 17 * 100000 = 1700000
```

3. A packed decimal field with positive scaling:

```
DEFAULT PACKED COMPLEX(FALSE) CONSTRAINED(FALSE) SIGNED(TRUE)
               SCALE(0) SGNLOC(DGTLSTBYT) SGNMNS(x'D')
               SGNPLS(x'C') PRECISION(15) FIT(ROUND);
X: PACKED PRECISION(4) SCALE(5);
byte    0       1       2          Number Stored =
    | o | p | p | p | p | s |           | 0 | 0 | 0 | 1 | 7 | C |
                                   Value = 17 * 0.00001 = 0.00017
```

<SEQUENCE>

Function: Declare an instance of the SEQUENCE type, an ordered collection of fields and constructors.

Format

```
<SEQUENCE> ::=
  SEQUENCE
  <SEQUENCE attributes list>
  [<WHEN clause>]
  <BEGIN statement>
    {<data declaration statement> | <SKIP statement>}...
  <END statement>

<SEQUENCE attributes list> ::=
  <SEQUENCE optional attributes list>

<SEQUENCE optional attributes list> ::=
  {
    [<HELP attribute>]
    [<NOTE attribute>]
    [<TITLE attribute>]
  }!
```

Syntax Rules: None.

General Rules

1. The elements of a SEQUENCE shall be mapped contiguously onto a bit string.
2. Unused bits required for proper alignment of certain data types shall be specified by the <SKIP statement>.

Examples

1. Declare name to be a sequence with the components: lastname, firstname, and initial.

```
DEFAULT CHAR CCSID(0) LENGTH(1) JUSTIFY(LEFT) UNITLEN(8);
name: SEQUENCE
      BEGIN;
         lastname: CHAR LENGTH(12);
         firstname: CHAR LENGTH(12);
         initial: CHAR;
      END;
```

The qualified names of the fields in name are:

```
name.lastname   name.firstname   name.initial
```

2. Declare address to be a sequence with the components: street, city, state, and zip.

```
DEFAULT CHAR CCSID(0) LENGTH(1) JUSTIFY(LEFT) UNITLEN(8);
address: SEQUENCE
         BEGIN;
            street: CHAR LENGTH(30);
            city: CHAR LENGTH(15);
            state: CHAR LENGTH(2);
            zip: CHAR LENGTH(10);
         END;
```

The qualified names of the fields in address are:

```
address.street   address.city   address.state   address.zip
```

---

<subtype instance>

Function: Declare an instance of a user-defined subtype.

Format

```
<subtype instance> ::=
  <subtype identifier>
  <subtype instance attributes list>
  [<WHEN clause>]
```

```
<subtype instance attributes list> ::=
  {
    <ARRAY attributes list> |
    <ASIS attributes list> |
    <BIT attributes list> |
    <BITPRE attributes list> |
    <BOOLEAN attributes list> |
    <CASE attributes list> |
    <CHAR attributes list> |
    <CHARPRE attributes list> |
    <CHARSFX attributes list> |
    <BINARY attributes list> |
    <ENUMERATION attributes list> |
    <FLOAT attributes list> |
    <PACKED attributes list> |
    <SEQUENCE attributes list> |
    <ZONED attributes list>
  }
```

Syntax Rules: The attribute list specified shall be of the ADL type specified in the <SUBTYPE statement> associated with the <subtype instance> either directly or through inheritance.

General Rules

1. The attributes specified shall override the values of the attributes with the same key words specified in the <SUBTYPE statement> identified by the <subtype identifier>.
2. Any attributes not specified in the <subtype instance> declaration shall be inherited from the <SUBTYPE statement>.
3. If an <identifier> is specified for the <subtype instance> <data declaration statement>, the <identifier> shall replace the <identifier> specified in the <SUBTYPE statement> in the fully qualified names.

Examples

1. Declare a sequence that includes an instance of GameBoard:

```
DEFAULT ENUMERATION BYTRVS(FALSE) LENGTH(8)
        SGNCNV(ALGEBRAIC) SIGNED(FALSE);
DEFAULT BOOLEAN BLNENC(LSTBIT) BYTRVS(FALSE) LENGTH(8);
DEFAULT ARRAY DMNLOW(1) MAXALC(TRUE) SKIP(0);
DEFAULT CHAR CCSID(0) LENGTH(1) JUSTIFY(LEFT) UNITLEN(8);
piece: ENUMERATION LENGTH(16) (king, queen, knight, bishop, rook, pawn);
GameBoard: SUBTYPE OF ARRAY DMNLST(DMNSIZE(8), DMNSIZE(8))
                      OF piece;
game: SEQUENCE
      NOTE('This sequence defines the state of '
           'a chess game that is being played.')
      BEGIN;
         move: ENUMERATION(white,black);
         incheck: BOOLEAN;
         checkmate: BOOLEAN;
         castled: ARRAY DMNLST(DMNSIZE(2))
                  OF BOOLEAN;
         ChessBoard: GameBoard;
      END;
```

2. Declare A to be a subtype of the array type with two dimensions.

```
DEFAULT ARRAY DMNLOW(1) MAXALC(TRUE) SKIP(0);
DEFAULT CHAR CCSID(0) LENGTH(1) JUSTIFY(LEFT) UNITLEN(8);
A: SUBTYPE OF ARRAY  DMNLST(DMNSIZE(4), DMNSIZE(7))
                     OF CHAR LENGTH(4);

Declare B to be an
instance of A with dimensions of 3 and 5:
B: A DMNLST(DMNSIZE(3), DMNSIZE(5));
```

Note: The whole DMNLST attribute can be overridden, but not the description of individual dimensions.

<ZONED>

Function: Declare an instance of the ZONED type, a zoned decimal numeric field.

1. A zoned decimal field is a sequence of bytes, each of which contains a representation of a decimal digit (0-9) in its rightmost 4 bits, and each of which normally contains a zone encoding in its leftmost 4 bits. The zone encoding is typically that which would cause the byte to print as a numeric character. For example, the digit 9 could be encoded as x'F9', which represents the value 9 and would print as the character '9' in CCSID(500).

If the field is signed, one of several variations on the above occurs:

- The sign can consist of a separate byte, which appears at the left end or right end of the numeric field, depending on the value specified for the <SGNLOC attribute>. The sign is the character '+' or '-', as appropriate.
   - The sign can be encoded in place of the zone portion of the leftmost or rightmost digit, also depending on the value specified for the <SGNLOC attribute>.

Every byte occupied by a ZONED field is assigned an ordinal number by which it can be referenced (by the SUBSTR function, for example). The first byte has an ordinal number of 1, which is increased by 1 for successive bytes, up to the length of the field in bytes.
2. The encoding of all zones is specified by the <ZONENC attribute>.
3. If a sign position exists, SIGNED(TRUE) is specified and its representation is defined by the <SGNLOC attribute>, <SGNPLS attribute>, and the <SGNMNS attribute>.
4. If a sign position does not exist, SIGNED(FALSE) is specified and the whole field represents the number.
5. The maximum number of significant digits in a ZONED field is specified by the <PRECISION attribute>.
6. Numbers are stored in ZONED fields as integers. The actual value depends on the <SCALE attribute>, as defined by:

   ```
   Actual_Value = Stored_Integer_Value*(10**(-SCALE))
   ```

If the scaling factor is negative, then the actual value is greater than the stored value. For example, if decimal 123 is stored and it has a scaling factor of -3, then the actual value is 123000. If the scaling factor is positive, then the actual value is equal or less than the stored value. For example, if decimal 123 is stored and it has a scaling factor of 3, then .123 is the actual value.

Format

```
<ZONED> ::=
  ZONED
  <ZONED attributes list>
  [<WHEN clause>]
```

```
<ZONED attributes list> ::=
  {
    <ZONED defaulted attributes list>
    <ZONED optional attributes list>
  }!
<ZONED defaulted attributes list> ::=
  {
    [<COMPLEX attribute>]
    [<CONSTRAINED attribute>]
    [<FIT attribute>]
    [PRECISION({1..31 | <constant identifier>})]
    [SCALE({-128..127 | <constant identifier>})]
    <ZONED SIGNED attributes list>
    [<ZONENC attribute>]
  }!
<ZONED SIGNED attributes list> ::=
  [
    SIGNED(TRUE)
    <ZONED SGNLOC attributes list>
  ]! |
  [SIGNED(FALSE)]
<ZONED SGNLOC attributes list> ::=
  [
    SGNLOC({ZONLSTBYT | ZONFRSBYT})
    <SGNMNS attribute>
    <SGNPLS attribute>
  ]! |
  [
    SGNLOC({LSTBYT | FRSBYT})
    <CCSID attribute>
  ]!
<ZONED optional attributes list> ::=
  {
    [<HELP attribute>]
    [<NOTE attribute>]
    [<TITLE attribute>]
  }!
```

Syntax Rules: The attributes of the <ZONED defaulted attributes list> shall be specified in the ZONED <DEFAULT statement> or the <ZONED> <data declaration statement>.

General Rules

1. The length of a ZONED field in bits shall be:
   a. PRECISION*8 if SIGNED(FALSE) is specified.
   b. PRECISION*8 if SGNLOC(ZONFRSBYT) or SGNLOC(ZONLSTBYT) is specified.
   c. (PRECISION*8)+8 if SGNLOC(FRSBYT) or SGNLOC(LSTBYT) is specified.
2. The minimum alignment of a ZONED field is byte alignment.
3. The <CCSID attribute> shall apply to the sign character only.

Examples: The following legend applies to the examples below:

```
Legend:
  p = precision nibble
  z = zone nibble
  s = sign nibble
  f = fraction nibble
```

1. ZONED with scale, precision, and sign

```
DEFAULT ZONED COMPLEX(FALSE) ZONENC(x'F') FIT(ROUND)
              CONSTRAINED(FALSE) SCALE(0) SGNLOC(ZONLSTBYT)
              SGNMNS(x'D') SGNPLS(x'C') PRECISION(15) SIGNED(TRUE);
X: ZONED PRECISION(4) SCALE(2);
byte    0       1       2       3
                            f       f
    | z | p | z | p | z | p | s | p |
```

2. ZONED with negative scale:

```
DEFAULT ZONED COMPLEX(FALSE) ZONENC(x'F') FIT(ROUND)
              CONSTRAINED(FALSE) SCALE(0) SGNLOC(ZONLSTBYT)
              SGNMNS(x'D') SGNPLS(x'C') PRECISION(15) SIGNED(TRUE);
X: ZONED PRECISION(3) SCALE(-5);
byte    0       1       2          Number Stored =
    | z | p | z | p | s | p |          | F | 0 | F | 1 | C | 7 |

                                   Value = 17 * 100000 = 1700000
```

3. ZONED with scale greater than precision

```
DEFAULT ZONED COMPLEX(FALSE) ZONENC(x'F') FIT(ROUND)
              CONSTRAINED(FALSE) SCALE(0) SGNLOC(ZONLSTBYT)
              SGNMNS(x'D') SGNPLS(x'C') PRECISION(15) SIGNED(TRUE);
X: ZONED PRECISION(3) SCALE(5);
byte    0       1       2          Number Stored =
    | z | p | z | p | s | p |          | F | 0 | F | 1 | C | 7 |

                                   Value = 17 * 0.00001 = 0.00017
```

4. A ZONED number of precision 3 and scale 0: The value of the number is positive 123:

| SIGNED | SGNLOC | SGNMNS | SGNPLS | ZONENC | Hex Encoding | Equivalent Character Literal |
|---|---|---|---|---|---|---|
| FALSE | | | | X'F' | X'F1F2F3' | '123' |
| TRUE | ZONLSTBYT | X'D' | X'C' | X'F' | X'F1F2C3' | '12C' |
| TRUE | ZONFRSBYT | X'D' | X'C' | X'F' | X'C1F2F3' | 'A23' |
| TRUE | LSTBYT | | | X'F' | X'F1F2F34E' | '123+' |
| TRUE | FRSBYT | | | X'F' | X'4EF1F2F3' | '+123' |

Chapter 6. Attributes

This chapter describes, in alphabetical order, the attributes that can be specified for ADL data types.

<BLNENC attribute>

Function: Specify how a BOOLEAN field is encoded.

Format

```
<BLNENC attribute> ::=
  BLNENC (LSTBIT | <constant identifier>)
```

Syntax Rules: If a <constant identifier> is specified, it shall be that of a <CONSTANT statement> whose value is defined by the ADL constant LSTBIT.

General Rules: LSTBIT

True - Last bit on
False - Last bit off

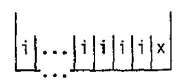

```
Legend:
  x = boolean encoding
  i = ignored bits
```

Examples: None.

<BYTRVS attribute>

Function: Specify whether a field is encoded in byte reversed order.

When data is byte reversed, each byte is moved to position ((M+1)-N) in the data representation, where

- N is the original position of a given byte.
- M is the total length of the data representation in bytes.
- Bytes are numbered from index 1.

Format

```
<BYTRVS attribute> ::=
  BYTRVS ({<boolean literal> | <constant identifier>})
```

Syntax Rules: If BYTRVS(<constant identifier>) is specified, the <constant identifier> shall be that of a <CONSTANT statement> whose value is a <boolean literal>.

General Rules

1. BYTRVS(TRUE) shall not be specified for a field less than 8 bits in length.
2. For a field of 8 bits in length, BYTRVS(TRUE) does not affect the representation of the field.
3. BYTRVS(TRUE) shall not be specified for a field that is not a multiple of 8 bits.

Examples

1. If the 16-bit value x'1234' is stored in byte reversed format at a location called NUM, its format is:

```
|34|12|

A  A
|  └─ NUM plus 1
└─ NUM
```

2. If the 32-bit value x'12345678' is stored in byte reversed format at a location called NUM, its format is:

```
|78|56|34|12|

A  A  A  A
|  |  |  └─ NUM plus 3
|  |  └─ NUM plus 2
|  └─ NUM plus 1
└─ NUM
```

<CCSID attribute>

Function: Specify the Coded Character Set Identifier of a field, as defined by the IBM Character Data Representation Architecture (CDRA).

Format

```
<CCSID attribute> ::=
  CCSID
   ({
     <positive integer> |
     <constant identifier> |
     <qualified identifier>
   })
```

Syntax Rules

1. The range of valid values for the <CCSID attribute> is 0 to 65535.
2. The hierarchy of CCSID attributes is as follows (low to high):
   - <data declaration statement>
   - a PLAN parameter specification
   - a <DEFAULT statement> of the data type.
3. If CCSID(<constant identifier>) is specified, the <constant identifier> shall be that of a <CONSTANT statement> with a value that is in the range of the valid values of the attribute.

4. If CCSID(<qualified identifier>) is specified, the <identifier> shall name a field from which the value of the attribute is taken. The value shall be one of the following:
   - A BINARY field with the attributes SCALE(0) and COMPLEX(FALSE).
   - A PACKED field with the attributes SCALE(0) and COMPLEX(FALSE).
   - A ZONED field with the attributes SCALE(0) and COMPLEX(FALSE).

General Rules

1. If CCSID(0) is specified for a lower level entity in the hierarchy, the CCSID attribute shall be inherited from the next higher level of the hierarchy.
2. If CCSID(65535) is specified, the encoding of a string is undefined.

Examples: Declare poem to be a character string in CCSID 500:

```
DEFAULT CHAR CCSID(0) LENGTH(1) JUSTIFY(LEFT) UNITLEN(8);
poem: CHAR LENGTH(40) CCSID(500);
```

---

<COMPLEX attribute>

Function: Specify whether a numeric field consists of two adjacent fields with the same attributes, with the first field representing the real component of the complex number, and the second field representing the coefficient of the imaginary component of the complex number.

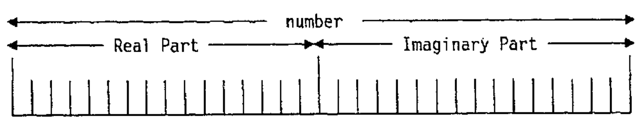

Format

```
<COMPLEX attribute> ::=
  COMPLEX
  ({<boolean literal> | <constant identifier>})
```

Syntax Rules: If COMPLEX(<constant identifier>) is specified, the <constant identifier> shall be that of a <CONSTANT statement> whose value is a <boolean literal>.

General Rules: None.

Examples: Declare number to be a fixed binary field that is complex.

```
DEFAULT BINARY BYTRVS(FALSE) COMPLEX(FALSE) CONSTRAINED(FALSE)
               RADIX(2) SCALE(0) SIGNED(TRUE) PRECISION(31)
               SGNCNV(ALGEBRAIC) FIT(ROUND);
number: BINARY PRECISION(15) COMPLEX(TRUE);
```

<CONSTRAINED attribute>

Function: Specify whether the values that can be assigned to a field must be constrained to the range implied by the <RADIX attribute>, <SCALE attribute>, and <PRECISION attribute> of the field.

Format

```
<CONSTRAINED attribute> ::=
  CONSTRAINED
  ({<boolean literal> | <constant identifier>})
```

Syntax Rules

1. If CONSTRAINED(<constant identifier>) is specified, the <constant identifier> shall be that of a <CONSTANT statement> whose value is a <boolean literal>.
2. If CONSTRAINED(TRUE) is specified, the field value shall be within the range implied by the <RADIX attribute>, <PRECISION attribute>, and the <SCALE attribute>.
3. IF CONSTRAINED(FALSE) is specified, then any value that can be represented by the field is valid, and all other values are made to fit the field. Truncation of the most significant digits, and/or rounding or truncation of the least significant digits can occur.

General Rules: None.

Examples

1. Declare a fixed binary field to be constrained.

```
DEFAULT BINARY BYTRVS(FALSE) COMPLEX(FALSE) CONSTRAINED(FALSE)
               RADIX(2) SCALE(0) SIGNED(TRUE) PRECISION(31)
               SGNCNV(ALGEBRAIC) FIT(ROUND);
number: BINARY PRECISION(2) CONSTRAINED(TRUE) RADIX(10);
```

The values of the number are constrained to the range -99 to 99.

2. Declare a constrained field:

```
DEFAULT BINARY BYTRVS(FALSE) COMPLEX(FALSE) CONSTRAINED(FALSE)
               RADIX(2) SCALE(0) SIGNED(TRUE) PRECISION(31)
               SGNCNV(ALGEBRAIC) FIT(ROUND);
X: BINARY RADIX(10) LENGTH(16) PRECISION(3) CONSTRAINED(TRUE);
```

only values in the range -999 to +999 can be assigned to the field, regardless of the fact that a signed binary field 16 bits in length can actually represent values in the range -32768 to +32767

3. Declare a constrained field:

```
DEFAULT PACKED COMPLEX(FALSE) CONSTRAINED(FALSE) SIGNED(TRUE)
               SCALE(0) SGNLOC(DGTLSTBYT) SGNMNS(x'D')
               SGNPLS(x'C') PRECISION(15) FIT(ROUND);
X: PACKED PRECISION(2) CONSTRAINED(TRUE);
```

only values in the range -99 to +99 can be assigned to the field, regardless of the fact that storage is available for an additional significant digit.

<DMNHIGH attribute>

Function: Specify the highest subscript value for a dimension of an array.

Format

```
<DMNHIGH attribute> ::=
  DMNHIGH
    ({
      <signed integer> |
      <constant identifier> |
      <qualified identifier>
    })
```

Syntax Rules

1. The range of valid values for the <DMNHIGH attribute> is <min31> to <max31>.
2. If DMNHIGH(<constant identifier>) is specified, the <constant identifier> shall be that of a <CONSTANT statement> whose value is in the range of the valid values of the attribute.
3. If DMNHIGH(<qualified identifier>) is specified, the <qualified identifier> shall name a field from which the value of the attribute is taken. The value shall be greater than zero and one of the following fields:
   - A BINARY field with the attributes SCALE(0) and COMPLEX(FALSE).
   - A PACKED field with the attributes SCALE(0) and COMPLEX(FALSE).
   - A ZONED field with the attributes SCALE(0) and COMPLEX(FALSE).

General Rules: None.

Examples: Refer to the examples under "<ARRAY>" on page 53.

<DMNLOW attribute>

Function: Specify the lowest subscript value for a dimension of an array.

Format

```
<DMNLOW attribute> ::=
  DMNLOW
    ({
      <signed integer> |
      <constant identifier> |
      <qualified identifier>
    })
```

Syntax Rules

1. The range of valid values for the <DMNLOW attribute> is <min31> to <max31>.
2. If DMNLOW(<constant identifier>) is specified, the <constant identifier> shall be that of a <CONSTANT statement> whose value is in the range of the valid values of the attribute.
3. If DMNLOW(<qualified identifier>) is specified, the <identifier> shall name a field from which the value of the attribute is taken. The value shall be one of the following:

- A BINARY field with the attributes SCALE(0) and COMPLEX(FALSE).
- A PACKED field with the attributes SCALE(0) and COMPLEX(FALSE).
- A ZONED field with the attributes SCALE(0) and COMPLEX(FALSE).

General Rules: None.

Examples: Refer to the examples under "<ARRAY>" on page 53.

<DMNLST attribute>

Function: Specify the attributes of each dimension of an array.

Format

```
<DMNLST attribute> ::=
  DMNLST (<dimension> [{, <dimension>}...])
<dimension> ::=
  {
    [<DMNLOW attribute>]
    {
      <DMNHIGH attribute> |
      <DMNSIZE attribute>
    }
    [<DMNMAX attribute>]
  }!
```

Syntax Rules

1. The <DMNMAX attribute> shall be specified if and only if a <qualified identifier> is specified for the <DMNLOW attribute>, <DMNHIGH attribute>, or <DMNSIZE attribute>.
2. The <DMNHIGH attribute> shall be greater than or equal to the <DMNLOW attribute>.
3. The number of elements in an ARRAY, implied by DMNHIGH and DMNLOW, shall be less than or equal to DMNMAX.
4. The number of elements in an ARRAY, specified by DMNSIZE, shall be less than or equal to DMNMAX.
5. The value of (DMNHIGH - DMNLOW + 1) shall be less than or equal to <max31>.

General Rules: None.

Examples: Refer to the examples under "<ARRAY>" on page 53.

<DMNMAX attribute>

Function: Specify the maximum number of elements in a dimension of an array.

Format

```
<DMNMAX attribute> ::=
  DMNMAX({<positive integer> | <constant identifier>})
```

Syntax Rules

1. The range of valid values is 1 to <max31>.
2. If DMNMAX(<constant identifier>) is specified. the <constant identifier> shall be that of a <CONSTANT statement> whose value is in the range of the valid values of the attribute.

General Rules: None.

Examples: Refer to the examples under "<ARRAY>" on page 53.

---

<DMNSIZE attribute>

Function: Specify the number of elements in a dimension of an array.

Format

```
<DMNSIZE attribute> ::=
  DMNSIZE
    ({
      <signed integer> |
      <constant identifier> |
      <qualified identifier>
    })
```

Syntax Rules

1. The range of valid values is 0 to <max31>.
2. If DMNSIZE(<constant identifier>) is specified, the <constant identifier> shall be that of a <CONSTANT statement> whose value is in the range of the valid values of the attribute.
3. If a DMNSIZE(<qualified identifier>) is specified, the <identifier> shall name a field from which the value of the attribute is taken. The value shall be one of the following:
   - A BINARY field with the attributes SCALE(0) and COMPLEX(FALSE).
   - A PACKED field with the attributes SCALE(0) and COMPLEX(FALSE).
   - A ZONED field with the attributes SCALE(0) and COMPLEX(FALSE).

General Rules: None.

Examples: Refer to the examples under "<ARRAY>" on page 53.

---

<FIT attribute>

Function: Specify how to assign a numeric value into a target field.

Format

```
<FIT attribute> ::=
  FIT ({ROUND | TRUNCATE | EXACT | <constant identifier>})
```

Syntax Rules

1. If FIT(ROUND) is specified, the least significant binary or decimal digits of the value shall be rounded to fit.
2. If FIT(TRUNCATE) is specified, the least significant binary or decimal digits of the value shall be truncated to fit.
3. If FIT(EXACT) is specified, there shall be no loss of the least significant binary or decimal digits.
4. If FIT(<constant identifier>) is specified, the <constant identifier> shall be that of a <CONSTANT statement> whose value is defined by the ADL constants ROUND or TRUNCATE.

General Rules: None.

Examples: Declare a 32-bit binary number which should be truncated to fit.

```
DEFAULT BINARY BYTRVS(FALSE) COMPLEX(FALSE) CONSTRAINED(FALSE)
               RADIX(2) SCALE(0) SIGNED(TRUE) PRECISION(31)
               SGNCNV(ALGEBRAIC) FIT(ROUND);
x: BINARY FIT(TRUNCATE);
```

---

<FORM attribute>

Function: Specify the form of a floating point number. See "<FLOAT>" on page 81 for a description of these formats.

Format

```
<FORM attribute> ::=
  FORM
    ({
      FB32 | FB64 | FB80 | FI128 | FH32 | FH64 | FH128 |
      <constant identifier>
    })
```

Syntax Rules: If FORM(<constant identifier>) is specified, the <constant identifier> shall be that of a <CONSTANT statement> whose value is defined by the ADL constants FB32, FB64, FB80, FH32, FH64, FH128, or FI128.

General Rules: None.

Examples: Declare a 32-bit binary floating-point number.

```
DEFAULT FLOAT FORM(FB32) BYTRVS(FALSE) COMPLEX(FALSE)
              RADIX(10) FIT(ROUND);
x: FLOAT;
```

<HELP attribute>

Function: Specify an extended description of an entity for presentation to end users.

Format

```
<HELP attribute> ::=
  HELP
    ({
      <character literal> |
      <encoded hex literal> |
      <constant identifier>
    })
```

Syntax Rules

1. The maximum length of HELP shall be <max15> bytes.
2. If HELP(<constant identifier>) is specified, the <constant identifier> shall be that of a <CONSTANT statement> whose value is a <character literal> or <encoded hex literal>.

General Rules: None.

Examples: None.

<HIGH attribute>

Function: Specify the integer value that is associated with the last position of a character string.

Format

```
<HIGH attribute> ::=
  HIGH
    ({
      <positive integer> |
      <constant identifier> |
      <qualified identifier>
    })
```

Syntax Rules

1. The range of valid values is 1 to <max31>.
2. If HIGH(<qualified identifier>) is specified, the <identifier> shall name a field from which the value of the attribute is taken. The value shall be one of the following:
   - A BINARY field with the attributes SCALE(0) and COMPLEX(FALSE).
   - A PACKED field with the attributes SCALE(0) and COMPLEX(FALSE).
   - A ZONED field with the attributes SCALE(0) and COMPLEX(FALSE).
3. If HIGH(<constant identifier>) is specified, the <constant identifier> shall be that of a <CONSTANT statement> whose value is in the range of the valid values of the attribute.

General Rules: None.

Examples: See the examples under "<CHAR>" on page 73.

<JUSTIFY attribute>

Function: Specify whether a character string assigned to a CHAR field is to be padded or truncated on the left or on the right.

Format

```
<JUSTIFY attribute> ::=
  JUSTIFY({LEFT | RIGHT | <constant identifier>})
```

Syntax Rules

1. If JUSTIFY(LEFT) is specified, padding or truncation occurs on the right.
2. If JUSTIFY(RIGHT) is specified, padding or truncation occurs on the left.
3. If JUSTIFY(<constant identifier>) is specified, the <constant identifier> shall be that of a <constant declaration statement> whose value is defined by the ADL constants LEFT or RIGHT.

General Rules: None.

Examples

```
----Source-----     ---------------Target-----------------
Length  Content     Length  JUSTIFY(LEFT)    JUSTIFY(RIGHT)
  3     'ABC'        4      'ABC '            ' ABC'
  3     'AB '        4      'AB  '            ' AB '
  3     ' BC'        4      ' BC '            '  BC'
  4     'ABCD'       4      'ABCD'            'ABCD'
  4     ' BCD'       4      ' BCD'            ' BCD'
  4     'ABC '       4      'ABC '            'ABC '
  5     'ABCDE'      4      'ABCD'            'BCDE'
  5     ' BCDE'      4      ' BCD'            'BCDE'
  5     'ABCD '      4      'ABCD'            'BCD '
```

<LENGTH attribute>

Function: Specify the length of the representation of a field. The unit of measurement varies according to the field being described.

Format

```
<LENGTH attribute> ::=
  LENGTH
    ({
      <positive integer> |
      <constant identifier> |
      <qualified identifier>
    })
```

Syntax Rules

1. The range of valid values for the <LENGTH attribute> depends on the ADL type being described.
2. The length in bits of each unit of an ASIS, CHAR, CHARPRE, or CHARSFX field shall be specified by the UNITLEN attribute.
3. The length in bits of each unit of a BINARY, BIT, CASE, FLOAT,BOOLEAN, or ENUMERATION field is the total number of bits occupied by the representation of the field.
4. If LENGTH(<constant identifier>) is specified, the <constant identifier> shall be that of a <CONSTANT statement> whose value is in the range of the valid lengths of the data type.
5. If LENGTH(<qualified identifier>) is specified, the <identifier> shall name a variable from which the value of the attribute is taken. The value shall be one of the following:
   - A BINARY field with the attributes SCALE(0) and COMPLEX(FALSE).
   - A PACKED field with the attributes SCALE(0) and COMPLEX(FALSE).
   - A ZONED field with the attributes SCALE(0) and COMPLEX(FALSE).
6. The hierarchy of LENGTH attributes is as follows (low to high):
   - <data declaration statement>
   - a PLAN parameter specification
   - a <DEFAULT statement> of the data type.
7. LENGTH(*) shall be specified only in an ASIS, BIT, or CHAR field, where length shall be from the position of the field in the data to the end of the data.

General Rules: None.

Examples: None.

---

<LOW attribute>

Function: Specify the integer value that is associated with the first position of a character string.

Format

```
<LOW attribute> ::=
  LOW
    ({
      <positive integer> |
      <constant identifier> |
      <qualified identifier>
    })
```

Syntax Rules

1. The range of valid values is 1 to <max31>.
2. If LOW(<qualified identifier>) is specified, the <identifier> shall name a field from which the value of the attribute is taken. The value shall be one of the following:
   - A BINARY field with the attributes SCALE(0) and COMPLEX(FALSE).
   - A PACKED field with the attributes SCALE(0) and COMPLEX(FALSE).
   - A ZONED field with the attributes SCALE(0) and COMPLEX(FALSE).
3. If LOW(<constant identifier>) is specified, the <constant identifier> shall be that of a <CONSTANT statement> whose value is in the range of the valid values of the attribute.

General Rules: None.

Examples: See the examples under "<CHAR>" on page 73.

<MAXALC attribute>

Function: Specify whether space for the maximum number of units occupied by a field is allocated.

Format

```
<MAXALC attribute> ::=
  MAXALC ({<boolean literal> | <constant identifier>})
```

Syntax Rules

1. If MAXALC(<constant identifier>) is specified, the <constant identifier> shall be that of a <CONSTANT statement> whose value is a <boolean literal>.
2. If MAXALC(TRUE) is specified, subsequent data may be aligned on the proper boundary of a field specified by the field, by using the <SKIP statement> following the data item.
3. If MAXALC(FALSE) is specified, subsequent data shall be aligned on a byte boundary.

General Rules: None.

Examples: None.

<MAXLEN attribute>

Function: Specify the maximum number of units occupied by the field. The unit of measurement varies according to the type of field being described.

Format

```
<MAXLEN attribute> ::=
  MAXLEN
    ({
      <positive integer> |
      <constant identifier> |
      <qualified identifier>
    })
```

Syntax Rules

1. The range of valid values for the <LENGTH attribute> depends on the ADL type being described.
2. The length in bits of each unit of an ASIS, CHAR, CHARPRE, or CHARSFX field shall be specified by the UNITLEN attribute.
3. The unit of measurement for BIT and BITPRE fields is bits.
4. If MAXLEN(<constant identifier>) is specified, the <constant identifier> shall be that of a <CONSTANT statement> whose value is in the range of the valid values of the attribute.
5. The <MAXLEN attribute> shall not include the prefix for CHARPRE or BITPRE fields.
6. The <MAXLEN attribute> shall include the suffix for CHARSFX fields.

7. If MAXLEN(<qualified identifier>) is specified, the <qualified identifier> shall name a field from which the value of the attribute is taken. The value shall be one of the following:
   - A BINARY field with the attributes SCALE(0) and COMPLEX(FALSE).
   - A PACKED field with the attributes SCALE(0) and COMPLEX(FALSE).
   - A ZONED field with the attributes SCALE(0) and COMPLEX(FALSE).
8. The hierarchy of MAXLEN attributes is as follows (low to high):
   - <data declaration statement>
   - a PLAN parameter specification
   - a <DEFAULT statement> of the data type.

General Rules: None.

Examples: None.

---

<NOTE attribute>

Function: Specify programming commentary about an ADL entity.

Format

```
<NOTE attribute> ::=
  NOTE
    ({
      <character literal> |
      <encoded hex literal> |
      <constant identifier>
    })
```

Syntax Rules

1. The maximum length of the <NOTE attribute> shall be <max15> bytes.
2. If NOTE(<constant identifier>) is specified, the <constant identifier> shall be that of a <CONSTANT statement> whose value is a <character literal> or an <encoded hex literal>.

General Rules: None.

Examples: None.

---

<PREBYTRVS attribute>

Function: Specify whether the length prefix of a CHARPRE or BITPRE field is byte reversed in memory.

See "<BYTRVS attribute>" on page 95.

Format

```
<PREBYTRVS attribute> ::=
  PREBYTRVS ({<boolean literal> | <constant identifier>})
```

Syntax Rules: If PREBYTRVS(<constant identifier>) is specified, the <constant identifier> shall be that of a <CONSTANT statement> whose value is a <boolean literal>.

General Rules: None.

Examples: None.

---

<PRECISION attribute>

Function: For BINARY, PACKED, and ZONED fields, specify the maximum number of significant binary or decimal digits of interest in a field.

For FLOAT fields, specify the maximum number of significant digits of interest in a field. The <PRECISION attribute> does not affect the form or value of the stored floating-point number.

Format

```
<PRECISION attribute> ::=
  PRECISION
  ({<positive integer> | <constant identifier>})
```

Syntax Rules

1. The <PRECISION attribute> shall be specified in:
   - bits for BINARY and FLOAT fields for which RADIX(2) is specified or implied.
   - decimal digits for BINARY, FLOAT, PACKED, and ZONED fields for which RADIX(10) is specified or implied.
2. If PRECISION(<constant identifier>) is specified, the <constant identifier> shall be that of a <CONSTANT statement> whose value is in the range of valid value of the attribute for the data type.

General Rules: None.

Examples

1. Declare `number` to be an unsigned ZONED field with a precision of 6 significant digits:

```
DEFAULT ZONED COMPLEX(FALSE) ZONENC(x'F') FIT(ROUND)
              CONSTRAINED(FALSE) SCALE(0) SGNLOC(ZONLSTBYT)
              SGNMNS(x'D') SGNPLS(x'C') PRECISION(15) SIGNED(TRUE);
number: ZONED PRECISION(6) SIGNED(FALSE);
```

2. Declare `electron` to be a floating-point binary field represented with a precision of 52 significant bits:

```
DEFAULT FLOAT FORM(FB64) BYTRVS(FALSE) COMPLEX(FALSE) RADIX(2)
              FIT(ROUND);
electron: FLOAT PRECISION(52);
```

3. Declare `population` to be an unsigned BINARY field represented with a precision of 32 significant bits:

```
DEFAULT BINARY BYTRVS(FALSE) COMPLEX(FALSE) CONSTRAINED(FALSE)
               RADIX(2) SCALE(0) SIGNED(TRUE) PRECISION(31)
               SGNCNV(ALGEBRAIC) FIT(ROUND);
population: BINARY SIGNED(FALSE) PRECISION(32);
```

4. Declare weight to be a PACKED field represented in 5 significant decimal digits.

```
DEFAULT PACKED COMPLEX(FALSE) CONSTRAINED(FALSE) SIGNED(TRUE)
               SCALE(0) SGNLOC(DGTLSTBYT) SGNMNS(x'D')
               SGNPLS(x'C') PRECISION(15) FIT(ROUND);
weight: PACKED PRECISION(5);
```

<PRELEN attribute>

Function: Specify the length in bits of the BINARY prefix that specifies the length of a CHARPRE or BITPRE field.

Format

```
<PRELEN attribute> ::=
  PRELEN ({16 | 32 | <constant identifier>})
```

Syntax Rules: If PRELEN(<constant identifier>) is specified, the <constant identifier> shall be that of a <CONSTANT statement> whose value is 16 or 32.

General Rules: None.

Examples: None.

<RADIX attribute>

Function: Specify the number system base assumed by the <SCALE attribute> and <PRECISION attribute> for a BINARY field. The <RADIX attribute>, together with the <PRECISION attribute> and the <SCALE attribute> determines the range of values that can be stored for a field.

Specify the number system base assumed by the <PRECISION attribute> of a FLOAT field.

Format

```
<RADIX attribute> ::=
  RADIX ({2 | 10 | <constant identifier>})
```

Syntax Rules: If RADIX(<constant identifier>) is specified, the <constant identifier> shall be that of a <CONSTANT statement> whose value is 2 or 10.

General Rules: None.

Examples: None.

<SCALE attribute>

Function: Specify the scaling factor of a fixed-point numeric field.

The <SCALE attribute> along with the <RADIX attribute> determines the scaling factor to use to find the actual value of a number. The scaling factor is:

```
RADIX**-SCALE
```

Note: <PACKED> and <ZONED> fields are implicitly radix 10 numbers.

Format

```
<SCALE attribute> ::=
  SCALE({<signed integer> | <constant identifier>})
```

Syntax Rules

1. The <SCALE attribute> shall be specified in:
   - bits for BINARY fields for which RADIX(2) is specified or implied.
   - decimal digits for BINARY, FLOAT, PACKED, and ZONED fields for which RADIX(10) is specified or implied.
2. The range of valid values for the <SCALE attribute> is <min7> to <max7>.
3. If SCALE(<constant identifier>) is specified, the <constant identifier> shall be that of a <CONSTANT statement> whose value is in the range <min7> to <max7>.

General Rules: None.

Examples: None.

<SFXENC attribute>

Function: Specify the encoding of the suffix of a CHARSFX field.

Format

```
<SFXENC attribute> ::=
  SFXENC ({x'00' | x'0000' | <constant identifier>})
```

Syntax Rules: If SFXENC(<constant identifier>) is specified, the <constant identifier> shall be that of a <CONSTANT statement> whose value is x'00' or x'0000'.

General Rules: None.

Examples: None.

<SGNCNV attribute>

Function: Specify how the sign of a BINARY field or an ENUMERATION field is to be determined.

Format

```
<SGNCNV attribute> ::=
  SGNCNV
    ({
      ALGEBRAIC |
      LOGICAL |
      <constant identifier>
    })
```

Syntax Rules: If SGNCNV(<constant identifier>) is specified, the <constant identifier> shall be that of a <CONSTANT statement> whose value is defined by the ADL constants ALGEBRAIC or LOGICAL.

General Rules

1. If the source field and the target field are both signed, then ignore the target field's <SGNCNV attribute>, and set the sign of the target field to the same sign as the source field.
2. If the source field and the target field are both unsigned, then ignore the target field's <SGNCNV attribute>.
3. If the source field is signed and the target field is unsigned, then:
   a. If SGNCNV(ALGEBRAIC) is specified for the target field, then
      - Assign the absolute value of the source field to the target field.
      - If the source field is negative, exception 0012 - Assignment of negative to unsigned field occurs.

b. If SGNCNV(LOGICAL) is specified for the target field, then
      1) If the target field is the same length as the source field, do a bit copy of the source field to the target field.
      2) If the target field is longer than the source field, do a bit copy of the source field to the low-order portion of the target field and replicate the sign bit of the source in the remaining high-order bits of the target field.
      3) If the target field is shorter than the source field, bit copy the low order bits to the target field.
4. If the source field is unsigned and the target field is signed, then:
   a. If SGNCNV(ALGEBRAIC) is specified for the target field, assume that the source field is positive and set the sign of the target field to positive.

b. If SGNCNV(LOGICAL) is specified for the target field, then
      1) If target field is the same length as source field, do a bit copy of target to source (i.e. preserve bit pattern).
      2) If target field is longer than the source field, zero-extend the source field to the length of the target field, and then do a bit copy to the target.
      3) If target field is shorter than the source field, bit copy the low order bits to the target field.

Examples

*Signed to Unsigned with SGNCNV(LOGICAL):*

1. Given the following ADL declaration and assignment statements,

```
x1: BINARY LENGTH(32) PRECISION(31) SIGNED(TRUE);
y1: BINARY LENGTH(32) PRECISION(32) SIGNED(FALSE) SGNCNV(LOGICAL);
x1 <- -1;
y1 <- x1;
```

then,

```
x1 = x'FFFFFFFF',
y1 = x'FFFFFFFF', and
y1 = 4294967295 as an unsigned integer.
```

2. Given the following ADL declaration and assignment statements,

```
x1: BINARY LENGTH(32) PRECISION(31) SIGNED(TRUE);
y1: BINARY LENGTH(8) PRECISION(8) SIGNED(FALSE) SGNCNV(LOGICAL);
x1 <- -1;
y1 <- x1;
```

then,

```
x1 = x'FFFFFFFF',
y1 = x'FF', and
y1 = 255 as an unsigned integer.
```

3. Given the following ADL declaration and assignment statements,

```
x1: BINARY LENGTH(8) PRECISION(7) SIGNED(TRUE);
y1: BINARY LENGTH(32) PRECISION(32) SIGNED(FALSE) SGNCNV(LOGICAL);
x1 <- -128 as signed integer
y1 <- x1;
```

then,

```
x1 = x'80',
y1 = x'FFFFFF80', and
y1 = 4294967168 as an unsigned integer.
```

4. Given the following ADL declaration and assignment statements,

```
x1: BINARY LENGTH(32) PRECISION(31) SIGNED(TRUE);
y1: BINARY LENGTH(8) PRECISION(8) SIGNED(FALSE) SGNCNV(LOGICAL);
x1 <- -128;
y1 <- x1;
```

then,

```
x1 = x'FFFFFF80',
y1 = x'80', and
y1 = 128 as an unsigned integer.
```

*Unsigned to signed with SGNCNV(LOGICAL):*

1. Given the following ADL declaration and assignment statements,

```
x1: BINARY LENGTH(32) PRECISION(32) SIGNED(FALSE);
y1: BINARY LENGTH(32) PRECISION(31) SIGNED(TRUE) SGNCNV(LOGICAL);
x1 <- 4294967295;
y1 <- x1;
```

then,

```
x1 = x'FFFFFFFF',
y1 = x'FFFFFFFF', and
y1 = -1 as a signed integer.
```

2. Given the following ADL declaration and assignment statements,

```
x1: BINARY LENGTH(32) PRECISION(32) SIGNED(FALSE);
y1: BINARY LENGTH(8) PRECISION(7) SIGNED(TRUE) SGNCNV(LOGICAL);
x1 <- 4294967295;
y1 <- x1;
```

then,

```
x1 = x'FFFFFFFF',
y1 = x'FF', and
y1 = -1 as a signed integer.
```

3. Given the following ADL declaration and assignment statements,

```
x1: BINARY LENGTH(8) PRECISION(8) SIGNED(FALSE);
y1: BINARY LENGTH(32) PRECISION(31) SIGNED(TRUE) SGNCNV(LOGICAL);
x1 <- 255;
y1 <- x1;
```

then,

```
x1 = x'FF',
y1 = x'000000FF', and
y1 = 255 as a signed integer.
```

4. Given the following ADL declaration and assignment statements,

```
x1: BINARY LENGTH(32) PRECISION(32) SIGNED(FALSE);
y1: BINARY LENGTH(8) PRECISION(7) SIGNED(TRUE) SGNCNV(LOGICAL);
x1 <- 4294967168;
y1 <- x1;
```

then,

```
x1 = x'FFFFFF80',
y1 = x'80', and
y1 = -128 as a signed integer.
```

<SGNLOC attribute>

Function: Specify the location of the sign in the representation of a PACKED or ZONED number.

Format

```
<SGNLOC attribute> ::=
  SGNLOC
    ({
      DGTLSTBYT |
      ZONFRSBYT |
      ZONLSTBYT |
      FRSBYT |
      LSTBYT |
      <constant identifier>
    })
```

Syntax Rules

1. For PACKED fields, the following can be specified:
   - DGTLSTBYT - last nibble of last byte.

```
byte   0       1       2       3
     | D | D | D | D | D | D | D | S |
```

```
Legend:
  D = digit (4 bits)
  s = sign  (4 bits)
```

2. For ZONED fields, the following can be specified:
   - ZONLSTBYT - first nibble of last byte.

```
byte   0       1       2       3
     | Z | D | Z | D | Z | D | S | D |
```

```
Legend:
  Z = zone  (4 bits)
  D = digit (4 bits)
  S = sign  (4 bits)
```

- ZONFRSBYT - first nibble of first byte.

```
byte   0       1       2       3
     | S | D | Z | D | Z | D | Z | D |
```

```
Legend:
  Z = zone  (4 bits)
  D = digit (4 bits)
  S = sign  (4 bits)
```

- FRSBYT - first byte, containing a character '+' or '-' in the specified CCSID.

```
byte   0         1       2       3
     |ssss|ssss| Z | D | Z | D | Z | D |
```

```
Legend:
  Z = zone  (4 bits)
  D = digit (4 bits)
  s = sign according to CCSID
```

- LSTBYT - last byte, containing a character '+' or '-' in the specified CCSID.

```
byte   0       1       2       3
     | Z | D | Z | D | Z | D |ssss|ssss|
```

```
Legend:
  Z = zone  (4 bits)
  D = digit (4 bits)
  s = sign according to CCSID
```

3. If SGNLOC(<constant identifier>) is specified, the <constant identifier> shall be that of a <CONSTANT statement> whose value is defined by the ADL constants DGTLSTBYT, BITLSTBYT, ZONFRSBYT, ZONLSTBYT, FRSBYT, or LSTBYT.

General Rules: None.

Examples: None.

<SGNMNS attribute>

Function: Specify for ZONED (if SGNLOC(ZONLSTBYT, ZONFRSBYT) is specified) or PACKED (if SGNLOC(DGTLSTBYT) is specified) fields the hexadecimal values that can be used to represent the sign of a negative number.

Format

```
<SGNMNS attribute> ::=
  SGNMNS ({<hex literal> | <constant identifier>})
```

Syntax Rules

1. The values specified for the <SGNPLS attribute>, <SGNMNS attribute>, and <SGNUNS attribute> shall be mutually exclusive.
2. The first <hex digit> specified in the <hex literal> is the preferred sign. The preferred sign is the sign generated by arithmetic operations of a given system.
3. If SGNMNS(<constant identifier>) is specified, the <constant identifier> shall be that of a <CONSTANT statement> whose value is a <hex literal>.

General Rules: None.

Examples: None.

<SGNPLS attribute>

Function: Specify for ZONED (if SGNLOC(ZONLSTBYT, ZONFRSBYT) are specified) or PACKED (if SGNLOC(DGTLSTBYT) is specified) fields the hexadecimal values that can be used to represent the sign of a positive number.

Format

```
<SGNPLS attribute> ::=
  SGNPLS ({<hex literal> | <constant identifier>})
```

Syntax Rules

1. The values specified for the <SGNPLS attribute>, <SGNMNS attribute>, and <SGNUNS attribute> shall be mutually exclusive.
2. The first <hex digit> specified in the <hex literal> is the preferred sign. The preferred sign is the sign generated by arithmetic operations of a given system.
3. If SGNPLS(<constant identifier>) is specified, the <constant identifier> shall be that of a <CONSTANT statement> whose value is a <hex literal>.

General Rules: None.

Examples: None.

<SGNUNS attribute>

Function: Specify for PACKED (with SGNLOC(DGTLSTBYT) specified) numbers with a sign position, the hexadecimal values that can be used when no sign has been specified.

Format

```
<SGNUNS attribute> ::=
  SGNUNS ({<hex literal> | <constant identifier>})
```

Syntax Rules

1. The values specified for the <SGNPLS attribute>, <SGNMNS attribute>, and <SGNUNS attribute> shall be mutually exclusive.
2. The first <hex digit> specified in the <hex literal> is the preferred sign. The preferred value is the value generated by arithmetic operations of a given system.
3. If (<constant identifier>) is specified, the <constant identifier> shall be that of a <CONSTANT statement> whose value is a <hex literal>.

General Rules: None.

Examples: None.

<SIGNED attribute>

Function: Specify whether a BINARY, PACKED, or ZONED field includes a sign position in its representation.

Format

```
<SIGNED attribute> ::=
  SIGNED ({<boolean literal> | <constant identifier>})
```

Syntax Rules

1. If SIGNED(<constant identifier>) is specified, the <constant identifier> shall be that of a <CONSTANT statement> whose value is a <boolean literal>.
2. If SIGNED(TRUE) is specified, a position for the sign exists within the representation.
3. If SIGNED(FALSE) is specified, a position for the sign does NOT exist within the representation.

General Rules: None.

Examples: None.

<SKIP attribute>

Function: Specify how many bits are to be skipped before the beginning of each element of an array.

Format

```
<SKIP attribute> ::=
  SKIP ({<positive integer> | <constant identifier>})
```

Syntax Rules

1. The range of valid values for the <SKIP attribute> is 0 to <max34>.
2. The <SKIP attribute> shall not apply to the first element of an ARRAY.
3. The <SKIP attribute> shall specify the number of bits skipped before each succeeding element of the ARRAY.
4. If SKIP(<constant identifier>) is specified, the <constant identifier> shall be that of a <CONSTANT statement> whose value is in the range of the valid values of the attribute.

General Rules: None.

Examples: Declare an array that contains 3 slack bits before each element:

```
arr: ARRAY SKIP(3) DMNLST(DMNLOW(1) DMNSIZE(3))
     OF BIT LENGTH(5);
```

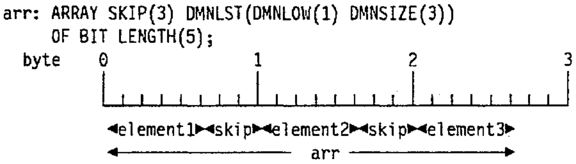

<TITLE attribute>

Function: Specify a short description of an entity.

Format

```
<TITLE attribute> ::=
  TITLE
    ({
      <character literal> |
      <encoded hex literal> |
      <constant identifier>
    })
```

Syntax Rules

1. The maximum length of TITLE shall be <max8> bytes.
2. If TITLE(<constant identifier>) is specified, the <constant identifier> shall be that of a <CONSTANT statement> whose value is a <character literal> or <encoded hex literal>.

General Rules: None.

Examples: None.

<UNITLEN attribute>

Function: Specify the length of each unit of an ASIS, CHAR, CHARPRE, or CHARSFX field.

Format

```
<UNITLEN attribute> ::=
  UNITLEN({ 1 | 8 | 16 | <constant identifier>})
```

Syntax Rules: If UNITLEN(<constant identifier>) is specified, the <constant identifier> shall be that of a <CONSTANT statement> whose value is 1, 8, or 16.

General Rules: None.

Examples: None.

<ZONENC attribute>

Function: Specify the encoding of the zone portion of a <ZONED> field for all bytes except the sign.

Format

```
<ZONENC attribute> ::=
  ZONENC ({<hex literal> | <constant identifier>})
```

Syntax Rules

1. The range of valid values is X'0' to X'F'.
2. If ZONENC(<constant identifier>) is specified, the <constant identifier> shall be that of a <CONSTANT statement> whose value is a <hex literal>.

General Rules: None.

Examples 1. x is a <ZONED> field that is printable in EBCDIC.

```
DEFAULT ZONED COMPLEX(FALSE) ZONENC(x'F') FIT(ROUND)
              CONSTRAINED(FALSE) SCALE(0) SGNLOC(ZONLSTBYT)
              SGNMNS(x'D') SGNPLS(x'C') PRECISION(15) SIGNED(TRUE);
x: ZONED PRECISION(3) SGNLOC(FRSBYT);
```

2. y is a <ZONED> field that is printable in ASCII.

```
DEFAULT ZONED COMPLEX(FALSE) ZONENC(x'F') FIT(ROUND)
              CONSTRAINED(FALSE) SCALE(0) SGNLOC(ZONLSTBYT)
              SGNMNS(x'D') SGNPLS(x'C') PRECISION(15) SIGNED(TRUE);
y: ZONED PRECISION(3) SGNLOC(FRSBYT) ZONENC(x'3');
```

3. z is a <ZONED> field that can be processed by 80386 machine instructions.

```
DEFAULT ZONED COMPLEX(FALSE) ZONENC(x'F') FIT(ROUND)
              CONSTRAINED(FALSE) SCALE(0) SGNLOC(ZONLSTBYT)
              SGNMNS(x'D') SGNPLS(x'C') PRECISION(15) SIGNED(TRUE);
z: ZONED PRECISION(3) SGNLOC(FRSBYT) ZONENC(x'0');
```

Chapter 7. Functions

This chapter describes, in alphabetical order, the functions that can be specified in ADL <assignment statements>s.

<LENGTH function>

Function: Returns the actual length of a named field or constructor.

Format

```
<LENGTH function> ::=
  LENGTH (<qualified identifier>)
```

Syntax Rules: None.

General Rules

1. The result of the <LENGTH function> is a BINARY value specified in bytes if the field is CHAR, CHARSFX, or CHARPRE. Otherwise, the result of the <LENGTH function> is a BINARY value specified in bits.
2. The range of values returned is 0 to <max34> bits or 0 to <max31> characters.

Examples: See Appendix A, "Scenarios" on page 161.

<SUBSTR function>

Function: Returns a substring of a character string or zoned decimal field.

Format

```
<SUBSTR function> ::=
  SUBSTR (<SUBSTR reference>,<SUBSTR position>,<SUBSTR length>)
<SUBSTR reference> ::= <qualified identifier>
<SUBSTR position> ::=
  <positive integer> | <constant identifier> | <qualified identifier>
<SUBSTR length> ::=
  <positive integer> | <constant identifier> | <qualified identifier>
```

Syntax Rules

1. The <qualified identifier> specified for the <SUBSTR reference> shall be that of a CHAR, CHARPRE, CHARSFX, or ZONED field.
2. The <SUBSTR position> shall specify the ordinal number of the start of the substring within the data portion of the field.
3. If the <SUBSTR reference> is defined in terms of the <HIGH attribute> and <LOW attribute>, the <SUBSTR position> shall not be less than the value of the <LOW attribute>.
4. The <SUBSTR length> shall specify the length of the substring in bytes.

5. If a <constant identifier> is specified, the <SUBSTR position> or <SUBSTR length> specified shall be that of a <CONSTANT statement> whose value is a <positive integer>.
6. If a <qualified identifier> is specified for <SUBSTR position> or <SUBSTR length>, the <qualified identifier> shall name a field from which the value taken is a positive integer.
7. The value of the <SUBSTR position> shall be greater than zero.
8. The value of the <SUBSTR position> plus <SUBSTR length> minus 1 shall not exceed the ordinal number of the last byte of the string.

General Rules: The result of the <SUBSTR function> is a CHAR value.

Examples: None.

Chapter 8. Conversion of Data Types

Assignment statements, expressions, or comparisons of a plan cause data to be moved between declared variables of a module. If the data type and attributes of the source variable do not match the data type and attributes of the target variable, then data conversions may be required. This chapter defines the rules that conforming implementations shall follow in performing these conversions.

General Conversion Rules

The following rules apply to all of the conversions described in this chapter unless explicitly overridden for a particular conversion.

1. All of the conversions between data types identified by the table in Figure 9 on page 124, and only those conversions, shall be supported.
2. All supported conversions between data types shall be performed as defined in the following subsections of this specification.
3. The *0001 -- Conversion not supported* exception shall occur for all assignments that require data conversions not allowed by Figure 9 on page 124.

TO DATA TYPES

| | | ARRAY | ASIS | BINARY | BIT | BITPRE | BOOLEAN | CASE | CHAR | CHARPRE | CHARSFX | ENUMERATION | FLOAT | PACKED | SEQUENCE | ZONED |
|---|---|---|---|---|---|---|---|---|---|---|---|---|---|---|---|---|
| F | ARRAY | X | X | | | | | | | | | | | | | |
| R | ASIS | X | X | X | X | X | X | X | X | X | X | X | X | X | X | X |
| O | BINARY | | X | X | | | | | | | | X | X | X | | X |
| M | BIT | | X | | X | X | | | | | | | | | | |
| | BITPRE | | X | | X | X | | | | | | | | | | |
| D | BOOLEAN | | X | | | | X | | | | | | | | | |
| A | CASE | | X | | | | | X | | | | | | | | |
| T | CHAR | | X | | | | | | X | X | X | | | | | |
| A | CHARPRE | | X | | | | | | X | X | X | | | | | |
| | CHARSFX | | X | | | | | | X | X | X | | | | | |
| T | ENUMERATION | | X | X | | | | | | | | X | | X | | X |
| Y | FLOAT | | X | X | | | | | | | | | X | X | | X |
| P | PACKED | | X | X | | | | | | | | X | X | X | | X |
| E | SEQUENCE | | X | | | | | | | | | | | | X | |
| S | ZONED | | X | X | | | | | | | | X | X | X | | X |

*Figure 9. ADL Data Type Conversion Matrix.*

X *Conversion supported by ADL* blank *Conversion not supported by ADL*

ARRAY-to-ARRAY

General Rules

1. If the target array does not have the same number of dimensions as the source array, then the *0008 -- Nonconformable arrays* exception shall occur.
2. For each dimension of the source array,
   a. The low bound of the source dimension (LOW) shall be taken from:
      1) The <DMNLOW attribute> of the dimension,
      2) A field referenced by the <DMNLOW attribute> of the dimension,
      3) The <DMNLOW attribute> of the <ARRAY> declaration,
      4) Or, the <DMNLOW attribute> specified in a <DEFAULT statement> for arrays.
   b. The high bound of the source dimension (HIGH) shall be taken from:
      1) The <DMNHIGH attribute> of the dimension,
      2) A field referenced by the <DMNHIGH attribute> of the dimension,
      3) Or, the formula

```
source HIGH = source LOW + source SIZE - 1.
```

c. The size of the source dimension (SIZE) shall be taken from:
      1) The <DMNSIZE attribute> of the dimension,
      2) A field referenced by the <DMNSIZE attribute> of the dimension,
      3) Or, the formula

```
source SIZE = source HIGH - source LOW + 1.
```

3. For each dimension of the target array,
   a. Determine the values of target LOW, target HIGH, and target SIZE as specified in Table 6 on page 126.
   b. If the source SIZE does not equal target SIZE, then the *0008 – Nonconformable arrays* exception shall occur. This rule covers all cases of array assignment to a target array dimension defined without reference fields.
   c. If the source SIZE is greater than the <DMNMAX attribute> of the target, then the *0008 – Nonconformable arrays* exception shall occur. This rule covers all cases of array assignment to a target array dimension defined with reference fields.
   d. At the completion of an <assignment statement>, if any target <field> is referenced by an array dimension specification, the required value for its referenced use shall be assigned to that field. This is done at the end of an assignment to ensure values are not changed by other operations of an <assignment statement>. Refer to Table 6 on page 126.
4. The elements of the source array shall be assigned to the elements of the target array such that the relative position of an element within each dimension shall be preserved. The association of elements with specific source array indices in each dimension need not be preserved.
5. Conversion of the elements of the source array to the representation required by the elements of the target array shall follow the conversion matrix specified in Figure 9 on page 124.

*Table 6. Target Array Dimension Considerations.*

*1. In the condition values,*

*I indicates a constant specified or defaulted for the attribute.*
*R indicates a reference to another field.*
*- indicates a condition that cannot occur.*

*2. Actions shall be performed in the sequence specified by the action rows of the table. Actions can be dependent on previously selected actions.*

| | | | | | | | | |
|---|---|---|---|---|---|---|---|---|
| Target <DMNLOW attribute> specified by | I | I | I | I | R | R | R | R |
| Target <DMNHIGH attribute> specified by | I | R | - | - | I | R | - | - |
| Target <DMNSIZE attribute> specified by | - | - | I | R | - | - | I | R |
| target LOW = target DMNLOW | X | X | X | X | | | | |
| target LOW = target DMNHIGH - source SIZE + 1 | | | | | X | | | |
| target LOW = source LOW | | | | | | X | | X |
| target LOW = source HIGH - target DMNSIZE + 1 | | | | | | | X | |
| target HIGH = target DMNHIGH | X | | | | X | | | |
| target HIGH = target LOW + source SIZE - 1 | | X | | | | X | | |
| target SIZE = target DMNSIZE | | | X | | | | X | |
| target SIZE = source SIZE | | X | | X | | X | | X |
| target SIZE = target HIGH - target LOW + 1 | X | | | | X | | | |

ASIS-to-constructor

General Rules

1. An ASIS-to-constructor conversion shall be a bit string copy starting with the leftmost bits (bit 0) of the source field and the target constructor for the lengths of the source field and the target constructor.
2. The length of the constructor shall be determined by the specified or inferred length of the constructor.
3. If the source field is longer than the target constructor, the source data shall be truncated to the length of the target constructor.
4. If the source field is shorter than the target constructor, the source data shall be padded to the right with b'0' to the length of the target constructor.
5. If reference fields are specified in the constructor, the reference fields are undefined.

ASIS-to-field data types

General Rules

1. An ASIS-to-field conversion shall be a bit string copy starting with the leftmost bits (bit 0) of the source field and the target field for the lengths of the source field and the target field.
2. The target shall be considered a bit string where:
   a. If the target field is ASIS or BIT, refer to Table 7 on page 128 for target length determinations.
   b. If the target field is BINARY, 1) The target length shall be obtained from LENGTH, if present.
2) The target length shall be inferred from PRECISION.

c. If the target field is BITPRE,

1) If MAXALC(TRUE) is specified for the target, the target length shall equal the target MAXLEN plus PRELEN.
2) If MAXALC(FALSE) is specified for the target, the target length shall equal MIN(source length, target MAXLEN plus PRELEN).

d. If the target field is BOOLEAN, ENUMERATION, or FLOAT, the target length shall be obtained from its LENGTH attribute or implied length.

e. If the target field is CHAR,

1) Refer to Table 8 on page 131 for the length of the target if the <LENGTH attribute> is used.
2) Refer to Table 9 on page 132 for the length of the target if the <HIGH attribute> and <LOW attribute> are used.
3) The obtained length of the target shall be multiplied by UNITLEN to get its bit string length.

f. If the target field is CHARPRE,

1) If MAXALC(TRUE) is specified for the target, the target length in bits shall equal the target ((MAXLEN * UNITLEN) + PRELEN).
2) If MAXALC(FALSE) is specified for the target, the target length in bits shall equal MIN(source (length * UNITLEN), target ((MAXLEN * UNITLEN) + PRELEN)).

g. If the target field is CHARSFX,

1) If MAXALC(TRUE) is specified for the target, the target length in bits shall equal the target (MAXLEN * UNITLEN).
2) If MAXALC(FALSE) is specified for the target, the target length in bits shall equal MIN(source (length * UNITLEN), target (MAXLEN * UNITLEN)).

h. If the target field is PACKED, refer to General Rule #1 on page 87 for the determination of the length.

i. If the target field is ZONED, refer to General Rule #1 on page 92 for the determination of the length.

3. Refer to "BIT-to-BIT" on page 128 for further conversion rules.
4. If the target is CHAR and reference fields were used in the target, refer to Table 10 on page 132 for update rules.

---

BINARY, PACKED, ZONED-to-ENUMERATION

General Rules

1. If the source is a PACKED or ZONED field, the source shall be converted to a BINARY field with SCALE(0) following the rules specified for that conversion in this section.
2. The value of the source BINARY field shall be compared with the values associated with the <enumeration identifier>s of the target ENUMERATION field.
   a. If a match is found, the value of the source BINARY field shall be converted to the attributes of the target ENUMERATION field.
   b. If no match is found, the *0010 – Invalid ENUMERATION value* shall occur.

BIT-to-BIT

General Rules

1. The length of the source shall be obtained from:
   a. The <LENGTH attribute>
   b. A field referenced by the <LENGTH attribute>
   c. The length of the outermost containing structure minus the offset of the field plus 1, if LENGTH(*) is specified.
2. This conversion shall be a bit string copy starting with the leftmost bit (bit 0) of the source and target fields for the lengths of the source and target fields.
3. If the target is BIT, Table 7 specifies how much space is available for the target.
4. If the bit length of the source is longer than the target field, the source data shall be truncated on the right to the length of the target field.
5. If the bit length of the source is shorter than the target field, the source data shall be padded to the right with b'0' to the length of the target field.
6. If reference fields were used in the target, Table 7 specifies how, at the end of an assignment statement, the target length reference fields are updated.

*Table 7. Determination of Target ASIS, BIT Length Fields and Length Reference Field Updates.*

1. *In the condition values,*
   *I indicates a constant specified or defaulted for the attribute.*
   *R indicates a reference to another field.*
   ** indicates LENGTH(*).*
   *- indicates a condition that cannot occur.*
   *T indicates a "TRUE" value.*
   *F indicates a "FALSE" value.*
   *X indicates an action to be taken.*
2. *Actions shall be performed in the sequence specified by the action rows of the table. Actions can be dependent on previously selected actions.*

| | | | | |
|---|---|---|---|---|
| Target <LENGTH attribute> specified by | I | * | R | R |
| Target <MAXALC attribute> value | - | - | T | F |
| Target length = target LENGTH | X | | | |
| Target length = target MAXLEN | | | X | |
| Target length = MIN(target MAXLEN, source LENGTH) | | | | X |
| Target length = MIN(length of the outermost containing constructor - the offset of the field + 1, source LENGTH) | | X | | |
| Update referenced length field to MIN(target MAXLEN, source length) | | | X | X |

BIT-to-BITPRE

General Rules

1. The length of the source shall be obtained from:
   a. The <LENGTH attribute>
   b. A field referenced by the <LENGTH attribute>
   c. The length of the outermost containing structure minus the offset of the field plus 1, if LENGTH(*) is specified.
2. If MAXALC(TRUE) is specified for the target, the target length shall equal the target MAXLEN plus PRELEN.
3. If MAXALC(FALSE) is specified for the target, the target length shall equal MIN(source length, target MAXLEN plus PRELEN).
4. A BIT-to-BITPRE conversion shall be a bit string copy starting with the leftmost bit (bit 0) of the source and target fields for the lengths of the source and target fields.
5. If the source field is longer than the length of the target field, the source data shall be truncated to the length of the target field.
6. The length of the bit string copied into the target field shall be encoded in the prefix of the target field, as specified by its PRELEN and PREBYTRVS attributes.

BITPRE-to-BIT

General Rules

1. A BITPRE-to-BIT conversion shall be a bit string copy starting with the leftmost bit (bit 0) of the source data portion of the field and target field for the lengths of the source and target fields.
2. The length of the source shall be obtained from the prefix of the source field, which is encoded as specified by its PRELEN and PREBYTRVS.
3. Table 7 on page 128 specifies how the length of the target shall be obtained.
4. If the bit length of the source is longer than the target field, the source data shall be truncated on the right to the length of the target field.
5. If the bit length of the source is shorter than the target field, the source data shall be padded to the right with b'0' to the length of the target field.
6. If reference fields were used in the target, Table 7 on page 128 specifies how, at the end of an assignment statement, the reference fields of the target shall be updated.

BITPRE-to-BITPRE

General Rules

1. A BITPRE-to-BITPRE conversion shall be a bit string copy starting with the leftmost bit (bit 0) of the source and target fields for the lengths of the source data and the target field.
   a. The length of the source data shall be taken from the prefix of the source field, which is encoded as specified by its PRELEN and PREBYTRVS attributes.
   b. If MAXALC(TRUE) is specified for the target, the target length shall equal the target MAXLEN plus PRELEN.

c. If MAXALC(FALSE) is specified for the target, the target length shall equal MIN(source length, target MAXLEN plus PRELEN).

2. If the source data is longer than the length of the target field, the source data shall be truncated to the length of the target field.

3. The length of the bit string copied into the target field shall be encoded in the prefix of the target field, as specified by its PRELEN and PREBYTRVS attributes.

BOOLEAN-to-BOOLEAN

General Rules: The value of the source field (FALSE or TRUE), encoded as specified by the attributes of the source BOOLEAN field, shall be converted to the corresponding encoding, as specified by the attributes of the target BOOLEAN field.

CASE-to-CASE

General Rules

1. The <condition>s of the source <WHEN statement>s shall be evaluated in the order in which the <WHEN statement>s are specified in the source CASE until one of the evaluations returns TRUE.
   a. The <WHEN statement> of the target CASE with the same statement <identifier> or <positional identifier> shall then be selected.
   b. Conversion of data from the declaration specified by the selected source <WHEN statement> to the declaration specified by the selected target <WHEN statement> shall follow the general rules specified in "General Conversion Rules" on page 123.
   c. At the completion of the <assignment statement>, the <condition> of the selected target <WHEN statement> shall evaluate to TRUE and the <condition> of all target <WHEN statement>s preceding the selected target <WHEN statement> shall evaluate to FALSE. Otherwise, the *0006 -- Target CASE failure* exception shall occur.
2. If no source <WHEN statement> evaluates to TRUE, the <OTHERWISE statement> of both the source and target CASE shall be selected.
   a. If no <OTHERWISE statement> is specified on the source or target and all respective <WHEN statement>s evaluate to FALSE, the plan shall be terminated and the *0020 -- CASE rejected* exception shall occur.
   b. Conversion of data from the declaration specified by the source <OTHERWISE statement> to the declaration specified by the target <OTHERWISE statement> shall follow the general rules specified in "General Conversion Rules" on page 123.

CHARxxx-to-CHARxxx

General Rules

1. The characters of the source data shall be converted from the encodings specified by the source CCSID to the encodings specified by CDRA for the target CCSID.
   a. If the source or target CCSID is not defined by CDRA, the *0004 -- Undefined CCSID* exception shall occur.
   b. If the source or target CCSID is not supported, the *0002 -- CCSID not supported* exception shall occur.

c. If the conversion between the source CCSID and the target CCSID is invalid, the *0003 -- Invalid CCSID pairing* exception shall occur.

CHARxxx-to-CHAR

General Rules

1. Table 8 specifies the rules for obtaining the target length if the <LENGTH attribute> is specified.
2. Table 9 on page 132 specifies the rules for obtaining the target length if the <HIGH attribute> and <LOW ATTRIBUTE> are specified.
3. If JUSTIFY(LEFT) is specified for the target,
   a. If the converted data is greater than the target length, the converted data shall be truncated on the right to the length of the target.
   b. If the converted data is shorter than the target length, the converted data shall be padded to the right with the space character defined by CDRA for the target CCSID.
   c. The converted data shall be copied left-aligned to the target data area.
4. If JUSTIFY(RIGHT) is specified for the target,
   a. If the converted data is shorter than the target length, the converted data shall be padded to the left with the space character defined by CDRA for the target CCSID.
   b. If the converted data is greater than the target length, the converted data shall be truncated on the left to the length of the target.
   c. The converted data shall be copied right-aligned to the target data area.
5. If reference fields were used in the target, Table 10 on page 132 specifies how, at the end of an assignment statement, the length reference fields of the target shall be updated.

*Table 8. CHARxxx-to-CHAR Target Length Considerations with the LENGTH Attribute.*

*1. In the condition values,*

*I indicates a constant specified or defaulted for the attribute.*
*R indicates a reference to another field.*
** indicates LENGTH(*).*
*- indicates a condition that cannot occur.*
*T indicates a "TRUE" value.*
*F indicates a "FALSE" value.*

*2. Actions shall be performed in the sequence specified by the action rows of the table. Actions can be dependent on previously selected actions.*

| | | | | |
|---|---|---|---|---|
| Target <LENGTH attribute> specified by | I | * | R | R |
| Target <MAXALC attribute> value | - | - | T | F |
| Target length = target LENGTH | X | | | |
| Target length = target MAXLEN | | | X | |
| Target length = MIN(target MAXLEN, source LENGTH) | | | | X |
| Target length = MIN(length of the outermost containing constructor - the offset of the field + 1, source LENGTH) | | X | | |

*Table 9. CHARxxx-to-CHAR Target Length Considerations with the HIGH and LOW Attributes.*

1. *In the condition values,*

*I indicates a constant specified or defaulted for the attribute.*
   *R indicates a reference to another field.*

2. *Actions shall be performed in the sequence specified by the action rows of the table. Actions can be dependent on previously selected actions.*

| | | | | |
|---|---|---|---|---|
| Target <HIGH attribute> value | I | R | I | R |
| Target <LOW attribute> value | I | I | R | R |
| target high = target HIGH | X | | X | |
| target low = default value for target LOW | | | | X |
| target high = target LOW + source length - 1 | | X | | X |
| target low = target LOW | X | X | | |
| target low = target HIGH - source length + 1 | | | X | |
| Target length = target HIGH - target LOW + 1 | X | X | X | X |

*Table 10. CHARxxx-to-CHAR Target Reference Field Update Considerations.*

1. *In the condition values,*

*I indicates a constant specified or defaulted for the attribute.*
   *R indicates a reference to another field.*
   *- indicates a condition that cannot occur.*
   *T indicates a "TRUE" value.*
   *F indicates a "FALSE" value.*

2. *Actions shall be performed in the sequence specified by the action rows of the table. Actions can be dependent on previously selected actions.*

| | | | | | |
|---|---|---|---|---|---|
| Target <LENGTH attribute> value | R | R | - | - | - |
| Target <MAXALC attribute> value | T | F | - | - | - |
| Target <HIGH attribute> value | - | - | R | I | R |
| Target <LOW attribute> value | - | - | I | R | R |
| Update referenced length field to MIN(target MAXLEN, source length) | X | X | | | |
| Update HIGH(qualifier) to its derived value. | | | X | | X |
| Update LOW(qualifier) to its derived value. | | | | X | X |

CHARxxx-to-CHARPRE

General Rules

1. If MAXALC(TRUE) is specified for the target, the target length equals the target MAXLEN.
2. If MAXALC(FALSE) is specified for the target, the target length equals MIN(source length, target MAXLEN).
3. If the length of the converted source is greater than the target length, the data shall be truncated on the right to the target length.
4. The length of the character string copied into the target field shall be encoded in the prefix of the target field, as specified by its <PRELEN attribute>, <PREBYTRVS attribute>, and <UNITLEN attribute>.
5. The converted data shall be copied left-aligned to the target data portion of the field.

CHARxxx-to-CHARSFX

General Rules

1. If MAXALC(TRUE) is specified for the target, the target length equals the target MAXLEN.
2. If MAXALC(FALSE) is specified for the target, the target length equals MIN(source length, target MAXLEN).
3. If the length of the converted source is greater than the target length, the data shall be truncated on the right to the target length.
4. The encoded bytes specified by the <SFXENC attribute> of the target field shall be appended to the converted character string.
5. The converted data shall be copied left-aligned to the target data area.

---

Constructor-to-ASIS

General Rules

1. The length of the constructor shall be the inferred length of the constructor.
2. Table 7 on page 128 specifies how the length of the target shall be obtained.
3. A constructor-to-ASIS conversion shall be a bit string copy starting with the leftmost bits (bit 0) of the source constructor and the target field for the lengths of the source constructor and target field.
4. If the bit length of the source constructor is longer than the target field, the source data shall be truncated on the right to the length of the target field.
5. If the bit length of the source constructor is shorter than the target field, the source data shall be padded to the right with b'0' to the length of the target field.
6. If reference fields were used in the target, Table 7 on page 128 specifies how, at the end of an assignment statement, the reference fields of the target are updated.
7. The LENGTH of the ASIS field is the length of the constructor in bits divided by the UNITLEN of the ASIS field.

---

ENUMERATION-to-BINARY, PACKED, ZONED

General Rules

1. The value of the source field shall be assumed to be a BINARY field whose length is specified by the <LENGTH attribute> specified in the source declaration, with SCALE(0) and RADIX(2).
2. The source value shall be converted to the attributes of the target field as specified for BINARY-to-BINARY, BINARY-to-PACKED, or BINARY-to-ZONED conversions.

ENUMERATION-to-ENUMERATION

General Rules

1. The binary value of the source field shall be used to determine the <enumeration identifier> of the source declaration associated with that value.
2. The <enumeration identifier> of the source field shall be compared to the <enumeration identifier>s of the target declaration of the field.
3. If the <enumeration identifier> of the source matches one of the <enumeration identifier>s of the target, the binary value associated with the matching <enumeration identifier> of the target shall be used as the value of the field.
4. If the <enumeration identifier> of the source does not match an <enumeration identifier> of the target, the *0009 -- ENUMERATION mismatch* exception shall occur.

Examples

1.

- Specify `color` in the base record to be:

`color: ENUMERATION(red:1, green:3, blue:5, white:7);`

The values associated with each are:

`red=1, green=3, blue=5, white=7`

- Specify `color` in the view record to be:

`color: ENUMERATION(red:1, green:3, blue, white);`

The values associated with each are:

`red=1, green=3, blue=4, white=5`

- The identifiers are matched during conversions resulting in:

```
base                  view
red   is matched with red   and the target value is 1
green is matched with green and the target value is 3
blue  is matched with blue  and the target value is 4
white is matched with white and the target value is 5
```

2.

- Specify `animal` in the base record to be:

`animal: ENUMERATION(cat:1, dog:3, monkey:5, elephant:7);`

The values associated with each are:

`cat=1, dog=3, monkey=5, elephant=7`

- Specify `animal` in the view record to be:

`animal: ENUMERATION(monkey, elephant, cat, dog);`

The values associated with each are:

`monkey=0 elephant=1 cat=2 dog=3`

- The identifiers are matched during conversions resulting in:

```
base                       view
cat      is matched with   cat        and the target value is 2
dog      is matched with   dog        and the target value is 3
monkey   is matched with   monkey     and the target value is 0
elephant is matched with   elephant   and the target value is 1
```

field data types-to-ASIS

General Rules

1. Table 7 on page 128 specifies how the length of the target shall be obtained.
2. A field data type-to-ASIS conversion consists of copying the encoded bits of the source field to the target ASIS field starting with the leftmost bits (bit 0) of the source field and the target field for the length s of the source field and target field.
3. If the bit string encoding of the source field is longer than the bit length of the target field, the source data shall be truncated on the right to the length of the target field.
4. If the bit string encoding of the source field is shorter than the bit length of the target field, the source data shall be padded to the right with b'0' to the length of the target field.
5. If reference fields were used in the target, Table 7 on page 128 specifies how, at the end of an assignment statement, the reference fields of the target shall be updated.

Numeric Conversions

This section provides a mathematical basis for the numeric conversions, and offers some implementation guidelines. All implementations shall yield the same results.

References to binary FLOAT types are to FLOAT types with FORM(FB32 | FB64 | FB80 | FI128).

References to hexadecimal FLOAT types are to FLOAT types with FORM(FH32 | FH64 | FH128).

Value of Fixed-Point Numbers: The value represented by a fixed-point (ADL type BINARY, PACKED or ZONED) number is given by:

```
(01)  N = V*(R**-S)
        = V/(R**S), where
          N = the effective value being represented.
          V = the integral value which is stored in the representation
              of N.
          R = the radix of the representation of N, as specified by
              N's RADIX attribute if N is of type BINARY; otherwise
              implicitly equal to 10.
          S = the scale of the representation of N, as specified by
              N's SCALE attribute.
```

Thus for an unsigned BINARY number with a stored value of, say, B'11', the following values of N may result:

```
             --- When R = 2 ----      ----- When R = 10 -----
  S =  2     N = 3*(1/4) =  .75       N = 3*(1/100) =    .03
  S =  1     N = 3*(1/2) =  1.5       N = 3*(1/10)  =     .3
  S =  0     N = 3*1     =  3         N = 3*1       =    3
  S = -1     N = 3*2     =  6         N = 3*10      =   30
  S = -2     N = 3*4     = 12         N = 3*100     =  300
  S = -3     N = 3*8     = 24         N = 3*1000    = 3000
```

In each case the *scale factor*, as given by R**-S, defines the weight assigned to the low-order digit in the stored values. For S=2, the stored value indicates the number of quarters when R equals 2, and the number of hundredths when R equals 10.

It is important to remember that the stored value for a BINARY number is, appropriately, encoded in binary -- *even though the RADIX attribute may specify 10.*

Value of Hexadecimal-FLOAT Numbers: The value represented by a hexadecimal-FLOAT number is given by:

```
(82)  N = F*(16**e)
        = F*(16**(C-b))
        = F*(16**(C-64)), where:
          N = the effective value being represented.
          F = the value which is stored in the significand of N.
              F is understood to have an implicit radix point
              immediately to its left, with the result that:
                |F| < 1
          e = the exponent.  Equivalent to C-b, where:
              C = the characteristic stored in the representation of N.
              b = 64, the bias.
```

A hexadecimal-FLOAT number is considered to be *normalized* if the leftmost hexadecimal digit of the significand is nonzero (assuming N to be nonzero); that is:

```
(83)  (1/16) ≤ |F| < 1
```

Value of Binary-FLOAT Numbers: The following material deals with numeric values only; it does not deal with "not a number" (NaN) or infinity.

*Normalized Numbers:* A normalized binary-FLOAT number has a nonzero characteristic, and the value represented is given by:

```
(84)  N = F*(2**e)
        = F*(2**(C-b)), where:
          N = the effective value being represented.
          F = the significand of N.  F is composed of a 1, followed
              by an implicit radix point, followed by a fraction; with
              the result that:
                1 ≤ |F| < 2
              If the field is extended-precision, then the entire
              significand, including the leading one, is stored
              left-justified in the field's significand bits.
              If the field is not extended precision, then only the
              fractional part is stored, also left-justified, and
              the implicit radix point stands immediately to the
              left.
          e = the exponent.  Equivalent to C-b, where:
              C = the characteristic stored in the representation of N.
              b = 127, when single-precision.
              b = 1023, when double-precision.
              b = 16383, when extended-precision.
```

*Denormal Numbers:* A Denormal binary-FLOAT number has a zero characteristic, and the value represented is given by:

```
(05)  N = F*(2**e)
        = F*(2**(C-b)), where:
          N = the effective value being represented.
          F = the significand of N.  F is composed of an implicit
              radix point, followed by a stored fraction; with the
              result that:
                |F| < 1
          e = the exponent.  Equivalent to C-b, where:
              C = the characteristic stored in the representation of N.
              b = 127, when single-precision.
              b = 1023, when double-precision.
              b = 16383, when extended-precision.
```

A denormal binary-FLOAT number with a zero-significand represents a zero.

Fixed-Point-to-Fixed-Point Conversions: The objective of a numeric conversion is to set the stored value of the target field in such a way that the target's effective value, $N_t$, is as near as possible to the source field's effective value, $N_s$. That is:

(06) $N_t \approx N_s$

Substituting from (01):

(07) $V_t*(R_t**-S_t) \approx V_s*(R_s**-S_s)$

Solving for $V_t$, the value to be stored in the target:

(08) $V_t \approx V_s*((R_tS_t)/(R_sS_s))$

The reasons why approximations (06), (07) and (08) may not be exact is that not all conversions can be exact. Consider a source BINARY such that:

$R_s = 10 \quad S_s = 1 \quad V_s = 15$

Then, $N_s = 1.5$, from (01).

If this source BINARY is converted to radix-2 BINARY targets with various scales we get:

| | --- $V_t$ from (08) -- | $N_t$ from (01) |
|---|---|---|
| $S_t = 2$ | = 15*(4/10) = 6 | 1.5 |
| $S_t = 1$ | = 15*(2/10) = 3 | 1.5 |
| $S_t = 0$ | = 15*(1/10) = 1.5 | 1 or 2 |
| $S_t = -1$ | = 15*(1/20) = .75 | 0 or 2 |
| $S_t = -2$ | = 15*(1/40) = .375 | 0 |

Notice that when $S_t$ equals 2 or 1 the corresponding $V_t$ represents the number of quarters or halves, respectively, and $N_t$ equals $N_s$ exactly. In the other three cases the requirement that $V_t$ be an integer necessitates truncation or rounding, with various degrees of correspondence between $N_t$ and $N_s$.

Another way to view the situation is to realize that for $S_t$ equal to 0, -1 or -2, $V_t$ represents the number of 1s, 2s or 4s, respectively, and fractional values cannot be represented.

The preceding example demonstrates how digits may be lost from the right-hand end of $V_t$. It should also be noted that digits may be lost from the left-hand end if the target precision, $P_t$, as given by the target's PRECISION attribute, is insufficient to accommodate the results given by (08). For example:

```
     Rs =      10                 Rt = 10
     Ss =       2                 St =  2
     Vs = 123425                  Pt =  4
     Ns =   1234.25, from (01).
     Then,
(09) Vt = 123425*((10**2)/(10**2)) = 123425, from (08).
     But, because Pt equals 4, the results of (09) must
     be of the form MOD(x,10**4), yielding:
     MOD(123425,10**4) = MOD(123425,10000) = 3425
     Applying (01) for Vt = 3425 gives the result:
     Nt = 34.25
```

In the case of unconstrained targets, the width of $V_t$ may not be limited by the target's PRECISION attribute.

*Rounding and Truncation of Fixed-Point Numbers:* That (08) must be an approximation is due to the fact that in the computer environment numbers are constricted to finite-length representations, and, in some cases, the attributes of source and target numbers may be such as to require some inexactitude, as was shown in the examples.

The purpose of this section is to derive from approximation (08) an unambiguous equation which exactly describes fixed-point to fixed-point conversions. Toward this end, four new variables will be introduced:

$V_i$ An intermediate stored value that will be derived directly from (08). It is introduced in order to help make clear how truncation and rounding are accomplished.

$W_t$ The effective width of the target. This variable is introduced in order to accommodate high-order truncation, when needed.

$B_{wt}$ The effective base against which $W_t$ will be applied. Its value will be either 2 or 10.

H The half-round term that will determine whether the low-order end of the target will be truncated or rounded. Its value will be either .5 or zero, depending on the FIT attribute of the target.

The derivation of an equality to replace approximation (08) is rather simple:

```
(10) Vi = Vs*((Rt**St)/(Rs**Ss)), from (08).
(11) Vt = MOD(FLOOR(Vi+H),(Bwt**Wt)), when Vi ≥ 0.
     Vt = MOD(CEIL(Vi-H),(Bwt**Wt)), when Vi < 0.
```

Equation (10) simply accepts the results of (08) without constraints. Equation (11) applies the constraints. The first argument to the MOD function ensures that the stored target value will be an integer, rounded or truncated if necessary. Application of the MOD function ensures that the stored target value will, if necessary, be truncated on the left to the proper width.

It remains to show how $W_t$, $B_{wt}$ and H receive their values. All ADL attributes used are those of the target:

$W_t$ – is equal to:

- The PRECISION attribute when the target is:
  - BINARY CONSTRAINED(TRUE)
  - PACKED CONSTRAINED(TRUE)
  - PACKED CONSTRAINED(FALSE) SIGNED(TRUE) with odd PRECISION
  - PACKED CONSTRAINED(FALSE) SIGNED(FALSE) with even PRECISION
  - ZONED
- The PRECISION attribute + 1 when the target is:
  - PACKED CONSTRAINED(FALSE) SIGNED(TRUE) with even PRECISION

- PACKED CONSTRAINED(FALSE) SIGNED(FALSE) with odd PRECISION

- The LENGTH attribute when the target is:
  - BINARY CONSTRAINED(FALSE) SIGNED(FALSE)
- The LENGTH attribute - 1 when the target is:
  - BINARY CONSTRAINED(FALSE) SIGNED(TRUE)

$B_{wt}$ -- is equal to:

- The RADIX attribute when the target is:
  - BINARY CONSTRAINED(TRUE)
- 2 when the target is:
  - BINARY CONSTRAINED(FALSE)
- 10 when the target is:
  - PACKED
  - ZONED H – is equal to:

- Zero when FIT(TRUNCATE)
- 0.5 when FIT(ROUND) or FIT(EXACT)

Hexadecimal-FLOAT-to-Fixed-Point Conversions: This conversion proceeds along much the same line as the fixed-point-to-fixed-point conversions:

(12) $N_t = N_s$
Substituting from (01) for the target and from (02) for the source:
(13) $V_t*(R_t**-S_t) = F_s*(16**e_s)$
Solving for $V_t$, the value to be stored in the target:
(14) $V_t = F_s*(16**e_s)*(R_t**S_t)$ Since the attributes specified for the target may preclude an exact conversion, provision is made for truncation and rounding, as is done for conversion between fixed-point numbers:

(15) $V_i = F_s*(16**e_s)*(R_t**S_t)$, from (14).
then, using equation (11) to apply constraints:
$V_t = MOD(FLOOR(V_i+H),(B_{wt}**W_t))$, when $V_i \geq 0$.
$V_t = MOD(CEIL(V_i-H),(B_{wt}**W_t))$, when $V_i < 0$.

The variables H, $B_{wt}$ and $W_t$ receive their values as previously described in "Rounding and Truncation of Fixed-Point Numbers" on page 138.

Fixed-Point-to-Hexadecimal-FLOAT Conversions: This derivation is for nonzero values and is intended to yield a normalized target. The conversion is complicated somewhat by the fact that two values must be stored in the target -- the significand and the characteristic. Portions of the following treatment are expressed in terms of absolute values in order to facilitate the use of logarithms:

(16) $|N_t| \approx |N_s|$

Substituting from (02) for the target:

(17) $|F_t*(16**e_t)| \approx |N_s|$, where:

$N_s = V_s*(R_s**-S_s)$, from (01).

Temporarily letting $F_t$ equal 16**-1 (the minimum normalized significand) and taking the base-16 logarithm:

(18) $-1+e_t \approx \log_{16}(|N_s|)$

(19) $e_t \approx \log_{16}(|N_s|)+1$

Since the exponent must be an integer, we set it as:

(20) $e_t$ = FLOOR($\log_{16}(|N_s|)+1$)

Application of (20) implies that $F_t$ may no longer be equal to 16**-1, but lies in the range:

$(1/16) \le F_t < 1$

The final approximation of $F_t$, with consideration for the sign, is determined by:

$F_t*(16**e_t) \approx N_s$, from (17).

(21) $F_t \approx N_s*(16**-e_t)$

The discussion thus far has derived an exact expression for the target exponent, $e_t$, and an approximation of the target significand, $F_t$; both are expressed as functions of the effective source value, $N_s$. It remains to determine the stored target characteristic, $C_t$, and an exact expression for $F_t$, allowing for possible rounding or truncation to the target significand width.

The characteristic is easily dealt with:

(22) $C_t = e_t+64$

Using $F_i$ as an intermediate value, the final expression of the target significand is derived by:

$F_i = N_s*(16**-e_t)$, from (21).

(23) $F_t$ = FLOOR($(F_i*(16**W_t))+H$) * $(16**-W_t)$, when $F_i > 0$.

$F_t$ = CEIL($(F_i*(16**W_t))-H$) * $(16**-W_t)$, when $F_i < 0$.

where:

$W_t$ = 6, for single precision.

$W_t$ = 14, for double precision.

$W_t$ = 28, for extended precision.

H = 0, when FIT(TRUNCATE).

H = 0.5, when FIT(ROUND) or FIT(EXACT).

The expression within the FLOOR or CEIL function effectively moves the radix point right, to the width of the target significand, and rounds the integer part of the result. The FLOOR or CEIL function then truncates any remaining fraction. The FLOOR or CEIL function is then multiplied by a factor that effectively moves the radix point back to the left.

Finally, it should be noted that an exception can occur if $C_t$ falls outside the range -128 through 127.

Binary-FLOAT-to-Fixed-Point Conversions: The following material deals with numeric values only; it does not deal with "not a number" (NaN) or infinity.

This conversion proceeds along much the same line as the fixed-point-to-fixed-point conversions:

(24) $N_t \approx N_s$

Substituting from (01) for the target and from (04) or (05) for the source:

(25) $V_t*(R_t**-S_t) \approx F_s*(2**e_s)$

Solving for $V_t$, the value to be stored in the target:

(26) $V_t \approx F_s*(2**e_s)*(R_t**S_t)$

Since the attributes specified for the target may preclude an exact conversion, provision is made for truncation and rounding, as is done for conversion between fixed-point numbers:

(27) $V_i = F_s*(2**e_s)*(R_t**S_t)$, from (26).
then, using equation (11) to apply constraints:
$V_t = MOD(FLOOR(V_i+H),(B_{wt}**W_t))$, when $V_i \geq 0$.
$V_t = MOD(CEIL(V_i-H),(B_{wt}**W_t))$, when $V_i < 0$.

The variables H, $B_{wt}$ and $W_t$ receive their values as previously described in "Rounding and Truncation of Fixed-Point Numbers" on page 138.

Note that when the source is normalized, and not of extended-precision, the significand includes an implicit integer 1, which is not stored. Otherwise the 1 is explicit, and is stored.

When the source is denormal, the significand consists solely of the stored fraction.

Fixed-Point-to-Binary-FLOAT Conversions: The following material deals with nonzero values only; it does not deal with "not a number" (NaN) or infinity.

The conversion is complicated somewhat by the fact that two values must be stored in the target -- the significand and the characteristic. Portions of the following treatment are expressed in terms of absolute values in order to facilitate the use of logarithms:

(28) $|N_t| = |N_s|$
Substituting from (04) for the target:
(29) $|F_t*(2**e_t)| = |N_s|$, where:
$N_s = V_s*(R_s**-S_s)$, from (01).
Temporarily letting $F_t$ equal 1 (the minimum normalized significand) and taking the base-2 logarithm:
(30) $e_t = \log_2(|N_s|)$
Since the exponent must be an integer, we set it as:
(31) $e_t = FLOOR(\log_2(|N_s|))$
Application of (31) implies that $F_t$ may no longer be equal to 1, but lies in the range:
$1 \leq F_t < 2$
The final approximation of $F_t$, with consideration for the sign, is determined by:
$F_t*(2**e_t) \approx N_s$, from (29).
(32) $F_t \approx N_s*(2**-e_t)$ The discussion thus far has derived an exact expression for the target exponent, $e_t$, and an approximation of the target significand, $F_t$; both are expressed as functions of the effective source value, $N_s$. It remains to determine the stored target characteristic, $C_t$, and an exact expression for $F_t$, allowing for possible rounding or truncation to the target significand width.

The characteristic is easily dealt with:

(33) $C_t = e_t+127$, for single-precision.
$C_t = e_t+1023$, for double-precision.
$C_t = e_t+16383$, for extended-precision.

Using $F_i$ as an intermediate value, the final expression of the target significand is derived by:

$F_i = N_s*(2**-e_t)$, from (32).
(34) $F_t = FLOOR((F_i*(2**W_t))+H) * (2**-W_t)$, when $F_i > 0$.
$F_t = CEIL((F_i*(2**W_t))-H) * (2**-W_t)$, when $F_i < 0$.
where:
$W_t = 23$, for single precision.
$W_t = 52$, for double precision.
$W_t = 63$, for extended precision.
H = 0, when FIT(TRUNCATE).
H = 0.5, when FIT(ROUND).

The expression within the FLOOR or CEIL function effectively moves the radix point right, to the width of the target significand, and rounds the integer part of the result. The FLOOR or CEIL function then truncates any remaining fraction. The FLOOR or CEIL function is then multiplied by a factor that effectively moves the radix point back to the left.

For a single precision target, an exception can occur if $C_t$ is greater than 254. Also, if $C_t$ is less than 1, then prior to application of (34):

- $F_t$ should be divided by 2**(1-$C_t$).
- $C_t$ should be set to zero.

The result will be a denormal number, or zero.

Finally, only the fractional part of $F_t$ should be stored in the target, except in the case of extended precision, where the integer digit is also stored.

Base Conversions: The information in this section has been derived from: Donald E. Knuth, *The Art of Computer Programming*, 2nd. ed. (Reading, Mass.: Addison-Wesley, 1981), vol. 2, p. 302.

An integer may be represented by a string of digits ($D_m...D_1D_0$). Similarly, a fraction may be represented by a string of digits ($0.D_{-1}D_{-2}...D_{-m}$). Each D represents a single digit in the representation of a number, and will have the value 0 or 1 in a base-2 representation, or one of the values 0 through 9 in a base-10 representation.

Note: The ADL BINARY and Hexadecimal-FLOAT types are both base-2 representations, even though the RADIX attribute may specify 10. The term *base* is used in this section instead of the more correct term *radix* in order to avoid any confusion with the RADIX attribute.

*Conversion of Integers:* Given an integer number, N, we can obtain its base-B representation ($D_m...D_1D_0$) as follows:

```
D0 = MOD(N,B)
D1 = MOD(FLOOR(N/B),B)
D2 = MOD(FLOOR(FLOOR(N/B)/B),B)
...
etc., stopping when:
FLOOR(...FLOOR(FLOOR(N/B)/B).../B) = 0
```

For example, to convert 123 to a base-2 representation:

```
D0 = MOD(123,2) = 1
D1 = MOD(FLOOR(123/2),2) = MOD(61,2) = 1
D2 = MOD(FLOOR(61/2),2) = MOD(30,2) = 0
D3 = MOD(FLOOR(30/2),2) = MOD(15,2) = 1
D4 = MOD(FLOOR(15/2),2) = MOD(7,2) = 1
D5 = MOD(FLOOR(7/2),2) = MOD(3,2) = 1
D6 = MOD(FLOOR(3/2),2) = MOD(1,2) = 1
D7 = MOD(FLOOR(1/2),2) = MOD(0,2) = 0,
yielding the digit string "1111011" (D7 is a leading zero).
```

*Conversion of Fractions:* Given a fraction, N, we can obtain its base-B representation ($0.D_{-1}D_{-2}...D_{-m}$) as follows:

```
D-1 = FLOOR(N*B)
D-2 = FLOOR({N*B}*B)
D-3 = FLOOR({{N*B}*B}*B)
...
where {x} denotes MOD(x,1).
```

For example, to convert .125 to a base-2 representation:

```
D-1 = FLOOR(.125*2) = 0
D-2 = FLOOR(MOD(.125*2,1)*2) = FLOOR(.25*2) = 0
D-3 = FLOOR(MOD(.25*2,1)*2) = FLOOR(.5*2) = 1
D-4 = FLOOR(MOD(.5*2,1)*2) = FLOOR(0*2) = 0,
yielding the digit string "001" (D-4 is a trailing zero).
```

General Numeric Conversion Rules

Rules for Retrieval of Source Values

- The stored value of a fixed-point field shall be retrieved from all digit positions across the full width of the field. All fixed-point source fields shall be treated as unconstrained.
- The stored significand of a floating-point field shall be retrieved from all bits across the full width of the significand, even though the field's PRECISION attribute may specify a precision smaller than the maximum for the field's length.

Rules for "Not a Number" (NaN), Infinity and Negative Zero: If the source field is a binary-FLOAT then:

1. If the target field is not a binary-FLOAT then:
   a. If the source value is "Not a Number" (NaN) then:
      - Set the target value to zero.
      - Exception *0014 -- Unable to convert "Not a Number" (NaN)* occurs.

b. If the source value is infinity then:
      - Set the target value to zero.
      - Exception *0015 -- Unable to convert infinity* occurs c. If the source value is negative zero, then set the target value to zero.
2. If the target field is a binary-FLOAT, then encode the source value in the target field.

Rules for the BYTRVS Attribute: There can be no general rule for handling this attribute. BYTRVS processing will depend on the environment in which the conversions are done and the instruction set used.

Rules for Floating-Point Overflow and Underflow

1. If the target field is a hexadecimal-FLOAT field, then:
   a. If a conversion results in an exponent less than -64 then:
      - Set the target characteristic to zero.
      - Store the target significand that results from the conversion.
      - Set exception *0013 -- Floating-point underflow*.

b. If a conversion results in an exponent greater than 63 then:
      - Set the target characteristic to 127.
      - Store the target significand that results from the conversion.
      - Set exception *0005 -- Floating-point overflow*.
2. If the target field is a binary-FLOAT field, then:
   a. If a conversion results in an exponent greater than:
      - 127, for a single-precision target,

- 1023, for a double-precision target, or
- 16383, for an extended-precision target, then:

- Set the target field to "not a number" (NaN).
- Exception *0005 -- Floating-point overflow* occurs.

Rules for the COMPLEX Attribute

1. If COMPLEX(TRUE) is specified for the source field then:
   a. If COMPLEX(TRUE) is specified for the target field then:
      - The real part of the source field shall be assigned to the real part of the target field.
      - The imaginary part of the source field shall be assigned to the imaginary part of the target field.

b. If COMPLEX(FALSE) is specified for the target field then:
      - Set the target field to zero.
      - Set exception *0018 - Assignment of complex to scalar*.
2. If COMPLEX(FALSE) is specified for the source field then:
   a. If COMPLEX(FALSE) is specified for the target field, then assign the source field to the target field.

b. If COMPLEX(TRUE) is specified for the target field then:
      - Assign the source field to the real part of the target field.
      - Set the imaginary part of the target field to zero.

Rules for Target FIT Attribute: If a conversion results in loss of low-order digits then:

1. If FIT(TRUNCATE) is specified for the target field, then store the result in the target field.
2. If FIT(ROUND) is specified for the target field, then round and store the result in the target field.
3. If FIT(EXACT) is specified for the target field then:
   a. If the target is a fixed-point field then:
      - Round and store the result in the target field.
      - Exception *0022 -- Fixed-point fit violation* occurs.

b. If the target is a floating-point field then:
      - Round and store the result in the target field.
      - Exception *0019 -- Floating-point fit violation* occurs.

Rules for Target CONSTRAINED Attribute

1. If CONSTRAINED(FALSE) is specified for the target field then:
   a. If the number of significant digits required in the stored value exceeds the number of digits available in the full width of the field then:
      - Truncate the value to the full width, discarding excess high-order digits, and store the result.
      - Exception *0011 -- Fixed-point overflow* occurs.
2. If CONSTRAINED(TRUE) is specified for the target field then:

a. If the number of significant digits required in the stored value exceeds the number of digits available in the full width of the field then:

- Truncate the value to the full width, discarding excess high-order digits, and store the result.
- Exception *0011* -- *Fixed-point overflow* occurs.

b. Else if the number of significant digits required in the stored value exceeds the number of digits specified by the PRECISION attribute then:

- Store all significant digits.
- Exception *0021* -- *Fixed-point constraint violation* occurs.

Note for BINARY Targets

If RADIX(10) is specified for a BINARY field, the number of significant digits cannot be determined simply by counting bits. The PRECISION attribute refers to *equivalent decimal digits*, and the equivalent number of significant digits must be determined by examining the magnitude of the stored value.

PRECISION(3) means that the absolute stored value should not exceed 999, for example.

Rules for Signs

*Definitions*

- A signed number is:
  - A BINARY field with SIGNED(TRUE) specified.
  - A FLOAT field.
  - A PACKED field with SIGNED(TRUE), SGNMNS, and SGNPLS specified.
  - A ZONED field with SIGNED(TRUE) specified.
- An unsigned number is:
  - A BINARY field with SIGNED(FALSE) specified.
  - A PACKED field with SIGNED(TRUE) and SGNUNS specified.
  - A PACKED field with SIGNED(FALSE) specified.
  - A ZONED field with SIGNED(FALSE) specified.

*Rules*

1. If the source field and the target field are both of the BINARY or ENUMERATION data types, see the General Rules of " <SGNCNV attribute> " on page 111.
2. If a signed number is assigned to a signed number, then the equivalent sign of the source shall be encoded in the target, as appropriate for the target's data type and sign-related attributes.
3. If a signed number is assigned to an unsigned number then:
   - The absolute value of the source shall be assigned to the target.
   - If the source value is negative, set exception 0012 - Assignment of negative to unsigned field.
4. If an unsigned number is assigned to an unsigned number, then there are no sign considerations.
5. If an unsigned number is assigned to a signed number, then the source shall be treated as positive, and the target shall be set positive as appropriate for the target's data type and sign-related attributes.

Design Notes

The algorithms in this section, when dealing with BINARY data fields, require that stored values from negative sources be complemented to positive before processing. Subsequent encoding of the target should correspond with the sign of the source.

Conversion Between Fixed-Point Fields of Like Radix

*All Cases Except BINARY-RADIX(10)-to-BINARY-RADIX(10):* The following material is applicable to conversions between two BINARY fields, where RADIX(2) is specified for both fields, or between any combination of PACKED or ZONED fields. It is not applicable to conversions between two BINARY fields, where RADIX(10) is specified for both fields.

Recall approximation (08), which yields the raw target stored value, $V_t$:

$$V_t \approx V_s*((R_tS_t)/(R_sS_s))$$

When $R_t$ is equal to $R_s$, the expression can be reduced to:

$$V_t \approx V_s*(R_t**(S_t-S_s))$$

It is apparent that $V_t$ can be generated by performing shift operations on $V_s$:

1. Move the digits of $V_s$ to an intermediate field, X. The width of X should be the greater of the effective widths of the source and target fields. The effective width of a field shall be determined as shown for $W_t$ in "Rounding and Truncation of Fixed-Point Numbers" on page 138. $V_s$ should be right-justified in X.
2. Shift X $(S_t-S_s)$ digits; left if positive, right if negative. Zeroes should be shifted in. Take note of any digits shifted out.
3. If any nonzero digits are shifted out of the right-hand end, then the target's FIT attribute becomes a concern:
   - If FIT(EXACT) is specified, then a fixed-point fit violation has occurred.
   - If FIT(EXACT) or FIT(ROUND) is specified, then X should be rounded, based on the value of the last digit shifted out.
4. If any nonzero digits are shifted out of the left-hand end, or if there are any nonzero digits to the left of the target's effective width, then a fixed-point overflow has occurred.
5. If there are any nonzero digits to the left of the target's PRECISION, and CONSTRAINED(TRUE) has been specified for the target, then a fixed-point constraint violation has occurred.
6. Truncate X on the left to the target's effective width. What remains are the digits for $V_t$.
7. Do not forget to properly encode the digits of X when moving them to the target field.

*BINARY-RADIX(10)-to-BINARY-RADIX(10):* The difficulty with this case is that the stored value is encoded in binary, even though RADIX(10) is specified. The result is a base-10 scaling applied to a base-2 number, and simply shifting $V_s$ will not work. $V_s$ must first be converted to a base-10 encoding, then shifted, then converted back to a base-2 encoding:

1. Convert $V_s$ to a base-10 encoded intermediate field, X, 20 digits wide. Base conversion of integers is outlined in "Conversion of Integers" on page 142.
2. Shift X $(S_t-S_s)$ digits; left if positive, right if negative. Zeroes should be shifted in. Take note of any digits shifted out.
3. If any nonzero digits are shifted out of the right-hand end, then the target's FIT attribute becomes a concern:
   - If FIT(EXACT) is specified, then a fixed-point fit violation has occurred.

- If FIT(EXACT) or FIT(ROUND) is specified, then X should be rounded, based on the value of the last digit shifted out.

4. If any nonzero digits are shifted out of the left-hand end, or if there are any nonzero digits to the left of the target's effective width, then a fixed-point overflow has occurred.
5. If there are any nonzero digits to the left of the target's PRECISION, and CONSTRAINED(TRUE) has been specified for the target, then a fixed-point constraint violation has occurred.
6. Convert X to a base-2 encoded (binary) intermediate field, Y, using as many resultant digits as are necessary.
7. Truncate Y on the left to the target's effective binary width, as given by:
   - The LENGTH attribute when SIGNED(FALSE) is specified.
   - The LENGTH attribute - 1 when SIGNED(TRUE) is specified.
8. If any nonzero digits are lost as a result of the truncation, then a fixed-point overflow has occurred.
9. Y contains the digits for $V_t$.

Conversion From Hexadecimal-FLOAT-to-BINARY

*When Target is BINARY RADIX(2):* This conversion can also be viewed as a shifting operation:

1. Move the digits of the source significand to an intermediate field, X. The width of X should be the greater of the effective widths of the source and target fields. The effective width of the target field may be determined as shown for $W_t$ in "Rounding and Truncation of Fixed-Point Numbers" on page 138. The effective width of the source field is equal to:
   - 24, if the source is single-precision.
   - 56, if the source is double-precision.
   - 112, if the source is extended-precision.

The digits of the source significand should be right-justified in X, and, if the source is extended-precision, should not include the digits from the secondary characteristic.
2. Set the following variables:

$R_s$ = 2, this will be used as a radix in a simulated binary.
   $S_s$ = 4*(Y-$e_s$), a scale, where:
   Y = 6, if the source is single-precision.
   Y = 14, if the source is double-precision.
   Y = 28, if the source is extended-precision.
   $e_s$ = the source exponent.
3. Shift X ($S_t$-$S_s$) digits; left if positive, right if negative. Zeroes should be shifted in. Take note of any digits shifted out.
4. If any nonzero digits are shifted out of the right-hand end, then the target's FIT attribute becomes a concern:
   - If FIT(EXACT) is specified, then a fixed-point fit violation has occurred.
   - If FIT(EXACT) or FIT(ROUND) is specified, then X should be rounded, based on the value of the last digit shifted out.
5. If any nonzero digits are shifted out of the left-hand end, or if there are any nonzero digits to the left of the target's effective width, then a fixed-point overflow has occurred.
6. If there are any nonzero digits to the left of the target's PRECISION, and CONSTRAINED(TRUE) has been specified for the target, then a fixed-point constraint violation has occurred.
7. Truncate X on the left to the target's effective width. What remains are the digits for $V_t$.

Conversion From BINARY-to-Hexadecimal-FLOAT

*When Source is BINARY RADIX(2):* This conversion can also be viewed as a shifting operation:

1. Move the bits of $V_s$ to an intermediate 68-bit field, X. $V_s$ should be left-justified in X.
2. Set the following variables:

$Y = MOD(|S_s|,4)$
   $Z = (S_s+Y)/4$
   $e_t = W_t-Z$, where:
   $W_t = 6$, if the target is single-precision.
   $W_t = 14$, if the target is double-precision.
   $W_t = 28$, if the target is extended-precision.
   $S_s$ = the source scale.

3. Repetitively shift X left until the first $(W_t+Y)$ bits are nonzero. Note the number of shifts required.
4. Set:

$e_t = e_t$ - the number of shifts required.

Now $e_t$ is equal to the target exponent.

5. If $e_t$ is less than -64, then a floating-point underflow has occurred.
6. If $e_t$ is greater than 63, then a floating-point overflow has occurred.
7. Shift X to the right Z bits.
8. Truncate X on the right, to the width $(W_t*4)$.
9. If any nonzero bits are lost as a result of the truncation, then the target's FIT attribute becomes a concern:
   - If FIT(EXACT) is specified, then a floating-point fit violation has occurred.
   - If FIT(EXACT) or FIT(ROUND) is specified, then X should be rounded, based on the value of the left-most bit lost as a result of the truncation.
10. X contains the bits for the target significand.
11. If the target is extended-precision, don't forget to leave space for the secondary characteristic when moving X to the target.

Specific Numeric Conversion Rules

The following sections list rules for specific conversions.

Rules for BINARY-to-BINARY

*General Rules*

- "Rules for the COMPLEX Attribute" on page 144
- "Rules for Retrieval of Source Values" on page 143
- "Rules for the BYTRVS Attribute" on page 143
- "Rules for Target FIT Attribute" on page 144
- "Rules for Target CONSTRAINED Attribute" on page 144
- "Rules for Signs" on page 145

*Design Notes*

- "Conversion Between Fixed-Point Fields of Like Radix" on page 146

Rules for BINARY-to-Hexadecimal-FLOAT

*General Rules*

- "Rules for the COMPLEX Attribute" on page 144
- "Rules for Retrieval of Source Values" on page 143
- "Rules for the BYTRVS Attribute" on page 143
- "Rules for Floating-Point Overflow and Underflow" on page 143
- "Rules for Target FIT Attribute" on page 144
- "Rules for Signs" on page 145

*Design Notes*

- "Conversion From BINARY-to-Hexadecimal-FLOAT" on page 148

Rules for BINARY-to-Binary-FLOAT

*General Rules*

- "Rules for the COMPLEX Attribute" on page 144
- "Rules for Retrieval of Source Values" on page 143
- "Rules for the BYTRVS Attribute" on page 143
- "Rules for Floating-Point Overflow and Underflow" on page 143
- "Rules for Target FIT Attribute" on page 144
- "Rules for Signs" on page 145

Rules for BINARY-to-PACKED

*General Rules*

- "Rules for the COMPLEX Attribute" on page 144
- "Rules for Retrieval of Source Values" on page 143
- "Rules for the BYTRVS Attribute" on page 143
- "Rules for Target FIT Attribute" on page 144
- "Rules for Target CONSTRAINED Attribute" on page 144
- "Rules for Signs" on page 145

*Design Notes*

- "Conversion Between Fixed-Point Fields of Like Radix" on page 146

Rules for BINARY-to-ZONED

*General Rules*

- "Rules for the COMPLEX Attribute" on page 144
- "Rules for Retrieval of Source Values" on page 143
- "Rules for the BYTRVS Attribute" on page 143
- "Rules for Target FIT Attribute" on page 144
- "Rules for Target CONSTRAINED Attribute" on page 144
- "Rules for Signs" on page 145

*Design Notes*

- "Conversion Between Fixed-Point Fields of Like Radix" on page 146

Rules for Hexadecimal-FLOAT-to-BINARY

*General Rules*

- "Rules for the COMPLEX Attribute" on page 144
- "Rules for Retrieval of Source Values" on page 143
- "Rules for the BYTRVS Attribute" on page 143
- "Rules for Target FIT Attribute" on page 144
- "Rules for Target CONSTRAINED Attribute" on page 144
- "Rules for Signs" on page 145

*Design Notes*

- "Conversion From Hexadecimal-FLOAT-to-BINARY" on page 147

Rules for Hexadecimal-FLOAT-to-Hexadecimal-FLOAT

*General Rules*

- "Rules for the COMPLEX Attribute" on page 144
- "Rules for Retrieval of Source Values" on page 143
- "Rules for Target FIT Attribute" on page 144
- "Rules for Signs" on page 145

Rules for Hexadecimal-FLOAT-to-Binary-FLOAT

*General Rules*

- "Rules for the COMPLEX Attribute" on page 144
- "Rules for Retrieval of Source Values" on page 143
- "Rules for the BYTRVS Attribute" on page 143
- "Rules for Floating-Point Overflow and Underflow" on page 143
- "Rules for Target FIT Attribute" on page 144
- "Rules for Signs" on page 145

Rules for Hexadecimal-FLOAT-to-PACKED

*General Rules*

- "Rules for the COMPLEX Attribute" on page 144
- "Rules for Retrieval of Source Values" on page 143
- "Rules for Target FIT Attribute" on page 144
- "Rules for Target CONSTRAINED Attribute" on page 144
- "Rules for Signs" on page 145

Rules for Hexadecimal-FLOAT-to-ZONED

*General Rules*

- "Rules for the COMPLEX Attribute" on page 144
- "Rules for Retrieval of Source Values" on page 143
- "Rules for Target FIT Attribute" on page 144
- "Rules for Target CONSTRAINED Attribute" on page 144
- "Rules for Signs" on page 145

Rules for Binary-FLOAT-to-BINARY

*General Rules*

- "Rules for the COMPLEX Attribute" on page 144
- "Rules for Retrieval of Source Values" on page 143
- "Rules for the BYTRVS Attribute" on page 143
- "Rules for "Not a Number" (NaN), Infinity and Negative Zero" on page 143
- "Rules for Target FIT Attribute" on page 144
- "Rules for Target CONSTRAINED Attribute" on page 144
- "Rules for Signs" on page 145

Rules for Binary-FLOAT-to-Hexadecimal-FLOAT

*General Rules*

- "Rules for the COMPLEX Attribute" on page 144
- "Rules for Retrieval of Source Values" on page 143
- "Rules for the BYTRVS Attribute" on page 143
- "Rules for "Not a Number" (NaN), Infinity and Negative Zero" on page 143
- "Rules for Floating-Point Overflow and Underflow" on page 143
- "Rules for Target FIT Attribute" on page 144
- "Rules for Signs" on page 145

Rules for Binary-FLOAT-to-Binary-FLOAT

*General Rules*

- "Rules for the COMPLEX Attribute" on page 144
- "Rules for Retrieval of Source Values" on page 143
- "Rules for the BYTRVS Attribute" on page 143
- "Rules for Floating-Point Overflow and Underflow" on page 143
- "Rules for Target FIT Attribute" on page 144
- "Rules for Signs" on page 145

Rules for Binary-FLOAT-to-PACKED

*General Rules*

- "Rules for the COMPLEX Attribute" on page 144
- "Rules for Retrieval of Source Values" on page 143
- "Rules for the BYTRVS Attribute" on page 143
- "Rules for "Not a Number" (NaN), Infinity and Negative Zero" on page 143
- "Rules for Target FIT Attribute" on page 144
- "Rules for Target CONSTRAINED Attribute" on page 144
- "Rules for Signs" on page 145

Rules for Binary-FLOAT-to-ZONED

*General Rules*

- "Rules for the COMPLEX Attribute" on page 144
- "Rules for Retrieval of Source Values" on page 143
- "Rules for the BYTRVS Attribute" on page 143
- "Rules for "Not a Number" (NaN), Infinity and Negative Zero" on page 143
- "Rules for Target FIT Attribute" on page 144
- "Rules for Target CONSTRAINED Attribute" on page 144
- "Rules for Signs" on page 145

Rules for PACKED-to-BINARY

*General Rules*

- "Rules for the COMPLEX Attribute" on page 144
- "Rules for Retrieval of Source Values" on page 143
- "Rules for the BYTRVS Attribute" on page 143
- "Rules for Target FIT Attribute" on page 144
- "Rules for Target CONSTRAINED Attribute" on page 144
- "Rules for Signs" on page 145

*Design Notes*

- "Conversion Between Fixed-Point Fields of Like Radix" on page 146

Rules for PACKED-to-Hexadecimal-FLOAT

*General Rules*

- "Rules for the COMPLEX Attribute" on page 144
- "Rules for Retrieval of Source Values" on page 143
- "Rules for Floating-Point Overflow and Underflow" on page 143
- "Rules for Target FIT Attribute" on page 144
- "Rules for Signs" on page 145

Rules for PACKED-to-Binary-FLOAT

*General Rules*

- "Rules for the COMPLEX Attribute" on page 144
- "Rules for Retrieval of Source Values" on page 143
- "Rules for the BYTRVS Attribute" on page 143
- "Rules for Floating-Point Overflow and Underflow" on page 143
- "Rules for Target FIT Attribute" on page 144
- "Rules for Signs" on page 145

Rules for PACKED-to-PACKED

*General Rules*

- "Rules for the COMPLEX Attribute" on page 144
- "Rules for Retrieval of Source Values" on page 143
- "Rules for Target FIT Attribute" on page 144
- "Rules for Target CONSTRAINED Attribute" on page 144
- "Rules for Signs" on page 145

*Design Notes*

- "Conversion Between Fixed-Point Fields of Like Radix" on page 146

Rules for PACKED-to-ZONED

*General Rules*

- "Rules for the COMPLEX Attribute" on page 144
- "Rules for Retrieval of Source Values" on page 143
- "Rules for Target FIT Attribute" on page 144
- "Rules for Target CONSTRAINED Attribute" on page 144

- "Rules for Signs" on page 145

*Design Notes*

- "Conversion Between Fixed-Point Fields of Like Radix" on page 146

Rules for ZONED-to-BINARY

*General Rules*

- "Rules for the COMPLEX Attribute" on page 144
- "Rules for Retrieval of Source Values" on page 143
- "Rules for the BYTRVS Attribute" on page 143
- "Rules for Target FIT Attribute" on page 144
- "Rules for Target CONSTRAINED Attribute" on page 144
- "Rules for Signs" on page 145

*Design Notes*

- "Conversion Between Fixed-Point Fields of Like Radix" on page 146

Rules for ZONED-to-Hexadecimal-FLOAT

*General Rules*

- "Rules for the COMPLEX Attribute" on page 144
- "Rules for Retrieval of Source Values" on page 143
- "Rules for Floating-Point Overflow and Underflow" on page 143
- "Rules for Target FIT Attribute" on page 144
- "Rules for Signs" on page 145

Rules for ZONED-to-Binary-FLOAT

*General Rules*

- "Rules for the COMPLEX Attribute" on page 144
- "Rules for Retrieval of Source Values" on page 143
- "Rules for the BYTRVS Attribute" on page 143
- "Rules for Floating-Point Overflow and Underflow" on page 143
- "Rules for Target FIT Attribute" on page 144
- "Rules for Signs" on page 145

Rules for ZONED-to-PACKED

*General Rules*

- "Rules for the COMPLEX Attribute" on page 144
- "Rules for Retrieval of Source Values" on page 143
- "Rules for Target FIT Attribute" on page 144
- "Rules for Target CONSTRAINED Attribute" on page 144
- "Rules for Signs" on page 145

*Design Notes*

- "Conversion Between Fixed-Point Fields of Like Radix" on page 146

Rules for ZONED-to-ZONED

*General Rules*

- "Rules for the COMPLEX Attribute" on page 144
- "Rules for Retrieval of Source Values" on page 143
- "Rules for Target FIT Attribute" on page 144
- "Rules for Target CONSTRAINED Attribute" on page 144
- "Rules for Signs" on page 145

*Design Notes*

- "Conversion Between Fixed-Point Fields of Like Radix" on page 146

SEQUENCE-to-SEQUENCE

General Rules

1. The elements of the target shall be matched with the elements of the source on a qualified name basis.
2. If a qualified name of the target is not found on the source, set exception *0023 -- Sequence element not found*.
3. Conversions of the elements of the source sequence to the representations required by the elements of the target sequence shall follow the general rules specified in Figure 9 on page 124.

Chapter 9. Program Calling Conventions

1. In addition to the arguments specified in a <CALL statement>, each implementation shall provide the address of an output area in which a Condition Token (CTOK) can be returned by the called program to the calling ADL plan.

2. In addition to the parameters specified in a <PLAN statement>, the parameter list of all plans shall include, as an implied last parameter, a Condition Token in which information about the execution of a plan can be returned to the caller of the plan.

3. The following ADL declaration defines the format of the CTOK:

```
CTOK: SEQUENCE
   NOTE('This sequence describes the format of Condition Tokens.'
   BEGIN;
      MsgSev: ENUMERATION (I, W, E, S, C) LENGTH(16)
         NOTE('Specifies the severity of the condition, where'
              '0 = I, information only.'
              '1 = W, a warning.'
              '2 = E, an error.'
              '3 = S, a severe error.'
              '4 = C, a critical error.');
      Msgno: BINARY PRECISION(16) SIGNED(FALSE)
         NOTE('Identifies a message associated with the condition.');
      Facility_Id: CHAR LENGTH(3) CCSID(0)
         NOTE('Identifies the message repository in which the message'
              'identified by Msgno can be found.);
      Case: BIT LENGTH(2)
         NOTE('A value of '01'b must be specified to identify this
              'Condition Token format.');
      Severity: BIT LENGTH(3)
         NOTE('Respecifies the value of the MsgSev field.');
      Control: BIT LENGTH(3)
         NOTE('..1 indicates the Facility_Id has been assigned by IBM.'
              '.1. reserved.'
              '1.. reserved.');
      I_S_Info: BIT LENGTH(32)
         NOTE('Specifies the handle of Instance Specific'
              'Information about the condition.  For ADL plans,'
              'this is the handle of the ADL Communications Area.');
   END;
```

4. For each condition detected by an ADL plan an ADL Communications Area (ADLCA) shall be returned as Instance Specific Information. Using the handle specified by the I_S_Info field of the CTOK, an ADLCA can be retrieved from the execution environment in which the ADL plan was called.

5. The following ADL declaration defines the format of an ADLCA:

```
ADLCA:
   SEQUENCE
   NOTE('An ADL Communications Area is data that is provided '
        'whenever a non-zero Communications Token is returned '
        'by an ADL Plan.  The method of obtaining the ADLCA is '
        'determined by each implementation.')
   BEGIN;
   LENGTH:
      BINARY PRECISION(32)
      NOTE('Specifies the length of the ADLCA.');
   MSGNO:
      BINARY PRECISION(32)
      NOTE('Specifies an ADL exception identifier.');
   MSGSEV:
      ENUMERATION LENGTH(16)
      (INFORMATION, WARNING, ERROR, SEVERE, CRITICAL)
      NOTE('Specifies the severity of the ADL condition.');
   PLANID:
      CHARPRE MAXLEN(255) MAXALC(FALSE)
      NOTE('Specifies the identifier of the plan being executed '
           'when the exception was detected.');
   PLANSTMT:
      BINARY PRECISION(32)
      NOTE('Specifies the number of the plan statement being'
           'executed when the exception was detected.');
   SRCFLDID:
      CHARPRE MAXLEN(255) MAXALC(FALSE) CCSID(65535);
      NOTE('Specifies the identifier of the source field '
           'being processed when the exception was detected.');
   TRGFLDID:
      CHARPRE MAXLEN(255) MAXALC(FALSE) CCSID(65535);
      NOTE('Specifies the identifier of the target field'
           'being processed when the exception was detected.');
   INPERRDTA:
      CHARPRE MAXLEN(255) MAXALC(FALSE) CCSID(65535);
      NOTE('Specifies the portion of the input data being '
           'when the exception was detected.');
   END;
```

Chapter 10. ADL Condition Summary

The following conditions can be detected and reported by ADL plans. The number specified is the value returned in the Msgno fields of the CTOK and ADLCA.

0001 Conversion not supported

Explanation: The attempted conversion is not supported in the conversion matrix shown in Figure 9 on page 124.

Severity: S

0002 CCSID not supported

Explanation: The source or target CCSID is not supported.

Severity: S

0003 Invalid CCSID pairing

Explanation: The conversion between the source CCSID and target CCSID is invalid.

Severity: S

0004 Undefined CCSID

Explanation: The source or target CCSID is not defined by CDRA.

Severity: S

0005 Floating-point overflow

Explanation: The converted source number results in an exponent greater than 63.

Severity: E

0006 Target CASE failure

Explanation: The selected target <WHEN statement> evaluates to FALSE or one or more target <WHEN statement>s preceding the selected <WHEN statement> evaluates to TRUE.

Severity: S

0007 Data Rejected

Explanation: The selected target <WHEN clause> evaluates to FALSE at the end of an assignment statement.

Severity: S

0008 Nonconformable arrays

Explanation: The target array does not have the same number of dimensions as the source array.

Severity: S

0009 ENUMERATION mismatch

Explanation: The source enumeration identifier does not match an enumeration identifier of the target.

Severity: S

0010 Invalid ENUMERATION value

Explanation: The value of the source BINARY field does not match a value associated with the enumeration identifier of the target.

Severity: S

0011 Fixed-point overflow

Explanation: The converted source number is too large to be represented within the target field.

Severity: E

0012 Assignment of negative to unsigned field

Explanation: The source is a signed negative number and the target field is unsigned.

Severity: W

0013 Floating-point underflow

Explanation: The converted source number results in an exponent less than -64.

Severity: E

0014 Unable to convert "Not a Number" (NaN)

Explanation: The source value is "Not a Number" (NaN).

Severity: E

0015 Unable to convert infinity

Explanation: The source value is infinity.

Severity: E

0016 Input area too short

Explanation: The length specified on an input parameter of the plan is less than the declared length of the data.

Severity: S

0017 Output area too short

Explanation: The maximum length specified on an output parameter of the plan is less than the declared length of the data.

Severity: S

0018 Assignment of complex to scalar

Explanation: The source contains a complex number and the target field is not complex.

Severity: E

0019 Floating-point fit violation

Explanation: The converted number results in the loss of low-order digits in a target floating-point field with FIT(EXACT) specified.

Severity: E

0020 CASE rejected

Explanation: All <WHEN statement>s evaluate to FALSE and an <OTHERWISE statement> does not exist.

Severity: S

0021 Fixed-point constraint violation

Explanation: The number of significant digits required in the stored value exceeds the number of digits specified by the PRECISION attribute of the target with CONSTRAINED(TRUE) specified.

Severity: E

0022 Fixed-point fit violation

Explanation: The converted number results in the loss of low-order digits in a target fixed-point field with FIT(EXACT) specified.

Severity: E

0023 Sequence element not found

Explanation: A SEQUENCE that is the target of an assignment contains an element for which an element of the source SEQUENCE with a matching identifier cannot be found.

Severity: E

Appendix A. Scenarios

A variety of scenarios are presented in this appendix, showing ADL modules and ways in which they can be used. These scenarios are not intended to include all features of the language, only those related to key concepts or uses.

Calling A Conversion Plan

In this scenario, a PL/I application program calls an ADL conversion plan to perform conversions not available through PL/I. This is illustrated by Figure 10 on page 162. Why this conversion is required, and what the PL/I program will do with the resulting data, are not of concern in this scenario. Many such conversions are available through ADL modules that are not available through other programming languages.

The ADL module converts a PL/I varying length, EBCDIC encoded character string into a PL/I fixed length, ASCII encoded character string with a suffix byte terminating the active data of the string.

The pertinent segment of the PL/I program is:

```
DCL X CHAR (1000) VARYING;
DCL Y CHAR (1001) /* ADL CHARSFX */;
X = 'some varying length value';
CALL CNVCHR(X,Y);
```

The required ADL module is:

```
DECLARE BEGIN;
   X: CHARPRE MAXLEN(1000) CCSID(500);
   Y: CHARSFX MAXLEN(1001) CCSID(837);
END;
CNVCHR: PLAN (X: INPUT, Y: OUTPUT)
        BEGIN;
        Y  <- X;
        END;
```

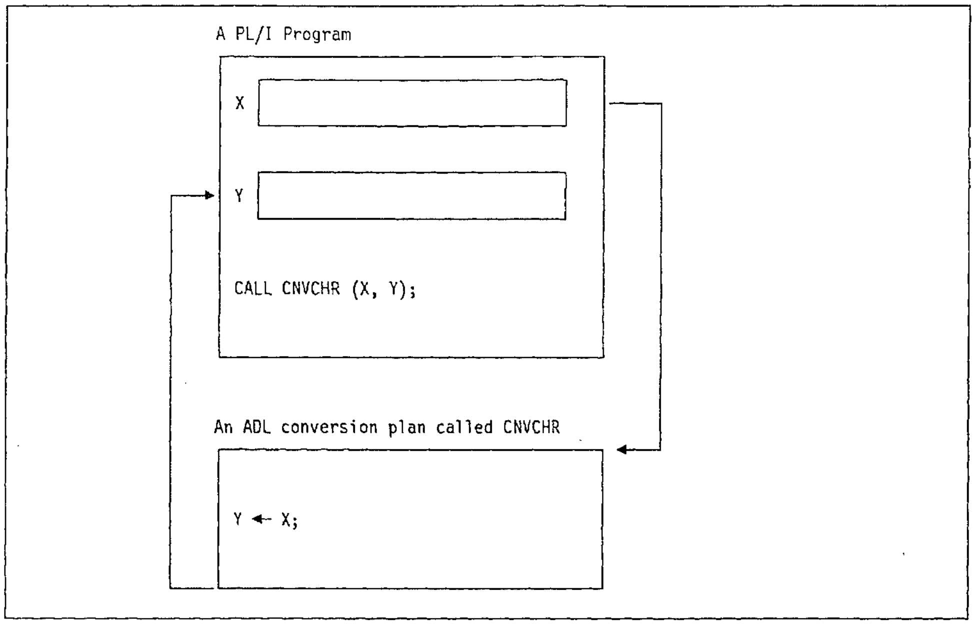

*Figure 10. Calling a Conversion Plan*

Generalizing a Conversion Plan

The ADL module of the previous scenario can be generalized to handle varying length inputs and outputs and varying CCSIDs. The caller of the CNVCHR plan is then required to provide additional information as CALL parameters.

The pertinent segment of the PL/I program is:

```
DCL X CHAR (1000) VARYING;
DCL Y CHAR (1001) /* ADL CHARSFX */;
DCL XCCSID FIXED BINARY(31);
DCL YMAXLEN FIXED BINARY(31);
DCL YCCSID FIXED BINARY(31);
X = 'some varying length value';
XCCSID =500;
YMAXLEN = 1001;
YCCSID = 837;
CALL CNVCHR(XCCSID, X, YMAXLEN, YCCSID, Y);
```

The required ADL module is:

```
DECLARE BEGIN;
    X: CHARPRE;
    Y: CHARSFX;
    XCCSID: BINARY;
    YMAXLEN: BINARY;
    YCCSID: BINARY;
END;
CNVCHR: PLAN (
              XCCSID:  INPUT,
              X:       INPUT CCSID(XCCSID),
              YMAXLEN: INPUT,
              YCCSID:  INPUT,
              Y:       OUTPUT MAXLEN(YMAXLEN) CCSID(YCCSID))
        BEGIN;
           Y <- X;
        END;
```

Calling a User Written Program from a Plan

An ADL plan can call programs written in other PLs to perform functions not available through ADL. One such function is the conversion of data that ADL cannot describe and convert. Other reasons for ADL plans to call user written programs are presented in other scenarios.

In this scenario, illustrated by Figure 11 on page 164, a record contains a field that is of the WEIRD data type, which cannot be described by ADL. This field is to be converted to the STRANGE data type, which cannot be described by ADL either. Since ADL cannot describe either WEIRD or STRANGE data, these fields are described as ASIS data in ADL. And since ADL cannot perform conversions between the WEIRD and STRANGE types, a user provided conversion program, CNVW2S, must be called to perform these conversions.

The pertinent segment of a PL/I program follows. How the PL/I program obtained the WEIRD data and what it will do with the STRANGE data are not of concern to this scenario.

```
DCL 1 X,
     2 A FIXED BINARY(31),
     2 B CHAR(1000) /* ADL ASIS NOTE('real data type is WEIRD') */,
     2 C CHAR(50)   /* ADL CCSID(500) */;
DCL 1 Y,
     2 A FIXED DECIMAL(9),
     2 B CHAR(1000) /* ADL ASIS NOTE('real data type is STRANGE') */,
     2 C CHAR(50)   /* ADL CCSID(837) */;
X.A = 57;
X.B = REPEAT('1A2B3C4D5E'X,100); /* the value of something WEIRD */
X.C = 'anything in CCSID 500';
CALL CNVREC(X,Y);
```

And the required ADL module is the following:

```
     DECLARE BEGIN;
     X: SEQUENCE BEGIN;
        A: BINARY PRECISION(31);
        B: ASIS LENGTH(1000) NOTE('real data type is WEIRD');
        C: CHAR LENGTH(50) CCSID(500);
        END;
     Y: SEQUENCE BEGIN;
        A: PACKED PRECISION(9);
        B: ASIS LENGTH(1000) NOTE('real data type is STRANGE');
        C: CHAR LENGTH(50) CCSID(837);
        END;
     END;
CNVREC: PLAN (X: INPUT,
              Y: OUTPUT)
        BEGIN;
           Y.A <- X.A;
           CALL 'CNVW2S' (X.B, Y.B);
           Y.C <- X.C;
        END;
```

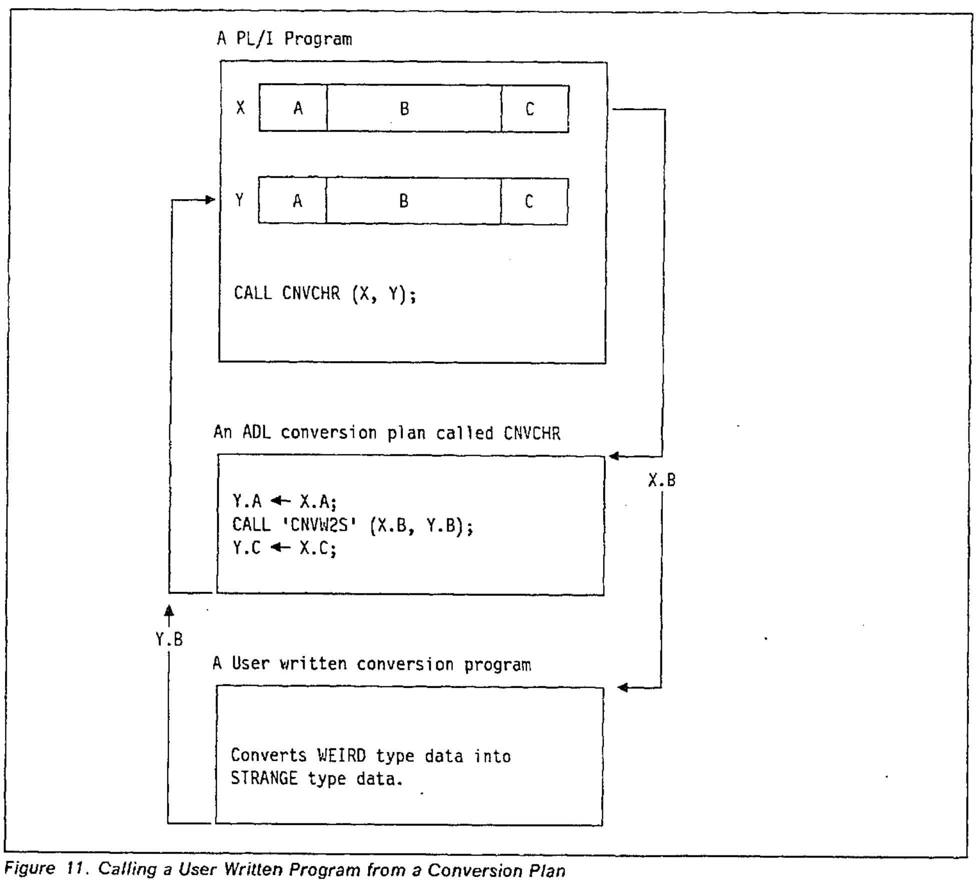

*Figure 11. Calling a User Written Program from a Conversion Plan*

Converting File Records by Calling ADL Plans

In this scenario, illustrated by Figure 12 on page 166, pgmA, of one representation domain, creates fileA and writes a set of records to it, each consisting of fields a, b, and c. If pgmB, of a different representation domain, is to read, process, and update those records, then the record fields must be encoded in formats a′, b′, and c′, respectively. Therefore, the records must be converted as they are read from fileA, and they must be converted as they are rewritten to fileA. In this scenario, pgmB requests the read and write operations on fileA and calls ADL conversion plans to perform any necessary conversions.

The following ADL module, containing the pgmA and pgmB declarations of the fileA records and the getPlan and putPlan, is separately processed to produce the callable getPlan and putPlan programs.

```
DECLARE BEGIN; /* declarations corresponding to pgmA variables */
  Arec: SEQUENCE BEGIN;
        a: BINARY PRECISION(31) RADIX(2);
        b: CHAR LENGTH(10) CCSID(500);
        c: PACKED PRECISION(5);
        END;
   END;
DECLARE BEGIN; /* declarations corresponding to pgmB variables */
  Brec: SEQUENCE BEGIN;
        a: BINARY PRECISION(5) RADIX(10) CONSTRAINED(TRUE);
        b: CHAR LENGTH(10) CCSID(837);
        c: ZONED PRECISION(5);
        END;
   END;
getPlan: PLAN (Arec: INPUT,
               Brec: OUTPUT)
         BEGIN;
            Brec <- Arec;
         END;
putPlan: PLAN (Brec: INPUT,
               Arec: OUTPUT)
         BEGIN;
            Arec <- Brec;
         END;
```

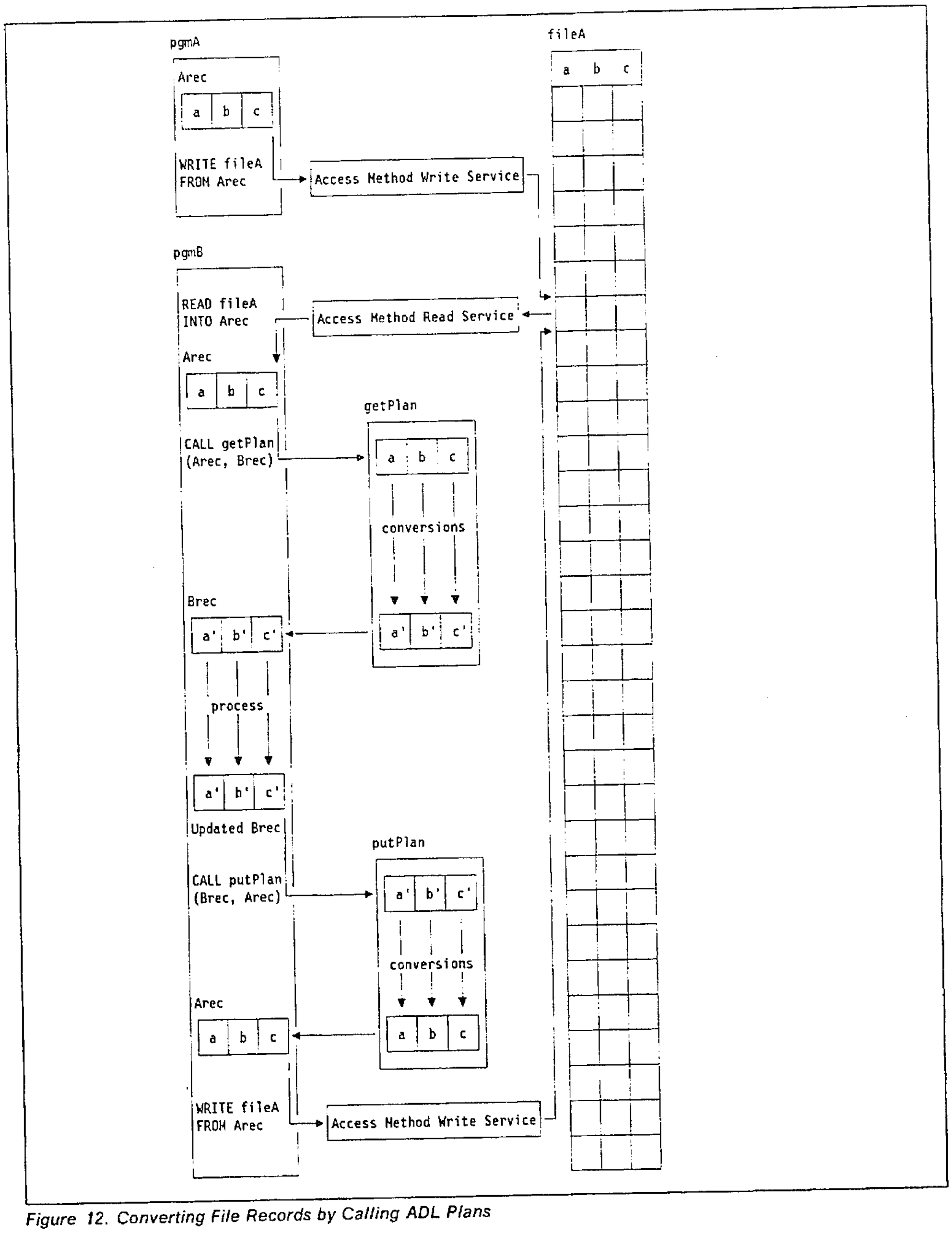
*Figure 12. Converting File Records by Calling ADL Plans*

Access Method Conversion of File Records

This scenario, illustrated by Figure 13 on page 169, shows an alternative to the calling of ADL plans by application programs. The goal, here, is for all programs that access fileA records to view its records encoded as the programs require them, as if those records were in the same representation domain as the accessing programs. Since the Access Method services of the file system must be used to read and write the records anyway, the Access Method services can call the ADL conversion plans as the records are read or written. Thus, to pgmB, working with fileA is no different than working with files in its own representation domain.

As in the previous scenario, the ADL module containing the declarations of pgmA and pgmB and the getPlan and putPlan ADL plans is separately processed to produce the callable getPlan and putPlan programs.

The primary advantage of this approach over that of the previous scenario is that fileA can be accessed by programs of still other representation domains without making any changes to those programs, thereby enhancing their portability between systems. However, the parameter lists of all ADL plans to be called by Access Method Services must conform to the argument lists provided by the Access Method Services.

The following is a scenario of a module whose plans can be called by Access Method Services. Note that in addition to the input and output records, the Access Method services also provide additional information about the records, including:

- The length of the input record. This allows the final field of the record to be of varying length, where the actual length is determined by the length of the stored record.
- The CCSID of the input record. This allows the declaration of character fields to be independent of the CCSID that is actually used for the record.
- The maximum allowed length of the output record.
- The required CCSID of the output record.

In addition to an OUTPUT parameter for the output record, an OUTPUT parameter is also defined to inform Access Method Services of the actual length of the output record.

```
DECLARE BEGIN; /* declarations corresponding to pgmA variables */
  Arec: SEQUENCE BEGIN;
        a: BINARY PRECISION(31) RADIX(2);
        b: CHAR LENGTH(10) CCSID(0);
        c: PACKED PRECISION(5);
        END;
END;
DECLARE BEGIN; /* declarations corresponding to pgmB variables */
  Brec: SEQUENCE BEGIN;
        a: BINARY PRECISION(5) RADIX(10) CONSTRAINED(TRUE);
        b: CHAR LENGTH(10) CCSID(0);
        c: ZONED PRECISION(5);
        END;
END;
DECLARE BEGIN; /* declarations of additional Access Method */
               /* variables passed to ADL plans */
   inlen:     BINARY PRECISION(31);
   inccsid:   BINARY PRECISION(31);
   outmaxlen: BINARY PRECISION(31);
   outccsid:  BINARY PRECISION(31);
   outlen:    BINARY PRECISION(31);
END;
getPlan: PLAN (inlen:     INPUT,
               inccsid:   INPUT,
               Arec:      INPUT LENGTH(inlen) CCSID(inccsid),
               outmaxlen: INPUT,
               outccsid:  INPUT,
               Brec:      OUTPUT MAXLEN(outmaxlen) CCSID(outccsid),
               outlen:    OUTPUT)
            BEGIN;
               Brec <- Arec;
               outlen <- LENGTH(Brec);
            END;
putPlan: PLAN (inlen:     INPUT,
               inccsid:   INPUT,
               Brec:      INPUT LENGTH(inlen) CCSID(inccsid),
               outmaxlen: INPUT,
               outccsid:  INPUT,
               Arec:      OUTPUT MAXLEN(outmaxlen) CCSID(outccsid),
               outlen:    OUTPUT)
            BEGIN;
               Arec <- Brec;
               outlen <- LENGTH(Arec);
            END;
```

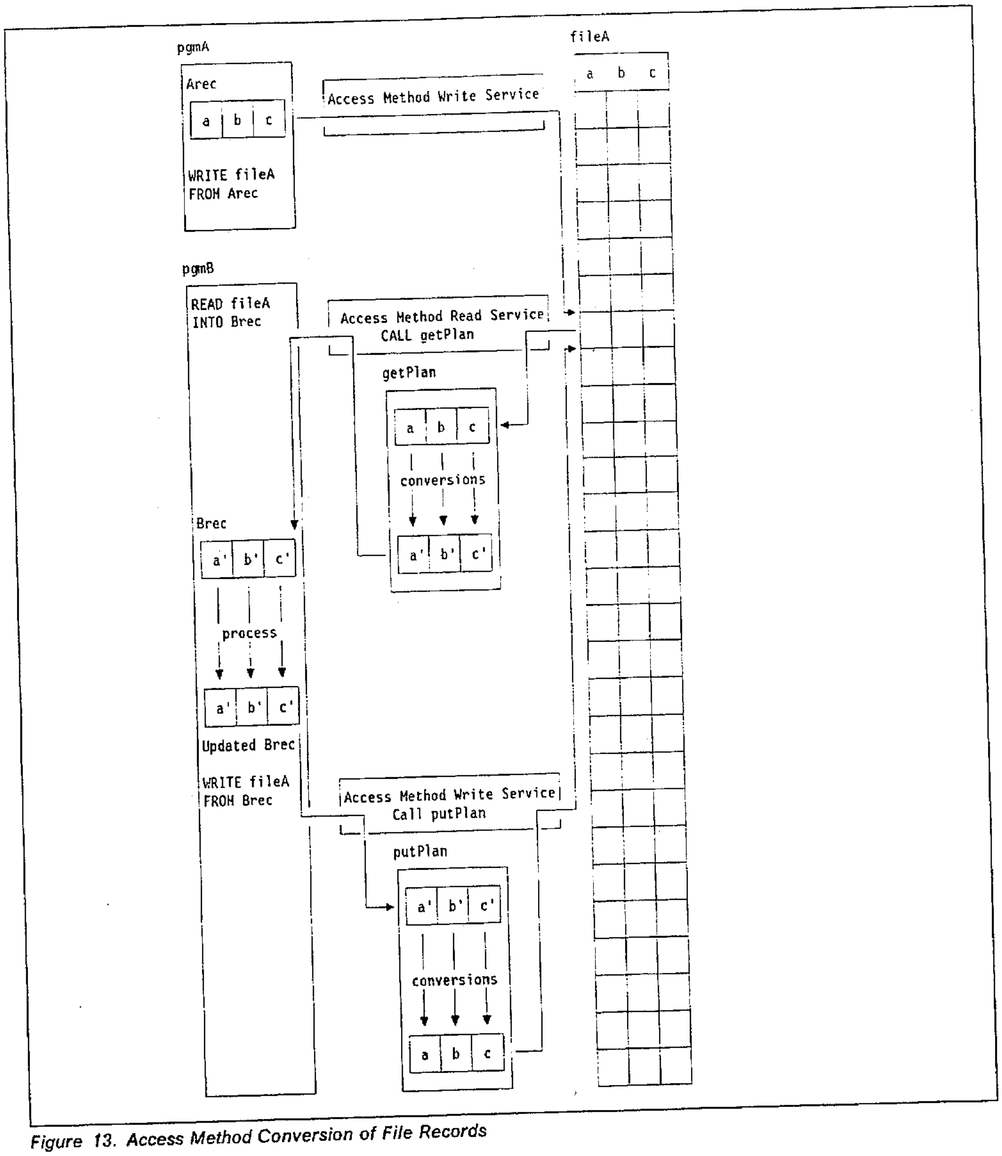
*Figure 13. Access Method Conversion of File Records*

View File Conversion of File Records

Using the same ADL module as in the previous scenario, conversions can be requested not by Access Method Services, but by a pseudo-file, called a VIEW, whose purpose is to manage the creation, use and integrity of ADL conversion programs. This is illustrated by Figure 14 on page 171. While this scenario may or may not apply to data other than file data, it serves to illustrate an important aspect of ADL; namely that the declarations and plans of a module can be managed as separate entities and brought together only when it is necessary to create conversion programs, as in Figure 15 on page 172.

The ADL declaration of fileA's records can be stored as an attribute of fileA and easily accessed whenever it is required by the Data Description Utility and whenever it is needed to create a view file. Similarly, the ADL declaration of viewB's view of fileA's record can be stored as an attribute of viewB. If a programmer defines ADL plans, they too can be stored as attributes of viewB, but if none are defined, then generic ADL plans for file record conversion can be supplied by default.

Other benefits can also be derived from the concept of view files, such as in management and use of keyed access paths to file records, but these are outside the scope of this scenario.

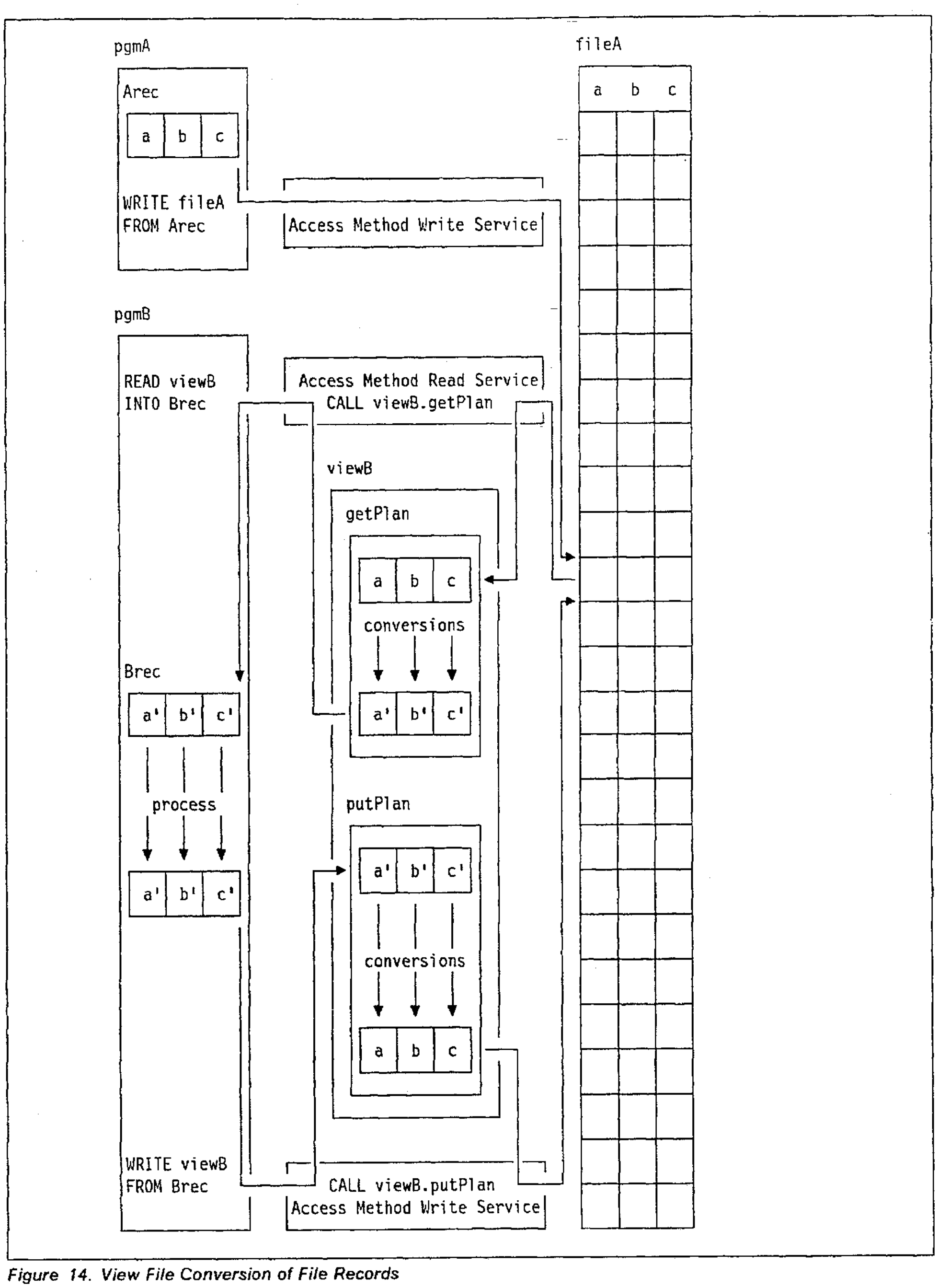
*Figure 14. View File Conversion of File Records*

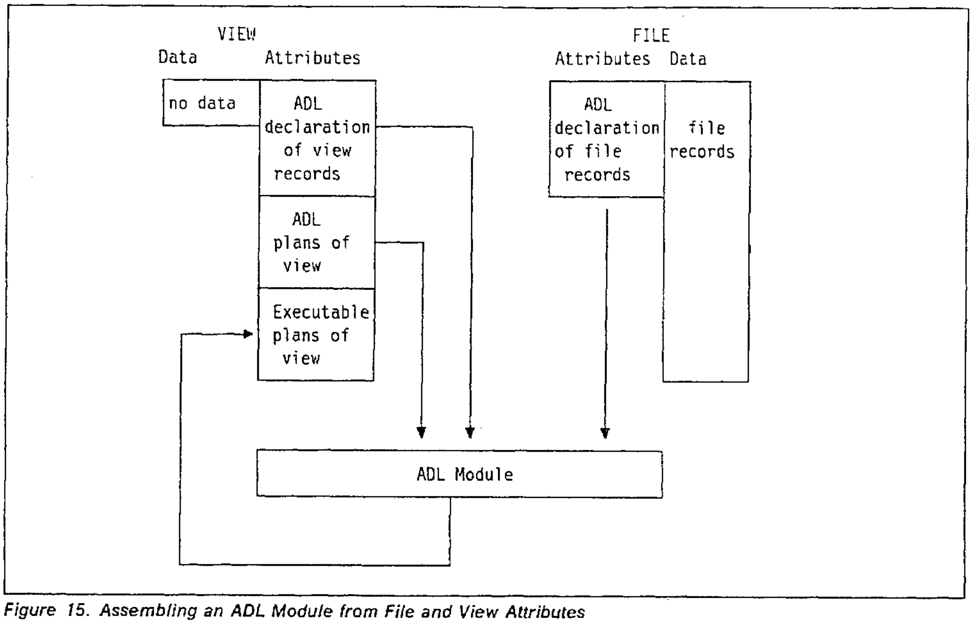

*Figure 15. Assembling an ADL Module from File and View Attributes*

Selecting and Reordering Fields of Records

In this scenario, pgmB does not require all of the fields written to fileA by pgmA, and pgmB needs the fields it selects in a different order than provided by pgmA. In the following module, only the declaration of Brec differs from earlier scenarios. Here, the Brec SEQUENCE includes only the fields required by pgmB, in the order required by pgmB. No changes are needed to the ADL plans, although they result in different conversion programs because of the changes to Brec. In the getPlan, the assignment of Arec to Brec causes A.c and A.a to be copied with conversions to their Brec counterparts. Field A.b is ignored. And in the PutPlan, the assignment of Brec to Arec causes B.c and B.a to be copied with conversions to their Arec counterparts. However, since field A.rec.b is not matched by a field named B.rec.b, an exception is raised and the PutPlan is terminated: This prevents the file from being contaminated with incomplete records. Thus, field selection is not allowed when writing or updating file records.

```
DECLARE BEGIN; /* declarations corresponding to pgmA variables */
  Arec: SEQUENCE BEGIN;
        a: BINARY PRECISION(31) RADIX(2);
        b: CHAR LENGTH(10) CCSID(0);
        c: PACKED PRECISION(5);
        END;
END;
DECLARE BEGIN; /* declarations corresponding to pgmB variables */
  Brec: SEQUENCE BEGIN;
        c: ZONED PRECISION(5);
        a: BINARY PRECISION(5) RADIX(10) CONSTRAINED(TRUE);
        END;
END;
DECLARE BEGIN; /* declarations of additional Access Method */
               /* variables passed to ADL plans */
   inlen:     BINARY PRECISION(31);
   inccsid:   BINARY PRECISION(31);
   outmaxlen: BINARY PRECISION(31);
   outccsid:  BINARY PRECISION(31);
   outlen:    BINARY PRECISION(31);
END;
getPlan: PLAN (inlen:     INPUT,
               inccsid:   INPUT,
               Arec:      INPUT LENGTH(inlen) CCSID(inccsid),
               outmaxlen: INPUT,
               outccsid:  INPUT,
               Brec:      OUTPUT MAXLEN(outmaxlen) CCSID(outccsid),
               outlen:    OUTPUT)
            BEGIN;
               Brec <- Arec;
               outlen <- LENGTH(Brec);
            END;
putPlan: PLAN (inlen:     INPUT,
               inccsid:   INPUT,
               Brec:      INPUT LENGTH(inlen) CCSID(inccsid),
               outmaxlen: INPUT,
               outccsid:  INPUT,
               Arec:      OUTPUT MAXLEN(outmaxlen) CCSID(outccsid),
               outlen:    OUTPUT)
            BEGIN;
               Arec <- Brec;
               outlen <- LENGTH(Arec);
            END;
```

Filtering a File's Records

In this scenario, pgmB requires only a subset of fileA's records, along with conversion of the records selected. The following ADL declaration of pgmB's variables shows the only difference from a non-selecting module; namely a WHEN clause specified in the declaration of Brec.

The WHEN clause of the Brec SEQUENCE specifies a condition that must be TRUE for a fileA record to be selected by viewB; in this case, a complex logical expression involving a comparison predicate and an IN predicate must be evaluated.

In the getPlan, the assignment of Arec to Brec causes the components of Arec to be converted and copied to the corresponding components of Brec. But the overall assignment succeeds only if the condition specified by Brec's WHEN clause is TRUE. A properly optimized conversion plan would evaluate the condition before attempting any data conversions or data movements.

In the putPlan, the assignment of Brec to Arec causes the components of Brec to be converted and copied. Since there is no WHEN clause specified for Arec, all instances of Brec are accepted.

```
DECLARE BEGIN; /* declarations corresponding to pgmA variables */
  Arec: SEQUENCE BEGIN;
        a: BINARY PRECISION(31) RADIX(2);
        b: CHAR LENGTH(10) CCSID(0);
        c: PACKED PRECISION(5);
        END;
END;
DECLARE BEGIN; /* declarations corresponding to pgmB variables */
 Brec: SEQUENCE
       WHEN ((a > 1000) OR a IN (55, 233, 751))
       BEGIN;
       a: BINARY PRECISION(5) RADIX(10) CONSTRAINED(TRUE);
       b: CHAR LENGTH(10) CCSID(0);
       c: ZONED PRECISION(5);
       END;
END;
DECLARE BEGIN; /* declarations of additional Access Method */
                  /* variables passed to ADL plans */
   inlen:     BINARY PRECISION(31);
   inccsid:   BINARY PRECISION(31);
   outmaxlen: BINARY PRECISION(31);
   outccsid:  BINARY PRECISION(31);
   outlen:    BINARY PRECISION(31);
END;
getPlan: PLAN (inlen:     INPUT,
               inccsid:   INPUT,
               Arec:      INPUT LENGTH(inlen) CCSID(inccsid),
               outmaxlen: INPUT,
               outccsid:  INPUT,
               Brec:      OUTPUT MAXLEN(outmaxlen) CCSID(outccsid),
               outlen:    OUTPUT)
            BEGIN;
               Brec <- Arec;
               outlen <- LENGTH(Brec);
            END;
putPlan: PLAN (inlen:     INPUT,
               inccsid:   INPUT,
               Brec:      INPUT LENGTH(inlen) CCSID(inccsid),
               outmaxlen: INPUT,
               outccsid:  INPUT,
               Arec:      OUTPUT MAXLEN(outmaxlen) CCSID(outccsid),
               outlen:    OUTPUT)
            BEGIN;
               Arec <- Brec;
               outlen <- LENGTH(Arec);
            END;
```

Validating File Input and Update Records

Records can be written to a file by any program authorized to open it, but this means the data in the file can be corrupted by erroneous programs. The integrity of the records in a file can be assured by only allowing access to the file through a view that validates each field of each record to be written to the file.

In this scenario, the ADL declaration of the records of a file includes WHEN clauses for each field of the record. All views defined over the file then incorporate field validation tests whenever Arec is the target of an ADL plan assignment statement. If any such validation test fails, the assignment statement and its containing plan fail.

This technique also extends to ADL modules written for program input parameters or other input messages to programs.

```
DECLARE BEGIN; /* declarations corresponding to pgmA variables */
  Arec: SEQUENCE BEGIN;
        a: BINARY PRECISION(31) RADIX(2)
           WHEN a BETWEEN 0 AND 57;
        b: CHAR LENGTH(10) CCSID(0)
           WHEN b IN ('father', 'mother', 'sister', 'brother');
        c: PACKED PRECISION(5)
           WHEN c < 50000;
        END;
END;
DECLARE BEGIN; /* declarations corresponding to pgmB variables */
 Brec: SEQUENCE
       WHEN ((a > 1000) OR a IN (55, 233, 751))
       BEGIN;
       a: BINARY PRECISION(5) RADIX(10) CONSTRAINED(TRUE);
       b: CHAR LENGTH(10) CCSID(0);
       c: ZONED PRECISION(5);
       END;
END;
DECLARE BEGIN; /* declarations of additional Access Method */
               /* variables passed to ADL plans */
   inlen:     BINARY PRECISION(31);
   inccsid:   BINARY PRECISION(31);
   outmaxlen: BINARY PRECISION(31);
   outccsid:  BINARY PRECISION(31);
   outlen:    BINARY PRECISION(31);
END;
getPlan: PLAN (inlen:     INPUT,
               inccsid:   INPUT,
               Arec:      INPUT LENGTH(inlen) CCSID(inccsid),
               outmaxlen: INPUT,
               outccsid:  INPUT,
               Brec:      OUTPUT MAXLEN(outmaxlen) CCSID(outccsid),
               outlen:    OUTPUT)
           BEGIN;
              Brec <- Arec;
              outlen <- LENGTH(Brec);
           END;
putPlan: PLAN (inlen:     INPUT,
               inccsid:   INPUT,
               Brec:      INPUT LENGTH(inlen) CCSID(inccsid),
               outmaxlen: INPUT,
               outccsid:  INPUT,
               Arec:      OUTPUT MAXLEN(outmaxlen) CCSID(outccsid),
               outlen:    OUTPUT)
           BEGIN;
              Arec <- Brec;
              outlen <- LENGTH(Arec);
           END;
```

Updating File Records

In this scenario, pgmB reads the records of fileA and updates only selected fields of each record. The getPlan converts all Arec fields to their corresponding Brec fields, including Arec fields that will not be updated by pgmB. If a standard putPlan is used, then all Brec fields are converted to their corresponding Arec fields, including those that were not updated by pgmB. Thus, the non-update fields are converted once for use by pgmB and then reconverted for replacement in fileA. However, not all conversions are fully reversible. For example, not all CCSID pairs allow conversions in both directions, and some numeric conversions lose precision in conversions and the conversions are, therefore, not reversible. Therefore, the non-update fields have been corrupted from their original values.

In this module, a special getPlan and a special putPlan are provided to prevent the corruption of non-updated fields. The getPlan copies the original values of the non-updated fields into ADL workspace variables, and the putPlan uses the workspace values to restore the original values of the non-updated fields.

```
DECLARE BEGIN; /* declarations corresponding to pgmA variables */
  Arec: SEQUENCE BEGIN;
        a: BINARY PRECISION(31) RADIX(2);
        b: CHAR LENGTH(10) CCSID(0);
        c: PACKED PRECISION(5);
        END;
  aHold: BINARY PRECISION(31) RADIX(2);
  bHold: CHAR LENGTH(10) CCSID(0);
END;
DECLARE BEGIN; /* declarations corresponding to pgmB variables */
 Brec: SEQUENCE
       BEGIN;  /* fields a and b are not updated */
       a: BINARY PRECISION(5) RADIX(10) CONSTRAINED(TRUE);
       b: CHAR LENGTH(10) CCSID(0);
       c: ZONED PRECISION(5);
       END;
END;
DECLARE BEGIN; /* declarations of additional Access Method */
               /* variables passed to ADL plans */
   inlen:     BINARY PRECISION(31);
   inccsid:   BINARY PRECISION(31);
   outmaxlen: BINARY PRECISION(31);
   outccsid:  BINARY PRECISION(31);
   outlen:    BINARY PRECISION(31);
END;
getPlan: PLAN (inlen:      INPUT,
               inccsid:    INPUT,
               Arec:       INPUT LENGTH(inlen) CCSID(inccsid),
               outmaxlen:  INPUT,
               outccsid:   INPUT,
               Brec:       OUTPUT MAXLEN(outmaxlen) CCSID(outccsid),
               outlen:     OUTPUT)
            BEGIN;
               aHold <- Arec.a;       /* Save original value of Arec.a */
               bHold <- Arec.b;       /* Save original value of Arec.b */
               Brec <- Arec;
               outlen <- LENGTH(Brec);
            END;
putPlan: PLAN (inlen:      INPUT,
               inccsid:    INPUT,
               Brec:       INPUT LENGTH(inlen) CCSID(inccsid),
               outmaxlen:  INPUT,
               outccsid:   INPUT,
               Arec:       OUTPUT MAXLEN(outmaxlen) CCSID(outccsid),
               outlen:     OUTPUT)
            BEGIN;
               Arec.a <- aHold;    /* Restore original value of Arec.a */
               Arec.b <- bHold;    /* Restore original value of Arec.b */
               Arec.c <- Brec.c;
               outlen <- LENGTH(Arec);
            END;
```

Converting Record Keys

Many files have an index that associates the values of certain key fields with individual records of the file. Programs can then access records randomly by specifying the key of each record or they can access them consecutively by ascending or descending key values. Programs accessing records randomly by key specify key values in terms of their own representation domain, and these keys must be converted to the representation domain of the file. Programs can also request that the keys of particular records be returned to them, and these keys must be converted from the representation domain of the file to that of the program.

In this scenario, an ADL module provides both record and key declarations for the file's representation domain and the program's representation domain. It also provides plans for converting records and keys.

```
DECLARE BEGIN; /* declarations corresponding to fileA fields */
  Arec: SEQUENCE BEGIN;
        a: BINARY PRECISION(31) RADIX(2);
        b: CHAR LENGTH(10) CCSID(0);
        c: PACKED PRECISION(5);
        END;
  Akey: SEQUENCE BEGIN;
        a: BINARY PRECISION(31) RADIX(2);
        c: PACKED PRECISION(5);
        END;
END;
DECLARE BEGIN; /* declarations corresponding to pgmB variables */
 Brec: SEQUENCE
       BEGIN;  /* fields a and b are not updated */
       a: BINARY PRECISION(5) RADIX(10) CONSTRAINED(TRUE);
       b: CHAR LENGTH(10) CCSID(0);
       c: ZONED PRECISION(5);
       END;
 Bkey: SEQUENCE
       BEGIN;
       a: BINARY PRECISION(5) RADIX(10) CONSTRAINED(TRUE);
       c: ZONED PRECISION(5);
       END;
END;
DECLARE BEGIN; /* declarations of additional Access Method */
               /* variables passed to ADL plans */
   inlen:     BINARY PRECISION(31);
   inccsid:   BINARY PRECISION(31);
   outmaxlen: BINARY PRECISION(31);
   outccsid:  BINARY PRECISION(31);
   outlen:    BINARY PRECISION(31);
END;
getPlan: PLAN (inlen:     INPUT,
               inccsid:   INPUT,
               Arec:      INPUT LENGTH(inlen) CCSID(inccsid),
               outmaxlen: INPUT,
               outccsid:  INPUT,
               Brec:      OUTPUT MAXLEN(outmaxlen) CCSID(outccsid),
               outlen:    OUTPUT)
            BEGIN;
               Brec <- Arec;
               outlen <- LENGTH(Brec);
            END;
putPlan: PLAN (inlen:     INPUT,
               inccsid:   INPUT,
               Brec:      INPUT LENGTH(inlen) CCSID(inccsid),
               outmaxlen: INPUT,
               outccsid:  INPUT,
               Arec:      OUTPUT MAXLEN(outmaxlen) CCSID(outccsid),
               outlen:    OUTPUT)
            BEGIN;
               Arec <- Brec;
               outlen <- LENGTH(Arec);
            END;
```

```
/* The following plan converts keys specified by pgmB to fileA */
keyPlan: PLAN (inlen:     INPUT,
               inccsid:   INPUT,
               Bkey:      INPUT LENGTH(inlen) CCSID(inccsid),
               outmaxlen: INPUT,
               outccsid:  INPUT,
               Akey:      OUTPUT MAXLEN(outmaxlen) CCSID(outccsid),
               outlen:    OUTPUT)
            BEGIN;
               Akey <- Bkey;
               outlen <- LENGTH(Arec);
            END;
/* The following plan converts keys fed back to pgmB from fileA */
kfbPlan: PLAN (inlen:     INPUT,
               inccsid:   INPUT,
               Arec:      INPUT LENGTH(inlen) CCSID(inccsid),
               outmaxlen: INPUT,
               outccsid:  INPUT,
               Bkey:      OUTPUT MAXLEN(outmaxlen) CCSID(outccsid),
               outlen:    OUTPUT)
            BEGIN;
               Bkey <- Arec;
               outlen <- LENGTH(Akey);
            END;
```

Converting Files of Text Records

If a file consists solely of text records, as many do, then the following ADL module can be used to convert the text from one CCSID to another CCSID. Note that the same ADL plans are used as for more complex records.

```
DECLARE BEGIN; /* declarations corresponding to pgmA variables */
  Arec: CHAR LENGTH(*);
  Brec: CHAR LENGTH(*);
END;
DECLARE BEGIN; /* declarations of additional Access Method */
               /* variables passed to ADL plans */
   inlen:     BINARY PRECISION(31);
   inccsid:   BINARY PRECISION(31);
   outmaxlen: BINARY PRECISION(31);
   outccsid:  BINARY PRECISION(31);
   outlen:    BINARY PRECISION(31);
END;
getPlan: PLAN (inlen:     INPUT,
               inccsid:   INPUT,
               Arec:      INPUT LENGTH(inlen) CCSID(inccsid),
               outmaxlen: INPUT,
               outccsid:  INPUT,
               Brec:      OUTPUT MAXLEN(outmaxlen) CCSID(outccsid),
               outlen:    OUTPUT)
            BEGIN;
               Brec <- Arec;
               outlen <- LENGTH(Brec);
            END;
putPlan: PLAN (inlen:     INPUT,
               inccsid:   INPUT,
               Brec:      INPUT LENGTH(inlen) CCSID(inccsid),
               outmaxlen: INPUT,
               outccsid:  INPUT,
               Arec:      OUTPUT MAXLEN(outmaxlen) CCSID(outccsid),
               outlen:    OUTPUT)
            BEGIN;
               Arec <- Brec;
               outlen <- LENGTH(Arec);
            END;
```

Defining Default Plans

As has been seen in many of the preceding scenarios, standard ADL plans can be used for most get and put operations on file records. Specialized plans are only required when additional functions are required. Therefore, it would be desirable to be able to define a set of plans that could be used when user- written plans are not provided; and indeed to eliminate the need for most user written plans.

The concept of <positional identifier>s was incorporated in ADL for this purpose. If the DECLARE statements for the representation domains of a file and a view are included in a module in precisely that order, then they can be referred to as the first DECLARE statement and the second DECLARE statement, or with positional identifiers "1" and "2", respectively. And if the SEQUENCE declaration of the record appears as the first declaration in each DECLARE statement, then their fully qualified positional identifiers are "1"."1" and "2"."1", respectively.

```
DECLARE BEGIN; /* declarations corresponding to pgmA variables */
               /* <positional identifier> "1" within the module*/
  Arec: SEQUENCE BEGIN;
        a: BINARY PRECISION(31) RADIX(2);
        b: CHAR LENGTH(10) CCSID(0);
        c: PACKED PRECISION(5);
        END;
END;
DECLARE BEGIN; /* declarations corresponding to pgmB variables */
               /* <positional identifier> "2" within the module*/
  Brec: SEQUENCE BEGIN;
        a: BINARY PRECISION(5) RADIX(10) CONSTRAINED(TRUE);
        b: CHAR LENGTH(10) CCSID(0);
        c: ZONED PRECISION(5);
        END;
END;
DECLARE BEGIN; /* declarations of additional Access Method */
               /* variables passed to ADL plans */
               /* <positional identifier> "3" within the module*/
   inlen:     BINARY PRECISION(31);
   inccsid:   BINARY PRECISION(31);
   outmaxlen: BINARY PRECISION(31);
   outccsid:  BINARY PRECISION(31);
   outlen:    BINARY PRECISION(31);
END;
getPlan: PLAN ("3".inlen:     INPUT,
               "3".inccsid:   INPUT,
               "1"."1":       INPUT
                              LENGTH("3".inlen)
                              CCSID("3".inccsid),
               "3".outmaxlen: INPUT,
               "3".outccsid:  INPUT,
               "2"."1":       OUTPUT
                              MAXLEN("3".outmaxlen)
                              CCSID("3".outccsid),
               "3".outlen:    OUTPUT)
            BEGIN;
               "2"."1" <- "1"."1";
               outlen <- LENGTH("2"."1");
            END;
putPlan: PLAN ("3".inlen:     INPUT,
               "3".inccsid:   INPUT,
               "2"."1":       INPUT
                              LENGTH("3".inlen)
                              CCSID("3".inccsid),
               "3".outmaxlen: INPUT,
               "3".outccsid:  INPUT,
               "1"."1":       OUTPUT
                              MAXLEN("3".outmaxlen)
                              CCSID("3".outccsid),
               "3".outlen:    OUTPUT)
            BEGIN;
               "1"."1" <- "2"."1";
               outlen <- LENGTH("1"."1");
            END;
```

Multiformat Files

In this scenario, pgmA has written records of two different formats to fileA. The order and frequency of these records is unpredictable by readers of the file, but each record has a discriminator field that serves to identify its format. The ADL declaration of the records of fileA clearly must accommodate both record formats and must include a facility for discriminating between them. Similarly, each view of the file must also accommodate them such that ADL plans only convert like formats.

In the following declarations, the ADL CASE data type is used to distinguish between the record formats. No change is needed to the ADL conversion plans. The assignment of Arec to Brec determines the format of an Arec record, matches it with the equivalent format of the Brec record, and performs appropriate conversions.

```
DECLARE BEGIN; /* declarations corresponding to pgmA variables */
Arec: CASE BEGIN;
      WHEN rf1.a = 1
      THEN
      rf1: SEQUENCE BEGIN;
           a: BINARY PRECISION(31) RADIX(2);
           b: CHAR LENGTH(10) CCSID(0);
           c: PACKED PRECISION(5);
           END;
      WHEN rf2.a = 2
      THEN
      rf2: SEQUENCE BEGIN;
           a: BINARY PRECISION(31) RADIX(2);
           b: CHAR LENGTH(10) CCSID(0);
           c: BIT LENGTH(24);
           END;
      END;
END;
DECLARE BEGIN; /* declarations corresponding to pgmB variables */
Brec: CASE BEGIN;
      WHEN rf1.a = 1
      THEN
      rf1: SEQUENCE BEGIN;
           a: BINARY PRECISION(5) RADIX(10) CONSTRAINED(TRUE);
           b: CHAR LENGTH(10) CCSID(0);
           c: ZONED PRECISION(5);
           END;
      WHEN rf2.a = 2
      THEN
      rf2: SEQUENCE BEGIN;
           a: BINARY PRECISION(5) RADIX(10) CONSTRAINED(TRUE);
           b: CHAR LENGTH(10) CCSID(0);
           c: BIT LENGTH(24);
           END;
      END;
END;
```

Converting Program Call Parameters

In this scenario, illustrated by Figure 16 on page 186, a program, pgmA, of one representation domain, needs to call a program, pgmB, of another representation domain. However, the encodings of the arguments specified by pgmA do not match the encodings of the parameters required by pgmB. The following ADL module can be defined by programmers or by appropriate software engineering tools to convert arguments as they flow to pgmB, and to convert values to be returned to pgmA.

```
A: DECLARE BEGIN; /* declarations corresponding to pgmA variables */
   a: BINARY PRECISION(31) RADIX(2);
   b: CHAR LENGTH(10) CCSID(500);
   c: PACKED PRECISION(5);
   d: ARRAY DMNLST(DMNSIZE(5)) OF PACKED PRECISION(9);
   END;
B: DECLARE BEGIN; /* declarations corresponding to pgmB variables */
   a: BINARY PRECISION(5) RADIX(10) CONSTRAINED(TRUE);
   b: CHAR LENGTH(10) CCSID(837);
   c: ZONED PRECISION(5);
   d: ARRAY DMNLST(DMNSIZE(5)) OF ZONED PRECISION(9);
   END;
gluePlan: PLAN (A.a: INPUT,
                A.b: INPUT,
                A.c: OUTPUT,
                A.d: OUTPUT)
          BEGIN;
             B.a <- A.a;
             B.b <- A.b;
             CALL 'pgmB' (B.a, B.b, B.c, B.d);
             A.c <- B.c;
             A.d <- B.d;
          END;
```

In this scenario,

- pgmA calls the ADL plan, named gluePlan, passing it the addresses of input parameters A.a and A.b, and of output parameters A.c and A.d.
- The module workspace includes space for local variables B.a, B.b, B.c and B.d
- gluePlan assigns input parameters A.a and A.b to B.a and B.b, respectively, thereby converting them to to the encodings required by pgmB.
- gluePlan calls pgmB, passing it the converted input parameters and providing it with addressability to local variables corresponding to pgmB's encodings of its output parameters.
- On return from pgmB, gluePlan assigns output parameters B.c and B.d to its output parameters, A.c and A.d, respectively, thereby converting them to the encodings required by pgmA.
- gluePlan returns to its caller, pgmA.

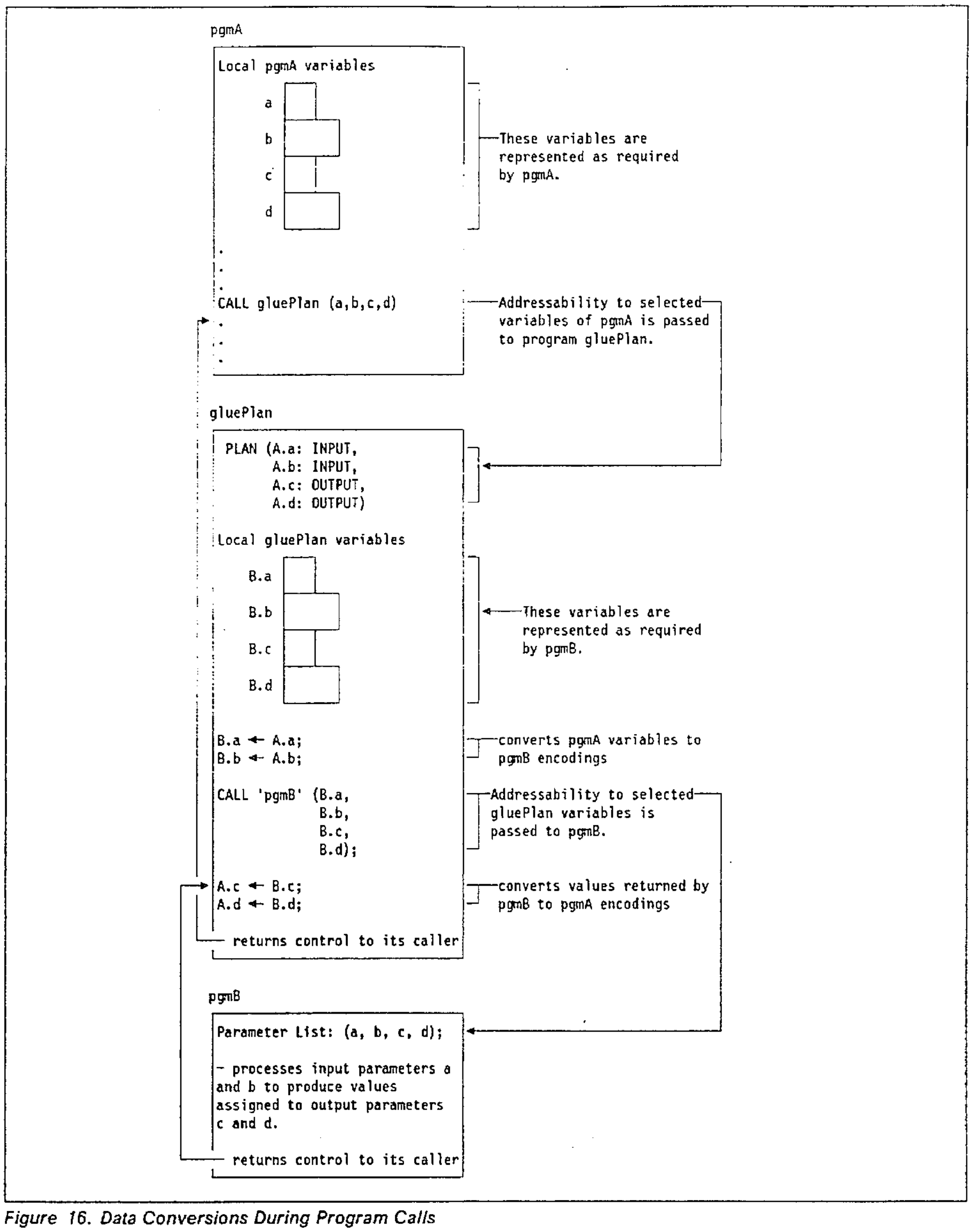
*Figure 16. Data Conversions During Program Calls*

Converting Remote Program Call Parameters

This scenario is similar to the previous scenario ("Converting Program Call Parameters" on page 185) except that pgmB resides in a remote system, as shown in Figure 17 on page 188, and (hypothetical) Remote Program Call (RPC) services are used for communications between systems. The following ADL module can be defined, by programmers or by appropriate software engineering tools, to convert parameters as they flow between the calling and called programs.

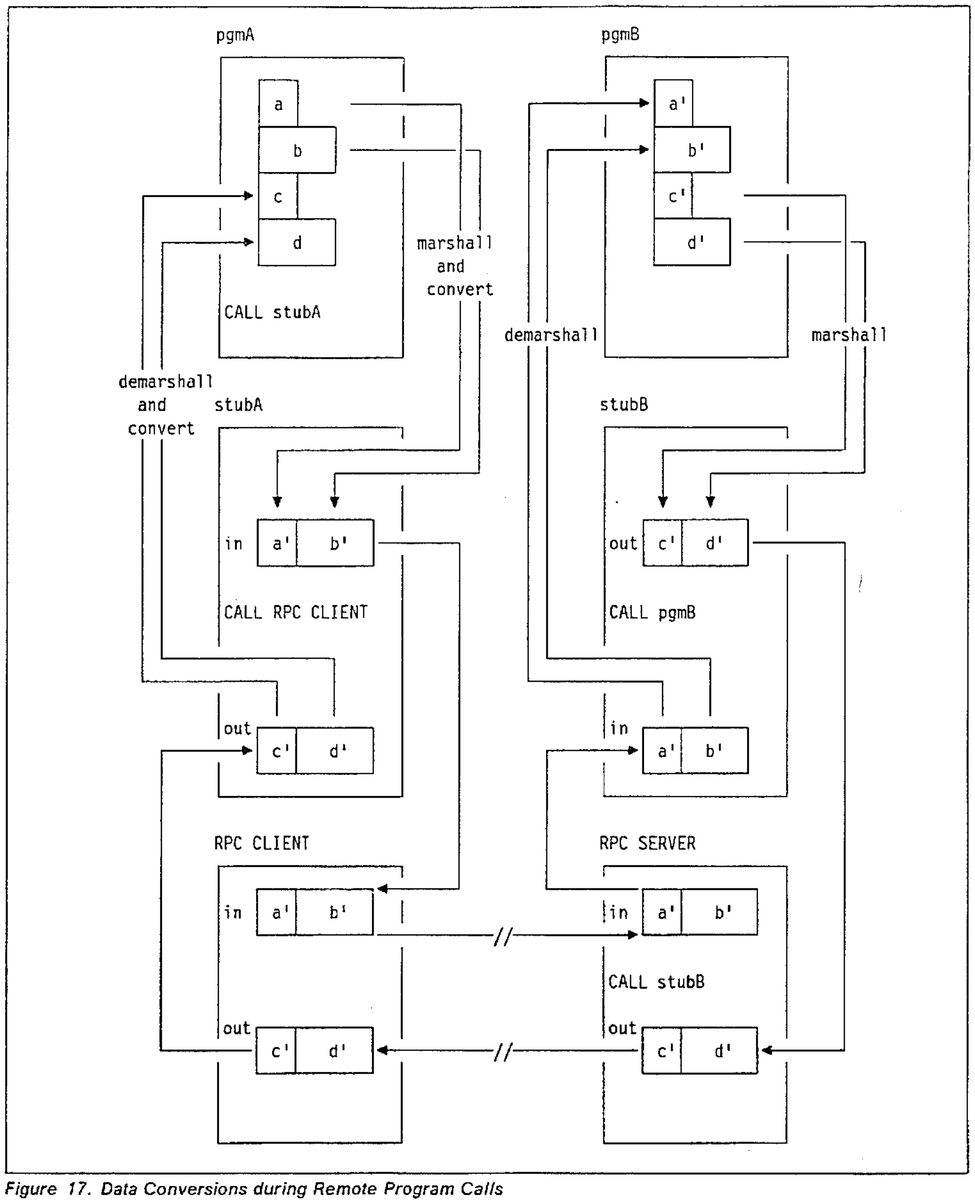
*Figure 17. Data Conversions during Remote Program Calls*

```
/*****************************************************************/
/* This declaration describes the variables of pgmA to be passed */
/* to pgmB as arguments. These variables are encoded as required */
/* by the representation domain of pgmA.                         */
/*****************************************************************/
A: DECLARE BEGIN;      /*corresponding to pgmA variable encodings */
   a: BINARY PRECISION(31);
   b: CHAR LENGTH(10) CCSID(500);
   c: PACKED PRECISION(5);
   d: ARRAY DMNLST(DMNSIZE(5)) OF PACKED PRECISION(9);
END;
/*****************************************************************/
/* This declaration describes the parameters of pgmB, the        */
/* message to be passed to its RPC stub by the RPC server (in)   */
/* and the message returned by its stub to the RPC server (out). */
/*****************************************************************/
B: DECLARE BEGIN;         /*corresponding to pgmB variable encodings */
   a: BINARY PRECISION(5) RADIX(10) CONSTRAINED(TRUE);
   b: CHAR LENGTH(10) CCSID(837);
   c: ZONED PRECISION(5);
   d: ARRAY DMNLST(DMNSIZE(5)) OF ZONED PRECISION(9);
   in: SEQUENCE BEGIN;  /* message passed to stubA by RPC server */
       a: BINARY PRECISION(5) RADIX(10) CONSTRAINED(TRUE);
       b: CHAR LENGTH(10) CCSID(837);
       END;
   out: SEQUENCE BEGIN; /*message returned to RPC server */
       c: ZONED PRECISION(5);
       d: ARRAY DMNLST(DMNSIZE(5)) OF ZONED PRECISION(9);
       END;
END;
/*****************************************************************/
/* This declaration describes additional variables to be passed  */
/* to the RPC client by stubA.                                   */
/*****************************************************************/
R: DECLARE BEGIN;        /* RPC_CLIENT parameter encodings */
   pgm_name: CHAR LENGTH(20) CCSID(837);
   inlen: BINARY PRECISION(31) BYTRVS(TRUE);
   outlen: BINARY PRECISION(31) BYTRVS(TRUE);
END;
```

```
/***************************************************************/
/* The stubA plan is called by pgmA to act as a surrogate      */
/* (or stub) for pgmB, which exists in a remote system.        */
/* It performs the following functions:                        */
/* 1. It marshalls (gathers) the input arguments into a message, */
/*    converting each to the encodings required by pgmB.       */
/* 2. It calls the RPC client to transmit the argument message to*/
/*    the remote RPC server.                                   */
/* 3. It demarshalls (scatters) the components of the returned */
/*    message into the output arguments of its caller,         */
/*    converting each to the encodings required by pgmA.       */
/* 4. It returns the output arguments to its caller.           */
/***************************************************************/
stubA: PLAN (A.a: INPUT,
             A.b: INPUT,
             A.c: OUTPUT,
             A.d: OUTPUT)
       BEGIN;
       B.in.a <- A.a;             /* marshall and convert A.a */
       B.in.b <- A.b;             /* marshall and convert A.b */
       R.pgm_name <- 'stubB';
       R.inlen <- LENGTH(B.in);
       R.outlen <- LENGTH(B.out);
       CALL 'RPC_CLIENT'
            (R.pgm_name,          /* name of stubB */
             R.inlen,             /* length of message to stubB */
             B.in,                /* message to stubB */
             R.outlen,            /* length of message to be returned */
             B.out);              /* message returned by stubB */
       A.c <- B.out.c;            /* demarshall and convert A.c */
       A.d <- B.out.d;            /* demarshall and convert A.d */
       END;
/***************************************************************/
/* The stubB plan is the surrogate of pgmB called by RPC servers */
/* to interface with pgmB.  It performs the following functions: */
/* 1. It demarshalls (scatters) the components of the message  */
/*    passed to it into variables that can be specified as     */
/*    arguments to pgmB.                                       */
/* 2. It calls pgmB, passing it the input and output arguments */
/*    that it expects.                                         */
/* 3. It marshalls (gathers) the output arguments returned by  */
/*    pgmB into an output message.                             */
/* 4. It returns the output message to the RPC server for      */
/*    transmission to the RPC client.                          */
/***************************************************************/
stubB: PLAN (B.in: INPUT,
             B.out: OUTPUT)
       BEGIN;
       B.a <- B.in.a;
       B.b <- B.in.b;
       CALL 'pgmB' (B.a, B.b, B.c, B.d);
       B.out.c <- B.c;
       B.out.d <- B.d;
       END;
```

While stubA and stubB are both required to handle parameter marshalling (assembly into a message) and demarshalling (disassembly from a message), all conversions are performed by stubA. Other protocols could be defined, but this protocol has the following application development advantages:

- The description of pgmB's parameters can be specified in the syntax of the PL of pgmB. From this description, the ADL declaration can be automatically generated by the PARSE function of pgmB's declaration translator.
- Only a single stubB is needed to handle all remote callers, regardless of their representation domains.
- Only the ADL declaration of pgmB's parameters needs to be communicated to remote clients for the creation of their client stubs. This communication is presumed to occur separately and before any calls to the program.
- Given an ADL description of pgmB's parameters, the TRANSLATE function of pgmA's declaration translator can be used to generate the ADL declaration of pgmA's argument variables. From this, and the ADL declaration of pgmB's parameters, stubA can be generated.
- By using the GENERATE function of pgmA's declaration translator PL declarations of the pgmA variables can be generated from their ADL declarations. These PL declarations can then be included in the text of pgmA.

Thus, to application programmers, an ADL-based approach to RPC requires only the following:

- The registration of programs that can be called by remote clients and the declaration of their parameters in the syntax of the PL in which the program was written.
- A specification that a remote program is to be called by a client program.

Everything else necessary to enable the remote program call can be performed automatically by appropriate application development tools.

In addition to these advantages, an ADL-based approach to RPC also has the following CALL-time advantages:

- No overhead information needs to be communicated between the calling and called programs' stubs;, only the application data.
- Only the minimum number of conversions and data movements occur, with full optimization of all conversions performed.

Converting Mapped Communications Records

In some cases, communication services allow a format identifier to be associated with each record sent to another program. The format identifier is not, itself, part of the record. The program sending a record specifies its format identifier, and the communication service associates this identifier with that record. When another program receives the record, the communication service returns both the record and its format identifier.

The following is an example of an ADL module for converting records with separate format identifiers, as they are sent from one program to another. The format identifier must be passed as a parameter to the plan by the communication service. The CASE declarations can then test the format identifier to determine which declaration to select.

```
DECLARE BEGIN; /* declarations corresponding to pgmA variables */
Arec: CASE BEGIN;
      WHEN R.fmtid = 'rf1'
      THEN
      rf1: SEQUENCE BEGIN;
           a: BINARY PRECISION(31) RADIX(2);
           b: CHAR LENGTH(10) CCSID(0);
           c: PACKED PRECISION(5);
           END;
      WHEN R.fmtid = 'rf2'
      THEN
      rf2: SEQUENCE BEGIN;
           a: BINARY PRECISION(31) RADIX(2);
           b: CHAR LENGTH(10) CCSID(0);
           c: BIT LENGTH(24);
           END;
      END;
END;
DECLARE BEGIN; /* declarations corresponding to pgmB variables */
Brec: CASE BEGIN;
      WHEN R.fmtid = 'rf1'
      THEN
      rf1: SEQUENCE BEGIN;
           a: BINARY PRECISION(5) RADIX(10) CONSTRAINED(TRUE);
           b: CHAR LENGTH(10) CCSID(0);
           c: ZONED PRECISION(5);
           END;
      WHEN R.fmtid = 'rf2'
      THEN
      rf2: SEQUENCE BEGIN;
           a: BINARY PRECISION(5) RADIX(10) CONSTRAINED(TRUE);
           b: CHAR LENGTH(10) CCSID(0);
           c: BIT LENGTH(24);
           END;
      END;
END;
R: DECLARE BEGIN; /* declarations of additional Access Method */
                  /* variables passed to ADL plans */
   fmtidlen:  BINARY PRECISION(31);
   fmtid:     CHAR LENGTH(8);
   inlen:     BINARY PRECISION(31);
   inccsid:   BINARY PRECISION(31);
   outmaxlen: BINARY PRECISION(31);
   outccsid:  BINARY PRECISION(31);
   outlen:    BINARY PRECISION(31);
   END;
```

```
sendPlan: PLAN(
            R.fmtidlen: INPUT,
            R.fmtid:     INPUT LENGTH(R.fmtidlen),
            R.inlen:     INPUT,
            R.inccsid:   INPUT,
            Arec:        INPUT LENGTH(R.inlen) CCSID(R.inccsid),
            R.outmaxlen: INPUT,
            R.outccsid:  INPUT,
            Brec:        OUTPUT MAXLEN(R.outmaxlen) CCSID(R.outccsid),
            R.outlen:    OUTPUT)
          BEGIN;
            Brec <- Arec;
            outlen <- LENGTH(Brec);
          END;
```

Appendix B. Backus Naur Form Summary

```
<argument> ::= <value expression>

<argument list> ::=
  (<argument>{[,<argument>]...})

<ARRAY> ::=
  ARRAY
  <ARRAY attributes list>
  [<WHEN clause>]
  OF
    {
      {<field><terminator>} |
      <CASE> |
      <SEQUENCE> |
      {<subtype instance><terminator>}
    }

<ARRAY attributes list> ::=
  {
    <DMNLST attribute>
    <ARRAY defaulted attributes list>
    <ARRAY optional attributes list>
  }!

<ARRAY defaulted attributes list> ::=
  {
    [<DMNLOW attribute>]
    [<MAXALC attribute>]
    [<SKIP attribute>]
  }!

<ARRAY optional attributes list> ::=
  {
    [<HELP attribute>]
    [<NOTE attribute>]
    [<TITLE attribute>]
  }!

<arrow> ::=
  <-

<ASIS> ::=
  ASIS
  <ASIS attributes list>
  [<WHEN clause>]

<ASIS attributes list> ::=
  {
    <ASIS defaulted attributes list>
    <ASIS optional attributes list>
  }!
```

```
<ASIS defaulted attributes list> ::=
  [
    LENGTH({1..<max ASIS> | <constant identifier>})
    UNITLEN({1 | 8 | 16 | <constant identifier>})
  ]! |
  [
    LENGTH(*)
    MAXLEN({1..<max ASIS> | <constant identifier>})
    UNITLEN({1 | 8 | 16 | <constant identifier>})]
  ]! |
  [
    LENGTH(<qualified identifier>)
    <MAXALC attribute>
    MAXLEN({1..<max ASIS> | <constant identifier>})
    UNITLEN({1 | 8 | 16 | <constant identifier>})]
  ]!

<ASIS optional attributes list> ::=
  {
    [<HELP attribute>]
    [<NOTE attribute>]
    [<TITLE attribute>]
  }!

<assignment statement> ::=
  [<identifier>:]
  <qualified identifier>
  <arrow>
  <value expression>
  <terminator>

<BEGIN statement> ::=
  [<identifier>:]
  BEGIN
  <terminator>

<BETWEEN predicate> ::=
  <value expression>
  [NOT]
  BETWEEN <value expression>
  AND <value expression>

<BINARY> ::=
  BINARY
  <BINARY attributes list>
  [<WHEN clause>]

<BINARY attributes list> ::=
  {
    <BINARY defaulted attributes list>
    <BINARY optional attributes list>
  }!
```

```
<BINARY defaulted attributes list> ::=
  {
    [<BYTRVS attribute>]
    [<COMPLEX attribute>]
    [<CONSTRAINED attribute>]
    [<FIT attribute>]
    [<PRECISION attribute>]
    [<RADIX attribute>]
    [<SCALE attribute>]
    [<SGNCNV attribute>]
    [<SIGNED attribute>]
  }!

<BINARY optional attributes list> ::=
  {
    [<HELP attribute>]
    [LENGTH({1..64 | <constant identifier>})]
    [<NOTE attribute>]
    [<TITLE attribute>]
  }!

<BIT> ::=
  BIT
  <BIT attributes list>
  [<WHEN clause>]

<BIT attributes list> ::=
  {
    <BIT defaulted attributes list>
    <BIT optional attributes list>
  }!

<BIT defaulted attributes list> ::=
  [LENGTH({1..<max34> | <constant identifier>})] |
  [
    LENGTH(*)
    MAXLEN({1..<max34> | <constant identifier>})
  ]! |
  [
    LENGTH(<qualified identifier>)
    <MAXALC attribute>
    MAXLEN({1..<max34> | <constant identifier>})
  ]!

<BIT optional attributes list> ::=
  {
    [<HELP attribute>]
    [<NOTE attribute>]
    [<TITLE attribute>]
  }!

<BITPRE> ::=
  BITPRE
  <BITPRE attributes list>
  [<WHEN clause>]
```

```
<BITPRE attributes list> ::=
  {
    <BITPRE defaulted attributes list>
    <BITPRE optional attributes list>
  }!

<BITPRE defaulted attributes list> ::=
  {
    [<MAXALC attribute>]
    [<MAXLEN attribute>]
    [<PREBYTRVS attribute>]
    [<PRELEN attribute>]
  }!

<BITPRE optional attributes list> ::=
  {
    [<HELP attribute>]
    [<NOTE attribute>]
    [<TITLE attribute>]
  }!

<BLNENC attribute> ::=
  BLNENC (LSTBIT | <constant identifier>)

<BOOLEAN> ::=
  BOOLEAN
  <BOOLEAN attributes list>
  [<WHEN clause>]

<BOOLEAN attributes list> ::=
  {
    <BOOLEAN defaulted attributes list>
    <BOOLEAN optional attributes list>
  }!

<BOOLEAN defaulted attributes list> ::=
  {
    [<BLNENC attribute>]
    [<BYTRVS attribute>]
    [LENGTH({1..64 | <constant identifier>})]
  }!

<boolean factor> ::=
  [NOT]<boolean primary>

<BOOLEAN optional attributes list> ::=
  {
    [<HELP attribute>]
    [<NOTE attribute>]
    [<TITLE attribute>]
  }!

<boolean primary> ::=
  <boolean literal> |
  <qualified identifier> |
  <predicate> |
  (<condition>)
```

```
<boolean term> ::=
  <boolean factor> |
  <boolean term> AND <boolean factor>

<BYTRVS attribute> ::=
  BYTRVS ({<boolean literal> | <constant identifier>})

<CALL statement> ::=
  [<identifier>:]
  CALL
  <program name>
  <argument list>
  <terminator>

<CASE> ::=
  CASE
  <CASE attributes list>
  [<WHEN clause>]
  <BEGIN statement>
    <WHEN statement>...
    [<OTHERWISE statement>]
  <END statement>

<CASE attributes list> ::=
  {
    <CASE defaulted attributes list>
    <CASE optional attributes list>
  }!

<CASE defaulted attributes list> ::=
  [<MAXALC attribute>]

<CASE optional attributes list> ::=
  {
    [<LENGTH attribute>]
    [<HELP attribute>]
    [<NOTE attribute>]
    [<TITLE attribute>]
  }!

<CCSID attribute> ::=
  CCSID
    ({
      <positive integer> |
      <constant identifier> |
      <qualified identifier>
    })

<CHAR> ::=
  CHAR
  <CHAR attributes list>
  [<WHEN clause>]

<CHAR attributes list> ::=
  {
    <CHAR defaulted attributes list>
    <CHAR optional attributes list>
  }!
```

```
<CHAR defaulted attributes list> ::=
  {
    [<CCSID attribute>]
    [<JUSTIFY attribute>]
    <CHAR length attributes list>
  }!

<CHAR HIGHLOW1 attributes list> ::=
  [
    HIGH({1..<max CHAR> | <constant identifier>})
    LOW({1..<max CHAR> | <constant identifier>})
    UNITLEN({8 | 16 | <constant identifier>})
  ]!

<CHAR HIGHLOW2 attributes list> ::=
  [
    HIGH({1..<max CHAR> | <constant identifier>})
    LOW(<qualified identifier>)
    <MAXALC attribute>
    MAXLEN({1..<max CHAR> | <constant identifier>})
    UNITLEN({8 | 16 | <constant identifier>})
  ]!

<CHAR HIGHLOW3 attributes list> ::=
  [
    HIGH(<qualified identifier>)
    LOW({1..<max CHAR> | <constant identifier>})
    <MAXALC attribute>
    MAXLEN({1..<max CHAR> | <constant identifier>})
    UNITLEN({8 | 16 | <constant identifier>})
  ]!

<CHAR HIGHLOW4 attributes list> ::=
  [
    HIGH(<qualified identifier>)
    LOW(<qualified identifier>)
    <MAXALC attribute>
    MAXLEN({1..<max CHAR> | <constant identifier>})
    UNITLEN({8 | 16 | <constant identifier>})
  ]!

<CHAR LENGTH asterisk attributes list> ::=
  [
    LENGTH(*)
    MAXLEN({1..<max CHAR> | <constant identifier>})
    UNITLEN({8 | 16 | <constant identifier>})
  ]!

<CHAR length attributes list> ::=
  [
    <CHAR LENGTH asterisk attributes list> |
    <CHAR LENGTH fixed attributes list> |
    <CHAR LENGTH identifier attributes list> |
    <CHAR HIGHLOW1 attributes list> |
    <CHAR HIGHLOW2 attributes list> |
    <CHAR HIGHLOW3 attributes list> |
    <CHAR HIGHLOW4 attributes list>
  ]
```

```
<CHAR length fixed attributes list> ::=
  [
    LENGTH({1..<max CHAR> | <constant identifier>})
    UNITLEN({8 | 16 | <constant identifier>})
  ]!

<CHAR LENGTH identifier attributes list> ::=
  [
    LENGTH(<qualified identifier>)
    <MAXALC attribute>
    MAXLEN({1..<max CHAR> | <constant identifier>})
    UNITLEN({8 | 16 | <constant identifier>})
  ]!

<CHAR optional attributes list> ::=
  {
    [<HELP attribute>]
    [<NOTE attribute>]
    [<TITLE attribute>]
  }!

<character> ::=
  <digit> |
  <letter> |
  <special character> |
  <underscore> |
  <space>

<CHARPRE> ::=
  CHARPRE
  <CHARPRE attributes list>
  [<WHEN clause>]

<CHARPRE attributes list> ::=
  {
    <CHARPRE defaulted attributes list>
    <CHARPRE optional attributes list>
  }!

<CHARPRE defaulted attributes list> ::=
  {
    [<CCSID attribute>]
    [<MAXALC attribute>]
    [
      MAXLEN
        ({
          1..<max CHARPRE> |
          <constant identifier>
        })
    ]
    [<PREBYTRVS attribute>]
    [<PRELEN attribute>]
    [UNITLEN({8 | 16 | <constant identifier>})]
  }!
```

```
<CHARPRE optional attributes list> ::=
  {
    [<HELP attribute>]
    [<NOTE attribute>]
    [<TITLE attribute>]
  }!

<CHARSFX> ::=
  CHARSFX
  <CHARSFX attributes list>
  [<WHEN clause>]

<CHARSFX attributes list> ::=
  {
    <CHARSFX defaulted attributes list>
    <CHARSFX optional attributes list>
  }!

<CHARSFX defaulted attributes list> ::=
  {
    [<CCSID attribute>]
    [<MAXALC attribute>]
    [
      MAXLEN
        ({
          1..<max CHARSFX> |
          <constant identifier>
        })
    ]
    [<SFXENC attribute>]
    [UNITLEN({8 | 16 | <constant identifier>})]
  }!

<CHARSFX optional attributes list> ::=
  {
    [<HELP attribute>]
    [<NOTE attribute>]
    [<TITLE attribute>]
  }!

<comment> ::=
  /* <source character>... */

<comparison operator> ::=
  = | < | > | <> | <= | >=

<comparison predicate> ::=
  <value expression>
  <comparison operator>
  <value expression>

<COMPLEX attribute> ::=
  COMPLEX
  ({<boolean literal> | <constant identifier>})

<condition> ::=
  <boolean term> |
  <condition> OR <boolean term>
```

```
<constant identifier> ::=
  <identifier>

<CONSTANT statement> ::=
  <constant identifier> :
  CONSTANT
  {<literal> | <constant identifier>}
  <terminator>

<CONSTRAINED attribute> ::=
  CONSTRAINED
  ({<boolean literal> | <constant identifier>})

<constructor> ::=
  <ARRAY> |
  <CASE> |
  <SEQUENCE>

<data> ::=
  <constructor> |
  {<subtype instance> <terminator>} |
  {<field> <terminator>}

<data declaration statement> ::=
  [<qualified identifier>:]... <data>

<DECLARE attributes list> ::=
  {
    [<NOTE attribute>]
    [<HELP attribute>]
    [<TITLE attribute>]
  }!

<DECLARE statement> ::=
  [<identifier>:]
  DECLARE
  <DECLARE attributes list>
  <BEGIN statement>
    {
      [<DEFAULT statement>] |
      [<CONSTANT statement>] |
      [<SUBTYPE statement>] |
      <data declaration statement>
    }...
  <END statement>
```

```
<DEFAULT statement> ::=
  [<identifier>:]
  DEFAULT
    {
      {ARRAY <ARRAY defaulted attributes list>} |
      {ASIS <ASIS defaulted attributes list>} |
      {BINARY <BINARY defaulted attributes list>} |
      {BIT <BIT defaulted attributes list>} |
      {BITPRE <BITPRE defaulted attributes list>} |
      {BOOLEAN <BOOLEAN defaulted attributes list>} |
      {CASE <CASE defaulted attributes list>} |
      {CHAR <CHAR defaulted attributes list>} |
      {CHARPRE <CHARPRE defaulted attributes list>} |
      {CHARSFX <CHARSFX defaulted attributes list>} |
      {ENUMERATION <ENUMERATION defaulted attributes list>} |
      {FLOAT <FLOAT defaulted attributes list>} |
      {PACKED <PACKED defaulted attributes list>} |
      {ZONED <ZONED defaulted attributes list>}
    }
  <terminator>

<delimiter token> ::=
  <character literal> |
  <special symbol>

<digit> ::=
  0 | 1 | 2 | 3 | 4 | 5 | 6 | 7 | 8 | 9

<dimension> ::=
  {
    [<DMNLOW attribute>]
    {
      <DMNHIGH attribute> |
      <DMNSIZE attribute>
    }
    [<DMNMAX attribute>]
  }!

<DMNHIGH attribute> ::=
  DMNHIGH
    ({
      <signed integer> |
      <constant identifier> |
      <qualified identifier>
    })

<DMNLOW attribute> ::=
  DMNLOW
    ({
      <signed integer> |
      <constant identifier> |
      <qualified identifier>
    })

<DMNLST attribute> ::=
  DMNLST (<dimension> [{, <dimension>}...])

<DMNMAX attribute> ::=
  DMNMAX({<positive integer> | <constant identifier>})
```

```
<DMNSIZE attribute> ::=
  DMNSIZE
    ({
      <signed integer> |
      <constant identifier> |
      <qualified identifier>
    })

<END statement> ::=
  [<identifier>: ]
  END
  <terminator>

<ENUMERATION> ::=
  ENUMERATION
  <ENUMERATION attributes list>
  [<WHEN clause>]
  <enumeration list>

<ENUMERATION attributes list> ::=
  {
    <ENUMERATION defaulted attributes list>
    <ENUMERATION optional attributes list>
  }!

<ENUMERATION defaulted attributes list> ::=
  {
    [<BYTRVS attribute>]
    [LENGTH({8 | 16 | 32 | <constant identifier>})&rbr  k.
    [<SGNCNV attribute>]
    [<SIGNED attribute>]
  }!

<enumeration identifier> ::=
  <identifier>

<enumeration list> ::=
  (<enumeration value>[, <enumeration value>]...)

<ENUMERATION optional attributes list> ::=
  {
    [<HELP attribute>]
    [<NOTE attribute>]
    [<TITLE attribute>]
  }!

<enumeration value> ::=
  <enumeration identifier>[:<signed integer>]

<escape character> ::= <value specification>
```

```
<field> ::=
  <ASIS> |
  <BINARY> |
  <BIT> |
  <BITPRE> |
  <BOOLEAN> |
  <CHAR> |
  <CHARPRE> |
  <CHARSFX> |
  <ENUMERATION> |
  <FLOAT> |
  <PACKED> |
  <ZONED>

<file name> ::=
  <character literal> | <encoded hex literal>

<FIT attribute> ::=
  FIT ({ROUND | TRUNCATE | EXACT | <constant identifier>})

<FLOAT> ::=
  FLOAT
  <FLOAT attributes list>
  [<WHEN clause>]

<FLOAT attributes list> ::=
  {
    <FLOAT defaulted attributes list>
    <FLOAT optional attributes list>
  }!

<FLOAT defaulted attributes list> ::=
  {
    [<BYTRVS attribute>]
    [<COMPLEX attribute>]
    [<FIT attribute>]
    [<FORM attribute>]
    [<RADIX attribute>]
  }!

<FLOAT optional attributes list> ::=
  {
    [<HELP attribute>]
    [<PRECISION attribute>]
    [<NOTE attribute>]
    [<TITLE attribute>]
  }!

<FORM attribute> ::=
  FORM
    ({
      FB32 | FB64 | FB80 | FI128 | FH32 | FH64 | FH128 |
      <constant identifier>
    })
```

```
<HELP attribute> ::=
  HELP
    ({
      <character literal> |
      <encoded hex literal> |
      <constant identifier>
    })

<HIGH attribute> ::=
  HIGH
    ({
      <positive integer> |
      <constant identifier> |
      <qualified identifier>
    })

<identifier> ::=
  {<letter> | <digit> | <identifier character>}...

<identifier character> ::=
  ? | % | & | <underscore>

<IN predicate> ::=
  <value expression>
  [NOT]
  IN (<in value list>)

<in value list> ::=
  <value specification>
  [{,<value specification>}]...

<INCLUDE statement> ::=
  [<identifier> :]
  INCLUDE
  <file name>
  <terminator>

<INPUT parameter> ::=
  <qualified identifier>
    [: INPUT
      {
        [<LENGTH attribute>]
        [<CCSID attribute>]
      }!
    ]

<JUSTIFY attribute> ::=
  JUSTIFY({LEFT | RIGHT | <constant identifier>})
```

```
<key word> ::=
   | ALGEBRAIC | AND | ARRAY | ASIS | BEGIN |
   | BINARY | BIT | BITPRE | BLNENC |
   | BYTRVS | CALL | CASE | CCSID |
   | CHARPRE | CHARSFX | COMPLEX | CONSTANT |
   | DECLARE | DEFAULT | DGTLSTBYT | DMNHIGH |
   | DMNLST | DMNMAX | DMNSIZE | END |
   | ESCAPE | EXACT | FALSE | FB32 |
   | FB80 | FH32 | FH64 | FH128 |
   | FIT | FLOAT | FORM | FRSBYT |
   | HIGH | INCLUDE | IN | INPUT |
   | LEFT | LENGTH | LIKE | LOGICAL |
   | LSTBIT | LSTBYT | MAXALC | MAXLEN |
   | NOTE | OF | OR | OTHERWISE |
   | PACKED | PLAN | PREBYTRVS | PRECISION |
   | RADIX | REJECT | RIGHT | ROUND |
   | SEQUENCE | SFXENC | SGNLOC | SGNMNS |
   | SGNUNS | SIGNED | SKIP | SUBSTR |
   | THEN | TITLE | TRUE | TRUNCATE |
   | WHEN | ZONED | ZONENC | ZONFRSBYT |


<LENGTH attribute> ::=
  LENGTH
    ({
      <positive integer> |
      <constant identifier> |
      <qualified identifier>
    })

<LENGTH function> ::=
  LENGTH (<qualified identifier>)

<letter> ::=
  <upper case letter> | <lower case letter>

<LIKE predicate> ::=
  <value expression> [NOT] LIKE <pattern>
  [ESCAPE <escape character>]

<LOW attribute> ::=
  LOW
    ({
      <positive integer> |
      <constant identifier> |
      <qualified identifier>
    })

<lower case letter> ::=
  a | b | c | d | e | f | g | h | i |
  j | k | l | m | n | o | p | q | r |
  s | t | u | v | w | x | y | z

<max ASIS> ::=
  See Syntax Rule 4 on page 59.

<max CHAR> ::=
  See Syntax Rule 3 on page 75.
```

```
<max CHARPRE> ::=
  See Syntax Rule 3 on page 77.

<max CHARSFX> ::=
  See Syntax Rule 3 on page 79.

<MAXALC attribute> ::=
  MAXALC ({<boolean literal> | <constant identifier>})

<MAXLEN attribute> ::=
  MAXLEN
    ({
      <positive integer> |
      <constant identifier> |
      <qualified identifier>
    })

<max15> ::= 32,767

<max31> ::= 2,147,483,647

<max34> ::= 17,179,869,176

<max7>  ::= 127

<max8>  ::= 255

<min31> ::= -2,147,483,648

<min7>  ::= -128

<module> ::= {<DECLARE statement> | <PLAN statement>}...

<new line> ::=
  See Syntax Rule #1 on page 34.

<nondelimiter token> ::=
  <qualified identifier> |
  <key word> |
  <noncharacter literal> |
  <quoted key word>

<NOTE attribute> ::=
  NOTE
    ({
      <character literal> |
      <encoded hex literal> |
      <constant identifier>
    })

<OTHERWISE clause> ::=
  OTHERWISE
    {
      <data declaration statement> |
      <REJECT statement> |
      <SKIP statement> |
      <terminator>
    }
```

```
<OTHERWISE statement> ::=
  [<identifier>: ]
  <OTHERWISE clause>

<OUTPUT parameter> ::=
  <qualified identifier>
  : OUTPUT
    {
      [<MAXLEN attribute>]
      [<CCSID attribute>]
    }!

<PACKED> ::=
  PACKED
  <PACKED attributes list>
  [<WHEN clause>]

<PACKED attributes list> ::=
  {
    <PACKED defaulted attributes list>
    <PACKED optional attributes list>
  }!

<PACKED defaulted attributes list> ::=
  {
    [<COMPLEX attribute>]
    [<CONSTRAINED attribute>]
    [<FIT attribute>]
    [PRECISION({1..31 | <constant identifier>})]
    [SCALE({-128..127 | <constant identifier>})]
    <PACKED SIGNED attributes list>
  }!

<PACKED optional attributes list> ::=
  {
    [<HELP attribute>]
    [<NOTE attribute>]
    [<TITLE attribute>]
  }!

<PACKED SGNLOC attributes list> ::=
  SGNLOC(DGTLSTBYT)
  {
    [
      <SGNMNS attribute>
      <SGNPLS attribute>
    ]! |
    [<SGNUNS attribute>]
  }

<PACKED SIGNED attributes list> ::=
  [
    SIGNED(TRUE)
    <PACKED SGNLOC attributes list>
  ]! |
  [SIGNED(FALSE)]

<parameter> ::=
  {<INPUT parameter> | <OUTPUT parameter>}
```

```
<parameter list> ::=
  (<parameter>[,<parameter>]...)

<pattern> ::= <value specification>

<PLAN statement> ::=
  <identifier>:
  PLAN
  <parameter list>
  <BEGIN statement>
    {<assignment statement> | <CALL statement>}...
  <END statement>

<positional identifier> ::= " <digit>... "

<PREBYTRVS attribute> ::=
  PREBYTRVS ({<boolean literal> | <constant identifier>})

<PRECISION attribute> ::=
  PRECISION
  ({<positive integer> | <constant identifier>})

<predicate> ::=
  <comparison predicate> |
  <BETWEEN predicate> |
  <IN predicate> |
  <LIKE predicate>

<PRELEN attribute> ::=
  PRELEN ({16 | 32 | <constant identifier>})

<program name> ::= <character literal>

<qualified identifier> ::=
  <qualifier list> [<subscript list>]

<qualifier> ::=
  <identifier> | <positional identifier>

<qualifier list> ::=
  [<qualifier>.]...<qualifier>

<quoted key word> ::= " <key word> "

<RADIX attribute> ::=
  RADIX ({2 | 10 | <constant identifier>})

<REJECT statement> ::=
  [<identifier>:]
  REJECT <terminator>

<SCALE attribute> ::=
  SCALE({<signed integer> | <constant identifier>})

<separator> ::=
  {<comment> | <space> | <new line> | <tab>}...
```

```
<SEQUENCE> ::=
  SEQUENCE
  <SEQUENCE attributes list>
  [<WHEN clause>]
  <BEGIN statement>
    {<data declaration statement> | <SKIP statement>}...
  <END statement>

<SEQUENCE attributes list> ::=
  <SEQUENCE optional attributes list>

<SEQUENCE optional attributes list> ::=
  {
    [<HELP attribute>]
    [<NOTE attribute>]
    [<TITLE attribute>]
  }!

<SFXENC attribute> ::=
  SFXENC ({x'00' | x'0000' | <constant identifier>})

<SGNCNV attribute> ::=
  SGNCNV
    ({
      ALGEBRAIC |
      LOGICAL |
      <constant identifier>
    })

<SGNLOC attribute> ::=
  SGNLOC
    ({
      DGTLSTBYT |
      ZONFRSBYT |
      ZONLSTBYT |
      FRSBYT |
      LSTBYT |
      <constant identifier>
    })

<SGNMNS attribute> ::=
  SGNMNS ({<hex literal> | <constant identifier>})

<SGNPLS attribute> ::=
  SGNPLS ({<hex literal> | <constant identifier>})

<SGNUNS attribute> ::=
  SGNUNS ({<hex literal> | <constant identifier>})

<SIGNED attribute> ::=
  SIGNED ({<boolean literal> | <constant identifier>})

<SKIP attribute> ::=
  SKIP ({<positive integer> | <constant identifier>})

<SKIP statement> ::=
  [<identifier>:]
  SKIP({<positive integer> | <constant identifier>})
  <terminator>
```

```
<source character> ::=
  See the Syntax Rule on 22.

<space> ::=
  See Syntax Rule #1 on page 34.

<special character> ::=
  . | , | : | ; | ? | ( | ) | ' | " |
  / | - | & | + | % | = | * | > | <

<special symbol> ::=
  ' | * | . | , | : | ; | = | + | - | ( | ) |
  > | < | <> | >= | <= | /* | */ | <arrow>

<subscript list> ::=
  ()

<SUBSTR function> ::=
  SUBSTR (<SUBSTR reference>,<SUBSTR position>,<SUBSTR length>)

<SUBSTR length> ::=
  <positive integer> | <constant identifier> | <qualified identifier>

<SUBSTR position> ::=
  <positive integer> | <constant identifier> | <qualified identifier>

<SUBSTR reference> ::= <qualified identifier>

<subtype identifier> ::= <identifier>

<subtype instance> ::=
  <subtype identifier>
  <subtype instance attributes list>
  [<WHEN clause>]

<subtype instance attributes list> ::=
  {
    <ARRAY attributes list> |
    <ASIS attributes list> |
    <BIT attributes list> |
    <BITPRE attributes list> |
    <BOOLEAN attributes list> |
    <CASE attributes list> |
    <CHAR attributes list> |
    <CHARPRE attributes list> |
    <CHARSFX attributes list> |
    <BINARY attributes list> |
    <ENUMERATION attributes list> |
    <FLOAT attributes list> |
    <PACKED attributes list> |
    <SEQUENCE attributes list> |
    <ZONED attributes list>
  }
```

```
<SUBTYPE statement> ::=
  <subtype identifier>:
  SUBTYPE
  OF
    {
      <constructor> |
      {<field> <terminator>} |
      {<subtype instance> <terminator>}
    }

<tab> ::=
  See Syntax Rule #1 on page 34.

<terminator> ::= ;

<THEN clause> ::=
  THEN
    {
      <data declaration statement> |
      <REJECT statement> |
      <SKIP statement> |
      <terminator>
    }

<TITLE attribute> ::=
  TITLE
    ({
      <character literal> |
      <encoded hex literal> |
      <constant identifier>
    })

<token> ::=
  <nondelimiter token> | <delimiter token>

<underscore> ::= _

<UNITLEN attribute> ::=
  UNITLEN({ 1 | 8 | 16 | <constant identifier>})

<upper case letter> ::=
  A | B | C | D | E | F | G | H | I |
  J | K | L | M | N | O | P | Q | R |
  S | T | U | V | W | X | Y | Z

<value expression> ::=
  <value specification> |
  (<value expression>)

<value specification> ::=
  <literal> |
  <constant identifier> |
  <qualified identifier> |
  <LENGTH function> |
  <SUBSTR function>

<WHEN clause> ::=
  WHEN <condition>
```

```
<WHEN statement> ::=
  [<identifier>:]
  <WHEN clause>
  <THEN clause>

<ZONED> ::=
  ZONED
  <ZONED attributes list>
  [<WHEN clause>]

<ZONED attributes list> ::=
  {
    <ZONED defaulted attributes list>
    <ZONED optional attributes list>
  }!

<ZONED defaulted attributes list> ::=
  {
    [<COMPLEX attribute>]
    [<CONSTRAINED attribute>]
    [<FIT attribute>]
    [PRECISION({1..31 | <constant identifier>})]
    [SCALE({-128..127 | <constant identifier>})]
    <ZONED SIGNED attributes list>
    [<ZONENC attribute>]
  }!

<ZONED optional attributes list> ::=
  {
    [<HELP attribute>]
    [<NOTE attribute>]
    [<TITLE attribute>]
  }!

<ZONED SGNLOC attributes list> ::=
  [
    SGNLOC({ZONLSTBYT | ZONFRSBYT})
    <SGNMNS attribute>
    <SGNPLS attribute>
  ]! |
  [
    SGNLOC({LSTBYT | FRSBYT})
    <CCSID attribute>
  ]!

<ZONED SIGNED attributes list> ::=
  [
    SIGNED(TRUE)
    <ZONED SGNLOC attributes list>
  ]! |
  [SIGNED(FALSE)]

<ZONENC attribute> ::=
  ZONENC ({<hex literal> | <constant identifier>})
```

Glossary

A Data Language. A language for describing the fields, arrays, etc. of data records so that these records can be transparently accessed by programs.

ADL. A Data Language

ADLCA. ADL Communications Area contains control information for exception handling.

alignment. The storing of data in relation to certain machine-dependent boundaries.

application. A collection of programs, files, views, and other resources designed to work together to model some aspect of reality.

array. An object consisting of an ordered collection of homogeneous objects mapped onto N dimensions.

attribute. An object that specifies information about another object (e.g., the length of a character string field or the date at which a record was last accessed).

bit string. A sequence of bits.

BNF. Backus-Naur Form (or Backus Normal Form). A syntax for formally describing a language.

boolean. An object that can have only one of two possible states (e.g., TRUE and FALSE).

built-in attribute. Attribute defined as part of ADL.

built-in function. Function defined as part of ADL.

case. An ordered collection of selections for the declaration of a field.

CCSID. Coded Character Set IDentifier - A Character Data Representation Architecture defined identifier that determines the code pages, character sets, and encoding scheme used to encode character string data.

CDRA. Character Data Representation Architecture

CEE. Common Execution Environment character string. A string of bytes containing characters encoded as specified by its CCSID attribute.

constructor. A data type that consists of zero or more instances of other data types. ADL examples of constructors are ARRAYs, CASEs, and SEQUENCEs.

CTOK. A Condition Token is a 12-byte area in which information about the execution of a called program is returned by that program.

DBCS. Double Byte Character Set - characters encoded in two bytes.

DDU. Data Description Utility - tool which provides programmers with interactive facilities for creating, managing, and using ADL modules.

demarshal. The process of decomposing a message into separately processable input or output parameters.

declaration. An ADL statement specifying the type, attributes, and entities of a record or an object.

discriminant. A discriminant is field that can be tested by a WHEN statement of a CASE to determine if the data declaration clause of the WHEN statement is to be selected.

element. An instance of a data type that is a component of a constructor data type.

entity. A record or an object.

fixed-point number. An object representing a number whose precision and scale are fixed.

floating-point number. An object representing a number with fixed precision and floating scale.

marshal. The process of composing a message from separately processable input or output parameters.

mixed character string. A character string consisting of both SBCS and DBCS characters.

module. A set of data declarations and plans for converting data.

null data. Absence of data to describe.

object. An instance of a type (e.g., a field of a record or an attribute of a field).

PL. Programming Language plan. A program for converting data from one representation to another.

program. An instruction stream for a particular machine architecture.

record. An instance of a field or constructor type.

SBCS. Single Byte Character Set - characters encoded in one byte.

sequence. An object consisting of an ordered collection of heterogeneous objects.

space. A contiguous sequence of memory locations in which data is represented.

subtype. In the type hierarchy, a lower level type which inherits characteristics and attributes from a higher level type.

supertype. In the type hierarchy, a higher level type from which a subtype inherits its characteristics and attributes.

type. A set of representable values encapsulated by a set of operations on those values. Each programming language defines its own set of data types, such as the *PIC* data types of COBOL or the *integer* data type of C.

representation domain. The set of programs and objects that process or store data of the same set of programming language data types and representations. Examples of representation domains are *MVS COBOL*, and *OS/2 C*.

declaration translator. A facility for a single representation domain capable of

- Mapping programming language data descriptions into ADL.
- Mapping the ADL of another representation domain into ADL of its own representation domain.
- Mapping ADL into programming language data descriptions.

Index

A

ALGEBRAIC
in <key word> 34
in <SGNCNV attribute> 111
in section: <SGNCNV attribute> 111
AND
in <BETWEEN predicate> 21
in <boolean term> 24
in <key word> 34
in section: <BETWEEN predicate> 21, 22
in section: <condition> 24, 25
<argument>
defined 38
in <argument list> 38
<argument list>
defined 38
in <CALL statement> 38
ARRAY
defined 56
in <ARRAY> 56
in <constructor> 40
in <DEFAULT statement> 42
in <key word> 34
in section: <ARRAY> 57
in section: <ASIS> 59
in section: <BIT> 66
in section: <CHAR> 75
in section: <DMNLST attribute> 100
in section: <qualified identifier> 31, 32
in section: <SKIP attribute> 117
in section: ARRAY-to-ARRAY 125
<ARRAY attributes list>
defined 57
in <ARRAY> 56
in <subtype instance attributes list> 90
<ARRAY defaulted attributes list>
defined 57
in <ARRAY attributes list> 57
in <DEFAULT statement> 42
in section: <ARRAY> 57
<ARRAY optional attributes list>
defined 57
in <ARRAY attributes list> 57
<arrow>
defined 34
in <assignment statement> 37
in section: <assignment statement> 37
ASIS
defined 58
in <ASIS> 58
in <DEFAULT statement> 42
in <field> 40
in <key word> 34
in section: <ASIS> 58, 59
ASIS *(continued)*
in section: <LENGTH attribute> 105
in section: <MAXLEN attribute> 106
in section: <UNITLEN attribute> 118
in section: ASIS-to-constructor 126
in section: ASIS-to-field data types 126
in section: BIT-to-BIT 128
in section: Constructor-to-ASIS 133
in section: field data types-to-ASIS 135
<ASIS attributes list>
defined 58
in <ASIS> 58
in <subtype instance attributes list> 90
<ASIS defaulted attributes list>
defined 58
in <ASIS attributes list> 58
in <DEFAULT statement> 42
in section: <ASIS> 59
<ASIS optional attributes list>
defined 59
in <ASIS attributes list> 58
<assignment statement>
defined 37
in <PLAN statement> 45
in section: <ASIS> 59
in section: <assignment statement> 37
in section: ARRAY-to-ARRAY 125
in section: CASE-to-CASE 130
<assignment statements>
in section: Functions 121

B

BEGIN
in <BEGIN statement> 37
in <key word> 34
<BEGIN statement>
defined 37
in <CASE> 69
in <DECLARE statement> 41
in <PLAN statement> 45
in <SEQUENCE> 88
in section: <BEGIN statement> 38
in section: <END statement> 43
BETWEEN
in <BETWEEN predicate> 21
in <key word> 34
in section: <BETWEEN predicate> 21, 22
<BETWEEN predicate>
defined 21
in <predicate> 31
BINARY
defined 62
in <BINARY> 62
in <DEFAULT statement> 42

BINARY *(continued)*
in <field> 40
in <key word> 34
in section: <ASIS> 59
in section: <BINARY> 60, 61, 62, 63, 64, 65
in section: <BIT> 66
in section: <BITPRE> 67
in section: <CCSID attribute> 97
in section: <CHAR> 75
in section: <CHARPRE> 76
in section: <data declaration statement> 40
in section: <DEFAULT statement> 43
in section: <DMNHIGH attribute> 99
in section: <DMNLOW attribute> 100
in section: <DMNSIZE attribute> 101
in section: <ENUMERATION> 80
in section: <FLOAT> 83
in section: <HIGH attribute> 103
in section: <LENGTH attribute> 105
in section: <LENGTH function> 121
in section: <LOW attribute> 105
in section: <MAXLEN attribute> 107
in section: <PRECISION attribute> 108
in section: <PRELEN attribute> 109
in section: <RADIX attribute> 109
in section: <SCALE attribute> 110
in section: <SGNCNV attribute> 111
in section: <SIGNED attribute> 116
in section: ADL Condition Summary 157
in section: ASIS-to-field data types 126
in section: BINARY, PACKED, ZONED-to-ENUMERATION 127
in section: ENUMERATION-to-BINARY, PACKED, ZONED 133
in section: Numeric Conversions 135, 136, 137, 138, 139, 142, 145, 146, 147, 148, 149, 150, 152, 153
<BINARY attributes list>
defined 62
in <BINARY> 62
in <subtype instance attributes list> 90
<BINARY defaulted attributes list>
defined 62
in <BINARY attributes list> 62
in <DEFAULT statement> 42
in section: <BINARY> 62
<BINARY optional attributes list>
defined 62
in <BINARY attributes list> 62
BIT
defined 65
in <BIT> 65
in <DEFAULT statement> 42
in <field> 40
in <key word> 34
in section: <BIT> 65, 66
in section: <comparison predicate> 23
in section: <LENGTH attribute> 105
BIT *(continued)*
in section: <MAXLEN attribute> 106
in section: ASIS-to-field data types 126
in section: BIT-to-BIT 128
in section: BIT-to-BITPRE 129
in section: BITPRE-to-BIT 129
<BIT attributes list>
defined 66
in <BIT> 65
in <subtype instance attributes list> 90
<BIT defaulted attributes list>
defined 66
in <BIT attributes list> 66
in <DEFAULT statement> 42
in section: <BIT> 66
<BIT optional attributes list>
defined 66
in <BIT attributes list> 66
BITPRE
defined 67
in <BITPRE> 67
in <DEFAULT statement> 42
in <field> 40
in <key word> 34
in section: <BITPRE> 67, 68
in section: <comparison predicate> 23
in section: <MAXLEN attribute> 106
in section: <PREBYTRVS attribute> 107
in section: <PRELEN attribute> 109
in section: ASIS-to-field data types 127
in section: BIT-to-BITPRE 129
in section: BITPRE-to-BIT 129
in section: BITPRE-to-BITPRE 129
<BITPRE attributes list>
defined 68
in <BITPRE> 67
in <subtype instance attributes list> 90
<BITPRE defaulted attributes list>
defined 68
in <BITPRE attributes list> 68
in <DEFAULT statement> 42
in section: <BITPRE> 68
<BITPRE optional attributes list>
defined 68
in <BITPRE attributes list> 68
BLNENC
in <BLNENC attribute> 95
in <key word> 34
<BLNENC attribute>
defined 95
in <BOOLEAN defaulted attributes list> 69
BOOLEAN
defined 68
in <BOOLEAN> 68
in <DEFAULT statement> 42
in <field> 40
in <key word> 34
in section: <BLNENC attribute> 95

BOOLEAN *(continued)*
in section: <BOOLEAN> 68, 69
in section: <comparison predicate> 23
in section: <condition> 24
in section: <LENGTH attribute> 105
in section: ASIS-to-field data types 127
in section: BOOLEAN-to-BOOLEAN 130
<BOOLEAN attributes list>
defined 68
in <BOOLEAN> 68
in <subtype instance attributes list> 90
<BOOLEAN defaulted attributes list>
defined 69
in <BOOLEAN attributes list> 68
in <DEFAULT statement> 42
in section: <BOOLEAN> 69
<boolean factor>
defined 24
in <boolean term> 24
<boolean literal>
in <boolean primary> 24
in <BYTRVS attribute> 95
in <COMPLEX attribute> 97
in <CONSTRAINED attribute> 98
in <MAXALC attribute> 106
in <PREBYTRVS attribute> 107
in <SIGNED attribute> 116
in section: <BYTRVS attribute> 95
in section: <COMPLEX attribute> 97
in section: <CONSTRAINED attribute> 98
in section: <MAXALC attribute> 106
in section: <PREBYTRVS attribute> 108
in section: <SIGNED attribute> 116
<BOOLEAN optional attributes list>
defined 69
in <BOOLEAN attributes list> 68
<boolean primary>
defined 24
in <boolean factor> 24
in section: <condition> 24
<boolean term>
defined 24
in <boolean term> 24
in <condition> 24
BYTRVS
in <BYTRVS attribute> 95
in <key word> 34
in section: <BINARY> 63
in section: <BOOLEAN> 69
in section: <BYTRVS attribute> 95, 96
in section: Numeric Conversions 143
<BYTRVS attribute>
defined 95
in <BINARY defaulted attributes list> 62
in <BOOLEAN defaulted attributes list> 69
in <ENUMERATION defaulted attributes list> 80
in <FLOAT defaulted attributes list> 84

C
CALL
in <CALL statement> 38
in <key word> 34
<CALL statement>
defined 38
in <PLAN statement> 45
in section: <CALL statement> 38
in section: Program Calling Conventions 155
CASE
defined 69
in <ARRAY> 56
in <CASE> 69
in <constructor> 40
in <DEFAULT statement> 42
in <key word> 34
in section: <CASE> 69, 70
in section: <LENGTH attribute> 105
in section: <OTHERWISE statement> 44, 45
in section: <positional identifier> 30
in section: <qualified identifier> 31, 32
in section: <WHEN statement> 50, 51
in section: CASE-to-CASE 130
<CASE attributes list>
defined 69
in <CASE> 69
in <subtype instance attributes list> 90
<CASE defaulted attributes list>
defined 69
in <CASE attributes list> 69
in <DEFAULT statement> 42
in section: <CASE> 70
<CASE optional attributes list>
defined 69
in <CASE attributes list> 69
CCSID
in <CCSID attribute> 96
in <key word> 34
in section: <CCSID attribute> 96, 97
in section: <CHAR> 73, 75
in section: <CHARPRE> 76
in section: <CHARSFX> 78
in section: <DEFAULT statement> 43
in section: <INCLUDE statement> 44
in section: <SGNLOC attribute> 114
in section: <ZONED> 91
in section: ADL Condition Summary 157
in section: CHARxxx-to-CHARxxx 130, 131
<CCSID attribute>
defined 96
in <CHAR defaulted attributes list> 73
in <CHARPRE defaulted attributes list> 77
in <CHARSFX defaulted attributes list> 78
in <INPUT parameter> 45
in <OUTPUT parameter> 46
in <ZONED SGNLOC attributes list> 92
in section: <CCSID attribute> 96
in section: <CHAR> 75

<CCSID attribute> *(continued)*
in section: <character> 22
in section: <CHARPRE> 77
in section: <CHARSFX> 79
in section: <comparison predicate> 24
in section: <INCLUDE statement> 44
in section: <token> 34
in section: <ZONED> 92
CHAR
defined 73
in <CHAR> 73
in <DEFAULT statement> 42
in <field> 40
in <key word> 34
in section: <CHAR> 73, 75
in section: <comparison predicate> 23
in section: <data declaration statement> 40
in section: <JUSTIFY attribute> 104
in section: <LENGTH attribute> 105
in section: <LENGTH function> 121
in section: <LIKE predicate> 27
in section: <MAXLEN attribute> 106
in section: <SUBSTR function> 121, 122
in section: <UNITLEN attribute> 118
in section: ASIS-to-field data types 127
in section: CHARxxx-to-CHARxxx 131, 132
<CHAR attributes list>
defined 73
in <CHAR> 73
in <subtype instance attributes list> 90
<CHAR defaulted attributes list>
defined 73
in <CHAR attributes list> 73
in <DEFAULT statement> 42
in section: <CHAR> 75
<CHAR HIGHLOW1 attributes list>
defined 74
in <CHAR length attributes list> 73
<CHAR HIGHLOW2 attributes list>
defined 74
in <CHAR length attributes list> 73
<CHAR HIGHLOW3 attributes list>
defined 74
in <CHAR length attributes list> 73
<CHAR HIGHLOW4 attributes list>
defined 74
in <CHAR length attributes list> 73
<CHAR LENGTH asterisk attributes list>
defined 74
in <CHAR length attributes list> 73
<CHAR length attributes list>
defined 73
in <CHAR defaulted attributes list> 73
<CHAR LENGTH fixed attributes list>
defined 74
in <CHAR length attributes list> 73
<CHAR LENGTH identifier attributes list>
defined 74
<CHAR LENGTH identifier attributes list> *(continued)*
in <CHAR length attributes list> 73
<CHAR optional attributes list>
defined 74
in <CHAR attributes list> 73
<character>
defined 22
<character literal>
in <delimiter token> 33
in <file name> 44
in <HELP attribute> 103
in <NOTE attribute> 107
in <program name> 38
in <TITLE attribute> 117
in section: <HELP attribute> 103
in section: <INCLUDE statement> 44
in section: <NOTE attribute> 107
in section: <TITLE attribute> 117
in section: <token> 34
CHARPRE
defined 76
in <CHARPRE> 76
in <DEFAULT statement> 42
in <field> 40
in <key word> 34
in section: <CHARPRE> 76, 77
in section: <comparison predicate> 23
in section: <LENGTH attribute> 105
in section: <LENGTH function> 121
in section: <MAXLEN attribute> 106
in section: <PREBYTRVS attribute> 107
in section: <PRELEN attribute> 109
in section: <SUBSTR function> 121
in section: <UNITLEN attribute> 118
in section: ASIS-to-field data types 127
in section: CHARxxx-to-CHARxxx 132
<CHARPRE attributes list>
defined 76
in <CHARPRE> 76
in <subtype instance attributes list> 90
<CHARPRE defaulted attributes list>
defined 77
in <CHARPRE attributes list> 76
in <DEFAULT statement> 42
in section: <CHARPRE> 77
<CHARPRE optional attributes list>
defined 77
in <CHARPRE attributes list> 76
CHARSFX
defined 78
in <field> 40
in <key word> 34
in section: <CHARSFX> 79
<CHARSFX attributes list>
defined 78
in <CHARSFX> 78
in <subtype instance attributes list> 90

<CHARSFX defaulted attributes list>
defined 78
in <CHARSFX attributes list> 78
in <DEFAULT statement> 42
in section: <CHARSFX> 79
<CHARSFX optional attributes list>
defined 79
in <CHARSFX attributes list> 78
<comment>
defined 33
in <separator> 33
in section: <token> 34
<comparison operator>
defined 23
in <comparison predicate> 23
in section: <comparison predicate> 23
<comparison predicate>
defined 23
in <predicate> 31
in section: <BETWEEN predicate> 21
in section: <IN predicate> 26
COMPLEX
in <key word> 34
<COMPLEX attribute>
defined 97
in <BINARY defaulted attributes list> 62
in <FLOAT defaulted attributes list> 84
in <PACKED defaulted attributes list> 87
in <ZONED defaulted attributes list> 92
<condition>
defined 24
in <boolean primary> 24
in <condition> 24
in <WHEN clause> 35
in section: <CASE> 70
in section: <condition> 24
in section: CASE-to-CASE 130
CONSTANT
in <CONSTANT statement> 39
in <key word> 34
in section: <CONSTANT statement> 39
<constant declaration statement>
in section: <JUSTIFY attribute> 104
<constant identifier>
defined 39
in <ASIS defaulted attributes list> 58
in <BINARY optional attributes list> 62
in <BIT defaulted attributes list> 66
in <BLNENC attribute> 95
in <BOOLEAN defaulted attributes list> 69
in <BYTRVS attribute> 95
in <CCSID attribute> 96
in <CHAR HIGHLOW1 attributes list> 74
in <CHAR HIGHLOW2 attributes list> 74
in <CHAR HIGHLOW3 attributes list> 74
in <CHAR HIGHLOW4 attributes list> 74
in <CHAR LENGTH asterisk attributes list> 74
in <CHAR length fixed attributes list> 74
<constant identifier> *(continued)*
in <CHAR LENGTH identifier attributes list> 74
in <CHARPRE defaulted attributes list> 77
in <CHARSFX defaulted attributes list> 78
in <COMPLEX attribute> 97
in <CONSTANT statement> 39
in <CONSTRAINED attribute> 98
in <DMNHIGH attribute> 99
in <DMNLOW attribute> 99
in <DMNMAX attribute> 100
in <DMNSIZE attribute> 101
in <ENUMERATION defaulted attributes list> 80
in <FIT attribute> 101
in <FORM attribute> 102
in <HELP attribute> 103
in <HIGH attribute> 103
in <JUSTIFY attribute> 104
in <LENGTH attribute> 104
in <LOW attribute> 105
in <MAXALC attribute> 106
in <MAXLEN attribute> 106
in <NOTE attribute> 107
in <PACKED defaulted attributes list> 87
in <PREBYTRVS attribute> 107
in <PRECISION attribute> 108
in <PRELEN attribute> 109
in <RADIX attribute> 109
in <SCALE attribute> 110
in <SFXENC attribute> 110
in <SGNCNV attribute> 111
in <SGNLOC attribute> 113
in <SGNMNS attribute> 115
in <SGNPLS attribute> 115
in <SGNUNS attribute> 116
in <SIGNED attribute> 116
in <SKIP attribute> 117
in <SKIP statement> 47
in <SUBSTR length> 121
in <SUBSTR position> 121
in <TITLE attribute> 117
in <UNITLEN attribute> 118
in <value specification> 35
in <ZONED defaulted attributes list> 92
in <ZONENC attribute> 118
in section: <BLNENC attribute> 95
in section: <BYTRVS attribute> 95
in section: <CCSID attribute> 96
in section: <COMPLEX attribute> 97
in section: <CONSTANT statement> 39
in section: <CONSTRAINED attribute> 98
in section: <DEFAULT statement> 42
in section: <DMNHIGH attribute> 99
in section: <DMNLOW attribute> 99
in section: <DMNMAX attribute> 101
in section: <DMNSIZE attribute> 101
in section: <FIT attribute> 102
in section: <FORM attribute> 102
in section: <HELP attribute> 103

<constant identifier> *(continued)*
in section: <HIGH attribute> 103
in section: <JUSTIFY attribute> 104
in section: <LENGTH attribute> 105
in section: <LOW attribute> 105
in section: <MAXALC attribute> 106
in section: <MAXLEN attribute> 106
in section: <NOTE attribute> 107
in section: <PREBYTRVS attribute> 108
in section: <PRECISION attribute> 108
in section: <PRELEN attribute> 109
in section: <RADIX attribute> 109
in section: <SCALE attribute> 110
in section: <SFXENC attribute> 110
in section: <SGNCNV attribute> 111
in section: <SGNLOC attribute> 114
in section: <SGNMNS attribute> 115
in section: <SGNPLS attribute> 115
in section: <SGNUNS attribute> 116
in section: <SIGNED attribute> 116
in section: <SKIP attribute> 117
in section: <SKIP statement> 48
in section: <SUBSTR function> 122
in section: <TITLE attribute> 117
in section: <token> 34
in section: <UNITLEN attribute> 118
in section: <ZONENC attribute> 118
<CONSTANT statement>
defined 39
in <DECLARE statement> 41
in section: <BLNENC attribute> 95
in section: <BYTRVS attribute> 95
in section: <CCSID attribute> 96
in section: <COMPLEX attribute> 97
in section: <CONSTRAINED attribute> 98
in section: <DMNHIGH attribute> 99
in section: <DMNLOW attribute> 99
in section: <DMNMAX attribute> 101
in section: <DMNSIZE attribute> 101
in section: <FIT attribute> 102
in section: <FORM attribute> 102
in section: <HELP attribute> 103
in section: <HIGH attribute> 103
in section: <LENGTH attribute> 105
in section: <LOW attribute> 105
in section: <MAXALC attribute> 106
in section: <MAXLEN attribute> 106
in section: <NOTE attribute> 107
in section: <PREBYTRVS attribute> 108
in section: <PRECISION attribute> 108
in section: <PRELEN attribute> 109
in section: <RADIX attribute> 109
in section: <SCALE attribute> 110
in section: <SFXENC attribute> 110
in section: <SGNCNV attribute> 111
in section: <SGNLOC attribute> 114
in section: <SGNMNS attribute> 115
in section: <SGNPLS attribute> 115
<CONSTANT statement> *(continued)*
in section: <SGNUNS attribute> 116
in section: <SIGNED attribute> 116
in section: <SKIP attribute> 117
in section: <SUBSTR function> 122
in section: <TITLE attribute> 117
in section: <UNITLEN attribute> 118
in section: <ZONENC attribute> 118
CONSTRAINED
in <CONSTRAINED attribute> 98
in <key word> 34
in section: <BINARY> 60, 61
in section: <CONSTRAINED attribute> 98
in section: ADL Condition Summary 158
in section: Numeric Conversions 138, 139, 144, 146, 147
<CONSTRAINED attribute>
defined 98
in <BINARY defaulted attributes list> 62
in <PACKED defaulted attributes list> 87
in <ZONED defaulted attributes list> 92
<constructor>
defined 40
in <data> 39
in <SUBTYPE statement> 49
in section: <ASIS> 59
in section: <BIT> 66
in section: <CHAR> 75
in section: <PLAN statement> 46

D

<data>
defined 39
in <data declaration statement> 39
in section: <data declaration statement> 40
<data declaration statement>
defined 39
in <DECLARE statement> 41
in <OTHERWISE clause> 45
in <SEQUENCE> 88
in <THEN clause> 50
in section: <ARRAY> 57
in section: <ASIS> 59
in section: <BINARY> 62
in section: <BIT> 66
in section: <BITPRE> 68
in section: <BOOLEAN> 69
in section: <CASE> 70
in section: <CCSID attribute> 96
in section: <CHAR> 75
in section: <CHARPRE> 77
in section: <CHARSFX> 79
in section: <data declaration statement> 40
in section: <DEFAULT statement> 41, 43
in section: <ENUMERATION> 80
in section: <FLOAT> 85
in section: <LENGTH attribute> 105
in section: <MAXLEN attribute> 107

<data declaration statement> *(continued)*
in section: <PACKED> 87
in section: <PLAN statement> 46
in section: <subtype instance> 90
in section: <ZONED> 92
DECLARE
in <DECLARE statement> 41
in <key word> 34
in section: <positional identifier> 31
<DECLARE attributes list>
defined 41
in <DECLARE statement> 41
<DECLARE statement>
defined 41
in <module> 30
in section: <DEFAULT statement> 42
in section: <module> 30
in section: <positional identifier> 30
in section: <qualified identifier> 31
DEFAULT
in <DEFAULT statement> 42
in <key word> 34
<DEFAULT statement>
defined 42
in <DECLARE statement> 41
in section: <ARRAY> 57
in section: <ASIS> 59
in section: <BINARY> 62
in section: <BIT> 66
in section: <BITPRE> 68
in section: <BOOLEAN> 69
in section: <CASE> 70
in section: <CCSID attribute> 96
in section: <CHAR> 75
in section: <CHARPRE> 77
in section: <CHARSFX> 79
in section: <data declaration statement> 40
in section: <DEFAULT statement> 42, 43
in section: <ENUMERATION> 80
in section: <FLOAT> 85
in section: <LENGTH attribute> 105
in section: <MAXLEN attribute> 107
in section: <PACKED> 87
in section: <ZONED> 92
in section: ARRAY-to-ARRAY 125
<delimiter token>
defined 33
in <token> 33
in section: <token> 34
DGTLSTBYT
in <key word> 34
in <PACKED SGNLOC attributes list> 87
in <SGNLOC attribute> 113
in section: <PACKED> 87
in section: <SGNLOC attribute> 113, 114
in section: <SGNMNS attribute> 115
in section: <SGNPLS attribute> 115
in section: <SGNUNS attribute> 116
<digit>
defined 22
in <character> 22
in <identifier> 25
in <positional identifier> 30
<dimension>
defined 100
in <DMNLST attribute> 100
DMNHIGH
in <DMNHIGH attribute> 99
in <key word> 34
in section: <DMNHIGH attribute> 99
in section: <DMNLST attribute> 100
in section: ARRAY-to-ARRAY 126
<DMNHIGH attribute>
defined 99
in <dimension> 100
in section: <ARRAY> 53, 54, 55, 56
in section: <DMNHIGH attribute> 99
in section: <DMNLST attribute> 100
in section: ARRAY-to-ARRAY 125, 126
DMNLOW
in <DMNLOW attribute> 99
in <key word> 34
in section: <ARRAY> 56
in section: <DMNLOW attribute> 99
in section: <DMNLST attribute> 100
in section: ARRAY-to-ARRAY 126
<DMNLOW attribute>
defined 99
in <ARRAY defaulted attributes list> 57
in <dimension> 100
in section: <ARRAY> 53, 54, 56
in section: <DMNLOW attribute> 99
in section: <DMNLST attribute> 100
in section: ARRAY-to-ARRAY 125, 126
DMNLST
in <DMNLST attribute> 100
in <key word> 34
in section: <subtype instance> 91
<DMNLST attribute>
defined 100
in <ARRAY attributes list> 57
in section: <ARRAY> 57
DMNMAX
in <key word> 34
<DMNMAX attribute>
defined 100
in <dimension> 100
in section: <ARRAY> 54, 55, 57
in section: <DMNLST attribute> 100
in section: ARRAY-to-ARRAY 125
DMNSIZE
in <DMNSIZE attribute> 101
in <key word> 34
in section: <DMNLST attribute> 100
in section: <DMNSIZE attribute> 101
in section: ARRAY-to-ARRAY 125, 126

<DMNSIZE attribute>
defined 101
in <dimension> 100
in section: <ARRAY> 53, 54, 56
in section: <DMNLST attribute> 100
in section: ARRAY-to-ARRAY 125, 126

E

<encoded hex literal>
in <file name> 44
in <HELP attribute> 103
in <NOTE attribute> 107
in <TITLE attribute> 117
in section: <HELP attribute> 103
in section: <NOTE attribute> 107
in section: <TITLE attribute> 117
END
in <END statement> 43
in <key word> 34
<END statement>
defined 43
in <CASE> 69
in <DECLARE statement> 41
in <PLAN statement> 45
in <SEQUENCE> 88
in section: <BEGIN statement> 38
in section: <END statement> 43
ENUMERATION
defined 79
in <DEFAULT statement> 42
in <ENUMERATION> 79
in <field> 40
in <key word> 34
in section: <ENUMERATION> 80
in section: <LENGTH attribute> 105
in section: <SGNCNV attribute> 111
in section: ASIS-to-field data types 127
in section: BINARY, PACKED, ZONED-to-ENUMERATION 127
in section: Numeric Conversions 145
<ENUMERATION attributes list>
defined 79
in <ENUMERATION> 79
in <subtype instance attributes list> 90
<ENUMERATION defaulted attributes list>
defined 80
in <DEFAULT statement> 42
in <ENUMERATION attributes list> 79
in section: <ENUMERATION> 80
<enumeration identifier>
defined 80
in <enumeration value> 80
in section: <ENUMERATION> 80
in section: BINARY, PACKED, ZONED-to-ENUMERATION 127
in section: ENUMERATION-to-ENUMERATION 134
<enumeration list>
defined 80
<enumeration list> *(continued)*
in <ENUMERATION> 79
<ENUMERATION optional attributes list>
defined 80
in <ENUMERATION attributes list> 79
<enumeration value>
defined 80
in <enumeration list> 80
in section: <ENUMERATION> 80
ESCAPE
in <key word> 34
in <LIKE predicate> 26
<escape character>
defined 26
in <LIKE predicate> 26
in section: <LIKE predicate> 27
EXACT
in <key word> 34

F

FALSE
in <key word> 34
in <PACKED SIGNED attributes list> 87
in <ZONED SIGNED attributes list> 92
in section: <ARRAY> 54, 55, 56, 57
in section: <ASIS> 59
in section: <BINARY> 60, 61, 62
in section: <BIT> 66
in section: <BITPRE> 68
in section: <CASE> 70
in section: <CCSID attribute> 97
in section: <CHAR> 75
in section: <CHARPRE> 77
in section: <comparison predicate> 23
in section: <condition> 24
in section: <CONSTRAINED attribute> 98
in section: <DMNHIGH attribute> 99
in section: <DMNLOW attribute> 100
in section: <DMNSIZE attribute> 101
in section: <ENUMERATION> 80
in section: <HIGH attribute> 103
in section: <LENGTH attribute> 105
in section: <LOW attribute> 105
in section: <MAXALC attribute> 106
in section: <MAXLEN attribute> 107
in section: <PACKED> 86, 87
in section: <predicate> 31
in section: <SIGNED attribute> 116
in section: <ZONED> 91, 92
in section: ADL Condition Summary 157, 158
in section: ASIS-to-field data types 127
in section: BIT-to-BIT 128
in section: BIT-to-BITPRE 129
in section: BITPRE-to-BITPRE 130
in section: BOOLEAN-to-BOOLEAN 130
in section: CASE-to-CASE 130
in section: CHARxxx-to-CHARxxx 131, 132, 133
in section: Numeric Conversions 138, 139, 144, 145, 147

FB32
in <FORM attribute> 102
in <key word> 34
in section: <FLOAT> 83, 85
in section: <FORM attribute> 102
in section: Numeric Conversions 135
FB64
in <FORM attribute> 102
in <key word> 34
in section: <FLOAT> 84, 85
in section: <FORM attribute> 102
in section: Numeric Conversions 135
FB80
in <FORM attribute> 102
in <key word> 34
in section: <FLOAT> 84, 85
in section: <FORM attribute> 102
in section: Numeric Conversions 135
FH128
in <FORM attribute> 102
in <key word> 34
in section: <FLOAT> 82, 85
in section: <FORM attribute> 102
in section: Numeric Conversions 135
FH32
in <FORM attribute> 102
in <key word> 34
in section: <FLOAT> 82, 85
in section: <FORM attribute> 102
in section: Numeric Conversions 135
FH64
in <FORM attribute> 102
in <key word> 34
in section: <FLOAT> 82, 85
in section: <FORM attribute> 102
in section: Numeric Conversions 135
FI128
in <FORM attribute> 102
in <key word> 34
in section: <FLOAT> 84, 85
in section: <FORM attribute> 102
in section: Numeric Conversions 135
<field>
defined 40
in <ARRAY> 56
in <data> 39
in <SUBTYPE statement> 49
in section: <LIKE predicate> 27
in section: <value expression> 35
in section: ARRAY-to-ARRAY 125
<file name>
defined 44
in <INCLUDE statement> 44
in section: <INCLUDE statement> 44
FIT
in <FIT attribute> 101
in <key word> 34
in section: <FIT attribute> 102
FIT *(continued)*
in section: ADL Condition Summary 158, 159
in section: Numeric Conversions 138, 139, 144, 146, 147, 148
<FIT attribute>
defined 101
in <BINARY defaulted attributes list> 62
in <FLOAT defaulted attributes list> 84
in <PACKED defaulted attributes list> 87
in <ZONED defaulted attributes list> 92
FLOAT
defined 84
in <DEFAULT statement> 42
in <field> 40
in <FLOAT> 84
in <key word> 34
in section: <FLOAT> 81, 85
in section: <LENGTH attribute> 105
in section: <PRECISION attribute> 108
in section: <RADIX attribute> 109
in section: <SCALE attribute> 110
in section: ASIS-to-field data types 127
in section: Numeric Conversions 135, 136, 137, 139, 140, 141, 142, 143, 145, 147, 148, 149, 150, 151, 152, 153
<FLOAT attributes list>
defined 84
in <FLOAT> 84
in <subtype instance attributes list> 90
<FLOAT defaulted attributes list>
defined 84
in <DEFAULT statement> 42
in <FLOAT attributes list> 84
in section: <FLOAT> 85
<FLOAT optional attributes list>
defined 85
in <FLOAT attributes list> 84
FORM
in <FORM attribute> 102
in <key word> 34
in section: <FLOAT> 82, 83, 84
in section: <FORM attribute> 102
in section: Numeric Conversions 135
<FORM attribute>
defined 102
in <FLOAT defaulted attributes list> 84
in section: <FLOAT> 81
FRSBYT
in <key word> 34
in <SGNLOC attribute> 113
in <ZONED SGNLOC attributes list> 92
in section: <DEFAULT statement> 43
in section: <SGNLOC attribute> 114
in section: <ZONED> 92

H

HELP
in <HELP attribute> 103
in <key word> 34
in section: <HELP attribute> 103
<HELP attribute>
defined 103
in <ARRAY optional attributes list> 57
in <ASIS optional attributes list> 59
in <BINARY optional attributes list> 62
in <BIT optional attributes list> 66
in <BITPRE optional attributes list> 68
in <BOOLEAN optional attributes list> 69
in <CASE optional attributes list> 69
in <CHAR optional attributes list> 74
in <CHARPRE optional attributes list> 77
in <CHARSFX optional attributes list> 79
in <DECLARE attributes list> 41
in <ENUMERATION optional attributes list> 80
in <FLOAT optional attributes list> 85
in <PACKED optional attributes list> 87
in <SEQUENCE optional attributes list> 88
in <ZONED optional attributes list> 92
<hex digit>
in section: <SGNMNS attribute> 115
in section: <SGNPLS attribute> 115
in section: <SGNUNS attribute> 116
<hex literal>
in <SGNMNS attribute> 115
in <SGNPLS attribute> 115
in <SGNUNS attribute> 116
in <ZONENC attribute> 118
in section: <SGNMNS attribute> 115
in section: <SGNPLS attribute> 115
in section: <SGNUNS attribute> 116
in section: <ZONENC attribute> 118
HIGH
in <CHAR HIGHLOW1 attributes list> 74
in <CHAR HIGHLOW2 attributes list> 74
in <CHAR HIGHLOW3 attributes list> 74
in <CHAR HIGHLOW4 attributes list> 74
in <HIGH attribute> 103
in <key word> 34
in section: <CHAR> 73, 75
in section: <HIGH attribute> 103
in section: ARRAY-to-ARRAY 125, 126
in section: CHARxxx-to-CHARxxx 132
<HIGH attribute>
defined 103
in section: <CHAR> 73, 75
in section: <SUBSTR function> 121
in section: ASIS-to-field data types 127
in section: CHARxxx-to-CHARxxx 131, 132

I

<identifier>
defined 25
<identifier> *(continued)*
in <assignment statement> 37
in <BEGIN statement> 37
in <CALL statement> 38
in <constant identifier> 39
in <DECLARE statement> 41
in <DEFAULT statement> 42
in <END statement> 43
in <enumeration identifier> 80
in <INCLUDE statement> 44
in <OTHERWISE statement> 45
in <PLAN statement> 45
in <qualifier> 31
in <REJECT statement> 46
in <SKIP statement> 47
in <subtype identifier> 49
in <WHEN statement> 50
in section: <assignment statement> 37
in section: <BEGIN statement> 38
in section: <CALL statement> 38
in section: <CCSID attribute> 97
in section: <CONSTANT statement> 39
in section: <DEFAULT statement> 42
in section: <DMNLOW attribute> 99
in section: <DMNSIZE attribute> 101
in section: <END statement> 43
in section: <HIGH attribute> 103
in section: <identifier> 25
in section: <INCLUDE statement> 44
in section: <LENGTH attribute> 105
in section: <LOW attribute> 105
in section: <OTHERWISE statement> 45
in section: <qualified identifier> 31, 32
in section: <REJECT statement> 47
in section: <SKIP statement> 48
in section: <subtype instance> 90
in section: <SUBTYPE statement> 49
in section: CASE-to-CASE 130
<identifier character>
defined 25
in <identifier> 25
in section: <identifier> 25
IN
in <IN predicate> 26
in <key word> 34
in section: <IN predicate> 26
<IN predicate>
defined 26
in <predicate> 31
<in value list>
defined 26
in <IN predicate> 26
in section: <IN predicate> 26
INCLUDE
in <INCLUDE statement> 44
in <key word> 34
<INCLUDE statement>
defined 44

<INCLUDE statement> *(continued)*
in section: <INCLUDE statement> 44
INPUT
in <INPUT parameter> 45
in <key word> 34
in section: <PLAN statement> 46
<INPUT parameter>
defined 45
in <parameter> 45
in section: <assignment statement> 37
in section: <PLAN statement> 46

J

JUSTIFY
in <JUSTIFY attribute> 104
in <key word> 34
in section: <JUSTIFY attribute> 104
in section: CHARxxx-to-CHARxxx 131
<JUSTIFY attribute>
defined 104
in <CHAR defaulted attributes list> 73

K

<key word>
defined 34
in <nondelimiter token> 33
in <quoted key word> 34
in section: <identifier> 25
in section: <token> 34

L

LEFT
in <JUSTIFY attribute> 104
in <key word> 34
in section: <JUSTIFY attribute> 104
in section: CHARxxx-to-CHARxxx 131
LENGTH
in <ASIS defaulted attributes list> 58
in <BINARY optional attributes list> 62
in <BIT defaulted attributes list> 66
in <BOOLEAN defaulted attributes list> 69
in <CHAR LENGTH asterisk attributes list> 74
in <CHAR length attributes list> 73
in <CHAR length fixed attributes list> 74
in <CHAR LENGTH identifier attributes list> 74
in <ENUMERATION defaulted attributes list> 80
in <key word> 34
in <LENGTH attribute> 104
in <LENGTH function> 121
in section: <ASIS> 58, 59
in section: <BINARY> 60, 61, 62
in section: <BIT> 65, 66
in section: <CHAR> 73, 75
in section: <ENUMERATION> 80
in section: <FLOAT> 82, 83
in section: <LENGTH attribute> 105

LENGTH *(continued)*
in section: ASIS-to-field data types 127
in section: BIT-to-BIT 128
in section: BIT-to-BITPRE 129
in section: CHARxxx-to-CHARxxx 131
in section: Constructor-to-ASIS 133
in section: Numeric Conversions 139, 147
<LENGTH attribute>
defined 104
in <CASE optional attributes list> 69
in <INPUT parameter> 45
in section: <BINARY> 60, 61, 62
in section: <CASE> 70
in section: <CHAR> 73, 75
in section: <LENGTH attribute> 105
in section: <MAXLEN attribute> 106
in section: <PLAN statement> 46
in section: ASIS-to-field data types 127
in section: BIT-to-BIT 128
in section: BIT-to-BITPRE 129
in section: CHARxxx-to-CHARxxx 131, 132
in section: ENUMERATION-to-BINARY, PACKED, ZONED 133
<LENGTH function>
defined 121
in <value specification> 35
in section: <LENGTH function> 121
<letter>
defined 22
in <character> 22
in <identifier> 25
in section: <identifier> 25
LIKE
in <key word> 34
in <LIKE predicate> 26
in section: <LIKE predicate> 27, 28
<LIKE predicate>
defined 26
in <predicate> 31
<literal>
in <CONSTANT statement> 39
in <value specification> 35
in section: <CONSTANT statement> 39
in section: <DEFAULT statement> 42
LOGICAL
in <key word> 34
in <SGNCNV attribute> 111
in section: <SGNCNV attribute> 111, 112
LOW
in <CHAR HIGHLOW1 attributes list> 74
in <CHAR HIGHLOW2 attributes list> 74
in <CHAR HIGHLOW3 attributes list> 74
in <CHAR HIGHLOW4 attributes list> 74
in <key word> 34
in <LOW attribute> 105
in section: <CHAR> 73, 75
in section: <LOW attribute> 105
in section: ARRAY-to-ARRAY 125, 126

LOW *(continued)*
in section: CHARxxx-to-CHARxxx 132
<LOW attribute>
defined 105
in section: <CHAR> 73, 75
in section: <SUBSTR function> 121
in section: ASIS-to-field data types 127
in section: CHARxxx-to-CHARxxx 131, 132
<lower case letter>
defined 22
in <letter> 22
LSTBIT
in <BLNENC attribute> 95
in <key word> 34
in section: <BLNENC attribute> 95
LSTBYT
in <key word> 34
in <SGNLOC attribute> 113
in <ZONED SGNLOC attributes list> 92
in section: <DEFAULT statement> 43
in section: <SGNLOC attribute> 114
in section: <ZONED> 92

M

<max ASIS>
defined 59
in <ASIS defaulted attributes list> 58
in section: <ASIS> 59
<max CHAR>
defined 75
in <CHAR HIGHLOW1 attributes list> 74
in <CHAR HIGHLOW2 attributes list> 74
in <CHAR HIGHLOW3 attributes list> 74
in <CHAR HIGHLOW4 attributes list> 74
in <CHAR LENGTH asterisk attributes list> 74
in <CHAR length fixed attributes list> 74
in <CHAR LENGTH identifier attributes list> 74
in section: <CHAR> 75
<max CHARPRE>
defined 77
in <CHARPRE defaulted attributes list> 77
<max CHARSFX>
defined 79
in <CHARSFX defaulted attributes list> 78
<max15>
defined 21
in section: <HELP attribute> 103
in section: <NOTE attribute> 107
<max31>
defined 21
in section: <DMNHIGH attribute> 99
in section: <DMNLOW attribute> 99
in section: <DMNLST attribute> 100
in section: <DMNMAX attribute> 101
in section: <DMNSIZE attribute> 101
in section: <HIGH attribute> 103
in section: <LENGTH function> 121
in section: <LOW attribute> 105
<max31> *(continued)*
in section: <positional identifier> 30
<max34>
defined 21
in <BIT defaulted attributes list> 66
in section: <ASIS> 59
in section: <BIT> 66
in section: <CHAR> 75
in section: <CHARSFX> 79
in section: <LENGTH function> 121
in section: <SKIP attribute> 117
<max7>
defined 21
in section: <SCALE attribute> 110
<max8>
defined 21
in section: <identifier> 25
in section: <TITLE attribute> 117
MAXALC
in <key word> 34
<MAXALC attribute>
defined 106
in <ARRAY defaulted attributes list> 57
in <ASIS defaulted attributes list> 58
in <BIT defaulted attributes list> 66
in <BITPRE defaulted attributes list> 68
in <CASE defaulted attributes list> 69
in <CHAR HIGHLOW2 attributes list> 74
in <CHAR HIGHLOW3 attributes list> 74
in <CHAR HIGHLOW4 attributes list> 74
in <CHAR LENGTH identifier attributes list> 74
in <CHARPRE defaulted attributes list> 77
in <CHARSFX defaulted attributes list> 78
in section: BIT-to-BIT 128
in section: CHARxxx-to-CHARxxx 131, 132
MAXLEN
in <key word> 34
<MAXLEN attribute>
defined 106
in <BITPRE defaulted attributes list> 68
in <OUTPUT parameter> 46
in section: <CHARPRE> 77
in section: <CHARSFX> 79
in section: <MAXLEN attribute> 106
in section: <PLAN statement> 46
<min31>
defined 21
in section: <DMNHIGH attribute> 99
in section: <DMNLOW attribute> 99
<min7>
defined 21
in section: <SCALE attribute> 110
<module>
defined 30
in section: <INCLUDE statement> 44
in section: <module> 30

N

<new line>
defined 33
in <separator> 33
in section: <token> 34
<noncharacter literal>
in <nondelimiter token> 33
<nondelimiter token>
defined 33
in <token> 33
in section: <token> 34
NOT
in <BETWEEN predicate> 21
in <boolean factor> 24
in <IN predicate> 26
in <key word> 34
in <LIKE predicate> 26
in section: <BETWEEN predicate> 21, 22
in section: <condition> 24, 25
in section: <IN predicate> 26
in section: <LIKE predicate> 27, 28
in section: <SIGNED attribute> 116
NOTE
in <key word> 34
in <NOTE attribute> 107
in section: <NOTE attribute> 107
<NOTE attribute>
defined 107
in <ARRAY optional attributes list> 57
in <ASIS optional attributes list> 59
in <BINARY optional attributes list> 62
in <BIT optional attributes list> 66
in <BITPRE optional attributes list> 68
in <BOOLEAN optional attributes list> 69
in <CASE optional attributes list> 69
in <CHAR optional attributes list> 74
in <CHARPRE optional attributes list> 77
in <CHARSFX optional attributes list> 79
in <DECLARE attributes list> 41
in <ENUMERATION optional attributes list> 80
in <FLOAT optional attributes list> 85
in <PACKED optional attributes list> 87
in <SEQUENCE optional attributes list> 88
in <ZONED optional attributes list> 92
in section: <NOTE attribute> 107

O

OF
in <ARRAY> 56
in <key word> 34
in <SUBTYPE statement> 49
in section: <qualified identifier> 32
OR
in <condition> 24
in <key word> 34
in section: <condition> 24, 25
OTHERWISE
in <key word> 34
in <OTHERWISE clause> 45
in section: <CASE> 70
in section: <OTHERWISE statement> 45
<OTHERWISE clause>
defined 45
in <OTHERWISE statement> 45
in section: <OTHERWISE statement> 45
<OTHERWISE statement>
defined 45
in <CASE> 69
in section: <CASE> 70
in section: <OTHERWISE statement> 45
in section: <REJECT statement> 46, 47
in section: ADL Condition Summary 158
in section: CASE-to-CASE 130
OUTPUT
in <key word> 34
in <OUTPUT parameter> 46
in section: <PLAN statement> 46
<OUTPUT parameter>
defined 46
in <parameter> 45
in section: <PLAN statement> 46

P

PACKED
defined 86
in <DEFAULT statement> 42
in <field> 40
in <key word> 34
in <PACKED> 86
in section: <ASIS> 59
in section: <BIT> 66
in section: <CCSID attribute> 97
in section: <CHAR> 75
in section: <DMNHIGH attribute> 99
in section: <DMNLOW attribute> 100
in section: <DMNSIZE attribute> 101
in section: <HIGH attribute> 103
in section: <LENGTH attribute> 105
in section: <LOW attribute> 105
in section: <MAXLEN attribute> 107
in section: <PACKED> 86, 87
in section: <PRECISION attribute> 108, 109
in section: <SCALE attribute> 110
in section: <SGNLOC attribute> 113
in section: <SGNMNS attribute> 115
in section: <SGNPLS attribute> 115
in section: <SGNUNS attribute> 116
in section: <SIGNED attribute> 116
in section: ASIS-to-field data types 127
in section: BINARY, PACKED, ZONED-to-ENUMERATION 127
in section: ENUMERATION-to-BINARY, PACKED, ZONED 133
in section: Numeric Conversions 135, 138, 139, 145, 146, 149, 150, 151, 152, 153

<PACKED attributes list>
defined 86
in <PACKED> 86
in <subtype instance attributes list> 90
<PACKED defaulted attributes list>
defined 87
in <DEFAULT statement> 42
in <PACKED attributes list> 86
in section: <PACKED> 87
<PACKED optional attributes list>
defined 87
in <PACKED attributes list> 86
<PACKED SGNLOC attributes list>
defined 87
in <PACKED SIGNED attributes list> 87
<PACKED SIGNED attributes list>
defined 87
in <PACKED defaulted attributes list> 87
< parameter >
defined 45
in <parameter list> 45
in section: <module> 30
in section: <PLAN statement> 46
< parameter list >
defined 45
in <PLAN statement> 45
in section: <PLAN statement> 46
<pattern>
defined 26
in <LIKE predicate> 26
in section: <LIKE predicate> 27
PLAN
in <key word> 34
in <PLAN statement> 45
in section: <assignment statement> 37
in section: <CCSID attribute> 96
in section: <LENGTH attribute> 105
in section: <MAXLEN attribute> 107
in section: <module> 30
in section: <PLAN statement> 46
<PLAN statement>
defined 45
in <module> 30
in section: <module> 30
in section: <PLAN statement> 46
in section: <positional identifier> 30
in section: Program Calling Conventions 155
<positional identifier>
defined 30
in <qualifier> 31
in section: <data declaration statement> 40
in section: <positional identifier> 30, 31
in section: CASE-to-CASE 130
<positive integer>
in <CCSID attribute> 96
in <DMNMAX attribute> 100
in <HIGH attribute> 103
in <LENGTH attribute> 104
<positive integer> *(continued)*
in <LOW attribute> 105
in <MAXLEN attribute> 106
in <PRECISION attribute> 108
in <SKIP attribute> 117
in <SKIP statement> 47
in <SUBSTR length> 121
in <SUBSTR position> 121
in section: <SKIP statement> 48
in section: <SUBSTR function> 122
PREBYTRVS
in <key word> 34
in <PREBYTRVS attribute> 107
in section: <PREBYTRVS attribute> 108
in section: BIT-to-BITPRE 129
in section: BITPRE-to-BIT 129
in section: BITPRE-to-BITPRE 129, 130
<PREBYTRVS attribute>
defined 107
in <BITPRE defaulted attributes list> 68
in <CHARPRE defaulted attributes list> 77
in section: CHARxxx-to-CHARxxx 132
PRECISION
in <key word> 34
in <PACKED defaulted attributes list> 87
in <PRECISION attribute> 108
in <ZONED defaulted attributes list> 92
in section: <BINARY> 60, 61, 62, 63
in section: <DEFAULT statement> 43
in section: <ENUMERATION> 80
in section: <FLOAT> 83, 84, 85
in section: <PACKED> 86, 87
in section: <PRECISION attribute> 108
in section: <ZONED> 92
in section: ADL Condition Summary 158
in section: ASIS-to-field data types 127
in section: Numeric Conversions 137, 138, 139, 143, 145, 146, 147
<PRECISION attribute>
defined 108
in <BINARY defaulted attributes list> 62
in <FLOAT optional attributes list> 85
in section: <BINARY> 60, 61
in section: <CONSTRAINED attribute> 98
in section: <FLOAT> 84
in section: <PACKED> 86
in section: <PRECISION attribute> 108
in section: <RADIX attribute> 109
in section: <ZONED> 91
<predicate>
defined 31
in <boolean primary> 24
in section: <condition> 24, 25
PRELEN
in <key word> 34
in <PRELEN attribute> 109
in section: <BITPRE> 68
in section: <CHARPRE> 77

PRELEN *(continued)*
in section: <PRELEN attribute> 109
in section: ASIS-to-field data types 127
in section: BIT-to-BITPRE 129
in section: BITPRE-to-BIT 129
in section: BITPRE-to-BITPRE 129, 130
<PRELEN attribute>
defined 109
in <BITPRE defaulted attributes list> 68
in <CHARPRE defaulted attributes list> 77
in section: CHARxxx-to-CHARxxx 132
<program name>
defined 38
in <CALL statement> 38

Q

<qualified identifier>
defined 31
in <ASIS defaulted attributes list> 58
in <assignment statement> 37
in <BIT defaulted attributes list> 66
in <boolean primary> 24
in <CCSID attribute> 96
in <CHAR HIGHLOW2 attributes list> 74
in <CHAR HIGHLOW3 attributes list> 74
in <CHAR HIGHLOW4 attributes list> 74
in <CHAR LENGTH identifier attributes list> 74
in <data declaration statement> 39
in <DMNHIGH attribute> 99
in <DMNLOW attribute> 99
in <DMNSIZE attribute> 101
in <HIGH attribute> 103
in <INPUT parameter> 45
in <LENGTH attribute> 104
in <LENGTH function> 121
in <LOW attribute> 105
in <MAXLEN attribute> 106
in <nondelimiter token> 33
in <OUTPUT parameter> 46
in <SUBSTR length> 121
in <SUBSTR position> 121
in <SUBSTR reference> 121
in <value specification> 35
in section: <ARRAY> 57
in section: <ASIS> 59
in section: <assignment statement> 37
in section: <BIT> 66
in section: <CCSID attribute> 97
in section: <CHAR> 75
in section: <condition> 24
in section: <data declaration statement> 40
in section: <DMNHIGH attribute> 99
in section: <DMNLOW attribute> 99
in section: <DMNLST attribute> 100
in section: <DMNSIZE attribute> 101
in section: <HIGH attribute> 103
in section: <LENGTH attribute> 105
in section: <LOW attribute> 105
<qualified identifier> *(continued)*
in section: <MAXLEN attribute> 107
in section: <PLAN statement> 46
in section: <qualified identifier> 31, 32
in section: <SUBSTR function> 121, 122
in section: <value expression> 35
<qualifier>
defined 31
in <qualifier list> 31
in section: <qualified identifier> 31, 32
<qualifier list>
defined 31
in <qualified identifier> 31
<quoted key word>
defined 34
in <nondelimiter token> 33
in section: <token> 34

R

RADIX
in <key word> 34
<RADIX attribute>
defined 109
in <BINARY defaulted attributes list> 62
in <FLOAT defaulted attributes list> 84
in section: <CONSTRAINED attribute> 98
in section: <RADIX attribute> 109
in section: <SCALE attribute> 110
REJECT
in <key word> 34
in <REJECT statement> 46
<REJECT statement>
defined 46
in <OTHERWISE clause> 45
in <THEN clause> 50
in section: <OTHERWISE statement> 45
in section: <WHEN statement> 50
RIGHT
in <JUSTIFY attribute> 104
in <key word> 34
in section: <JUSTIFY attribute> 104
in section: CHARxxx-to-CHARxxx 131
ROUND
in <FIT attribute> 101
in <key word> 34
in section: <FIT attribute> 102
in section: Numeric Conversions 139, 144, 146, 147, 148

S

SCALE
in <key word> 34
in <PACKED defaulted attributes list> 87
in <SCALE attribute> 110
in <ZONED defaulted attributes list> 92
in section: <ASIS> 59
in section: <BINARY> 60, 61, 62

SCALE *(continued)*
in section: <BIT> 66
in section: <CCSID attribute> 97
in section: <CHAR> 75
in section: <DMNHIGH attribute> 99
in section: <DMNLOW attribute> 100
in section: <DMNSIZE attribute> 101
in section: <ENUMERATION> 80
in section: <HIGH attribute> 103
in section: <LENGTH attribute> 105
in section: <LOW attribute> 105
in section: <MAXLEN attribute> 107
in section: <SCALE attribute> 110
in section: BINARY, PACKED, ZONED-to-ENUMERATION 127
in section: ENUMERATION-to-BINARY, PACKED, ZONED 133
<SCALE attribute>
defined 110
in <BINARY defaulted attributes list> 62
in section: <CONSTRAINED attribute> 98
in section: <PACKED> 86
in section: <RADIX attribute> 109
in section: <SCALE attribute> 110
in section: <ZONED> 91
<separator>
defined 33
in section: <token> 34
SEQUENCE
defined 88
in <ARRAY> 56
in <constructor> 40
in <key word> 34
in <SEQUENCE> 88
in section: <data declaration statement> 40
in section: <positional identifier> 30
in section: <SEQUENCE> 88, 89
in section: <SUBTYPE statement> 49
in section: ADL Condition Summary 159
<SEQUENCE attributes list>
defined 88
in <SEQUENCE> 88
in <subtype instance attributes list> 90
<SEQUENCE optional attributes list>
defined 88
in <SEQUENCE attributes list> 88
SFXENC
in <key word> 34
<SFXENC attribute>
defined 110
in <CHARSFX defaulted attributes list> 78
in section: CHARxxx-to-CHARxxx 133
<SGNCNV attribute>
defined 111
in <BINARY defaulted attributes list> 62
in <ENUMERATION defaulted attributes list> 80
in section: <SGNCNV attribute> 111
SGNLOC
in <key word> 34
in <PACKED SGNLOC attributes list> 87
in <PACKED SIGNED attributes list> 87
in <SGNLOC attribute> 113
in <ZONED SGNLOC attributes list> 92
in <ZONED SIGNED attributes list> 92
in section: <DEFAULT statement> 43
in section: <PACKED> 87
in section: <SGNLOC attribute> 114
in section: <SGNMNS attribute> 115
in section: <SGNPLS attribute> 115
in section: <SGNUNS attribute> 116
in section: <ZONED> 92
<SGNLOC attribute>
defined 113
in section: <PACKED> 86
in section: <ZONED> 91
SGNMNS
in <key word> 34
in <SGNMNS attribute> 115
in section: <DEFAULT statement> 43
in section: <SGNMNS attribute> 115
in section: Numeric Conversions 145
<SGNMNS attribute>
defined 115
in <PACKED SGNLOC attributes list> 87
in <ZONED SGNLOC attributes list> 92
in section: <PACKED> 86
in section: <SGNMNS attribute> 115
in section: <SGNPLS attribute> 115
in section: <SGNUNS attribute> 116
in section: <ZONED> 91
SGNPLS
in <key word> 34
in <SGNPLS attribute> 115
in section: <DEFAULT statement> 43
in section: <SGNPLS attribute> 115
in section: Numeric Conversions 145
<SGNPLS attribute>
defined 115
in <PACKED SGNLOC attributes list> 87
in <ZONED SGNLOC attributes list> 92
in section: <PACKED> 86
in section: <SGNMNS attribute> 115
in section: <SGNPLS attribute> 115
in section: <SGNUNS attribute> 116
in section: <ZONED> 91
SGNUNS
in <key word> 34
in <SGNUNS attribute> 116
in section: Numeric Conversions 145
<SGNUNS attribute>
defined 116
in <PACKED SGNLOC attributes list> 87
in section: <PACKED> 86
in section: <SGNMNS attribute> 115
in section: <SGNPLS attribute> 115

<SGNUNS attribute> *(continued)*
in section: <SGNUNS attribute> 116
SIGNED
in <key word> 34
in <PACKED defaulted attributes list> 87
in <PACKED SIGNED attributes list> 87
in <SIGNED attribute> 116
in <ZONED defaulted attributes list> 92
in <ZONED SIGNED attributes list> 92
in section: <BINARY> 60, 62
in section: <ENUMERATION> 80
in section: <PACKED> 86, 87
in section: <SIGNED attribute> 116
in section: <ZONED> 91, 92
in section: Numeric Conversions 138, 139, 145, 147
<SIGNED attribute>
defined 116
in <BINARY defaulted attributes list> 62
in <ENUMERATION defaulted attributes list> 80
<signed integer>
in <DMNHIGH attribute> 99
in <DMNLOW attribute> 99
in <DMNSIZE attribute> 101
in <enumeration value> 80
in <SCALE attribute> 110
in section: <ENUMERATION> 80
SKIP
in <key word> 34
in <SKIP attribute> 117
in <SKIP statement> 47
in section: <SKIP attribute> 117
<SKIP attribute>
defined 117
in <ARRAY defaulted attributes list> 57
in section: <ARRAY> 57
in section: <SKIP attribute> 117
<SKIP statement>
defined 47
in <OTHERWISE clause> 45
in <SEQUENCE> 88
in <THEN clause> 50
in section: <CASE> 70
in section: <MAXALC attribute> 106
in section: <OTHERWISE statement> 45
in section: <SEQUENCE> 89
in section: <WHEN statement> 51
<source character>
defined 22
in <comment> 33
in section: <character> 22
in section: <INCLUDE statement> 44
<space>
defined 33
in <character> 22
in <separator> 33
in section: <token> 34
<special character>
defined 22
in <character> 22
<special symbol>
defined 33
in <delimiter token> 33
<subscript list>
defined 31
in <qualified identifier> 31
in section: <qualified identifier> 31
SUBSTR
in <key word> 34
in <SUBSTR function> 121
in section: <CHAR> 73
in section: <ZONED> 91
<SUBSTR function>
defined 121
in <value specification> 35
in section: <SUBSTR function> 122
<SUBSTR length>
defined 121
in <SUBSTR function> 121
in section: <SUBSTR function> 121, 122
<SUBSTR position>
defined 121
in <SUBSTR function> 121
in section: <SUBSTR function> 121, 122
<SUBSTR reference>
defined 121
in <SUBSTR function> 121
in section: <SUBSTR function> 121
SUBTYPE
in <key word> 34
in <SUBTYPE statement> 49
in section: <DEFAULT statement> 42
<SUBTYPE defaulted attributes list>
in section: <DEFAULT statement> 42
<subtype identifier>
defined 49
in <subtype instance> 89
in <SUBTYPE statement> 49
in section: <subtype instance> 90
in section: <token> 34
<subtype instance>
defined 89
in <ARRAY> 56
in <data> 39
in <SUBTYPE statement> 49
in section: <ARRAY> 57
in section: <subtype instance> 90
in section: <SUBTYPE statement> 49
<subtype instance attributes list>
defined 90
in <subtype instance> 89
<SUBTYPE statement>
defined 49
in <DECLARE statement> 41
in section: <subtype instance> 90

T

<tab>
defined 33
in <separator> 33
in section: <token> 34
<terminator>
defined 34
in <ARRAY> 56
in <assignment statement> 37
in <BEGIN statement> 37
in <CALL statement> 38
in <CONSTANT statement> 39
in <data> 39
in <DEFAULT statement> 42
in <END statement> 43
in <INCLUDE statement> 44
in <OTHERWISE clause> 45
in <REJECT statement> 46
in <SKIP statement> 47
in <SUBTYPE statement> 49
in <THEN clause> 50
in section: <CASE> 70
in section: <ENUMERATION> 79
in section: <OTHERWISE statement> 45
in section: <WHEN statement> 51
THEN
in <key word> 34
in <THEN clause> 50
in section: <CASE> 70
in section: <WHEN statement> 51
<THEN clause>
defined 50
in <WHEN statement> 50
in section: <CASE> 70
in section: <WHEN statement> 50, 51
TITLE
in <key word> 34
in <TITLE attribute> 117
in section: <TITLE attribute> 117
<TITLE attribute>
defined 117
in <ARRAY optional attributes list> 57
in <ASIS optional attributes list> 59
in <BINARY optional attributes list> 62
in <BIT optional attributes list> 66
in <BITPRE optional attributes list> 68
in <BOOLEAN optional attributes list> 69
in <CASE optional attributes list> 69
in <CHAR optional attributes list> 74
in <CHARPRE optional attributes list> 77
in <CHARSFX optional attributes list> 79
in <DECLARE attributes list> 41
in <ENUMERATION optional attributes list> 80
in <FLOAT optional attributes list> 85
in <PACKED optional attributes list> 87
in <SEQUENCE optional attributes list> 88
in <ZONED optional attributes list> 92
<token>
defined 33
in section: <token> 34
TRUE
in <key word> 34
in <PACKED SIGNED attributes list> 87
in <ZONED SIGNED attributes list> 92
in section: <ARRAY> 54, 55, 56, 57
in section: <assignment statement> 37
in section: <BINARY> 60, 61, 62, 63
in section: <BITPRE> 68
in section: <BOOLEAN> 69
in section: <BYTRVS attribute> 96
in section: <CASE> 70
in section: <CHARPRE> 77
in section: <comparison predicate> 23
in section: <condition> 24
in section: <CONSTRAINED attribute> 98
in section: <ENUMERATION> 80
in section: <MAXALC attribute> 106
in section: <OTHERWISE statement> 44, 45
in section: <PACKED> 86
in section: <predicate> 31
in section: <SIGNED attribute> 116
in section: <when clause> 35
in section: <WHEN statement> 51
in section: <ZONED> 91
in section: ADL Condition Summary 157, 158
in section: ASIS-to-field data types 127
in section: BIT-to-BIT 128
in section: BIT-to-BITPRE 129
in section: BITPRE-to-BITPRE 129
in section: BOOLEAN-to-BOOLEAN 130
in section: CASE-to-CASE 130
in section: CHARxxx-to-CHARxxx 131, 132, 133
in section: Numeric Conversions 138, 139, 144, 145, 146, 147
TRUNCATE
in <FIT attribute> 101
in <key word> 34
in section: <FIT attribute> 102
in section: Numeric Conversions 139, 144

U

<underscore>
defined 22
in <character> 22
in <identifier character> 25
in section: <LIKE predicate> 27
UNITLEN
in <ASIS defaulted attributes list> 58
in <CHAR HIGHLOW1 attributes list> 74
in <CHAR HIGHLOW2 attributes list> 74
in <CHAR HIGHLOW3 attributes list> 74
in <CHAR HIGHLOW4 attributes list> 74
in <CHAR LENGTH asterisk attributes list> 74
in <CHAR length fixed attributes list> 74
in <CHAR LENGTH identifier attributes list> 74

UNITLEN (*continued*)
in <CHARPRE defaulted attributes list> 77
in <CHARSFX defaulted attributes list> 78
in <key word> 34
in <UNITLEN attribute> 118
in section: <ASIS> 59
in section: <CHAR> 73, 75
in section: <CHARPRE> 77
in section: <CHARSFX> 79
in section: <LENGTH attribute> 105
in section: <MAXLEN attribute> 106
in section: <UNITLEN attribute> 118
in section: ASIS-to-field data types 127
in section: Constructor-to-ASIS 133
<UNITLEN attribute>
defined 118
in section: CHARxxx-to-CHARxxx 132
<upper case letter>
defined 22
in <letter> 22

V
<value expression>
defined 35
in <argument> 38
in <assignment statement> 37
in <BETWEEN predicate> 21
in <comparison predicate> 23
in <IN predicate> 26
in <LIKE predicate> 26
in <value expression> 35
in section: <assignment statement> 37
in section: <BETWEEN predicate> 21
in section: <comparison predicate> 23, 24
in section: <IN predicate> 26
in section: <LIKE predicate> 27
<value specification>
defined 35
in <escape character> 26
in <in value list> 26
in <pattern> 26
in <value expression> 35
in section: <IN predicate> 26
in section: <LIKE predicate> 27

W
WHEN
in <key word> 34
in <WHEN clause> 35
<WHEN clause>
defined 35
in <ARRAY> 56
in <ASIS> 58
in <BINARY> 62
in <BIT> 65
in <BITPRE> 67
in <BOOLEAN> 68
<WHEN clause> (*continued*)
in <CASE> 69
in <CHAR> 73
in <CHARPRE> 76
in <CHARSFX> 78
in <ENUMERATION> 79
in <FLOAT> 84
in <PACKED> 86
in <SEQUENCE> 88
in <subtype instance> 89
in <WHEN statement> 50
in <ZONED> 91
in section: <assignment statement> 37
in section: <CASE> 70
in section: ADL Condition Summary 157
<WHEN statement>
defined 50
in <CASE> 69
in section: <CASE> 70, 71
in section: <OTHERWISE statement> 44
in section: <qualified identifier> 32
in section: <REJECT statement> 46
in section: <WHEN statement> 51
in section: ADL Condition Summary 157, 158
in section: CASE-to-CASE 130

Z
ZONED
defined 91
in <DEFAULT statement> 42
in <field> 40
in <key word> 34
in <ZONED> 91
in section: <ASIS> 59
in section: <BIT> 66
in section: <CCSID attribute> 97
in section: <CHAR> 75
in section: <DEFAULT statement> 43
in section: <DMNHIGH attribute> 99
in section: <DMNLOW attribute> 100
in section: <DMNSIZE attribute> 101
in section: <HIGH attribute> 103
in section: <LENGTH attribute> 105
in section: <LOW attribute> 105
in section: <MAXLEN attribute> 107
in section: <PRECISION attribute> 108
in section: <SCALE attribute> 110
in section: <SGNLOC attribute> 113, 114
in section: <SGNMNS attribute> 115
in section: <SGNPLS attribute> 115
in section: <SIGNED attribute> 116
in section: <SUBSTR function> 121
in section: <ZONED> 91, 92, 93
in section: <ZONENC attribute> 118
in section: ASIS-to-field data types 127
in section: BINARY, PACKED, ZONED-to-ENUMERATION 127
in section: ENUMERATION-to-BINARY, PACKED, ZONED 133

ZONED *(continued)*
in section: Numeric Conversions 135, 138, 139, 145, 146, 149, 150, 151, 152, 153
<ZONED attributes list>
defined 92
in <subtype instance attributes list> 90
in <ZONED> 91
<ZONED defaulted attributes list>
defined 92
in <DEFAULT statement> 42
in <ZONED attributes list> 92
in section: <ZONED> 92
<ZONED optional attributes list>
defined 92
in <ZONED attributes list> 92
<ZONED SGNLOC attributes list>
defined 92
in <ZONED SIGNED attributes list> 92
<ZONED SIGNED attributes list>
defined 92
in <ZONED defaulted attributes list> 92
ZONENC
in <key word> 34
in <ZONENC attribute> 118
in section: <ZONENC attribute> 118
<ZONENC attribute>
defined 118
in <ZONED defaulted attributes list> 92
in section: <ZONED> 91
ZONFRSBYT
in <key word> 34
in <SGNLOC attribute> 113
in <ZONED SGNLOC attributes list> 92
in section: <DEFAULT statement> 43
in section: <SGNLOC attribute> 114
in section: <SGNMNS attribute> 115
in section: <SGNPLS attribute> 115
in section: <ZONED> 92
ZONLSTBYT
in <key word> 33
in <SGNLOC attribute> 113
in <ZONED SGNLOC attributes list> 92
in section: <DEFAULT statement> 43
in section: <SGNLOC attribute> 114
in section: <SGNMNS attribute> 115
in section: <SGNPLS attribute> 115
in section: <ZONED> 92

Declaration Translator Specifications for

SAA C/370 Declaration Translator Version 1.0
and
SAA C/2 Declaration Translator Version 1.0

Document Number DDM-TM-CCC-02

May 10, 1992

Kenneth M. Sissors

IBM Federal Systems Company
Bldg 120/026
9500 Godwin Drive
Manassas, VA 22110

Unclassified

Preface

The document specifies the language information and functions required to implement a Distributed Data Management (DDM) Architecture Declaration Translator for the System Application Architecture (SAA) C programming language as it is implemented on the SAA systems (MVS/ESA, VM/ESA, OS/2).

The information contained in this document has not been submitted to any formal IBM test and is described on an "As Is" basis without any warranty, either express or implied. The use of this information or the implementation of any of these techniques is a reader responsibility and depends on the reader's ability to evaluate and integrate them into the reader's operational environment. While each item may have been reviewed by IBM for accuracy in a specific situation, there is no guarantee that the same or similar results will be obtained elsewhere. Readers attempting to adapt these techniques to their own environments do so at their own risk.

VM/ESA, MVS/ESA, OS/2, SAA, and Systems Application Architecture are trademarks of the International Business Machines Corporation.

Contents

Part 1. Common Declaration Translator Specifications . . . . . . . . . . . . 1

Chapter 1. Introduction . . . . . . . . . . . . 2
1.1 Overview . . . . . . . . . . . . 2
1.2 Scope . . . . . . . . . . . . 3
1.3 Notation . . . . . . . . . . . . 5
1.4 Deviations from ADL . . . . . . . . . . . . 6
1.5 Conventions . . . . . . . . . . . . 6
1.6 Common Parse Source Text Specification . . . . . . . . . . . . 15
1.7 Common Translate Declaration Space Specification . . . . . . . . . . . . 20
1.8 Common Generate Source Text Specification . . . . . . . . . . . . 23
1.9 Translate and Generate Syntax Rules . . . . . . . . . . . . 30

Chapter 2. ADL Annotation of Programming Language Text . . . . . . . . . . . . 39
2.1 Overview of ADL Annotation . . . . . . . . . . . . 39
2.2 <ADL annotation> . . . . . . . . . . . . 39
2.3 <LIST statement> . . . . . . . . . . . . 54
2.4 <implied ARRAY> . . . . . . . . . . . . 56
2.5 <implied CASE> . . . . . . . . . . . . 67
2.6 <implied SEQUENCE> . . . . . . . . . . . . 69
2.7 <implied SUBSTR> . . . . . . . . . . . . 71
2.8 Extended List Annotation Example . . . . . . . . . . . . 72

Part 2. C Declaration Translator . . . . . . . . . . . . 75

Chapter 3. Introduction . . . . . . . . . . . . 76

Chapter 4. C Declaration Translator Restrictions . . . . . . . . . . . . 77
4.1 General Restrictions . . . . . . . . . . . . 77
4.2 Input / Output Restrictions . . . . . . . . . . . . 77

Part 3. C Declaration Translator Parse Source Text . . . . . . . . . . . . 79

Chapter 5. C Declaration Translator Language Subset . . . . . . . . . . . . 80
5.1 <character> . . . . . . . . . . . . 80
5.2 <constant> . . . . . . . . . . . . 81
5.3 <identifier> . . . . . . . . . . . . 84
5.4 <token> . . . . . . . . . . . . 85
5.5 <expression> . . . . . . . . . . . . 86
5.6 <data declaration> and <data definition> . . . . . . . . . . . . 87
5.7 Common <data declaration> and <data definition> Terms . . . . . . . . . . . . 88
5.8 <annotation> . . . . . . . . . . . . 89
5.9 <preprocessor directive> . . . . . . . . . . . . 91
5.10 <preprocessor pragma> . . . . . . . . . . . . 93
5.11 <C OPTIONS annotation> . . . . . . . . . . . . 96

Unclassified

Chapter 6. C Data Description Format and Parse Algorithms . . . . . . . . . 102
6.1 <C data description> . . . . . . . . . . . . . . . . . . . . . . . . . . 102
6.2 Data Alignment . . . . . . . . . . . . . . . . . . . . . . . . . . . . . 104
6.3 C map_to_adl_id Function . . . . . . . . . . . . . . . . . . . . . . . . 105

Chapter 7. C Declaration Translator Representation Domain Defaults . . . . 106

Chapter 8. C Declaration Translator ADL Mappings . . . . . . . . . . . . . . 109
8.1 <array data definition> . . . . . . . . . . . . . . . . . . . . . . . . . 111
8.2 <bit-field data definition> . . . . . . . . . . . . . . . . . . . . . . . 116
8.3 <boolean_t data definition> . . . . . . . . . . . . . . . . . . . . . . 120
8.4 <char data definition> . . . . . . . . . . . . . . . . . . . . . . . . . 123
8.5 <double data definition> . . . . . . . . . . . . . . . . . . . . . . . . 127
8.6 <enumeration data declaration> . . . . . . . . . . . . . . . . . . . . 131
8.7 <enumeration data definition> . . . . . . . . . . . . . . . . . . . . . 136
8.8 <enumeration typedef data declaration> . . . . . . . . . . . . . . . . 141
8.9 <float data definition> . . . . . . . . . . . . . . . . . . . . . . . . . 145
8.10 <int data definition> . . . . . . . . . . . . . . . . . . . . . . . . . . 148
8.11 <long double data definition> . . . . . . . . . . . . . . . . . . . . . 152
8.12 <pointer data definition> . . . . . . . . . . . . . . . . . . . . . . . . 155
8.13 <string data definition> . . . . . . . . . . . . . . . . . . . . . . . . 158
8.14 <struct data declaration> . . . . . . . . . . . . . . . . . . . . . . . . 168
8.15 <struct data definition> . . . . . . . . . . . . . . . . . . . . . . . . 171
8.16 <struct typedef data declaration> . . . . . . . . . . . . . . . . . . . 176
8.17 <typedef data declaration> . . . . . . . . . . . . . . . . . . . . . . 179
8.18 <typedef instance data definition> . . . . . . . . . . . . . . . . . . . 182
8.19 <union data declaration> . . . . . . . . . . . . . . . . . . . . . . . 186
8.20 <union data definition> . . . . . . . . . . . . . . . . . . . . . . . . 190
8.21 <union typedef data declaration> . . . . . . . . . . . . . . . . . . . 196
8.22 <wchar_t data definition> . . . . . . . . . . . . . . . . . . . . . . . 200
8.23 <wide string data definition> . . . . . . . . . . . . . . . . . . . . . 203

Chapter 9. C Extended Examples . . . . . . . . . . . . . . . . . . . . . . . 212
9.1 Example C Binary Record I/O with struct data description . . . . . . . . 213
9.2 Example C Binary Stream I/O with struct data description . . . . . . . . 218
9.3 Example C Binary Stream I/O with LIST data description . . . . . . . . 224

Chapter 10. Exceptions for Parse Source Text . . . . . . . . . . . . . . . . . 229

Chapter 11. C Declaration Translator BNF Summary . . . . . . . . . . . . . 240

Part 4. C Declaration Translator Translate Declaration Space . . . . . . . . . . . . . . . . 266

Chapter 12. C Translate Declaration Space Options . . . . . . . . . . . . . . 267

Chapter 13. C Declaration Translator Translate Declaration Space . . . . . . 268
13.1 Order of Declarations . . . . . . . . . . . . . . . . . . . . . . . . . . 268
13.2 Translate from CASE declaration . . . . . . . . . . . . . . . . . . . . 268
13.3 Translate from ARRAY declaration . . . . . . . . . . . . . . . . . . . 269
13.4 Translate from SUBTYPE statement . . . . . . . . . . . . . . . . . . . 269
13.5 Translate from SUBTYPE instances . . . . . . . . . . . . . . . . . . . 269

13.6 Data Alignment . . . 270
13.7 Translation of Reference Fields . . . 270
13.8 Translate from ADL <ASIS> . . . 272
13.9 Translate from ADL <BINARY> . . . 273
13.10 Translate from ADL <BIT> . . . 282
13.11 Translate from ADL <BITPRE> . . . 284
13.12 Translate from ADL <BOOLEAN> . . . 286
13.13 Translate from ADL <CHAR> . . . 287
13.14 Translate from ADL <CHARPRE> . . . 290
13.15 Translate from ADL <CHARSFX> . . . 292
13.16 Translate from Numerics Types with COMPLEX(TRUE) . . . 293
13.17 Translate from attributes for a single dimension . . . 294
13.18 Translate from ADL <ENUMERATION> . . . 296
13.19 Translate from ADL <FLOAT16> . . . 297
13.20 Translate from ADL <FLOAT2> . . . 299
13.21 Translate from ADL <PACKED> . . . 301
13.22 Translate from ADL <ZONED> . . . 302
13.23 Translate from RADIX(10) Fixed Point Numerics . . . 303

Chapter 14. Exceptions for Translate Declaration Space . . . 314

Part 5. C Declaration Translator Generate Source Text . . . 316

Chapter 15. C Generate Source Text Options . . . 317

Chapter 16. C Declaration Translator Generate Source Text . . . 318
16.1 Generated C Data Description Format . . . 318
16.2 Order of Declarations . . . 318
16.3 Generate from CASE declaration . . . 318
16.4 Generate from ARRAY declaration . . . 319
16.5 Generate from SUBTYPE statement . . . 319
16.6 Generate from SUBTYPE Instance . . . 320
16.7 ADL <CONSTANT statement> . . . 320
16.8 Data Alignment . . . 320
16.9 C Data Description Formatting . . . 321
16.10 C map_to_pl_id Function . . . 322
16.11 Generate from ADL <ASIS> . . . 323
16.12 Generate from ADL <BINARY> . . . 326
16.13 Generate from ADL <BOOLEAN> . . . 332
16.14 Generate from ADL <CHAR> . . . 333
16.15 Generate from ADL <CHARSFX> . . . 336
16.16 Generate from Attributes for a single dimension . . . 339
16.17 Generate from ADL <ENUMERATION> . . . 340
16.18 Generate from ADL <FLOAT16> . . . 341
16.19 Generate from ADL <FLOAT2> . . . 343

Chapter 17. Some C Style Suggestions for Generate Source Text . . . 345
17.1 General Guidelines . . . 345
17.2 In-line Comments . . . 346
17.3 Block Comments . . . 347
17.4 Header Descriptions . . . 347

Chapter 18. Exceptions for Generate Source Text . . . . . . . . . . . . . . . . 349

Part 6. Appendices . . . . . . . . . . . . . . . . . . . . . . . . . . . . . . . . . . . . . . . . . . . 351

Appendix A. Translate Declaration Space Test Results . . . . . . . . . . . . . 352
A.1 Test Translate ASIS for S/370 on 08/15/91 at 13:35:52 . . . . . . . . . . 353
A.2 Test Translate BINARY for OS/2 on 09/10/91 at 16:09:12 . . . . . . . . 355
A.3 Test Translate BINARY for S/370 on 09/10/91 at 15:48:56 . . . . . . . . 360
A.4 Test Translate BIT for S/370 on 08/15/91 at 15:03:12 . . . . . . . . . . . 366
A.5 Test Translate BITPRE for S/370 on 09/04/91 at 16:23:35 . . . . . . . . 368
A.6 Test Translate BOOLEAN for S/370 on 08/08/91 at 10:25:51 . . . . . . 369
A.7 Test Translate CHAR for OS/2 on 07/31/91 at 13:30:42 . . . . . . . . . 370
A.8 Test Translate CHAR for S/370 on 08/15/91 at 17:39:09 . . . . . . . . . 374
A.9 Test Translate CHARPRE for S/370 on 09/04/91 at 16:21:45 . . . . . . 378
A.10 Test Translate CHARSFX for S/370 on 08/15/91 at 17:45:27 . . . . . . 379
A.11 Test Translate COMPLEX for OS/2 on 07/31/91 at 13:32:56 . . . . . . 380
A.12 Test Translate COMPLEX for S/370 on 07/31/91 at 13:32:47 . . . . . 381
A.13 Test Translate DECIOS2 for OS/2 on 09/17/91 at 17:18:20 . . . . . . . 382
A.14 Test Translate DECI370 for S/370 on 12/15/91 at 18:32:23 . . . . . . . 386
A.15 Test Translate DMNATTR for S/370 on 08/23/91 at 09:49:52 . . . . . 390
A.16 Test Translate ENUMERAT for S/370 on 12/15/91 at 18:03:41 . . . . 392
A.17 Test Translate FLOAT16 for S/370 on 09/17/91 at 17:11:36 . . . . . . 393
A.18 Test Translate FLOAT2 for S/370 on 12/15/91 at 18:05:35 . . . . . . . 395

Appendix B. Generate Source Text Test Results . . . . . . . . . . . . . . . . . 397
B.1 Test Generate ASIS for S/370 on 08/26/91 at 17:32:48 . . . . . . . . . . 398
B.2 Test Generate BINARY for OS/2 on 08/23/91 at 11:56:41 . . . . . . . . 400
B.3 Test Generate BINARY for S/370 on 08/23/91 at 11:56:12 . . . . . . . . 409
B.4 Test Generate BOOLEAN for S/370 on 08/27/91 at 15:57:51 . . . . . . 418
B.5 Test Generate CHAR for S/370 on 08/26/91 at 17:36:41 . . . . . . . . . 419
B.6 Test Generate CHARSFX for S/370 on 08/26/91 at 17:24:05 . . . . . . . 420
B.7 Test Generate DMNATTR for S/370 on 08/27/91 at 16:40:38 . . . . . . 421
B.8 Test Generate ENUMERAT for S/370 on 08/27/91 at 17:09:04 . . . . . 422
B.9 Test Generate FLOAT16 for S/370 on 08/27/91 at 15:49:23 . . . . . . . 423
B.10 Test Generate FLOAT2 for OS/2 on 08/27/91 at 15:49:39 . . . . . . . . 425

Appendix C. C Declaration Translator Glossary . . . . . . . . . . . . . . . . . 427

Appendix D. Common Declaration Translator BNF Summary . . . . . . . . . 428

Appendix E. Reference to Related Publications . . . . . . . . . . . . . . . . . 434

Index . . . . . . . . . . . . . . . . . . . . . . . . . . . . . . . . . . . . . . . . 435

Unclassified

Part 1. Common Declaration Translator Specifications

Chapter 1. Introduction . . . 2
1.1 Overview . . . 2
1.1.1 Representation Domains and Declaraton translators . . . 2
1.2 Scope . . . 3
1.3 Notation . . . 5
1.4 Deviations from ADL . . . 6
1.5 Conventions . . . 6
1.5.1 General Conventions . . . 6
1.5.2 Exception Message Severity Levels . . . 6
1.5.3 Error Processing Rules . . . 7
1.5.4 Constant Processing Rules . . . 8
1.5.5 SUBTYPE Processing Rules . . . 9
1.5.6 ADL <DEFAULT statement> Processing Rules . . . 10
1.5.7 User Specified Padding Processing Rules . . . 10
1.5.8 DFM Considerations . . . 11
1.5.9 Identifier Mapping Constants . . . 14
1.6 Common Parse Source Text Specification . . . 15
1.6.1 Parse Source Text Conventions . . . 15
1.6.2 Parse CCSID Considerations . . . 15
1.6.3 map_to_adl_id function . . . 18
1.7 Common Translate Declaration Space Specification . . . 20
1.7.1 General Processing Rules . . . 20
1.7.2 Translate Guidelines . . . 22
1.8 Common Generate Source Text Specification . . . 23
1.8.1 General Processing Rules . . . 23
1.8.2 Generate Source Text Conventions . . . 25
1.8.3 map_to_pl_id procedure . . . 27
1.9 Translate and Generate Syntax Rules . . . 30
1.9.1 Variable Definitions . . . 30
1.9.2 Input and Output Stem Variables . . . 31
1.9.3 Status Stem Qualifiers . . . 33
1.9.4 Pseudo Code Functions . . . 36
1.9.5 Specifying Defaulted Attribute Values . . . 38
1.9.6 Pseudo Code Conventions . . . 38

Chapter 2. ADL Annotation of Programming Language Text . . . 39
2.1 Overview of ADL Annotation . . . 39
2.2 <ADL annotation> . . . 39
2.3 <LIST statement> . . . 54
2.4 <implied ARRAY> . . . 56
2.5 <implied CASE> . . . 67
2.6 <implied SEQUENCE> . . . 69
2.7 <implied SUBSTR> . . . 71
2.8 Extended List Annotation Example . . . 72

Unclassified

Chapter 1. Introduction

1.1 Overview

The purpose of a declaration translator specification is to specify the language information required to implement a declaration translator for each of the SAA Programming Languages (PLs) (COBOL, FORTRAN, C, RPG, CSP, and PL/I), as they are implemented on the SAA systems (MVS/ESA™, VM/ESA™, OS/2™).

Part 1 contains specifications common to all declaration translators.

1.1.1 Representation Domains and Declaraton translators

1. All programs compiled by a particular compiler, and all data exported (writes for example) by those programs are members of the same representation domain. Examples of representation domains are

IBM 370 C

IBM OS/2 COBOL

Associated with each representation domain is a declaration translator that understands the following things about the representation domain:

- The syntax used by programmers for describing data.
   - The data types supported by the programming language.
   - The attributes used to qualify data types.
   - The ADL annotation which is valid for the language and data types.
   - The representations used for each data type.
   - The alignment of variables in memory.
   - The mapping of structures and arrays to memory.
   - The semantics of the operations defined by the programming language for each of its data types.

2. Declaraton translators support the following translations of ADL Declaration Spaces (ADLDCLSPCs):

- From programming language declarations to an ADLDCLSPC appropriate to its representation domain.
   - From an ADLDCLSPC appropriate to any other representation domain to an ADLDCLSPC appropriate to its own representation domain.
   - From an ADLDCLSPC appropriate to its representation domain to the programming language declarations in its representation domain.

MVS/ESA, VM/ESA, OS/2, and SAA are trademarks of the International Business Machines Corporation.

1.2 Scope

This section defines the scope of the individual PL declaration translator specification sections. The part number refers to the document parts in the PL declaration translator specification.

1.2.1.1 Part 2. PL Declaration Translator

This section shall:

1. Introduce the declaration translator and specify supported systems, compiler versions, and documentation used.
2. Summarize the restrictions on data descriptions
3. Summarize the I/O methods supported for a representation domain
4. Summarize the restrictions on I/O methods

1.2.1.2 Part 3. PL Declaration Translator Parse Source Text

This section shall:

1. Specify the supported programming language syntax using BNF with additional information provided by syntax and general rules.

For some languages it may not be practical or possible to specify an element completely in BNF. In this case, include sufficient additional text, references, or notes to complete the specification.
2. Specify the format, syntax and general rules for a PL data description.
3. Specify Data Alignment and padding rules.
4. Specify the declaration translator algorithms for mapping between PL identifiers and ADL identifiers.
5. Specify the representation domain defaults using the ADL <DEFAULT statement>. Representation domain defaults take precedence over ADL defaults.
6. Specify all statements which define data, affect data representation, or are required to interpret the source text format.
7. Specify the following for each PL data declaration:

Function A statement of the purpose of the declaration.

Format A BNF definition of the syntax of the declaration and of any ADL annotation allowed for the declaration.

ADL Mapping The mapping of the PL declaration to an equivalent ADL declaration.

Mappings shall indicate which attributes have the same values as representation domain defaults.

Include algorithms as needed to explicitly show how attribute values are set based on the programming language declaration.

Notes Additional syntactic constraints not expressed in BNF that the declaration shall satisfy. Other general rules for the PL declaration or the mapping to ADL.

Exceptions Exceptions which could be issued by the parse and/or mapping functions.

Examples Sample PL declaration and its ADL mapping.

8. Include an extended example of a PL data description.
9. Include a summary of Parse Source Text exception messages with explanation and/or recovery information for each message. This is only an initial list. It shall be completed during implementation.
10. Include a summary of all PL BNF statements.

1.2.1.3 Part 4. PL Declaration Translator Translate Declaration Space

This section shall:

1. Specify the mapping from ADL objects in any representation domain to the ADL objects in the representation domain of this declaration translator. The goal of translate is to always produce a usable ADLDCLSPC, avoiding issuing error exceptions.

If an alien type cannot be translated directly into a type in the declaration translator's domain, then it should be translated to an ASIS type or to a type which can be mapped by the Generate Source Text function. Generate Source Text will produce a PL data type with a compatible record image to the ADL type and with ADL annotation to indicate the actual ADL type that will be placed in the ADLDCLSPC when the data description is parsed.
2. Specify for each mapping the BNF term from Parse Source Text of the PL data declaration to which the translated ADL declaration would be generated.
3. Include a summary of Translate Declaration Space exception messages with explanation and/or recovery information for each message. This is only an initial list. It shall be completed during implementation.

1.2.1.4 Part 5. PL Declaration Translator Generate Source Text

This section shall:

1. Specify the mappings from ADL in the PL representation domain to PL source text declarations and ADL annotation.
2. Specify for each mapping the BNF term or terms from Parse Source Text of the data declaration being generated.
3. Specify the values for all required terms and all optional terms which have PL defaults in the BNF production of the data declaration.
4. Specify any other PL syntax which is required to complete the PL declaration, but which cannot be specified as terminal values for a BNF term. For example, in this fragment of a C int definition

   ```
   <sign adjective> [<length adjective>] int
   ```

the values of the terms <sign adjective> and <length adjective> must be specified. In addition, int is also needed to complete the C declaration.
5. PL syntax which is not optional and is not part of a list of alternative choices does not have to be specified. Specifying the BNF term being mapped by definition selects this PL syntax.

6. Include a summary of Generate Source Text exception messages with explanation and/or recovery information for each message. This is only an initial list. It shall be completed during implementation.

1.2.1.5 DDM Architecture and ADL

This document does not specify:

1. The syntax and semantics of A Data Language.
2. The means by which ADL descriptions of data are created or managed, declaration translator interfaces, declaration translator function descriptions, and the internal ADL encodings with which declaration translators will work.

See *A Data Language* for more detail on these topics.

1.3 Notation

This section defines the notation used in this document.

1. The syntactic notation used in this standard is extended BNF (Backus Naur Form), as defined in *A Data Language* with the following additional rules:
   - When a syntactic variable is defined by the *A Data Language* it shall be preceded by the letters ADL (as in ADL<B>).
   - If a declaration translator specification uses a symbol which is also a BNF symbol, where the set of BNF symbols consist of the following single and compound symbols,

```
<BNF OR symbol> ::= |

<BNF symbols> ::=
     [ | ] | { | } | .! | ... | ::= | < | > | <BNF OR symbol>
```

then the symbol shall be preceded by the BNF escape symbol as defined below:

```
<BNF escape> ::= ►
```

The escape character indicates that the following character should be interpreted as a language symbol and not as a BNF symbol.

2. The highest level BNF term for each declaration translator shall be

`<PL data description>` where PL is the declaration translator PL name.

3. The notation and syntax used in pseudo code is defined in 1.9, "Translate and Generate Syntax Rules" on page 30. Pseudo code shall be written using REXX syntax as defined by that section.

1.4 Deviations from ADL

A change was made to the ADL specification for floating point types too late to allow the declaration translator specifications to be updated. ADL merged the FLOAT2 and FLOAT16 types into a single FLOAT type. The following shows how to map from the old types to the new types. The declaration translator specifications contain only the old float types.

Table 1. Mapping of FLOAT2 and FLOAT16 to FLOAT

| Old ADL floating point type | New ADL floating point type |
|---|---|
| FLOAT16 LENGTH(32) | FLOAT FORM(FH32) |
| FLOAT16 LENGTH(64) | FLOAT FORM(FH64) |
| FLOAT16 LENGTH(128) | FLOAT FORM(FH128) |
| FLOAT2 LENGTH(32) | FLOAT FORM(FB32) |
| FLOAT2 LENGTH(64) | FLOAT FORM(FB64) |
| FLOAT2 LENGTH(80) | FLOAT FORM(FB80) |
| FLOAT2 LENGTH(128) | FLOAT FORM(FI128) |

1.5 Conventions

This section defines the conventions used in this document.

1.5.1 General Conventions

1. In this document, the term "shall" defines conditions that are required to be true.
2. All ADL keywords are specified with uppercase letters.
3. All SAA language keywords for a particular SAA language are specified in all uppercase or lowercase letters, according to the conventions of that language.
4. This document specifies ADL encodings using ADL source text.
5. Bit and byte numbering positions are defined according to IBM's Corporate Systems Practice (CSP) 0-2042-005 (12/71). A summary follows:
   - Bits are consecutively numbered from left to right starting with zero. The left-hand bit has the most significant value, and the right-hand bit the least significant value. Numbering of bits within a word follow the left-to-right order starting with zero.

1.5.2 Exception Message Severity Levels

The Parse Source Text, Generate Source Text, and Translate Declaration Space sections include exception messages which indicate a severity level for the error encountered, and the text of the message itself. The messages in these sections are only an initial set which shall be completed during implementation of the declaration translators. The severity levels and their meanings are as follows:

| | |
|---|---|
| I | INFORMATION : An information message about a declaration translator processing decision. The declaration translator function can complete successfully if only INFORMATION messages are issued. |
| W | WARNING : A warning message indicating that the declaration translator processing may not have performed as the user expected. The declaration translator function can complete successfully if only WARNING messages are issued. However, the caller may not want to use the declaration translator output without modification. |
| E | ERROR : An error message indicating a severity such that the output from the declaration translator is not usable. If possible, the declaration translator function will complete and produce output, excluding the erroneous data. For example, for Parse Source Text and Translate Declaration Space an output ADLDCLSPC may be produced, with partially completed or missing fields. The ADLDCLSPC must be a valid encoding to insure that a hex dump can be taken without failure. |
| S | SEVERE ERROR : An error which requires the declaration translator to terminate processing immediately. |

1.5.3 Error Processing Rules

- Not all pseudo code procedures are specified to indicate that processing continues after an error is encountered. However, the declaration translators should be implemented in such a way as to continue processing the entire input wherever possible, recovering at the next field, attribute, or other logical place. The entire input ADLDCLSPC on Generate Source Text or Translate Declaration Space, and the entire source file on Parse Source Text shall be scanned for errors when possible.
- The specification of the Translate Declaration Space function assumes the input is a valid ADLDCLSPC. The specification of the Generate Source Text function assumes the input ADLDLCSPC is valid for its representation domain. So the pseudo code procedures for these functions do not necessarily provide complete checking to insure the input is correct. However, the implementation of the declaration translators should provide this type of checking to guard against such input errors, and to provide for graceful termination of the function.
- Parse Source Text and Generate Source Text functions shall fail with an exception of severity E if statements or encodings which are unknown in their representation domain are encountered.
- Translate Declaration Space shall fail with an exception of severity E if encodings which are unknown or not translatable into the declaration translator's representation domain are encountered.
- Parse Source Text and Generate Source Text shall fail with an exception of severity E if PL source or an ADLDCLSPC which exceed representation domain limits are encountered.
- Translate Declaration Space shall either fail with an exception of severity E or W if an ADLDCLSPC is encountered which exceeds representation domain limits. It shall fail with an exception of severity E if there is no identifiable recovery for a user. It shall fail with an exception of severity W if a user may be able to recover by generating PL source text from the translated ADLDCLSPC, editing the PL source, and then parsing to a valid ADLDCLSPC.

An example of this situation would be if an ADLDCLSPC input to translate would produce a record too large for the representation domain. The translation could be completed, then the source generated. The user could then delete data declarations to provide a data description valid for the domain.

1.5.4 Constant Processing Rules

The following rules shall apply to all declaration translators:

1. Parse Source Text, Translate Declaration Space, and Generate Source Text are specified as though there are no attributes whose value is given by a reference to an ADL <constant identifier>. All attributes are treated as though their value is given by an ADL keyword (e.g. TRUE, FALSE, DGTLSTBYT) or literal value (e.g. 31, 0, 15, x'D').

2. If a declaration translator implementation supports ADL constants then the following shall be true:

a. Declaration translator implementations shall support ADL <constant identifier> which are the same as ADL <key word>s. How a given declaration translator implementation handles this is outside the scope of this specification. For example it must be valid for a FORTRAN programmer to do the following:

   ```
   PARAMETER (LSTBIT=2048)
   CHARACTER*1 X*LSTBIT;
   LOGICAL*4 Y;
   ```

In ADL this is

   ```
   LSTBIT : CONSTANT 2048;
   X : CHAR LENGTH (LSTBIT);
   Y : BOOLEAN LENGTH(32) BLNENC("LSTBIT");
   ```

b. The level of constant support varies by PL representation domain. Constants may be supported in both PL source text and ADL annotation for those PL's which have named constants. PLs which do not have named constants may support only those constants which are defined and referenced within ADL annotation. All others may be deleted.

c. If a declaration translator Translate Declaration Space changes an attribute's value, and that attribute was specified with an ADL <constant identifier> reference, then the ADL <constant identifier> reference shall be replaced with the new, correct, literal value or ADL <key word> for the translated attribute. For example, the input to Translate Declaration Space is :

   ```
   max_str_length : CONSTANT 33;
   str : ASIS LENGTH(*) MAXLEN(max_str_length) UNITLEN(1);
   ```

is translated to the following:

   ```
   max_str_length : CONSTANT 33;
   str : ASIS MAXLEN(40) UNITLEN(1);
   ```

The constant in MAXLEN had to be replaced because this domain required a different value than the constant.

d. If the attribute's value is specified by an ADL <constant identifier reference>, and the attribute is not generated to PL source text, then, during Translate Declaration Space, the ADL <constant identifier reference> shall be replaced by the value of the constant. For example, the following is input to the C declaration translator :

```
flt_len : CONSTANT 64;
sign : FALSE;
x : FLOAT16 LENGTH(flt_len);
y : BINARY SIGNED(sign) PRECISION(32);
```

This is translated to :

```
x : FLOAT16 LENGTH(64);
y : BINARY SIGNED(FALSE) PRECISION(32);
```

The constants were replaced here because they could not be produced in the PL source text on generate. The following is the source text generated by the C declaration translator for the above:

```
double x;
unsigned long int y;
```

e. At the end of Translate Declaration Space remove any ADL <constant statement> which is no longer referenced.

1.5.5 SUBTYPE Processing Rules

The following rules shall apply to all declaration translators:

1. Representation domains which do not have user defined types can define in their translate processing rules that ADL <subtype instance>s are not supported and not translated. ADL <subtype instance>s shall be replaced in the declaration by the ADL type defined by the ADL <SUBTYPE statement> for that ADL <subtype instance>.

2. Declaration translator implementations for representation domains which do have user defined types, shall support ADL <SUBTYPE statement>s which have the same identifiers as ADL keywords. For example it must be valid for a C programmer to do the following:

```
typedef int BINARY;
int x;
BINARY y;
```

In ADL this is

```
BINARY : SUBTYPE OF BINARY...;
x : "BINARY"...;       /* use ADL's BINARY  */
y : BINARY...;         /* use user's BINARY */
```

How a given declaration translator implementation handles this is outside the scope of this specification. Representation domains which do support SUBTYPEs are specified without consideration of the fact that SUBTYPEs can have the same identifiers as ADL keywords.

1.5.6 ADL<DEFAULT statement> Processing Rules

1. ADL<DEFAULT statement>s shall not be accepted as ADL annotation by PL declaration translators. The representation domain defaults are fixed for a given PL declaration translator.
2. ADL<DEFAULT statement>s shall not be generated by PL declaration translators.
3. Parse Source Text shall encode the PL representation domain defaults, as defined in this document, into the output ADLDCLSPC.
4. Translate Declaration Space shall encode the PL representation domain defaults, as defined in this document, into the output ADLDCLSPC replacing the input ADLDCLSPC defaults.

1.5.7 User Specified Padding Processing Rules

Normally, padding is added to a structure by a declaration translator because of alignment requirements. However, some representation domains also allow padding in structures to be specified by users. In COBOL this is done by using the name FILLER on a declaration. In C this is done by using an unnamed bit field. In both cases direct reference cannot be made to the declared object.

Declaration translator's Parse Source Text shall map these declarations to an ADL<SKIP statement>. The size of the SKIP is determined from the PL data type and attributes. This mapping choice has the advantages of:

- Best performance. No time is wasted moving these fields between records. They are simply skipped over.
- Users can add, delete, or move these padding fields as they desire to position fields at specific locations or to pad out a structure to a specific size.

It is possible through indirect means to place data into these padding fields. If the user wants this data to be converted, then the field must be given a valid PL identifier (in COBOL an identifier other than FILLER). The declaration translator's Parse Source Text will then map the field to the ADL type and attributes corresponding to the PL type and attributes.

Declaration translator's Translate Declaration Space may ignore ADL<SKIP statement>s in the input ADLDCLSPC. The declaration translator may add ADL<SKIP statement>s to the output ADLDCLSPC as required by the representation domain's alignment rules.

For each representation domain which has user specified padding, the PL declaration translator shall specify how Generate Source Text will handle the ADL<SKIP statement>. An ADL<SKIP statement> could represent both user specified padding and padding required by alignment. A declaration translator can choose to generate user specified padding declarations to account for all of the SKIP bits or it can generate user specified padding declarations for most of the SKIP bits and let alignment account for the remainder.

1.5.8 DFM Considerations

When a data description is written to produce an ADLDCLSPC for use by Distributed File Management (DFM) for file description, the following guidelines should be followed:

Multiple Data Declarations

If a DECLARE contains multiple data declarations, and default DFM conversion plans are used, the first declaration is taken as the file's record description.

Default Plans

If DFM default plans are to be used, it is recommended that the first data declaration in the DECLARE be a SEQUENCE or a CASE where the variants are SEQUENCEs, even if the SEQUENCE contains only a single field. This insures that the ADLDCLSPC can be translated to the widest number of representation domains and used for conversions with the widest number of representation domains.[1]

If a single field or multple fields are written without a containing SEQUENCE, and then translated into a representation domain which requires a SEQUENCE for file I/O, conversions would be supported only with user written PLANs, not with the default DFM plans. User written plans can do assignments between single fields and members of a SEQUENCE.

Subsetting and Reordering

If an ADLDCLSPC contains any field with an ADL <positional identifier>, then the following restrictions on subsetting and reordering apply:[2]

1. A field can be deleted from a view to create a subset, only if there are no fields with an ADL <positional identifier> following the deleted field at the same nesting level.

Deleting a field which is followed by a field with an ADL <positional identifier> at the same nesting level causes the ADL <positional identifier> value to be reduced by one. This causes the field to match with the wrong field in the base which may cause conversion errors.

2. A field can be swapped with another field at the same nesting level to reorder the view if both field's names are ADL <identifier>s and not ADL <positional identifier>s.

Fields with ADL <positional identifier>s cannot be reordered.

3. Within a <LIST statement>, a field can be deleted from a view to create a subset, only if there are no fields with an ADL <positional identifier> following the deleted field at the same nesting level.

---

[1] The requirement for using a SEQUENCE or a CASE of SEQUENCEs originates with COBOL.

[2] These rules are designed to prevent problems with a view ADLDCLSPC. However, because a declaration translator does not know if an ADLDCLSPC is for a view or base, the rules shall apply to any ADLDCLSPC.

4. Within a <LIST statement>, a field can be swapped with another field at the same nesting level to reorder the view if both field's names are ADL <identifier>s.

Fields with ADL <positional identifier>s cannot be reordered.

The following example illustrates the above rules. Listed for each data declaration are the ADL <qualified identifier>, whether the field can be swapped and if so with what fields, and whether the field can be deleted to create a subset.

Shown is a <LIST statement> and declarations for C, and the equivalent ADL declarations. The ADL declarations could also have been created from PL declarations which did not use the <LIST statement>.

```
/* ADL DECLARE
     TITLE('C LIST example for subsetting and reordering')
   BEGIN;
*/
/* ADL
   x: ISEQ (a, "2", "3", "4",
           ISEQ (a, "2", b, "4")
           b,
           y: ISEQ (a, "2", "3", b)
           c);
*/
int x_a;     /* ADL x.a: ;          */
int x_2_;    /* ADL x."2": ;        */
char x_3_;   /* ADL x."3": ;        */
char x_4_;   /* ADL x."4": ;        */
int _5_a;    /* ADL x."5".a: ;      */
int _5_2_;   /* ADL x."5"."2": ;    */
int _5_b;    /* ADL x."5".b: ;      */
int _5_4_;   /* ADL x."5"."4": ;    */
char x_b;    /* ADL x.b: ;          */
char y_a;    /* ADL x.y.a: ;        */
char y_2_;   /* ADL x.y."2": ;      */
char y_3_;   /* ADL x.y."3": ;      */
char y_b;    /* ADL x.y.b: ;        */
int c;       /* ADL x.c: ;          */
```

Note: The above shows fully qualified annotated identifiers and generated C identifiers which have the minimum qualification to avoid ambiguity. These are just examples. This specification does not specify whether to generate fully qualified or minimally qualified identifiers. This is left to the implementers.

Unclassified

```
                                              Can swap       Can be deleted
                     ADL<qualified identifier> to reorder    to create subset
                     ------------------------- ----------    ----------------
x: SEQUENCE BEGIN;         x                   n/a                n/a
  a  : ...;                x.a                 x.b, x.c, x.y      no
  "2": ...;                x."2"               no                 no
  "3": ...;.               x."3"               no                 no
  "4": ...;                x."4"               no                 no
  "5": SEQUENCE BEGIN;     x."5"               no                 yes
    a  : ...;              x."5".a             x."5".b            no
    "2": ...;              x."5"."2"           no                 no
    b  : ...;              x."5".b             x."5".a            no
    "4": ...;              x."5"."4"           no                 yes
  END;
  b: ...;                  x.b                 x.a, x.c, x.y      yes
  y: SEQUENCE BEGIN;       x.y                 x.a, x.b, x.c      yes
    a  : ...;              x.y.a               x.y.b              no
    "2": ...;              x.y."2"             no                 no
    "3": ...;              x.y."3"             no                 yes
    b  : ...;              x.y.b               x.y.a              yes
  END;
  c: ...;                  x.c                 x.a, x.b, x.y      yes
END;
```

1.5.9 Identifier Mapping Constants

1.5.9.1 Purpose

Define representation domain specific constants used by the identifier mapping routines. Identifier mapping routines map between PL and ADL identifier formats in Parse Source Text, and between ADL and PL identifier formats in Generate Source Text See 1.6.3, "map_to_adl_id function" on page 18 for the general Parse Source Text mapping algorithm. See 1.8.3, "map_to_pl_id procedure" on page 27 for the general Generate Source Text mapping algorithm.

significant_id_length
The maximum number of significant identifier characters duplicate_id_count
A value appended to an identifier which is a duplicate to make it unique

1.5.9.2 Format

```
significant_id_length ::= <unsigned integer>

select
  when PL = C                          then significant_id_length = 255
  when PL = { FORTRAN | PL/I | CSP }   then significant_id_length = 31
  when PL = { COBOL }                  then significant_id_length = 30
  when PL = { RPG }                    then significant_id_length = 6
end

duplicate_id_count ::= <unsigned integer>
```

1.6 Common Parse Source Text Specification

This section defines the syntax and common functions for Parse Source Text.

1.6.1 Parse Source Text Conventions

ADL Identifiers

ADL identifiers in the mappings shall be specified by the map_to_adl_id function. See 1.6.3 for a general definition of this function.

Defaulted Attributes

Defaulted attributes are identified by surrounding them with square brackets. Defaulted attributes are those attributes which have the same value as the representation domain default defined by an ADL <DEFAULT statement>. These are not encoded in the ADLDCLSPC.

Optional Attributes

Optional attributes are identified by surrounding them with square brackets. Optional attributes are those attributes which are specified in the ADL type's optional attributes list. If these attributes appear in square brackets in an ADL mapping and have not been specified in <ADL annotation>, they will not be encoded in the ADLDCLSPC.

Annotated Defaulted Attributes

When a defaulted attribute is specified in <ADL annotation> and its value is the same as the representation domain default value, it shall not be encoded in the ADLDCLSPC. When a defaulted attribute is specified in <ADL annotation> and its value is different from the representation domain default value, it shall be encoded in the ADLDCLSPC.

Annotated Optional Attributes

When an optional attribute is specified in <ADL annotation>, it shall be encoded in the ADLDCLSPC.

1.6.2 Parse CCSID Considerations

The declaration translator Parse Source Text interface in the current DDM architecture states that if the PL source text is not in the CCSID expected by the declaration translator, the source text will be converted before it is parsed. The following describes problems with this approach with which declaration translator implementations will need to be concerned.

1. Existing PL source text is written to provide the correct codepoints the compiler expects. This often requires characters which have the wrong graphic to be entered.

DFM requires these files must be assigned CCSIDs which indicate the codepage of the file. The CCSID is needed to tag character string literals encoded in the ADLDCLSPC.

If the CCSID assigned to the file does not support the entire declaration translator character set, then incorrect conversions can result in the declaration translator being unable to parse the file.

For example, a programmer is writing a C data description using codepage 389 (Italian). This codepage does not have the left and right square brackets needed to write C data declarations. The SAA C instructions for countries which do not support the entire C character set is to use alternative characters which have the codepoint of the desired C character.

So C recognizes the left square bracket ([) as codepoint x'AD' and the right square bracket (]) as codepoint x'BD'. In codepage 389, you would enter ffl ligature (ffl), which has a codepoint of x'AD' when a C left bracket was needed. You would enter open double quote (") which has a codepoint of x'BD' when a C right square bracket was needed.

If the C declaration translator is on OS/2 using U.S. codepage 437 neither of these character graphics are in this code page. A CCSID conversion would not work correctly. It may be that this problem could be handled by special conversion tables for declaration translators and CCSIDs where this is a problem.

Alternatively, an option could be provided to prevent conversions. The file would be parsed as is, and string literals would be stored with the file CCSID. However, in case of ASCII to EBCDIC differences between declaration translator and input source, the declaration translator would need to be able to parse both ASCII and EBCDIC. Conversion to the declaration translator's CCSID would corrupt the file.

```
Desired C data definition

    float x[4][5];

    8998A4AAFBAFB5   Codepoints in codepage 437
    6361307D4DD5DE


In codepage 389 this must be written as

    float xffl4"ffl5";

    8998A4AAFBAFB5   Codepoints in codepage 389
    6361307D4DD5DE
```

Figure 1. Example of PL Source Text CCSID Problems

As shown by Figure 1 even though the character graphics are different, the codepoints are the same. Therefore a U.S. C compiler can parse the C source text entered as shown in codepage 389 without doing any CCSID conversions.

If a CCSID conversion were done there would be problems because the graphics entered in codepage 389 with codepoints x'AD' and x'BD' do not exist in codepage 437.

2. New PL source is written in files which have SBCS or Mixed CCSIDs. If the file CCSID is not the declaration translator's CCSID then the declaration translator must use CDRA services to convert the PL source text, except for PL and ADL character literals, which are left as is, and non ADL annotation comments which are ignored.

If the CCSID being used supports the entire C character set, CCSID conversions will produce the codepoints expected by the declaration translator.

If the CCSID being used does not support the entire declaration translator character set, then this is the same problem as existing files.

1.6.3 map_to_adl_id function

1.6.3.1 Function

Map PL identifiers from the representation domain of this declaration translator into valid ADL identifiers. Each declaration translator specification shall use this general algorithm, specifying only their representation domain unique character mappings and processing.

See 1.6.2, "Parse CCSID Considerations" on page 15 for how files in different CCSIDs are handled. The following assumes the identifiers are already in a CCSID which the declaration translator understands.

See 1.5.9, "Identifier Mapping Constants" on page 14 for the definition of the constant significant_id_length.

1.6.3.2 Format

```
<PL identifier> ::= See syntax note 3

<PL qualified operator> ::= See syntax note 1

<PL qualified identifier> ::=
   <PL identifier>[{<PL qualified operator><PL identifier>}...]

<PL identifier annotation> ::= ADL<qualified identifier>
```

x = map_to_adl_id ( <PL qualified identifier>, ADL <qualified identifier> )

1.6.3.3 Syntax Notes

1. <PL qualified operator> is the PL defined symbol or symbols used to connect the qualifiers which make up a <PL qualified identifier>.
2. <PL identifier annotation> must be written in <ADL annotation> as defined by each declaration translator.
3. Each declaration translator defines the characters and symbols which are valid in their <PL identifier>.

1.6.3.4 Parameters

<PL qualified identifier>
: The language identifier term. This term must be defined in the PL BNF. Its name can follow PL conventions. This is obtained from the PL source text. This parameter is required but may be the null string (e.g. '').

ADL <qualified identifier>
: The ADL <qualified identifier>. This represents an ADL <qualified identifier> which is written as ADL annotation in the declaration being mapped. This parameter is required but may be the null string (e.g. '').

x

Function return value

1.6.3.5 Processing

1. If ADL <qualified identifier> is specified and it is an ADL <positional identifier>, this declaration is encoded without a name. <PL qualified identifier> is ignored if specified.
2. If ADL <qualified identifier> is specified, and it is not an ADL <positional identifier>, the ADL <qualified identifier> is encoded as is in the ADLDCLSPC. The <PL qualified identifier> is ignored if specified.
3. If neither <PL qualified identifier> nor ADL <qualified identifier> are specified then this declaration is encoded without a name in the ADLDCLSPC. This declaration can only be referenced by use of an ADL <positional identifier>.
4. If only <PL qualified identifier> is specified, it is mapped to an ADL <qualified identifier> using the PL specified mappings, and this resulting ADL <qualified identifier> is then encoded in the ADLDCLSPC.
5. Truncate <PL qualified identifier> to significant_id_length
6. Call out exception if <PL qualified identifier> is not unique within the first significant_id_length characters.
7. Map all PL special characters (@, $, #, &, -, _) to their ADL equivalents. This character mapping shall be specified by each PL declaration translator.
8. <PL qualified identifier>s are mapped to ADL <qualified identifier>s according to the PL declaration translator defined rules.
9. Mapping complete. Identifier can now be encoded in the ADLDCLSPC.

1.6.3.6 Examples

The following shows a C data description :

```
C Data Description
--------------------------------
int abc_xyz;
char _xy;
char _xy1;      /* ADL ?xy : ;      */
char _xy2;      /* ADL %xy : ;      */
float abc_xyz3; /* ADL abc?xyz : ;  */
```

When this data description is parsed the map_to_adl_id function produces the following results :

```
ADL <identifier>s output by parse
---------------------------------
map_to_adl_id('abc_xyz','')          returns  abc_xyz
map_to_adl_id('_xy','')              returns  _xy
map_to_adl_id('_xy1','?xy')          returns  ?xy
map_to_adl_id('_xy2','%xy')          returns  %xy
map_to_adl_id('abc_xyz3','abc?xyz')  returns  abc?xyz
```

1.7 Common Translate Declaration Space Specification

This section defines the general processing rules, syntax and common functions for Translate Declaration Space

1.7.1 General Processing Rules

Translate specifies how to translate any ADL type and associated attributes into the representation domain of the declaration translator. Translate is specified in terms of processing rules for the ADL constructors SEQUENCE, CASE and ARRAY and pseudo code procedures for the ADL field types and ARRAY dimension list.

These processing rules and procedures work with a collected set of information about the current declaration being processed and the current processing status. They output a collected set of new ADL type and attribute values. How the information about a declaration is derived from encoded ADL in the input ADLDCLSPC, how status information is produced, and how output declaration information is changed to encoded ADL in the output ADLDCLSPC is outside the scope of this specification.

The following specifies the environment, preprocessing, and post processing which shall be true for each declaration translator's Translate Declaration Space specification section. This provides the processing context necessary to understand the Translate Declaration Space specifications.

1.7.1.1 General Processing

1. Translate is specified in terms of ADL source text.
2. Translate processing is specified in terms of ADL declarations and attributes which are equivalent to the DDM encoding in the input and output declaration spaces.
3. For each data declaration, all associated attributes are available for testing from the input ADLDCLSPC and setting in the output ADLDCLSPC. They are collected according to ADL rules from the hierarchy of data declaration, ADL <SUBTYPE statement>s, and ADL <DEFAULT statement>s.
4. For each data declaration, processing status information is collected. This is additional information about the declaration or about the current processing status. Examples are the current dimension number, total dimensions in this array, nesting level, subtype instance flag, ADL type of the containing constructor, etc..
5. The input ADLDCLSPC is processed sequentially starting with the ADL <DECLARE statement>.
6. For all declaration translators the following are always copied to the output ADLDCLSPC:
   a. The ADL <DECLARE statement> and its attributes
   b. ADL <TITLE attribute> c. ADL < NOTE attribute > d. ADL < HELP attribute > e. The ADL < identifier > for the declaration f. The ADL < WHEN clause >

1.7.1.2 ADL < CONSTANT statement >

The ADL < CONSTANT statement > is translated according to the rules specified in 1.5.4, "Constant Processing Rules" on page 8.

1.7.1.3 ADL < DEFAULT statement >

1. The declaration translator's representation domain specific ADL < DEFAULT statement > s are inserted into the output ADLDCLSPC. The input ADL < DEFAULT statement > s are used to determine input attribute values but are not copied to the output ADLDCLSPC. Representation domain defaults are specified in the Parse Source Text section of each declaration translator specification.

Only those defaults needed by the translated declarations shall be encoded.

1.7.1.4 ADL < SEQUENCE >

1. For each ADL < SEQUENCE > data declaration, the following are copied to the output ADLDCLSPC:

a. ADL < SEQUENCE > key word b. ADL < identifier > c. ADL < SEQUENCE > attributes list d. ADL < WHEN clause > e. ADL < BEGIN statement > f. ADL < END statement > after completion of the member processing.

2. All statements within the ADL < SEQUENCE > are processed before continuing with the declarations following the ADL < SEQUENCE > data declaration.

1.7.1.5 ADL < CASE >

1. For each ADL < CASE > data declaration, the ADL < CASE attributes list > is processed according to declaration translator specified procedures.

2. Each WHEN or OTHERWISE and its associated data declaration are processed sequentially as follows:

a. The ADL < WHEN clause > is copied to the output ADLDCLSPC. The OTHERWISE keyword and identifier, if present, are copied to the output ADLDCLSPC.

b. If the associated data declaration is null (i.e. it is either not present or is only an ADL < SKIP statement > ), then it is copied to the output ADLDCLSPC.

c. If the associated data declaration is not null then it is processed according to declaration translator specified procedures.

3. Processing then continues with the declarations following the ADL < CASE > data declaration.

1.7.1.6 ADL < ARRAY >

1. For each ADL < ARRAY > data declaration, the ADL < ARRAY defaulted attributes list > is processed according to declaration translator specified procedures.

2. For each dimension in the ADL < ARRAY > 's ADL < DMNLST attribute >, a declaration translator specified procedure specifies how the dimension attributes are translated.

3. The element of the ADL < ARRAY > is processed according to declaration translator specified procedures.

1.7.1.7 ADL < MAXLEN attribute >

MAXLEN(ADL < qualified identifier > ) shall be considered an invalid form of this attribute by declaration translators. An error shall be signaled.

---

1000E MAXLEN(ADL < qualified identifier > ) not supported by translate.

Explanation: The ADL < MAXLEN attribute > must be a literal or constant value. There is no data type corresponding to a MAXLEN(ADL < qualified identifier > ) in any of the SAA representation domains.

1.7.2 Translate Guidelines

The goal of translate is to produce an output ADLDCLSPC which maximizes the usability of the data in this representation domain. In order, from most useful to least useful, Translate Declaration Space attempts to produce:

1. An ADL declaration statement which maps during generate directly to a PL source declaration without the need for any annotation.

2. An ADL declaration statement which maps during generate directly to a PL source declaration which needs only annotation of its attributes but not its data type.

3. An ADL declaration statement which translates and/or generates to multiple PL source declarations which allow the representation domain to manipulate the component parts for the field. For example, a. An ADL < CHARPRE > data declaration can be translated to an ADL < BINARY > data declaration and an ADL < CHAR > data declaration with a LENGTH(ADL < qualified identifier > ) reference to the binary field. Two PL source declarations are generated for the one ADL declaration statement.

b. A numeric with COMPLEX(TRUE) can be translated to a field with COMPLEX(TRUE) and then generates to two separate PL numeric declarations with annotation.

4. An ADL declaration statement which generates to a PL type with the ADL type as annotation.

5. The ADL <ASIS> data declaration which generates to a PL data declaration with ASIS as annotation.

1.8 Common Generate Source Text Specification

This section defines the general processing rules, syntax and common functions for Generate Source Text.

1.8.1 General Processing Rules

Generate Source Text specifies how to generate from an ADLDCLSPC in the declaration translator's representation domain into PL source text. Generate Source Text is specified in terms of processing rules for the ADL constructors CASE, SEQUENCE, and ARRAY and pseudo code procedures for the ADL field types and ARRAY dimension list.

These processing rules and procedures work with a collected set of information about the current declaration being processed and the current processing status. They output a collected set of values which is used to produce the actual source text line(s). How the information about a declaration is derived from encoded ADL in the input ADLDCLSPC, how status information is produced, and how output declaration information is changed to actual PL source text lines is outside the scope of this specification.

The following specifies the environment, preprocessing, and post processing which shall be true for each declaration translator's Generate Source Text specification section. This provides the processing context necessary to understand the Generate Source Text specifications.

1.8.1.1 General Processing

1. Generate Source Text input processing shall be specified in terms of ADL declarations which are equivalent to the DDM encoding of ADL in the input ADLDCLSPC.

2. The input ADLDCLSPC is processed sequentially starting with the ADL <DECLARE statement>.

3. The ADL <identifier> for the declaration shall be mapped to a <PL identifier> by a call to the procedure map_to_pl_id. The following call shall be made for each identifier, prior to calling the declaration translator specified Generate Source Text procedures.

   ```
   call map_to_pl_id(ADL<identifier>,<identifier>,<identifier annotation>)
   ```

See 1.8.3, "map_to_pl_id procedure" on page 27 for a description of this procedure.

4. For each declaration, all associated attributes are available for testing from the input ADLDCLSPC. They are collected according to ADL rules from the hierarchy of data declaration, ADL <SUBTYPE statement>s, and ADL <DEFAULT statement>s.

5. For each declaration, processing status information is collected. This is additional information about the declaration or about the current processing status. Examples are the current dimension number, total dimensions in this array, nesting level, subtype instance flag, ADL type of the containing constructor, etc..

6. Generate Source Text output processing shall be specified using the BNF term name from the Parse Source Text section of the PL source declaration which is being generated. It then shall specify the terminal information for all terms defined under the main BNF term. Thus at the end of the generate procedure all terms needed to create the PL source text are defined as terminals.

7. The PL source text is then built on return from the mapping procedures following the BNF and rules in the Parse Source Text section and using style and formatting rules appropriate to the language. This process is outside the scope of this specification.

8. For all declaration translators the following shall always be generated as ADL annotation. The generation of these items is not considered further in declaration translator specifications. The annotation generated must follow the BNF and associated rules specified in the Parse Source Text section of each declaration translator specification.

a. ADL <DECLARE statement> and its attributes b. ADL <TITLE attribute> c. ADL <NOTE attribute> d. ADL <HELP attribute> e. ADL <WHEN clause>

1.8.1.2 ADL <CONSTANT statement>

1. The ADL <CONSTANT statement> is generated to PL source declarations if the representation domain supports named constants.

2. The ADL <CONSTANT statement> is generated as annotation if the representation domain does not support named constants and the constant is referenced within <ADL annotation>.

1.8.1.3 ADL <DEFAULT statement>

1. DEFAULT statements are not generated as ADL annotation or PL source text. These are fixed for a representation domain and cannot be altered by users.

1.8.1.4 ADL <SEQUENCE>

1. For each ADL <SEQUENCE> data declaration, the ADL <SEQUENCE> key word and ADL <identifier> are processed according to declaration translator specified procedures. Then all statements within the ADL <SEQUENCE> are processed before continuing with the declarations following the ADL <SEQUENCE> data declaration.

Unclassified

1.8.1.5 ADL<CASE>

1. For each ADL <CASE> data declaration, the ADL <CASE> key word, ADL <identifier> and ADL <CASE attributes list> are processed according to declaration translator specified procedures.
2. Each ADL <WHEN clause> or ADL <OTHERWISE statement> and their associated data declaration are processed sequentially as follows:
   a. The ADL <WHEN clause> and the OTHERWISE key word are generated as ADL annotation. This may optionally include the ADL <THEN statement>.
   b. If the associated data declaration is null, i.e. it is either not present or is only an ADL <SKIP statement>, then it is generated according to declaration translator specified procedures.
   c. If the associated data declaration is not null, then it is processed according to declaration translator specified procedures.
3. Processing then continues with the declarations following the ADL <CASE> data declarations.

1.8.1.6 ADL<ARRAY>

1. For each ADL <ARRAY> data declaration, the ADL <ARRAY> data declaration is processed according to declaration translator specified procedures.
   a. For each dimension in the ADL <ARRAY>'s ADL <DMNLST attribute>, a declaration translator procedure specifies how the dimension attributes are generated. How the total list of dimensions is to be generated is specified by declaration translator procedures.
   b. The element of the ADL <ARRAY> data declaration is processed according to declaration translator specified procedures.

1.8.1.7 ADL<MAXLEN attribute>

MAXLEN(ADL <qualified identifier>) shall be considered an invalid form of this attribute by declaration translators. An error shall be signaled.

1001E MAXLEN(ADL <qualified identifier>) not supported by generate.

Explanation: The ADL <MAXLEN attribute> must be a literal or constant value. There is no data type corresponding to a MAXLEN(ADL <qualified identifier>) in any of the SAA representation domains.

1.8.2 Generate Source Text Conventions

Generated Source Text

The pseudo code procedures shall explicitly state the source text that it will generate. All optional language terms which have default PL values shall be specified. Optional language terms which do not have PL defaults do not have to be specified.

For example, in the following C definition, the entire term is optional because there are no defaults defined:

```
[<attribute>] ::= const | volatile
```

However, in the following C definition, syntax rules define long to be the default if no length adjective is specified. Therefore this term must be specified in the Generate Source Text procedures.

```
[<length adjective>] ::= short | long
```

C/370 integers can be written in many equivalent forms because of C default attribute values. For example, the following are all ways of writing the type specifier for a 32 bit signed integer. The last form is the correct form for generate because all defaults are explicitly stated :

```
static
int
long
long int
signed long
signed long int
extern signed long int
```

Unclassified

1.8.3 map_to_pl_id procedure

1.8.3.1 Function

Map ADL identifiers to valid PL identifiers for this declaration translator's representation domain. Each declaration translator must specify its own algorithm for this function.

1.8.3.2 Format call map_to_pl_id (ADL <identifier>,
<PL identifier>,
<PL identifier annotation>)

ADL <identifier>

This is an input parameter. It is either the stored ADL <identifier> for the declaration, or if no identifier is stored then this is the ADL <positional identifier> for this declaration.

<PL identifier>

This is an output parameter. It is the result of mapping the ADL <identifier> into a valid <PL identifier>.

<PL identifier annotation>

This is an output parameter. If the <PL identifier> equals the original ADL <identifier>, then this parameter is a null string. If the <PL identifier> is different from the ADL <identifier>, then this is the original input value of ADL <identifier>.

1.8.3.3 Processing map_to_pl_id returns the <PL identifier> by executing the declaration translator unique algorithm to map the ADL <identifier> to a <PL identifier>.

ADL <qualified identifier>s are mapped to <PL qualified identifier>s according to PL defined rules.

Each algorithm must be able to handle the following :

1. Generated identifier or qualified identifier is not unique according to the PL rules for identifier scope, significant identifier characters, and qualified identifiers.

Duplicates can occur because of :

a. More special characters in the ADL <identifier> than are supported in this PL.

b. ADL contains identifiers distinguished by case (ABC < > aBc) and case is not significant in this PL (ABC = aBc).

c. All unique characters in identifier were truncated to make the identifier a duplicate within the first significant_id_length characters.

2. Unable to modify identifier to make it unique

The following constants are used by this process.

Unclassified significant_id_length

Used in determining identifier uniqueness. For example :

```
significant_id_length = 6
abcdef.uvwxyz1
abcdef.uvwxyz2
abcdef.uvwxy0
```

The first two fully qualified identifiers are duplicates because they are identical within `significant_id_length` characters at every level. The last is unique because it differs in the sixth character at the lowest level qualifier.

If the identifier is not unique, then the identifier will be modified to attempt to make it unique. If the identifier can be modified to be unique, then the generated source is annotated with the ADL <identifier> from the ADLDCLSPC. Otherwise, an exception is signaled.

if the ADL <identifier> is longer than the significant_id_length, then it is truncated to the `significant_id_length` and the generated source is annotated with the ADL identifier from the ADLDCLSPC.

duplicate_id_count

This number is incremented for each duplicate identifier found in the current generate process. This is initially zero.

The `duplicate_id_count` is appended to the end of the identifier to make it unique. The identifier is truncated as needed to make the appended digits fall within the first `significant_id_length` characters.

The following is the general algorithm for any declaration translator :

1. The identifier being mapped is either the ADL <identifier> stored in the ADLDCLSPC, or if no identifier is stored, it is the ADL <positional identifier> for this field.
2. Mapping is done according to declaration translator specified rules. The following are general considerations for each declaration translator mapping procedure:
   a. If the first character of the identifier is not legal as a first character for this representation domain, then append a legal character to the start of the identifier.
   b. Truncate identifier if its length is greater than significant_id_length.
   c. If this identifier is a duplicate, try to modify to make it unique by appending duplicate_id_count, truncating characters if needed so that the appended digits fall within significant_id_length characters. Repeat until successful or identifier is all numeric and thus illegal.
   d. If the identifier is positional, it must be modified according to declaration translator rules to make it into a valid <PL identifier>. The field is annotated with `ADL<positional identifier>` to indicate that on parse this field will be given a new ADL <positional identifier>.

e. If the identifier has been modified, so it cannot be mapped back to the original ADL identifier, then annotation of the ADL <identifier> is required.

1.8.3.4 Examples

The following shows the ADL source for an ADLDCLSPC in the C representation domain :

```
ADL Data Description in C Representation Domain
-------------------------------------
abc_xyz : BINARY...;
_xy : CHAR...;
?xy : CHAR...;
ASIS...;
%xy : CHAR...;
abc?xyz : FLOAT...;
```

When this ADLDCLSPC is generated to C source text, the map_to_pl_id function produces the following results :

```
For each identifier, the following call is made:

call map_to_pl_id(ADL<identifier>,
               <PL identifier>,
               <PL identifier annotation>)

The values for the input and output parameters are:

Input           Output          Output
ADL<identifier> <PL identifier> <PL identifier annotation>
-------------   -------------   ------------------------
abc_xyz         abc_xyz
_xy             _xy
?xy             _xy1            ?xy
"4"             _4_             "4"
%xy             _xy2            %xy
abc?xyz         abc_xyz3        abc?xyz
```

1.9 Translate and Generate Syntax Rules

This section defines the syntax and common functions for pseudo code procedures in Translate Declaration Space and Generate Source Text.

1.9.1 Variable Definitions

All elements of ADL declaration statements, which represent the encoded ADL in the input and output ADLDCLSPCs, and all status information are referenced and set using REXX stem variables. The general format of a stem variable is

```
<stem>.<qualifier>[.<qualifier>]...
```

The three defined stems are:

in. Input ADLDCLSPC type and attribute values for the current declaration.

Translate Only out. Output ADLDCLSPC type and attribute values for the current declaration.

End of Translate Only

Generate Only out. Output BNF term values. The BNF terms must be defined in the parse section.

End of Generate Only status. Processing status information.

These can be used to test or set attribute and other data declaration information. For example:

```
if in.type = FLOAT2 then ...
```

```
out.type = FLOAT16
```

```
if status.containing \= 'SEQUENCE' then ...
```

These names can also be used to directly reference or set an attribute value. For example:

```
if in.PRECISION < 15 then ...
```

```
out.BLNENC = LSTBIT
```

It is outside the scope of this specification how the information in *in.* , and *status.* are obtained from the input ADLDCLSPC and the processing status of translate or generate. It is outside the scope of this specification how the information in *out.* is encoded in the output ADLDCLSPC for translate or as PL source text for generate.

1.9.2 Input and Output Stem Variables

The stem qualifiers used are the ADL attribute keywords plus some special qualifiers for other declaration information. Attribute values are the values or keywords as defined by ADL. These are all reserved keywords and cannot be used as variables in the pseudo code.

in.type The type of the current ADL declaration statement. This must be one of the type keywords specified under section *5.0 Data Declarations* in *A Data Language* . If the declaration statement is an ADL <subtype instance>, the value of *in.type* will be the true ADL type obtained from the ADL <SUBTYPE statement> for that ADL <subtype instance>.

in.instance Set to TRUE if this is a subtype instance, FALSE otherwise.

in.name The ADL <identifier> or ADL <positional identifier> for the declaration.

Translate Only out.term The main BNF term from Parse Source Text of the declaration to which the input is being translated. For example, the translate BINARY procedure for C/370 was called for a 32 bit SIGNED(TRUE), BYTRVS(TRUE), SCALE(0) BINARY:

```
out.term        = '<int data definition>'
out.type        = BINARY
out.PRECISION   = default(31)
out.LENGTH      = default(32)
out.BYTRVS      = default(FALSE)
out.SCALE       = default(0)
out.COMPLEX     = default(FALSE)
out.FIT         = default(TRUNCATE)
out.CONSTRAINED = default(FALSE)
out.RADIX       = default(2)
```

Notes:

1. The BNF term must be enclosed in single quotes.
2. Attributes which have the same value as the defaults for this representation domain are entered using the default function. This indicates these attributes are not actually encoded in the output ADLDCLSPC for this element since they are included in the representation domain defaults.

End of Translate Only

Generate Only out.term The main BNF term from Parse Source Text of the declaration being generated. For example, if the generate BINARY procedure for C was called for a 32 bit, SIGNED(TRUE), SCALE(0) BINARY:

```
out.term               = '<int data definition>'
out.<storage class>    = 'extern'
out.<sign adjective>   = 'signed'
out.<length adjective> = 'long'
out.type_specifier     = 'int'
```

Notes:

1. Stem qualifiers which are BNF terms must be written with their angle brackets.
2. BNF terms on the right side of the assignment statement must appear in single quotes.
3. Non-numeric literal values on the right side of the assignment statement must appear in single quotes.
4. PL syntax which does not have a corresponding BNF term, should be assigned to an *out.* with a stem using PL terminology to identify the PL syntax element. In the above example 'int' is a *type specifier* in C's terminology. This stem should not use BNF angle brackets. The assignment statement would appear as follows:

   ```
   out.type_specifier = int
   ```

End of Generate Only

For both Translate Declaration Space and Generate Source Text, if more than one declaration is output then *out.* is set in the following manner:

```
out.1.type = BINARY
out.2.type = CHAR
out.2.LENGTH = out.1.name
```

Note: For both translate and generate, any attribute which has not been set for a type will have a value NIL. In the syntax of REXX, before data from the ADLDCLSPC is assigned to *in.* the following is done to set all possible stems to NIL:

```
in. = NIL
```

NIL shall be defined to be eqaul to the null string. Therefore, the following are equivalent ways for testing that an attribute has not been assigned a value:

```
if in.MAXLEN = NIL

if in.MAXLEN = ''
```

Unclassified

1.9.3 Status Stem Qualifiers

The following status information is available to declaration translator procedures:

status.dimension

The number of the current dimension in the current ADL < ARRAY > data declaration, as processed by the DMNATTR procedure.[3] This is the number of the dimension in the ADL < DMNLST attribute > , counting from left to right. For example

```
DMNLST(ADL<dimension>, ADL<dimension>, ... , ADL<dimension>)
               #1              #2                    #n
```

status.dimensions.current

The total number of dimensions in the current ADL < ARRAY > data declaration, as processed by the DMNATTR procedure.

status.dimensions.nested

The maximum number of subscripts required to reference the current dimension in the current ADL < ARRAY > . This is the sum of the maximum number of dimensions in an array, for all arrays at each level of nested sequences, plus the number of dimensions in the current ADL < ARRAY > up to and including the current dimension, as processed by the DMNATTR procedure.

status.level

The nesting level for the current declaration. This is 0 for the DECLARE and is 1 for all declarations immediately contained by the DECLARE. It is increased by 1 each time processing begins for the members of an ADL < SEQUENCE > , or data declarations for an ADL < CASE > . It is decreased by one when processing of all ADL < SEQUENCE > members, or ADL < CASE > data declarations is completed. The following shows the status.level values for a sample declaration:

[3] The DMNATTR procedure shall be included in each declaration translator's translate and generate chapters. This procedure shows the translation or generation of the attributes for a single dimension.

```
status.level   ADL source text
------------   ---------------
0              xmp : DECLARE
               BEGIN;
1                 x : SEQUENCE
                 BEGIN;
2                   a : ...;
2                   b : ...;
2                   c : SEQUENCE
                    BEGIN;
3                     s : ARRAY OF
                        SEQUENCE
                        BEGIN;
4                         u : ...;
4                         v : ...;
                        END; /* end SEQUENCE s */
3                     y : ...;
3                     z : CASE
                      BEGIN;
                        WHEN a = 1 THEN
4                         var1 : ...;
                        WHEN a = 2 THEN
4                         var2 : ...;
                        OTHERWISE
4                         var3 : SEQUENCE
                          BEGIN;
5                           a : ...;
5                           b : ...;
5                           c : ...;
                          END; /* end SEQUENCE var3 */
                      END; /* end CASE z */
3                     m1 : ...;
                    END; /* end SEQUENCE c */
2                   m2 : ...;
                 END; /* end SEQUENCE x */
1                parm1 : ...;
1                parm2 : ...;
1                parm3 : ...;
               END; /* end DECLARE xmp */
```

status.containing

The ADL type of the constructor which immediately contains the current data declaration. This is one of

```
DECLARE | SEQUENCE | CASE | ARRAY | SUBTYPE
```

status.minimum.size

Total size of the record, including the current data declaration, if all adjustable size fields are at their minimum size.

status.maximum.size

The current size of the record, including the current data declaration, if all adjustable size fields are at their maximum size.

Unclassified status.character_encoding
This is the character encoding for a declaration if CCSID is a valid attribute for the declaration. Possible values are :

- DBCS
- SBCS
- Mixed
- Unknown - if CCSID(0) or CCSID(65535) is specified.

status.basic_encoding
This is also determined from CCSID, if CCSID is valid for a declaration. Possible values are:

- EBCDIC
- ASCII
- Unknown - if CCSID(0) or CCSID(65535) is specified.

status.char.length
When in.type = CHAR, this will be set to the string's length according to the following logic:

```
select
  when datatype(in.LENGTH) = 'NUM'
  then
    status.char.length = in.LENGTH
  when datatype(in.LOW) = 'NUM' & datatype(in.HIGH) = 'NUM'
  then
    status.char.length = in.HIGH - in.LOW + 1
  otherwise
    status.char.length = in.MAXLEN
end
```

status.significant_id_length
The maximum number of characters which are significant in an identifier for this representation domain.

status.system
This is OS/2, or S/370. This can be used to determine whether to use an ASCII ZONENC(x'3') or an EBCDIC ZONENC(x'F') for an ADL<ZONED> data declaration. It can also be used if SGNLOC(FRSBYT) or SGNLOC(LSTBYT) is specified for an ADL<ZONED> data declaration to determine whether to specify ASCII CCSID(61697) or EBCDIC CCSID(61696).

status.max_precision
For numeric types, this is the maximum available precision for the field determined from radix, sign, and constrained values.

| Table 2. Maximum Numeric Precision | | | | |
|---|---|---|---|---|
| **TYPE** | **RADIX** | **CONSTRAINED** | **SIGNED** | **max_precision** |
| BINARY | 2 | TRUE | TRUE | PRECI-SION |
| BINARY | 2 | TRUE | FALSE | PRECI-SION |
| BINARY | 2 | FALSE | TRUE | LENGTH-1 |
| BINARY | 2 | FALSE | FALSE | LENGTH |
| BINARY | 10 | TRUE | TRUE | PRECI-SION |
| BINARY | 10 | TRUE | FALSE | PRECI-SION |
| BINARY | 10 | FALSE | TRUE | FLOOR( (LENGTH-1) * log 2) |
| BINARY | 10 | FALSE | FALSE | FLOOR( LENGTH * log 2) |
| ZONED | 10 | n/a | n/a | PRECI-SION |
| PACKED | 10 | TRUE | n/a | PRECI-SION |

| Table 3. Maximum Numeric Precision for PACKED CONSTRAINED(FALSE) | | | |
|---|---|---|---|
| **SIGNED** | **SGNLOC** | **PRECISION** | **max_precision** |
| TRUE | DGTLSTBYT | odd | PRECISION |
| TRUE | DGTLSTBYT | even | PRECISION + 1 |
| FALSE | n/a | odd | PRECISION + 1 |
| FALSE | n/a | even | PRECISION |

1.9.4 Pseudo Code Functions

Any function defined by REXX can be used in the pseudo code for these specifications. In addition, the following functions are provided to handle special problems.

ceil( *expression* )
Returns the smallest integer that is > = expression floor( *expression* )
Returns the largest integer < = expression default( *val* )
Used to show in the specifications that an attribute should have the same value as a DEFAULT value and therefore should not be placed in the ADLDCLSPC.

call exception *error_type* , *error_msg*

Write error message to listing. See 1.5, "Conventions" on page 6 for details on the meaning of each severity level.

error_type is defined as

| | |
|---|---|
| I | INFORMATION |
| W | WARNING |
| E | ERROR |
| S | SEVERE ERROR |

call exception *msg_number severity text*

Write error message to listing. See 1.5, "Conventions" on page 6 for details on the meaning of each severity level. This produces a message in the listing and this specification in the same format and with the same number as in the message summary for Translate Declaration Space and Generate Source Text. This is an alternative to the above format.

error

Write an error message and return the most severe error encountered so far. There are serveral different formats which are acceptable for this function. See 1.5, "Conventions" on page 6 for details on the meaning of each severity level.

ec = error( *severity,'message text'* )

This formats as

```
ec = error(severity,'message text')
```

ec = error( *severity,'msg_symbol'* )

When msg_symbol has been given on the :msgid. tag, then this formats as:

```
ec = error(msg_number severity message text)
```

ec = error( *serverity,'msg_symbol'* )

When msg_symbol has been given on the :msgid. tag with the NUMONLY attribute, then this formats as:

```
ec = error(msg_number severity)
```

out.l.name = create_len_ref_name(*name, special_char*)

Creates a name for length reference field. On some translates, CHARPRE and BITPRE may translate to a separate length reference field and a CHAR or BIT. This function produces a standard name of the form

```
name||special_char||LEN

where

  name is the name of the CHARPRE or BITPRE field
  special char is some special char allowed in identifiers
```

For example, create_len_ref_name('address','_') produces the following name for the length reference field

```
address_LEN
```

The function must also handle duplicate identifiers and identifiers larger than the significant_id_length. The process for handling these is similar to that for map_to_adl_id and map_to_pl_id except that if characters must be deleted or overlaid, LEN and the special char must be preserved.

1.9.5 Specifying Defaulted Attribute Values

Translate Only

Declaraton translators shall show all representation attributes when setting out. in a translate pseudo code procedure. If the value set is the same as a representation domain default, then use the default function to indicate these will not be included in the output ADLDCLSPC. This is done to make the representation of these types clearer to the reader. Defaulted attributes shall not be encoded for a field in the output ADLDCLSPC.

```
out.BYTRVS = default( FALSE )
out.SKIP   = default( 0 )
out.CCSID  = default( 0 )
out.SCALE  = default( 0 )
```

End of Translate Only

1.9.6 Pseudo Code Conventions

Pseudo code procedures use the REXX language. Each pseudo code procedure shall meet the following conventions, which will provide a default environment as described below.

- The procedure must start with the procedure expose statement. There are no parameters.

  ```
  procname : procedure expose in. out. status.
  ```

- The procedure must end with a either one of the following:

  ```
  return ec /* if ec=error(...) used in procedure  */
  ```

  ```
  return 0  /* if no errors or call exception used */
  ```

- By default, all variables and parameters are private to this procedure. Changing a variable's value in the procedure does not change its value in any higher level procedure.
- The expose *in. out. status.* makes these stem variables global. They can be set prior to a procedure call to pass status and input ADLDCLSPC information and referenced after a call to set output ADLDCLSPC information or produce PL source text.

Chapter 2. ADL Annotation of Programming Language Text

2.1 Overview of ADL Annotation

While ADL text can be written to fully describe data exported by the SAA Programming Languages, an SAA objective is to use existing descriptions specified in the syntax of the SAA PLs to the extent possible. This is necessary for both programmer usability and application development efficiency. These PL descriptions, however, are incomplete in terms of the actual data representation, alignment, and aggregation methods used by the compilers of the SAA PLs. Therefore, some means must be defined for each PL implementation of relating PL data descriptions to ADL data descriptions. In general, the following three capabilities are required:

1. Parse Source Text: Parse PL data description text to produce an ADL data description.
2. Translate Declaration Space: Translate the ADL description of data suitable for any other PL or implementation of a PL to produce an ADL description of data suitable for a given PL implementation.
3. Generate Source Text: Generate PL text from an ADL data description.

In many cases, PL text provides sufficient information to allow an ADL description to be produced without any further considerations by programmers. However, additional information is often required, especially if data is to be exported to other PLs or imported from other PLs. This chapter of the declaration translator specifications defines a general model of how additional information can be provided as ADL annotation to PL text.

In general, ADL annotation consists of special comments intermixed with standard PL text to provide additional information about data, beyond what can be expressed by the PL or inferred from PL implementation considerations. The first non blank symbol after the opening comment symbol of the PL shall be the symbol ADL. Following this symbol is text consisting of ADL statements or segments of ADL statements. This ADL annotation can be intermixed with PL text in whatever way is considered optimal for each PL. The precise definition of the ADL annotation for each SAA PL is specified by each PL declaration translator's Parse Source Text specification. Annotation of all SAA PLs will conform to this general model of annotation. One of the goals of each PL declaration translator is to minimize the amount of annotation that must be written by programmers.

2.2 <ADL annotation>

2.2.1.1 Function

Annotation provides information that cannot be obtained from source language data descriptions. Annotation may also be added by the user to provide informational notes or to produce an alternate ADL data description.

The following annotation model specifies most ADL terms as optional. This is to allow the greatest flexibility to meet the needs of the PLs. Each PL, may restrict the set of allowed annotation and make any optional item here required for that PL. However, required items specified below shall also be required for each PL using an annotation term with a required item.

2.2.1.2 Format

```
<ADL annotation> ::=
   <opening language comment symbol>
      ADL
         [<PL specific annotation>]
         [<ADL DECLARE annotation>]
      | [<PL OPTIONS annotation>]
   [<closing language comment symbol>]

   <opening language comment symbol> ::= See syntax rule 1

   <closing language comment symbol> ::= See syntax rule 1

 <PL specific annotation> ::=
   ADL<character>...

 <identifier annotation> ::=
     <unqualified identifier annotation>
   | <qualified identifier annotation>

 <unqualified identifier annotation> ::=
     ADL<identifier> :
   | ADL<positional identifier> :

 <qualified identifier annotation> ::=
     ADL<qualified identifier> :

 <ADL DECLARE annotation> ::=
   [<unqualified identifier annotation>:]
   [DECLARE]
   [ADL<DECLARE attributes list>]
   [ADL<BEGIN statement>]
     {
        [ADL<constant statement>]
      | [<SUBTYPE annotation>]
      | [<ADL data annotation>]
     }...
   [ADL<END statement>]
```

Unclassified

```
<SUBTYPE annotation> ::=
  [ADL<subtype identifier>: ]
  [SUBTYPE]
  [OF]
  [<ADL data annotation>]
  ADL<terminator>

<ADL data annotation> ::=
  {
    [<qualified identifier annotation>:] [<ADL field annotation>]
    ADL<terminator>
  }
| {
    [<qualified identifier annotation>:] [<ADL ARRAY annotation>]
    ADL<terminator>
  }
| {[<qualified identifier annotation>:] [<ADL CASE annotation>]}
| {[<LIST annotation>]}
| {[<qualified identifier annotation>:] [<ADL SEQUENCE annotation>]}
| {
    [<qualified identifier annotation>:]
    [<ADL subtype instance annotation>]
    ADL<terminator>
  }

<ADL field annotation> ::=
  {[ASIS] [ADL<ASIS attributes list>]}
| {[BINARY] [ADL<BINARY attributes list>]}
| {[BIT] [ADL<BIT attributes list>]}
| {[BITPRE] [ADL<BITPRE attributes list>]}
| {[BOOLEAN] [ADL<BOOLEAN attributes list>]}
| {[CHAR] [ADL<CHAR attributes list>]}
| {[CHARPRE] [ADL<CHARPRE attributes list>]}
| {[CHARSFX] [ADL<CHARSFX attributes list>]}
| {[ENUMERATION] [ADL<ENUMERATION attributes list>]}
| {[FLOAT16] [ADL<FLOAT16 attributes list>]}
| {[FLOAT2] [ADL<FLOAT2 attributes list>]}
| {[PACKED] [ADL<PACKED attributes list>]}
| {[ZONED] [ADL<ZONED attributes list>]}
| {SKIP[({ADL<positive integer> | ADL<constant identifier>})]}

<ADL subtype instance annotation> ::=
  [ADL<subtype identifier>]
  [ADL<subtype instance attributes list>]

<ADL ARRAY annotation> ::=
  [ARRAY]
  [<ADL DMNLST attribute annotation>]
  [ADL<ARRAY defaulted attributes list>]
  [ADL<ARRAY optional attributes list>]
  [OF]
  [<ADL data annotation>]
```

Unclassified

```
<ADL DMNLST attribute annotation> ::=
  DMNLST( [<ADL dimension>] [, [<ADL dimension>]]... )

<ADL dimension> ::=
  {
    [ADL<DMNLOW attribute>]
    {
       [ADL<DMNHIGH attribute>]
     | [ADL<DMNSIZE attribute>]
    }
    [ADL<DMNMAX attribute>]
  }!

<ADL CASE annotation> ::=
  [CASE]
  [ADL<CASE attributes list>]
  [ADL<BEGIN statement>]
  [<ADL WHEN annotation>]...
  [<ADL OTHERWISE annotation>]
  [ADL<END statement>]

<ADL WHEN annotation> ::=
  [<unqualified identifier annotation>:]
  [WHEN]
  [ADL<condition>]
  [THEN]
  {
     [ADL<REJECT statement>]
   | [ADL<SKIP statement>]
   | {
       [<unqualified identifier annotation>:]
       [<ADL data annotation>]
       ADL<terminator>
     }
  }

<ADL OTHERWISE annotation> ::=
  [<unqualified identifier annotation>:]
  [OTHERWISE]
  {
     [ADL<REJECT statement>]
   | [ADL<SKIP statement>]
   | {
       [<unqualified identifier annotation>:]
       [<ADL data annotation>]
       ADL<terminator>
     }
  }

<LIST annotation> ::=
  [<LIST statement>]
```

Unclassified

```
<ADL SEQUENCE annotation> ::=
  [SEQUENCE]
  [ADL<SEQUENCE attributes list>]
  [ADL<BEGIN statement>]
  {
    [<unqualified identifier annotation>:]
    [<ADL data annotation>]
    ADL<terminator>
  }...
  [ADL<END statement>]

<PL OPTIONS annotation> ::=
  OPTIONS (<option> [, <option>]...) ADL<terminator>

<option> ::=
  ADL<character>...
```

2.2.1.3 Syntax Rules

1. The definition of the terms <opening language comment symbol>, and if required by the representation domain, <closing language comment symbol> are defined by each PL declaration translator.
2. The rules for the placement of the <opening language comment symbol> are language dependent and are defined for each PL.
3. The rules for the placement of the <closing language comment symbol> are language dependent and are defined for each PL. <closing language comment symbol>s are required if the PL defines a closing comment symbol.
4. The rules for multi-line comments and comment continuation are PL defined.
5. The relationship of <ADL annotation> to PL text shall conform to one or more of the following, as specified by each Declaration Translator specification:
   - <ADL annotation> applies to the PL data declaration it follows.
   - <ADL annotation> applies to the PL data declaration it precedes.
   - <ADL annotation> within a PL data declaration statement applies to that PL declaration.
   - <ADL annotation> is independent of any PL data declarations.
6. In each instance where <ADL annotation> is allowed for a given PL,
   - <ADL annotation> shall conform to the general model of <ADL annotation>s specified herein, and shall not include elements of the PL or of any other language.
   - Optional <ADL annotation> productions shall be allowed to be specified only if they cannot be inferred from other elements of the PL.
7. Attributes which are defaulted by representation domain defaults shall not be required when writing ADL annotation.
8. Each PL shall define the <PL OPTIONS annotation> that it allows.

Unclassified

9. If an ADL <positional identifier> is specified, then the PL identifier is ignored, and no identifier is stored in the ADLDCLSPC for this field.
10. <qualified identifier annotation> shall be valid only if the declaration is referenced from a <LIST statement>. Otherwise, only <unqualified identifier annotation> shall be valid.
11. If <ADL data annotation> is specified for any array, it shall not be <ADL ARRAY annotation>.

2.2.1.4 General Rules

1. The ADL description produced by the combination of PL data declarations and <ADL annotation> must describe a field of the same length as a PL implementation that considers only PL text.

2.2.1.5 Examples

The following examples illustrate the possible use of ADL annotation for selected conditions in the SAA PLs.

2.2.1.5.1 Identifier Annotations: The characters and rules for identifiers differ from PL to PL, but all ADL identifiers are constructed from a single set of characters according to a single set of rules. A PL's Parse Source Text maps the PL identifiers to ADL identifiers, and a PL Generate Source Text maps ADL identifiers to PL identifiers. But not all such mappings are bidirectional. In some cases, it is necessary to annotate PL identifiers with the specific ADL to be used so that correct reverse mappings can occur.

1. Given the following ADL:

```
DEFAULT BINARY BYTRVS(FALSE) COMPLEX(FALSE) CONSTRAINED(FALSE)
               RADIX(2) SCALE(0) SIGNED(TRUE) PRECISION(31);
DEFAULT CHAR CCSID(0) LENGTH(1) JUSTIFY(LEFT);

?systime : BINARY...;
_systime : BINARY...;
month?day%year : CHAR LENGTH(9);
BINARY...;
```

C GENERATE produces:

```
int _systime;           /* ADL ?systime :;       */
int _systime2;          /* ADL _systime :;       */
char month_day_year[9]; /* ADL month?day%year:; */
int _4_;                /* "4" :;                */
```

2. COBOL Generate Source Text maps the underscore, question mark, ampersand, and percent sign in ADL identifiers to hyphens in COBOL identifiers. COBOL Parse Source Text maps the hyphens to underscores. The Parse Source Text mapping is not one-to-one with the Generate Source Text Unclassified mapping. Therefore, Generate Source Text must produce the annotation shown in order to preserve the identifier as found in ADL.

Given the following ADL,

```
DEFAULT FLOAT16 COMPLEX(FALSE) RADIX(2) LENGTH(32);

AA_BB?CC&DD: FLOAT16;
```

COBOL Generate Source Text produces the following COBOL text:

```
          15 AA-BB-CC-DD COMP-1.
      *ADL AA_BB?CC&DD:;
```

If the identifier had not been annotated, a COBOL Parse Source Text would produce an identifier of AA_BB_CC_DD. Note that the identifier annotation follows the COBOL statement being annotated.

2.2.1.5.2 Information Annotations: ADL includes certain optional attributes that affect neither the representation nor the conversion of data. Examples are TITLE, HELP, or NOTE. They only provide programmer or application commentary. These attributes can be specified in ADL annotation of PL variable declarations.

In ADL, all data declarations occur within the context of an ADL < DECLARE statement >, in which optional attributes can be specified. Normally, PL source text need not be annotated with an ADL < DECLARE statement > because its existence can be inferred. However, if optional attributes are to be specified, an ADL < DECLARE statement > can be specified as annotation.

1. Given the following ADL,

```
view : DECLARE
   TITLE('View Test Case')
   NOTE('PL/I view, SAA PLI/370');
BEGIN;
   DEFAULT FLOAT16 COMPLEX(FALSE) RADIX(2) LENGTH(32);

   num : FLOAT16 LENGTH(128);
END;
```

PL/I Generate Source Text produces the following PL/I text:

```
/* ADL    view : DECLARE                             */
/* ADL       TITLE('View Test Case')                 */
/* ADL       NOTE('PL/I view, SAA PLI/370')          */
 DCL num FLOAT(109);
```

2. Given the following ADL,

```
y : SEQUENCE
  TITLE('LIST I/O Model')
BEGIN;
  a : BINARY...;
  z : SEQUENCE
    NOTE('Nested <implied SEQUENCE> annotation example')
  BEGIN;
    b : CHAR...;
  END;
END;
```

FORTRAN Generate Source Text produces the following FORTRAN source text:

```
! ADL LIST y: TITLE('LIST I/O Model')
! ADL  (a,
! ADL   z: NOTE('Nested <implied SEQUENCE> annotation example')
! ADL    (b));

INTEGER*4 a
CHARACTER*1 b
```

2.2.1.5.3 Representation Annotations: Representation annotation modifies the ADL description normally produced by a PL Parse Source Text function.

1. The following is a C char declaration with ADL annotation to indicate it is being used as a single byte signed binary field.

```
signed char checked_out_books /* ADL BINARY; */;
```

C Parse Source Text produces the following ADL:

```
DEFAULT BINARY BYTRVS(FALSE) COMPLEX(FALSE) CONSTRAINED(FALSE)
              RADIX(2) SCALE(0) SIGNED(TRUE) PRECISION(31);

checked_out_books : BINARY PRECISION(7);
```

2. A C enumeration can be used by an application as a boolean flag. Normally this is parsed to ADL<ENUMERATION>. The addition of BOOLEAN in annotation modifies this to produce an ADL<BOOLEAN> field. The length and ADL<BLNENC attribute> are determined from the characteristics of the enum declaration in C.

```
enum { FALSE, TRUE } fault_detected /* ADL BOOLEAN */;
```

C Parse Source Text produces the following ADL:

Unclassified

```
DEFAULT BOOLEAN BLNENC(LSTBIT) BYTRVS(FALSE) LENGTH(8);

fault_detected : BOOLEAN;
```

3. COBOL Translate Declaration Space will leave an ADL <BOOLEAN> as an ADL <BOOLEAN>. COBOL Generate Source Text produces a COBOL declaration of a binary number but with annotation providing the true ADL data type, which is needed to correctly parse this field back to an ADL <BOOLEAN>.

```
*ADL BOOLEAN ;
     15 LOGICAL PIC 9 COMP-4.
```

The ADL for the above is:

```
DEFAULT BOOLEAN BLNENC(LSTBIT) BYTRVS(FALSE) LENGTH(16);

LOGICAL : BOOLEAN;
```

2.2.1.5.4 Annotation for ARRAY

1. FORTRAN Translate Declaration Space preserves the number of dimensions and the number of elements per dimension, but alters the representation of the elements and the ADL <DMNLST attribute>s as necessary. This may result in an array which exceeds the FORTRAN limit of seven dimensions. For example the following is the result of a FORTRAN Translate Declaration Space of an eight dimension array:

```
DEFAULT ARRAY DMNLOW(1);
DEFAULT CHAR CCSID(0) LENGTH(1) JUSTIFY(LEFT);

X : ARRAY DMNLST( DMNHIGH(8), DMNHIGH(7), DMNHIGH(6),
                  DMNHIGH(5), DMNHIGH(4), DMNHIGH(3),
                  DMNHIGH(2), DMNHIGH(1))
    OF CHAR;
```

FORTRAN Generate Source Text of this ADL produces a one dimensional array annotated so that it can be parsed to an eight dimension array:

```
character*1  X(40320)  !ADL DMNLST( DMNHIGH(8), DMNHIGH(7), DMNHIGH(6),
                       !ADL         DMNHIGH(5), DMNHIGH(4), DMNHIGH(3),
                       !ADL         DMNHIGH(2), DMNHIGH(1));
```

The FORTRAN application accesses the eight dimension array using the single dimension FORTRAN declaration, doing its own index calculations to determine the single dimension index to use for any desired multi-dimension reference.

2. For COBOL, a multi-dimensional array is maintained in that form by COBOL Translate Declaration Space, as shown by the following ADL:

```
DEFAULT ARRAY DMNLOW(1);
DEFAULT FLOAT16 COMPLEX(FALSE) RADIX(2) LENGTH(32);

THREE_DIMS : ARRAY DMNLST ( DMNSIZE(2), DMNSIZE(3), DMNSIZE(4) )
          OF FLOAT16;
```

COBOL Generate Source Text produces a single-dimensioned array to avoid difficulties with too many subscripts, but provides annotation for the multi-dimensioned array.

```
    *ADL THREE_DIMS: ARRAY DMNLST ( DMNSIZE(2), DMNSIZE(3), DMNSIZE(4) );
        15 THREE-DIMS COMP-1 OCCURS 24 TIMES.
```

Note that any annotation that specifies an ADL data type, such as that above, precedes the affected COBOL code.

2.2.1.5.5 Annotation for Complex numbers: If a PL does not support complex numbers, then it is necessary to store the real and imaginary parts of the complex number in separate variables. However, with ADL annotation, these variables can be described as a single complex number.

1. C Translate Declaration Space of the ADL for a complex number produces the following ADL:

```
DEFAULT FLOAT16 COMPLEX(FALSE) RADIX(2) LENGTH(32);

impedance : FLOAT16 LENGTH(64) COMPLEX(TRUE);
```

C Generate Source Text produces the following C source text from the above ADL:

```
struct double_complex
  {
    double real;
    double imaginary;
  } impedance /* ADL FLOAT16 COMPLEX(TRUE) */;
```

2. COBOL handles complex numbers in the same way as C. Given the following ADL, after a COBOL Translate Declaration Space,

```
DEFAULT BINARY BYTRVS(FALSE) COMPLEX(FALSE) CONSTRAINED(TRUE)
             RADIX(10) SCALE(0) SIGNED(TRUE);

D_06: BINARY COMPLEX(TRUE) LENGTH(16) PRECISION(4) SCALE(2);
```

COBOL Generate Source Text produces this COBOL output:

```
*ADL D_06: BINARY COMPLEX(TRUE) LENGTH(16) PRECISION(4) SCALE(2);
     15 D-06.
        20 REAL      PIC S99V99 COMP-4.
        20 IMAGINARY PIC S99V99 COMP-4.
```

2.2.1.5.6 Annotation for Varying Strings: For representation domains which do not support varying strings it is still useful to have a length field to provide the actual number of characters used out of a fixed character string. This can be done with annotation.

1. FORTRAN Translate Declaration Space of an ADL <CHARPRE> is:

```
DEFAULT BINARY BYTRVS(FALSE) COMPLEX(FALSE) CONSTRAINED(FALSE)
               RADIX(2) SCALE(0) SIGNED(TRUE) PRECISION(31);
DEFAULT CHAR CCSID(0) LENGTH(1) JUSTIFY(LEFT);

name_length : BINARY PRECISION(15);
name : CHAR MAXLEN(80) MAXALC(TRUE) LENGTH(name_length);
```

FORTRAN Generate Source Text produces the following FORTRAN declarations from this:

```
INTEGER*2 name_length
CHARACTER*80 name ! ADL LENGTH(name_length);
```

2. COBOL Translate Declaration Space will translate an ADL <CHARPRE> to an ADL <CHARPRE> with attributes appropriate to COBOL as shown below:

```
DEFAULT CHARPRE CCSID(0) MAXALC(TRUE) PREBYTRVS(FALSE)
                PRELEN(32) MAXLEN(1) CHARLEN(8);

D_11: CHARPRE MAXLEN(22);
```

COBOL Generate Source Text produces the following COBOL source:

```
*ADL D_11: CHARPRE CCSID(0) MAXLEN(22) PRELEN(32) MAXALC(TRUE);
     15 D-11.
        20 CHARLEN PIC 9(5) COMP-4.
        20 CHARSTR PIC X(22) DISPLAY.
```

3. In the CSP external source format, comments are restricted to the :PROL. section. The :RECDITEM. tags contain the structural information for the record. The :ITEM. tags contain the data type information for fields. Annotation specifies the starting and ending sequence numbers of the lines to which it applies in the :RECDITEM. section. CSP annotation requires that the external source format file have sequence numbers.

Unclassified

CSP Translate Declaration Space will translate an ADL <CHARPRE> to an ADL <CHARPRE> with MAXALC(TRUE). CSP Generate Source Text produces CSP external source format code depicting a sequence of a binary number for the prefix field, and a fixed-length character string. This is annotated with ADL <CHARPRE> so that Parse Source Text can produce a single ADL <CHARPRE> field for this sequence.

For example, CSP Translate Declaration Space of an ADL <CHARPRE> is to the following ADL:

```
DEFAULT CHARPRE CCSID(0) MAXALC(TRUE) PREBYTRVS(FALSE)
                PRELEN(32) MAXLEN(1) CHARLEN(8);

R_01: SEQUENCE BEGIN;
  D_11: CHARPRE MAXLEN(22);
END;
```

CSP Generate Source Text produces the following CSP external source format file:

```
:EZEE 330              12/20/90 12:44:35                                     00000100
:RECORD    NAME     = R_01                                                   00000200
           DATE     = '12/20/90'    TIME = '12:44:35'                        00000300
           ORG      = SERIAL                                                 00000400
           FILENAME = R_01                                                   00000500
           SCOPE    = GLOBAL                                                 00000600
:PROL.                                                                       00000700
ADL 00005700 00006300 D_11: CHARPRE CCSID(0) MAXLEN(22)                      00001600
    PRELEN(32) MAXALC(TRUE);                                                 00001700
:EPROL.                                                                      00002000
:RECDITEM  NAME     = D_11                                                   00005700
           LEVEL    = 04          OCCURS    = 00001                          00005800
           SCOPE    = GLOBAL                                                 00005900
:RECDITEM  NAME     = CHARLEN                                                00006000
           LEVEL    = 05          OCCURS    = 00001                          00006100
           SCOPE    = GLOBAL                                                 00006200
:RECDITEM  NAME     = CHARSTR                                                00006300
           LEVEL    = 05          OCCURS    = 00001                          00006400
           SCOPE    = GLOBAL                                                 00006500
:ITEM      NAME  = D_11                                                      00012200
           DATE  = '12/20/90'   TIME     = '12:44:35' TYPE     = HEX         00012300
           BYTES = 00026        DECIMALS = 00         EVENSQL  = N           00012400
:EITEM.                                                                      00012500
:ITEM      NAME  = CHARLEN                                                   00012600
           DATE  = '12/20/90'   TIME     = '12:44:35' TYPE     = BIN         00012700
           BYTES = 00004        DECIMALS = 00         EVENSQL  = N           00012800
:EITEM.                                                                      00012900
:ITEM      NAME  = CHARSTR                                                   00013000
           DATE  = '12/20/90'   TIME     = '12:44:35' TYPE     = CHA         00013100
           BYTES = 00022        DECIMALS = 00         EVENSQL  = N           00013200
:EITEM.                                                                      00013300
```

2.2.1.5.7 Required Annotations: Some information needed by ADL cannot be obtained from the PL source. This information must be provided by ADL annotations. For example, none of the SAA PLs include a means of distinguishing between alternative data declarations (except through program logic). <ADL CASE annotation> must be added to allow ADL conversion plans to distinguish between varying cases when performing data conversions.

1. The following PL/I declaration describes a dynamic array. However, there is no way to know the maximum size of the array because it is allocated by a variable that is not set until execution of the program. Therefore the maximum is provided in annotation.

```
DECLARE 1 DAILY_SALES BASED(P),
          2 NUMBER_OF_SALES FIXED BINARY(31,0),
          2 SALES_LIST ( ALLOCATION_SIZE REFER( NUMBER_OF_SALES ))
            /* ADL DMNLST( DMNMAX(1000) ); */ FIXED DECIMAL(6,0),
        ALLOCATION_SIZE FIXED BINARY(31,0);
```

PL/I Parse Source Text produces the following ADL. Note that the field ALLOCATION_SIZE is not part of the SEQUENCE named DAILY_SALES and is not included in the record.

```
DEFAULT BINARY BYTRVS(FALSE) COMPLEX(FALSE) CONSTRAINED(FALSE)
               RADIX(2) SCALE(0) SIGNED(TRUE) PRECISION(31);
DEFAULT PACKED COMPLEX(FALSE) CONSTRAINED(FALSE)
               SCALE(0) SGNLOC(DGTLSTBYT) SGNMNS(x'D')
               SGNPLS(x'C') PRECISION(15);

DAILY_SALES : SEQUENCE
BEGIN;
  NUMBER_OF_SALES : BINARY;
  SALES_LIST : ARRAY DMNLST( DMNHIGH( NUMBER_OF_SALES ) DMNMAX(1000))
    OF PACKED PRECISION(6);
END;
```

2. A COBOL programmer can declare a file record to have two possible descriptions, discriminated by the first field of the record. The COBOL source text must be annotated to indicate the discriminant field and the values to test to determine the correct description for a given record. If neither ADL <WHEN clause> evaluates to TRUE then a null record is returned.

```
      *ADL CASE MAXALC(FALSE) BEGIN;
      *ADL WHEN IOREC_1.DISC = "1" THEN
         01 IOREC-1.
            02 DISC PIC X DISPLAY.
            02 VARIANT-1 PIC 9 COMP_4.
            02 VARIANT-2 PIC S9(4) DISPLAY.
            02 EOR PIC XXX DISPLAY.
      *ADL WHEN IOREC_2.DISC = "2" THEN
         01 IOREC-2.
            02 DISC PIC X DISPLAY.
            02 VARIANT-1.
               03 FLT COMP-2.
               03 BIN PIC 9(5)V9(4) COMP-4.
            02 VARIANT-2 PIC S9(8) DISPLAY.
            02 EOR PIC XXX DISPLAY.
      *ADL END;
```

COBOL Parse Source Text produces the following ADL:

Unclassified

```
DEFAULT BINARY BYTRVS(FALSE) COMPLEX(FALSE) CONSTRAINED(TRUE)
               RADIX(10) SCALE(0) SIGNED(TRUE);
DEFAULT CASE MAXALC(TRUE) CCSID(0);
DEFAULT CHAR CCSID(0) JUSTIFY(LEFT);
DEFAULT FLOAT16 COMPLEX(FALSE) RADIX(2) LENGTH(32);
DEFAULT SEQUENCE CCSID(0);
DEFAULT ZONED COMPLEX(FALSE) ZONENC(x'F')
              CONSTRAINED(TRUE) SCALE(0) SGNLOC(ZONLSTBYT)
              SGNMNS(x'D') SGNPLS(x'C') SIGNED(TRUE);

CASE MAXALC(FALSE)
  BEGIN;
    WHEN IOREC_1.DISC = "1" THEN
    IOREC_1: SEQUENCE
      BEGIN;
        DISC: CHAR LENGTH(1);
        VARIANT_1: BINARY PRECISION(1) LENGTH(16) SIGNED(FALSE);
        VARIANT_2: ZONED PRECISION(4);
        EOR: CHAR LENGTH(3);
      END;
    WHEN IOREC_2.DISC = "2" THEN
    IOREC_2: SEQUENCE
      BEGIN;
        DISC: CHAR LENGTH(1);
        VARIANT_1: SEQUENCE
          BEGIN;
            FLT: FLOAT16 PRECISION(56) LENGTH(64);
            BIN: BINARY PRECISION(9) LENGTH(32) SIGNED(FALSE) SCALE(4);
          END;
        VARIANT_2: ZONED PRECISION(8);
        EOR: CHAR LENGTH(3);
      END;
  END;
```

2.2.1.5.8 Conversion Control Annotations: Conversion control annotation alters the conversions performed but otherwise does not change the representation of the field as understood by the PL application. Examples are the ADL <CONSTRAINED attribute> which provides control over error checking for values which exceed the maximum for the field, the ADL <FIT attribute> which selects rounding or truncation for least significant digits, and the ADL <CCSID attribute> which controls the character encoding used for character conversions.

1. FORTRAN integer fields are normally parsed to an ADL <BINARY> with CONSTRAINED(FALSE). Values exceeding the maximum for the field are simply truncated to fit. However, as a debug aid, the user can add CONSTRAINED(TRUE) annotation to cause an exception to be raised if a value too large for this field is assigned during conversion.

```
integer*2  count  !ADL CONSTRAINED(TRUE);
```

FORTRAN Parse Source Text produces the following ADL:

```
DEFAULT BINARY BYTRVS(FALSE) COMPLEX(FALSE) CONSTRAINED(FALSE)
               RADIX(2) SCALE(0) SIGNED(TRUE) PRECISION(31);

count : BINARY PRECISION(15) CONSTRAINED(TRUE);
```

2. A COBOL GRAPHICS string can only contain DBCS characters. If annotated with a non-zero CCSID, the CCSID must be a DBCS CCSID. If not annotated, then the higher level CCSID in the CCSID hierarchy should be DBCS, however this cannot be validated by declaration translators. For example,

```
     15 GRAPHICS PIC G(20) DISPLAY-1;
*ADL CCSID(926);
*CCSID(926) is Korean PC Data DBCS
```

COBOL Parse Source Text produces:

```
DEFAULT CHAR CCSID(0) LENGTH(1) JUSTIFY(LEFT);

GRAPHICS: CHAR LENGTH(40) CCSID(926);
```

2.2.1.5.9 PL OPTIONS annotations: The options, pragmas, or other compiler directives used by the application are required in order to correctly parse the PL source text and produce the correct representation descriptions. The options can be specified when the PL Parse Source Text is called, or can be placed in the PL source text by using <PL OPTIONS annotation>.

1. The following shows <PL OPTIONS annotation> for C. This specifies that the file has fixed length records and only the source text between columns 1 and 72 should be parsed. Columns 73 to 80 contain sequence numbers and are ignored.

```
/* ADL OPTIONS ( MARGINS(1,72), SEQUENCE(73,80) ); */
```

2. This FORTRAN <PL OPTIONS annotation> sets the maximum string length to 2000 characters. The source text is in free format and may contain double-byte characters.

```
!ADL OPTIONS ( CHARLEN(2000), DBCS, FREE );
```

2.2.1.5.10 ADL LIST Annotations: For those languages that allow data to be exported by reference to independent variables, <LIST annotation> can be specified to define the total list of data items exported. In particular, this capability models the C, FORTRAN, and RPG styles of data declaration and file I.O.

For an extended example of < LIST annotation > see 2.8, "Extended List Annotation Example" on page 72.

2.3 <LIST statement>

The < LIST statement > appears only in ADL annotation for those PL declaration translators which support the < LIST statement >.

2.3.1.1 Function

Declare an instance of the LIST type, an ordered collection of fields defined by referring to other data declaration statements.

The < LIST statement > is an aid to writing ADL annotation for the description of records produced by FORTRAN unformatted I/O, C binary stream I/O, and RPG. It helps to minimize the amount of annotation which much be written for languages which do not have explicit SEQUENCES or nested SEQUENCES such as FORTRAN and RPG.

The < LIST statement > is source level construct which appears only in < ADL annotation >. It is not encoded in the ADLDCLSPC.

2.3.1.2 Format

```
<LIST statement> ::=
      [<unqualified identifier annotation> :]
      <LIST element>
      ADL<terminator>

   <LIST element> ::=
      {
          <implied ARRAY>
        | <implied CASE>
        | <implied SEQUENCE>
        | <implied SUBSTR>
      }
```

2.3.1.3 Syntax Rules

1. All < qualified identifier annotation > at the same nesting level in a < LIST element > must be unique.

2.3.1.4 General Rules

1. < LIST statement > is parsed to the equivalent ADL type as follows:

```
<implied ARRAY>    is parsed to ADL<ARRAY>
<implied CASE>     is parsed to ADL<CASE>
<implied SEQUENCE> is parsed to ADL<SEQUENCE>
<implied SUBSTR>   is parsed to ADL<CHAR>
```

2. If a declaration translator is generating a < LIST statement >, the ADL type is generated to < LIST element > as follows:

```
ADL<ARRAY>    is generated to <implied ARRAY>
ADL<CASE>     is generated to <implied CASE>
ADL<SEQUENCE> is generated to <implied SEQUENCE>
ADL<SUBSTR>   is generated to <implied CHAR>
```

2.3.1.5 Examples

1. See the following chapters on 2.4, "<implied ARRAY>" on page 56, 2.6, "<implied SEQUENCE>" on page 69, 2.5, "<implied CASE>" on page 67, 2.7, "<implied SUBSTR>" on page 71, 2.8, "Extended List Annotation Example" on page 72.

2.4 <implied ARRAY>

2.4.1.1 Function

Describe an ARRAY in a <LIST statement> by specifying the range of its subscripts in each of its dimensions.

2.4.1.2 Format

```
<implied ARRAY> ::=
      IARRAY
      [ADL<ARRAY optional attributes list>]
      <implied DMNLST> OF
      {
         ADL<qualified identifier> ADL<subscript list>
       | <implied CASE>
       | <implied SEQUENCE>
      }

   <implied DMNLST> ::=
      (
        <implied dimension>
        [,<implied dimension>]...
      )

   <implied dimension> ::=
      <initial value>
      TO <final value>
      [BY <increment value>]

   <initial value> ::=
      ADL<signed integer>
    | ADL<constant identifier>
    | ADL<qualified identifier>

   <final value> ::=
    {
        ADL<signed integer>
      | ADL<constant identifier>
      | ADL<qualified identifier>
    }
    [ - 1 ]

   <increment value> ::=
      ADL<signed integer>
    | ADL<constant identifier>

   <PL high bound> ::= ADL<signed integer>

   <PL low bound> ::= ADL<signed integer>
```

```
<PL array size> ::= ADL<signed integer>
```

2.4.1.3 Syntax Rules

1. If an ADL <qualified identifier> is specified, it shall reference a PL array declaration or a subtype instance of an PL array. The number of <implied dimension>s shall equal the number of ADL <dimension>s in the referenced PL array.
2. If <final value> - 1 is specified and <final value> is an ADL <qualified identifier>, then <initial value> shall be an ADL <signed integer> or an ADL <constant identifier>.
3. If <final value> is an ADL <qualified identifier>, then <increment value> shall equal 1.
4. If <final value> is an ADL <qualified identifier>, then the referenced array declaration shall be declared with constant bounds or constant size.
5. <PL high bound>, <PL low bound>, and <PL array size> are the values of these PL attributes obtained from the PL array declaration referenced by the <implied ARRAY> for each dimension.
6. If an <implied SEQUENCE> or <implied CASE> is specified, every member of the <implied SEQUENCE> or <implied CASE> shall reference an ADL <data declaration statement> of a PL array with the same number of ADL <dimension>s as there are <implied dimension>s in the <implied ARRAY>.
7. The number of elements in an <implied dimension> shall be less than or equal to the number of elements in the corresponding ADL <dimension> of each referenced PL array.
8. If an <implied CASE> is specified, all discriminants of the <implied CASE> shall appear outside the <implied ARRAY>. The elements of an <implied ARRAY> can vary in structure, but they cannot be self-discriminating.
9. The subscripts for the array are implied. They would be written in the same order as the dimensions are declared. That is, the first dimension defines the range of values for the first implied subscript, the second dimension defines the range of values for the second implied subscript, etc..
10. ADL <subscript list> must not contain any subscripts. This is simply used to indicate that the identifier is that of an array.
11. If <initial value> and/or <final value> is an ADL <qualified identifier>, then the <increment value> shall be 1.

2.4.1.4 General Rules

1. An <implied ARRAY> shall be considered equivalent to an ADL <ARRAY> whose number of dimensions is equal to the number of <implied dimension>s specified.
2. For each <implied dimension> specified, the equivalent ADL <ARRAY>, ADL <DMNLOW attribute> is specified by <initial value> and the ADL <DMNHIGH attribute>, ADL <DMNSIZE attribute>, and ADL <DMNMAX> is determined by Unclassified

```
select
when <final value> - 1 is specified
and  <final value> is not an ADL<qualified identifier>
then
  DMNSIZE = CEIL( ( <final value> - <initial value> )
            / <increment value> )

when <final value> - 1 is specified
and  <final value> is an  ADL<qualified identifier>
then
  DMNSIZE = ADL<qualified identifier>
  DMNMAX  = <PL array size>

when <final value> is specified
and  <final value> is not an ADL<qualified identifier>
then
  DMNHIGH = FLOOR( ( <final value> - <initial value> )
            / <increment value> ) + <initial value>

when <final value> is specified
and  <final value> is an ADL<qualified identifier>
then
  DMNHIGH = ADL<qualified identifier>
  DMNMAX  = <PL high bound> - <PL low bound> + 1
end select
```

3. The <increment value> shall default to 1 if not specified.
4. The elements of the array in the list shall each be byte aligned.
5. The elements of an <implied ARRAY> are mapped to storage such that the right most <implied dimension> varies the fastest.

Note: Because <implied ARRAY> and ADL<ARRAY> are mapped to storage such that the rightmost dimension varies the fastest, FORTRAN must reverse the order of dimensions in FORTRAN array declarations referenced from the <LIST statement> in Parse Source Text and Generate Source Text.

2.4.1.5 Special FORTRAN Considerations

ADL and most other high level languages store arrays such that when indexing through the array elements from low memory to high, the rightmost dimension varies the fastest. For a two dimensional array this is called row major order. FORTRAN stores its arrays such that when indexing through the array elements from low memory to high, the leftmost dimension varies the fastest. For a two dimensional array this is called column major order. This requires some special actions for both the FORTRAN declaration translator and FORTRAN programmer.

The following figure shows a FORTRAN array in a base file being accessed by a C view file.

1. The FORTRAN application which created the base file contains the following FORTRAN record description:

```
! ADL A: IARRAY (1 TO 2, 1 TO 4) OF A;
INTEGER*4 A(4,2)
```

Note that the programmer writing the ADL annotation must reverse the order of the dimensions from those in the FORTRAN declaration. This accounts for the difference in how ADL and FORTRAN describe arrays.

2. In Figure 2 on page 61, 1 shows the FORTRAN programmer's logical view of his array as a matrix of four rows by two columns.
3. In Figure 2 on page 61, 2 shows how the FORTRAN compiler represents the array as a linear sequence of elements in memory. The compiler allocates all of column one followed by all of column two.
4. In Figure 2 on page 61, 3 represents the the I/O to create and access the file. This also shows the assignment between the elements of the FORTRAN array and the C array as a result of the C application's read or write of its view file.
5. FORTRAN can write this array by a simple write statement. The array is stored in the file unchanged from its representation in the program. Item 2 shows both the representation of the array in memory and in a record in the base file.

```
WRITE(unit=10) A
```

6. The C application programmer uses the C declaration translator to translate the FORTRAN data description to C and then generate C source text. This describes C's view of the FORTRAN file.

```
! ADL A: IARRAY (0 TO 1, 0 TO 3) OF A;
long int A[2][4];
```

Note that the FORTRAN and C ADL descriptions are essentially the same. Both describe an array with two elements in the first dimension and four elements in the second dimension. In other words, a matrix of two rows by four columns. This is the programmer's logical view of the array as shown in Figure 2 on page 61, 5.

7. The C compiler represents this array in memory as a linear sequence of elements, as shown in Figure 2 on page 61, 4. The compiler allocates all of row one followed by all of row two.
8. For a file opened binary, type = record, there is no change in representation of the array on a read from the view file record to program memory or a write from program memory to a view file record. Therefore, 4 shows the array's representation in memory and in the view file.
9. The C application can read or write the array with the following statements (demo is the name of the file):

```
fread(X, sizeof(X), 1, *demo);
fwrite(X, sizeof(X), 1,*demo);
```

10. It is important to note that the main difference between the FORTRAN record and C record is that the dimensions are reversed. SeeFigure 2 on page 61 , 3 for the pairing of the FORTRAN elements to the C elements.

This is also the main difference in the two programmer's logical views of the array. In FORTRAN the array is considered to be a matrix of four rows by two columns. In C the array is considered to be a matrix of two rows by four columns, which is the reverse in order of dimensions of the FORTRAN logical view.

11. If instead, the base file had been described by the C data description, then when the FORTRAN declaration translator did the translate and generate to C to FORTRAN, the FORTRAN array declaration must be generated with dimensions reversed from the ADL for the array.

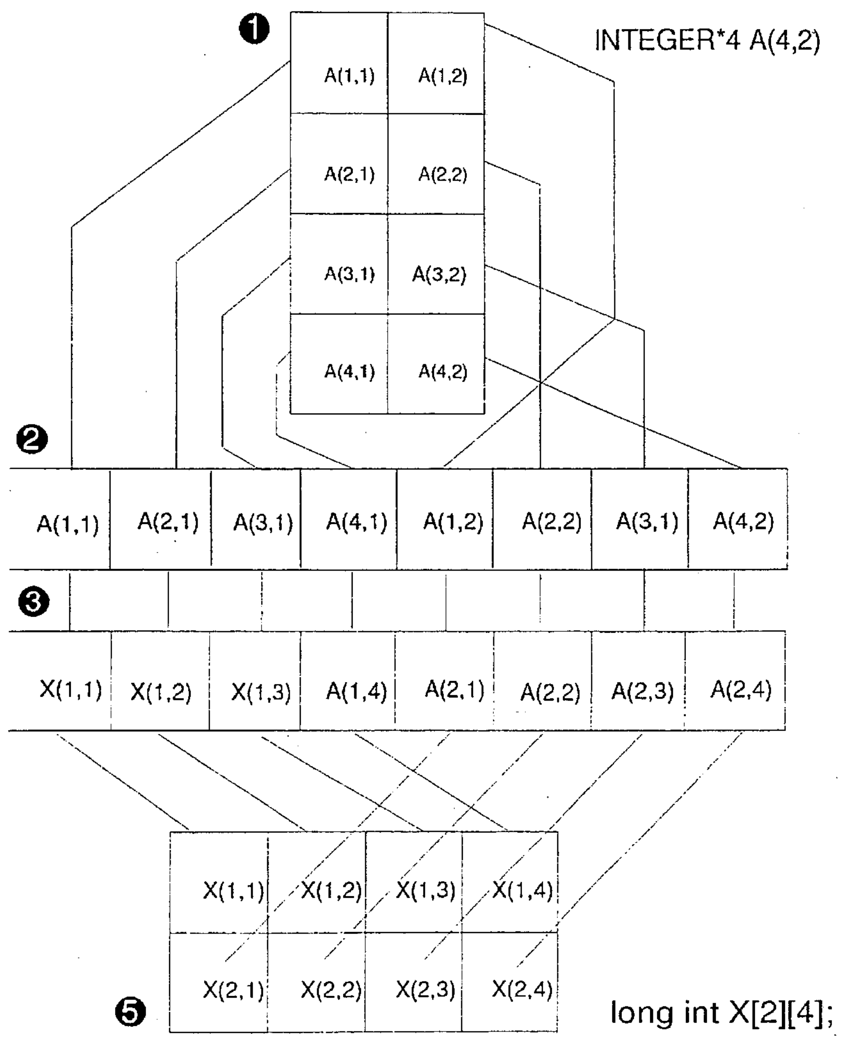
Figure 2. FORTRAN to C Array Mapping

2.4.1.6 Examples

1. Given the following FORTRAN declarations,

```
! ADL x: IARRAY ( 1 TO 5 BY 2 ) OF A();

INTEGER*4 A(5)
```

the declaration of x is equivalent to the ADL declaration

```
x: ARRAY DMNLST( DMNHIGH(3) ) OF BINARY ...;
```

2. Given the following FORTRAN declarations,

```
! ADL x: IARRAY ( 500 TO 1000 BY 5, 1 TO 5 BY 2) OF A();

INTEGER*2 A(1:5,500:1000)
```

the declaration of x is equivalent to the ADL declaration

```
x: ARRAY DMNLST( DMNLOW(500) DMNHIGH(600), DMNHIGH(3) )
   OF BINARY...;
```

3. Given the following C declarations of an array x of a sequence containing an array y and a simple field b:

```
struct
{
  int y[4];
  char b;
} x[5];
```

The programmer's logical view of is shown below.

| | | | | | |
|---|---|---|---|---|---|
| x[0] | y[0] | y[1] | y[2] | y[3] | b |
| x[1] | y[0] | y[1] | y[2] | y[3] | b |
| x[2] | y[0] | y[1] | y[2] | y[3] | b |
| x[3] | y[0] | y[1] | y[2] | y[3] | b |
| x[4] | y[0] | y[1] | y[2] | y[3] | b |

Figure 3. Logical View of C Array of Sequence

This is mapped to storage by the C compiler as a linear sequence of fields as shown below. This is also the representation of x when written to a file record by the C application.

Unclassified

Offset (bytes)

| Address | 0 | 4 | 8 | 12 | 16 | 17 19 |
|---|---|---|---|---|---|---|
| BASE + 0 | x.y[0][0] | x.y[0][1] | x.y[0][2] | x.y[0][3] | x.b[0] | 3 bytes Padding |
| BASE + 20 | x.y[1][0] | x.y[1][1] | x.y[1][2] | x.y[1][3] | x.b[1] | 3 bytes Padding |
| BASE + 40 | x.y[2][0] | x.y[2][1] | x.y[2][2] | x.y[2][3] | x.b[2] | 3 bytes Padding |
| BASE + 60 | x.y[3][0] | x.y[3][1] | x.y[3][2] | x.y[3][3] | x.b[3] | 3 bytes Padding |
| BASE + 80 | x.y[4][0] | x.y[4][1] | x.y[4][2] | x.y[4][3] | x.b[4] | 3 bytes Padding |

Figure 4. Memory Mapping of C Array of Sequence

The C declaration of x is equivalent to the ADL declaration

```
x: ARRAY DMNLOW(0) DMNLST ( DMNSIZE(5) ) OF SEQUENCE
BEGIN;
  y: ARRAY DMNLOW(0) DMNLST ( DMNSIZE(4) ) OF BINARY...;
  b: CHAR LENGTH(1);
END;
```

The ADLDCLSPC for the preceding is translated by the FORTRAN declaration translator into an ADLDCLSPC equivalent to the following ADL

```
x: ARRAY DMNLOW(1) DMNLST ( DMNHIGH(5) ) OF SEQUENCE
BEGIN;
  y: ARRAY DMNLOW(1) DMNLST ( DMNHIGH(4) ) OF BINARY...;
  b: CHAR LENGTH(1);
END;
```

The FORTRAN declaration translator generates from this FORTRAN declarations,

```
! ADL x: IARRAY ( 1 TO 5 ) OF
! ADL    ISEQ ( y: IARRAY ( 1 TO 4 ) OF a(), b );

INTEGER*4 a(4,5)
CHARACTER*1 b(5)
```

The representation of the record described by LIST statement x or its equivalent ADL is shown in Figure 4 on page 64. In this example, the only difference between the two representation domains is in array indexing.

However, the FORTRAN programmer's logical view of the data in memory is different from that of the data in a file record, as shown below:

| | | | | |
|---|---|---|---|---|
| a(1,1) | a(1,2) | a(1,3) | a(1,4) | a(1,5) |
| a(2,1) | a(2,2) | a(2,3) | a(2,4) | a(2,5) |
| a(3,1) | a(3,2) | a(3,3) | a(3,4) | a(3,5) |
| a(4,1) | a(4,2) | a(4,3) | a(4,4) | a(4,5) |

| | | | | |
|---|---|---|---|---|
| b(1) | b(2) | b(3) | b(4) | b(5) |

Figure 5. Logical View of FORTRAN Declarations

FORTRAN must work with the data as independant arrays because FORTRAN it does not have a SEQUENCE data type. It is up to the FORTRAN programmer to write the I/O statements required to move the data between his FORTRAN types and the view file record. However, the LIST statement helps guide the creation of these I/O statements.

A FORTRAN programmer could import this data into the variables A and B by the following FORTRAN READ statement:

Unclassified

```
read(unit=10) ((a(j,i), j=1,4), b(i), i=1,5)
```

A FORTRAN programmer could export this data from the variables A and B by the following FORTRAN WRITE statement:

```
write(unit=10) ((a(j,i), j=1,4), b(i), i=1,5)
```

The FORTRAN variable a and b will be mapped to in the program's memory as:

```
a(1,1) a(2,1) a(3,1) a(4,1)  <- column 1
a(1,2) a(2,2) a(3,2) a(4,2)  <- column 2
a(1,3) a(2,3) a(3,3) a(4,3)  <- column 3
a(1,4) a(2,4) a(3,4) a(4,4)  <- column 4
a(1,5) a(2,5) a(3,5) a(4,5)  <- column 5
b(1)   b(2)   b(3)   a(4)   b(5)
```

The elements of FORTRAN's array's in memory and the elements of the view file record described by the ADL list statement are paired as follows:

```
x.y(1,1) x.y(1,2) x.y(1,3) x.y(1,4) x.b(1)  <- row 1
a(1,1)   a(2,1)   a(3,1)   a(4,1)   b(1)    <- column 1

x.y(2,1) x.y(2,2) x.y(2,3) x.y(2,4) x.b(2)  <- row 2
a(1,2)   a(2,2)   a(3,2)   a(4,2)   b(2)    <- column 2

x.y(3,1) x.y(3,2) x.y(3,3) x.y(3,4) x.b(3)  <- row 3
a(1,3)   a(2,3)   a(3,3)   a(4,3)   b(3)    <- column 3

x.y(4,1) x.y(4,2) x.y(4,3) x.y(4,4) x.b(4)  <- row 4
a(1,4)   a(2,4)   a(3,4)   a(4,4)   b(4)    <- column 4

x.y(5,1) x.y(5,2) x.y(5,3) x.y(5,4) x.b(5)  <- row 5
a(1,5)   a(2,5)   a(3,5)   a(4,5)   b(5)    <- column 5
```

In general x.y(i,j) = a(j,i) and x.b(i) = b(i).

4. Given the following C declarations,

```
/* ADL x: ISEQ (s, y: IARRAY (0 TO s-1 BY 1) OF y()); */

int s;
float y[100];
```

the declaration of x is equivalent to the ADL declaration

```
x : SEQUENCE
BEGIN;
  s: BINARY PRECISION(31) SIGNED(TRUE) BYTRVS(FALSE) SCALE(0);
  y: ARRAY DMNLST( DMNLOW(0) DMNSIZE(s) DMNMAX(100) )
    OF FLOAT16 LENGTH(32) BYTRVS(FALSE);
END;
```

2.5 <implied CASE>

2.5.1.1 Function

Describe alternative segments of a list in terms of the conditions under which each alternative is selected.

2.5.1.2 Format

```
<implied CASE> ::=
      ICASE
      [ADL<CASE optional attributes list>]
       (
         <implied WHEN list>
         [,<implied OTHERWISE>]
       )

   <implied WHEN list> ::=
      <implied WHEN>
      [, <implied WHEN>]...

   <implied WHEN> ::=
      [<unqualified identifier annotation>:]
       (
         ADL<condition> THEN
         <implied CASE element>
       )

   <implied OTHERWISE> ::=
      OTHERWISE <implied CASE element>

   <implied CASE element>
          ADL<qualified identifier>
        | SKIP(ADL<positive integer>)
        | REJECT
        | { [<unqualified identifier annotation>:] <LIST element> }
```

2.5.1.3 Syntax Rules

1. The maximum length of an <implied CASE> shall be (2**34)-8 bits.

2.5.1.4 General Rules

1. An <implied CASE> is equivalent to an ADL<CASE> with MAXALC(FALSE) specified.
2. The ADL<condition>s of the <implied WHEN>s shall be evaluated in the order specified until the evaluation of one of them returns TRUE. The <implied CASE element> associated with that selection describes the data, and all subsequent <implied WHEN>s in the <implied CASE> are ignored. If no <implied WHEN> evaluates to TRUE, the <implied OTHERWISE> shall be selected and its <implied CASE element> shall describe the data.

3. If an ADL <qualified identifier> is specified as a <implied CASE element>, the value of the corresponding data item in the list shall be represented as specified by the named ADL <data declaration statement>.
4. If an array is identified by an ADL <qualified identifier> <implied CASE element>, then the corresponding data item in the list shall include all elements of the array such that the internal alignment of its elements is preserved. The array shall NOT be decomposed into a list of individual elements.
5. If a sequence is identified by an ADL <qualified identifier> <implied CASE element>, then the corresponding data item in the list shall include all elements of the sequence such that the internal alignment of its elements is preserved. The sequence shall NOT be decomposed into a list of individual elements.
6. If an SKIP is specified, the specified number of bits shall be skipped in the data.

2.5.1.5 Examples

1. In the following C declarations

```
/* ADL
  x: ISEQ ( a, y: ICASE ( w1:(a=1 THEN b),
                          w2:(a=2 THEN-ISEQ (c, d)),
                          OTHERWISE e ),
             f);
*/

int a;
char b;
float c;
double d;
int e;
char f;
```

the value of a is used as a discriminator in the list to determine whether a is followed by b or by c and d. e is selected if a equals neither 1 nor 2.

The declaration of x is equivalent to the ADL declaration

```
x: SEQUENCE
BEGIN;
  a: BINARY...;
  y: CASE MAXALC(FALSE)
  BEGIN;
    w1: WHEN a=1 THEN b: CHAR...;
    w2: WHEN a=2 THEN
      SEQUENCE
      BEGIN;
        c: FLOAT2...;
        d: FLOAT2...;
      END;
    OTHERWISE e: BINARY...;
  END;
  f: CHAR...;
END;
```

Unclassified

2.6 <implied SEQUENCE>

2.6.1.1 Function

Describe the elements of a list by specifying the names of the ADL <data declaration statement>s that correspond to the elements.

2.6.1.2 Format

```
<implied SEQUENCE> ::=
     ISEQ
     [ADL<SEQUENCE optional attributes list>]
     (
       <implied SEQUENCE element>
       [, <implied SEQUENCE element>]...
     )

   <implied SEQUENCE element> ::=
          ADL<qualified identifier>
        | SKIP(ADL<positive integer>)
        | {[<unqualified identifier annotation>:] <LIST element>}
```

2.6.1.3 Syntax Rules

1. None.

2.6.1.4 General Rules

1. An <implied SEQUENCE> shall be considered equivalent to an ADL<SEQUENCE>.
2. The <implied SEQUENCE element>s of the <implied SEQUENCE> shall each be byte aligned.
3. If an ADL<qualified identifier> is specified as an <implied SEQUENCE element>, the value of the corresponding data item in the list shall be represented as specified by the named ADL<data declaration statement>.
4. If an array is identified by an ADL<qualified identifier> <implied SEQUENCE element>, then the corresponding data item in the list shall include all elements of the array such that the internal alignment of its elements is preserved. The array shall NOT be decomposed into a list of individual elements.
5. If a sequence is identified by an ADL<qualified identifier> <implied SEQUENCE element>, then the corresponding data item in the list shall include all elements of the sequence such that the internal alignment of its elements is preserved. The sequence shall NOT be decomposed into a list of individual elements.
6. If SKIP is specified, the specified number of bits shall be skipped in the data described by the <implied SEQUENCE> before the next element in the <implied SEQUENCE>.

2.6.1.5 Examples

1. Given the following C declarations

```
/* ADL x: ISEQ ( a, b, d, c); */

int a;
char b;
float c;
int d;
```

The declaration of x is equivalent to the ADL declaration

```
x: SEQUENCE
BEGIN;
  a: BINARY...;
  b: CHAR...;
  d: BINARY...;
  c: FLOAT2...;
END;
```

2. Given the following FORTRAN declarations

```
! ADL x: ISEQ TITLE('Implied Sequence')
! ADL    ( a,
! ADL      y: ISEQ TITLE('Nested Implied Sequence')
! ADL         ( a, c ),
! ADL      c );

INTEGER*2 a
CHARACTER*8 y_a ! ADL y.a :;
REAL*4 c
LOGICAL*1 y_c   ! ADL y.c :;
```

The declaration of x is equivalent to the ADL declaration

```
x: SEQUENCE
  TITLE('Implied Sequence')
BEGIN;
  a: BINARY...;
  y: SEQUENCE
    TITLE('Nested Implied Sequence')
  BEGIN;
    a: CHAR...;
    c: BOOLEAN...;
  END;
  c: FLOAT2...;
END;
```

Unclassified

2.7 <implied SUBSTR>

2.7.1.1 Function

Describe a character string in a <LIST statement> as a substring of a character string ADL<data declaration statement>. The substring is specified by starting and ending character positions, which define the length of the string in the LIST. Both starting and ending positions may be reference fields.

2.7.1.2 Format

```
<implied SUBSTR> ::=
      ISUBSTR [ADL<CHAR optional attributes list>]
      (
        ADL<qualified identifier>,
        [<starting position>]..
        [<ending position>]
      )

   <starting position> ::=
        ADL<positive integer>
      | ADL<constant identifier>
      | ADL<qualified identifier>

   <ending position> ::=
        ADL<positive integer>
      | ADL<constant identifier>
      | ADL<qualified identifier>
```

2.7.1.3 Syntax Rules

1. The ADL<qualified identifier> specified shall be that of a PL field which maps to an ADL<CHAR>, ADL<CHARPRE>, or ADL<CHARSFX>.
2. The <starting position> specified indicates the character position of the start of the substring within the character string.
3. The <ending position> specified indicates the character position of the end of the substring within the character string.
4. The first character of the string is at character position 1.
5. The actual length as given by <ending position> - <starting position> + 1 shall be less than or equal to the declared length of the string referenced by ADL<qualified identifier>.
6. <starting position> shall be less than or equal to <ending position>.
7. The value of <starting position> and <ending position> shall both be greater than zero.
8. If <starting position> is not specified, it defaults to one.
9. If <ending position> is not specified, it defaults to the declared size of the data portion of the character string referenced by ADL<qualified identifier>.

10. If <starting position> or <ending position> are specified as ADL <qualified identifier>, the referenced field shall come before this <implied SUBSTR> in the <LIST statement>.

2.7.1.4 General Rules

1. The <implied SUBSTR> is equivalent to an ADL <CHAR>.
2. The actual length of the string is

```
<ending position> - <starting position> + 1
```

2.7.1.5 Examples

1. Given the following FORTRAN declarations:

```
! ADL ISEQ (M, N,
! ADL       AMN:ISUBSTR(A, M..N),
! ADL       B1:ISUBSTR(B, ..NCHAR),
! ADL       B2:ISUBSTR(B, 26..));

PARAMETER NCHAR=25
INTEGER*4 M
INTEGER*4 N
CHARACTER*50 A
CHARACTER*50 B
```

The equivalent ADL declaration is:

```
DEFAULT BINARY BYTRVS(FALSE) COMPLEX(FALSE) CONSTRAINED(FALSE)
               RADIX(2) SCALE(0) SIGNED(TRUE) PRECISION(31);
DEFAULT CHAR CCSID(0) LENGTH(1) JUSTIFY(LEFT);
NCHAR : 25;

SEQUENCE
BEGIN;
  M : BINARY;
  N : BINARY;
  AMN : CHAR LOW(M) HIGH(N) MAXLEN(50) MAXALC(FALSE);
  B1 : CHAR LENGTH(NCHAR);
  B2 : CHAR LENGTH(25);
END;
```

2.8 Extended List Annotation Example

1. A C program can read and write a record a field at a time. This gives the C program great flexibility in the types of records it can read, more so than with record I/O. However, the trade-off for this flexibility is more complex program logic for I/O. For example, the following is the ADL description produced by C Translate Declaration Space from the ADL for a record written by FORTRAN.

Unclassified

```
DEFAULT ARRAY DMNLOW(0);
DEFAULT BINARY BYTRVS(FALSE) COMPLEX(FALSE) CONSTRAINED(FALSE)
               RADIX(2) SCALE(0) SIGNED(TRUE) PRECISION(31);
DEFAULT CHAR CCSID(0) LENGTH(1) JUSTIFY(LEFT);

x : SEQUENCE
  NOTE('SEQUENCE for LIST Model I/O, C/370 domain')
BEGIN;
  M : BINARY;
  UserName : CHAR LOW(1) HIGH(M) MAXLEN(80) MAXALC(FALSE);
  S1 : BINARY;
  S2 : BINARY;
  SystemUserids : ARRAY DMNLST( DMNSIZE(S1) DMNMAX(5),
                                DMNSIZE(S2) DMNMAX(10) )
                MAXALC(FALSE)
    OF BINARY LENGTH(16) SIGNED(FALSE);
END;
```

C Generate Source Text produces the following C source text from the preceding ADL if LIST model I/O is requested:

```
/* ADL
   x: ISEQ NOTE('SEQUENCE for LIST Model I/O, C/370 domain')
         ( M, UserName: ISUBSTR (UserName,1..M), S1, S2,
           SystemUserids: IARRAY (0 TO S1-1, 0 TO S2-1)
             OF SystemUserids);
*/

signed long int M;
char UserName[80];
signed long int S1;
signed long int S2;
unsigned short int SystemUserids[5][10];
```

A C programmer can write the following C code fragment to read this record:

```
/* The file pointer is *sample.  The fread parameters are              */
/* <address to read into>,<bytes to read>,<repeat factor>,<file pointer> */

/* Read M. Then read the M characters into the string.                 */
rc = fread(&M, sizeof(M), 1, *sample);
rc = fread(UserName, M, 1, *sample);

/* Read S1, S2 and then the elements of the array, where each element is */
/* two bytes long and there are S1*S2 elements.  The result in memory    */
/* is that array SystemUserids is a MAXALC(TRUE) dynamic array.          */
rc = fread(&S1 ,sizeof(S1), 1, *sample);
rc = fread(&S2, sizeof(S2) ,1 ,*sample);

for (i = 0; i <= S1-1; ++i) /* DO i=0 TO S1-1 BY 1 */
  for (j = 0; j <= S2-1; ++j) /* DO j=0 TO S2-1 BY 1 */
    rc = fread(SystemUserids[i][j], sizeof(short), 1, *sample);
```

Part 2. C Declaration Translator

Chapter 3. Introduction . . . . . . . . . . . . . . . . . . . . . . . . . . . . . . . . 76

Chapter 4. C Declaration Translator Restrictions . . . . . . . . . . . . . . . . . 77
4.1 General Restrictions . . . . . . . . . . . . . . . . . . . . . . . . . . . . . . . . 77
4.2 Input / Output Restrictions . . . . . . . . . . . . . . . . . . . . . . . . . . . 77

Chapter 3. Introduction

The following declaration translator specification applies to SAA C as implemented by Version 2, Release 1 of the IBM C/370 Compiler, IBM C Set/2 Version 1.0, and to all subsequent releases and modifications until otherwise indicated in new editions. The following publications were used as a source for most of these specifications. Other information was obtained from the product developers, language experts, and test programs.

Reference Publications:

1. *SAA Common Programming Interface C Reference - Level 2*, SC09-1308-1
2. *IBM C/370 Version 1, Release 2 User's Guide*, SC09-1264-03
3. *IBM C/370 Version 2, Release 1, Programming Guide*, SC09-1384-00
4. *IBM C Set/2 User's Guide, Release 1.0*, SC09-1310-00.
5. *Portability Guide for IBM C*, SC09-1405-00.

See the latest available editions of the IBM C/370 publications for the list of operating systems on which this product is implemented.

See the latest available editions of the IBM C Set/2 publications for the list of operating systems on which this product is implemented.

Note: In declaration translator messages throughout the following chapters, &1, &2, &n refer to variables which will be filled in by the declaration translator.

VM SP, VM/XA SP, MVS/XA, MVS/ESA, and Systems Applications Architecture are trademarks of the International Business Machines Corporation.

Chapter 4. C Declaration Translator Restrictions

4.1 General Restrictions

1. All mappings are in terms of the C source statements after processing of preprocessor statements.
2. The declaration translators do not perform preprocessing. Source input must not include preprocessor statements, except for the #include directive and certain pragmas.

It is the user's responsibility to use the C compiler to preprocess the source, if it contains preprocessor directives, before submitting it to the C declaration translator.

4.2 Input / Output Restrictions

4.2.1 Record I/O

1. Supported for Parse Source Text, Translate Declaration Space, and Generate Source Text.

System/370 Only 2. fopen must specify binary I/O and type=record.
3. This supports VSAM and simple sequential files.

End of System/370 Only

OS/2 Only

4. Record Level Input Output (RLIO) C language macros must be used for record I/O.

End of OS/2 Only

4.2.2 Text Stream I/O

1. Supported only for simple character conversions. A simple record description can be created which describes each record as a string of characters the length of the record. Conversion is based on CCSID. The following is an example of such a description. This can be parsed by the ADL declaration translator to produce the file's ADLDCLSPC:

```
DECLARE BEGIN;
   CHAR LENGTH(*)
   MAXLEN(<record size>)
   UNITLEN(8)
   ADL<CCSID attribute>;
END;

 <record size> ::= See syntax note 1
```

4.2.2.1 Syntax Notes:

1. <record size> is the maximum size of the data in bytes. For DFM this is usually the logical record length of the file (LRECL).
2. The ADL <CCSID attribute> can optionally be specified.

4.2.3 Binary Stream I/O

1. Supported if the objects written to the stream can be described correctly by a record description. For example, if a struct is written to the stream, where the file was opened with `lrecl=sizeof(struct)`, then every record is a struct and this declaration can be processed by Parse Source Text.
2. The size of the record as determined from the data description must be less than or equal to the logical record length of the file, and each record or variant must start at the beginning of the logical record. They cannot be split across a record boundary.
3. A sequence of scalar fields written by separate writes can be described by packed struct or packed union, where each field written is a member of the packed struct or packed union.
4. A stream which contains combinations of struct and scalar or which was created by more complicated I/O may be described by a combination of packed and unpacked struct and union. A careful analysis may be needed to determine what was written and what the C data description should be.
5. The <LIST statement> can also be used. This may simplify the the description process since the <LIST statement> provides a closer match to the logic and independent fread and fwrite statements than does a single structure, which describes only the final results of all I O for a record.

Unclassified

Part 3. C Declaration Translator Parse Source Text

Chapter 5. C Declaration Translator Language Subset . . . . . . . . . . 80
5.1 <character> . . . . . . . . . . 80
5.2 <constant> . . . . . . . . . . 81
5.3 <identifier> . . . . . . . . . . 84
5.4 <token> . . . . . . . . . . 85
5.5 <expression> . . . . . . . . . . 86
5.6 <data declaration> and <data definition> . . . . . . . . . . 87
5.7 Common <data declaration> and <data definition> Terms . . . . . . . 88
5.8 <annotation> . . . . . . . . . . 89
5.9 <preprocessor directive> . . . . . . . . . . 91
5.10 <preprocessor pragma> . . . . . . . . . . 93
5.11 <C OPTIONS annotation> . . . . . . . . . . 96

Chapter 6. C Data Description Format and Parse Algorithms . . . . . . . . . 102
6.1 <C data description> . . . . . . . . . . 102
6.2 Data Alignment . . . . . . . . . . 104
6.3 C map_to_adl_id Function . . . . . . . . . . 105

Chapter 7. C Declaration Translator Representation Domain Defaults . . . . 106

Chapter 8. C Declaration Translator ADL Mappings . . . . . . . . . . 109

Chapter 5. C Declaration Translator Language Subset

5.1 <character>

5.1.1.1 Format

```
<octal digit> ::=
   0 | 1 | 2 | 3 | 4 | 5 | 6 | 7

<decimal digit> ::=
   <octal digit> | 8 | 9

<hexadecimal digit> ::=
   <decimal digit> | A | B | C | D | E | F | a | b | c | d | e | f

<upper case letter> ::=
   A | B | C | D | E | F | G | H | I |
   J | K | L | M | N | O | P | Q | R |
   S | T | U | V | W | X | Y | Z

<lower case letter> ::=
   a | b | c | d | e | f | g | h | i |
   j | k | l | m | n | o | p | q | r |
   s | t | u | v | w | x | y | z

<letter> ::=
   <upper case letter> | <lower case letter>
```

System/370 Only

```
<OR symbol> ::= |

<NOT symbol> ::= ¬
```

End of System/370 Only

OS/2 Only

```
<OR symbol> ::= ¦

<NOT symbol> ::= ^
```

End of OS/2 Only

```
<underscore> ::= _
```

```
<graphic character> ::=
     ! | " | # | % | & | ' | ( | ) | * | +
   | , | - | . | / | : | ; | ►< | = | ►> | ?
   | ►[ | \ | ►] | ►{ | ►} | ~ | <underscore>
   | <OR symbol> | <NOT symbol>

<space> ::=
  See Syntax Rule 1, 2, 3, and 4.

<character> ::=
    <decimal digit>
  | <letter>
  | <graphic character>
  | <space>
```

5.1.1.2 Syntax Rules

System/370 Only

1. The codepoint of the <space> character for C/370 is x'40'. This is also referred to as a blank.
2. The encoding of all <character>s for C/370 is defined by the *IBM C/370 User's Guide* SC09-1264, *Appendix F. C/370 Code Point Mappings.*

End of System/370 Only

OS/2 Only

3. The codepoint of the <space> character for IBM C Set/2 is x'20'.
4. The encoding of all <character>s for IBM OS/2 C is defined by the Character Data Representation Architecture (CDRA) for CCSID(437).

End of OS/2 Only

5.1.1.3 Exceptions

0001E  Invalid character.

Explanation: A character which is not in the C source character set has been encountered.

5.2 <constant>

Unclassified

5.2.1.1 Format

```
<decimal constant> ::=
   { 1 | 2 | 3 | 4 | 5 | 6 | 7 | 8 | 9} [<decimal digit>...]

<octal constant> ::=
   {0} [<octal digit>...]

<hexadecimal constant> ::=
   {0x | 0X} {<hexadecimal digit>...}

<integer constant> ::=
     <decimal constant>
   | <octal constant>
   | <hexadecimal constant>
```

System/370 Only

```
<bell> ::= \a = x'2F'

<backspace> ::= \b = x'16'

<new line> ::= \n = x'15'

<horizontal tab> ::= \t = x'05'

<single quotation> ::= \' = ' = x'7D'

<double quotation> ::= \" = " = x'22'

<backslash> ::= \\ = \ = x'E0'
```

End of System/370 Only

OS/2 Only

```
<bell> ::= \a = x'07'

<backspace> ::= \b = x'08'

<new line> ::= \n = x'0A'
```

[4]

[4] <new line> is known also known as line feed (LF) on an OS/2 or other ASCII system.

```
<horizontal tab> ::= \t = x'09'

<single quotation> ::= \' = ' = x'27'

<backslash> ::= \\ = \ = x'5C'
```

End of OS/2 Only

```
<form feed> ::= \f = x'0C'

<carriage return> ::= \r = x'0D'

<vertical tab> ::= \v = x'0B'

<line continuation character> ::= \

<escape sequence character> ::=
     <bell>
   | <backspace>
   | <form feed>
   | <new line>
   | <carriage return>
   | <horizontal tab>
   | <vertical tab>
   | <single quotation>
   | <double quotation>
   | <backslash>
   | <line continuation character>

<escape sequence> ::=
   \ {<escape sequence character> | <octal digit>...
   | {x | X}{<hexadecimal digit>...}}

<character constant> ::=
   [ L ] '{<character> | <escape sequence>}'

<char string constant> ::=
   "{<character> | <escape sequence> }..."

<wchar_t string constant> ::=
   L"{<character> | <escape sequence> }..."

<string constant> ::=
    <char string constant>
  | <wchar_t string constant>

<enumeration constant> ::= <identifier>
```

```
<integral constant> ::=
    <integer constant> | <character constant>
  | <enumeration constant>

<constant> ::=
    <integral constant> | <string constant>
```

5.2.1.2 Syntax Rules

1. Non-graphic characters must be entered as <escape sequence character>s.
2. The value of an <escape sequence character> is the member of the system character set that the <escape sequence character> represents.
3. <line continuation character> is used in C character strings to indicate the current line continues on the next line.
4. The <integral constant> can be signed. However, the sign is not considered part of the constant. Rather, it is treated as the unary minus operator which negates the value of the operand.
5. The value of an <enumeration constant> is assigned according to the rules defined under <enumeration data definition>.
6. A <decimal constant> cannot begin with a zero. The number zero in the first digit position defines the number as an <octal constant>.
7. <new line> terminates a line of text. A <new line> is defined to be the right margin, the end of the current record, or an explicit <new line> character.

5.2.1.3 Exceptions

0002E String literals must be terminated before the end of the line.

Explanation: String literals must be terminated before the end of the source line. You can construct literals which are longer than one line by using the line continuation sequence (backslash at the end of the line) or by using the concatenation of adjacent string literals.

5.3 <identifier>

5.3.1.1 Format :

```
<first identifier character> ::=
   <letter> | <underscore>

<remaining identifier characters> ::=
   { <letter> | <decimal digit> | <underscore> }...

<identifier> ::=
    <first identifier character>
  [ <remaining identifier characters> ]
```

Unclassified

5.3.1.2 Syntax Rules

1. None

5.4 <token>

5.4.1.1 Function

Specify lexical units.

5.4.1.2 Format

```
<special symbol> ::=
     ; | , | ►[ | ►] | ( | ) | *
   | - | + | / | .

<comment> ::=
   /* <character>...*/

<separator> ::=
   {
      <comment>
    | <space>
    | <new line>
    | <horizontal tab>
    | <vertical tab>
    | <form feed>
    | <carriage return>
   }...

<keyword> ::=
     short            | long             | int
   | float            | double           | char
   | wchar_t          | struct           | union
   | enum             | typedef          | boolean_t
   | #pragma          | _Packed          | auto
   | register         | unsigned         | signed
   | const            | extern           | sizeof
   | static           | volatile         | void
   | #include

<nondelimiter token> ::=
     <identifier>
   | <keyword>
   | <constant>

<delimiter token> ::=
   <special symbol>
   <separator>

<token> ::=
   <nondelimiter token> | <delimiter token>
```

Unclassified

5.4.1.3 Syntax Rules

1. Trigraphs are provided for terminals which do not support all C characters. Each trigraph should be replaced during the lexical scan of the source file with the character it represents as defined below.

```
??= is replaced by # before parsing
??( is replaced by [ before parsing
??) is replaced by ] before parsing
??< is replaced by { before parsing
??> is replaced by } before parsing
??/ is replaced by \ before parsing
??- is replaced by ~ before parsing
```

System/370 Only

```
??' is replaced by ¬ before parsing
??! is replaced by | before parsing
```

End of System/370 Only

OS/2 Only

```
??' is replaced by ^ before parsing
??! is replaced by ¦ before parsing
```

End of OS/2 Only

2. A <token>, other than a <string constant>, shall not include a <space>.
3. Any <token> may be followed by a <separator>.
4. A <nondelimiter token> shall be followed by a <delimiter token> or a <separator>. If the syntax does not allow a <nondelimiter token> to be followed by a <delimiter token>, then that <nondelimiter token> shall be followed by a <separator>.
5. C <identifier>s cannot duplicate any <keyword>. These are reserved for C, the compiler, or declaration translator use.
6. C is case senstitive. Keywords must be written in the correct case to be recognized. Most keywords are all lowercase.

5.5 <expression>

5.5.1.1 Format

```
<unary plus> ::= +

<unary minus> ::= -

<indirection> ::= *
```

```
<size of an object> ::= sizeof

<unary operator> ::=
     <unary plus>
   | <unary minus>
   | <indirection>
   | <size of an object>

<operator> ::=
     <unary operator>

<operand> ::=
     <identifier>
   | <constant>

<unary expression> ::=
   [<unary operator>]<operand>

<constant expression> ::=
   [<unary operator>]<constant>

<integral constant expression> ::=
   [<unary operator>]<integral constant>

<expression> ::=
     <unary expression>
   | <constant expression>
   | <integral constant expression>
```

5.5.1.2 Syntax Rules

1. All primary operators have the same precedence and have left-to-right associativity
2. See *Chapter 6. Expressions and Operators* in the *SAA Common Programming Interface C Reference - Level 2* for an explanation of operators and more detail on expressions.

5.6 <data declaration> and <data definition>

5.6.1.1 Function

A <data definition> describes a data object and reserves storage.

A <data declaration> describes a data object. The storage is allocated later by a <data definition> which references this <data declaration> or it allocated externally.

5.6.1.2 Format

```
<data declaration> ::=
      <struct data declaration>
    | <struct typedef data declaration>
    | <union data declaration>
    | <union typedef data declaration>
    | <enumeration data declaration>
    | <enumeration typedef data declaration>
    | <typedef data declaration>


<data definition> ::=
      <pointer data definition>
    | <string data definition>
    | <wide string data definition>
    | <int data definition>
    | <bit-field data definition>
    | <float data definition>
    | <double data definition>
    | <long double data definition>
    | <char data definition>
    | <wchar_t data definition>
    | <array data definition>
    | <struct data definition>
    | <union data definition>
    | <enumeration data definition>
    | <typedef instance data definition>
```

5.6.1.3 Syntax Rules

1. These terms are mapped to ADL in Chapter 8, "C Declaration Translator ADL Mappings" on page 109.

5.7 Common <data declaration> and <data definition> Terms

5.7.1.1 Format

```
<internal storage class> ::= auto | register | static

<external storage class> ::= static | extern

<storage class> ::=
   <internal storage class> | <external storage class>

<attribute> ::=
   {
     volatile
     const
     _Packed
   }!
```

```
<initializer> ::=
   { = <expression> } |
   { = <expression> [, <expression>]...}

<dimension size> ::= <integral constant expression>

<subscript declarator> ::=
   ►[<dimension size>►]
   [{►[<dimension size>►]}...]

<declarator> ::=
    <array declarator>
  | <boolean_t declarator>
  | <char declarator>
  | <double declarator>
  | <float declarator>
  | <int declarator>
  | <long double declarator>
  | <pointer declarator>
  | <string declarator>
  | <struct declarator>
  | <typedef declarator>
  | <typedef instance declarator>
  | <union declarator>
  | <wchar_t declarator>
  | <wide string declarator>
```

5.7.1.2 Syntax Rules

1. Initializers will be ignored in most cases. These can contain any data, including <constant>s not defined in this specification. The data will not be validated in any way.
2. The <attribute> _Packed is only meaningful for structs and unions.

5.7.1.3 General Rules

1. These common terms are referenced by the <data definition>s and <data declaration>s terms which are defined and mapped to ADL in chapter Chapter 8, "C Declaration Translator ADL Mappings" on page 109.

5.8 <annotation>

5.8.1.1 Format

```
<annotation> ::=
    <DECLARE annotation>
  | <LIST statement annotation>
  | <identifier annotation>
  | <when annotation>
  | <otherwise annotation>
  | <case variant annotation>
```

```
   | <type specifier annotation>

<type specifier annotation> ::=
   | <pointer annotation>
   | <string annotation>
   | <wide string annotation>
   | <int annotation>
   | <bit-field annotation>
   | <float annotation>
   | <double annotation>
   | <long double annotation>
   | <char annotation>
   | <wchar_t annotation>
   | <array annotation>
   | <struct annotation>
   | <union annotation>
   | <enumeration annotation>
   | <_boolean_t annotation>

<LIST statement annotation> ::=
   <LIST statement>
   [<LIST statement>...]
```

5.8.1.2 Syntax Rules

1. For the definition of annotation terms see Chapter 8, "C Declaration Translator ADL Mappings" on page 109.
2. C annotation follows the general annotation model as specified by Chapter 2, "ADL Annotation of Programming Language Text" on page 39.
3. If the annotation includes an identifier, this replaces the identifier mapped from the C declaration or definition.
4. If the annotation includes an ADL object type, this replaces the object mapped from the C declaration or definition.
5. If the annotation includes attributes, then these replace the matching attribute in the attribute list mapped from the C declaration, or if this attribute is not present, it is added to the attribute list. In either case, if the value of the attribute is the same as the ADL default, it is not included in the attribute list.

5.8.1.3 General Rules

1. All <annotation> must be written within C comments where the first non blank symbol following the opening comment is ADL.
2. <annotation> can be enclosed with a single opening and closing comment symbols or multiple opening and closing comment symbols, where each opening comment symbol is followed by ADL.
3. Annotation can be split across lines.

5.8.1.4 Examples

The following are examples of valid annotation of an int.

```
int x /* ADL ASIS; */;
int y
   /* ADL
      TITLE('A sample annotated int')
      NOTE('ADL annotation comments can be written in many ways');
   */;
int z
   /* ADL TITLE('Another annotated int') */
   /* ADL WHEN x > 20000;               */;
```

5.9 <preprocessor directive>

5.9.1.1 Function

Preprocessing is a step in the compilation process which enables you to

- Replace identifiers or strings in the current file with specified source text
- Imbed files within the current file
- Conditionally compile sections of the current file The C Declaration Translator does not support C Compiler preprocessor directives, except for #include. To use files containing preprocessor directives other than the #include, the C compiler must be called to do the preprocessing before calling the C declaration translator.

System/370 Only

To run only the preprocessor against the source file use the PPONLY compiler option.

End of System/370 Only

OS/2 Only

To run only the preprocessor against the source file use the /P+ compiler option. Also see the /Pd+ option.

End of OS/2 Only

5.9.1.2 Format

```
<preprocessor directive> ::=
    <include directive>
```

5.9.1.3 Syntax Rules

1. Preprocessor directives must begin with the # character followed by the preprocessor keyword. This must be the first non <separator> on a line.
2. A preprocessor directive ends at the end of a line unless the last character of the line is the \ (backslash). This is interpreted as a continuation character. The \ and the following new line character are ignored.
3. Preprocessor directives can appear any place in a program.
4. For the complete format, syntax, and function specification see the *SAA Common Programming Interface C Reference - Level 2*, document number SC09-1308.

5.9.2 <include directive>

5.9.2.1 Function

Causes the declaration translator to replace this directive with the specified file.

5.9.2.2 Format

```
<include directive> ::=
   #include { "<file name>" | ►<<file name>►> | <character>... }


<file name> ::= See syntax rule 1
```

5.9.2.3 Syntax Rules

1. <file name> is system dependent. See the system user guides for the each compiler to determine this system specific definition.

5.9.2.4 General Rules

System/370 Only

1. The library search order for the included file is specified by the *IBM C/370 User's Guide* document number SC09-1264. This can be altered by compiler options SEARCH, LSEARCH, NOSEARCH, and NOLSEARCH. See the user's guide for details.

End of System/370 Only

OS/2 Only

2. The library search order for the included file is specified by the *IBM C Set/2 User's Guide*, SC09-1310. This can be altered by the following compiler options:

`/Xs, /Xu, /X, /I<path>, /Fs<path>, /Fu<path>`

End of OS/2 Only

Unclassified

5.9.2.5 Exceptions

0003E Include file &1 not found.

Explanation: The file specified of #include directive could not be found.

0004W #include file header must not be empty.

Recovery: Remove the #include directive or, ensure that the header is not empty.

0005E Invalid #include file header &1

Explanation: The name of the file specified on the #include directive is invalid.

Recovery: For details on the include directive and valid C header files, refer to the *Systems Application Architecture Common Programming Interface C Reference* SC09-1308.

5.10 <preprocessor pragma>

5.10.1.1 Function

Pragma statements can appear in C source by use of #pragma, which is an implementation-defined instruction to the compiler.

5.10.1.2 Format

```
<preprocessor pragma> ::=
    <pragma sequence>
  | <pragma margins>
  | <pragma chars>
  | <pragma options>
  | <pragma runopts>
```

5.10.1.3 Exceptions

0006E Error in #pragma &1.

Recovery: Check the syntax of the #pragma directive.

0007E Unsupported option &1 on #pragma &2.

Recovery: Check your #pragma directive options.

0008E Invalid #pragma &1

Explanation: Unrecognizable #pragma name.

Recovery: See this specification for list of supported #pragmas.

0009E Option out of range on #pragma &1.

Explanation: The specified #pragma option is not within the range of the valid values.

5.10.2 <pragma sequence>

5.10.2.1 Function

Specifies the section of the input record that is to contain sequence numbers. The #pragma nosequence directive specifies that the input record does not contain sequence numbers. This directive applies only to the source file in which it is found. See *IBM C/370 User's Guide* SC09-1264 for a complete description of this directive.

The sequence directive specifies the left and right column to be used for sequence numbers. If no directive is included, the defaults are sequence(73,80) for fixed length records and nosequence for variable length records.

5.10.2.2 Format

```
<left col> ::= <integer constant>

<right col> ::= <integer constant>

<pragma sequence> ::=
   #pragma { sequence (<left col>,<right col>) } |
            nosequence
```

5.10.2.3 Syntax Rules

MVS Only 1. 0 < <left col> < <right col> < 32768

End of MVS Only

VM/CMS Only 2. 0 < <left col> < <right col> < 65535

End of VM/CMS Only

3. <right col> can be specified as an asterisk (*) indicating the last column of the input record.
4. If C system library include files are used, then the following must be true:

   ```
   <left col> < 20
   <right col> > 50
   ```

If C system library include files are not used, then <left col> and <right col> can be any setting that is consistant with your own include files.

5.10.3 <pragma margins>

5.10.3.1 Function

Control the margins of the source declarations which will be scanned for input to the declaration translator. The declaration translator ignores any text outside of those margins. This directive applies only to the source file in which it is found. The directive takes effect on the line following the directive itself and remains in effect until another #pragma margins or #pragma nomargins is encountered or, until the end of the file is reached. See *IBM C/370 User's Guide* SC09-1264 for complete details on this directive.

5.10.3.2 Format

```
<pragma margins> ::=
   #pragma { margins(<left col>,<right col>) } |
             nomargins
```

5.10.3.3 Syntax Rules

MVS Only 1. 0 < <left col> < <right col> < 32768

End of MVS Only

VM/CMS Only 2. 0 < <left col> < <right col> < 65535

End of VM/CMS Only

3. <right col> can be specified as an asterisk (*) indicating the last column of the input record.
4. If C system library include files are used, then the following must be true:

```
<left col> < 20
<right col> > 50
```

If C system library include files are not used, then <left col> and <right col> can be any setting that is consistant with your own include files.

5.10.4 <pragma chars>

5.10.4.1 Function

Specifies that the compiler is to treat all char as signed or unsigned.

5.10.4.2 Format

```
<pragma chars> ::=
   #pragma chars ( { signed | unsigned } )
```

5.10.4.3 Syntax Rules

System/370 Only

1. The default for char types is unsigned.

End of System/370 Only

OS/2 Only

2. This is controlled by an option instead of a pragma. The option is /J{[+]|[-]}. Default is /J-, make the default char type unsigned.

End of OS/2 Only

5.10.5 <pragma options> & <pragma runopts>

System/370 Only

5.10.5.1 Function

Specifies compiler or runtime options. None of the options specified on either of these pragma are relevant to data description. Therefore, if these pragmas are included they will be ignored by the C declaration translator.

5.10.5.2 Format

```
<pragma options> ::=
   <character>...

<pragma runopts> ::=
   <character>...
```

5.10.5.3 Syntax Rules

1. None

End of System/370 Only

5.11 <C OPTIONS annotation>

5.11.1.1 Function

Control the processing of the C data description by the the C declaration translator. These options are specified and passed to the declaration translator when it is invoked or specified in the source using <C OPTIONS annotation>.

Some options may also be specified in the data description by using <preprocessor pragma>. OPTIONS which are also ADL attributes may also be specified as annotation for some <data definition> or <data declaration>.

See Chapter 2, "ADL Annotation of Programming Language Text" on page 39 for a description and examples of <PL OPTIONS annotation>. <C OPTIONS annotation> must appear before any other C code.

Options can be specified in either OS/2 or System/370 format or both. This will ease the work to migrate a data description file between systems.

Any options not referenced here are unsupported. More specifically, the C declaration translator does not support the language level options or compatibility options which may limit or alter the syntax and representation of data declarations and data definitions in C on either OS/2 or System/370.

5.11.1.2 Format

```
<C option> ::=
      <option MARGINS>
    | <option SEQUENCE>
    | <option FIT>
    | <option CONSTRAINED>

<C OPTIONS annotation> ::=
   OPTIONS (<C option>[, <C option>]...);
```

5.11.1.3 Syntax Rules

1. Options passed on the call to Parse Source Text are passed in the parameter defined by the DDM term TYPMGROPT under term TYPMGRIFC,
2. The following is the hierarchy and scope for options.

Options which are ADL attributes a. If an option is not specified it shall take the default value as specified by the C representation domain defaults.

b. Options specified in <C OPTIONS annotation> override the above default values. They apply to all <data definition> or <data declaration> which allow annotation of this ADL attribute.

c. Options specified on the call to Parse Source Text override the default values and those specified in <C OPTIONS annotation>. They apply to all <data definition> or <data declaration> which allow annotation of this ADL attribute.

d. An attribute annotated on a <data definition> or <data definition> override all of the above.

Options which are not ADL attributes a. If an option is not specified it shall either:
   1) Take the default value as specified by the C compiler, if it is a compiler option.
   2) Take the default value as specified by the C declaration translator, if it is a declaration translator specific option.

b. Options specified in <C OPTIONS annotation> override the above default values.

c. Options specified on the call to Parse Source Text override the default values and those specified in <C OPTIONS annotation>.

5.11.2 <option MARGINS>

5.11.2.1 Function

Control the margins of the C data description which will be scanned for input to the declaration translator. The declaration translator ignores any text outside of those margins. See *IBM C/370 User's Guide* SC09-1264 for complete details on this option. This option applies to all files unless overridden by #pragma margins.

See also 5.10.3, "<pragma margins>" on page 95.

5.11.2.2 Format

```
<option MARGINS> ::=
     { MARGINS(<left col>,<right col>) }
   | NOMARGINS
   | /Sg[<left col>][,<right col>]
   | /Sg-
```

5.11.2.3 Syntax Rules

MVS Only 1. 0 < <left col> < <right col> < 32768

End of MVS Only

VM/CMS Only 2. 0 < <left col> < <right col> < 65535

End of VM/CMS Only

OS/2 Only

3. /Sg is the OS/2 form of the margins option see the IBM C Set/2 user's guide for details.

End of OS/2 Only

4. <right col> can be specified as an asterisk (*) indicating the last column of the input record.
5. If C system library include files are used, then the following must be true:

```
<left col> < 20
<right col> > 50
```

If C system library include files are not used, then <left col> and <right col> can be any setting that is consistant with your own include files.
6. Option nomargins specifies the entire input record is scanned.
7. Default for fixed format files is MARGINS(1,72).
8. Default for variable format files is NOMARGINS.
9. If the file contains sequence numbers, then MARGINS must be set so that the sequence numbers are not inside of these margins.

5.11.3 <option SEQUENCE>

5.11.3.1 Function

Specifies the section of the input record that is to contain sequence numbers. The option NOSEQUENCE specifies that the input record does not contain sequence numbers. See *IBM C/370 User's Guide* SC09-1264 for a complete description of this option. This option applies to all files unless overridden by #pragma sequence.

The sequence option specifies the left and right column to be used for sequence numbers. If no option is included, the defaults are SEQUENCE(73,80) for fixed length records and NOSEQUENCE for variable length records.

See also 5.10.2, "<pragma sequence>" on page 94.

5.11.3.2 Format

```
<option SEQUENCE> ::=
     { SEQUENCE (<left col>,<right col>) }
   | NOSEQUENCE
   | /Sq[<left col>][,<right col>]
   | /Sq-
```

5.11.3.3 Syntax Rules

MVS Only 1. 0 < <left col> < <right col> < 32768

End of MVS Only

VM/CMS Only 2. 0 < <left col> < <right col> < 65535

End of VM/CMS Only

OS/2 Only

3. /Sq is the OS/2 form of the sequence option see the IBM C Set/2 user's guide for details.

End of OS/2 Only

4. <right col> can be specified as an asterisk (*) indicating the last column of the input record.
5. If C system library include files are used, then the following must be true:

```
<left col> < 20
<right col> > 50
```

If C system library include files are not used, then <left col> and <right col> can be any setting that is consistant with your own include files.

5.11.4 <option FIT>

5.11.4.1 Function

Specifies how to assign a numeric value to a target field. This overrides the representation domain default value.

5.11.4.2 Format

```
<option FIT> ::=
    FIT ( TRUNCATE | ROUND | EXACT )
```

5.11.4.3 Syntax Rules

1. See the A Data Language for the specification of the ADL <FIT attribute>.

5.11.5 <option CONSTRAINED>

5.11.5.1 Function

Specify whether the values that can be assigned to a field must be constrained to the range implied by the ADL < RADIX attribute > , ADL < SCALE attribute > , and ADL < PRECISION attribute > of the field.

5.11.5.2 Format

```
<option CONSTRAINED> ::=
    CONSTRAINED ( TRUE | FALSE )
```

5.11.5.3 Syntax Rules

1. See the A Data Language for the specification of the ADL < CONSTRAINED attribute > .

Unclassified

Chapter 6. C Data Description Format and Parse Algorithms

6.1 <C data description>

6.1.1.1 Format :

```
<DECLARE annotation> ::=
   [<unqualified identifier annotation>:] DECLARE
   {
     [ADL<TITLE attribute>]
     [ADL<TEXT attribute>]
     [ADL<NOTE attribute>]
   }!


<C data description> ::=
   [ <C OPTIONS annotation> ]
   [ <DECLARE annotation> ]
   {
     [ <data declaration> ]
     [ ADL<constant statement> ]
     [ <preprocessor pragma> ]
     [ <data definition> ]
     [ <LIST statement annotation> ]
   }...
```

6.1.1.2 Syntax Notes :

1. The <include directive> causes the declaration translator to replace the directive with the contents of the specified file. The <include directive> can appear anywhere in the <C data description>. However, the C source text in the included file must be valid at that point in the data description.
2. If the <LIST statement annotation> is not used, then each <data definition> is a description of a logical record which is read or written by the C application through a view or base file.
3. If the <LIST statement annotation> is used, then each <LIST statement annotation> is a description of a logical record which is read or written by a C application through a view or base file.
4. If the <C data description> includes multiple logical record descriptions and it is used with DFM and default conversion plans, then only the first description (i.e. the first <LIST statement annotation> or <data definition>) is used by DFM as the record description of the file. See 1.5.8, "DFM Considerations" on page 11.
5. The <LIST statement annotation> is specified by 2.3, "<LIST statement>" on page 54.

6.1.1.3 General Rules

1. <C OPTIONS annotation> sets the initial processing state.
2. A <preprocessor pragma> changes the processing state. See 5.10, "<preprocessor pragma>" on page 93 for the scope of each type of <preprocessor pragma>.
3. The <data declaration> and <data definition> are mapped to ADL as specified by Chapter 8, "C Declaration Translator ADL Mappings" on page 109.
4. If the <LIST statement annotation> is used, then this is mapped to ADL constructors (SEQUENCE, CASE, ARRAY) according to 2.3, "<LIST statement>" on page 54. The <data definition>s referenced by the <LIST statement annotation>, and any <data declaration>s referenced by the <data definition>s are mapped to ADL according to Chapter 8, "C Declaration Translator ADL Mappings" on page 109.

At the completion of the parse of the <C data description>, any <data definition>s not referenced by the <LIST statement annotation>, and any <data declaration>s not referenced by a referenced <data definition> or by the <LIST statement annotation>, are included in the ADLDCLSPC as independent ADL declarations.

6.1.1.4 Exceptions

0010E A declaration must declare at least a variable, a tag or enum members.

Recovery: Remove the empty declaration or complete it by adding either a variable or a list of enum constants.

0011E A type must be specified in the declaration of the object &1.

Recovery: Declare the object or function with a type.

0012E Nesting cannot exceed the maximum limit &1

Explanation: The internal declaration translator limit of &1 nested include files was exceeded.

Recovery: Remove the nesting by putting all of the include files at the same level.

0013E Number of input files cannot exceed the maximum limit of &1.

Explanation: The internal declaration translator limit of &1 include files per Parse Source Text was exceeded.

Recovery: Try combining some files.

0014E Declaration cannot specify multiple type specifiers.

Recovery: Only keep one type specifier.

Unclassified

0015E File cannot end in comment that started on line &1.

Explanation: An unterminated comment has been detected which began on the specified line.

0016E Include file cannot end in a comment.

Recovery: End your comment in the include file.

0017E File cannot end with continuation line.

Recovery: Remove the continuation character from the last line of the file.

6.2 Data Alignment

1. The alignment of the first byte of the logical record is considered to be the strictest boundary the data requires. All other boundaries are relative to this.
2. Alignment and padding requirements are specified by:

System/370 Only

- *IBM C/370 User's Guide, Version 1, Release 2*,SC09-1264-03, Part 8, Chapter 42, C Mapping, page 357
- *IBM C/370 Programming Guide, Version 2, Release 1*, SC09-1384-00, A.0 Appendix A. ANSI Notes, A.2 Implementation Defined Behavior, and Section 8.1.6 C Data Mapping.

End of System/370 Only

OS/2 Only

- *IBM C Set/2 User's Guide*, SC09-1310, Part 6. Advanced Topics, Chapter 17. C Mapping, and Part 7. Appendixes, Appendix B. ANSI Implementation-Defined Behavior.
- Note that alignment requirements differ depending on whether the system processor is an 80386 or an 80486.

End of OS/2 Only

- For _Packed structures and unions by the *SAA Common Programming Interface C Reference - Level 2*, SC09-1308-1, Chapter 4, Declarations and Definitions, Defining a Packed Structure, page 89 and Defining a Packed Union, page 94.

3. After alignment requirements have been determined and the padding requirements calculated, the padding must be reflected in the ADL encodings.
   a. For a SEQUENCE, insert an ADL <SKIP statement> wherever padding is required. A SEQUENCE never starts with a SKIP statement. A SEQUENCE which is also a member of a SEQUENCE would have a SKIP statement preceding the SEQUENCE in order for it to start on the correct boundary.

b. For a CASE, if the CASE requires padding so it ends on the correct boundary, set the ADL <LENGTH attribute> to a value equal to the length of the largest variant plus the required padding.

c. For an ARRAY, the ADL <SKIP attribute> is never used. C produces CASE and SEQUENCE objects which contain padding so that they both start and end on their required boundary. Therefore, each subsequent array element will start at the correct boundary without need of additional padding.

4. There is no padding between items referenced by <LIST statement annotation> unless it is explicitly placed there by including ADL <SKIP attribute>s in the LIST. Constructors referenced by <LIST statement annotation> have internal padding as defined by the preceding alignment rules.

6.3 C map_to_adl_id Function

6.3.1.1 Format

See 1.6.3, "map_to_adl_id function" on page 18 .

6.3.1.2 Processing :

To map a C identifier to ADL, follow the general algorithm specified by 1.6.3, "map_to_adl_id function" on page 18, where step 4 is specified as follows :

4. All characters in a C identifier are legal in an ADL identifier. No conversion of the characters is required.

6.3.1.3 Exceptions :

0018E Identifier contains DBCS characters. Identifier must contain only SBCS characters.

Recovery: Rewrite the indentifier using only SBCS characters.

0019E Identifier is a duplicate, i.e. not unique within the first 255 characters.

Recovery: Change the first 255 characters of the identifier to make it unique.

0020E Identifier &1 must be declared prior to use.

Recovery: Declare an object of that name.

6.3.1.4 Examples 1. map_to_adl_id('todays_date','') returns todays_date
2. map_to_adl_id('__time','') returns __time
3. map_to_adl_id('______','') returns ______

Unclassified

Chapter 7. C Declaration Translator Representation Domain Defaults

The DEFAULT statements are used by the C declaration translator in the Parse Source Text and Translate Declaration Space functions. The declaration translator will add a pre-built internal DDM encoding of these declarations to the ADLDCLSPC created by Parse Source Text or Translate Declaration Space and use these in the field and user subtype declarations. This can help to reduce the size of an ADLDCLSPC.

It is also possible to deliver these defaults as an include file for use when writing ADL for the ADL declaration translator. This would be a useful aid when a C declaration translator is not available, the C file was written by a different C compiler than the declaration translators available, or the programmer has done something in C which the declaration translator does not support but ADL does.

Defaults are also important for minimizing the amount of ADL annotation which must be written by a programmer. When writing annotation only those attributes which do not have a default or which must be given a value different from their default value are required to be written by the programmer.

Defaults are chosen to mainly to reflect language characteristics or system characteristics. In other cases they are chosen to reflect most common usage such as 32 bit FLOAT and BINARY or 8 bit ENUMERATION.

```
DEFAULT ARRAY
   DMNLOW(0)
   MAXALC(TRUE)
   SKIP(0);
```

```
DEFAULT ASIS
   UNITLEN(8)
   MAXALC(TRUE);
```

System/370 Only

```
DEFAULT BINARY
   PRECISION(31)
   SCALE(0)
   BYTRVS(FALSE)
   COMPLEX(FALSE)
   CONSTRAINED(FALSE)
   FIT(TRUNCATE)
   RADIX(2)
   SIGNED(TRUE);
```

End of System/370 Only

OS/2 Only

```
DEFAULT BINARY
   PRECISION(31)
   SCALE(0)
   BYTRVS(TRUE)
   COMPLEX(FALSE)
   CONSTRAINED(FALSE)
   FIT(TRUNCATE)
   RADIX(2)
   SIGNED(TRUE);
```

End of OS/2 Only

```
DEFAULT BOOLEAN
   LENGTH(8)
   BLNENC(LSTBIT)
   BYTRVS(FALSE);

DEFAULT CHAR
   MAXALC(TRUE)
   UNITLEN(8)
   JUSTIFY(LEFT)
   CCSID(0);

DEFAULT CHARSFX
   CCSID(0)
   UNITLEN(8)
   MAXALC(TRUE)
   SFXENC(x'00');

DEFAULT ENUMERATION
   BYTRVS(FALSE)
   LENGTH(8)
   SIGNED(TRUE)
```

System/370 Only

```
DEFAULT FLOAT16
   LENGTH(32)
   COMPLEX(FALSE)
   FIT(TRUNCATE)
   RADIX(2);
```

End of System/370 Only

OS/2 Only

```
DEFAULT FLOAT2
   LENGTH(32)
   BYTRVS(TRUE)
   COMPLEX(FALSE)
   FIT(TRUNCATE)
   RADIX(2);
```

End of OS/2 Only

Unclassified

Chapter 8. C Declaration Translator ADL Mappings 8.1 <array data definition> . . . . . 111
8.2 <bit-field data definition> . . . . . 116
8.3 <boolean_t data definition> . . . . . 120
8.4 <char data definition> . . . . . 123
8.5 <double data definition> . . . . . 127
8.6 <enumeration data declaration> . . . . . 131
8.7 <enumeration data definition> . . . . . 136
8.8 <enumeration typedef data declaration> . . . . . 141
8.9 <float data definition> . . . . . 145
8.10 <int data definition> . . . . . 148
8.11 <long double data definition> . . . . . 152
8.12 <pointer data definition> . . . . . 155
8.13 <string data definition> . . . . . 158
8.14 <struct data declaration> . . . . . 168
8.15 <struct data definition> . . . . . 171
8.16 <struct typedef data declaration> . . . . . 176
8.17 <typedef data declaration> . . . . . 179
8.18 <typedef instance data definition> . . . . . 182
8.19 <union data declaration> . . . . . 186
8.20 <union data definition> . . . . . 190
8.21 <union typedef data declaration> . . . . . 196
8.22 <wchar_t data definition> . . . . . 200
8.23 <wide string data definition> . . . . . 203

Special Notices:

1. In the following sections, the ADL Mappings show a mapping to ADL of only one C <identifier> and optionally <identifier annotation>. If multiple <declarator>s were specified they each shall be mapped the same way. These may be encoded in the ADLDCLSPC as multiple identifiers for a single ADL declaration node.

2. A single C <data definition> with multiple <declarator>s may produce multiple ADL <data declaration>s (multiple ADLNODE in the ADLDCLSPC). This can occur because:

a. A <declarator> can optionally have a <subscript declarator>. A <data definition> could produce both an array and a simple type.

b. Each declarator can have its own <array annotation>. Therefore it is possible that multiple arrays would be produced in the ADLDCLSPC, one for each <declarator> with <array annotation>.

c. <array annotation> can include ASIS, which replaces the entire ARRAY with an ASIS, so yet a third type of ADL <data declaration> can be produced from a single C <data definition>.

d. Finally, each <declarator> for <struct data definition> or <union data definition> can optionally have the _Packed attribute. Different ADL <data declaration statements> are needed for those <declarator>s with the _Packed attribute and for those without the _Packed attribute.

3. The ADL <FIT attribute> and the ADL <CONSTRAINED attribute> can be specified as parameters to the call Parse Source Text, in the OPTIONS statement, as annotation on a field or they can take the C representation domain default value.

The mappings in this chapter only show the attributes set to their default values. In fact, their value must be set according to the hierarchy of options as defined in 5.11, "<C OPTIONS annotation>" on page 96.

8.1 <array data definition>

8.1.1 Function :

An array is a set of elements that can be addressed in terms of 1 to N dimensions. An element can be a field, a struct or a union. All C compilers support at least 12 dimensions. The C compiler does not define a limit on the number of dimensions. The last dimension iterates the fastest.

An array may be annotated with the ADL <DMNSIZE attribute> to specify reference fields giving the number of elements actually used in a dimension. This lets a C application view use its fixed size arrays to read and write files with arrays where each dimension has only the number of elements as given by the reference fields.

A C program can also use the <LIST statement> and the <implied ARRAY>. This style of array matches well what a C programmer can do using binary stream I/O statements and program logic. With this style of array, a C program can directly read or write an array written to a file where each dimension has only the number of elements as given by the reference fields. See 2.3, "<LIST statement>" on page 54 and 2.8, "Extended List Annotation Example" on page 72 for details and examples.

8.1.2 Format :

```
<array declarator> ::=
   [<array annotation>] [<attribute>] <identifier> <subscript declarator>

<array data definition> ::=
   {
     [<storage class>] [<attribute>] <type specifier>
   }
   {
     <array declarator> [<initializer>] [<identifier annotation>]
   }
   [
     {
       , <array declarator> [<initializer>] [<identifier annotation>]
     }...
   ]
   [<type specifier annotation>] ;

<array annotation> ::=
  {
    {
      [ ASIS ]
      {
        [ ADL<TITLE attribute> ]
        [ ADL<NOTE attribute> ]
        [ ADL<HELP attribute> ]
        [ ADL<WHEN clause> ]
      }!
    }
```

```
  | {
      [ DMNLST( [ DMNSIZE( ADL<qualified identifier> ) ]
          {[, [ DMNSIZE( ADL<qualified identifier> ) ] ]...}) ]
      [ ADL<MAXALC attribute> ]
      [ ADL<TITLE attribute> ]
      [ ADL<NOTE attribute> ]
      [ ADL<HELP attribute> ]
      [ ADL<WHEN clause> ]
    }!
  }
  ADL<terminator>

<field size> ::= <integral constant>
```

8.1.2.1 Format Notes

1. See 8.12.2, "Format :" on page 155 under the description of 8.12, "<pointer data definition>" on page 155 for the definition of <type specifier>.
2. For each <type specifier> see the section describing the type for a definition of <type specifier annotation>, where *type specifier* is replaced by the actual keyword for the type.
3. <dimension size> specifies the number of elements in this dimension. See 5.7, "Common <data declaration> and <data definition> Terms" on page 88 for a definition of <dimension size> and <subscript declarator>.
4. The C array dimensions are mapped in row major order. Thus the right most (highest) dimension index iterates the fastest when referencing the array in the order elements were allocated in memory.
5. C does not define a limit on array dimension size or array size. ADL places a limit on array size of the maximum signed integer which is (231)-1 bytes. As the element size increases the maximum number of elements must descrease in order to keep the array size less than or equal to (231)-1 bytes. The resources available in a particular system (memory available, disk space available, maximum record size) will normally impose much stricter restraints on array size.
6. The lower bound for any dimension is zero.
7. See 8.13, "<string data definition>" on page 158 and 8.23, "<wide string data definition>" on page 203 for a definition of strings and arrays of characters. These are special cases of <array data definition> (a string is an array of char).
8. The field referenced by ADL<DMNSIZE attribute> can be located anywhere in the record so long it is in a fixed location. That is it cannot follow a MAXALC(FALSE) object.
9. In general, <array annotation> is valid only if at least one <declarator> has a <subscript declarator>.
10. In general, <array annotation> applies only to those <declarator>s which have a <subscript declarator>.
11. The ADL<MAXALC attribute> defaults to MAXALC(TRUE). This allows arrays with reference fields to be used with C record I/O and allows the array to be contained in a struct or union.

Unclassified

12. If the array is annotated with MAXALC(FALSE), then one of the following must be true
    a. C stream I/O is used to read the MAXALC(FALSE) data from the record into the C applications MAXALC(TRUE) data structures in memory.
    b. The MAXALC(FALSE) data is read or written in a application buffer at one time using C record I/O. Program logic statements using combinations of memory moves/copy, string moves/copy and type casts, manipulates and handles getting/setting the MAXALC(FALSE) data in the buffer.

8.1.3 ADL Mapping :

<array data definition> *MAPS TO ADL:*

```
map_to_adl_id(<identifier>,ADL<qualified identifier>) :
/*------------------------------------------------------*/
/* REXX PROCEDURE: ARRAY        DATE: 12/16/91          */
/*   This procedure is called when <subscript declarator> */
/*   is not null and the data definition is not a       */
/*   <string data definition> or <wide string data       */
/*   definition>.                                        */
/* Initialization Section                                */
/*------------------------------------------------------*/
/* START OF LOOP: ARRAY */
DO FOREVER
  SELECT
    WHEN (pos('ASIS',<array annotation>) <> 0) THEN
      DO
        ASIS                          /* entire array is ASIS    */
        LENGTH( <dimension size>[{*<dimension size>}...]*<field size>/8 )
        [ UNITLEN(8) ]
        [ ADL<TITLE attribute> ]
        [ ADL<NOTE attribute> ]
        [ ADL<HELP attribute> ]
        [ ADL<WHEN clause> ]
        [ ADL<terminator> ]
        LEAVE /* EXIT LOOP: ARRAY */
      END
    WHEN (pos('DMNLST',<array annotation> <> 0 & pos('DMNSIZE',<array annotation> <> 0) THEN
      DO
        ARRAY
        DMNLST(
          /*********************************************************************/
          /* For each dimension which has been annotated with                */
          /* DMNSIZE(ADL<qualified identifier>) map that dimension as follows */
          /*********************************************************************/
          DMNSIZE( ADL<qualified identifier> ) DMNMAX( <dimension size> )
          /*********************************************************************/
          /* For each dimension which has not been annotated map it as follows*/
          /*********************************************************************/
          DMNSIZE( <dimension size> )                                       ] )
      END
    OTHERWISE
        ARRAY
        DMNLST(
          DMNSIZE( <dimension size> )
          [{, DMNSIZE( <dimension size> )}...] )
  END
  IF (¬(status.dimension <= status.dimensions.current)) THEN
    DO
      [ ADL<TITLE attribute> ]
      [ ADL<NOTE attribute> ]
      [ ADL<HELP attribute> ]
      [ ADL<WHEN clause> ]
      OF
```

```
| |  /**********************************************************/
| |  /* The ADL mapping of <type specifier> as specified by    */
| |  /* the section in this chapter for the <data definition>. */
| |  /* The ADL mappings are modified somewhat for array.      */
| |  /* The identifier shown in the ADL mapping of the <data   */
| |  /* definition> for the type becomes the identifier for    */
| |  /* the ARRAY.  The ADLNODE for the type itself is encoded */
| |  /* with a NIL name field.                                 */
| |  /**********************************************************/
| |  LEAVE /* EXIT LOOP: ARRAY */
| └END
└END /* END OF LOOP: ARRAY */
/* Termination Section                                  */
/* END PROCEDURE: ARRAY                                 */
```

8.1.3.1 ADL Mapping Notes :

1. < field size > is the size of an array element in bits. See the section in this chapter describing < type specifier > and see the term *ADLFLDSIZ - Field Size in bits* in the ADL encodings for specification of calculating field size.

8.1.4 Exceptions :

0021E For array definitions, the C declaration translator requires that all dimensions must be specified.

Recovery: Give a size to all of the dimensions.

0022E The array size must be a positive integral constant.

Recovery: Change the array size to a positive integral constant.

0023W < type_specifier annotation > ignored because of preceding ASIS.

Explanation: An ASIS preceding the data definition causes the ADL description to be a single ASIS string. The only optional attributes encoded with this ASIS are those which follow the ASIS in the < array annotation >. Annotation following the < type specifier > is ignored.

Recovery: If it is important have the < type specifier annotation > encoded, then either (1) Move the ASIS to after the < type_specifier > data definition. (2) Move those attributes in the < type specifier annotation > which are valid in < array annotation > to before the data definition following the ASIS. Otherwise this warning message can be ignored.

8.1.5 Examples :

1.

```
/* C source declaration */
int samples[3] = {1, 2, 3}; /* initialized one dimension array */

/* ADL source declaration    */
samples : ARRAY DHNLST( DNMSIZE(3) ) OF BINARY;
```

2.

Unclassified

```
/* C/370 source declaration */
char numbers[2][2] = {21, 22},  /* two dimensional array */
                     {23, 24};  /* n(1)=2, n(2) = 2      */

/* ADL source declaration   */
numbers : ARRAY DMNLST( DMNSIZE(2), DMNSIZE(2) )
          OF BINARY PRECISION(8) SIGNED(FALSE);
```

3.

```
/* C source declaration */
short small_vals[3][2] /* ASIS; */;

/* ADL source declaration   */
small_vals : ARRAY DMNLST( DMNSIZE(3), DMNSIZE(2) )
             OF ASIS LENGTH(2) UNITLEN(8);
```

4.

```
/* C source declaration */
/* first dimension size = 6 */
short /* ADL ASIS; */ small_vals[3][2];

/* ADL source declaration   */
small_vals : ASIS LENGTH(12) UNITLEN(8);
```

5.

```
/* OS/2 C source declaration */
short int x; /* number of active elements in 1st dimension */
short int z; /* number of active elements in 3rd dimension */
double /* ADL DMNLST( DMNSIZE(x),,DMNSIZE(z) ); */ position[10][20][30];

/* ADL source declaration   */
x : BINARY PRECISION(15);
z : BINARY PRECISION(15);
position : ARRAY DMNLST ( DMNSIZE(x) DMNMAX(10),
                          DMNSIZE(20),
                          DMNSIZE(z) DMNMAX(30) )
           OF FLOAT2 LENGTH(64);
```

6.

```
/* C source declaration */
int /* ADL ASIS; */ samples[100][100] /* NOTE('Samples taken 07/17/91'); */;

/* ADL source declaration   */
/* ASIS LENGTH = 32 * 100 * 100 = 320,000 bits / 8 = 40000 bytes */
samples : ASIS LENGTH(40000) UNITLEN(8);
0023W  <type_specifier annotation> ignored because of preceding ASIS.
```

8.2 <bit-field data definition>

8.2.1 Function :

Bit-fields are signed or unsigned integers of a specified number of bits. Bit-fields can only be specified in a structure or union. Consecutive bit-fields are packed within a sequence of bytes. In C bit-fields are specified by following the member name with a constant expression which defines the number of bits the field will occupy.

OS/2 Only

NOTE

It is not possible to describe all IBM C Set/2 bit-fields using ADL. Though the bit-fields are allocated and follow the same rules as IBM C/370, they are stored byte reversed.

It is an error if system = OS/2 and the total length of a sequence of bit-fields, plus padding to fill out the last byte, is greater than 8. A bit-field which is not adjacent to any other bit field can have a size of 1 to 8 bits, 16 bits or 32 bits. Translate should map all ADL <BINARY> for OS/2 into 8, 16, or 32 bit integers.

End of OS/2 Only

8.2.2 Format :

```
<bit-field declarator> ::=
   [<attribute>] <identifier> : <bit-field size>

<bit-field data definition> ::=
   {
     [<attribute>] [<sign adjective>] int
   }
   {
     <bit-field declarator> [<initializer>] [<identifier annotation>]
   }
   [
     {
       , <bit-field declarator> [<initializer>] [<identifier annotation>]
     }...
   ]
   [<bit-field annotation>] ;

<bit-field size> ::= <integer constant>

<bit-field annotation> ::=
  {
    [ ASIS ]
```

```
    {
      [ ADL<TITLE attribute> ]
      [ ADL<NOTE attribute> ]
      [ ADL<HELP attribute> ]
    }!
  }
```

8.2.2.1 Format Notes :

1. < bit-field size > specifies the number of bits in the bit-field.
2. bit-fields are only allowed as part of a struct or union type.
3. A 1 bit, signed bit-field, precision 0, can hold a range of numbers from -1 to 0 using the C compiler. This can also be thought of as representing the states of either positive or negative, that is you only have a sign bit.

8.2.3 ADL Mapping :

System/370 Only

< bit-field data definition > *MAPS TO ADL:*

```
map_to_adl_id(<identifier>,ADL<qualified identifier>) :
/*-------------------------------------------------------*/
/* REXX PROCEDURE: BITFIELD      DATE: 05/05/92          */
/* Initialization Section                                */
/*-------------------------------------------------------*/
/*--------------------------------------------------------------------------*/
/* REXX PROCEDURE: ASISBIT       DATE: 12/16/91                             */
/* FUNCTION:  If annotated with ASIS then map to ASIS and return to caller. */
/* Initialization Section                                                   */
/*--------------------------------------------------------------------------*/
IF (pos('ASIS',<bit-field annotation>) <> 0) THEN
  DO
    ASIS
    UNITLEN(1)
    LENGTH(<bit-field size>)
    return                        /* return to caller                          */
  END
/* Termination Section                                                      */
/* END PROCEDURE: ASISBIT                                                   */
SELECT
  WHEN (<identifier> = '' & ADL<qualfified identifier> = '') THEN
    DO
      /**********************************************************/
      /* Field is an unnamed bit-field.  This is user specified */
      /* padding.  An unnamed bit field cannot have any         */
      /* attributes annotated.  It is mapped to the ADL<SKIP    */
      /* statement>.                                            */
      /**********************************************************/
      SKIP(<bit-field size>)
      ADL<terminator>
    END
  WHEN (<bit-field size> = 0) THEN
    DO
      /**********************************************************/
      /* Field is a zero length bit-field.  This causes the     */
      /* following field to be aligned on the next 32 bit       */
      /* boundary.  The declaration translator determines the   */er of  */
      /* bits of padding required to place the next field on    */
      /* this boundary and then sets an ADL<SKIP statement> to  */
      /* the a value equal to the required number of bits.      */
      /**********************************************************/
```

```
|  | ADL<SKIP statement>
|  └END
|  WHEN (<bit-field size> > 0 & <bit-field size> <= 32) THEN
|  ┌DO
|  |  /************************************************************/
|  |  /* A non-zero bit-field (0 < <bit-field size> <= 32).       */
|  |  /* This is mapped to BINARY.  In C bit fields are int's     */
|  |  /* (singed or unsigned) of a specified number of bits.      */
|  |  /************************************************************/
|  |  BINARY
|  |  LENGTH(<bit-field size>)
|  |  IF (<sign adjective> = 'signed') THEN
|  |   ┌DO
|  |   |  [ SIGNED(TRUE) ]
|  |   |  PRECISION(<bit-field size> - 1)
|  |   └END
|  |  ELSE
|  |   ┌DO
|  |   |  SIGNED(FALSE)
|  |   |  PRECISION(<bit-field size>)
|  |   └END
|  |  [ COMPLEX(FALSE) ]
|  |  [ BYTRVS(FALSE) ]
|  |  [ RADIX(2) ]
|  |  [ SCALE(0) ]
|  |  [ CONSTRAINED(FALSE) ]
|  |  [ FIT(TRUNCATE) ]
|  |  [ ADL<TITLE attribute> ]
|  |  [ ADL<NOTE attribute> ]
|  |  [ ADL<HELP attribute> ]
|  |  [ ADL<WHEN clause> ]
|  |  ADL<terminator>
|  └END
|  OTHERWISE
└END
/* Termination Section                                          */
/* END PROCEDURE: BITFIELD                                      */
```

End of System/370 Only

8.2.3.1 ADL Mapping Notes :

System/370 Only

1. A bit-field of length 0 forces the alignment of the next field to begin on the next 4 byte boundary. These fields do not generate an ADL declaration. They simply alter the alignment of the next declaration. bit-fields of length zero must be unnamed in C and cannot be referenced.

End of System/370 Only

2. An unnamed nonzero bit-field can be used for padding. This is mapped to an ADL <SKIP statement>.
3. bit-fields in a structure are packed starting from bit 0 (the high order bit). They are assigned from left to right (most significant bit to least significant bit).
4. When data of another type follows a bit-field, padding is added to place the next item on its natural boundary.
5. bit-fields can cross storage boundaries.

Unclassified

8.2.4 Exceptions :

Declaration of a bit-field cannot specify multiple sign adjectives.

Recovery: Only keep one sign adjective.

8.2.5 Examples :

1.

```
/* C source declaration */
struct {
            signed int latch : 1;   /* 1 bit  */
            int status : 4;         /* 4 bits */
            signed int : 0;         /* 0 bits */
            unsigned int x : 1;     /* 1 bit  */
            signed int : 3;         /* 3 bits */
            unsigned int error : 5; /* 5 bits */
       } sample ;


/* ADL source declaration   */
BEGIN;
  sample : RECORD OF
    SEQUENCE
    BEGIN;
      latch  : BINARY PRECISION(0) LENGTH(1);
      status : BINARY PRECISION(3) LENGTH(4);
      SKIP(27);
      x      : BINARY PRECISION(1) LENGTH(1) SIGNED(FALSE);
      "4"    : BINARY PRECISION(2) LENGTH(3);
      error  : BINARY PRECISION(5) LENGTH(5) SIGNED(FALSE);
    END;
END;
```

8.3 <boolean_t data definition>

8.3.1 Function :

The boolean_t typedef is provided to facilitate access to and conversions between other languages which provide boolean or logical types with various internal encodings. The boolean_t typedef declares a two valued enumeration of {FALSE, TRUE}. Including this typedef and using it in declarations will result in data described by the ADL <BOOLEAN> type. C source text translated and then generated from an ADLDCLSPC in other representation domains will include this typedef if those domains contain the ADL <BOOLEAN> type.

8.3.2 Format :

```
<boolean_t declarator> ::=
   [<array annotation>] [<attribute>] <identifier> [<subscript declarator>]

<boolean_t data definition> ::=
   {
     [<storage class>] [<attribute>] boolean_t
   }
   {
     <boolean_t declarator> [<initializer>] [<identifier annotation>]
   }
   [
     {
       , <boolean_t declarator> [<initializer>] [<identifier annotation>]
     }...
   ]
   [<boolean_t annotation>] ;

<boolean_t annotation> ::=
   {
     [ ASIS ]
     {
       [ ADL<TITLE attribute> ]
       [ ADL<NOTE attribute> ]
       [ ADL<HELP attribute> ]
       [ ADL<WHEN clause> ]
     }!
   }
   ADL<terminator>
```

8.3.2.1 Format Notes :

1. In order to use the boolean_t type you must include the following in your data description before the first use of boolean_t.

```
<boolean_t data declaration> ::=
   typedef enum {FALSE, TRUE} boolean_t /* ADL BOOLEAN; */;
```

Unclassified

8.3.3 ADL Mapping :

<boolean_t data definition> *MAPS TO ADL:*

```
map_to_adl_id(<identifier>,ADL<qualified identifier>) :
/*-------------------------------------------------------*/
/* REXX PROCEDURE: BOOLEANT       DATE: 12/16/91         */
/* Initialization Section                                */
/*-------------------------------------------------------*/
/*-----------------------------------------------------------------------------*/
/* REXX PROCEDURE: ASISBLNT       DATE: 12/16/91                               */
/* FUNCTION:  If annotated with ASIS then map to ASIS and return to caller.    */
/* Initialization Section                                                      */
/*-----------------------------------------------------------------------------*/
If (pos('ASIS',<boolean_t annotation>) <> 0) THEN
 ┌DO
 │ ASIS
 │ [ UNITLEN(8) ]
 │ LENGTH(1)
 │ return                        /* return to caller                           */
 └END
/* Termination Section                                                         */
/* END PROCEDURE: ASISBLNT                                                     */
boolean_t                     /* ADL<subtype instance>   */
[ ADL<TITLE attribute> ]      /* attribute override      */
[ ADL<NOTE attribute> ]       /* attribute override      */
[ ADL<HELP attribute> ]       /* attribute override      */
[ ADL<WHEN clause> ]          /* attribute override      */
ADL<terminator>
/* Termination Section                                   */
/* END PROCEDURE: BOOLEANT                               */
```

<boolean_t data declaration> *MAPS TO ADL:*

```
map_to_adl_id(<identifier>,ADL<qualified identifier>) :
/*-------------------------------------------------------*/
/* REXX PROCEDURE: BOOLEAND       DATE: 07/24/91         */
/* Initialization Section                                */
/*-------------------------------------------------------*/
IF (<enumerator list> <> FALSE, TRUE) THEN
    ec = ERROR(E,'0025E')
ELSE
 ┌DO
 │  SUBTYPE OF BOOLEAN
 │  [ LENGTH(8) ]
 │  [ BLNENC(LSTBIT) ]
 │  [ BYTRVS(FALSE) ]
 │  [ ADL<TITLE attribute> ]
 │  [ ADL<NOTE attribute> ]
 │  [ ADL<HELP attribute> ]
 │  [ ADL<WHEN clause> ]
 │  ADL<terminator>
 └END
/* Termination Section                                   */
/* END PROCEDURE: BOOLEAND                               */
```

8.3.3.1 ADL Mapping Notes :

1. If <subscript declarator> is specified, then this is an array of boolean_t, where the array is mapped as specified by 8.1, "<array data definition>" on page 111.
2. If <array annotation> includes ASIS, then the entire array of boolean_t is mapped as a single ASIS string as specified by 8.1, "<array data definition>" on page 111

8.3.4 Exceptions :

0024E Missing data declaration for boolean_t.

Explanation: A boolean_t data definition was found but there was not a data declaration of boolean_t.

Recovery: Include the boolean_t typedef in your data description before the first boolean_t data definition.

0025E The enumerators are incorrect in the boolean_t typedef.

Explanation: The enumerators in the typedef enum for boolean_t are required to be { FALSE, TRUE } in the order listed.

8.3.5 Examples:

1.

```
/* C source declaration */
/* Include boolean_t typedef and define boolean_t variables */
typedef enum {FALSE, TRUE} boolean_t /* ADL BOOLEAN; */;
boolean_t target_found, end_of_file;

/* ADL source declaration    */
boolean_t : SUBTYPE OF BOOLEAN LENGTH(8);
target_found : end_of_file : boolean_t;
```

2.

```
/* C typedef declaration and usage of boolean_t */
typedef enum { FALSE, TRUE } boolean_t /* ADL BOOLEAN; */;
boolean_t truth_values[8][3];

/* ADL mapping of the above */
boolean_t : SUBTYPE OF BOOLEAN LENGTH(8) BLNENC(LSTBIT);
truth_values : ARRAY DMNLST( DMNSIZE(8), DMNSIZE(3)
  OF boolean_t;
```

8.4 <char data definition>

8.4.1 Function :

A single character. In C a character declared as char is stored as an integer in one byte. If only char is specified in a C program, the compiler defaults to unsigned char.

8.4.2 Format :

```
<char declarator> ::=
   [<attribute>]<identifier>

<char data definition> ::=
     {
       [<storage class>]
       [<attribute>]
       [<sign adjective>]
       char
     }
     {
       <char declarator>
       [<initializer>]
       [<identifier annotation>]
     }
     [
       {
         , <char declarator>
         [<initializer>]
         [<identifier annotation>]
       }...
     ]
     [<char annotation>] ;
<char annotation> ::=
   {
     ASIS
     {
       [ ADL<TITLE attribute> ]
       [ ADL<NOTE attribute> ]
       [ ADL<HELP attribute> ]
       [ ADL<WHEN clause> ]
     }!
   }
 | {
     [ ADL<CCSID attribute> ]
     [ ADL<TITLE attribute> ]
     [ ADL<NOTE attribute> ]
     [ ADL<HELP attribute> ]
     [ ADL<WHEN clause> ]
   }!
 | {
     BINARY
     {
```

```
      [ ADL<FIT attribute> ]
      [ ADL<CONSTRAINED attribute> ]
      [ ADL<TITLE attribute> ]
      [ ADL<NOTE attribute> ]
      [ ADL<HELP attribute> ]
      [ ADL<WHEN clause> ]
    }!
  }
ADL<terminator>
```

8.4.2.1 Format Notes

1. If only char is specified, the compiler defaults to unsigned char. However, this default can be changed by including the preprocessor directive `#pragma chars (signed)` in the program. This changes the default to signed char.

2. See 8.13, " < string data definition > " on page 158 for the declaration and ADL Mapping of an array of char. The C declaration translator's default is to map a char with a dimension as a string, but through annotation this can also be mapped as an array of single byte characters.

8.4.3 ADL Mapping :

< char data definition > *MAPS TO ADL:*

```
map_to_adl_id(<identifier>,ADL<qualified identifier>) :
/*--------------------------------------------*/
/* REXX PROCEDURE: CHAR         DATE: 12/16/91 */
/* Initialization Section                      */
/*--------------------------------------------*/
CHAR:
SELECT
  WHEN (pos('ASIS',<char annotation>) <> 0) THEN
   DO
     ASIS                /* annotated with ASIS    */
     [ UNITLEN(8) ]
     LENGTH(1)
   END
  WHEN (pos('BINARY',<char annotation>) <> 0) THEN
   DO
     BINARY              /* annotated with BINARY  */
     LENGTH(8)
     SELECT
       WHEN (<sign adjective> = 'signed') THEN
        DO
          PRECISION(7)
          SIGNED(TRUE)
        END
       WHEN (<sign adjective> = 'unsigned') THEN
        DO
          PRECISION(8)
          SIGNED(FALSE)
        END
       WHEN (#pragma chars (signed)) THEN
        DO
          PRECISION(7)
          SIGNED(TRUE)
```

Unclassified

```
|   |   |   └END
|   |   |   OTHERWISE
|   |   |       PRECISION(8)
|   |   |       SIGNED(FALSE)
|   |   └END
|   |    [ FIT(TRUNCATE) ]
|   |    [ CONSTRAINED(FALSE) ]
|   |    [ SCALE(0) ]
|   |    [ RADIX(2) ]
|   |    [ BYTRVS(FALSE) ]
|   |    [ COMPLEX(FALSE) ]
|   └END
|   OTHERWISE
|       CHAR
|       [ UNITLEN(8) ]
|       LENGTH(1)
|       [ CCSID(0) ]
|       [ JUSTIFY(LEFT) ]
└END
/* Termination Section */
[ ADL<TITLE attribute> ]
[ ADL<NOTE attribute> ]
[ ADL<HELP attribute> ]
[ ADL<WHEN clause> ] ;
/* END PROCEDURE: CHAR */
```

8.4.3.1 ADL Mapping Notes :

1. CCSID specifies the coded character set identifier of the character string. The default value indicates the CCSID is inherited from the file CCSID.
2. The character can be declared as signed char or unsigned char. For purposes of data description and conversion of a < char data definition >, these are equivalent.

However, the < sign adjective > is significant in determining the ADL < SIGNED attribute > if the < char annotation > includes BINARY, making the ADL type ADL < BINARY >.

8.4.4 Exceptions :

0026E Declaration of a char cannot specify multiple sign adjectives.

Recovery: Only keep one sign adjective.

0027E Length adjective long or short cannot be used with char.

Recovery: Remove the length adjective or try using int.

8.4.5 Examples :

1.

```
/* C source declaration */
char temp_char;

/* ADL source declaration   */
temp_char : CHAR;
```

Unclassified

2.

```
/* C source declaration */
char last_char = 'h';          /* initialized to h = x'88'   */

/* ADL source declaration   */
last_char : CHAR;
```

3.

```
/* C source declaration */
char next_char /* ADL ASIS ; */;

/* ADL source declaration   */
next_char : ASIS LENGTH(1);
```

4.

```
/* C source declaration */
signed char count /* ADL BINARY FIT(ROUND) ; */;

/* ADL source declaration   */
count : BINARY PRECISION(7) LENGTH(8) FIT(ROUND)
```

5.

```
/* C source declaration */
unsigned char count /* ADL BINARY CONSTRAINED(TRUE); */;

/* ADL source declaration   */
count : BINARY PRECISION(8) LENGTH(8) SIGNED(FALSE) CONSTRAINED(TRUE);
```

8.5 <double data definition>

8.5.1 Function :

A double length floating point number. The range of values and the approximate decimal digits of precision vary depending on the system.

IBM C Set/2

Approximate decimal range and digits of precision

```
0.223*(10**-307) <= |x| <= 0.180*(10**309)
15 decimal digits of precision
```

IBM C/370

Approximate decimal range and digits of precision

```
0.540*(10**-78) <= |x| <= 0.724*(10**76)
15 decimal digits of precision
```

8.5.2 Format :

```
<double declarator> ::=
   [<array annotation>] [<attribute>]<identifier> [<subscript declarator>]

<double data definition> ::=
   {
     [<storage class>] [<attribute>] double
   }
   {
     <double declarator> [<initializer>] [<identifier annotation>]
   }
   [
     {
       , <double declarator> [<initializer>] [<identifier annotation>]
     }...
   ]
   [<double annotation>] ;

<double annotation> ::=
  [ ASIS ]
  {
    [ ADL<TITLE attribute> ]
    [ ADL<NOTE attribute> ]
    [ ADL<HELP attribute> ]
    [ ADL<WHEN clause> ]
  }!
  ADL<terminator>
```

8.5.2.1 Format Notes :

System/370 Only

1. Normalization may result in the leading 3 bits of the first hex digit being zero. Therefore, the maximum guaranteed binary precision is 53 bits.

End of System/370 Only

8.5.3 ADL Mapping :

<double data definition> *MAPS TO ADL:*

```
map_to_adl_id(<identifier>,ADL<qualified identifier>) :
/*-----------------------------------------------------*/
/* REXX PROCEDURE: DOUBLE        DATE: 12/16/91         */
/* Initialization Section                               */
/*-----------------------------------------------------*/
IF (pos('ASIS',<double annotation>) <> 0) THEN
  ┌DO
  │  ASIS
  │  [ UNITLEN(8) ]
  │  LENGTH(8)
  └END
ELSE
  ┌DO
  │  IF (status.system = 'OS/2') THEN
  │    ┌DO
  │    │  FLOAT2
  │    │  [ BYTRVS(TRUE) ]
  │    └END
  │  ELSE
  │    ┌DO
  │    │  FLOAT16
  │    │  [ BYTRVS(FALSE) ]
  │    └END
  │  [ COMPLEX(FALSE) ]
  │  [ RADIX(2) ]
  │  [ FIT(TRUNCATE) ]
  │  LENGTH(64)
  └END
[ ADL<TITLE attribute> ]
[ ADL<NOTE attribute> ]
[ ADL<HELP attribute> ]
[ ADL<WHEN clause> ]
[ ADL<terminator> ]
/* Termination Section                                  */
/* END PROCEDURE: DOUBLE                                */
```

8.5.3.1 ADL Mapping Notes :

1. If <subscript declarator> is specified, then this is an array of double, where the array is mapped as specified by 8.1, "<array data definition>" on page 111.
2. If <array annotation> includes ASIS, then the entire array of double is mapped as a single ASIS string as specified by 8.1, "<array data definition>" on page 111

Unclassified

8.5.4 Exceptions :

0028E Sign adjectives cannot be used with double.

Recovery: Remove the sign adjective.

0029E Length adjective short cannot be used with double.

Recovery: Remove the length adjective.

8.5.5 Examples :

1.

```
/* OS/2 C source declaration */
double mass_sample_1;

/* ADL source declaration   */
mass_sample_1 : FLOAT2 LENGTH(64);
```

2.

```
/* C/370 source declaration */
double mass_sample_2 = 1.2e-68; /* initialized to 1.2e-68 */

/* ADL source declaration   */
mass_sample_2 : FLOAT16 LENGTH(64);
```

3.

```
/* C source declaration */
double mass_sample_3 /* ADL ASIS; */; /* suppress conversions */

/* ADL source declaration   */
mass_sample_3 : ASIS LENGTH(8) UNITLEN(8);
```

4.

```
/* C/370 source declaration */
double mass[1000];

/* ADL source declaration   */
mass : ARRAY DMNLST( DMNSIZE(1000) )
  OF FLOAT16 LENGTH(64);
```

5.

```
/* C/370 source declaration */
double distance[200] /* ADL ASIS; */;

/* ADL source declaration   */
distance : ARRAY DMNLST( DMNSIZE(200) )
  OF ASIS LENGTH(8) UNITLEN(8);
```

6.

```
/* C/370 source declaration */

double /* ADL ASIS */ distance[100];

/* ADL source declaration   */
distance : ASIS LENGTH(800) UNITLEN(8);
```

8.6 <enumeration data declaration>

8.6.1 Function :

An enumeration represents a set of programmer defined values. Each enumeration constant represents an integer value. Enumeration constants can be used anywhere an integer constant is valid. Enumeration variables can be initialized by enumeration constants or integers. The compiler determines the enumeration constant value by the following rules:

1. If an equal sign and an integral constant expression follows the identifier, the identifier represents the value of the integral constant expression.
2. Otherwise, if the enumerator is the first in the list, it represents zero.
3. Otherwise, the identifier represents one greater than the value of the preceding enumerator.

An <enumeration data declaration> does not declare any storage. It is mapped to an ADL<SUBTYPE>.

8.6.2 Format :

```
<enumeration data declaration> ::=
   [<array annotation>]
   [<attribute>] enum <enum tag> [<identifier annotation>]
   ►{<enumeration list>►}
   [<enumeration annotation>] ;
```

8.6.2.1 Format Notes :

1. Enumeration data items are mapped to the minimum applicable type which can hold the largest defined enumeration constant for that enumeration type.

System/370 Only

Enumeration is mapped to signed char, signed short int, or signed int.

End of System/370 Only

OS/2 Only

Enumeration is mapped to signed char, unsigned char, signed short int, unsigned short int, signed int, or unsigned int.

End of OS/2 Only

2. For a definition of <enum tag> see 8.7, "<enumeration data definition>" on page 136.
3. For a definition of <enumeration list> see 8.7, "<enumeration data definition>" on page 136.

4. For a definition of <enumeration annotation> see 8.7, "<enumeration data definition>" on page 136.

8.6.3 ADL Mapping :

<enumeration data declaration> *MAPS TO ADL:*

```
map_to_adl_id(<identifier>,ADL<qualified identifier>) :
/*-------------------------------------------------------*/
/* REXX PROCEDURE: ENUND         DATE: 12/16/91          */
/* Initialization Section                                */
/*-------------------------------------------------------*/
/*------------------------------------------------------------------------*/
/* REXX INLINE PROCEDURE: SETLENG      DATE: 12/16/91                      */
/* Initialization Section                                                  */
/*------------------------------------------------------------------------*/
IF (if status.system = 'OS/2') THEN
  DO
    /*-------------------------------------------------------*/
    /* REXX INLINE PROCEDURE: ENUNLEN2     DATE: 12/16/91     */
    /*-------------------------------------------------------*/
    x = max( abs( min(<enumeration list>) ), abs( max(<enumeration list>) ) )
    IF (min(<enumeration list>) <= 0) THEN
      DO
        e_sign = TRUE
        SELECT
          WHEN (x <= 128) THEN
              e_length = 8
          WHEN (x <= 32768) THEN
              e_length = 16
          WHEN (x <= 2,147,483,648) THEN
              e_length = 32
          OTHERWISE
              call exception(E,'<enumeration constant> out of range')
        END
      END
    ELSE
      DO
        e_sign = FALSE
        SELECT
          WHEN (x <= 255) THEN
              e_length = 8
          WHEN (x <= 65535) THEN
              e_length = 16
          WHEN (x <= 4,294,967,295) THEN
              e_length = 32
          OTHERWISE
              call exception(E,'<enumeration constant> out of range')
        END
      END
    /* Termination Section                                   */
    /* END PROCEDURE: ENUNLEN2                               */
  END
ELSE
  DO
    /*-------------------------------------------------------*/
    /* REXX INLINE PROCEDURE: ENUNLEN      DATE: 12/16/91     */
    /*-------------------------------------------------------*/
    SELECT
      WHEN (max(<enumeration list>) <= 127) THEN
        DO
          e_length = 8
          e_sign = TRUE
        END
      WHEN (max(<enumeration list>) <= 32767) THEN
        DO
          e_sign = TRUE
          e_length = 16
```

```
        END
      WHEN (max(<enumeration list>) <= 2,147,483,647) THEN
        DO
          e_sign = TRUE
          e_length = 32
        END
      OTHERWISE
    END
    /* Termination Section                                  */
    /* END PROCEDURE: ENUMLEN                               */
  END
/* Termination Section                                                   */
/* END PROCEDURE: SETLENG                                                */
/*-----------------------------------------------------------------------*/
/* REXX PROCEDURE: ASISENMD      DATE: 12/16/91                          */
/* FUNCTION:  If annotated with ASIS then map to ASIS and return to caller.  */
/* Initialization Section                                                */
/*-----------------------------------------------------------------------*/
IF (pos('ASIS',<enumeration annotation>) <> 0) THEN
  DO
    map_to_adl_id(<typedef identifier>,ADL<qualifier identifier>) :
    SUBTYPE OF ASIS
    [ UNITLEN(8) ]
    LENGTH(e_length / 8)
    return                          /* return to caller                  */
  END
/* Termination Section                                                   */
/* END PROCEDURE: ASISENMD                                               */
IF (<enum tag> <> '') THEN
  DO
    map_to_adl_id(<enum tag>,ADL<qualifier identifier>) :
    SUBTYPE OF ENUMERATION
    SELECT
      WHEN (e_length = 8) THEN
           [ BYTRVS(FALSE) ]
      WHEN (status.system = 'OS/2') THEN
           BYTRVS(TRUE)
      OTHERWISE
           [ BYTRVS(FALSE) ]
    END
    /*******************************************************/
    /* If LENGTH(8) and/or SIGNED(TRUE) then these         */
    /* attributes have default values and will not be      */
    /* encoded in the ADLDCLSPC.                           */
    /*******************************************************/
    LENGTH(e_length)
    SIGNED(e_sign)
    [ ADL<TITLE attribute> ]
    [ ADL<NOTE attribute> ]
    [ ADL<HELP attribute> ]
    [ ADL<WHEN clause> ]
    /**********************************************************/
    /* Now map the <enumeration list>.  The <enumerator>s,    */
    /* plus their values if they were explicitly set, are     */
    /* stored with the ADL<ENUMERATION> type.  The equal sign */
    /* used in C to assign a value is replaced by a colon (:) */
    /* in ADL.                                                */
    /**********************************************************/
    adlmap(<enumeration list>)
    ADL<terminator>
  END
ELSE
     ec = EXCETPTION(E,'0030E')
/* Termination Section                                  */
/* END PROCEDURE: ENUMD                                 */
```

8.6.3.1 ADL Mapping Notes :

1. None

8.6.4 Exceptions :

0030E An enum data declaration must specify an enum tag.

Recovery: Add the enum tag or turn the declaration into a data definition by adding <enumeration declarator>s.

0031E The enum constants must be specified when the enum tag is declared.

Recovery: Add the list of enum constants in the enum tag declaration.

0032E Enumeration constant must be an integral constant expression.

Recovery: Change the initializer of the enumeration constant to be a constant expression.

0033E An incomplete enum tag cannot be used in a declaration.

Recovery: Give a definition of the tag before it is used in the declaration of an object or in the declaration itself.

0034E Length adjectives cannot be used with enums.

Recovery: Remove the length adjective.

0035E Sign adjectives cannot be used with enums.

Recovery: Remove the sign adjective.

System/370 Only

0036E The maximum <enumerator> value cannot exceed 2,147,483,647.

Recovery: Remove any <enumerator>s with values greater than 2,147,483,647.

End of System/370 Only

OS/2 Only

0037E The maximum <enumerator> value cannot exceed 4,294,967,295.

Recovery: Remove any <enumerator>s with values greater than 4,294,967,295.

End of OS/2 Only

8.6.5 Examples

1.

```
/* C source declaration */
enum colors {RED,YELLOW,BLUE,GREEN=7,WHITE};

/* ADL source declaration   */
colors : SUBTYPE OF ENUMERATION
  LENGTH(8) BYTRVS(FALSE) (RED,YELLOW,BLUE,GREEN:7,WHITE);
```

8.7 <enumeration data definition>

8.7.1 Function :

An enumeration represents a set of programmer defined values. Each enumeration constant represents an integer value. Enumerations constants can be used anywhere an integer constant is valid. Enumerations variables can be initialized by enumeration constants or integers. The compiler determines the enumeration constant value by the following rules:

1. If an equal sign and an integral constant expression follows the identifier, the identifier represents the value of the integral constant expression.
2. Otherwise, if the enumerator is the first in the list, it represents zero.
3. Otherwise, the identifier represents one greater than the value of the preceding enumerator.

8.7.2 Format :

```
<enumeration declarator> ::=
   [<attribute>] <identifier> [<subscript declarator>]

<enumeration data definition> ::=
   [<array annotation>]
   {
     [<storage class>] [<attribute>] enum
     [<enum tag>] [<identifier annotation>]
   }
   ►{<enumeration list>►}
   {
     <enumeration declarator> [<initializer>] [<identifier annotation>]
   }
   [
     {
       , <enumeration declarator> [<initializer>] [<identifier annotation>]
     }...
   ]
   [<enumeration annotation>] ;

<enumeration list> ::=
   <enumerator>[, <enumerator>]...

<enumerator> ::=
   <enumeration constant>
   [= <integral constant expression>]

<enum tag> ::= <identifier>

<enumeration annotation> ::=
  {
    [ ASIS ]
    {
```

Unclassified

```
        [ ADL<TITLE attribute> ]
        [ ADL<NOTE attribute> ]
        [ ADL<HELP attribute> ]
        [ ADL<WHEN clause> ]
    }!
}
ADL<terminator>
```

8.7.2.1 Format Notes :

1. Enumeration data items are mapped to the minimum applicable type which can hold the largest defined enumeration constant for that enumeration type.

System/370 Only

Enumeration is mapped to signed char, signed short int, or signed int.

End of System/370 Only

OS/2 Only

Enumeration is mapped to signed char, unsigned char, signed short int, unsigned short int, signed int, or unsigned int.

End of OS/2 Only

8.7.3 ADL Mapping :

< enumeration data definition > *MAPS TO ADL:*

```
map_to_adl_id(<identifier>,ADL<qualified identifier>) :
/*-------------------------------------------------------*/
/* REXX PROCEDURE: ENUM          DATE: 12/16/91          */
/* Initialization Section                                */
/*-------------------------------------------------------*/
IF (<enumeration list> = '') THEN
    call EXCEPTION(E,'Incomplete enum data definition')
ELSE
  DO
    /*-------------------------------------------------------*/
    /* REXX INLINE PROCEDURE: ENUMMAP      DATE: 12/16/91    */
    /*-------------------------------------------------------*/
    /*-------------------------------------------------------------------------*/
    /* REXX INLINE PROCEDURE: SETLENG      DATE: 12/16/91                      */
    /* Initialization Section                                                  */
    /*-------------------------------------------------------------------------*/
    IF (if status.system = 'OS/2') THEN
      DO
        /*-----------------------------------------------------*/
        /* REXX INLINE PROCEDURE: ENUMLEN2     DATE: 12/16/91  */
        /*-----------------------------------------------------*/
        x = max( abs( min(<enumeration list>) ), abs( max(<enumeration list>) ) )
        IF (min(<enumeration list>) <= 0) THEN
          DO
            e_sign = TRUE
            SELECT
              WHEN (x <= 128) THEN
                  e_length = 8
              WHEN (x <= 32768) THEN
                  e_length = 16
```

Unclassified

```
WHEN (x <= 2,147,483,648) THEN
    e_length = 32
OTHERWISE
    call exception(E,'<enumeration constant> out of range')
END
END
ELSE
DO
  e_sign = FALSE
  SELECT
    WHEN (x <= 255) THEN
        e_length = 8
    WHEN (x <= 65535) THEN
        e_length = 16
    WHEN (x <= 4,294,967,295) THEN
        e_length = 32
    OTHERWISE
        call exception(E,'<enumeration constant> out of range')
  END
END
/* Termination Section                                   */
/* END PROCEDURE: ENUMLEN2                               */
END
ELSE
DO
  /*-----------------------------------------------------*/
  /* REXX INLINE PROCEDURE: ENUMLEN       DATE: 12/16/91  */
  /*-----------------------------------------------------*/
  SELECT
    WHEN (max(<enumeration list>) <= 127) THEN
      DO
        e_length = 8
        e_sign = TRUE
      END
    WHEN (max(<enumeration list>) <= 32767) THEN
      DO
        e_sign = TRUE
        e_length = 16
      END
    WHEN (max(<enumeration list>) <= 2,147,483,647) THEN
      DO
        e_sign = TRUE
        e_length = 32
      END
    OTHERWISE
  END
  /* Termination Section                                 */
  /* END PROCEDURE: ENUMLEN                              */
END
/* Termination Section                                                  */
/* END PROCEDURE: SETLENG                                               */
/*----------------------------------------------------------------------*/
/* REXX PROCEDURE: ASISENMF     DATE: 12/16/91                          */
/* FUNCTION:  If annotated with ASIS then map to ASIS and return to caller. */
/* Initialization Section                                               */
/*----------------------------------------------------------------------*/
IF (pos('ASIS',<enumeration annotation>) <> 0) THEN
  DO
    map_to_adl_id(<identifier>,ADL<qualifier identifier>) :
    ASIS
    [ UNITLEN(8) ]
    LENGTH(e_length / 8)
    return                        /* return to caller                   */
  END
/* Termination Section                                                  */
/* END PROCEDURE: ASISENMF                                              */
IF (<enum tag> <> '') THEN
  DO
```

```
      map_to_adl_id(<enum tag>,ADL<qualifier identifier>) :
      SUBTYPE OF ENUMERATION
    END
  ELSE
    DO
      map_to_adl_id(<identifier>,ADL<qualified identifier>) :
      ENUMERATION
    END
  SELECT
    WHEN (e_length = 8) THEN
        [ BYTRVS(FALSE) ]
    WHEN (status.system = 'OS/2') THEN
        BYTRVS(TRUE)
    OTHERWISE
        [ BYTRVS(FALSE) ]
  END
  LENGTH(e_length)
  SIGNED(e_sign)
  /* Termination Section                                    */
  /* END PROCEDURE: ENUMMAP                                 */
  [ ADL<TITLE attribute> ]
  [ ADL<NOTE attribute> ]
  [ ADL<HELP attribute> ]
  [ ADL<WHEN clause> ]
  /**********************************************************/
  /* Now map the <enumeration list>.  The <enumerator>s     */
  /* plus their values if they were explicitly set are      */
  /* stored with the ADL<ENUMERATION> type.  The equal sign */
  /* used in C to assign a value is replaced by a colon (:) */
  /* in ADL.                                                */
  /**********************************************************/
  adlmap(<enumeration list>)
  ADL<terminator>
  IF (<enum tag> <> '') THEN
    DO
      /**********************************************************/
      /* Now create an ADL<subtype instance>.  This is created  */
      /* whenever an <enum tag> is included. If an <enumeration */
      /* list> was not included then this <enum tag>            */
      /* must have been previously declarated in an             */
      /* <enumeration data declaration> which is mapped to an   */
      /* ADL<SUBTYPE statement>.                                */
      /**********************************************************/
      map_to_adl_id(<identifier>,ADL<qualified identifier>) :
      map_to_adl_id(<enum tag>,ADL<qualifier identifier>)
       [ ADL<TITLE attribute> ]
       [ ADL<NOTE attribute> ]
       [ ADL<HELP attribute> ]
       [ ADL<WHEN clause> ]
       [ ADL<terminator> ]
    END
END
/* Termination Section                                    */
return
/* END PROCEDURE: ENUM                                    */
```

8.7.3.1 ADL Mapping Notes :

1. None

8.7.4 Exceptions :

0038E The enum constants must be specified when the enum tag is declared.

Recovery: Add the list of enum constants in the enum tag declaration.

0039E Enumeration constant must be an integral constant expression.

Recovery: Change the initializer of the enumeration constant to be a constant expression.

0040E An incomplete enum tag cannot be used in a declaration.

Recovery: Give a definition of the tag before it is used in the declaration of an object or in the declaration itself.

0041E Length adjectives cannot be used with enums.

Recovery: Remove the length adjective.

0042E Sign adjectives cannot be used with enums.

Recovery: Remove the sign adjective.

8.7.5 Examples

1.

```
/* IBM C Set/2 source declaration */
enum codes /* ADL NOTE('Sample enumeration declaration') */
   {x0=1,x1=10,x2=100,x3=1000,x4=10000};

const enum codes xcode /* ADL NOTE('Sample enumeration definition') */
static enum codes const ycode;

/* ADL source declaration   */
codes : SUBTYPE OF ENUMERATION LENGTH(16) BYTRVS(TRUE)
        NOTE('Sample enumeration declaration')
        (x0:1,x1:10,x2:100,x3:1000,x4:10000);
 xcode : codes NOTE('Sample enumeration definition');
 ycode : codes;
```

2.

```
/* C data declaration and definition */
enum error_types
  {information=4, warning=8, error=16, severe=20}
  io_errors, parameter_errors, user_errors;

/* ADL mapping of the above */
error_types : SUBTYPE OF ENUMERATION
  LENGTH(8) BYTRVS(FALSE)
  (information:4, warning:8, error:16, severe:20);

io_errors : parameter_errors : user_errors : error_types;
```

Unclassified

8.8 <enumeration typedef data declaration>

8.8.1 Function :

An enumeration represents a set of programmer defined values. Each enumeration constant represents an integer value. Enumerations constants can be used anywhere an integer constant is valid. Enumerations variables can be initialized by enumeration constants or integers. The compiler determines the enumeration constant value by the following rules:

1. If an equal sign and an integral constant expression follows the identifier, the identifier represents the value of the integral constant expression.
2. Otherwise, if the enumerator is the first in the list, it represents zero.
3. Otherwise, the identifier represents one greater than the value of the preceding enumerator.

An <enumeration typedef data declaration> does not declare any storage. It is mapped to an ADL<SUBTYPE>.

8.8.2 Format :

```
<enumeration typedef data declaration> ::=
   [<array annotation>]
   typedef
   [<attribute>] enum [<identifier annotation>]
   ►{<enumeration list>►} <typedef identifier>
   [<enumeration annotation>] ;
```

8.8.2.1 Format Notes :

1. Enumeration data items are mapped to the minimum applicable type which can hold the largest defined enumeration constant for that enumeration type. The types to which an enum is mapped by C are :

System/370 Only

Enumeration is mapped to signed char, signed short int, or signed int.

End of System/370 Only

OS/2 Only

Enumeration is mapped to signed char, unsigned char, signed short int, unsigned short int, signed int, or unsigned int.

End of OS/2 Only

2. For a definition of <enum tag> see 8.7, "<enumeration data definition>" on page 136.

3. For a definition of <enumeration list> see 8.7, "<enumeration data definition>" on page 136.

4. For a definition of <enumeration annotation> see 8.7, "<enumeration data definition>" on page 136.

8.8.3 ADL Mapping :

<enumeration typedef data declaration> *MAPS TO ADL:*

```
map_to_adl_id(<identifier>,ADL<qualified identifier>) :
/*------------------------------------------------------*/
/* REXX PROCEDURE: ENUNT          DATE: 12/16/91        */
/* Initialization Section                               */
/*------------------------------------------------------*/
/*----------------------------------------------------------------------------*/
/* REXX INLINE PROCEDURE: SETLENG      DATE: 12/16/91                         */
/* Initialization Section                                                     */
/*----------------------------------------------------------------------------*/
IF (if status.system = 'OS/2') THEN
  DO
    /*------------------------------------------------------*/
    /* REXX INLINE PROCEDURE: ENUNLEN2      DATE: 12/16/91   */
    /*------------------------------------------------------*/
    x = max( abs( min(<enumeration list>) ), abs( max(<enumeration list>) ) )
    IF (min(<enumeration list>) <= 0) THEN
      DO
        e_sign = TRUE
        SELECT
          WHEN (x <= 128) THEN
              e_length = 8
          WHEN (x <= 32768) THEN
              e_length = 16
          WHEN (x <= 2,147,483,648) THEN
              e_length = 32
          OTHERWISE
              call exception(E,'<enumeration constant> out of range')
        END
      END
    ELSE
      DO
        e_sign = FALSE
        SELECT
          WHEN (x <= 255) THEN
              e_length = 8
          WHEN (x <= 65535) THEN
              e_length = 16
          WHEN (x <= 4,294,967,295) THEN
              e_length = 32
          OTHERWISE
              call exception(E,'<enumeration constant> out of range')
        END
      END
    /* Termination Section                                   */
    /* END PROCEDURE: ENUNLEN2                               */
  END
ELSE
  DO
    /*------------------------------------------------------*/
    /* REXX INLINE PROCEDURE: ENUNLEN      DATE: 12/16/91    */
    /*------------------------------------------------------*/
    SELECT
      WHEN (max(<enumeration list>) <= 127) THEN
        DO
          e_length = 8
          e_sign = TRUE
        END
```

Unclassified

```
      WHEN (max(<enumeration list>) <= 32767) THEN
        DO
          e_sign = TRUE
          e_length = 16
        END
      WHEN (max(<enumeration list>) <= 2,147,483,647) THEN
        DO
          e_sign = TRUE
          e_length = 32
        END
      OTHERWISE
    END
    /* Termination Section                                        */
    /* END PROCEDURE: ENUMLEN                                     */
  END
/* Termination Section                                                      */
/* END PROCEDURE: SETLENG                                                   */
/*-------------------------------------------------------------------------*/
/* REXX PROCEDURE: ASISENMD      DATE: 12/16/91                            */
/* FUNCTION:  If annotated with ASIS then map to ASIS and return to caller. */
/* Initialization Section                                                   */
/*-------------------------------------------------------------------------*/
IF (pos('ASIS',<enumeration annotation>) <> 0) THEN
  DO
    map_to_adl_id(<typedef identifier>,ADL<qualifier identifier>) :
    SUBTYPE OF ASIS
    [ UNITLEN(8) ]
    LENGTH(e_length / 8)
    return                          /* return to caller                      */
  END
/* Termination Section                                                      */
/* END PROCEDURE: ASISENMD                                                  */
IF (<typedef identifier> <> '') THEN
  DO
    map_to_adl_id(<typedef identifier>,ADL<qualifier identifier>) :
    SUBTYPE OF ENUMERATION
    SELECT
      WHEN (e_length = 8) THEN
          [ BYTRVS(FALSE) ]
      WHEN (status.system = 'OS/2') THEN
          BYTRVS(TRUE)
      OTHERWISE
          [ BYTRVS(FALSE) ]
    END
    /*********************************************************/
    /* If LENGTH(8) and/or SIGNED(TRUE) then these          */
    /* attributes have default values and will not be       */
    /* encoded in the ADLDCLSPC.                            */
    /*********************************************************/
    LENGTH(e_length)
    SIGNED(e_sign)
    [ ADL<TITLE attribute> ]
    [ ADL<NOTE attribute> ]
    [ ADL<HELP attribute> ]
    [ ADL<WHEN clause> ]
    /*************************************************************/
    /* Now map the <enumeration list>.  The <enumerator>s      */
    /* plus if their values if they were explicitly set are    */
    /* stored with the ADL<ENUMERATION> type.  The equal sign */
    /* used in C to assign a value is replaced by a colon (:) */
    /* in ADL.                                                 */
    /*************************************************************/
    adlmap(<enumeration list>)
    ADL<terminator>
  END
ELSE
    ec = ERROR(E,'0043E')
/* Termination Section                              */
/* END PROCEDURE: ENUMT                             */
```

Unclassified

8.8.3.1 ADL Mapping Notes :

1. None

8.8.4 Exceptions :

---

0043E An enum typedef declaration must include a typedef indentifier.

Recovery: Add the typedef identifier.

---

The enum constants must be specified when the enum tag is declared.

Recovery: Add the list of enum constants in the enum tag declaration.

---

0044E Enumeration constant must be an integral constant expression.

Recovery: Change the initializer of the enumeration constant to be a constant expression.

---

0045E An incomplete enum tag cannot be used in a declaration.

Recovery: Give a definition of the tag before it is used in the declaration of an object or in the declaration itself.

---

0046E Length adjectives cannot be used with enums.

Recovery: Remove the length adjective.

---

0047E Sign adjectives cannot be used with enums.

Recovery: Remove the sign adjective.

8.8.5 Examples

1.

```
/* C source declaration */
typedef enum {RED,YELLOW,BLUE,GREEN=7,WHITE} colors;

/* ADL source declaration   */
colors : SUBTYPE OF ENUMERATION
  LENGTH(8) BYTRVS(FALSE) (RED,YELLOW,BLUE,GREEN:7,WHITE);
```

Unclassified

8.9 <float data definition>

8.9.1 Function :

A single length floating point number. The range of values and the approximate decimal digits of precision vary depending on the system.

IBM C Set/2

Approximate decimal range and digits of precision

```
0.118*(10**-37) <= |x| <= 0.340*(10**39)
6 decimal digits of precision
```

IBM C/370

Approximate decimal range and digits of precision

```
0.540*(10**-78) <= |x| <= 0.724*(10**76)
6 decimal digits of precision
```

8.9.2 Format :

```
<float declarator> ::=
   [<array annotation>] [<attribute>]<identifier> [<subscript declarator>]

<float data definition> ::=
   {
     [<storage class>] [<attribute>] float
   }
   {
     <float declarator> [<initializer>] [<identifier annotation>]
   }
   [
     {
       , <float declarator> [<initializer>] [<identifier annotation>]
     }...
   ]
   [<float annotation>] ;

<float annotation> ::=
   [ ASIS ]
   {
     [ ADL<TITLE attribute> ]
     [ ADL<NOTE attribute> ]
     [ ADL<HELP attribute> ]
     [ ADL<WHEN clause> ]
   }!
   ADL<terminator>
```

8.9.2.1 Format Notes :

System/370 Only

1. Normalization may result in the leading 3 bits of the first hex digit being zero. Therefore, the maximum guaranteed binary precision is 21 bits.

End of System/370 Only

8.9.3 ADL Mapping :

<float data definition> *MAPS TO ADL:*

```
map_to_adl_id(<identifier>,ADL<qualified identifier>) :
/*------------------------------------------------------*/
/* REXX PROCEDURE: FLOAT        DATE: 12/16/91          */
/* Initialization Section                               */
/*------------------------------------------------------*/
IF (pos('ASIS',<float annotation>) <> 0) THEN
 ┌DO
 │ ASIS
 │ [ UNITLEN(8) ]
 │ LENGTH(4)
 └END
ELSE
 ┌DO
 │ IF (status.system = 'OS/2') THEN
 │  ┌DO
 │  │ FLOAT2
 │  │ [ BYTRVS(TRUE) ]
 │  └END
 │ ELSE
 │  ┌DO
 │  │ FLOAT16
 │  │ [ BYTRVS(FALSE) ]
 │  └END
 │ [ COMPLEX(FALSE) ]
 │ [ RADIX(2) ]
 │ [ FIT(TRUNCATE) ]
 │ [ LENGTH(32) ]
 └END
[ ADL<TITLE attribute> ]
[ ADL<NOTE attribute> ]
[ ADL<HELP attribute> ]
[ ADL<WHEN clause> ]
[ ADL<terminator> ]
/* Termination Section                                  */
/* END PROCEDURE: FLOAT                                 */
```

8.9.3.1 ADL Mapping Notes :

1. If <subscript declarator> is specified, then this is an array of float, where the array is mapped as specified by 8.1, "<array data definition>" on page 111.

2. If <array annotation> includes ASIS, then the entire array of float is mapped as a single ASIS string as specified by 8.1, "<array data definition>" on page 111

8.9.4 Exceptions :

0048E Length adjective short cannot be used with float.

Recovery: Remove the length adjective.

0049E Length adjective long cannot be used with float.

Recovery: Remove the length adjective or try using double instead of float.

0050E Sign adjectives cannot be used with float.

Recovery: Remove the sign adjective.

0051E ASIS cannot precede a data definition unless it is an array.

Explanation: For an array data definition, the annotation for the array precedes the data definition, and the annotation for the type follows the data definition. If an array is not being defined, then all annotation must follow the data definition.

8.9.5 Examples :

1.

```
/* IBM C/370 source declaration */
float percent_completed;

/* ADL source declaration    */
percent_completed : FLOAT16;
```

2.

```
/* IBM C Set/2 source declaration */
float error_factor = 5.5e-3; /* initialized to 5.5e-3 */

/* ADL source declaration    */
error_factor : FLOAT2;
```

3.

```
/* C source declaration */
float time_interval /* ADL ASIS; */;

/* ADL source declaration    */
time_interval : ASIS LENGTH(4) UNITLEN(8);
```

8.10 <int data definition>

8.10.1 Function :

Define a binary integer field. A C int can be signed or unsigned and can be 16 or 32 bits long, depending on the sign and length adjectives.

| <sign adjective> | <length adjective> | decimal range |
|---|---|---|
| [ signed ] | [ long ] | -2,147,483,648 to 2,147,483,647 |
| [ signed ] | short | -32,768 to 32,767 |
| unsigned | [ long ] | 0 to 4,294,967,295 |
| unsigned | short | 0 to 65,535 |

8.10.2 Format :

```
<sign adjective> ::= signed | unsigned

<length adjective> ::= short | long

<int declarator> ::=
   [<array annotation>] [<attribute>] <identifier> [<subscript declarator>]

<int annotation> ::=
   {
     [ ADL<FIT attribute> ]
     [ ADL<CONSTRAINED attribute> ]
     [ ADL<TITLE attribute> ]
     [ ADL<NOTE attribute> ]
     [ ADL<HELP attribute> ]
     [ ADL<WHEN clause> ]
   }!
 | {
     [ ASIS ]
     {
       [ ADL<TITLE attribute> ]
       [ ADL<NOTE attribute> ]
       [ ADL<HELP attribute> ]
       [ ADL<WHEN clause> ]
     }!
   }
   ADL<terminator>

<int data definition> ::=
   {
     {
       [<storage class>] [<attribute>]
       [<sign adjective>]
```

```
      { [<length adjective>] int } | <length adjective>
    }
    | <internal storage class>
    | static
  }
  {
    <int declarator>
    [<initializer>]
    [ <identifier annotation> ]
  }
  [
    {
      , <int declarator>
      [<initializer>]
      [ <identifier annotation> ]
    }...
  ]
  [ <int annotation> ] ;
```

8.10.2.1 Format Notes :

1. If an <internal storage class> is given on an <data definition> but no data type is specified, then the data type defaults to int with <length adjective> = long and <sign adjective> = signed.
2. If static is given on an <data definition> but no data type is specified, then the data type defaults to int <length adjective> = long and <sign adjective> = signed.

8.10.3 ADL Mapping :

<int data definition> *MAPS TO ADL:*

```
map_to_adl_id(<identifier>,ADL<qualified identifier>) :
/*-----------------------------------------------*/
/* REXX PROCEDURE: INT            DATE: 12/16/91  */
/* Initialization Section                        */
/*-----------------------------------------------*/
INT:
IF (pos('ASIS',<int annotation>) = 0) THEN
 DO
 | BINARY
 | SELECT
 | | WHEN (<length adjective> = short & <sign adjective> = unsigned) THEN
 | |   DO
 | |   |  [ LENGTH(16) ]
 | |   |  SIGNED(FALSE)
 | |   |  PRECISION(16)
 | |   END
 | | WHEN (<length adjective> = short & <sign adjective> = signed) THEN
 | |   DO
 | |   |  [ LENGTH(16) ]
 | |   |  [ SIGNED(TRUE) ]
 | |   |  PRECISION(15)
 | |   END
 | | WHEN (<length adjective> = long & <sign adjective> = unsigned) THEN
```

```
|  |    ┌DO
|  |    |  [ LENGTH(32) ]
|  |    |  SIGNED(FALSE)
|  |    |  PRECISION(32)
|  |    └END
|  |   OTHERWISE
|  |       [ LENGTH(32) ]
|  |       [ SIGNED(TRUE) ]
|  |       [ PRECISION(31) ]
|  └END
|   [ SCALE(0) ]
|   [ CONSTRAINED(FALSE) ]
|   [ FIT(TRUNCATE) ]
|   [ RADIX(2) ]
|   [ COMPLEX(FALSE) ]
|   [ ADL<BYTRVS attribute> ]
|   [ ADL<TITLE attribute> ]
|   [ ADL<NOTE attribute> ]
|   [ ADL<HELP attribute> ]
|   [ ADL<WHEN clause> ];
└END
ELSE
┌DO
|   ASIS
|   [ UNITLEN(8) ]
|   IF (<length adjective> = short) THEN
|       LENGTH(2)
|   ELSE
|       LENGTH(4)
|   [ ADL<TITLE attribute> ]
|   [ ADL<NOTE attribute> ]
|   [ ADL<HELP attribute> ]
|   [ ADL<WHEN clause> ];
└END
/* Termination Section      */
/* END PROCEDURE: INT       */
```

8.10.3.1 ADL Mapping Notes :

System/370 Only

1. ADL <BYTRVS attribute> = [ BYTRVS(FALSE) ]

End of System/370 Only

OS/2 Only

2. ADL <BYTRVS attribute> = [ BYTRVS(TRUE) ]

End of OS/2 Only

Unclassified

8.10.4 Exceptions :

0052E Declaration of an int cannot specify multiple sign adjectives.

Recovery: Only keep one sign adjective.

0053E Declaration of an int cannot specify multiple length adjectives.

Recovery: Only keep one length adjective.

8.10.5 Examples :

1.

```
/* C source declaration */
int result;

/* ADL source declaration   */
result : BINARY;
```

2.

```
/* C source declaration */
short scope;

/* ADL source declaration   */
scope : BINARY PRECISION(15);
```

3.

```
/* C source declaration */
long big_number, giant_number, monstrous_number;

/* ADL source declaration   */
big_number: giant_number: monstrous_number: BINARY;
```

4.

```
/* C source declaration */
unsigned long todays_fines; /* ADL todays$fines :; */

/* ADL source declaration   */
todays$fines : BINARY PRECISION(32) SIGNED(FALSE);
```

5.

```
/* C source declaration */
unsigned short user_count /* ADL ASIS ; */;

/* ADL source declaration   */
user_count : ASIS LENGTH(2) UNITLEN(8);
```

8.11 <long double data definition>

8.11.1 Function :

A extended length floating point number. The range of values and the approximate decimal digits of precision vary depending on the system.

IBM C Set/2

Approximate decimal range and digits of precision

```
0.330*(10**-4931) <= |x| <= 0.121*(10**4933)
19 decimal digits of precision
```

IBM C/370

Approximate decimal range and digits of precision

```
0.540*(10**-78) <= |x| <= 0.724*(10**76)
32 decimal digits of precision
```

8.11.2 Format :

```
<long double declarator> ::=
   [<array annotation>] [<attribute>]<identifier> [<subscript declarator>]

<long double data definition> ::=
   {
     [<storage class>] [<attribute>] long double
   }
   {
     <long double declarator> [<initializer>] [<identifier annotation>]
   }
   [
     {
       , <long double declarator> [<initializer>] [<identifier annotation>]
     }...
   ]
   [<long double annotation>] ;

<long double annotation> ::=
   [ ASIS ]
   {
     [ ADL<TITLE attribute> ]
     [ ADL<NOTE attribute> ]
     [ ADL<HELP attribute> ]
     [ ADL<WHEN clause> ]
   }!
   ADL<terminator>
```

8.11.2.1 Format Notes :

System/370 Only

1. Normalization may result in the leading 3 bits of the first hex digit being zero. Therefore, the maximum guaranteed binary precision is 109 bits.

End of System/370 Only

8.11.3 ADL Mapping :

<long double data definition> *MAPS TO ADL:*

```
map_to_adl_id(<identifier>,ADL<qualified identifier>) :
/*------------------------------------------------------*/
/* REXX PROCEDURE: LONGDBL      DATE: 12/16/91          */
/* Initialization Section                               */
/*------------------------------------------------------*/
IF (pos('ASIS',<long double annotation>) <> 0) THEN
 ┌DO
 │  ASIS
 │  [ UNITLEN(8) ]
 │  LENGTH(16)
 └END
ELSE
 ┌DO
 │  IF (status.system = 'OS/2') THEN
 │   ┌DO
 │   │  FLOAT2
 │   │  [ BYTRVS(TRUE) ]
 │   └END
 │  ELSE
 │   ┌DO
 │   │  FLOAT16
 │   │  [ BYTRVS(FALSE) ]
 │   └END
 │  [ COMPLEX(FALSE) ]
 │  [ RADIX(2) ]
 │  [ FIT(TRUNCATE) ]
 │  LENGTH(128)
 └END
[ ADL<TITLE attribute> ]
[ ADL<NOTE attribute> ]
[ ADL<HELP attribute> ]
[ ADL<WHEN clause> ]
[ ADL<terminator> ]
/* Termination Section                                  */
/* END PROCEDURE: LONGDBL                               */
```

8.11.3.1 ADL Mapping Notes :

1. If <subscript declarator> is specified, then this is an array of double, where the array is mapped as specified by 8.1, "<array data definition>" on page 111.
2. If <array annotation> includes ASIS, then the entire array of double is mapped as a single ASIS string as specified by 8.1, "<array data definition>" on page 111

8.11.4 Exceptions :

0054E Sign adjectives cannot be used with long double.

Recovery: Remove the sign adjective.

0055E Length adjective short cannot be used with long double.

Recovery: Remove the short length adjective.

8.11.5 Examples :

1.

```
/* IBM C Set/2 source declaration */
long double xx;

/* ADL source declaration   */
xx : FLOAT2 LENGTH(128);
```

2.

```
/* IBM C/370 source declaration */
long double xy = 7.9e-11; /* initialized to 7.9e-11 */

/* ADL source declaration   */
xy : FLOAT16 LENGTH(128);
```

3.

```
/* IBM C/370 source declaration */
long double std_deviation /* ADL ASIS; */;

/* ADL source declaration   */
xx : ASIS LENGTH(16) UNITLEN(8);
```

Unclassified

8.12 <pointer data definition>

8.12.1 Function :

A system specific address of a data object or function. In a C program on OS/2 or System/370 a pointer occupies 32 bits. In a C program a pointer is identified by preceding a type with the indirection operator (*).

8.12.2 Format :

```
<pointer declarator> ::=
   [<array annotation>]
   {
       {*...} [<attribute>] {[*]...}
    | {[*]...} [<attribute>] {*...}
   }
   <identifier> [<subscript declarator>]

<pointer data definition> ::=
   {
     [<storage class>] [<attribute>] <type specifier>
   }
   {
     <pointer declarator> [<initializer>] [<identifier annotation>]
   }
   [
     {
       , <pointer declarator> [<initializer>] [<identifier annotation>]
     }...
   ]
   [<pointer annotation>] ;

<pointer annotation> ::=
   {
     [ ADL<TITLE attribute> ]
     [ ADL<NOTE attribute> ]
     [ ADL<HELP attribute> ]
     [ ADL<WHEN clause> ]
   }!
   ADL<terminator>

<type specifier> ::=
     array
   | struct
   | union
   | int
   | float
   | double
   | enum
   | char
   | wchar_t
```

Unclassified

8.12.2.1 Format Notes :

1. <type specifier> can be any type. However, you cannot have a pointer to a bit-field or objects having register storage class.

8.12.3 ADL Mapping :

<pointer data definition> *MAPS TO ADL:*

```
map_to_adl_id(<identifier>,ADL<qualified identifier>) :
/*-------------------------------------------------------*/
/* REXX PROCEDURE: POINTER       DATE: 12/16/91          */
/* Initialization Section                                */
/*-------------------------------------------------------*/
┌SELECT
│  WHEN (<type specifier> = int & <bit-field specifier> <> '') THEN
│      ec = ERROR(E,'0056E  Pointer to a bit-field is invalid.')
│  WHEN (<storage class> = 'register') THEN
│      ec = ERROR(E,'0057E')
│  OTHERWISE
│      ASIS
│      [ UNITLEN(8) ]
│      LENGTH(4)
│      [ ADL<TITLE attribute> ]
│      [ ADL<NOTE attribute> ]
│      [ ADL<HELP attribute> ]
│      [ ADL<WHEN clause> ]
│      ADL<terminator>
└END
/* Termination Section                                    */
/* END PROCEDURE: POINTER                                 */
```

8.12.3.1 ADL Mapping Notes :

1. The ADL mapping for pointers define a 32 bit bit string which will not be converted.

8.12.4 Exceptions :

---

0056E Pointer to a bit-field is invalid.

Recovery: Remove the indirection operator or remove the bit-field size to make the field an normal int.

---

0057E Pointer to an object with registor storage class is invalid.

Recovery: Remove the registor storage class or remove the indirection operator.

8.12.5 Examples :

1.

```
/* C source declaration */
short *ptr_to_short;

/* ADL source declaration  */
ptr_to_short : ASIS LENGTH(4) UNITLEN(8);
```

2.

Unclassified

```
/* C source declaration */
char *customer_name;

/* ADL source declaration   */
customer_name : ASIS LENGTH(4) UNITLEN(8);
```

3.

```
/* C source declaration */
char *stree = "9500 Godwin Drive";

/* ADL mapping of above */
street : ASIS LENGTH(4) UNITLEN(8);
```

8.13 <string data definition>

8.13.1 Function :

A character string. C does not have an explicit character string type. In C a character string is an array of characters. It depends on program usage whether the string is a fixed string, a suffix terminated varying string, or an array of single characters. It is also possible to have multidimensional arrays of strings or single characters.

The default is to assume a simple C declaration of an array of char is a fixed character string. The choice made by the declaration translator may not be correct, since the declaration translator does not know how the program logic used the string.

The safest method of declaring C strings is to include annotation so that the correct ADL string declaration can be determined. With annotation any C string declaration can be selected as a fixed string, a suffix terminated varying string, or an array of single characters. In addition, the C declaration translator allows annotation with the ADL <ASIS> type. This causes the data definition to be described in ADL as an unencoded bit string.

A C suffix terminated variable length character string is stored as a one dimensional array of signed or unsigned char. This is used as a null terminated string (i.e. the end of the string is marked by a null, X'00' byte). The number of characters in the string can vary from 0 to the size of the array minus one.

8.13.2 Format :

```
<string declarator> ::=
   [<array annotation>] [<attribute>] <identifier> [<subscript declarator>]

<string data definition> ::=
   [<storage class>] [<attribute>]
   [<sign adjective>] char
   {
     <string declarator>►[<string size>►]
     [<initializer>] [<identifier annotation>]
   }
   [
     {
       , <string declarator>►[<string size>►]
       [<initializer>] [<identifier annotation>]
     }...
   ]
   [ <string annotation> ];

<string size> ::= <decimal constant>
```

```
<string annotation> ::=
  {
      <SKIP padding annotation>
    | <ASIS fixed length string annotation>
    | <ASIS varying length string annotation>
    | <CHAR array of single char annotation>
    | <CHAR fixed length string annotation>
    | <CHAR varying length string annotation>
    | <CHARSFX varying length string annotation>
  }
  ADL<terminator>

<SKIP padding annotation> ::= SKIP

<ASIS fixed length string annotation> ::=
    {
      ASIS
      {
        [ ADL<TITLE attribute> ]
        [ ADL<NOTE attribute> ]
        [ ADL<HELP attribute> ]
        [ ADL<WHEN clause> ]
      }!
    }

<ASIS varying length string annotation> ::=
    {
      ASIS
      {
        LENGTH(ADL<qualified identifier>)
        [ ADL<UNITLEN attribute> ]
        [ ADL<MAXALC attribute> ]
        [ ADL<TITLE attribute> ]
        [ ADL<NOTE attribute> ]
        [ ADL<HELP attribute> ]
        [ ADL<WHEN clause> ]
      }!
    }

<CHAR array of single char annotation>
    {
      CHAR
      {
        [ ADL<CCSID attribute> ]
        [ ADL<TITLE attribute> ]
        [ ADL<NOTE attribute> ]
        [ ADL<HELP attribute> ]
        [ ADL<WHEN clause> ]
      }!
    }
```

```
<CHAR fixed length string annotation>
    {
      [ ADL<CCSID attribute> ]
      [ ADL<JUSTIFY attribute> ]
      [ ADL<TITLE attribute> ]
      [ ADL<NOTE attribute> ]
      [ ADL<HELP attribute> ]
      [ ADL<WHEN clause> ]
    }!

<CHAR varying length string annotation>
    {
      LENGTH(ADL<qualified identifier>)
      [ ADL<MAXALC attribute> ]
      [ ADL<CCSID attribute> ]
      [ ADL<JUSTIFY attribute> ]
      [ ADL<TITLE attribute> ]
      [ ADL<NOTE attribute> ]
      [ ADL<HELP attribute> ]
      [ ADL<WHEN clause> ]
    }!

<CHARSFX varying length string annotation>
    {
      CHARSFX
      {
        [ ADL<CCSID attribute> ]
        [ ADL<MAXALC attribute> ]
        [ ADL<TITLE attribute> ]
        [ ADL<NOTE attribute> ]
        [ ADL<HELP attribute> ]
        [ ADL<WHEN clause> ]
      }!
    }
```

8.13.2.1 Format Notes

1. The <SKIP padding annotation> allows a user to explicitly position fields by inserting bytes of padding. When <SKIP padding annotation> is used, the <string data definition> cannot have <array annotation> or <identifier annotation>. The <data definition> must be a single dimensioned array of char (i.e. a simple fixed length string).

2. There are six type of strings which can be described depending on what <string annotation> is included:

<ASIS fixed length string annotation>
   Annotated with ASIS but without LENGTH(ADL<qualified identifier>).

<ASIS varying length string annotation>
   Annotated with ASIS and LENGTH(ADL<qualified identifier>).

<CHAR array of single char annotation>
Annotated with CHAR but without LENGTH(ADL<qualified identifier>).

<CHAR fixed length string annotation>
Annotated without CHAR and without LENGTH(ADL<qualified identifier>).

<CHAR varying length string annotation>
Annotated without CHAR but with LENGTH(ADL<qualified identifier>).

<CHARSFX varying length string annotation>
Annotated with CHARSFX.

3. If a <subscript declarator> is included, then the result is an array of one of the six types of strings described above. If the <string annotation> was <CHAR array of single char annotation>, then this simply adds annother dimension to the array resulting in a multidimensional array of single characters.
4. C does not define a limit on string length. ADL limits this value to (231)-1 (index range 0 to (231)-2).
5. CHAR can be used for SBCS, DBCS, or mixed SBCS and DBCS characters.
6. <array annotation> is as defined in 8.1, "<array data definition>" on page 111.

8.13.3 ADL Mapping :

<string data definition> *MAPS TO ADL:*

```
map_to_adl_id(<identifier>,ADL<qualified identifier>) :
/*---------------------------------------------------*/
/* REXX PROCEDURE: STRING       DATE: 12/16/91       */
/* Initialization Section                            */
/*---------------------------------------------------*/
/*---------------------------------------------------*/
/* INLINE REXX PROCEDURE: CHRARRAY    DATE: 12/16/91 */
/*   <dimension size> is obtained from the definition */
/*   of <subscript declarator>.                      */
/* Initialization Section                            */
/*---------------------------------------------------*/
/* START OF LOOP: CHRARRAY */
DO FOREVER
  SELECT
    WHEN (pos('ASIS',<array annotation>) <> 0) THEN
      DO
        ASIS
        LENGTH([<dimension size>{[*<dimension size>]...}]*<string size>)
        [ UNITLEN(8) ]
        /*******************************************************/
        /* Optional attributes from the <array annotation>.    */
        /*******************************************************/
        [ ADL<TITLE attribute> ]
        [ ADL<NOTE attribute> ]
        [ ADL<HELP attribute> ]
        [ ADL<WHEN clause> ]
        [ ADL<terminator> ]
        LEAVE /* EXIT LOOP: CHRARRAY */
      END
    WHEN (<subscript declarator> <> '') THEN
      DO
        ARRAY
        IF (pos('CHAR',<string annotation>) <> 0) THEN
         DO
```

```
            /*********************************************************************/
            /* This declaration is a multidimensional array of single character.*/
            /* The <string size> becomes the DMNSIZE of the last dimension.     */
            /*********************************************************************/
          IF (status.dimension.current <= status.dimensions) THEN
           DO
              DMNLST (
                DMNSIZE(<dimension size>)[[, DMNSIZE(<dimension size>)]...]
                DMNSIZE(<string size>)
                     )
              string_length = 1
            /* CONTINUE LOOP: CHRARRAY */
           END
          ELSE
           DO
             /*******************************************************/
             /* Optional attributes from the <array annotation>.    */
             /*******************************************************/
             [ ADL<TITLE attribute> ]
             [ ADL<NOTE attribute> ]
             [ ADL<HELP attribute> ]
             [ ADL<WHEN clause> ]
             OF
             LEAVE /* EXIT LOOP: CHRARRAY */
           END
        END
      ELSE
        DO
            /*********************************************************************/
            /* This declaration is an array of one or more dimensions of string.*/
            /*********************************************************************/
          IF (status.dimension.current <= status.dimensions) THEN
           DO
              DMNLST (
              DMNSIZE(<dimension size>)[[, DMNSIZE(<dimension size>)]...]
                     )
              string_length = <string size>
            /* CONTINUE LOOP: CHRARRAY */
           END
          ELSE
           DO
             /*******************************************************/
             /* Optional attributes from the <array annotation>.    */
             /*******************************************************/
             [ ADL<TITLE attribute> ]
             [ ADL<NOTE attribute> ]
             [ ADL<HELP attribute> ]
             [ ADL<WHEN clause> ]
             OF
             LEAVE /* EXIT LOOP: CHRARRAY */
           END
        END
    END
  OTHERWISE
      IF (pos('CHAR',<string annotation>) <> 0) THEN
        DO
          ARRAY
            /*********************************************************************/
            /* This declaration is a one dimensional array of single character. */
            /*********************************************************************/
            DMNLST (
            DMNSIZE(<string size>)
                   )
            string_length = 1
          /*******************************************************/
          /* Optional attributes from the <array annotation>.    */
          /*******************************************************/
          [ ADL<TITLE attribute> ]
          [ ADL<NOTE attribute> ]
          [ ADL<HELP attribute> ]
          [ ADL<WHEN clause> ]
          OF
        END
```

Unclassified

```
            ELSE
             DO
              /**********************************************************/
              /* This declaration is a simple string (not an array).  */
              /**********************************************************/
              string_length = <string size>
             END
            LEAVE /* EXIT LOOP: CHRARRAY */
   END
END /* END OF LOOP: CHRARRAY */
/* Termination Section                         */
/* END PROCEDURE: CHRARRAY                     */
IF (pos('ASIS',<array annotation>) = 0) THEN
 DO
   /*-----------------------------------------------------------------------*/
   /* REXX INLINE PROCEDURE: UNITLEN      DATE: 12/16/91                   */
   /* Initialization Section                                               */
   /*-----------------------------------------------------------------------*/
   IF (pos('UNITLEN',<string annotation>) <> 0) THEN
    DO
      ADL<UNITLEN attribute> /* value from <string annotation> */
      /* remainder <> 0  */
      IF (UNITLEN = 16 & string_length // 2 <> 0) THEN
       DO
         [ UNITLEN(8)
         call EXCEPTION(E,'String length must be an even number of bytes for UNITLEN(16)'
       END
    END
   ELSE
      [ UNITLEN(8) ]
   /* Termination Section                                                  */
   /* END PROCEDURE: UNITLEN                                               */
   SELECT
     WHEN (pos('ASIS',<string annotation>) <> 0) THEN
      DO
        ASIS                          /* ADL type = ASIS        */
        IF (pos('LENGTH(ADL<qualified identifier>)',<string annotation>) <> 0) THEN
         DO
           LENGTH(ADL<qualified identifier>)
           IF (pos('MAXALC',<string annotation>) <> 0) THEN
              ADL<MAXALC attribute>          /* use value from annotation */
           ELSE
              MAXALC(TRUE)
           MAXLEN(string_length*8/UNITLEN)
         END
        ELSE
           LENGTH(string_size*8/UNITLEN)
      END
     WHEN (pos('CHARSFX',<string annotation>) <> 0) THEN
      DO
        CHARSFX                       /* ADL type = CHARSFX     */
        [ SFXENC(x'00') ]
        MAXLEN(string_length*8/UNITLEN)
        IF (pos('MAXALC',<string annotation>) <> 0) THEN
           ADL<MAXALC attribute>          /* use value from annotation */
        ELSE
           [ MAXALC(TRUE) ]
        [ CCSID(0) ]
      END
     OTHERWISE
        CHAR                          /* ADL type = CHAR        */
        IF (pos('LENGTH(ADL<qualified identifier>)',<string annotation>) <> 0) THEN
         DO
           LENGTH(ADL<qualified identifier>)
           MAXLEN(string_length*8/UNITLEN)
           IF (pos('MAXALC',<string annotation>) <> 0) THEN
              ADL<MAXALC attribute>          /* use value from annotation */
           ELSE
              MAXALC(TRUE)
         END
        ELSE
           LENGTH(string_length*8/UNITLEN)
        [ CCSID(0) ]
```

```
|  |      [ JUSTIFY(LEFT) ]
|  └END
|  [ ADL<HELP attribute> ]
|  [ ADL<NOTE attribute> ]
|  [ ADL<TITLE attribute> ]
|  [ ADL<WHEN clause> ]
|  [ ADL<terminator> ]
└END
/* Termination Section                                        */
/* END PROCEDURE: STRING                                      */
```

8.13.3.1 ADL Mapping Notes :

1. If < SKIP padding annotation > is used, then the < string data definition > is mapped to a SKIP( < string size > *8).
2. ASIS annotation which precedes the C data definition creates a single ADL ASIS field the length of the string or array.
3. ASIS annotation following the C data definition changes the string type to ASIS. If this was an array of string, ASIS changes this to an array of ASIS.
4. For multidimensional arrays of strings, the dimensions are assigned in the order specified from left to right to the ARRAY DMNLST, except for the last dimension. The last dimension specifies the length of the string. However, by annotating with CHAR the last dimension if simply the last array dimension and the object of the array is a single character rather than a string.
5. For the purposes of data description and conversion it does not matter whether the string was declared with as a signed or unsigned char.

8.13.4 Exceptions :

0058E All dimensions and string lengths must be specified.

Explanation: An empty dimension declaration or string length is not allowed by the C declaration translator.

Recovery: Fill in a value for any empty dimension or string length.

0059W String annotation ignored because of preceding ASIS.

Explanation: An ASIS preceding the data definition causes the ADL description to be a single ASIS string. The only optional attributes encoded with this ASIS are those which follow the ASIS in the array annotation. The < string annoation > is ignored.

Recovery: If it is important have these optional attributes encoded then either (1) Move the ASIS to after the string data definition. (2) Move the optional attributes to before the data definition following the ASIS. Otherwise this warning message can be ignored.

8.13.5 Examples :

1. SKIP padding

```
/* C source declaration */
struct
{
  float a;
  char filler1[4]; /* ADL SKIP */
  float b;
} x;

/* ADL delaration */
x : SEQUENCE
BEGIN;
  a : FLOAT16;
  SKIP(32);
  b : FLOAT16;
END;
```

2. ASIS fixed length string

```
/* C source declaration */
char name_first[30] /* ADL ASIS; */;

/* ADL source declaration    */
name_first : ASIS LENGTH(30) UNITLEN(8);
```

3. ASIS varying length string

```
/* C source declaration */
short int name_size;
char name_first[30] /* ADL ASIS LENGTH(name_size); */;

/* ADL source declaration    */
name_size : BINARY LENGTH(15) PRECISION(16);
name_first : ASIS LENGTH(name_size) MAXLEN(30)
             MAXALC(TRUE) UNITLEN(8);
```

4. ASIS varying length string UNITLEN(1)

```
/* C source declaration */
short int name_size;
char name_first[30] /* ADL ASIS LENGTH(name_size) UNITLEN(1); */;

/* ADL source declaration    */
name_size : BINARY LENGTH(15) PRECISION(16);
name_first : ASIS LENGTH(name_size) MAXLEN(240)
             MAXALC(TRUE) UNITLEN(1);
```

5. CHAR array of single characters

```
/* C source declaration */
char char_list[30] /* ADL CHAR; */;

/* ADL source declaration    */
char_list : ARRAY DMNLST( DMNSIZE(30) )
  OF CHAR LENGTH(1) UNITLEN(8);
```

6. CHAR fixed length string

Unclassified

```
/* C source declaration */
char name_first[30];

/* ADL source declaration   */
name_first : CHAR LENGTH(30) UNITLEN(8);
```

7. CHAR varying length string

```
/* C source declaration */
short int name_size;
char name_first[30] /* ADL LENGTH(name_size); */;

/* ADL source declaration   */
name_size : BINARY LENGTH(15) PRECISION(16);
name_first : CHAR LENGTH(name_size) UNITLEN(8)
             MAXLEN(30) MAXALC(TRUE);
```

8. CHARSFX varying length suffix terminated string

```
/* C source declaration */
char type_group[80] = "Sample" /* ADL CHARSFX; */;
char user_group[64] /* ADL CHARSFX; */;

/* ADL source declaration   */
type_group : CHARSFX MAXLEN(80) UNITLEN(8);
user_group : CHARSFX MAXLEN(64) UNITLEN(8);
```

9. Array of CHAR fixed length string

```
/* C source declaration */
char name_first[100][30];
char name_last[100][50][30];

/* ADL source declaration   */
name_first : ARRAY DMNLST(DMNSIZE(100))
  OF CHAR LENGTH(30) UNITLEN(8);
name_last  : ARRAY DMNLST(DMNSIZE(100), DMNSIZE(50))
  OF CHAR LENGTH(30) UNITLEN(8);
```

10. Array of CHARSFX varying length suffix terminated string

```
/* C source declaration */
char name_first[100][30] /* ADL CHARSFX; */;
char name_last[100][50][30] /* ADL CHARSFX; */;

/* ADL source declaration   */
name_first : ARRAY DMNLST(DMNSIZE(100))
   OF CHARSFX MAXLEN(30) UNITLEN(8);
name_last  : ARRAY DMNLST(DMNSIZE(100), DMNSIZE(50))
   OF CHARSFX MAXLEN(30) UNITLEN(8);
```

11. Multidimensional array of single characters

```
/* C source declaration */
char name_first[100][30] /* ADL CHAR; */;
char name_last[100][50][30] /* ADL CHAR; */;

/* ADL source declaration   */
name_first : ARRAY DMNLST(DMNSIZE(100), DMNSIZE(30))
  OF CHAR LENGTH(1) UNITLEN(8);
name_last  : ARRAY DMNLST(DMNSIZE(100), DMNSIZE(50), DMNSIZE(30))
  OF CHAR LENGTH(1) UNITLEN(8);
```

12. Array of ASIS fixed length strings

```
/* C source declaration */
char name_first[100][30] /* ADL ASIS; */;

/* ADL source declaration   */
name_first : ARRAY DMNLST(DMNSIZE(100))
  OF ASIS LENGTH(30) UNITLEN(8);
```

13. ASIS of an array of fixed length strings

```
/* C source declaration */
char /* ADL ASIS TITLE('ASIS data'); */ name_first[100][30];

/* ADL source declaration   */
name_first : ASIS LENGTH(3000) UNITLEN(8) TITLE('ASIS data');
```

14. Array and string annotation

```
/* C source declaration */

char /* ADL TITLE('Array of first names'); */ name_first[100][30]
     /* ADL NOTE('All names blank padded'); */;

/* ADL source declaration   */
name_first : ARRAY
  DMNLST(DMNSIZE(100))
  TITLE('Array of first names')
  OF CHAR LENGTH(30) UNITLEN(8) NOTE('All names blank padded');
```

8.14 <struct data declaration>

8.14.1 Function :

An ordered group of data objects. The data objects within a structure can have varied data types. Each data object in a structure is called a member or field. A member can be of any type including struct, union, and bit-field. A <struct data declaration> only declares a <struct tag>, which will be mapped to any ADL<SUBTYPE>. It does not define any storage.

8.14.2 Format :

```
<struct data declaration> ::=
  {
    [<storage class>] [<attribute>] struct
    <struct tag> [<identifier annotation>]
  }
  <member list>
  [<struct annotation>] ;
```

8.14.2.1 Format Notes.

1. For a definition of <struct tag> see 8.15, "<struct data definition>" on page 171.
2. For a definition of <member list> see 8.15, "<struct data definition>" on page 171.
3. For a definition of <struct annotation> see 8.15, "<struct data definition>" on page 171.
4. A <data definition> in the <member list> cannot include a <storage class>.

8.14.3 ADL Mapping :

<struct data declaration> *MAPS TO ADL:*

```
/*-------------------------------------------------------*/
/* REXX PROCEDURE: STRUCTD      DATE: 07/24/91           */
/* Initialization Section                                */
/*-------------------------------------------------------*/
IF (<struct tag> <> '') THEN
  DO
```

```
    map_to_adl_id(<struct tag>,ADL<qualifier identifier>) :
    SUBTYPE OF SEQUENCE
    [ ADL<TITLE attribute> ]
    [ ADL<NOTE attribute> ]
    [ ADL<HELP attribute> ]
    [ ADL<WHEN clause> ]
    ADL<BEGIN statement>
    /**********************************************************/
    /* Now map the <member list>.  To do this map each        */
    /* <data definition> in the member list according to the */
    /* appropriate section in this chapter.  The alignment    */
    /* algorithm must be applied (unless the _Packed          */
    /* attribute was used on the struct).  See the sections   */
    /* on data alignment in this part of the specification.   */
    /**********************************************************/
    adlmap(<member list>)
    ADL<END statment>
   END
ELSE
    ec = ERROR(E,'0060E  A struct declartion must specify a struct tag.')
/* Termination Section                                */
/* END PROCEDURE: STRUCTD                             */
```

8.14.4 ADL Mapping Notes :

1. None

8.14.5 Exceptions :

0060E A struct declartion must specify a struct tag.

Recovery: Add the struct tag or add a struct declarator to make this a struct data definition.

---

0061E Struct member declarations must specify a declarator.

Recovery: Declare the member with a name.

---

0062E The &1 struct definition must specify a member list.

Recovery: Specify the members of the struct in the definition or remove the empty braces to make it a simple struct tag declaration.

---

0063E Length adjectives cannot be used with structs.

Recovery: Remove the length adjective.

---

0064E Sign adjectives cannot be used with structs.

Recovery: Remove the sign adjective.

8.14.6 Examples :

1.

```
/* C source declaration */
struct groceries /* ADL TITLE('My generic grocery list') */
   {
     int apples;                /* Structure declaration */
     int oranges;               /* no storage allocated  */
     char store_name[40];
   };

/* ADL source declaration   */
groceries : SUBTYPE OF SEQUENCE
  TITLE('My generic grocery list')
BEGIN;
  apples     : BINARY;
  oranges    : BINARY;
  store_name : CHAR LENGTH(40);
END;
```

2.

```
/* C source declaration               */
/* Declares and allocates storage for an  */
/* array named week of structure type    */
/* groceries.                             */
struct groceries week[52] /* ADL TITLE('This years grocery lists') */;

/* ADL source declaration   */
week : ARRAY
   DMNLST(DNMSIZE(52))
   TITLE('This years grocery lists')
   OF groceries;
```

Unclassified —

8.15 <struct data definition>

8.15.1 Function :

An ordered group of data objects. The data objects within a structure can have varied data types. Each data object in a structure is called a member or field. A member can be of any type including struct, union, and bit-field.

8.15.2 Format :

```
<struct declarator> ::=
   [<array annotation>] [<attribute>] <identifier> [<subscript declarator>]

<struct data definition> ::=
   {
     [<storage class>] [<attribute>] struct
     [<struct tag> [<identifier annotation>] ]
   }
   [ <member list> ]
   {
     <struct declarator> [<initializer>] [<identifier annotation>]
   }
   [
     {
       , <struct declarator> [<initializer>] [<identifier annotation>]
     }...
   ]
   [<struct annotation>] ;

<struct tag> ::= <identifier>

<member list> ::= ►{ <data definition> [<data definition>]... ►}

<struct annotation> ::=
  {
    [ ASIS ]
    {
      [ ADL<TITLE attribute> ]
      [ ADL<NOTE attribute> ]
      [ ADL<HELP attribute> ]
      [ ADL<WHEN clause> ]
    }!
  }
  ADL<terminator>
```

8.15.2.1 Format Notes.

1. <data definition> can be any valid C <data definition> except function, though pointer to function is allowed.
2. <array annotation> is valid only if at least one <struct declarator> has a <subscript declarator>.
3. <array annotation> applies only to those <struct declarator>s which have a <subscript declarator>.
4. The <data definition>s in the <member list> cannot include a <storage class>.

8.15.3 ADL Mapping :

<struct data definition> *MAPS TO ADL:*

```
/*-------------------------------------------------------*/
/* REXX PROCEDURE: STRUCT        DATE: 12/16/91          */
/* Initialization Section                                */
/*-------------------------------------------------------*/
SELECT
  WHEN (<member list> = '') THEN
    DO
      /**********************************************************/
      /* Create an ADL<subtype instance>.  This is created      */
      /* whenever a <struct tag> is included. If a              */
      /* <member list> was not included then this <struct tag>  */
      /* must have been previously declared in a <struct data   */
      /* declaration>, which is mapped to an ADL<SUBTYPE>.      */
      /**********************************************************/
      map_to_adl_id(<identifier>,ADL<qualified identifier>) :
      map_to_adl_id(<struct tag>,ADL<qualifier identifier>)
      [ ADL<TITLE attribute> ]
      [ ADL<NOTE attribute> ]
      [ ADL<HELP attribute> ]
      [ ADL<WHEN clause> ]
      [ ADL<terminator> ]
    END
  WHEN (<struct tag> <> '') THEN
    DO
      map_to_adl_id(<struct tag>,ADL<qualifier identifier>) :
      SUBTYPE OF SEQUENCE
      [ ADL<TITLE attribute> ]
      [ ADL<NOTE attribute> ]
      [ ADL<HELP attribute> ]
      [ ADL<WHEN clause> ]
      ADL<BEGIN statement>
      /**********************************************************/
      /* Map the <member list>.  To do this map each            */
      /* <data definition> in the member list according to the  */
      /* appropriate section in this chapter.  The alignment    */
      /* algorithm must be applied (unless the _Packed          */
      /* attribute was used on the struct).  See the sections   */
      /* on data alignment in this part of the specification.   */
      /**********************************************************/
      adlmap(<member list>)
      ADL<END statment>
```

```
    |     /************************************************************/
    |     /* Create an ADL<subtype instance>.  This is created         */
    |     /* whenever a <struct tag> is included. If a                 */
    |     /* <member list> was not included then this <struct tag>     */
    |     /* must have been previously declared in a <struct data      */
    |     /* declaration>, which is mapped to an ADL<SUBTYPE>.         */
    |     /************************************************************/
    |     map_to_adl_id(<identifier>,ADL<qualified identifier>) :
    |     map_to_adl_id(<struct tag>,ADL<qualifier identifier>)
    |     [ ADL<TITLE attribute> ]
    |     [ ADL<NOTE attribute> ]
    |     [ ADL<HELP attribute> ]
    |     [ ADL<WHEN clause> ]
    |     [ ADL<terminator> ]
    |  └END
    OTHERWISE
          map_to_adl_id(<identifier>,ADL<qualified identifier>) :
          SEQUENCE
          [ ADL<TITLE attribute> ]
          [ ADL<NOTE attribute> ]
          [ ADL<HELP attribute> ]
          [ ADL<WHEN clause> ]
          ADL<BEGIN statement>
          /************************************************************/
          /* Map the <member list>.  To do this map each               */
          /* <data definition> in the member list according to the    */
          /* appropriate section in this chapter.  The alignment       */
          /* algorithm must be applied (unless the _Packed             */
          /* attribute was used on the struct).  See the sections     */
          /* on data alignment in this part of the specification.      */
          /************************************************************/
          adlmap(<member list>)
          ADL<END statment>
└END
/* Termination Section                                      */
/* END PROCEDURE: STRUCT                                    */
```

8.15.4 ADL Mapping Notes :

1. None

8.15.5 Exceptions :

0065E An incomplete struct tag cannot be used in a declaration.

Recovery: Give a definition of the tag before it is used in the declaration of an object or in the declaration itself.

0066E Struct member declarations must specify a declarator.

Recovery: Declare the member with a name.

Unclassified

0067E The &1 struct definition must specify a member list.

Recovery: Specify the members of the struct in the definition or remove the empty braces to make it a simple struct tag declaration.

0068E Length adjectives cannot be used with structs.

Recovery: Remove the length adjective.

0069E Sign adjectives cannot be used with structs.

Recovery: Remove the sign adjective.

0070E A struct's member cannot be declared with a storage class.

Recovery: Remove the storage class from the member's data definition.

8.15.6 Examples :

1.

```
/* C source data declaration and definition */
struct groceries /* ADL TITLE('My generic grocery list') */
   {
     int apples;                /* Structure declaration */
     int oranges;               /* no storage allocated  */
     char store_name[40];
   } week[52] /* ADL TITLE('This years grocery lists'); */;

/* ADL source declaration   */
groceries : SUBTYPE OF SEQUENCE
  TITLE('My generic grocery list')
BEGIN;
  apples     : BINARY;
  oranges    : BINARY;
  store_name : CHAR LENGTH(40);
END;

week : ARRAY
   DMNLST(DNMSIZE(52))
   TITLE('This years grocery lists')
   OF groceries;
```

2.

Unclassified

```
/* C source declaration */
struct {                        /* Declares and allocates storage for  */
       char first_char;         /* this structure to variables named   */
       char first_token[255];   /* file_1 and file_2.                  */
       long tokens_read;
      } file_1, file_2;

/* ADL source declaration   */
file_1 : file_2 : SEQUENCE
BEGIN;
  first_char  : CHAR LENGTH(1);
  first_token : CHAR LENGTH(255);
  tokens_read : BINARY;
END;
```

8.16 <struct typedef data declaration>

8.16.1 Function :

An ordered group of data objects. The data objects within a structure can have varied data types. Each data object in a structure is called a member or field. A member can be of any type including struct, union, and bit-field. A <struct typedef data declaration> only declares a <typedef identifier>, which will be mapped to an ADL <SUBTYPE>. It does not define any storage.

8.16.2 Format :

```
<struct typedef data declaration> ::=
   typedef [<attribute>] struct
   <member list>
   <typedef identifier> [<identifier annotation>]
   [<struct annotation>] ;
```

8.16.2.1 Format Notes.

1. For a definition of <struct tag> see 8.15, "<struct data definition>" on page 171.
2. For a definition of <member list> see 8.15, "<struct data definition>" on page 171.
3. For a definition of <struct annotation> see 8.15, "<struct data definition>" on page 171.
4. The <data definition>s in the <member list> cannot include a <storage class>.

8.16.3 ADL Mapping :

<struct typedef data declaration> *MAPS TO ADL:*

```
/*-------------------------------------------------------*/
/* REXX PROCEDURE: STRUCTT      DATE: 07/18/91          */
/* Initialization Section                                */
/*-------------------------------------------------------*/
map_to_adl_id(<struct tag>,ADL<qualifier identifier>) :
SUBTYPE OF SEQUENCE
[ ADL<TITLE attribute> ]
[ ADL<NOTE attribute> ]
[ ADL<HELP attribute> ]
[ ADL<WHEN clause> ]
ADL<BEGIN statement>
/*********************************************************/
/* Now map the <member list>.  To do this map each       */
/* <data definition> in the member list according to the */
/* appropriate section in this chapter.  The alignment   */
/* algorithm must be applied (unless the _Packed         */
/* attribute was used on the struct).  See the sections  */
/* on data alignment in this part of the specification.  */
/*********************************************************/
adlmap(<member list>)
ADL<END statment>
```

Unclassified

```
/* Termination Section                                           */
/* END PROCEDURE: STRUCTT                                        */
```

8.16.4 ADL Mapping Notes :

1. None

8.16.5 Exceptions :

0071E Struct member declarations must specify a declarator.

Recovery: Declare the member with a name.

0072E The &1 struct definition must specify a member list.

Recovery: Specify the members of the struct in the definition or remove the empty braces to make it a simple struct tag declaration.

0073E Length adjectives cannot be used with structs.

Recovery: Remove the length adjective.

0074E Sign adjectives cannot be used with structs.

Recovery: Remove the sign adjective.

8.16.6 Examples :

1.

```
/* C source declaration */
typedef struct
   {
     int apples;                /* Structure declaration */
     int oranges;               /* no storage allocated  */
     char store_name[40];
   } groceries /* ADL TITLE('My generic grocery list'); */;

/* ADL source declaration   */
groceries : SUBTYPE OF SEQUENCE
  TITLE('My generic grocery list')
BEGIN;
  apples     : BINARY;
  oranges    : BINARY;
  store_name : CHAR LENGTH(40);
END;
```

2.

```
/* C source declaration              */
/* Declares and allocates storage for */
/* groceries.                        */
groceries this_years[52] /* ADL TITLE('This years grocery lists'); */,
          last_years[52] /* ADL TITLE('Last years grocery lists'); */;

/* ADL source declaration    */
this_years : ARRAY
   DMNLST(DNMSIZE(52))
   TITLE('This years grocery lists')
   OF groceries;

last_years : ARRAY
   DMNLST(DNMSIZE(52))
   TITLE('Last years grocery lists')
   OF groceries;
```

8.17 <typedef data declaration>

8.17.1 Function :

C language typedef declarations allow you to define your own identifiers that can be used in place of C type specifiers such as int, float, and double. The data types you define using typedef are not new data types. The identifiers you define are synonyms for the primary data types used by the C language or, data types derived by combining the primary data types.

A typedef declaration does not reserve any storage.

8.17.2 Format :

```
<typedef declarator> ::=
   [<array annotation>] [<attribute>]
   <typedef identifier> [<subscript declarator>]

<typedef identifier> ::= <identifier>

<typedef data declaration> ::=
   typedef
   {
     [<attribute>] <type specifier>
   }
   {
     <typedef declarator> [<identifier annotation>]
   }
   [
     {
       , <typedef declarator> [<identifier annotation>]
     }...
   ]
   [<type specifier annotation>] ;
```

8.17.2.1 Format Notes

1. See 8.12.2, "Format :" on page 155 under the description of 8.12, " <pointer data definition> " on page 155 for the definition of <type specifier>.
2. For each <type specifier> see the section describing the type for a definition of <type specifier annotation>, where *type specifier* is replaced by the actual keyword for the type.
3. <array annotation> is valid only when a typedef of an array is being declared.

8.17.3 ADL Mapping :

<typedef data declaration> *MAPS TO ADL:*

```
map_to_adl_id(<typedef identifier>,ADL<qualified identifier>) :
/*------------------------------------------------------*/
/* REXX PROCEDURE: TYPEDEF        DATE: 07/24/91         */
/* Initialization Section                                */
```

```
/*------------------------------------------------------*/
SUBTYPE OF
adlmap(<type specifier>)
/* Termination Section                                  */
/* END PROCEDURE: TYPEDEF                               */
```

8.17.3.1 ADL Mapping Notes :

1. None.

8.17.4 Exceptions :

1. None

8.17.5 Examples:

1.

```
/* C source declaration */
/* Declare LENGTH as synonym for int.  Declare length,  */
/* width, and height to be integral variables.          */
/* Note that becuase C is case sensative, LENGTH and    */
/* length are different identifiers.                    */
typedef int LENGTH;
LENGTH length, width, height;

/* ADL source declaration   */
LENGTH : SUBTYPE OF BINARY;
length : width : height : LENGTH;
```

2.

```
/* C source declaration */
/* Declare a structure type named WEIGHT.  Declare      */
/* five variables to be struct variables of type WEIGHT. */
typedef struct {
                int kilos;
                int grams;
               } WEIGHT;
WEIGHT chicken, horse, cow, whale, mouse, man;

/* ADL source declaration   */
WEIGHT : SUBTYPE OF SEQUENCE
  BEGIN;
    kilos : BINARY;
    grams : BINARY;
  END;
chicken : horse : cow : whale : man : WEIGHT;
```

3.

Unclassified

```
/* C source declaration */
typedef unsigned long int
/* ADL DMNLST(DMNSIZE(total_rejects)) */ reject_part_numbers[10,000];

struct
{
  unsigned int total_rejects;
  reject_part_numbers rejects;
} quality_data;

/* ADL mapping of above */
reject_part_numbers : SUBTYPE OF
  ARRAY DMNLST( DMNSIZE(total_rejects) DMNMAX(10000) )
  OF BINARY SIGNED(FALSE) LENGTH(32) PRECISION(32);

quality_data : SEQUENCE
BEGIN;
  total_rejects : BINARY SIGNED(FALSE) LENGTH(32) PRECISIN(32);
  rejects : reject_part_numbers;
END;
```

Unclassified

8.18 <typedef instance data definition>

8.18.1 Function :

A typedef instance is a data defintion where the <type specifier> was declared in a typedef statement. The typedef declared type specifier may be from system provided include files or they may be user created. The typedef identifier is a synonym for the primary data types used by the C language or, data types derived by combining the primary data types.

8.18.2 Format :

```
<typedef instance declarator> ::=
   [<array annotation>] [<attribute>] <identifier> [<subscript declarator>]

<typedef instance data definition> ::=
   {
     [<storage class>] [<attribute>] <typedef identifier>
   }
   {
     <typedef instance declarator> [<initializer>] [<identifier annotation>]
   }
   [
     {
       , <typedef instance declarator> [<initializer>] [<identifier annotation>]
     }...
   ]
   [<type specifier annotation>] ;
```

8.18.2.1 Format Notes

1. For each <type specifier> see the section describing the type for a definition of <type specifier annotation>, where *type specifier* is replaced by the actual keyword for the type.
2. When the <typedef identifier> is that of a typedef of an array and <subscript declarator> is null, then <type specifier annotation> is <array annotation>. The attributes of the elements of the array cannot be overridden on an instance of a typedef of an array.
3. <array annotation> is valid only when the typedef instance includes dimensions, i.e. <subscript declarator> is not null. In this case an ADL<ARRAY> declaration will be produced. The <type specifier annotation> annotates the element ADL type or ADL <subtype instance>.

8.18.3 ADL Mapping :

<typedef instance data definition> *MAPS TO ADL:*

```
map_to_adl_id(<identifier>,ADL<qualified identifier>) :
map_to_adl_id(<typedef identifier>,ADL<qualified identifier>)
/*-------------------------------------------------------*/
/* REXX PROCEDURE: INSTANCE     DATE: 07/23/91           */
/* Initialization Section                                */
/*-------------------------------------------------------*/
```

```
SELECT
  WHEN (<subscript declarator> <> '') THEN
      IF (<typedef identifier> references a SUBTYPE OF ARRAY) THEN
       DO
         /**********************************************************/
         /* Both <type specifier annotation> and <array           */
         /* annotation> are allowed.  Because the <typedef         */
         /* identifier> references an array, and there are         */
         /* additional subscripts on the <typedef instance data    */
         /* definition> the mapping must be to an ADL<ARRAY>       */
         /* where the element definition is taken from the SUBTYPE */
         /* and the DMNLST is the DMNLST from the SUBTYPE with     */
         /* the dimensions from the <typedef instance data         */
         /* definition> appended to the end of this list.  However */
         /* if the <array annotation> includes ASIS then the       */
         /* <type specifier annotation> is ignored and the mapping */
         /* is to an ASIS string of LENGTH(<field size>) where     */
         /* <field size> is the length in bits of the array.       */
         /* If <array annotation> does not include ASIS but the    */
         /* <type specifier annotation> does then the array        */
         /* element is replaced by an ASIS LENGTH(<field size>)    */
         /* where <field size> is the size in bits of the element. */
         /**********************************************************/
       END
      ELSE
       DO
         /**********************************************************/
         /* Both <type specifier annotation> and <array annotation>*/
         /* are allowed.  The mapping is to an ADL<ARRAY> of       */
         /* ADL<subtype instance>, where the ADL<subtype           */
         /* identifier> is given by the <typedef identifier>.  The */
         /* <array annotation> is place in the ADL<ARRAY>          */
         /* attributes list and the <type specifier annotation> is */
         /* placed in the ADLINSTANCE attributes list.  However, if*/
         /* the <type specifier annotation> includes ASIS, then the*/
         /* <type specifier annotation> is ignored and the mapping */
         /* produces an ASIS string of LENGTH(<field size>) where  */
         /* <field size> is the size in bits of the ARRAY OF       */
         /* ADL<subtype instance>.                                 */
         /**********************************************************/
       END
  WHEN (<typedef identifier> references a SUBTYPE OF ARRAY) THEN
   DO
     /**********************************************************/
     /* Only <array annotation> is allowed on the <typedef     */
     /* instance data definition>.  The annotated attributes   */
     /* are placed in the ADLINSTANCE attribute list.          */
     /* The mapping is to a ADL<subtype instance>.  However, if*/
     /* the <type specifier annotation> includes ASIS, then the*/
     /* mapping produces an ASIS string of LENGTH(<field size>)*/
     /* where <field size> is the size in bits of the ARRAY OF */
     /* ADL<subtype instance>.                                 */
     /**********************************************************/
   END
  OTHERWISE
      /**********************************************************/
```

```
|       /* Only <type specifier annotation> allowed on the        */
|       /* <typedef instance data definition>.  These are placed  */
|       /* in the ADLINSTANCE attribute list.  However, if the    */
|       /* <type specifier annotation> includes ASIS, then the    */
|       /* mapping is to an ASIS string of LENGTH(<field size>)   */
|       /* where <field size> is the size in bits of the          */
|       /* ADL<subtype instance>.                                 */
|       /**********************************************************/
└END
[ ADL<TITLE attribute> ]
[ ADL<NOTE attribute> ]
[ ADL<HELP attribute> ]
[ ADL<WHEN clause> ]
ADL<terminator>
/* Termination Section                                   */
/* END PROCEDURE: INSTANCE                               */
```

8.18.3.1 ADL Mapping Notes :

1. None

8.18.4 Exceptions :

0075E typdef identifier must be declared before use in a data definition

Recovery: Add or move the typedef declaration before the data definition

---

0076E Length adjectives cannot be used for variables declared with a typedef.

Recovery: Remove the length adjective.

---

0077E Sign adjectives cannot be used for variables declared with a typedef.

Recovery: Remove the sign adjective.

8.18.5 Examples:

1.

```
/* C source declaration */
/* Create an typedef called dbcs which uses EBCDIC Japanese Host CCSID */
typedef wchar_t dbcs /* ADL CCSID(300) */

/* Create a data definition which is an instance of this typedef */
dbcs title[80];

/* The ADL mapping of the above */
dbcs : SUBTYPE OF CHAR LENGTH(2) CCSID(300);

title : ARRAY DMNLST( DMNSIZE(80) ) OF dbcs;
```

2.

Unclassified

```
/* C source declaration */
typedef int xy[100][100];

xy /* ADL ASIS */ chart;

/* ADL mapping of the above */
xy : SUBTYPE
  OF ARRAY DMNLST( DMNSIZE(100), DMNSIZE(100) )
    OF BINARY PRECISION(31) LENGTH(32) SIGNED(TRUE);

chart : ASIS LENGTH(40000) UNTILEN(8);
```

3.

```
/* C declaration of a 3 dimensional array 10 x 100 x 100 */
typedef int xy[100][100];

xy coordinates[10] /* ADL TITLE('Screen coordinates'); */;

/* ADL mapping of the above */
xy : SUBTYPE
  OF ARRAY DMNLST( DMNSIZE(100), DMNSIZE(100) )
    OF BINARY;

coordinates : ARRAY DMNLST ( DMNSIZE(10), DMNSIZE(100), DMNSIZE(100) )
  OF BINARY TITLE('Screen coordinates');
```

8.19 <union data declaration>

8.19.1 Function :

A union is an object that can hold any one of a set of named members. The members of the named set can be of any data type. At any given time, a union can contain only one of its members. However, enough space is allocated to hold the largest member of the union.

A union requires ADL annotation to be completely parsed. ADL requires that variant records have a discriminant fields which can be tested to determine which variant was written to a record. This is done by annotating with the ADL <WHEN statement> or ADL <OTHERWISE statement>.

The union can also be used to describe a MAXALC(FALSE) variant by annotating with MAXALC(FALSE). MAXALC(FALSE) unions can be created by writing the variants or union members to the record with program logic. In this example, the file must be opended for stream I/O. The application itself may or may not actually use the union statement since the case may be built in the record from independent data definitions using stream I/O statements. However, the union could still be used to describe the variant to the C declaration translator.

A <union data declaration> does not define any storage. It only declares the <union tag> and is mapped to an ADL SUBTYPE OF CASE.

8.19.2 Format :

```
<union data declaration> ::=
   {
     [<storage class>] [<attribute>] union
     <union tag> [<identifier annotation>]
   }
   <union member list>
   [<union annotation>] ;
```

8.19.2.1 Format Notes.

1. For a definition of <union tag> see 8.20, "<union data definition>" on page 190.
2. For a definition of <union member list> see 8.20, "<union data definition>" on page 190.
3. For a definition of <union annotation> see 8.20, "<union data definition>" on page 190.
4. Each union member must be annotated with a WHEN or OTHERWISE statement.
5. The OTHERWISE may appear only once in a union annotation.
6. A <data definition> in the <union member list> cannot include a <storage class>.

8.19.3 ADL Mapping :

<union data declaration> *MAPS TO ADL:*

```
map_to_adl_id(<identifier>,ADL<qualified identifier>) :
/*--------------------------------------------------------*/
/* REXX PROCEDURE: UNIOND      DATE: 07/24/91             */
/* Initialization Section                                 */
/*--------------------------------------------------------*/
IF (<union tag> <> '') THEN
  DO
    map_to_adl_id(<union tag>,ADL<qualifier identifier>) :
    SUBTYPE OF CASE
    [ MAXALC(TRUE) ]
    [ ADL<TITLE attribute> ]
    [ ADL<NOTE attribute> ]
    [ ADL<HELP attribute> ]
    [ ADL<WHEN clause> ]
    ADL<BEGIN statement>
    /**********************************************************/
    /* Now map the <union member list>.  To do this map each  */
    /* <data definition> in the member list according to the  */
    /* appropriate section in this chapter.  The alignment    */
    /* algorithm must be applied (unless the _Packed          */
    /* attribute was used on the union).  See the sections    */
    /* on data alignment in this part of the specification.   */
    /* The member list also includes WHEN and OTHERWISE       */
    /* annotation and possibly ADL<REJEC statement>,          */
    /* ADL<SKIP statement>, or ADL<terminator> in place of    */
    /* the <data definition>.  These are all encoded as       */
    /* defined by the ADL definition and ADL encodings.       */
    /**********************************************************/
    adlmap(<union member list>)
    ADL<END statment>
  END
ELSE
    ec = ERROR(E,'0078E  A union declartion must specify a union tag.')
/* Termination Section                                    */
/* END PROCEDURE: UNIOND                                  */
```

8.19.3.1 ADL Mapping Notes :

1. If MAXALC(FALSE) is not specified it defaults to MAXALC(TRUE)

8.19.4 Exceptions

0078E A union declartion must specify a union tag.

Recovery: Add the union tag or add a union declarator to make this a union data definition.

0079E Description of union <identifier> not complete. Missing required annotation with WHEN statements.

Recovery: Each union member must be annotated with a WHEN or OTHERWISE statement. The WHEN statement contain conditional tests of a field in the record which determines which union member a union contains.

---

0080E The ADL <qualified identifier> from the ADL <condition> not found.

Explanation: The ADL <qualified identifier> referenced in the ADL <condition> of the <when annotation> must be part of the record being described.

Recovery: Add the field to the C data description or correct the ADL <qualified identifier> to correctly reference a field in the record.

---

0081E An Incomplete union tag cannot be used in a declaration.

Recovery: Give a definition of the tag before it is used in the declaration of an object or in the declaration itself.

---

0082E Union member declarations must specify a declarator.

Recovery: Declare the member with a name.

---

0083E The &1 union definition must specify a member list.

Recovery: Specify the members of the union in the definition or remove the empty braces to make it a simple union tag declaration.

---

0084E Length adjectives cannot be used with unions.

Recovery: Remove the length adjective.

---

0085E Sign adjectives cannot be used with unions.

Recovery: Remove the sign adjective.

8.19.5 Examples :

1.

```
/* C source declaration */
struct
{
  char data_flag; /* the descriminant for the union */
  union junk
  {
    /* ADL WHEN data_flag = 'I' THEN */ char x[5];
    /* ADL WHEN data_flag = 'W' THEN */ short size;
    /* ADL WHEN data_flag = 'E' THEN */ long result;
    /* ADL OTHERWISE REJECT ; */
  } old_data,
    new_data /* ADL TITLE('More sample annotation'); */,
    out_data /* ADL MAXALC(FALSE) NOTE('Use stream I/O'); */;
} data_record;

/* ADL source declaration   */
junk : SUBTYPE OF CASE
BEGIN;
  WHEN (data_flag = 'I') THEN x : CHAR LENGTH(5);
  WHEN (data_flag = 'W') THEN size : BINARY PRECISION(15);
  WHEN (data_flag = 'E') THEN result : BINARY;
  OTHERWISE REJECT;
END;

data_record : SEQUENCE
BEGIN;
  data_flag : CHAR LENGTH(1);
  old_data : junk;
  new_data : junk TITLE('More sample annotation');
  out_data : junk MAXALC(FALSE) NOTE('Use stream I/O');
END;
```

8.20 <union data definition>

8.20.1 Function :

A union is an object that can hold any one of a set of named members. The members of the named set can be of any data type. At any given time, a union can contain only one of its members. However, enough space is allocated to hold the largest member of the union.

A union requires ADL annotation to be completely parsed. ADL requires that variant records have a discriminant fields which can be tested to determine which variant was written to a record. This is done by annotating with the ADL < WHEN statement > or ADL < OTHERWISE statement >.

The union can also be used to describe a MAXALC(FALSE) variant by annotating with MAXALC(FALSE). MAXALC(FALSE) unions can be created by writing the variants or union members to the record with program logic. In this example, the file must be opended for stream I/O. The application itself may or may not actually use the union statement since the case may be built in the record from independent data definitions using stream I/O statements. However, the union could still be used to describe the variant to the C declaration translator.

8.20.2 Format :

```
<union declarator> ::=
   [<array annotation>] [<attribute>] <identifier> [<subscript declarator>]

<union data definition> ::=
   {
     [<storage class>] [<attribute>] union
     [<union tag> [<identifier annotation>] ]
   }
   [ <union member list> ]
   {
     <union declarator> [<initializer>] [<identifier annotation>]
   }
   [
     {
       , <union declarator> [<initializer>] [<identifier annotation>]
     }...
   ]
   [<union annotation>] ;

<union tag> ::= <identifier>

<union member list> ::=
   ►{
      {
        <when annotation>
        { <data definition> | <case variant annotation> }
        [
```

Unclassified

```
        <when annotation>
        { <data definition> | <case variant annotation> }
      ]...
    }
    [
      <otherwise annotation>
      { <data definition> | <case variant annotation> }
    ]
 ►}

<when annotation> ::=
   [ADL<qualified identifier> :]
   WHEN ADL<condition> THEN

<otherwise annotation> ::=
   [ADL<qualified identifier> :]
   OTHERWISE

<case variant annotation> ::=
   {
      ADL<REJECT statement>
    | ADL<SKIP statement>
    | ADL<terminator>
   }

<union annotation> ::=
  {
    [ ASIS ]
    {
      [ ADL<MAXALC attribute> ]
      [ ADL<TITLE attribute> ]
      [ ADL<NOTE attribute> ]
      [ ADL<HELP attribute> ]
      [ ADL<WHEN clause> ]
    }!
  }
  ADL<terminator>
```

8.20.2.1 Format Notes.

1. Each union member must be annotated with a WHEN or OTHERWISE statement.
2. The OTHERWISE may appear only once in a union annotation.
3. A <data definition> in the <union member list> cannot include a <storage class>.

8.20.3 ADL Mapping :

<union data definition> *MAPS TO ADL:*

```
map_to_adl_id(<identifier>,ADL<qualified identifier>) :
/*------------------------------------------------------*/
/* REXX PROCEDURE: UNION          DATE: 07/21/91          */
/* Initialization Section                                 */
/*------------------------------------------------------*/
SELECT
  WHEN (<union member list> = '') THEN
    DO
      /*********************************************************/
      /* Now create an ADL<subtype instance>.  This is created  */
      /* whenever a union tag> is included. If a                */
      /* <union member list> was not included then this <union  */
      /* tag> must have been previously declared in a <union    */
      /* data declaration>, which is mapped to an ADL<SUBTYPE>. */
      /*********************************************************/
      map_to_adl_id(<identifier>,ADL<qualified identifier>) :
      map_to_adl_id(union tag>,ADL<qualifier identifier>)
      [ ADL<TITLE attribute> ]
      [ ADL<NOTE attribute> ]
      [ ADL<HELP attribute> ]
      [ ADL<WHEN clause> ]
      [ ADL<terminator> ]
    END
  WHEN (pos('ASIS',<array annotation>) = 0) THEN
      IF (union tag> <> '') THEN
        DO
          map_to_adl_id(union tag>,ADL<qualifier identifier>) :
          SUBTYPE OF CASE
          [ MAXALC(TRUE) ]
          [ ADL<TITLE attribute> ]
          [ ADL<NOTE attribute> ]
          [ ADL<HELP attribute> ]
          [ ADL<WHEN clause> ]
          ADL<BEGIN statement>
          /*********************************************************/
          /* Now map the <union member list>.  To do this map each  */
          /* <data definition> in the member list according to the */
          /* appropriate section in this chapter.  The alignment    */
          /* algorithm must be applied (unless the _Packed          */
          /* attribute was used on the union).  See the sections    */
          /* on data alignment in this part of the specification.   */
          /* The member list also includes WHEN and OTHERWISE       */
          /* annotation and possibly ADL<REJEC statement>,          */
          /* ADL<SKIP statement>, or ADL<terminator> in place of    */
          /* the <data definition>.  These are all encoded as       */
          /* defined by the ADL definition and ADL encodings.       */
          /*********************************************************/
          adlmap(<union member list>)
          ADL<END statment>
```

```
        /***********************************************************/
        /* Now create an ADL<subtype instance>.  This is created    */
        /* whenever a union tag> is included. If a                  */
        /* <union member list> was not included then this <union    */
        /* tag> must have been previously declarated in a <union    */
        /* data declaration>, which is mapped to an ADL<SUBTYPE>.   */
        /***********************************************************/
        map_to_adl_id(<identifier>,ADL<qualified identifier>) :
        map_to_adl_id(union tag>,ADL<qualifier identifier>)
        [ ADL<TITLE attribute> ]
        [ ADL<NOTE attribute> ]
        [ ADL<HELP attribute> ]
        [ ADL<WHEN clause> ]
        [ ADL<terminator> ]
      END
    ELSE
      DO
        map_to_adl_id(<identifier>,ADL<qualified identifier>) :
        CASE
        [ MAXALC(TRUE) ]
        [ ADL<TITLE attribute> ]
        [ ADL<NOTE attribute> ]
        [ ADL<HELP attribute> ]
        [ ADL<WHEN clause> ]
        ADL<BEGIN statement>
        /***********************************************************/
        /* Now map the <union member list>.  To do this map each    */
        /* <data definition> in the member list according to the    */
        /* appropriate section in this chapter.  The alignment      */
        /* algorithm must be applied (unless the _Packed            */
        /* attribute was used on the union).  See the sections      */
        /* on data alignment in this part of the specification.     */
        /* The member list also includes WHEN and OTHERWISE         */
        /* annotation and possibly ADL<REJEC statement>,            */
        /* ADL<SKIP statement>, or ADL<terminator> in place of      */
        /* the <data definition>.  These are all encoded as         */
        /* defined by the ADL definition and ADL encodings.         */
        /***********************************************************/
        adlmap(<union member list>)
        ADL<END statment>
      END
  OTHERWISE
END
/* Termination Section                                 */
/* END PROCEDURE: UNION                                */
```

8.20.3.1 ADL Mapping Notes :

1. If MAXALC(FALSE) is not specified it defaults to MAXALC(TRUE)

8.20.4 Exceptions

0086E Description of union <identifier> not complete. Missing required annotation with WHEN statements.

Recovery: Each union member must be annotated with a WHEN or OTHERWISE statement. The WHEN statement contain conditional tests of a field in the record which determines which union member a union contains.

---

0087E The ADL <qualified identifier> from the ADL <condition> not found.

Explanation: The ADL <qualified identifier> referenced in the ADL <condition> of the <when annotation> must be part of the record being described.

Recovery: Add the field to the C data description or correct the ADL <qualified identifier> to correctly reference a field in the record.

---

0088E An Incomplete union tag cannot be used in a declaration.

Recovery: Give a definition of the tag before it is used in the declaration of an object or in the declaration itself.

---

0089E Union member declarations must specify a declarator.

Recovery: Declare the member with a name.

---

0090E The &1 union definition must specify a member list.

Recovery: Specify the members of the union in the definition or remove the empty braces to make it a simple union tag declaration.

---

0091E Length adjectives cannot be used with unions.

Recovery: Remove the length adjective.

---

0092E Sign adjectives cannot be used with unions.

Recovery: Remove the sign adjective.

---

0093E A struct's member cannot be declared with a storage class.

Recovery: Remove the storage class from the member's data definition.

8.20.5 Examples :

1.

Unclassified

```
/* C source declaration */
struct
{
  char data_flag; /* the descriminant for the union */
  union junk
  {
    /* ADL WHEN data_flag = 'I' THEN */ char x[5];
    /* ADL WHEN data_flag = 'W' THEN */ short size;
    /* ADL WHEN data_flag = 'E' THEN */ long result;
    /* ADL OTHERWISE REJECT ; */
  } old_data,
    new_data /* ADL TITLE('More sample annotation'); */,
    out_data /* ADL MAXALC(FALSE) NOTE('Use stream I/O'); */;
} data_record;

/* ADL source declaration   */
junk : SUBYTPE OF CASE
BEGIN;
  WHEN (data_flag = 'I') THEN x : CHAR LENGTH(5);
  WHEN (data_flag = 'W') THEN size : BINARY PRECISION(15);
  WHEN (data_flag = 'E') THEN result : BINARY;
  OTHERWISE REJECT;
END;

data_record : SEQUENCE
BEGIN;
  data_flag : CHAR LENGTH(1);
  old_data : junk;
  new_data : junk TITLE('More sample annotation');
  out_data : junk MAXALC(FALSE) NOTE('Use stream I/O');
END;
```

Unclassified

8.21 <union typedef data declaration>

8.21.1 Function :

A union is an object that can hold any one of a set of named members. The members of the named set can be of any data type. At any given time, a union can contain only one of its members. However, enough space is allocated to hold the largest member of the union.

A union requires ADL annotation to be completely parsed. ADL requires that variant records have a discriminant fields which can be tested to determine which variant was written to a record. This is done by annotating with the ADL <WHEN statement> or ADL <OTHERWISE statement>.

The union can also be used to describe a MAXALC(FALSE) variant by annotating with MAXALC(FALSE). MAXALC(FALSE) unions can be created by writing the variants or union members to the record with program logic. In this example, the file must be opended for stream I/O. The application itself may or may not actually use the union statement since the case may be built in the record from independent data definitions using stream I/O statements. However, the union could still be used to describe the variant to the C declaration translator.

A <union typedef data declaration> does not define any storage. It only declares the <typedef identifier> and is mapped to an ADL SUBTYPE OF CASE.

8.21.2 Format :

```
<union typedef data declaration> ::=
   typedef [<attribute>] union
   <union member list>
   <typedef identifier> [<identifier annotation>]
   [<union annotation>] ;
```

8.21.2.1 Format Notes.

1. For a definition of <union tag> see 8.20, "<union data definition>" on page 190.
2. For a definition of <union member list> see 8.20, "<union data definition>" on page 190.
3. For a definition of <union annotation> see 8.20, "<union data definition>" on page 190.
4. Each union member must be annotated with a WHEN or OTHERWISE statement.
5. The OTHERWISE may appear only once in a union annotation.
6. A <data definition> in the <union member list> cannot include a <storage class>.

8.21.3 ADL Mapping :

<union typedef data declaration> *MAPS TO ADL:*

```
map_to_adl_id(<identifier>,ADL<qualified identifier>) :
/*-------------------------------------------------------*/
/* REXX PROCEDURE: UNIONT      DATE: 07/21/91            */
/* Initialization Section                                */
/*-------------------------------------------------------*/
map_to_adl_id(<union tag>,ADL<qualifier identifier>) :
SUBTYPE OF CASE
[ MAXALC(TRUE) ]
[ ADL<TITLE attribute> ]
[ ADL<NOTE attribute> ]
[ ADL<HELP attribute> ]
[ ADL<WHEN clause> ]
ADL<BEGIN statement>
/*******************************************************/
/* Now map the <union member list>.  To do this map each */
/* <data definition> in the member list according to the */
/* appropriate section in this chapter.  The alignment   */
/* algorithm must be applied (unless the _Packed         */
/* attribute was used on the union).  See the sections   */
/* on data alignment in this part of the specification.  */
/* The member list also includes WHEN and OTHERWISE      */
/* annotation and possibly ADL<REJEC statement>,         */
/* ADL<SKIP statement>, or ADL<terminator> in place of   */
/* the <data definition>.  These are all encoded as      */
/* defined by the ADL definition and ADL encodings.      */
/*******************************************************/
adlmap(<union member list>)
ADL<END statment>
/* Termination Section                                   */
/* END PROCEDURE: UNIONT                                 */
```

8.21.3.1 ADL Mapping Notes :

1. If MAXALC(FALSE) is not specified it defaults to MAXALC(TRUE)

8.21.4 Exceptions

0094E Description of union <identifier> not complete. Missing required annotation with WHEN statements.

Recovery: Each union member must be annotated with a WHEN or OTHERWISE statement. The WHEN statement contain conditional tests of a field in the record which determines which union member a union contains.

0095E The ADL <qualified identifier> from the ADL <condition> not found.

Explanation: The ADL <qualified identifier> referenced in the ADL <condition> of the <when annotation> must be part of the record being described.

Recovery: Add the field to the C data description or correct the ADL <qualified identifier> to correctly reference a field in the record.

0096E An Incomplete union tag cannot be used in a declaration.

Recovery: Give a definition of the tag before it is used in the declaration of an object or in the declaration itself.

0097E Union member declarations must specify a declarator.

Recovery: Declare the member with a name.

0098E The &1 union definition must specify a member list.

Recovery: Specify the members of the union in the definition or remove the empty braces to make it a simple union tag declaration.

0099E Length adjectives cannot be used with unions.

Recovery: Remove the length adjective.

0100E Sign adjectives cannot be used with unions.

Recovery: Remove the sign adjective.

8.21.5 Examples :

1.

Unclassified

```
/* C source declaration */
typedef union
  {
    /* ADL WHEN data_flag = 'I' THEN */ char x[5];
    /* ADL WHEN data_flag = 'W' THEN */ short size;
    /* ADL WHEN data_flag = 'E' THEN */ long result;
    /* ADL OTHERWISE REJECT ; */
  } junk;

struct
{
  char data_flag; /* the descriminant for the union */
  union junk
    old_data,
    new_data /* ADL TITLE('More sample annotation'); */,
    out_data /* ADL MAXALC(FALSE) NOTE('Use stream I/O'); */;
} data_record;

/* ADL source declaration   */
junk : SUBYTPE OF CASE
BEGIN;
  WHEN (data_flag = 'I') THEN x : CHAR LENGTH(5);
  WHEN (data_flag = 'W') THEN size : BINARY PRECISION(15);
  WHEN (data_flag = 'E') THEN result : BINARY;
  OTHERWISE REJECT;
END;

data_record : SEQUENCE
BEGIN;
  data_flag : CHAR LENGTH(1);
  old_data : junk;
  new_data : junk TITLE('More sample annotation');
  out_data : junk MAXALC(FALSE) NOTE('Use stream I/O');
END;
```

8.22 <wchar_t data definition>

8.22.1 Function :

A single multibyte character. A multibyte character takes two bytes of storage. This is used for DBCS characters.

8.22.2 Format :

```
<wchar_t declarator> ::=
   [<attribute>] <identifier>

<wchar_t data definition> ::=
   {
     [<storage class>] [<attribute>] wchar_t
   }
   {
     <wchar_t declarator> [<initializer>] [<identifier annotation>]
   }
   [
     {
       , <wchar_t declarator> [<initializer>] [<identifier annotation>]
     }...
   ]
   [<wchar_t annotation>] ;
<wchar_t annotation> ::=
  {
    ASIS
    {
      [ ADL<TITLE attribute> ]
      [ ADL<NOTE attribute> ]
      [ ADL<HELP attribute> ]
    }!
  }
  {
    [ ADL<CCSID attribute> ]
    [ ADL<TITLE attribute> ]
    [ ADL<NOTE attribute> ]
    [ ADL<HELP attribute> ]
  }!
```

8.22.2.1 Format Notes :

1. The wide character is defined as

`typedef unsigned short wchar_t;`

2. wchar_t is used for DBCS characters.
3. If a CCSID is annotated, then the its value must be that of a valid DBCS CCSID.
4. See 8.23, "<wide string data definition>" on page 203 for the declaration and ADL Mapping of an array of wchar_t. The C declaration translator's default is to map a wchar_t with a dimension as a string, but through annotation this can also be mapped as an array of DBCS characters.

8.22.3 ADL Mapping :

<wchar_t data definition> *MAPS TO ADL:*

```
map_to_adl_id(<identifier>,ADL<qualified identifier>) :
/*------------------------------------------------------*/
/* REXX PROCEDURE: WCHART        DATE: 08/19/91         */
/* Initialization Section                               */
/*------------------------------------------------------*/
IF (pos('ASIS',<wchar_t annotation>) <> 0) THEN
  DO
   ASIS                          /* ADL type               */
   LENGTH(1)
   UNITLEN(16)
  END
ELSE
  DO
   CHAR                          /* ADL type               */
   LENGTH(1)
   UNITLEN(16)
   [ CCSID(0) ]
  END
/* Termination Section                                  */
[ ADL<TITLE attribute> ]
[ ADL<NOTE attribute> ]
[ ADL<HELP attribute> ]
[ ADL<WHEN clause> ]
[ ADL<terminator> ]
/* END PROCEDURE: WCHART                                */
```

8.22.3.1 ADL Mapping Notes :

1. None

8.22.4 Exceptions :

0101E SBCS or Mixed CCSID not valid for a wchar_t character.

Explanation: Only a DBCS CCSID can be annotated on a whcar_t character.

8.22.5 Examples :

1.

```
/* C source declaration */
/* CCSID attribute set to CCSID(929) Thai PC Data DB */
wchar_t first_char /* ADL CCSID(929); */;

/* ADL source declaration   */
first_char : CHAR LENGTH(1) UNITLEN(16) CCSID(929);
```

2.

Unclassified

```
/* C source declaration */
/* CCSID inherited from CCSID hierarchy */
wchar_t next_char = 0x4288; /* initialized to a DBCS h */

/* ADL source declaration   */
next_char : CHAR LENGTH(1) UNITLEN(16);
```

3.

```
/* C source declaration */
/* CCSID attribute set to  CCSID(834) Korean Host DB */
wchar_t last_value /* ADL CCSID(834); */;

/* ADL source declaration   */
last_value : CHAR LENGTH(1) UNITLEN(16) CCSID(834);
```

4.

```
/* C source declaration */
/* CCSID attribute set to CCSID(285) United Kingdom SBCS */
wchar_t last_char /* ADL CCSID(285); */;

/* ADL source declaration   */
last_char : CHAR LENGTH(1) UNITLEN(16) CCSID(285);
0101E  SBCS or Mixed CCSID not valid for a wchar_t character.
```

5.

```
/* C source declaration */
wchar_t last_value /* ADL ASIS; */;

/* ADL source declaration   */
last_value : ASIS LENGTH(1) UNITLEN(16);
```

8.23 <wide string data definition>

8.23.1 Function :

A wide character string. This is a string of type wchar_t and is designed to hold DBCS data. In C a wide character string is an array of wchar_t. It depends on program usage whether the string is a fixed string, a suffix terminated varying string, or an array of single wchar_t characters. It is also possible to have multidimensional arrays of strings or single wchar_t characters.

The default is to assume a simple C declaration of an array of wchar_t is a fixed wide character string. The choice made by the declaration translator may not be correct, since the declaration translator does not know how the program logic used the string.

The safest method of declaring C strings is to include annotation so that the correct ADL string declaration can be determined. With annotation any C string declaration can be selected as a fixed string, a suffix terminated varying string, or an array of single wchar_t characters. In addition, the C declaration translator allows annotation with the ADL <ASIS> type. This causes the data definition to be described in ADL as an unencoded bit string.

A C suffix terminated variable length wide character string is stored as a one dimensional array of wchar_t. This is used as a null terminated string (i.e. the end of the string is marked by a null,X'0000' byte). The number of wchar_t characters in the string can vary from 0 to the size of the array minus one.

8.23.2 Format :

```
<wide string declarator> ::=
   [<array annotation>] [<attribute>] <identifier> [<subscript declarator>]

<wide string data definition> ::=
   [<storage class>] [<attribute>]
   [<sign adjective>] wchar_t
   {
     <wide string declarator>►[<string size>►]
     [<initializer>] [<identifier annotation>]
   }
   [
     {
       , <wide string declarator>►[<string size>►]
       [<initializer>] [<identifier annotation>]
     }...
   ]
   [ <wide string annotation> ];

<wide string annotation> ::=
  {
      <ASIS fixed length string annotation>
    | <ASIS varying length string annotation>
```

Unclassified

```
  | <CHAR array of single char annotation>
  | <CHAR fixed length string annotation>
  | <CHAR varying length string annotation>
  | <CHARSFX varying length string annotation>
}
ADL<terminator>
```

8.23.2.1 Format Notes

1. See 8.13, " <string data definition> " on page 158 for the definitions of the string annotation types defined under <wide string annotation>.
2. There are six type of strings which can be described depending on what <wide string annotation> is included:

<ASIS fixed length string annotation>
   Annotated with ASIS but without LENGTH(ADL<qualified identifier>).

<ASIS varying length string annotation>
   Annotated with ASIS and LENGTH(ADL<qualified identifier>).

<CHAR array of single char annotation>
   Annotated with CHAR but without LENGTH(ADL<qualified identifier>).

<CHAR fixed length string annotation>
   Annotated without CHAR and without LENGTH(ADL<qualified identifier>).

<CHAR varying length string annotation>
   Annotated without CHAR but with LENGTH(ADL<qualified identifier>).

<CHARSFX varying length string annotation>
   Annotated with CHARSFX.
3. If a <subscript declarator> is included, then the result is an array of one of the six types of strings described above. If the <string annotation> was <CHAR array of single char annotation>, then this simply adds annother dimension to the array resulting in a multidimensional array of single double byte characters.
4. The C definition of wchar_t is `typedef unsigned short wchar_t;`
5. Every character takes two bytes in a wide string. SBCS characters must be entered in their DBCS form, where the low byte is a CCSID defined value and the high byte is the SBCS encoding.
6. C does not define a limit on string length. The limit is defined by ADL to be (230)-1 characters (index values from 0 to (230)-2).
7. <wide string data definition> can be used only for DBCS characters.
8. <array annotation> is defined in 8.1, " <array data definition> " on page 111.
9. <string size> is defined in 8.13, " <string data definition> " on page 158.

8.23.3 ADL Mapping :

<wide string data definition> *MAPS TO ADL:*

```
map_to_adl_id(<identifier>,ADL<qualified identifier>) :
/*---------------------------------------------------*/
/* REXX PROCEDURE: WIDESTR       DATE: 12/16/91      */
/* Initialization Section                            */
/*---------------------------------------------------*/
/*---------------------------------------------------*/
/* INLINE REXX PROCEDURE: WCHARRAY     DATE: 12/16/91 */
/*    <dimension size> is obtained from the definition */
/*    of <subscript declarator>.                      */
/* Initialization Section                            */
/*---------------------------------------------------*/
/* START OF LOOP: WCHARRAY */
DO FOREVER
  SELECT
    WHEN (pos('ASIS',<array annotation> <> 0) THEN
      DO
        ASIS
        LENGTH([<dimension size>{[*<dimension size>]...}]*<string size>)
        UNITLEN(16)
        /********************************************************/
        /* Optional attributes from the <array annotation>.     */
        /********************************************************/
        [ ADL<TITLE attribute> ]
        [ ADL<NOTE attribute> ]
        [ ADL<HELP attribute> ]
        [ ADL<WHEN clause> ]
        [ ADL<terminator> ]
        LEAVE /* EXIT LOOP: WCHARRAY */
      END
    WHEN (<subscript declarator> <> '') THEN
      DO
        ARRAY
        IF (pos('CHAR',<wide string annotation>) <> 0) THEN
          DO
            /*********************************************************************/
            /* This declaration is a multidimensional array of single DBCS char. */
            /* The <string size> becomes the DMNSIZE of the last dimension.      */
            /*********************************************************************/
          IF (status.dimension.current <= status.dimensions) THEN
            DO
              DMNLST (
                DMNSIZE(<dimension size>){[, DMNSIZE(<dimension size>)]...}
                DMNSIZE(<string size>)
                     )
              string_length = 1
            /* CONTINUE LOOP: WCHARRAY */
            END
          ELSE
            DO
              /********************************************************/
              /* Optional attributes from the <array annotation>.     */
              /********************************************************/
              [ ADL<TITLE attribute> ]
              [ ADL<NOTE attribute> ]
              [ ADL<HELP attribute> ]
              [ ADL<WHEN clause> ]
              OF
              LEAVE /* EXIT LOOP: WCHARRAY */
            END
          END
        ELSE
          DO
            /*********************************************************************/
            /* This declaration is an array of one or more dimensions of string.*/
            /*********************************************************************/
```

Unclassified

```
            IF (status.dimension.current <= status.dimensions) THEN
              DO
                  DMNLST (
                  DMNSIZE(<dimension size>){[, DMNSIZE(<dimension size>)]...}
                         )
                  string_length = <string size>
                /* CONTINUE LOOP: WCHARRAY */
              END
            ELSE
              DO
                /*********************************************************/
                /* Optional attributes from the <array annotation>.      */
                /*********************************************************/
                [ ADL<TITLE attribute> ]
                [ ADL<NOTE attribute> ]
                [ ADL<HELP attribute> ]
                [ ADL<WHEN clause> ]
                OF
                LEAVE /* EXIT LOOP: WCHARRAY */
              END
          END
        END
    OTHERWISE
        IF (pos('CHAR',<wide string annotation>) <> 0) THEN
          DO
            ARRAY
              /*********************************************************************/
              /* This declaration is a one dimensional array of single character. */
              /*********************************************************************/
              DMNLST (
              DMNSIZE(<string size>)
                     )
              string_length = 1
            /*********************************************************/
            /* Optional attributes from the <array annotation>.      */
            /*********************************************************/
            [ ADL<TITLE attribute> ]
            [ ADL<NOTE attribute> ]
            [ ADL<HELP attribute> ]
            [ ADL<WHEN clause> ]
            OF
          END
        ELSE
          DO
            /*********************************************************/
            /* This declaration is a simple string (not an array).  */
            /*********************************************************/
            string_length = <string size>
          END
        LEAVE /* EXIT LOOP: WCHARRAY */
  END
END /* END OF LOOP: WCHARRAY */
/* Termination Section                                   */
/* END PROCEDURE: WCHARRAY                               */
IF (pos('ASIS',<array annotation>) = 0) THEN
  DO
    /*------------------------------------------------------------------------*/
    /* REXX INLINE PROCEDURE: UNITLENW     DATE: 12/16/91                     */
    /* Initialization Section                                                 */
    /*------------------------------------------------------------------------*/
    IF (pos('UNITLEN',<wide string annotation>) <> 0) THEN
        ADL<UNITLEN attribute> /* value from <wide string annotation> */
    ELSE
        [ UNITLEN(16) ]
    /* Termination Section                                                    */
    /* END PROCEDURE: UNITLENW                                                */
    SELECT
      WHEN (pos('ASIS',<wide string annotation>) <> 0) THEN
        DO
```

```
      ASIS                          /* ADL type = ASIS        */
      IF (pos('LENGTH(ADL<qualified identifier>)',<wide string annotation>) <> 0) THEN
       DO
         LENGTH(ADL<qualified identifier>)
         IF (pos('MAXALC',<wide string annotation>) <> 0) THEN
            ADL<MAXALC attribute>          /* use value from annotation */
         ELSE
            MAXALC(TRUE)
         MAXLEN(string_length*16/UNITLEN)
       END
      ELSE
         LENGTH(string_length*16/UNITLEN)
     END
    WHEN (pos('CHARSFX',<wide string annotation>) <> 0) THEN
     DO
      CHARSFX                       /* ADL type = CHARSFX     */
      SFXENC(x'0000')
      MAXLEN(string_length*16/UNITLEN)
      IF (pos('MAXALC',<wide string annotation>) <> 0) THEN
         ADL<MAXALC attribute>          /* use value from annotation */
      ELSE
         [ MAXALC(TRUE) ]
      [ CCSID(0) ]
     END
    OTHERWISE
      CHAR                          /* ADL type = CHAR        */
      IF (pos('LENGTH(ADL<qualified identifier>)',<wide string annotation>) <> 0) THEN
       DO
         LENGTH(ADL<qualified identifier>)
         MAXLEN(string_length*16/UNITLEN)
         IF (pos('MAXALC',<wide string annotation>) <> 0) THEN
            ADL<MAXALC attribute>          /* use value from annotation */
         ELSE
            MAXALC(TRUE)
       END
      ELSE
         LENGTH(string_length*16/UNITLEN)
      [ CCSID(0) ]
      [ JUSTIFY(LEFT) ]
   END
   [ ADL<HELP attribute> ]
   [ ADL<NOTE attribute> ]
   [ ADL<TITLE attribute> ]
   [ ADL<WHEN clause> ]
   [ ADL<terminator> ]
  END
/* Termination Section                              */
/* END PROCEDURE: WIDESTR                           */
```

8.23.3.1 ADL Mapping Notes :

1. ASIS annotation which precedes the C data definition creates a single ADL ASIS field the length of the string or array.
2. ASIS annotation following the C data definition changes the string type to ASIS. If this was an array of string, ASIS changes this to an array of ASIS.
3. For multidimensional arrays of strings, the dimensions are assigned in the order specified from left to right to the ARRAY DMNLST, except for the last dimension. The last dimension specifies the length of the string. However, by annotating with CHAR the last dimension is simply the last array dimension and the object of the array is a single double byte character rather than a string.

Unclassified

8.23.4 Exceptions :

0102E All dimensions and string lengths must be specified in a wide string data definition.

Explanation: An empty dimension declaration or string length is not allowed by the C declaration translator.

Recovery: Fill in a value for any empty dimension or string length.

0103E Annotated CCSID value must be a DBCS CCSID for a wide string.

Explanation: The wide string type can only be used with DBCS characters.

0104W Wide string annotation ignored because of preceding ASIS.

Explanation: An ASIS preceding the data definition causes the ADL description to be a single ASIS string. The only optional attributes encoded with this ASIS are those which follow the ASIS in the array annotation.

Recovery: If it is important have these optional attributes encoded then either (1) Move the ASIS to after the wide string data definition. (2) Move the optional attributes to before the data definition following the ASIS. Otherwise this warning message can be ignored.

8.23.5 Examples :

1. ASIS fixed length string

```
/* C source declaration */
wchar_t name_first[30] /* ADL ASIS; */;

/* ADL source declaration    */
name_first : ASIS LENGTH(30) UNITLEN(16);
```

2. ASIS varying length string

```
/* C source declaration */
short int name_size;
wchar_t name_first[30] /* ADL ASIS LENGTH(name_size); */;

/* ADL source declaration    */
name_size : BINARY LENGTH(15) PRECISION(16);
name_first : ASIS LENGTH(name_size) MAXLEN(30)
  UNITELEN(16)
  MAXALC(TRUE);
```

3. ASIS varying length string UNITLEN(1)

```
/* C source declaration */
short int name_size;
wchar_t name_first[30] /* ADL ASIS LENGTH(name_size) UNITLEN(1); */;

/* ADL source declaration    */
name_size : BINARY LENGTH(15) PRECISION(16);
name_first : ASIS LENGTH(name_size) MAXLEN(480)
  UNITELEN(1)
  MAXALC(TRUE);
```

Unclassified

4. CHAR array of single characters

```
/* C source declaration */
/* CCSID attribute set to CCSID(4396) EBCDIC Japanese Host DB */
wchar_t char_list[30] /* ADL CHAR CCSID(4396); */;

/* ADL source declaration    */
char_list : ARRAY DMNLST( DMNSIZE(30) )
  OF CHAR LENGTH(1) CCSID(4396) UNITLEN(16);
```

5. CHAR fixed length string

```
/* C source declaration */
/* CCSID attribute set to CCSID(4396) EBCDIC Japanese Host DB */
wchar_t name_first[30]; /* ADL CCSID(4396); */;

/* ADL source declaration    */
name_first : CHAR LENGTH(30) UNITLEN(16) CCSID(4396);
```

6. CHAR varying length string

```
/* C source declaration */
/* CCSID attribute set to CCSID(834) EBCDIC Korean Host DB */
short int name_size;
wchar_t name_first[30] /* ADL LENGTH(name_size) CCSID(834); */;

/* ADL source declaration    */
name_size : BINARY LENGTH(15) PRECISION(16);
name_first : CHAR LENGTH(name_size)
   MAXLEN(30) MAXALC(TRUE) UNITLEN(16) CCSID(834);
```

7. CHARSFX varying length suffix terminated string

```
/* C source declaration */
/* CCSID attribute set to CCSID(839) EBCDIC Thai Host DB */
wchar_t type_group[80] /* ADL CHARSFX CCSID(839); */;
wchar_t user_group[64] /* ADL CHARSFX CCSID(839); */;

/* ADL source declaration    */
type_group : CHARSFX MAXLEN(80) UNITELN(16) CCSID(839);
user_group : CHARSFX MAXLEN(64) UNITLEN(16) CCSID(839);
```

8. Array of CHAR fixed length string

```
/* C source declaration */
/* CCSID attribute set to CCSID(835)  */
/* EBCDIC Traditional Chinese Host DB */
wchar_t name_first[100][30]  /* ADL CCSID(835); */;
wchar_t name_last[100][50][30]; /* ADL CCSID(835); */;

/* ADL source declaration    */
name_first : ARRAY DMNLST(DMNSIZE(100))
  OF CHAR LENGTH(30) UNITLEN(16) CCSID(835);
name_last  : ARRAY DMNLST(DMNSIZE(100), DMNSIZE(50))
  OF CHAR LENGTH(30) UNITLEN(16) CCSID(835);
```

9. Array of CHARSFX varying length suffix terminated string

Unclassified

```
/* C source declaration */
/* CCSID attribute inherited from CCSID hierarchy. */
/* Declaration translator unable to validate CCSID value.     */
wchar_t name_first[100][30] /* ADL CHARSFX; */;
wchar_t name_last[100][50][30] /* ADL CHARSFX; */;

/* ADL source declaration    */
name_first : ARRAY DMNLST(DMNSIZE(100))
   OF CHARSFX MAXLEN(30) UNITLEN(16);
name_last  : ARRAY DMNLST(DMNSIZE(100), DMNSIZE(50))
   OF CHARSFX MAXLEN(30) UNITLEN(16);
```

10. Multidimensional array of single characters

```
/* C source declaration */
/* CCSID attribute set to CCSID(301) Japanese PC Date DB */
wchar_t name_first[100][30] /* ADL CHAR CCSID(301); */;
wchar_t name_last[100][50][30] /* ADL CHAR CCSID(301); */;

/* ADL source declaration    */
name_first : ARRAY DMNLST(DMNSIZE(100), DMNSIZE(30))
  OF CHAR LENGTH(1) UNITLEN(16) CCSID(301);
name_last  : ARRAY DMNLST(DMNSIZE(100), DMNSIZE(50), DMNSIZE(30))
  OF CHAR LENGTH(1) UNITLEN(16) CCSID(301);
```

11. Array of ASIS fixed length strings

```
/* C source declaration */
wchar_t name_first[100][30] /* ADL ASIS; */;

/* ADL source declaration    */
name_first : ARRAY DMNLST(DMNSIZE(100))
  OF ASIS LENGTH(30) UNITLEN(16);
```

12. ASIS of an array of fixed length strings

```
/* C source declaration */
/* ADL ASIS TITLE('ASIS data'); */ wchar_t name_first[100][30];

/* ADL source declaration    */
name_first : ASIS LENGTH(3000) UNITLEN(16) TITLE('ASIS data');
```

13. Array and string annotation

```
/* C source declaration */
/* CCSID attribute set to CCSID(929) Thai PC Data DB */
/* ADL TITLE('Array of first names'); */
wchar_t name_first[100][30]
/* ADL NOTE('All names blank padded') CCSID(929); */

/* ADL source declaration    */
name_first : ARRAY
  DMNLST(DMNSIZE(100))
  TITLE('Array of first names')
  OF CHAR LENGTH(30) UNITLEN(16)
  NOTE('All names blank padded') CCSID(929);
```

Unclassified

Chapter 9. C Extended Examples

This section contains extended examples of C data descriptions for various data and I/O methods. All of the examples use similar C data definitions. They demonstrate three ways of doing I/O with DFM described files.

1. Open the file for binary record I/O. Use fread/fwrite to read/write a record at a time. The file is described by a single C data definition. It can be a simple field, an array, a struct or union. All items are MAXALC(TRUE).
2. Open the file for binary stream I/O. Use fread/fwrite to read/write one or more fields at a time until the entire record is processed. The file is described by a single C data definition. It can be a simple field, an array, a struct or union. Items can be either MAXALC(TRUE) or MAXALC(FALSE). The C application moves the data between the programs MAXALC(TRUE) data structures and the record buffer where they may be MAXALC(FALSE).
3. Open the file for binary stream I/O. Use fread/fwrite to read/write one or more fields at a time until the entrie record is processed. The file is described by <LIST annotation> (see 2.3, "<LIST statement>" on page 54). The <LIST statement> references independent C data definitions. The C application moves the data between the programs MAXALC(TRUE) data structures and the record buffer where they may be MAXALC(FALSE).

These programs were compiled and run on VM/XA CMS 5.6 using the C/370 Version 1 Release 2 compiler. For each program a hex dump of the first record is provided along with a key showing the names of the fields and identifying padding. The compiler aggregate map for the data, which shows byte sizes and padding bytes of the data in the programs memory, is also provided.

The C data description files are shown along with the ADL description. In some cases the C data description file is the same as the data definitions for the program, in other cases a separate description is needed.

9.1 Example C Binary Record I/O with struct data description . . . . . . . . 213
9.2 Example C Binary Stream I/O with struct data description . . . . . . . . 218
9.3 Example C Binary Stream I/O with LIST data description . . . . . . . . 224

Unclassified

9.1 Example C Binary Record I/O with struct data description

9.1.1 Program Source

```
/*********************************************************************/
/* PROGRAM : RECORD                                                  */
/*   Write a file using record I/O.  The record description is       */
/*   contained in file tmrecord.h.  This is also the data description */
/*   input to the C declaration translator to produce the file's     */
/*   ADLDCLSPC                                                       */
/*********************************************************************/
#include <stdio.h>
#pragma map(localtime,"LOCALTIM")
#include <time.h>
#include "tmrecord.h"

FILE *RECORD;
int i, rc;                      /* loop counter, function return code */
struct tm *newtime;             /* time and date information          */
time_t ltime;                   /* time and date value                */
char vm[6], cms[4], version[5]; /* operating system and version       */

main ()
{
  /* Initialize the data */
  my_record.part_1.y = 0.1;
  my_record.part_1.num_results = 3;

  /* initialize results up to num_results elements */
  for (i=0;i<my_record.part_1.num_results;i++)
  {
    my_record.part_1.results[i] = (i+1)*0.1;
  }

  /* set the remaining, unused elements of results to zero */
  for (i=my_record.part_1.num_results;i<5;i++)
  {
    my_record.part_1.results[i] = 0;
  }

  /* get the current date and time */
  time(&ltime);
  newtime = localtime(&ltime);
  memcpy(my_record.part_1.date_time,asctime(newtime),26);
  printf("%s",asctime(newtime));

  /* get the current VM/CMS operating system level */
  rc = system("QUERY CMSLEVEL (STACK");
  scanf("%s %s %s",vm,cms,version);
  printf("%s %s %s\n",vm,cms,version);
  strcpy(my_record.part_2.system,vm);
  strcat(my_record.part_2.system," ");
  strcat(my_record.part_2.system,cms);
  strcat(my_record.part_2.system," ");
  strcat(my_record.part_2.system,version);
```

Unclassified

```
  my_record.part_2.system_len = strlen(my_record.part_2.system);

  /* Open the file for writing using binary record I/O */
  RECORD =
  fopen("RECORD OUTPUT A",
        "wb,type=record,"
        "lrecl=96,"
        "recfm=F");
  if (RECORD == NULL) perror("fopen failed");

  printf("size of my_record %d\n",sizeof(my_record));

  /* write my_record to the file for a total of 4 records */
  for (i=0;i<4;i++)
  {
    rc = fwrite(&my_record,1,sizeof(my_record),RECORD);
    if (rc != sizeof(my_record)) perror("fwrite of my_record failed");
  }
  fclose (RECORD); /* Close the file */
}
```

9.1.2 C/370 Data Description

```
/********************************************************************/
/* NAME : tmrecord.h                                                */
/*                                                                  */
/* FUNCTION : This file describes the data structure used by the    */
/*    program RECORD (record.c).  The structure my_record is        */
/*    written to the file RECORD OUTPUT A.  This is also the data   */
/*    description file input to the C declaration translator to     */
/*    produce the file's ADLDCLSPC.  This description includes ADL  */
/*    annotation to provide the C declaration translator information*/
/*    about the data that cannot be obtained from the C data        */
/*    declarations.  It also includes notational annotation (TITLE  */
/*    and NOTE).                                                    */
/********************************************************************/

/* ADL
      DECLARE
      TITLE('Program RECORD (record.c), Compiler C/370 V1 R2')
      NOTE('Binary record I/O')
*/

/********************************************************************/
/* struct data_1                                                    */
/*    A sample structure declaration.  Maps to ADL SUBTYPE.         */
/********************************************************************/
struct data_1
  {
   long double y;
   char num_results; /* ADL BINARY; */
   float /* ADL DMNLST( DMNSIZE(num_results) ); */ results[5];
   char date_time[26] /* ADL CHARSFX; */;
  };

/********************************************************************/
```

Unclassified

```
/* struct data_2                                                    */
/*    A sample structure declaration.  MAPS to ADL SUBTYPE.         */
/********************************************************************/
struct data_2
  {
   short int system_len; /* current length of system string */
   char system[15] /* ADL LENGTH(system_len); */;
  };

/********************************************************************/
/* my_record.  This is the description of the records of file       */
/* RECORD OUTPUT A, written by the program RECORD.C.                */
/********************************************************************/
static struct
  {
   struct data_1 part_1;
   struct data_2 part_2;
  } my_record;
```

9.1.3 Compiler Aggregate Storage Map

```
15688040 R02 M00 IBM  C/370   RECORD  C  A1    07/26/91 15:34:12       Page 8
=============================================================================
| Aggregate map for: my_record                         Total Size: 96 bytes |
|===========================================================================|
|     Offset        |      Length       | Member Name                       |
|   Bytes(Bits)     |   Bytes(Bits)     |                                   |
|===================|===================|===================================|
|       0           |       72          |  part_1                           |
|       0           |       16          |    y                              |
|      16           |        1          |    num_results                    |
|      17           |        3          |    ***PADDING***                  |
|      20           |       20          |    results[5]                     |
|      40           |       26          |    date_time[26]                  |
|      66           |        6          |    ***PADDING***                  |
|      72           |       18          |  part_2                           |
|      72           |        2          |    system_len                     |
|      74           |       15          |    system[15]                     |
|      89           |        1          |    ***PADDING***                  |
|      90           |        6          |  ***PADDING***                    |
=============================================================================
```

9.1.4 ADL Description of File

```
"1" : DECLARE
   TITLE('Program RECORD (record.c), Compiler C/370 V1 R2')
   NOTE('Binary Record I/O')
BEGIN;

   DEFAULT ARRAY DMNLOW(0) MAXALC(TRUE) SKIP(0);
   DEFAULT ASIS UNITLEN(8) MAXALC(TRUE);
   DEFAULT BINARY PRECISION(31) SCALE(0) BYTRVS(FALSE)
      COMPLEX(FALSE) CONSTRAINED(FALSE) FIT(TRUNCATE)
      RADIX(2) SIGNED(TRUE);
   DEFAULT BOOLEAN LENGTH(8) BLNENC(LSTBIT) BYTRVS(FALSE);
   DEFAULT CHAR MAXALC(TRUE) UNITLEN(8) CCSID(0);
```

Unclassified

```
 DEFAULT CHARSFX CCSID(0) UNITLEN(8) MAXALC(TRUE)
    SFXENC(x'00');
 DEFAULT FLOAT16 LENGTH(32) BYTRVS(FALSE) COMPLEX(FALSE)
    FIT(TRUNCATE) RADIX(2);

data_1 : SUBTYPE OF SEQUENCE
BEGIN;
  y : FLOAT16 LENGTH(128);
  num_results : BINARY LENGTH(8) PRECISION(8) SIGNED(FALSE);
  SKIP(24);
  results : ARRAY DMNLST( DMNMAX(5) DMNSIZE(num_results) )
    OF FLOAT16 LENGTH(32);
  date_time : CHARSFX MAXLEN(26);
  SKIP(48);
END;

data_2 : SUBTYPE OF SEQUENCE
BEGIN;
  system_len : BINARY PRECISION(15) LENGTH(16);
  system : CHAR LENGTH(system_len) MAXALC(TRUE);
  SKIP(8);
END;

my_record : SEQUENCE
  BEGIN;
    part_1 : data_1;
    part_2 : data_2;
    SKIP(48);
  END;

END;
```

9.1.5 Hex File Output

Unclassified

```
FILE: RECORD    OUTPUT   A1 07/26/91 12:26:31
RECFM: F        LRECL: 96        RECORDS: 1

my_record.part_1.y
|                 my_record.part_1.num_results
|                 | ***PADDING***
|                 | |    my_record.part_1.results[0]
|                 | |    |    my_record.part_1.results[1]
|                 | |    |    |    my_record.part_1.results[2]
|                 | |    |    |    |    my_record.part_1.results[3]
|                 | |    |    |    |    |    my_record.part_1.results[4]
|                 | |    |    |    |    |    |
REC 1     rrrrrr                rr        <
          4199999900000000 0 000 4199 4333 44CC 0000 0000
BYTES 1   0999999900000000 3 000 0999 0333 0CCC 0000 0000
TO 40
          |...+....1....+. . ..2 .... +... .3.. ..+. ...4

my_record.part_1.dat_time
|                           ***PADDING***
|                           |      my_record.part_2.system_len
|                           |      |  my_record.part_2.system
|                           |      |  |                ***PADDING***
|                           |      |  |                | ***PADDING***
|                           |      |  |                | |
REC 1     Fri Jul 26 12:26:31 1991        VM/XA CMS 5.6,
          C984DA94FF4FF7FF7FF4FFFF10 000000 00 ED6EC4CDE4F4F60 0 000000
BYTES 41  6990143026012A26A310199150 000000 0E 54171034205B6B0 0 000000
TO 96
          ....+....5....+....6....+. ...7.. .. +....8....+.... 9 ....+.
```

Unclassified

9.2 Example C Binary Stream I/O with struct data description

9.2.1 Program Source

```
/*********************************************************************/
/* PROGRAM : STREAM                                                  */
/*   Write a file using stream I/O.  The record description is       */
/*   contained in file tmstream.h.  This is also the data description */
/*   input to the C declaration translator to produce the file's     */
/*   ADLDCLSPC.                                                      */
/*                                                                   */
/*   Though binary stream I/O is used, an entire record is always    */
/*   written.  That is, the record as described by tmstream.h never  */
/*   spans a record boundary, and the start of the described         */
/*   record is always at the first byte of the file record.          */
/*********************************************************************/
#include <stdio.h>
#pragma map(localtime,"LOCALTIM")
#pragma map(check_error,"CHECK_ER")
#include <time.h>
#include "tmstream.h"

void check_error (char *error_msg);

FILE *STREAM;
int i, rc;                        /* loop counter, function return code */
struct tm *newtime;               /* time and date information          */
time_t ltime;                     /* time and date value                */
char vm[6], cms[4], version[5];   /* operating system and version       */

main ()
{
  /* Initialize the data */
  my_record.part_1.y = 0.1;
  my_record.part_1.num_results = 3;

  /* initialize results up to num_results elements */
  for (i=0;i<my_record.part_1.num_results;i++)
  {
    my_record.part_1.results[i] = (i+1)*0.1;
  }

  /* get the current date and time */
  time(&ltime);
  newtime = localtime(&ltime);
  memcpy(my_record.part_1.date_time,asctime(newtime),26);
  printf("%s",asctime(newtime));

  /* get the current VM/CMS operating system level */
  rc = system("QUERY CMSLEVEL (STACK");
  scanf("%s %s %s",vm,cms,version);
  printf("%s %s %s\n",vm,cms,version);
  strcpy(my_record.part_2.system,vm);
  strcat(my_record.part_2.system," ");
  strcat(my_record.part_2.system,cms);
```

Unclassified

```
  strcat(my_record.part_2.system," ");
  strcat(my_record.part_2.system,version);
  my_record.part_2.system_len = strlen(my_record.part_2.system);

  /* Open the file for writing using binary stream I/O */
  STREAM =
  fopen("STREAM OUTPUT A",
        "wb,"
        "lrecl=100,"
        "recfm=V");
  if (STREAM == NULL) perror("fopen failed");

  /* write my_record to the file for a total of 4 records */
  for (i=0;i<4;i++)
  {
    rc = fwrite(&my_record.part_1.y,1,
                sizeof(my_record.part_1.y),STREAM);
    check_error("fwrite failed");

    rc = fwrite(&my_record.part_1.num_results,1,
                sizeof(my_record.part_1.num_results),STREAM);
    check_error("fwrite failed");

    /* write out num_results elements from the results array */
    rc = fwrite(my_record.part_1.results,
                sizeof(my_record.part_1.results[0]),
                my_record.part_1.num_results,STREAM);
    check_error("fwrite failed");

    rc = fwrite(my_record.part_1.date_time,1,
                sizeof(my_record.part_1.date_time),STREAM);
    check_error("fwrite failed");

    rc = fwrite(&my_record.part_2.system_len,1,
                sizeof(my_record.part_2.system_len),STREAM);
    check_error("fwrite failed");

    /* write out system_len characters from the system string */
    rc = fwrite(my_record.part_2.system,
                sizeof(my_record.part_2.system[0]),
                my_record.part_2.system_len,STREAM);
    check_error("fwrite failed");

    /* now flush the buffer to the file.  This causes the next item */
    /* written to begin at the start of the next record in the file */
    fflush(STREAM);
  }
  fclose (STREAM); /* Close the file */
}


/* Check for I/O errrors and write out error message, information on */
/* the error and then reset the I/O error indicators.                */
void check_error (char *error_msg)
{
  if (ferror(STREAM))
```

Unclassified

```
  {
    perror(error_msg);
    clearerr(STREAM);
  }
  return;
}
```

9.2.2 C/370 Data Description

```
/***********************************************************************/
/* NAME : tmstream.h                                                   */
/*                                                                     */
/* FUNCTION : This file describes the data structure used by the      */
/*    program STREAM (stream.c).  The data from the struct my_record */
/*    is written to the file STREAM OUTPUT A.  This is also the data */
/*    description file input to the C declaration translator to       */
/*    produce the file's ADLDCLSPC.                                    */
/*                                                                     */
/*    This description includes ADL annotation to provide the C      */
/*    declaration translator information about the data               */
/*    that cannot be obtained from the C data declarations.           */
/*    It also includes notational annotation (TITLE and NOTE).        */
/***********************************************************************/

/* ADL
      DECLARE
      TITLE('Program STREAM (stream.c), Compiler C/370 V1 R2')
      NOTE('Binary stream I/O')
*/

/**********************************************************************/
/* struct data_1                                                      */
/*    A sample structure declaration.  Maps to ADL SUBTYPE.           */
/**********************************************************************/
struct data_1
  {
   long double y;
   char num_results; /* ADL BINARY; */
   float /* ADL MAXALC(FALSE) DMNLST( DMNSIZE(num_results) ); */ results[5];
   char date_time[26] /* ADL CHARSFX; */;
  };

/**********************************************************************/
/* struct data_2                                                      */
/*    A sample structure declaration.  MAPS to ADL SUBTYPE.           */
/**********************************************************************/
struct data_2
  {
   short int system_len; /* current length of system string */
   char system[15] /* ADL LENGTH(system_len) MAXALC(FALSE); */;
  };

/**********************************************************************/
/* my_record.  This is the description of the records of file        */
/* RECORD OUTPUT A, written by the program RECORD.C.                 */
/**********************************************************************/
```

Unclassified

```
_Packed struct
  {
   _Packed struct data_1 part_1;
   _Packed struct data_2 part_2;
  } static my_record;
```

9.2.3 Compiler Aggregate Storage Map

Note: The following shows the format and size of the data in the program's memory. The size of the record the program writes is smaller because it writes out only the valid data as given by the reference fields for the members results and system.

```
15688040 R02 M00 IBM C/370     STREAM   C   A1    07/26/91 17:46:52    Page 9
============================================================================
| Aggregate map for: my_record                          Total Size: 80 bytes  |
|==========================================================================|
|      Offset       |      Length       | Member Name                        |
|    Bytes(Bits)    |    Bytes(Bits)    |                                    |
|===================|===================|====================================|
|        0          |        63         |  part_1                            |
|        0          |        16         |    y                               |
|       16          |         1         |    num_results                     |
|       17          |        20         |    results[5]                      |
|       37          |        26         |    date_time[26]                   |
|       63          |        17         |  part_2                            |
|       63          |         2         |    system_len                      |
|       65          |        15         |    system[15]                      |
============================================================================
```

9.2.4 ADL Description of File

Note: The primary difference between the record stream.c produces versus the record record.c produces is that stream.c creates a record with no padding bytes and with most variable data MAXALC(FALSE). It is an application choice whether to write the data MAXALC(FALSE) or MAXALC(TRUE). The member date_time which is an ADL <CHARSFX> could have been written MAXALC(FALSE) but it was simpler to write it MAXALC(TRUE). The space savings would not have been worth the trouble in this example.

```
"1" : DECLARE
   TITLE('Program STREAM (stream.c), Compiler C/370 V1 R2')
   NOTE('Binary Stream I/O')
BEGIN;

   DEFAULT ARRAY DMNLOW(0) MAXALC(TRUE) SKIP(0);
   DEFAULT ASIS UNITLEN(8) MAXALC(TRUE);
   DEFAULT BINARY PRECISION(31) SCALE(0) BYTRVS(FALSE)
      COMPLEX(FALSE) CONSTRAINED(FALSE) FIT(TRUNCATE)
      RADIX(2) SIGNED(TRUE);
   DEFAULT BOOLEAN LENGTH(8) BLNENC(LSTBIT) BYTRVS(FALSE);
   DEFAULT CHAR MAXALC(TRUE) UNITLEN(8) CCSID(0);
   DEFAULT CHARSFX CCSID(0) UNITLEN(8) MAXALC(TRUE)
      SFXENC(x'00');
   DEFAULT FLOAT16 LENGTH(32) BYTRVS(FALSE) COMPLEX(FALSE)
      FIT(TRUNCATE) RADIX(2);

 data_1 : SUBTYPE OF SEQUENCE
 BEGIN;
```

Unclassified

```
    y : FLOAT16 LENGTH(128);
    num_results : BINARY LENGTH(8) PRECISION(8) SIGNED(FALSE);
    results : ARRAY MAXALC(FALSE)
      DMNLST( DMNSIZE(num_results) DMNMAX(5) )
      OF FLOAT16 LENGTH(32);
    date_time : CHARSFX MAXLEN(26);
  END;

  data_2 : SUBTYPE OF SEQUENCE
  BEGIN;
    system_len : BINARY PRECISION(15) LENGTH(16);
    system : CHAR LENGTH(system_len) MAXLEN(15) MAXALC(FALSE);
  END;

  my_record : SEQUENCE
    BEGIN;
      part_1 : data_1;
      part_2 : data_2;
    END;

END;
```

9.2.5 Hex File Output

```
FILE: STREAM OUTPUT A1 07/26/91 17:47:04  RECFM:V  LRECL:71  RECORDS:2

          my_record.part_1.y
          |                 my_record.part_1.num_results
          |                 | my_record.part_1.results[0]
          |                 | |    my_record.part_1.results[1]
          |                 | |    |    my_record.part_1.results[2]
          |                 | |    |    |    my_record.part_1.date_time
          |                 | |    |    |    |
REC 1       rrrrrr             rr        <  Fri Jul 26 17:47:03 1991
          4199999900000000 0 4199 4333 44CC C984DA94FF4FF7FF7FF4FFFF10
BYTES 1   0999999900000000 3 0999 0333 0CCC 6990143026017A47A030199150
TO 55
          |...+....1....+. . ..2. ...+ .... 3....+....4....+....5....+

          my_record.part_2.system_len
          | my_record.part_2.system
          | |
REC 1       VM/XA CMS 5.6,
          00 ED6EC4CDE4F4F6
BYTES 56  0E 54171034205B6B
TO 71
          .. ..6....+....7.


          my_record.part_1.y
          |                 my_record.part_1.num_results
          |                 | my_record.part_1.results[0]
          |                 | |    my_record.part_1.results[1]
          |                 | |    |    my_record.part_1.results[2]
          |                 | |    |    |    my_record.part_1.date_time
          |                 | |    |    |    |
```

Unclassified

```
REC 2      rrrrrr           rr      <   Fri Jul 26 17:47:03 1991
        4199999900000000 0 4199 4333 44CC C984DA94FF4FF7FF7FF4FFFF10
BYTES 1 0999999900000000 3 0999 0333 0CCC 6990143026017A47A030199150
TO 55
        |...+....1....+. . ..2. ...+ .... 3....+....4....+....5....+

        my_record.part_2.system_len
        |  my_record.part_2.system
        |  |
REC 2      VM/XA CMS 5.6,
        00 ED6EC4CDE4F4F6
BYTES 56 0E 54171034205B6B
TO 71
        .. ..6....+....7.
```

9.3 Example C Binary Stream I/O with LIST data description

9.3.1 Program Source

This example demonstrates reading the record written by program stream.c. However, the data description is done using <LIST annotation> rather than a C struct. A C declaration translator could be written without support of <LIST annotation>. However, it may be a useful usability enhancement as the <LIST statement> may be closer to the applications I/O statements which wrote or read the record.

```
/**********************************************************************/
/* PROGRAM : LIST                                                     */
/*   Read a file using stream I/O. The record description is          */
/*   contained in file list.h. This is also the data description      */
/*   input to the C declaration translator to produce the file's      */
/*   ADLDCLSPC.                                                       */
/*                                                                    */
/*   Program list.c reads the file produced by program stream.c.      */
/*   This file, STREAM OUTPUT A, contains MAXALC(FALSE) items with    */
/*   reference fields. This example also demonstrates how stream I/O */
/*   can be used to read files where data does not span a record     */
/*   boundary and each physical record contains only one logical      */
/*   record as described by ADL. These conditions are necessary for  */
/*   use of DFM, even though C programs can create files which don't  */
/*   meet these conditions.                                           */
/*                                                                    */
/*   The program displays the data to stdout after reading each       */
/*   record.                                                          */
/**********************************************************************/
#include <stdio.h>
#pragma map(localtime,"LOCALTIM")
#pragma map(check_error,"CHECK_ER")
#include <time.h>
#include "list.h"

void check_error (char *error_msg);

FILE *LIST;
int i, j, rc;                      /* loop counter, function return code */
struct tm *newtime;                /* time and date information          */
time_t ltime;                      /* time and date value                */
char vm[6], cms[4], version[5];    /* operating system and version       */

main ()
{
  /* Open the file for writing using binary stream I/O */
  LIST =
  fopen("STREAM OUTPUT A",
        "rb,"
        "lrecl=100,"
        "recfm=V");
  if (LIST == NULL) perror("fopen failed");

  /* read my_record from the file for a total of 2 records */
  for (i=0;i<2;i++)
```

```
  {
    rc = fread(&y,1,sizeof(y),LIST);
    check_error("fread failed");

    rc = fread(&num_results,1,sizeof(num_results),LIST);
    check_error("fread failed");

    /* read in num_results elements into the results array */
    rc = fread(results,sizeof(results[0]),num_results,LIST);
    check_error("fread failed");

    rc = fread(date_time,1,sizeof(date_time),LIST);
    check_error("fread failed");

    rc = fread(&system_len,1,sizeof(system_len),LIST);
    check_error("fread failed");

    /* read in system_len characters into the system string */
    rc = fread(system,sizeof(system[0]),system_len,LIST);
    check_error("fread failed");

    /* now flush the buffer from the file.  This causes the next      */
    /* item read to begin at the start of the next record in the file */
    fflush(LIST);

    /* Display the data read to stdout */
    printf("\nContents of record %d of file STREAM OUTPUT A\n",i+1);
    printf("--------------------------------------------\n");
    printf("y=%.2f\n",y);
    printf("num_results=%d\n",num_results);
    for (j=0;j<num_results;j++)
    {
      printf("results[%d]=%.2f\n",j,results[j]);
    }
    printf("date_time=%s",date_time);
    printf("system_len=%d\n",system_len);
    printf("system=%s\n",system);
  }
  fclose (LIST); /* Close the file */
}


/* Check for I/O errrors and write out error message, information on */
/* the error and then reset the I/O error indicators.                */
void check_error (char *error_msg)
{
  if (ferror(LIST))
  {
    perror(error_msg);
    clearerr(LIST);
  }
  return;
}
```

9.3.2 C/370 Data Description

Unclassified

```
/*********************************************************************/
/* NAME : list.h                                                     */
/*                                                                   */
/* FUNCTION : This file describes the data definitions used by       */
/*    program LIST (list.c).  The data read is the file created      */
/*    by program stream.c in file STREAM OUTPUT A.  This shows how   */
/*    this record which contains MAXALC(FALSE) data with reference   */
/*    fields and no padding bytes can be described by a <LIST        */
/*    statement> and read by a C program using binary stream I/O.    */
/*    This file is included both in the C program and is input to the*/
/*    C declaration translator.                                      */
/*********************************************************************/

/* ADL
       DECLARE
       TITLE('Program LIST (list.c), Compiler C/370 V1 R2')
       NOTE('Binary stream I/O')

       my_record : ISEQ
       (
         part_1 : ISEQ
         (
           y, num_results,
           results : IARRAY(1 TO num_results - 1) OF results(),
           date_time
         ),
         part_2 : ISEQ
         (
           system_len, system
         )
       );
*/

/*********************************************************************/
/* The follow are the independent data definitions referenced by    */
/* the <implied SEQUENCE> named my_record.                           */
/*********************************************************************/
static long double y;
static char num_results; /* ADL BINARY; */
static float results[5];
static char date_time[26] /* ADL CHARSFX; */;
static short int system_len; /* current length of system string */
static char system[15] /* ADL LENGTH(system_len) MAXALC(FALSE); */;
```

9.3.3 Compiler Aggregate Storage Map

An aggregate storage map is not available because the program list.c does not contain any aggregates (struct or union). The format of the individual fields is the same as the struct members in the previous two examples for record.c and stream.c.

Unclassified

9.3.4 ADL Description of File

Note: The ADL description of the record read by list.c is the essentially the same as the ADL description of the record written by stream.c, even though their data descriptions describe the data by different methods. The one major difference is that this description does not contain any ADL <SUBTYPE> or ADL <subtype instance>.

```
"1" : DECLARE
   TITLE('Program LIST (list.c), Compiler C/370 V1 R2')
   NOTE('Binary Stream I/O')
BEGIN;

   DEFAULT ARRAY DMNLOW(0) MAXALC(TRUE) SKIP(0);
   DEFAULT ASIS UNITLEN(8) MAXALC(TRUE);
   DEFAULT BINARY PRECISION(31) SCALE(0) BYTRVS(FALSE)
      COMPLEX(FALSE) CONSTRAINED(FALSE) FIT(TRUNCATE)
      RADIX(2) SIGNED(TRUE);
   DEFAULT BOOLEAN LENGTH(8) BLNENC(LSTBIT) BYTRVS(FALSE);
   DEFAULT CHAR MAXALC(TRUE) UNITLEN(8) CCSID(0);
   DEFAULT CHARSFX CCSID(0) UNITLEN(8) MAXALC(TRUE)
      SFXENC(x'00');
   DEFAULT FLOAT16 LENGTH(32) BYTRVS(FALSE) COMPLEX(FALSE)
      FIT(TRUNCATE) RADIX(2);

  my_record : SEQUENCE
   BEGIN;
     part_1 : SEQUENCE
       BEGIN;
         y : FLOAT16 LENGTH(128);
         num_results : BINARY LENGTH(8) PRECISION(8) SIGNED(FALSE);
         results : ARRAY MAXALC(FALSE)
           DMNLST( DMNSIZE(num_results) DMNMAX(5) )
           OF FLOAT16 LENGTH(32);
         date_time : CHARSFX MAXLEN(26);
       END;
     part_2 : SEQUENCE
       BEGIN;
         system_len : BINARY PRECISION(15) LENGTH(16);
         system : CHAR LENGTH(system_len) MAXLEN(15) MAXALC(FALSE);
       END;
   END;

END;
```

9.3.5 Hex File Output

Program list.c only reads the file STREAM OUTPUT A. It does not write any records. See 9.2, "Example C Binary Stream I/O with struct data description" on page 218 for hex dump of the records of STREAM OUTPUT A. The following is the output the program displays showing the contents of the records read.

Unclassified

```
Ready; T=0.02/0.03 17:20:56
list

Contents of record 1 of file STREAM OUTPUT A
--------------------------------------------
y=0.10
num_results=3
results[0]=0.1
results[1]=0.20
results[2]=0.30
date_time=Sun Jul 28 17:14:58 1991
system_len=14
system=VM/XA CMS 5.6,

Contents of record 2 of file STREAM OUTPUT A
--------------------------------------------
y=0.10
num_results=3
results[0]=0.1
results[1]=0.20
results[2]=0.30
date_time=Sun Jul 28 17:14:58 1991
system_len=14
system=VM/XA CMS 5.6,

Ready; T=0.03/0.06 17:20:58
```

Unclassified

Chapter 10. Exceptions for Parse Source Text

&1, &2, and &n represent variables which will be substituted in the message by the declaration translator.

0001E Invalid character.

Explanation: A character which is not in the C source character set has been encountered.

0002E String literals must be terminated before the end of the line.

Explanation: String literals must be terminated before the end of the source line. You can construct literals which are longer than one line by using the line continuation sequence (backslash at the end of the line) or by using the concatenation of adjacent string literals.

**0003E Include file *&1* not found.**

Explanation: The file specified of #include directive could not be found.

0004W #include file header must not be empty.

Recovery: Remove the #include directive or, ensure that the header is not empty.

**0005E Invalid #include file header *&1***

Explanation: The name of the file specified on the #include directive is invalid.

Recovery: For details on the include directive and valid C header files, refer to the *Systems Application Architecture Common Programming Interface C Reference* SC09-1308.

**0006E Error in #pragma *&1*.**

Recovery: Check the syntax of the #pragma directive.

**0007E Unsupported option *&1* on #pragma *&2*.**

Recovery: Check your #pragma directive options.

**0008E Invalid #pragma *&1***

Explanation: Unrecognizable #pragma name.

Recovery: See this specification for list of supported #pragmas.

Unclassified

0009E Option out of range on #pragma &1.

Explanation: The specified #pragma option is not within the range of the valid values.

0010E A declaration must declare at least a variable, a tag or enum members.

Recovery: Remove the empty declaration or complete it by adding either a variable or a list of enum constants.

0011E A type must be specified in the declaration of the object &1.

Recovery: Declare the object or function with a type.

0012E Nesting cannot exceed the maximum limit &1

Explanation: The internal declaration translator limit of &1 nested include files was exceeded.

Recovery: Remove the nesting by putting all of the include files at the same level.

0013E Number of input files cannot exceed the maximum limit of &1.

Explanation: The internal declaration translator limit of &1 include files per Parse Source Text was exceeded.

Recovery: Try combining some files.

0014E Declaration cannot specify multiple type specifiers.

Recovery: Only keep one type specifier.

0015E File cannot end in comment that started on line &1.

Explanation: An unterminated comment has been detected which began on the specified line.

0016E Include file cannot end in a comment.

Recovery: End your comment in the include file.

0017E File cannot end with continuation line.

Recovery: Remove the continuation character from the last line of the file.

0018E Identifier contains DBCS characters. Identifier must contain only SBCS characters.

Recovery: Rewrite the indentifier using only SBCS characters.

Unclassified

0019E Identifier is a duplicate, i.e. not unique within the first 255 characters.

Recovery: Change the first 255 characters of the identifier to make it unique.

0020E Identifier &1 must be declared prior to use.

Recovery: Declare an object of that name.

0021E For array definitions, the C declaration translator requires that all dimensions must be specified.

Recovery: Give a size to all of the dimensions.

0022E The array size must be a positive integral constant.

Recovery: Change the array size to a positive integral constant.

0023W <type_specifier annotation> ignored because of preceding ASIS.

Explanation: An ASIS preceding the data definition causes the ADL description to be a single ASIS string. The only optional attributes encoded with this ASIS are those which follow the ASIS in the <array annotation>. Annotation following the <type specifier> is ignored.

Recovery: If it is important have the <type specifier annotation> encoded, then either (1) Move the ASIS to after the <type_specifier> data definition. (2) Move those attributes in the <type specifier annotation> which are valid in <array annotation> to before the data definition following the ASIS. Otherwise this warning message can be ignored.

Declaration of a bit-field cannot specify multiple sign adjectives.

Recovery: Only keep one sign adjective.

0024E Missing data declaration for boolean_t.

Explanation: A boolean_t data definition was found but there was not a data declaration of boolean_t.

Recovery: Include the boolean_t typedef in your data description before the first boolean_t data definition.

0025E The enumerators are incorrect in the boolean_t typedef.

Explanation: The enumerators in the typedef enum for boolean_t are required to be { FALSE, TRUE } in the order listed.

0026E Declaration of a char cannot specify multiple sign adjectives.

Recovery: Only keep one sign adjective.

Unclassified

0027E Length adjective long or short cannot be used with char.

Recovery: Remove the length adjective or try using int.

0028E Sign adjectives cannot be used with double.

Recovery: Remove the sign adjective.

0029E Length adjective short cannot be used with double.

Recovery: Remove the length adjective.

0030E An enum data declaration must specify an enum tag.

Recovery: Add the enum tag or turn the declaration into a data definition by adding <enumeration declarator>s.

0031E The enum constants must be specified when the enum tag is declared.

Recovery: Add the list of enum constants in the enum tag declaration.

0032E Enumeration constant must be an integral constant expression.

Recovery: Change the initializer of the enumeration constant to be a constant expression.

0033E An incomplete enum tag cannot be used in a declaration.

Recovery: Give a definition of the tag before it is used in the declaration of an object or in the declaration itself.

0034E Length adjectives cannot be used with enums.

Recovery: Remove the length adjective.

0035E Sign adjectives cannot be used with enums.

Recovery: Remove the sign adjective.

System/370 Only

0036E The maximum <enumerator> value cannot exceed 2,147,483,647.

Recovery: Remove any <enumerator>s with values greater than 2,147,483,647.

End of System/370 Only

OS/2 Only

0037E The maximum <enumerator> value cannot exceed 4,294,967,295.

Recovery: Remove any <enumerator>s with values greater than 4,294,967,295.

End of OS/2 Only

0038E The enum constants must be specified when the enum tag is declared.

Recovery: Add the list of enum constants in the enum tag declaration.

0039E Enumeration constant must be an integral constant expression.

Recovery: Change the initializer of the enumeration constant to be a constant expression.

0040E An incomplete enum tag cannot be used in a declaration.

Recovery: Give a definition of the tag before it is used in the declaration of an object or in the declaration itself.

0041E Length adjectives cannot be used with enums.

Recovery: Remove the length adjective.

0042E Sign adjectives cannot be used with enums.

Recovery: Remove the sign adjective.

0043E An enum typedef declaration must include a typedef indentifier.

Recovery: Add the typedef identifier.

The enum constants must be specified when the enum tag is declared.

Recovery: Add the list of enum constants in the enum tag declaration.

0044E Enumeration constant must be an integral constant expression.

Recovery: Change the initializer of the enumeration constant to be a constant expression.

0045E An incomplete enum tag cannot be used in a declaration.

Recovery: Give a definition of the tag before it is used in the declaration of an object or in the declaration itself.

0046E Length adjectives cannot be used with enums.

Recovery: Remove the length adjective.

Unclassified

0047E Sign adjectives cannot be used with enums.

Recovery: Remove the sign adjective.

0048E Length adjective short cannot be used with float.

Recovery: Remove the length adjective.

0049E Length adjective long cannot be used with float.

Recovery: Remove the length adjective or try using double instead of float.

0050E Sign adjectives cannot be used with float.

Recovery: Remove the sign adjective.

0051E ASIS cannot precede a data definition unless it is an array.

Explanation: For an array data definition, the annotation for the array precedes the data definition, and the annotation for the type follows the data definition. If an array is not being defined, then all annotation must follow the data definition.

0052E Declaration of an int cannot specify multiple sign adjectives.

Recovery: Only keep one sign adjective.

0053E Declaration of an int cannot specify multiple length adjectives.

Recovery: Only keep one length adjective.

0054E Sign adjectives cannot be used with long double.

Recovery: Remove the sign adjective.

0055E Length adjective short cannot be used with long double.

Recovery: Remove the short length adjective.

0056E Pointer to a bit-field is invalid.

Recovery: Remove the indirection operator or remove the bit-field size to make the field an normal int.

0057E Pointer to an object with registor storage class is invalid.

Recovery: Remove the registor storage class or remove the indirection operator.

Unclassified

0058E All dimensions and string lengths must be specified.

Explanation: An empty dimension declaration or string length is not allowed by the C declaration translator.

Recovery: Fill in a value for any empty dimension or string length.

0059W String annotation ignored because of preceding ASIS.

Explanation: An ASIS preceding the data definition causes the ADL description to be a single ASIS string. The only optional attributes encoded with this ASIS are those which follow the ASIS in the array annotation. The <string annoation> is ignored.

Recovery: If it is important have these optional attributes encoded then either (1) Move the ASIS to after the string data definition. (2) Move the optional attributes to before the data definition following the ASIS. Otherwise this warning message can be ignored.

0060E A struct declartion must specify a struct tag.

Recovery: Add the struct tag or add a struct declarator to make this a struct data definition.

0061E Struct member declarations must specify a declarator.

Recovery: Declare the member with a name.

0062E The &1 struct definition must specify a member list.

Recovery: Specify the members of the struct in the definition or remove the empty braces to make it a simple struct tag declaration.

0063E Length adjectives cannot be used with structs.

Recovery: Remove the length adjective.

0064E Sign adjectives cannot be used with structs.

Recovery: Remove the sign adjective.

0065E An incomplete struct tag cannot be used in a declaration.

Recovery: Give a definition of the tag before it is used in the declaration of an object or in the declaration itself.

0066E Struct member declarations must specify a declarator.

Recovery: Declare the member with a name.

0067E The &1 struct definition must specify a member list.

Recovery: Specify the members of the struct in the definition or remove the empty braces to make it a simple struct tag declaration.

0068E Length adjectives cannot be used with structs.

Recovery: Remove the length adjective.

0069E Sign adjectives cannot be used with structs.

Recovery: Remove the sign adjective.

0070E A struct's member cannot be declared with a storage class.

Recovery: Remove the storage class from the member's data definition.

0071E Struct member declarations must specify a declarator.

Recovery: Declare the member with a name.

0072E The &1 struct definition must specify a member list.

Recovery: Specify the members of the struct in the definition or remove the empty braces to make it a simple struct tag declaration.

0073E Length adjectives cannot be used with structs.

Recovery: Remove the length adjective.

0074E Sign adjectives cannot be used with structs.

Recovery: Remove the sign adjective.

0075E typdef identifier must be declared before use in a data definition

Recovery: Add or move the typedef declaration before the data definition

0076E Length adjectives cannot be used for variables declared with a typedef.

Recovery: Remove the length adjective.

0077E Sign adjectives cannot be used for variables declared with a typedef.

Recovery: Remove the sign adjective.

0078E A union declartion must specify a union tag.

Recovery: Add the union tag or add a union declarator to make this a union data definition.

0079E Description of union <identifier> not complete. Missing required annotation with WHEN statements.

Recovery: Each union member must be annotated with a WHEN or OTHERWISE statement. The WHEN statement contain conditional tests of a field in the record which determines which union member a union contains.

0080E The ADL <qualified identifier> from the ADL <condition> not found.

Explanation: The ADL <qualified identifier> referenced in the ADL <condition> of the <when annotation> must be part of the record being described.

Recovery: Add the field to the C data description or correct the ADL <qualified identifier> to correctly reference a field in the record.

0081E An Incomplete union tag cannot be used in a declaration.

Recovery: Give a definition of the tag before it is used in the declaration of an object or in the declaration itself.

0082E Union member declarations must specify a declarator.

Recovery: Declare the member with a name.

0083E The &1 union definition must specify a member list.

Recovery: Specify the members of the union in the definition or remove the empty braces to make it a simple union tag declaration.

0084E Length adjectives cannot be used with unions.

Recovery: Remove the length adjective.

0085E Sign adjectives cannot be used with unions.

Recovery: Remove the sign adjective.

0086E Description of union <identifier> not complete. Missing required annotation with WHEN statements.

Recovery: Each union member must be annotated with a WHEN or OTHERWISE statement. The WHEN statement contain conditional tests of a field in the record which determines which union member a union contains.

0087E The ADL <qualified identifier> from the ADL <condition> not found.

Explanation: The ADL <qualified identifier> referenced in the ADL <condition> of the <when annotation> must be part of the record being described.

Recovery: Add the field to the C data description or correct the ADL <qualified identifier> to correctly reference a field in the record.

0088E An Incomplete union tag cannot be used in a declaration.

Recovery: Give a definition of the tag before it is used in the declaration of an object or in the declaration itself.

0089E Union member declarations must specify a declarator.

Recovery: Declare the member with a name.

0090E The &1 union definition must specify a member list.

Recovery: Specify the members of the union in the definition or remove the empty braces to make it a simple union tag declaration.

0091E Length adjectives cannot be used with unions.

Recovery: Remove the length adjective.

0092E Sign adjectives cannot be used with unions.

Recovery: Remove the sign adjective.

0093E A struct's member cannot be declared with a storage class.

Recovery: Remove the storage class from the member's data definition.

0094E Description of union <identifier> not complete. Missing required annotation with WHEN statements.

Recovery: Each union member must be annotated with a WHEN or OTHERWISE statement. The WHEN statement contain conditional tests of a field in the record which determines which union member a union contains.

0095E The ADL <qualified identifier> from the ADL <condition> not found.

Explanation: The ADL <qualified identifier> referenced in the ADL <condition> of the <when annotation> must be part of the record being described.

Recovery: Add the field to the C data description or correct the ADL <qualified identifier> to correctly reference a field in the record.

0096E An Incomplete union tag cannot be used in a declaration.

Recovery: Give a definition of the tag before it is used in the declaration of an object or in the declaration itself.

0097E Union member declarations must specify a declarator.

Recovery: Declare the member with a name.

Unclassified

0098E The &1 union definition must specify a member list.

Recovery: Specify the members of the union in the definition or remove the empty braces to make it a simple union tag declaration.

0099E Length adjectives cannot be used with unions.

Recovery: Remove the length adjective.

0100E Sign adjectives cannot be used with unions.

Recovery: Remove the sign adjective.

0101E SBCS or Mixed CCSID not valid for a wchar_t character.

Explanation: Only a DBCS CCSID can be annotated on a whcar_t character.

0102E All dimensions and string lengths must be specified in a wide string data definition.

Explanation: An empty dimension declaration or string length is not allowed by the C declaration translator.

Recovery: Fill in a value for any empty dimension or string length.

0103E Annotated CCSID value must be a DBCS CCSID for a wide string.

Explanation: The wide string type can only be used with DBCS characters.

0104W Wide string annotation ignored because of preceding ASIS.

Explanation: An ASIS preceding the data definition causes the ADL description to be a single ASIS string. The only optional attributes encoded with this ASIS are those which follow the ASIS in the array annotation.

Recovery: If it is important have these optional attributes encoded then either (1) Move the ASIS to after the wide string data definition. (2) Move the optional attributes to before the data definition following the ASIS. Otherwise this warning message can be ignored.

Unclassified

Chapter 11. C Declaration Translator BNF Summary

```
<annotation> ::=
     <DECLARE annotation>
   | <LIST statement annotation>
   | <identifier annotation>
   | <when annotation>
   | <otherwise annotation>
   | <case variant annotation>
   | <type specifier annotation>

<array annotation> ::=
  {
    {
      [ ASIS ]
      {
        [ ADL<TITLE attribute> ]
        [ ADL<NOTE attribute> ]
        [ ADL<HELP attribute> ]
        [ ADL<WHEN clause> ]
      }!
    }
  | {
      [ DMNLST( [ DMNSIZE( ADL<qualified identifier> ) ]
          {[, [ DMNSIZE( ADL<qualified identifier> ) ] ]...}) ]
      [ ADL<MAXALC attribute> ]
      [ ADL<TITLE attribute> ]
      [ ADL<NOTE attribute> ]
      [ ADL<HELP attribute> ]
      [ ADL<WHEN clause> ]
    }!
  }
  ADL<terminator>

<array data definition> ::=
   {
     [<storage class>] [<attribute>] <type specifier>
   }
   {
     <array declarator> [<initializer>] [<identifier annotation>]
   }
   [
     {
       , <array declarator> [<initializer>] [<identifier annotation>]
     }...
   ]
   [<type specifier annotation>] ;

<array declarator> ::=
   [<array annotation>] [<attribute>] <identifier> <subscript declarator>
```

```
<ASIS fixed length string annotation> ::=
    {
      ASIS
      {
        [ ADL<TITLE attribute> ]
        [ ADL<NOTE attribute> ]
        [ ADL<HELP attribute> ]
        [ ADL<WHEN clause> ]
      }!
    }

<ASIS varying length string annotation> ::=
    {
      ASIS
      {
        LENGTH(ADL<qualified identifier>)
        [ ADL<UNITLEN attribute> ]
        [ ADL<MAXALC attribute> ]
        [ ADL<TITLE attribute> ]
        [ ADL<NOTE attribute> ]
        [ ADL<HELP attribute> ]
        [ ADL<WHEN clause> ]
      }!
    }

<attribute> ::=
   {
     volatile
     const
     _Packed
   }!
```

System/370 Only

```
<backslash> ::= \\ = \ = x'E0'
```

End of System/370 Only

OS/2 Only

```
<backslash> ::= \\ = \ = x'5C'
```

End of OS/2 Only

System/370 Only

```
<backspace> ::= \b = x'16'
```

End of System/370 Only

OS/2 Only

```
<backspace> ::= \b = x'08'
```

End of OS/2 Only

System/370 Only

```
<bell> ::= \a = x'2F'
```

End of System/370 Only

OS/2 Only

```
<bell> ::= \a = x'07'
```

End of OS/2 Only

```
<bit-field annotation> ::=
   {
     [ ASIS ]
     {
       [ ADL<TITLE attribute> ]
       [ ADL<NOTE attribute> ]
       [ ADL<HELP attribute> ]
     }!
   }
```

Unclassified

```
<bit-field data definition> ::=
   {
     [<attribute>] [<sign adjective>] int
   }
   {
     <bit-field declarator> [<initializer>] [<identifier annotation>]
   }
   [
     {
       , <bit-field declarator> [<initializer>] [<identifier annotation>]
     }...
   ]
   [<bit-field annotation>] ;

<bit-field declarator> ::=
   [<attribute>] <identifier> : <bit-field size>

<bit-field size> ::= <integer constant>

<boolean_t annotation> ::=
   {
     [ ASIS ]
     {
       [ ADL<TITLE attribute> ]
       [ ADL<NOTE attribute> ]
       [ ADL<HELP attribute> ]
       [ ADL<WHEN clause> ]
     }!
   }
   ADL<terminator>

<boolean_t data declaration> ::=
   typedef enum {FALSE, TRUE} boolean_t /* ADL BOOLEAN; */;

<boolean_t data definition> ::=
   {
     [<storage class>] [<attribute>] boolean_t
   }
   {
     <boolean_t declarator> [<initializer>] [<identifier annotation>]
   }
   [
     {
       , <boolean_t declarator> [<initializer>] [<identifier annotation>]
     }...
   ]
   [<boolean_t annotation>] ;

<boolean_t declarator> ::=
   [<array annotation>] [<attribute>] <identifier> [<subscript declarator>]
```

```
<C data description> ::=
   [ <C OPTIONS annotation> ]
   [ <DECLARE annotation> ]
   {
     [ <data declaration> ]
     [ ADL<constant statement> ]
     [ <preprocessor pragma> ]
     [ <data definition> ]
     [ <LIST statement annotation> ]
   }...

<C option> ::=
     <option MARGINS>
   | <option SEQUENCE>
   | <option FIT>
   | <option CONSTRAINED>

<C OPTIONS annotation> ::=
   OPTIONS (<C option>[, <C option>]...);

<carriage return> ::= \r = x'0D'

<case variant annotation> ::=
   {
      ADL<REJECT statement>
    | ADL<SKIP statement>
    | ADL<terminator>
   }
```

Unclassified

```
<char annotation> ::=
   {
     ASIS
     {
       [ ADL<TITLE attribute> ]
       [ ADL<NOTE attribute> ]
       [ ADL<HELP attribute> ]
       [ ADL<WHEN clause> ]
     }!
   }
 | {
     [ ADL<CCSID attribute> ]
     [ ADL<TITLE attribute> ]
     [ ADL<NOTE attribute> ]
     [ ADL<HELP attribute> ]
     [ ADL<WHEN clause> ]
   }!
 | {
     BINARY
     {
       [ ADL<FIT attribute> ]
       [ ADL<CONSTRAINED attribute> ]
       [ ADL<TITLE attribute> ]
       [ ADL<NOTE attribute> ]
       [ ADL<HELP attribute> ]
       [ ADL<WHEN clause> ]
     }!
   }
   ADL<terminator>

<CHAR array of single char annotation>
    {
      CHAR
      {
        [ ADL<CCSID attribute> ]
        [ ADL<TITLE attribute> ]
        [ ADL<NOTE attribute> ]
        [ ADL<HELP attribute> ]
        [ ADL<WHEN clause> ]
      }!
    }
```

Unclassified

```
<char data definition> ::=
     {
       [<storage class>]
       [<attribute>]
       [<sign adjective>]
       char
     }
     {
       <char declarator>
       [<initializer>]
       [<identifier annotation>]
     }
     [
       {
         , <char declarator>
         [<initializer>]
         [<identifier annotation>]
       }...
     ]
     [<char annotation>] ;

<char declarator> ::=
   [<attribute>]<identifier>

<CHAR fixed length string annotation>
    {
      [ ADL<CCSID attribute> ]
      [ ADL<JUSTIFY attribute> ]
      [ ADL<TITLE attribute> ]
      [ ADL<NOTE attribute> ]
      [ ADL<HELP attribute> ]
      [ ADL<WHEN clause> ]
    }!

<char string constant> ::=
   "{<character> | <escape sequence> }..."

<CHAR varying length string annotation>
    {
      LENGTH(ADL<qualified identifier>)
      [ ADL<MAXALC attribute> ]
      [ ADL<CCSID attribute> ]
      [ ADL<JUSTIFY attribute> ]
      [ ADL<TITLE attribute> ]
      [ ADL<NOTE attribute> ]
      [ ADL<HELP attribute> ]
      [ ADL<WHEN clause> ]
    }!

<character> ::=
    <decimal digit>
  | <letter>
  | <graphic character>
  | <space>
```

Unclassified

```
<character constant> ::=
   [ L ] '{<character> | <escape sequence>}'

<CHARSFX varying length string annotation>
    {
      CHARSFX
      {
        [ ADL<CCSID attribute> ]
        [ ADL<MAXALC attribute> ]
        [ ADL<TITLE attribute> ]
        [ ADL<NOTE attribute> ]
        [ ADL<HELP attribute> ]
        [ ADL<WHEN clause> ]
      }!
    }

<comment> ::=
   /* <character>...*/

<constant> ::=
     <integral constant> | <string constant>

<constant expression> ::=
   [<unary operator>]<constant>

<data declaration> ::=
     <struct data declaration>
   | <struct typedef data declaration>
   | <union data declaration>
   | <union typedef data declaration>
   | <enumeration data declaration>
   | <enumeration typedef data declaration>
   | <typedef data declaration>

<data definition> ::=
     <pointer data definition>
   | <string data definition>
   | <wide string data definition>
   | <int data definition>
   | <bit-field data definition>
   | <float data definition>
   | <double data definition>
   | <long double data definition>
   | <char data definition>
   | <wchar_t data definition>
   | <array data definition>
   | <struct data definition>
   | <union data definition>
   | <enumeration data definition>
   | <typedef instance data definition>

<decimal constant> ::=
   { 1 | 2 | 3 | 4 | 5 | 6 | 7 | 8 | 9} [<decimal digit>...]
```

Unclassified

```
<decimal digit> ::=
   <octal digit> | 8 | 9

<declarator> ::=
    <array declarator>
  | <boolean_t declarator>
  | <char declarator>
  | <double declarator>
  | <float declarator>
  | <int declarator>
  | <long double declarator>
  | <pointer declarator>
  | <string declarator>
  | <struct declarator>
  | <typedef declarator>
  | <typedef instance declarator>
  | <union declarator>
  | <wchar_t declarator>
  | <wide string declarator>

<DECLARE annotation> ::=
   [<unqualified identifier annotation>:] DECLARE
   {
     [ADL<TITLE attribute>]
     [ADL<TEXT attribute>]
     [ADL<NOTE attribute>]
   }!

<delimiter token> ::=
   <special symbol>
   <separator>

<dimension size> ::= <integral constant expression>

<double annotation> ::=
   [ ASIS ]
   {
     [ ADL<TITLE attribute> ]
     [ ADL<NOTE attribute> ]
     [ ADL<HELP attribute> ]
     [ ADL<WHEN clause> ]
   }!
   ADL<terminator>
```

```
<double data definition> ::=
   {
     [<storage class>] [<attribute>] double
   }
   {
     <double declarator> [<initializer>] [<identifier annotation>]
   }
   [
     {
       , <double declarator> [<initializer>] [<identifier annotation>]
     }...
   ]
   [<double annotation>] ;

<double declarator> ::=
   [<array annotation>] [<attribute>]<identifier> [<subscript declarator>]
```

System/370 Only

```
<double quotation> ::= \" = " = x'22'
```

End of System/370 Only

```
<enum tag> ::= <identifier>

<enumeration annotation> ::=
  {
    [ ASIS ]
    {
      [ ADL<TITLE attribute> ]
      [ ADL<NOTE attribute> ]
      [ ADL<HELP attribute> ]
      [ ADL<WHEN clause> ]
    }:
  }
  ADL<terminator>

<enumeration constant> ::= <identifier>

<enumeration data declaration> ::=
   [<array annotation>]
   [<attribute>] enum <enum tag> [<identifier annotation>]
   ►{<enumeration list>►}
   [<enumeration annotation>] ;
```

Unclassified

```
<enumeration data definition> ::=
   [<array annotation>]
   {
     [<storage class>] [<attribute>] enum
     [<enum tag>] [<identifier annotation>]
   }
   ►{<enumeration list>►}
   {
     <enumeration declarator> [<initializer>] [<identifier annotation>]
   }
   [
     {
       , <enumeration declarator> [<initializer>] [<identifier annotation>]
     }...
   ]
   [<enumeration annotation>] ;

<enumeration declarator> ::=
   [<attribute>] <identifier> [<subscript declarator>]

<enumeration list> ::=
   <enumerator>[, <enumerator>]...

<enumeration typedef data declaration> ::=
   [<array annotation>]
   typedef
   [<attribute>] enum [<identifier annotation>]
   ►{<enumeration list>►} <typedef identifier>
   [<enumeration annotation>] ;

<enumerator> ::=
   <enumeration constant>
   [= <integral constant expression>]

<escape sequence> ::=
   \ {<escape sequence character> | <octal digit>...
   | {x | X}{<hexadecimal digit>...}}

<escape sequence character> ::=
     <bell>
   | <backspace>
   | <form feed>
   | <new line>
   | <carriage return>
   | <horizontal tab>
   | <vertical tab>
   | <single quotation>
   | <double quotation>
   | <backslash>
   | <line continuation character>

<expression> ::=
     <unary expression>
   | <constant expression>
   | <integral constant expression>
```

```
<external storage class> ::= static | extern

<field size> ::= <integral constant>

<file name> ::= See syntax rule 1

<first identifier character> ::=
   <letter> | <underscore>

<float annotation> ::=
   [ ASIS ]
   {
     [ ADL<TITLE attribute> ]
     [ ADL<NOTE attribute> ]
     [ ADL<HELP attribute> ]
     [ ADL<WHEN clause> ]
   }!
   ADL<terminator>

<float data definition> ::=
   {
     [<storage class>] [<attribute>] float
   }
   {
     <float declarator> [<initializer>] [<identifier annotation>]
   }
   [
     {
       , <float declarator> [<initializer>] [<identifier annotation>]
     }...
   ]
   [<float annotation>] ;

<float declarator> ::=
   [<array annotation>] [<attribute>]<identifier> [<subscript declarator>]

<form feed> ::= \f = x'0C'

<graphic character> ::=
     ! | " | # | % | & | ' | ( | ) | * | +
   | , | - | . | / | : | ; | ►< | = | ►> | ?
   | ►[ | \ | ►] | ►{ | ►} | ¯ | <underscore>
   | <OR symbol> | <NOT symbol>

<hexadecimal constant> ::=
   {0x | 0X} {<hexadecimal digit>...}

<hexadecimal digit> ::=
   <decimal digit> | A | B | C | D | E | F | a | b | c | d | e | f
```

Unclassified

```
┌──────────────────── System/370 Only ────────────────────┐

<horizontal tab> ::= \t = x'05'

└────────────────── End of System/370 Only ───────────────┘


┌──────────────────────── OS/2 Only ──────────────────────┐

<horizontal tab> ::= \t = x'09'

└───────────────────── End of OS/2 Only ──────────────────┘

<identifier> ::=
    <first identifier character>
  [ <remaining identifier characters> ]

<include directive> ::=
  #include { "<file name>" | ►<<file name>►> | <character>... }

<indirection> ::= *

<initializer> ::=
  { = <expression> } |
  { = <expression> [, <expression>]...}

<int annotation> ::=
  {
    [ ADL<FIT attribute> ]
    [ ADL<CONSTRAINED attribute> ]
    [ ADL<TITLE attribute> ]
    [ ADL<NOTE attribute> ]
    [ ADL<HELP attribute> ]
    [ ADL<WHEN clause> ]
  }!
 | {
    [ ASIS ]
    {
      [ ADL<TITLE attribute> ]
      [ ADL<NOTE attribute> ]
      [ ADL<HELP attribute> ]
      [ ADL<WHEN clause> ]
    }!
  }
  ADL<terminator>
```

Unclassified

```
<int data definition> ::=
   {
     {
       [<storage class>] [<attribute>]
       [<sign adjective>]
       { [<length adjective>] int } | <length adjective>
     }
     | <internal storage class>
     | static
   }
   {
     <int declarator>
     [<initializer>]
     [ <identifier annotation> ]
   }
   [
     {
       , <int declarator>
       [<initializer>]
       [ <identifier annotation> ]
     }...
   ]
   [ <int annotation> ] ;

<int declarator> ::=
   [<array annotation>] [<attribute>] <identifier> [<subscript declarator>]

<integer constant> ::=
     <decimal constant>
   | <octal constant>
   | <hexadecimal constant>

<integral constant> ::=
     <integer constant> | <character constant>
   | <enumeration constant>

<integral constant expression> ::=
   [<unary operator>]<integral constant>

<internal storage class> ::= auto | register | static

<keyword> ::=
     short          | long           | int
   | float          | double         | char
   | wchar_t        | struct         | union
   | enum           | typedef        | boolean_t
   | #pragma        | _Packed        | auto
   | register       | unsigned       | signed
   | const          | extern         | sizeof
   | static         | volatile       | void
   | #include

<left col> ::= <integer constant>

<length adjective> ::= short | long
```

```
<letter> ::=
   <upper case letter> | <lower case letter>

<line continuation character> ::= \

<LIST statement annotation> ::=
   <LIST statement>
   [<LIST statement>...]

<long double annotation> ::=
   [ ASIS ]
   {
     [ ADL<TITLE attribute> ]
     [ ADL<NOTE attribute> ]
     [ ADL<HELP attribute> ]
     [ ADL<WHEN clause> ]
   }!
   ADL<terminator>

<long double data definition> ::=
   {
     [<storage class>] [<attribute>] long double
   }
   {
     <long double declarator> [<initializer>] [<identifier annotation>]
   }
   [
     {
       , <long double declarator> [<initializer>] [<identifier annotation>]
     }...
   ]
   [<long double annotation>] ;

<long double declarator> ::=
   [<array annotation>] [<attribute>]<identifier> [<subscript declarator>]

<lower case letter> ::=
   a | b | c | d | e | f | g | h | i |
   j | k | l | m | n | o | p | q | r |
   s | t | u | v | w | x | y | z

<member list> ::= ►{ <data definition> [<data definition>]... ►}
```

Unclassified

System/370 Only

```
<new line> ::= \n = x'15'
```

End of System/370 Only

OS/2 Only

```
<new line> ::= \n = x'0A'
```

End of OS/2 Only

```
<nondelimiter token> ::=
     <identifier>
   | <keyword>
   | <constant>
```

System/370 Only

```
<NOT symbol> ::= ¬
```

End of System/370 Only

OS/2 Only

```
<NOT symbol> ::= ^
```

End of OS/2 Only

```
<octal constant> ::=
   {0} [<octal digit>...]

<octal digit> ::=
   0 | 1 | 2 | 3 | 4 | 5 | 6 | 7

<operand> ::=
     <identifier>
   | <constant>
```

Unclassified

```
<operator> ::=
     <unary operator>

<option CONSTRAINED> ::=
     CONSTRAINED ( TRUE | FALSE )

<option FIT> ::=
     FIT ( TRUNCATE | ROUND | EXACT )

<option MARGINS> ::=
     { MARGINS(<left col>,<right col>) }
   | NOMARGINS
   | /Sg[<left col>][,<right col>]
   | /Sg-

<option SEQUENCE> ::=
     { SEQUENCE (<left col>,<right col>) }
   | NOSEQUENCE
   | /Sq[<left col>][,<right col>]
   | /Sq-
```

System/370 Only

```
<OR symbol> ::= ►|
```

End of System/370 Only

OS/2 Only

```
<OR symbol> ::= ¦
```

End of OS/2 Only

```
<otherwise annotation> ::=
   [ADL<qualified identifier> :]
   OTHERWISE

<pointer annotation> ::=
   {
     [ ADL<TITLE attribute> ]
     [ ADL<NOTE attribute> ]
     [ ADL<HELP attribute> ]
     [ ADL<WHEN clause> ]
   }!
   ADL<terminator>
```

```
<pointer data definition> ::=
   {
     [<storage class>] [<attribute>] <type specifier>
   }
   {
     <pointer declarator> [<initializer>] [<identifier annotation>]
   }
   [
     {
       , <pointer declarator> [<initializer>] [<identifier annotation>]
     }...
   ]
   [<pointer annotation>] ;

<pointer declarator> ::=
   [<array annotation>]
   {
       {*...} [<attribute>] {[*]...}
     | {[*]...} [<attribute>] {*...}
   }
   <identifier> [<subscript declarator>]

<pragma chars> ::=
   #pragma chars ( { signed | unsigned } )

<pragma margins> ::=
   #pragma { margins(<left col>,<right col>) } |
            nomargins
```

System/370 Only

```
<pragma options> ::=
   <character>...
```

End of System/370 Only

System/370 Only

```
<pragma runopts> ::=
   <character>...
```

End of System/370 Only

```
<pragma sequence> ::=
   #pragma { sequence (<left col>,<right col>) } |
            nosequence
```

Unclassified

```
<preprocessor directive> ::=
    <include directive>

<preprocessor pragma> ::=
    <pragma sequence>
  | <pragma margins>
  | <pragma chars>
  | <pragma options>
  | <pragma runopts>

<record size> ::= See syntax note 1

<remaining identifier characters> ::=
   { <letter> | <decimal digit> | <underscore> }...

<right col> ::= <integer constant>

<separator> ::=
   {
      <comment>
     | <space>
     | <new line>
     | <horizontal tab>
     | <vertical tab>
     | <form feed>
     | <carriage return>
   }...

<sign adjective> ::= signed | unsigned
```

System/370 Only

```
<single quotation> ::= \' = ' = x'7D'
```

End of System/370 Only

OS/2 Only

```
<single quotation> ::= \' = ' = x'27'
```

End of OS/2 Only

```
<size of an object> ::= sizeof

<SKIP padding annotation> ::= SKIP
```

Unclassified

```
<space> ::=
  See Syntax Rule 1, 2, 3, and 4.

<special symbol> ::=
    ; | , | ►[ | ►] | ( | ) | *
  | - | + | / | .

<storage class> ::=
   <internal storage class> | <external storage class>

<string annotation> ::=
  {
      <SKIP padding annotation>
    | <ASIS fixed length string annotation>
    | <ASIS varying length string annotation>
    | <CHAR array of single char annotation>
    | <CHAR fixed length string annotation>
    | <CHAR varying length string annotation>
    | <CHARSFX varying length string annotation>
  }
  ADL<terminator>

<string constant> ::=
    <char string constant>
  | <wchar_t string constant>

<string data definition> ::=
   [<storage class>] [<attribute>]
   [<sign adjective>] char
   {
     <string declarator>►[<string size>►]
     [<initializer>] [<identifier annotation>]
   }
   [
     {
       , <string declarator>►[<string size>►]
       [<initializer>] [<identifier annotation>]
     }...
   ]
   [ <string annotation> ];

<string declarator> ::=
   [<array annotation>] [<attribute>] <identifier> [<subscript declarator>]

<string size> ::= <decimal constant>
```

Unclassified

```
<struct annotation> ::=
  {
    [ ASIS ]
    {
      [ ADL<TITLE attribute> ]
      [ ADL<NOTE attribute> ]
      [ ADL<HELP attribute> ]
      [ ADL<WHEN clause> ]
    }!
  }
  ADL<terminator>

<struct data declaration> ::=
   {
     [<storage class>] [<attribute>] struct
     <struct tag> [<identifier annotation>]
   }
   <member list>
   [<struct annotation>] ;

<struct data definition> ::=
   {
     [<storage class>] [<attribute>] struct
     [<struct tag> [<identifier annotation>] ]
   }
   [ <member list> ]
   {
     <struct declarator> [<initializer>] [<identifier annotation>]
   }
   [
     {
       , <struct declarator> [<initializer>] [<identifier annotation>]
     }...
   ]
   [<struct annotation>] ;

<struct declarator> ::=
   [<array annotation>] [<attribute>] <identifier> [<subscript declarator>]

<struct tag> ::= <identifier>

<struct typedef data declaration> ::=
   typedef [<attribute>] struct
   <member list>
   <typedef identifier> [<identifier annotation>]
   [<struct annotation>] ;

<subscript declarator> ::=
   ►[<dimension size>►]
   [{►[<dimension size>►]}...]

<token> ::=
   <nondelimiter token> | <delimiter token>
```

Unclassified

```
<type specifier> ::=
    array
  | struct
  | union
  | int
  | float
  | double
  | enum
  | char
  | wchar_t

<type specifier annotation> ::=
   | <pointer annotation>
   | <string annotation>
   | <wide string annotation>
   | <int annotation>
   | <bit-field annotation>
   | <float annotation>
   | <double annotation>
   | <long double annotation>
   | <char annotation>
   | <wchar_t annotation>
   | <array annotation>
   | <struct annotation>
   | <union annotation>
   | <enumeration annotation>
   | <_boolean_t annotation>

<typedef data declaration> ::=
   typedef
   {
     [<attribute>] <type specifier>
   }
   {
     <typedef declarator> [<identifier annotation>]
   }
   [
     {
       , <typedef declarator> [<identifier annotation>]
     }...
   ]
   [<type specifier annotation>] ;

<typedef declarator> ::=
   [<array annotation>] [<attribute>]
   <typedef identifier> [<subscript declarator>]

<typedef identifier> ::= <identifier>
```

```
<typedef instance data definition> ::=
   {
     [<storage class>] [<attribute>] <typedef identifier>
   }
   {
     <typedef instance declarator> [<initializer>] [<identifier annotation>]
   }
   [
     {
       , <typedef instance declarator> [<initializer>] [<identifier annotation>]
     }...
   ]
   [<type specifier annotation>] ;

<typedef instance declarator> ::=
   [<array annotation>] [<attribute>] <identifier> [<subscript declarator>]

<unary expression> ::=
   [<unary operator>]<operand>

<unary minus> ::= -

<unary operator> ::=
     <unary plus>
   | <unary minus>
   | <indirection>
   | <size of an object>

<unary plus> ::= +

<underscore> ::= _

<union annotation> ::=
   {
     [ ASIS ]
     {
       [ ADL<MAXALC attribute> ]
       [ ADL<TITLE attribute> ]
       [ ADL<NOTE attribute> ]
       [ ADL<HELP attribute> ]
       [ ADL<WHEN clause> ]
     }!
   }
   ADL<terminator>

<union data declaration> ::=
   {
     [<storage class>] [<attribute>] union
     <union tag> [<identifier annotation>]
   }
   <union member list>
   [<union annotation>] ;
```

Unclassified

```
<union data definition> ::=
   {
     [<storage class>] [<attribute>] union
     [<union tag> [<identifier annotation>] ]
   }
   [ <union member list> ]
   {
     <union declarator> [<initializer>] [<identifier annotation>]
   }
   [
     {
       , <union declarator> [<initializer>] [<identifier annotation>]
     }...
   ]
   [<union annotation>] ;

<union declarator> ::=
   [<array annotation>] [<attribute>] <identifier> [<subscript declarator>]

<union member list> ::=
   ►{
      {
        <when annotation>
        { <data definition> | <case variant annotation> }
        [
          <when annotation>
          { <data definition> | <case variant annotation> }
        ]...
      }
      [
        <otherwise annotation>
        { <data definition> | <case variant annotation> }
      ]
   ►}

<union tag> ::= <identifier>

<union typedef data declaration> ::=
   typedef [<attribute>] union
   <union member list>
   <typedef identifier> [<identifier annotation>]
   [<union annotation>] ;

<upper case letter> ::=
   A | B | C | D | E | F | G | H | I |
   J | K | L | M | N | O | P | Q | R |
   S | T | U | V | W | X | Y | Z

<vertical tab> ::= \v = x'0B'
```

Unclassified

```
<wchar_t annotation> ::=
   {
     ASIS
     {
       [ ADL<TITLE attribute> ]
       [ ADL<NOTE attribute> ]
       [ ADL<HELP attribute> ]
     }!
   }
   {
     [ ADL<CCSID attribute> ]
     [ ADL<TITLE attribute> ]
     [ ADL<NOTE attribute> ]
     [ ADL<HELP attribute> ]
   }!

<wchar_t data definition> ::=
    {
      [<storage class>] [<attribute>] wchar_t
    }
    {
      <wchar_t declarator> [<initializer>] [<identifier annotation>]
    }
    [
      {
        , <wchar_t declarator> [<initializer>] [<identifier annotation>]
      }...
    ]
    [<wchar_t annotation>] ;

<wchar_t declarator> ::=
    [<attribute>] <identifier>

<wchar_t string constant> ::=
    L"{<character> | <escape sequence> }..."

<when annotation> ::=
    [ADL<qualified identifier> :]
    WHEN ADL<condition> THEN

<wide string annotation> ::=
   {
       <ASIS fixed length string annotation>
     | <ASIS varying length string annotation>
     | <CHAR array of single char annotation>
     | <CHAR fixed length string annotation>
     | <CHAR varying length string annotation>
     | <CHARSFX varying length string annotation>
   }
   ADL<terminator>
```

```
<wide string data definition> ::=
   [<storage class>] [<attribute>]
   [<sign adjective>] wchar_t
   {
     <wide string declarator>►[<string size>►]
     [<initializer>] [<identifier annotation>]
   }
   [
     {
       , <wide string declarator>►[<string size>►]
       [<initializer>] [<identifier annotation>]
     }...
   ]
   [ <wide string annotation> ];

<wide string declarator> ::=
   [<array annotation>] [<attribute>] <identifier> [<subscript declarator>]
```

Unclassified

Part 4. C Declaration Translator Translate Declaration Space

Chapter 12. C Translate Declaration Space Options . . . . . . . . . . . . . . 267

Chapter 13. C Declaration Translator Translate Declaration Space . . . . . . 268
13.1 Order of Declarations . . . . . . . . . . . . . . . . . . . . . . . . . . . 268
13.2 Translate from CASE declaration . . . . . . . . . . . . . . . . . . . . . . 268
13.3 Translate from ARRAY declaration . . . . . . . . . . . . . . . . . . . . . 269
13.4 Translate from SUBTYPE statement . . . . . . . . . . . . . . . . . . . . . 269
13.5 Translate from SUBTYPE instances . . . . . . . . . . . . . . . . . . . . . 269
13.6 Data Alignment . . . . . . . . . . . . . . . . . . . . . . . . . . . . . . 270
13.7 Translation of Reference Fields . . . . . . . . . . . . . . . . . . . . . . 270
13.8 Translate from ADL < ASIS > . . . . . . . . . . . . . . . . . . . . . . . 272
13.9 Translate from ADL < BINARY > . . . . . . . . . . . . . . . . . . . . . . 273
13.10 Translate from ADL < BIT > . . . . . . . . . . . . . . . . . . . . . . . 282
13.11 Translate from ADL < BITPRE > . . . . . . . . . . . . . . . . . . . . . 284
13.12 Translate from ADL < BOOLEAN > . . . . . . . . . . . . . . . . . . . . 286
13.13 Translate from ADL < CHAR > . . . . . . . . . . . . . . . . . . . . . . 287
13.14 Translate from ADL < CHARPRE > . . . . . . . . . . . . . . . . . . . . 290
13.15 Translate from ADL < CHARSFX > . . . . . . . . . . . . . . . . . . . . 292
13.16 Translate from Numerics Types with COMPLEX(TRUE) . . . . . . . 293
13.17 Translate from attributes for a single dimension . . . . . . . . . . . . 294
13.18 Translate from ADL < ENUMERATION > . . . . . . . . . . . . . . . 296
13.19 Translate from ADL < FLOAT16 > . . . . . . . . . . . . . . . . . . . 297
13.20 Translate from ADL < FLOAT2 > . . . . . . . . . . . . . . . . . . . . 299
13.21 Translate from ADL < PACKED > . . . . . . . . . . . . . . . . . . . . 301
13.22 Translate from ADL < ZONED > . . . . . . . . . . . . . . . . . . . . 302
13.23 Translate from RADIX(10) Fixed Point Numerics . . . . . . . . . . . 303

Chapter 14. Exceptions for Translate Declaration Space . . . . . . . . . . . . 314

Unclassified

Chapter 12. C Translate Declaration Space Options

The C declaration translator supports several options on the call to Translate Declaration Space that affect the results of these functions. Also see Chapter 15, "C Generate Source Text Options" on page 317.

Option Description

PACKED
: Specifies on Translate Declaration Space that all ADL <SEQUENCE> and ADL <CASE> shall be translated as if they had the C _Packed attribute. That is, they will not include any padding except to fill out a byte after a bit field. PACKED should be specified on Translate Declaration Space when LIST is desired on Generate Source Text.

If PACKED is not specified then all ADL <SEQUENCE> and ADL <CASE> shall be translated with padding as required by C's alignment rules.

Chapter 13. C Declaration Translator Translate Declaration Space

The following REXX pseudo-code procedures specify the mapping from ADL data declarations in any representation domain to ADL data declarations in the C representation domain. This function will take as input an ADLDCLSPC in any representation domain and output an ADLDCLSPC in the C representation domain.

Translate Declaration Space is used for the following :

1. To create an ADLDCLSPC that can be used as a view of data described by the input ADLDCLSPC. This would usually be followed by a generate to get C source declarations or ADL source declarations.
2. To create an ADLDCLSPC to describe base data using as a model an ADLDCLSPC describing data in another representation domain.

These mappings imply a set of conversions between the data described by the base ADLDCLSPC and the data described by the view ADLDCLSPC.

13.1 Order of Declarations

Present declarations to Translate Declaration Space for processing in the following order:

1. Constants
2. Defaults
3. SUBTYPEs
4. Data Declarations

Within Constants, any constant which is assigned the value of another constant must be declared after the declaration of the other constant.

Within SUBTYPEs, any SUBTYPE which is declared with a reference to another SUBTYPE must appear after the declaration of the referenced SUBTYPE.

13.2 Translate from CASE declaration

Set the ADL<MAXALC attribute> to TRUE. The ADL<LENGTH attribute> may need to be set to reflect padding. See 13.6, "Data Alignment" on page 270 for details.

Unclassified

13.3 Translate from ARRAY declaration

The ADL < DMNLOW attribute > always takes its default value of zero. The ADL < SKIP attribute > always takes its default value of zero. Padding between elements of an array is handled in C by padding contained in CASE or SEQUENCE. Non-constructor elements never require padding.

13.4 Translate from SUBTYPE statement

C supports SUBTYPE statements. These are equivalent to C's typedef declarations. However, if a SUBTYPE overrides the attributes of another SUBTYPE, C cannot support this except for the following attributes:

TITLE

HELP

NOTE

For any other attribute override, the C declaration translator shall replace the subtype and its attribute overrides with the base ADL type and attributes.

If the object of the SUBTYPE is another SUBTYPE with no attribute overrides other than those listed above, then it shall be copied along with its attributes to the output ADLDCLSPC.

If the object of the SUBTYPE is a base ADL type or was changed into a base ADL type because of unsupported attribute overrides, then the ADL type and attributes shall be translated into C as specified by this chapter.

13.5 Translate from SUBTYPE instances

C supports SUBTYPE instances. These are equivalent to C's typedef definitions. However, if a SUBTYPE instance has attribute overrides, C cannot support this except for the following attribute:

TITLE

HELP

NOTE

For any other attribute override, the C declaration translator shall replace the subtype and its attribute overrides with the base ADL type and attributes.

If the SUBTYPE instance does not have any attribute overrides other than those listed above, then it shall be copied along with its attributes to the output ADLDCLSPC.

If the SUBTYPE instance was changed into a base ADL type because of unsupported attribute overrides, then the ADL type and attributes shall be translated into C as specified by this chapter.

13.5.1.1 Exceptions

0105E A subtype instance of a bit field must be contained in a SEQUENCE or CASE.

Explanation: A SUBTYPE was translated to a C bit field. The only valid instances of this SUBTYPE are inside of a CASE or SEQUENCE.

Recovery: Change the SUBTYPE to an byte sized char or int, move the instance into a SEQUENCE or CASE, or replace the SUBTYPE instance with a definition of a byte sized char or int.

13.6 Data Alignment

The Translate Declaration Space function must determine the alignment requirements for data and from this the padding requirements for CASE and SEQUENCE. To determine alignment and padding requirements see 6.2, "Data Alignment" on page 104. The requirements and procedures for setting padding in Parse Source Text are the same as in Translate Declaration Space.

Padding is set in SEQUENCE by adding SKIP statements ahead of data to position it on the correct alignment boundary. A SKIP statement is also added at the end of the SEQUENCE to make it end on the same boundary that it began. CASE padding is added by setting LENGTH to be the size of the largest case element plus the amount of padding required after this element.

Translate Declaration Space must also set FLDSIZ. See ADL encodings for a description of how to calculate FLDSIZ.

13.7 Translation of Reference Fields

The following procedures show the translation of ADL <BINARY>, ADL <PACKED>, and ADL <ZONED> fields without regard to whether the translated field is referenced by an ADL <LENGTH attribute> or ADL <DMNSIZE attribute>. However, declaration translator implementations must consider this and if necessary alter the translation.

The following are the rules for translating reference fields to the C representation domain:

Translation Rules:

1. If a field is referenced by an ADL <LENGTH attribute> or an ADL <DMNSIZE attribute>, then it shall be translated to the smallest BINARY field which can hold the largest possible source reference field value. The largest possible reference field for C is the following:

Unclassified

```
BINARY
SCALE(0)
SIGNED(FALSE)
LENGTH(32)
PRECISION(32)
COMPLEX(FALSE)
CONSTRAINED(TRUE)
FIT(EXACT)
```

The CONSTRAINED(TRUE) and FIX(EXACT) insure that an error will be signaled at conversion time if the result of converting the source reference field is too large to be represented exactly within the target reference field.

2. If the UNITLEN for the field making the refernce to this field is UNITLEN(1) and if the largest integer value which the source field can represent is greater than (2**32)-1, then the following warning shall be issued by the translate procedure:

`0106W Fixed-point overflow possible at conversion time.`

13.7.1.1 Exceptions

0106W Fixed-point overflow possible at conversion time.

Explanation: The source reference field is larger than the target reference field. If the source field contains a value which when converted is larger than the target reference field can accept, then a fixed-point overflow error is signaled at conversion time. A fixed-point constraint violation and a fixed-point fit violation may also be signaled at conversion time.

Unclassified

13.8 Translate from ADL<ASIS>

See also A.1, "Test Translate ASIS for S/370 on 08/15/91 at 13:35:52" on page 353.

13.8.1 ASIS CCCCDE3T A1 5/08/92 16:13:28

```
/*-------------------------------------------------------------------------*/
/* REXX PROCEDURE: ASIS        DATE: 08/15/91                              */
/* AUTHOR: Kenneth M. Sissors                                              */
/* FUNCTION: Map ADL<ASIS> to the C representation domain.                 */
/* INPUT:                                                                  */
/*    in.        - input ADLDCLSPC data                                    */
/*    status.    - status information                                      */
/* OUTPUT:                                                                 */
/*    out.       - output ADLDCLSPC data                                   */
/* VARIABLES:                                                              */
/*    none       -                                                         */
/* Initialization Section                                                  */
/*-------------------------------------------------------------------------*/
ASIS     : procedure expose in. out. status.
out.type = in.type
out.UNITLEN = in.UNITLEN
out.term = '<string data definition>'
SELECT
  WHEN (in.LENGTH = 'ADL<qualified identifier>') THEN
    DO
      out.LENGTH = in.LENGTH
      IF (in.UNITLEN = 1) THEN
          out.MAXLEN = ceil(in.MAXLEN/8)*8  /* make multiple of 8 bits */
      ELSE
          out.MAXLEN = in.MAXLEN
      out.MAXALC = default(TRUE)
    END
  WHEN (in.LENGTH = '*') THEN
      IF (in.UNITLEN = 1) THEN
          out.LENGTH = ceil(in.MAXLEN/8)*8  /* make multiple of 8 bits */
      ELSE
          out.LENGTH = in.MAXLEN
  WHEN (in.UNITLEN = 1) THEN
      out.LENGTH = ceil(in.LENGTH/8)*8  /* make multiple of 8 bits */
  OTHERWISE
      out.LENGTH = in.LENGTH
END
/* Termination Section                                                     */
return 0
/* END PROCEDURE: ASIS                                                     */
```

13.8.2 Exceptions

1. None

13.9 Translate from ADL<BINARY>

See also A.2, "Test Translate BINARY for OS/2 on 09/10/91 at 16:09:12" on page 355.

13.9.1 BINARY CCCCDE2T * 9/10/91 16:08:32

```
/*------------------------------------------------------------------------*/
/* REXX PROCEDURE: BINARY       DATE: 09/10/91                            */
/* AUTHOR: Kenneth M. Sissors                                             */
/* FUNCTION: Translate ADL<BINARY> to IBM OS/2 C domain.                  */
/* INPUT:                                                                 */
/*    in.        - access to in. stem values                              */
/*    status.    - input status values                                    */
/* OUTPUT:                                                                */
/*    out.       - new values for output node                             */
/* VARIABLES:                                                             */
/*    effective_precision - status.max_precision taking into account      */
/*       trailing zeros when SCALE < 0                                    */
/* Initialization Section                                                 */
/*------------------------------------------------------------------------*/
BINARY : procedure expose in. out. status.
ec = 0
out.FIT          = default(TRUNCATE)
out.BYTRVS       = default(TRUE)
/*------------------------------------------------------------------------*/
/* REXX INLINE PROCEDURE: MAXCPREC     DATE: 06/02/91                     */
/* FUNCTION: Based on SIGNED set maximum precisions for 8, 16, and 32 bit int*/
/* Initialization Section                                                 */
/*------------------------------------------------------------------------*/
MAXCPREC :
IF (in.SIGNED = TRUE) THEN
  DO
    max8prec  = 7                /* maximum precision for signed char         */
    max16prec = 15               /* maximum precision for signed short int    */
    max32prec = 31               /* maximum precision for signed long int     */
  END
ELSE
  DO
    max8prec  = 8                /* maximum precision for unsigned char       */
    max16prec = 16               /* maximum precision for unsigned short int  */
    max32prec = 32               /* maximum precision for unsigned long int   */
  END
/* Termination Section                                               */
/* END PROCEDURE: MAXCPREC                                           */
effective_precision = status.max_precision - in.SCALE
SELECT
  WHEN (in.COMPLEX = TRUE) THEN
      call COMPLEX               /* call COMPLEX to map COMPLEX fields        */
  WHEN (in.RADIX = 10) THEN
      call DECIOS2               /* call DECIOS2 to map decimal ranged fields */
  OTHERWISE
      out.COMPLEX = default(FALSE)
      out.RADIX   = default(2)
      SELECT
```

Unclassified

```
WHEN (in.SCALE > 0) THEN
 ┌DO
 │ out.type    = FLOAT2          /* fractional values so change to float      */
 │ /*---------------------------------------------------------------------------*/
 │ /* Translate SCALE > 0 BINARY to FLOAT2                                      */
 │ /*                                                                          */
 │ /*   Worst case exponent required for SCALE=127 and PRECISION=64,and only    */
 │ /*   significant bit is the least significant bit.  Binary point must be     */
 │ /*   shifted right to normalize the number (decreases exponent).             */
 │ /*                                                                          */
 │ /*   Number of binary digits = SCALE  (this may add trailing zeros).         */
 │ /*   Maximum right shift of binary point = SCALE                             */
 │ /*   Worst case binary exponent = -127                                       */
 │ /*   This is within the FLOAT2 exponent range for double                     */
 │ /*   2**-1022 <= |x| <= 1.999...*2**1023                                     */
 │ /*                                                                          */
 │ /*   Therefore can translate based only on PRECISION, except for the         */
 │ /*   single FLOAT2 which has a minimum exponent of -126 = SCALE(126).        */
 │ /*---------------------------------------------------------------------------*/
 │┌SELECT
 ││  WHEN (status.max_precision <= 24 & in.SCALE <= 126) THEN
 ││   ┌DO
 ││   │ out.term = '<float data definition>'
 ││   │ out.LENGTH = 32             /* float, 24 bits binary precision          */
 ││   └END
 ││  WHEN (status.max_precision <= 53) THEN
 ││   ┌DO
 ││   │ out.term = '<double data definition>'
 ││   │ out.LENGTH = 64             /* double, 53 bits binary precision         */
 ││   └END
 ││  OTHERWISE
 ││     out.term = '<long double data definition>'
 ││     out.LENGTH = 128            /* long double, 64 bits binary precision    */
 │└END
 └END
WHEN (status.max_precision - in.SCALE > max32prec) THEN
 ┌DO
 │ out.type = FLOAT2
 │ /*---------------------------------------------------------------------------*/
 │ /* Translate SCALE < 0 BINARY to FLOAT2                                      */
 │ /*                                                                          */
 │ /*   SCALE < 0 indicates number is an integer with trailing binary zeros.    */
 │ /*   If the number of binary digits represented by PRECISION and SCALE is    */
 │ /*   is greater than C's largest integer (31 bits signed, 32 bits unsigned)  */
 │ /*   then must map to a float.                                               */
 │ /*                                                                          */
 │ /*   Worst case SCALE=-128, PRECSION=64, most significant bit is a one.      */
 │ /*   Must shift binary point to left of this bit to normalize (increases     */
 │ /*   exponent).                                                              */
 │ /*   Binary exponent = 192 - 1 = 191                                         */
 │ /*   This is within the double FLOAT2 exponent range :                       */
 │ /*   2**-1022 <= |x| <= 1.999...*2**1023                                     */
 │ /*                                                                          */
 │ /*   Therefore can translate based only on PRECISION.                        */
 │ /*---------------------------------------------------------------------------*/
 │ IF (status.max_precision <= 53) THEN
 │  ┌DO
 │  │ out.term = '<double data definition>'
 │  │ out.LENGTH = 64             /* double, 53 bits binary precision          */
```

Unclassified

```
      END
    ELSE
      DO
        out.term = '<long double data definition>'
        out.LENGTH = 128              /* long double, 64 bits binary precision      */
      END
  END
OTHERWISE
    /*-----------------------------------------------------------------------*/
    /* Translate SCALE <= 0 BINARY to C int                                  */
    /*                                                                       */
    /*   Number is small enough to be represented as a C integer or bit-field. */
    /*-----------------------------------------------------------------------*/
    out.term = '<int data definition>'
    out.type        = BINARY
    out.SCALE       = default(0)
    out.SIGNED      = in.SIGNED
    out.CONSTRAINED = default(FALSE)
    SELECT
      WHEN (effective_precision = max8prec) THEN
        DO
          out.PRECISION = effective_precision
          out.term = '<char data definition>'  /* annotated with BINARY              */
          out.LENGTH = 8
        END
      WHEN (effective_precision = max16prec) THEN
        DO
          out.PRECISION = effective_precision
          out.LENGTH = 16
        END
      WHEN (effective_precision = max32prec) THEN
        DO
          out.PRECISION = effective_precision
          out.LENGTH = default(32)
        END
      WHEN (find('SEQUENCE CASE SUBTYPE',status.containing) = 0) THEN
        DO
          /*-----------------------------------------------------------------------*/
          /* Can't have bit-fields in array or outside struct or union             */
          /* Must make fixed binary a multiple of a byte to map to C int           */
          /*-----------------------------------------------------------------------*/
          out.LENGTH = ceil(effective_precision/8)*8
          IF (out.LENGTH = 8) THEN
              out.term = '<char data definition>'  /* annotated with BINARY              */
          IF (in.SIGNED = FALSE) THEN
              out.PRECISION = out.LENGTH
          ELSE
            DO
              /* Must leave 1 bit for sign, so adjust precision                      */
              out.PRECISION = out.LENGTH - 1
            END
        END
      OTHERWISE
          out.PRECISION = effective_precision
          /*-----------------------------------------------------------------------*/
          /* Translate to a C bit-field (signed or unsigned)                       */
          /*-----------------------------------------------------------------------*/
          out.term = '<bit-field data definition>'
          IF (in.SIGNED = FALSE) THEN
```

```
|     |     |         out.LENGTH = out.PRECISION
|     |     |     ELSE
|     |     |         out.LENGTH = out.PRECISION + 1
|     |     └END
|     └END
└END
/* Termination Section                                                     */
/*------------------------------------------------------------------------*/
/* REXX PROCEDURE: CHKDEFLT     DATE: 09/10/91                            */
/* FUNCTION: Check for type domain default values.  Attributes which have */
/*    the same value as a default are not stored in the ADLDCLSPC.        */
/* Initialization Section                                                  */
/*------------------------------------------------------------------------*/
CHKDEFLT :
IF (out.SIGNED = TRUE) THEN
    out.SIGNED = default(TRUE)     /* C type domain default                    */
IF (out.PRECISION = 31) THEN
    out.PRECISION = default(31)    /* C type domain default                    */
IF (out.LENGTH = 32) THEN
    out.LENGTH = default(32)       /* C type domain default                    */
/* Termination Section                                                     */
/* END PROCEDURE: CHKDEFLT                                                 */
return ec                     /* return to caller                          */
/* END PROCEDURE: BINARY                                                   */
```

13.9.2 Exceptions

1. None

Unclassified

See also A.3, "Test Translate BINARY for S/370 on 09/10/91 at 15:48:56" on page 360.

13.9.3 BINARY CCCCDE3T A1 5/08/92 16:15:09

```
/*------------------------------------------------------------------------*/
/* REXX PROCEDURE: BINARY       DATE: 08/15/91                            */
/* AUTHOR: Kenneth M. Sissors                                             */
/* FUNCTION: Translate ADL<BINARY> to C/370 domain.                       */
/* INPUT:                                                                 */
/*    in.       - access to in. stem values                               */
/*    status.   - input status values                                     */
/* OUTPUT:                                                                */
/*    out.      - new values for output node                              */
/* VARIABLES:                                                             */
/*    effective_precision - status.max_precision taking into account      */
/*        trailing zeros when SCALE < 0                                   */
/* Initialization Section                                                 */
/*------------------------------------------------------------------------*/
BINARY : procedure expose in. out. status.
out.FIT         = default(TRUNCATE)
out.BYTRVS      = default(FALSE)
```

Unclassified

```
/*----------------------------------------------------------------------*/
/* REXX INLINE PROCEDURE: MAXCPREC     DATE: 06/02/91                  */
/* FUNCTION: Based on SIGNED set maximum precisions for 8, 16, and 32 bit int*/
/* Initialization Section                                               */
/*----------------------------------------------------------------------*/
MAXCPREC :
IF (in.SIGNED = TRUE) THEN
  DO
    max8prec  = 7                /* maximum precision for signed char        */
    max16prec = 15               /* maximum precision for signed short int   */
    max32prec = 31               /* maximum precision for signed long int    */
  END
ELSE
  DO
    max8prec  = 8                /* maximum precision for unsigned char      */
    max16prec = 16               /* maximum precision for unsigned short int */
    max32prec = 32               /* maximum precision for unsigned long int  */
  END
/* Termination Section                                                  */
/* END PROCEDURE: MAXCPREC                                              */
effective_precision = status.max_precision - in.SCALE
SELECT
  WHEN (in.COMPLEX = TRUE) THEN
      call COMPLEX               /* call COMPLEX to map COMPLEX fields         */
  WHEN (in.RADIX = 10) THEN
      call DECI370               /* call DECI370 to map decimal ranged fields  */
  OTHERWISE
      out.COMPLEX = default(FALSE)
      out.RADIX   = default(2)
      SELECT
        WHEN (in.SCALE > 0) THEN
          DO
            out.type    = FLOAT16       /* fractional values so change to float     */
            /*------------------------------------------------------------------*/
            /* Translate SCALE > 0 BINARY to FLOAT16.                           */
            /*                                                                  */
            /*   Worst case exponent required for SCALE=127 and PRECISION=64,and only  */
            /*   significant bit is the least significant bit.  Binary point must be   */
            /*   shifted right to normalize the number (decreases exponent).    */
            /*                                                                  */
            /*   Number of hex digits = ceil(SCALE)/4  (this may add trailing zeros).  */
            /*   Maximum right shift of binary point = (ceil(SCALE/4)-1)        */
            /*   Worst case hexadecimal exponent = -(ceil(127/4)-1) = -31       */
            /*   This is within the FLOAT16 exponent range : 16**-65 <= |x| <= 16**63  */
            /*                                                                  */
            /*   Therefore can translate based only on PRECISION.               */
            /*------------------------------------------------------------------*/
            SELECT
              WHEN (status.max_precision <= 24) THEN
                DO
                  out.term = '<float data definition>'
                  out.LENGTH = default(32)       /* float, 6 hex digits precision      */
                END
              WHEN (status.max_precision <= 56) THEN
                DO
                  out.term = '<double data definition>'
                  out.LENGTH = 64                /* double, 14 hex digits precision    */
                END
              OTHERWISE
```

Unclassified

```
        out.term = '<long double data definition>'
        out.LENGTH = 128              /* long double, 28 hex digits precision       */
      END
    END
  WHEN (status.max_precision - in.SCALE > max32prec) THEN
    DO
      out.type = FLOAT16          /* too big for int                          */
      /*----------------------------------------------------------------------*/
      /* Translate SCALE < 0 BINARY to FLOAT16.                               */
      /*                                                                      */
      /*   SCALE < 0 indicates number is an integer with trailing binary zeros.  */
      /*   If the number of binary digits represented by PRECISION and SCALE is  */
      /*   is greater than C's largest integer (31 bits signed, 32 bits unsigned) */
      /*   then must map to a float.                                          */
      /*                                                                      */
      /*   Worst case SCALE=-128, PRECSION=64, most significant bit is a one.  */
      /*   Must shift binary point to left of this bit to normalize (increases  */
      /*   exponent). Take the number in hex (may add leading zeros).         */
      /*   Hexadecimal exponent = ceil(192/4) = 48.                            */
      /*   This is within the FLOAT16 exponent range : 16**-65 <= |x| <= 16**63  */
      /*                                                                      */
      /*   Therefore can translate based only on PRECISION.                   */
      /*----------------------------------------------------------------------*/
      SELECT
        WHEN (status.max_precision <= 24) THEN
          DO
            out.term = '<float data definition>'
            out.LENGTH = default(32)      /* float, 6 hex digits                   */
          END
        WHEN (status.max_precision <= 56) THEN
          DO
            out.term = '<double data definition>'
            out.LENGTH = 64               /* double, 14 hex digits                 */
          END
        OTHERWISE
            out.term = '<long double data definition>'
            out.LENGTH = 128              /* long double, 28 hex digits            */
      END
    END
  OTHERWISE
      /*----------------------------------------------------------------------*/
      /* Translate SCALE <= 0 BINARY to C int                                 */
      /*                                                                      */
      /*   Number is small enough to be represented as a C integer or bit-field. */
      /*----------------------------------------------------------------------*/
      out.term = '<int data definition>'
      out.type        = BINARY
      out.SCALE       = default(0)
      out.SIGNED      = in.SIGNED
      out.CONSTRAINED = default(FALSE)
      SELECT
        WHEN (effective_precision = max8prec) THEN
          DO
            out.PRECISION = effective_precision
            out.term = '<char data definition>'  /* annotated with BINARY          */
            out.LENGTH = 8
          END
        WHEN (effective_precision = max16prec) THEN
          DO
```

```
                out.PRECISION = effective_precision
                out.LENGTH = 16
              END
            WHEN (effective_precision = max32prec) THEN
              DO
                out.PRECISION = effective_precision
                out.LENGTH = default(32)
              END
            WHEN (find('SEQUENCE CASE SUBTYPE',status.containing) = 0) THEN
              DO
                /*-------------------------------------------------------------------*/
                /* Can't have bit-fields in array or outside struct or union         */
                /* Must make fixed binary a multiple of a byte to map to C int       */
                /*-------------------------------------------------------------------*/
                out.LENGTH = ceil(effective_precision/8)*8
                IF (out.LENGTH = 8) THEN
                   out.term = '<char data definition>'  /* annotated with BINARY           */
                IF (in.SIGNED = FALSE) THEN
                   out.PRECISION = out.LENGTH
                ELSE
                  DO
                   /* Must leave 1 bit for sign, so adjust precision                    */
                   out.PRECISION = out.LENGTH - 1
                  END
              END
            OTHERWISE
                out.PRECISION = effective_precision
                /*-------------------------------------------------------------------*/
                /* Translate to a C bit-field (signed or unsigned)                   */
                /*-------------------------------------------------------------------*/
                out.term = '<bit-field data definition>'
                IF (in.SIGNED = FALSE) THEN
                   out.LENGTH = out.PRECISION
                ELSE
                   out.LENGTH = out.PRECISION + 1
          END
      END
END
/* Termination Section                                                   */
/*-----------------------------------------------------------------------*/
/* REXX PROCEDURE: CHKDEFLT     DATE: 05/08/92                           */
/* FUNCTION: Check for representation domain default values.  Attributes */
/*    which have the same value as a default are not stored in the ADLDCLSPC.*/
/* Initialization Section                                                */
/*-----------------------------------------------------------------------*/
CHKDEFLT :
IF (out.SIGNED = TRUE) THEN
    out.SIGNED = default(TRUE)      /* C representation domain default        */
IF (out.PRECISION = 31) THEN
    out.PRECISION = default(31)     /* C representation domain default        */
/* Termination Section                                                   */
/* END PROCEDURE: CHKDEFLT                                               */
return 0                        /* return to caller                      */
/* END PROCEDURE: BINARY                                                 */
```

13.9.4 Exceptions

1. None

Unclassified

13.10 Translate from ADL<BIT>

See also A.4, "Test Translate BIT for S/370 on 08/15/91 at 15:03:12" on page 366.

13.10.1 BIT CCCCDE3T A1 5/08/92 16:13:30

```
/*--------------------------------------------------------------------------*/
/* REXX PROCEDURE: BIT          DATE: 08/15/91                              */
/* AUTHOR: Kenneth M. Sissors                                               */
/* FUNCTION: Map ADL<BIT> to the C representation domain.                   */
/* INPUT:                                                                   */
/*    in.        - input ADLDCLSPC data                                     */
/*    status.    - status information                                       */
/* OUTPUT:                                                                  */
/*    out.       - output ADLDCLSPC data                                    */
/* VARIABLES:                                                               */
/*    none       -                                                          */
/* Initialization Section                                                   */
/*--------------------------------------------------------------------------*/
BIT      : procedure expose in. out. status.
out.type = ASIS
out.term = '<string data definition>'
SELECT
  WHEN (in.LENGTH = 'ADL<qualified identifier>') THEN
    DO
      out.LENGTH = in.LENGTH
      out.MAXLEN = ceil(in.MAXLEN/8)*8  /* make multiple of 8 bits          */
      out.MAXALC = default(TRUE)
      out.UNITLEN = 1
    END
  WHEN (in.LENGTH = '*') THEN
    DO
      out.LENGTH = ceil(in.MAXLEN/8)    /* switch to bytes                  */
      out.UNITLEN = 8
    END
  WHEN (in.LENGTH // 8 = 0) THEN
    DO
      out.LENGTH = in.LENGTH/8          /* switch to bytes                  */
      out.UNITLEN = 1
    END
  OTHERWISE
      out.LENGTH = ceil(in.LENGTH/8)    /* switch to bytes                  */
      out.UNITLEN = 8
END
/* Termination Section                                                      */
return 0
/* END PROCEDURE: BIT                                                       */
```

13.10.2 Exceptions

1. None

13.11 Translate from ADL<BITPRE>

See also A.5, "Test Translate BITPRE for S/370 on 09/04/91 at 16:23:35" on page 368.

13.11.1 BITPRE CCCCDE3T A1 5/08/92 16:13:21

```
/*--------------------------------------------------------------------------*/
/* REXX PROCEDURE: BITPRE        DATE: 12/15/91                             */
/* AUTHOR: Kenneth M. Sissors                                               */
/* FUNCTION: Map ADL<BITPRE> to the C type domain.                          */
/* INPUT:                                                                   */
/*     in.        - input ADLDCLSPC data                                    */
/*     status.    - status information                                      */
/* OUTPUT:                                                                  */
/*     out.       - output ADLDCLSPC data                                   */
/* VARIABLES:                                                               */
/*     none       -                                                         */
/* Initialization Section                                                   */
/*--------------------------------------------------------------------------*/
BITPRE   : procedure expose in. out. status.
/********************************************************************       */
/* Create length reference field for the BITPRE and make up a name.         */
/********************************************************************       */
out.1.name = create_len_ref_name(in.name,'_')
out.1.type = BINARY
out.1.term = '<int data definition>'
out.1.PRECISION = in.PRELEN - 1  /* prefix field is always signed           */
out.1.LENGTH = in.PRELEN
out.1.SCALE = default(0)
out.1.RADIX = default(2)
out.1.COMPLEX = default(FALSE)
IF (status.system = 'OS/2') THEN
    out.1.BYTRVS = default(TRUE)
ELSE
    out.1.BYTRVS = default(FALSE)
out.1.SIGNED = default(TRUE)
out.1.FIT = default(TRUNCATE)
out.1.CONSTRAINED = default(FALSE)
/*--------------------------------------------------------------------------*/
/* REXX INLINE PROCEDURE: PRCDEFLT     DATE: 09/04/91                       */
/* Initialization Section                                                   */
/*--------------------------------------------------------------------------*/
IF (out.1.PRECISION = 31) THEN
    out.1.PRECISION = default(31)
/* Termination Section                                                      */
/* END PROCEDURE: PRCDEFLT                                                  */
/********************************************************************       */
/* Map the BITPRE to an ASIS with a length reference to the above field     */
/********************************************************************       */
out.2.name = in.name
out.2.type = ASIS
out.2.term = '<string data definition>'
```

```
out.2.LENGTH = out.1.name
out.2.MAXLEN = ceil(in.MAXLEN/8)*8
out.2.UNITLEN = 1
out.2.MAXALC = default(TRUE)
/* Termination Section                                          */
return 0
/* END PROCEDURE: BITPRE                                        */
```

13.11.2 Exceptions

1. None

Unclassified

13.12 Translate from ADL<BOOLEAN>

See also A.6, "Test Translate BOOLEAN for S/370 on 08/08/91 at 10:25:51" on page 369.

13.12.1 BOOLEAN CCCCDE3T A1 5/08/92 16:12:36

```
/*-----------------------------------------------------------------------*/
/* REXX PROCEDURE: BOOLEAN      DATE: 08/08/91                           */
/* AUTHOR: Kenneth M. Sissors                                            */
/* FUNCTION: Translate ADL<BOOLEAN> to the C representation domain.      */
/*   In C source this will be a two valued enumeration annotated with    */
/*   ADL BOOLEAN.                                                        */
/* INPUT:                                                                */
/*   in.        - input ADLDCLSPC data                                   */
/*   status.    - status information                                     */
/* OUTPUT:                                                               */
/*   out.       - output ADLDCLSPC data                                  */
/* Initialization Section                                                */
/*-----------------------------------------------------------------------*/
BOOLEAN  : procedure expose in. out. status.
out.1.name = 'boolean_t'
out.1.type = SUBTYPE OF BOOLEAN
out.1.term = '<boolean_t data declaration>'
out.1.LENGTH = default(8)
out.1.BLNENC = default(LSTBIT)
out.1.BYTRVS = default(FALSE)
out.2.name = in.name
out.2.type = 'boolean_t'
out.2.term = '<boolean_t data definition>'
/* Termination Section                                                   */
return 0                          /* return to caller                    */
/* END PROCEDURE: BOOLEAN                                                */
```

13.12.2 Exceptions

1. None

13.13 Translate from ADL<CHAR>

See also A.8, "Test Translate CHAR for S/370 on 08/15/91 at 17:39:09" on page 374.

13.13.1 CHAR CCCCDE3T A1     5/08/92 16:13:24

```
/*--------------------------------------------------------------------------*/
/* REXX PROCEDURE: CHAR        DATE: 08/15/91                               */
/* AUTHOR: Kenneth M. Sissors                                               */
/* FUNCTION: Translate ADL<CHAR> to C representation domain.                */
/* Initialization Section                                                   */
/*--------------------------------------------------------------------------*/
CHAR:        procedure expose in. out. status.
```

```
/*-------------------------------------------------------------------------*/
/* INLINE REXX PROCEDURE: CHARLIST     DATE: 07/02/91                      */
/* AUTHOR: Kenneth M. Sissorss                                             */
/* FUNCTION: Check if LIST option specified and set variable for MAXALC.   */
/* Initialization Section                                                  */
/*-------------------------------------------------------------------------*/
CHARLIST:
IF (pos('LIST',status.options)) THEN
    maxalc_value = 'FALSE'         /* in LIST, logic reads MAXLAC(FALSE) chars.  */
ELSE
    maxalc_value = 'TRUE'          /* in constructors, MAXALC must be TRUE.      */
/* Termination Section                                                     */
/* END PROCEDURE: CHARLIST                                                 */
IF (in.LENGTH = '*') THEN
  DO
    out.type = CHARSFX             /* string is variable but no length field     */
    out.term = '<string data definition>'
    out.UNITLEN = in.UNITLEN
    out.MAXALC = default(TRUE)
    IF (in.UNITLEN = 8) THEN
        out.SFXENC = default(x'00')
    ELSE
        out.SFXENC = x'0000'
    out.MAXLEN = in.MAXLEN
    out.MAXALC = maxalc_value
  END
ELSE
  DO
    out.type = CHAR
    out.term = '<char data definition>'
    out.JUSTIFY = default(LEFT)
    out.UNITLEN = in.UNITLEN
    SELECT
      WHEN (in.LENGTH = 'ADL<qualified identifier>') THEN
        DO
          out.LENGTH = in.LENGTH
          out.MAXLEN = in.MAXLEN
          out.MAXALC = maxalc_value
        END
      WHEN (in.LOW = 'ADL<qualified identifier>') THEN
        DO
          out.LENGTH = in.LOW
          out.MAXLEN = in.MAXLEN
          out.MAXALC = maxalc_value
        END
      WHEN (in.HIGH = 'ADL<qualified identifier>') THEN
        DO
          out.LENGTH = in.HIGH
          out.MAXLEN = in.MAXLEN
          out.MAXALC = maxalc_value
        END
      WHEN (in.LENGTH = NIL) THEN
          out.LENGTH = in.HIGH - in.LOW + 1
      OTHERWISE
          out.LENGTH = in.LENGTH
    END
```

Unclassified

```
 └END
/* Termination Section                                                */
return 0                  /* return to caller                         */
/* END PROCEDURE: CHAR                                                */
```

13.13.2 Exceptions

1. None

Unclassified

13.14 Translate from ADL<CHARPRE>

See also A.9, "Test Translate CHARPRE for S/370 on 09/04/91 at 16:21:45" on page 378.

13.14.1 CHARPRE CCCCDE3T A1 5/08/92 16:12:34

```
/*--------------------------------------------------------------------------*/
/* REXX PROCEDURE: CHARPRE      DATE: 12/15/91                              */
/* AUTHOR: Kenneth M. Sissors                                               */
/* FUNCTION: Map ADL<CHARPRE> to the C representation domain.               */
/* INPUT:                                                                   */
/*    in.       - input ADLDCLSPC data                                      */
/*    status.   - status information                                        */
/* OUTPUT:                                                                  */
/*    out.      - output ADLDCLSPC data                                     */
/* VARIABLES:                                                               */
/*    none      -                                                           */
/* Initialization Section                                                   */
/*--------------------------------------------------------------------------*/
CHARPRE  : procedure expose in. out. status.
/*********************************************************************     */
/* Create length reference field for the CHARPRE and make up a name.       */
/*********************************************************************     */
out.1.name = create_len_ref_name(in.name,'_')
out.1.type = BINARY
out.1.term = '<int data definition>'
out.1.PRECISION = in.PRELEN - 1  /* prefix field is always signed          */
out.1.LENGTH = in.PRELEN
out.1.SCALE = default(0)
out.1.RADIX = default(2)
out.1.COMPLEX = default(FALSE)
IF (status.system = 'OS/2') THEN
    out.1.BYTRVS = default(TRUE)
ELSE
    out.1.BYTRVS = default(FALSE)
out.1.SIGNED = default(TRUE)
out.1.FIT = default(TRUNCATE)
out.1.CONSTRAINED = default(FALSE)
/*--------------------------------------------------------------------------*/
/* REXX INLINE PROCEDURE: PRCDEFLT     DATE: 09/04/91                       */
/* Initialization Section                                                   */
/*--------------------------------------------------------------------------*/
IF (out.1.PRECISION = 31) THEN
    out.1.PRECISION = default(31)
/* Termination Section                                                      */
/* END PROCEDURE: PRCDEFLT                                                  */
/****************************************************************************/
/* Map CHARPRE to a CHAR with a length reference to the above field        */
/****************************************************************************/
out.2.name = in.name
out.2.type = CHAR
out.2.term = '<string data definition>'
```

```
out.2.LENGTH = out.1.name
out.2.UNITLEN = in.UNITLEN
out.2.MAXLEN = in.MAXLEN
out.2.MAXALC = default(TRUE)
/* Termination Section                                              */
return 0
/* END PROCEDURE: CHARPRE                                           */
```

13.14.2 Exceptions

1. None

13.15 Translate from ADL<CHARSFX>

See also A.10, "Test Translate CHARSFX for S/370 on 08/15/91 at 17:45:27" on page 379.

13.15.1 CHARSFX CCCCDE3T A1 5/08/92 16:12:16

```
/*--------------------------------------------------------------------------*/
/* REXX PROCEDURE: CHARSFX      DATE: 08/15/91                              */
/* AUTHOR: Kenneth M. Sissors                                               */
/* FUNCTION: Translate ADL<CHARSFX> to the C representation domain.         */
/* INPUT:                                                                   */
/*    in.       -- input ADLDCLSPC data                                     */
/*    status.   -- status information                                       */
/* OUTPUT:                                                                  */
/*    out.      -- output ADLDCLSPC data                                    */
/* Initialization Section                                                   */
/*--------------------------------------------------------------------------*/
CHARSFX  : procedure expose in. out. status.
out.MAXALC = default(TRUE)
out.MAXLEN = in.MAXLEN
out.CCSID  = in.CCSID
IF (in.UNITLEN = 8) THEN
    out.SFXENC = default(x'00')
ELSE
    out.SFXENC = x'0000'
/* Termination Section                                                      */
return 0                        /* return to caller                         */
/* END PROCEDURE: CHARSFX                                                   */
```

13.15.2 Exceptions

1. None

13.16 Translate from Numerics Types with COMPLEX(TRUE)

See also A.12, "Test Translate COMPLEX for S/370 on 07/31/91 at 13:32:47" on page 381.

13.16.1 COMPLEX CCCCDE3T A1 5/08/92 16:12:17

```
/*--------------------------------------------------------------------------*/
/* REXX PROCEDURE: COMPLEX        DATE: 05/05/92                             */
/* AUTHOR: Kenneth M. Sissors                                                */
/* FUNCTION:                                                                 */
/*   Translate numeric types which have COMPLEX(TRUE) set.                   */
/*   These are translated to an ASIS in the C representation domain.  The C */
/*   declaration translator could be enhanced to translate these to a struct */
/*   of two floats (real and imaginary) or a typedef of this structure.     */
/*   This would give a C domain access to float complex.                     */
/*                                                                           */
/* INPUT:                                                                    */
/*    in.        - input ADLDCLSPC data                                      */
/*    status.    - status data                                               */
/* OUTPUT:                                                                   */
/*    out.       - output ADLDCLSPC data                                     */
/* VARIABLES:                                                                */
/*    none       -                                                           */
/* Initialization Section                                                    */
/*--------------------------------------------------------------------------*/
COMPLEX  : procedure expose in. out. status.
out.type = ASIS
out.LENGTH = in.fldsiz          /* set to size of input field               */
/* Termination Section                                                       */
return 0                        /* return to caller                          */
/* END PROCEDURE: COMPLEX                                                    */
```

13.16.2 Exceptions

1. None

Unclassified

13.17 Translate from attributes for a single dimension

See also A.15, "Test Translate DMNATTR for S/370 on 08/23/91 at 09:49:52" on page 390.

13.17.1 DMNATTR CCCCDE3T A1 5/08/92 16:12:23

```
/*------------------------------------------------------------------------*/
/* REXX PROCEDURE: DMNATTR      DATE: 08/23/91                            */
/* AUTHOR: Kenneth M. Sissors                                             */
/* FUNCTION: Translate ADL<ARRAY> ADL<DMNLST attribute>s for a dimension.  */
/* INPUT:                                                                 */
/*   in.        - input ADLDCLSPC data                                    */
/*   status.    - input ADLDCLSPC status and processing status            */
/* OUTPUT:                                                                */
/*   out.       - output ADLDCLSPC data                                   */
/* Initialization Section                                                 */
/*------------------------------------------------------------------------*/
DMNATTR  : procedure expose in. out. status.
out.DMNLOW = default(1) /* will never have DMNLOW in ADLDCLSPC; defaulted */
/**********************************************************              */
/* The ADL<DMNLOW attribute> for the array defaults to 0.                 */
/* The ADL<MAXALC attribute> is set according to translate                */
/* options or if no option given then to domain defaults.                 */
/**********************************************************              */
SELECT
  WHEN (in.DMNHIGH = 'ADL<qualified identifier>') THEN
    DO
      out.DMNSIZE = in.DMNHIGH
      out.DMNMAX = in.DMNMAX
    END
  WHEN (in.DMNLOW  = 'ADL<qualified identifier>') THEN
    DO
      out.DMNSIZE = in.DMNLOW
      out.DMNMAX = in.DMNMAX
    END
  WHEN (in.DMNSIZE = 'ADL<qualified identifier>') THEN
    DO
      out.DMNSIZE = in.DMNSIZE
      out.DMNMAX = in.DMNMAX
    END
  WHEN (in.DMNSIZE <> '') THEN
      out.DMNSIZE = in.DMNSIZE
  OTHERWISE
      out.DMNSIZE = in.DMNHIGH - in.DMNLOW + 1
END
/* Termination Section                                                    */
return 0                     /* return to caller                          */
/* END PROCEDURE: DMNATTR                                                 */
```

13.17.2 Exceptions

1. None

13.18 Translate from ADL<ENUMERATION>

See also A.16, "Test Translate ENUMERAT for S/370 on 12/15/91 at 18:03:41" on page 392.

13.18.1 ENUMERAT CCCCDE3T A1 5/08/92 16:12:19

```
/*------------------------------------------------------------------------*/
/* REXX PROCEDURE: ENUMERAT     DATE: 12/15/91                            */
/* AUTHOR:                                                                */
/* FUNCTION:                                                              */
/* INPUT:                                                                 */
/*   in.       - input ADLDCLSPC data                                     */
/*   status.   - input ADLDCLSPC status and processing status             */
/* OUTPUT:                                                                */
/*   out.      - output ADLDCLSPC data                                    */
/* Initialization Section                                                 */
/*------------------------------------------------------------------------*/
ENUMERAT : procedure expose in. out. status.
out.type = ENUMERATION
out.term = '<enumeration data definition>'
SELECT
  WHEN (in.LENGTH = 8) THEN
      out.BYTRVS = FALSE
  WHEN (status.system = 'OS/2') THEN
      out.BYTRVS = default(TRUE)
  OTHERWISE
      out.BYTRVS = default(FALSE)
END
out.ENUMERATION_LIST = in.ENUMERATION_LIST
/* Termination Section                                                    */
/*------------------------------------------------------------------------*/
/* REXX INLINE PROCEDURE: ENUMLEN      DATE: 09/03/91                     */
/* Initialization Section                                                 */
/*------------------------------------------------------------------------*/
out.LENGTH = in.LENGTH
IF (status.system = 'S/370') THEN
    out.SIGNED = default(TRUE)
ELSE
    out.SIGNED = in.SIGNED
/* Termination Section                                                    */
/* END PROCEDURE: ENUMLEN                                                 */
return 0                         /* return to caller                      */
/* END PROCEDURE: ENUMERAT                                                */
```

13.18.2 Exceptions

1. None

13.19 Translate from ADL<FLOAT16>

See also A.17, "Test Translate FLOAT16 for S/370 on 09/17/91 at 17:11:36" on page 393.

13.19.1 FLOAT16 CCCCDE3T A1 5/08/92 16:12:25

```
/*--------------------------------------------------------------------------*/
/* REXX PROCEDURE: FLOAT16       DATE: 09/17/91                             */
/* AUTHOR: Kenneth H. Sissors                                               */
/* FUNCTION: Translate ADL<FLOAT16> to C representation domain              */
/* INPUT:                                                                   */
/*    in.       - input ADLDCLSPC data                                      */
/*    status.   - status information                                        */
/* OUTPUT:                                                                  */
/*    out.      - output ADLDCLSPC data                                     */
/* Initialization Section                                                   */
/*--------------------------------------------------------------------------*/
FLOAT16  : procedure expose in. out. status.
ec = 0
IF (status.system = 'S/370') THEN
 DO
   out.type = FLOAT16
   SELECT
     WHEN (in.LENGTH = 32) THEN
       DO
         out.term = '<float data definition>'
         out.LENGTH = default(32)
       END
     WHEN (in.LENGTH = 64) THEN
       DO
         out.term = '<double data definition>'
         out.LENGTH = 64
       END
     OTHERWISE
         out.term = '<long double data definition>'
         out.LENGTH = 128
   END
 END
ELSE
 DO
   out.type = FLOAT2
   out.BYTRVS = default(TRUE)
   SELECT
     WHEN (in.LENGTH = 32) THEN
       DO
         out.term = '<double data definition>'
         out.LENGTH = 64
       END
     WHEN (in.LENGTH = 64) THEN
       DO
         out.term = '<double data definition>'
         out.LENGTH = 64
```

ᴗnc.assitec

```
    |  |  |  | ec = ERROR(W,'0107W  Possible loss of precision in conversion of FLOAT16 to')
    |  |  | └END
    |  |  OTHERWISE
    |  |      out.term = '<long double data definition>'
    |  |      out.LENGTH = 128
    |  |      ec = ERROR(W,'0107W  Possible loss of precision in conversion of FLOAT16 to')
    |  └END
    └END
/* Termination Section                                                      */
out.COMPLEX = default(FALSE)
out.FIT = default(TRUNCATE)
out.RADIX = default(2)
return ec                        /* return to caller                        */
/* END PROCEDURE: FLOAT16                                                   */
```

13.19.2 Exceptions

0107W Possible loss of precision in conversion of FLOAT16 to FLOAT2.

Explanation: The PRECISION of the FLOAT16 source field is greater than the PRECISION of the FLOAT2 target field. Some loss of least significant digits is possible at conversion time.

Unclassified

13.20 Translate from ADL<FLOAT2>

See also A.18, "Test Translate FLOAT2 for S/370 on 12/15/91 at 18:05:35" on page 395.

13.20.1 FLOAT2 CCCCDE3T A1 5/08/92 16:11:46

```
/*--------------------------------------------------------------------------*/
/* REXX PROCEDURE: FLOAT2       DATE: 12/15/91                              */
/* AUTHOR: Kenneth M. Sissors                                               */
/* FUNCTION: Translate ADL<FLOAT2> to C representation domain.              */
/* INPUT:                                                                   */
/*    in.        - input ADLDCLSPC data                                     */
/*    status.    - status information                                       */
/* OUTPUT:                                                                  */
/*    out.       - output ADLDCLSPC data                                    */
/* Initialization Section                                                   */
/*--------------------------------------------------------------------------*/
FLOAT2    : procedure expose in. out. status.
ec = 0
IF (status.system = 'OS/2') THEN
 ┌DO
 │  out.type = FLOAT2
 │  out.BYTRVS = default(TRUE)
 │ ┌SELECT
 │ │ WHEN (in.LENGTH = 32) THEN
 │ │  ┌DO
 │ │  │  out.term = '<float data definition>'
 │ │  │  out.LENGTH = default(32)
 │ │  └END
 │ │ WHEN (in.LENGTH = 64) THEN
 │ │  ┌DO
 │ │  │  out.term = '<double data definition>'
 │ │  │  out.LENGTH = 64
 │ │  └END
 │ │ OTHERWISE
 │ │     out.term = '<long double data definition>'
 │ │     out.LENGTH = 128
 │ └END
 └END
ELSE
 ┌DO
 │  out.type = FLOAT16
 │  IF (in.LENGTH = 32) THEN
 │   ┌DO
 │   │  out.term = '<float data definition>'
 │   │  out.LENGTH = default(32)
 │   │  /* Because of normalization of hex FLOAT may have only 21 bits of precision  */
 │   │  ec = error(W,'0109W  Possible loss of precision in conversion of FLOAT2 to')
 │   └END
 │  ELSE
 │   ┌DO
 │   │  IF (in.LENGTH = 64) THEN
```

```
        DO
          out.term = '<double data definition>'
          out.LENGTH = 64
        END
      ELSE
        DO
          out.term = '<long double data definition>'
          out.LENGTH = 128
        END
      ec = ERROR(W,'0108W  FLOAT2 to FLOAT16 conversion may cause overflow or')
    END
  END
/* Termination Section                                                   */
out.COMPLEX = default(FALSE)
out.RADIX = default(2)
out.FIT = default(TRUNCATE)
return ec                        /* return to caller                     */
/* END PROCEDURE: FLOAT2                                                 */
```

13.20.2 Exceptions

0108W FLOAT2 to FLOAT16 conversion may cause overflow or underflow.

Explanation: The range of exponents for the FLOAT2 source field is larger than the range of exponents for the FLOAT16 target field. Overflow or underflow will occur at conversion time if the result of the conversion is a target exponent which is outside the range of the FLOAT16 target field.

0109W Possible loss of precision in conversion of FLOAT2 to FLOAT16.

Explanation: The PRECISION of the FLOAT2 source field may be greater than the PRECISION of the FLOAT16 target field. Because of normalization of hexadecimal floating point numbers, only 53 bits of PRECISION may be available. Some loss of least significant digits is possible at conversion time.

Unclassified

13.21 Translate from ADL<PACKED>

13.21.1 PACKED CCCCDE3T A1 5/08/92 16:12:13

```
/*-------------------------------------------------------------------------*/
/* REXX PROCEDURE: PACKED        DATE: 08/08/91                            */
/* AUTHOR:  Kenneth M. Sissors                                             */
/* FUNCTION: Translate ADL<PACKED> to C representation domain.             */
/* INPUT:                                                                  */
/*    in.        - input ADLDCLSPC data                                    */
/*    status.    - status informtation                                     */
/* OUTPUT:                                                                 */
/*    out.       - output ADLDCLSPC data                                   */
/* Initialization Section                                                  */
/*-------------------------------------------------------------------------*/
PACKED   : procedure expose in. out. status.
IF (status.system = 'OS/2') THEN
    call DECIOS2                  /* map decimals to OS/2                       */
ELSE
    call DECI370                  /* map decimals to S/370                      */
/* Termination Section                                                     */
return result                 /* return to caller                          */
/* END PROCEDURE: PACKED                                                   */
```

13.21.2 Exceptions

1. None

13.22 Translate from ADL<ZONED>

13.22.1 ZONED CCCCDE3T A1 5/08/92 16:12:08

```
/*--------------------------------------------------------------------------*/
/* REXX PROCEDURE: ZONED        DATE: 08/08/91                              */
/* AUTHOR:  Kenneth M. Sissors                                              */
/* FUNCTION: Translate ADL<ZONED> to C representation domain.               */
/* INPUT:                                                                   */
/*    in.        - input ADLDCLSPC data                                     */
/*    status.    - status information                                       */
/* OUTPUT:                                                                  */
/*    ou.        - output ADLDCLSPC data                                    */
/* Initialization Section                                                   */
/*--------------------------------------------------------------------------*/
ZONED    : procedure expose in. out. status.
IF (if status.system = 'OS/2') THEN
    call DECIOS2                    /* map decimal fields to OS/2               */
ELSE
    call DECI370                    /* map decimal fields to S/370              */
/* Termination Section                                                      */
return result                   /* return to caller                         */
/* END PROCEDURE: ZONED                                                     */
```

13.22.2 Exceptions

1. None

13.23 Translate from RADIX(10) Fixed Point Numerics

See also A.13, "Test Translate DECIOS2 for OS/2 on 09/17/91 at 17:18:20" on page 382.

13.23.1 DECIOS2 CCCCDE2T A1 5/08/92 16:19:00

```
/*------------------------------------------------------------------------*/
/* REXX PROCEDURE: DECIOS2      DATE: 09/17/91                             */
/* AUTHOR:  Kenneth M. Sissors                                             */
/* FUNCTION: Translate decimal fields to IBM OS/2 C representation domain. */
/*   These fields are of type BINARY RADIX(10), PACKED or ZONED.           */
/* INPUT:                                                                  */
/*    in.       - input ADLDCLSPC data                                     */
/*    status.   - status information                                       */
/* OUTPUT:                                                                 */
/*    out.      - output ADLDCLSPC data                                    */
/* Initialization Section                                                  */
/*------------------------------------------------------------------------*/
DECIOS2  : procedure expose in. out. status.
ec = 0
out.FIT        = default(TRUNCATE)
out.BYTRVS     = default(TRUE)
```

Unclassified

```
/*-------------------------------------------------------------------------*/
/* REXX INLINE PROCEDURE: MAXCPREC     DATE: 06/02/91                      */
/* FUNCTION: Based on SIGNED set maximum precisions for 8, 16, and 32 bit int*/
/* Initialization Section                                                  */
/*-------------------------------------------------------------------------*/
MAXCPREC :
IF (in.SIGNED = TRUE) THEN
  DO
    max8prec  = 7                /* maximum precision for signed char         */
    max16prec = 15               /* maximum precision for signed short int    */
    max32prec = 31               /* maximum precision for signed long int     */
  END
ELSE
  DO
    max8prec  = 8                /* maximum precision for unsigned char       */
    max16prec = 16               /* maximum precision for unsigned short int  */
    max32prec = 32               /* maximum precision for unsigned long int   */
  END
/* Termination Section                                                     */
/* END PROCEDURE: MAXCPREC                                                 */
effective_precision = status.max_precision - in.SCALE
IF (in.COMPLEX = TRUE) THEN
    call COMPLEX                 /* call COMPLEX to map COMPLEX fields        */
ELSE
  DO
    out.RADIX = default(2)
    out.COMPLEX = default(FALSE)
    SELECT
      WHEN (in.SCALE > 0) THEN
        DO
          /***********************************************************************/
          /* SCALE > 0                                                           */
          /*                                                                     */
          /* This must be mapped to a FLOAT2.  Exponent required is determined   */
          /* by in.SCALE.  To determine the maximum decimal scale, the scale     */
          /* is compared against the lower limit in the decimal range for        */
          /* FLOAT2 exponents.  The FLOAT2 exponent ranges are approximately:    */
          /*                                                                     */
          /*  10**-37   <= |x| <= 10**39    => SCALE <= 37                       */
          /*  10**-307  <= |x| <= 10**309   => SCALE <= 307                      */
          /*  10**-4931 <= |x| <= 10**4933  => SCALE <= 4931                     */
          /*                                                                     */
          /***********************************************************************/
          out.type = FLOAT2            /* fraction, use float                  */
          SELECT
            WHEN (status.max_precision <= 6 & in.SCALE <= 37) THEN
              DO
                out.term = '<float data definition>'
                out.length = 32
              END
            WHEN (status.max_precision <= 15) THEN
              DO
                out.term = '<double data definition>'
                out.length = 64
              END
            OTHERWISE
```

Unclassified

```
                out.term = '<long double data definition>'
                out.length = 128
                IF (¬(status.max_precision <= 19)) THEN
                    ec = ERROR(W,'0110W  Possible loss of PRECISION : decimal to FLOAT2 conversion.')
            END
        END
      WHEN (effective_precision <= FLOOR(max8prec * log10(2))) THEN
        DO
          /*-----------------------------------------------------------------------*/
          /* Translate SCALE <= 0 BINARY to C int                                  */
          /*                                                                       */
          /*   Number is small enough to be represented as a C integer.            */
          /*-----------------------------------------------------------------------*/
          out.type        = BINARY
          out.SCALE       = default(0)
          out.SIGNED      = in.SIGNED
          out.CONSTRAINED = default(FALSE)
          out.term = '<char data definition>'  /* annotated with BINARY            */
          out.LENGTH = 8
          out.PRECISION = max8prec
        END
      WHEN (effective_precision <= FLOOR(max16prec * log10(2))) THEN
        DO
          /*-----------------------------------------------------------------------*/
          /* Translate SCALE <= 0 BINARY to C int                                  */
          /*                                                                       */
          /*   Number is small enough to be represented as a C integer.            */
          /*-----------------------------------------------------------------------*/
          out.term = '<int data definition>'
          out.type        = BINARY
          out.SCALE       = default(0)
          out.SIGNED      = in.SIGNED
          out.CONSTRAINED = default(FALSE)
          out.LENGTH = 16
          out.PRECISION = max16prec
        END
      WHEN (effective_precision <= FLOOR(max32prec * log10(2))) THEN
        DO
          /*-----------------------------------------------------------------------*/
          /* Translate SCALE <= 0 BINARY to C int                                  */
          /*                                                                       */
          /*   Number is small enough to be represented as a C integer.            */
          /*-----------------------------------------------------------------------*/
          out.term = '<int data definition>'
          out.type        = BINARY
          out.SCALE       = default(0)
          out.SIGNED      = in.SIGNED
          out.CONSTRAINED = default(FALSE)
          out.LENGTH = default(32)
          out.PRECISION = max32prec
        END
      OTHERWISE
          /***********************************************************************/
          /* SCALE < 0                                                           */
          /*                                                                     */
          /* This must be mapped to a FLOAT2.  Exponent required is determined   */
```

```
          /* by effective_precision.  To determine the maximum decimal scale, the      */
          /* effective_precision is compared against the upper limit in the decimal    */
          /* range for FLOAT2 exponents.  The FLOAT2 exponent ranges are               */
          /* approximately:                                                             */
          /*                                                                            */
          /*  10**-37   <= |x| <= 10**39     => abs(SCALE) <= 39                        */
          /*  10**-307  <= |x| <= 10**309    => abs(SCALE) <= 309                       */
          /*  10**-4931 <= |x| <= 10**4933   => abs(SCALE) <= 4933                      */
          /*                                                                            */
          /******************************************************************************/
          out.type = FLOAT2              /* large integer, use float                    */
          SELECT
            WHEN (status.max_precision <= 6 & abs(effective_precision) <= 39) THEN
              DO
                out.term = '<float data definition>'
                out.LENGTH = 32
              END
            WHEN (status.max_precision <= 15) THEN
              DO
                out.term = '<double data definition>'
                out.LENGTH = 64
              END
            OTHERWISE
                out.term = '<long double data definition>'
                out.LENGTH = 128
                IF (¬(status.max_precision <= 19)) THEN
                    ec = ERROR(W,'0110W  Possible loss of PRECISION : decimal to FLOAT2 conversion.')
          END
      END
  END
/* Termination Section                                                        */
/*----------------------------------------------------------------------------*/
/* REXX PROCEDURE: CHKDEFLT     DATE: 09/10/91                                */
/* FUNCTION: Check for representation domain default values.  Attributes     */
/*    which have the same value as a default are not stored in the ADLDCLSPC.*/
/* Initialization Section                                                     */
/*----------------------------------------------------------------------------*/
CHKDEFLT :
IF (out.SIGNED = TRUE) THEN
     out.SIGNED = default(TRUE)      /* C representation domain default         */
IF (out.PRECISION = 31) THEN
     out.PRECISION = default(31)     /* C representation domain default         */
IF (out.LENGTH = 32) THEN
     out.LENGTH = default(32)        /* C representation domain default         */
/* Termination Section                                                        */
/* END PROCEDURE: CHKDEFLT                                                    */
return ec                        /* return to caller                          */
/* END PROCEDURE: DECIOS2                                                     */
```

13.23.2 Exceptions

0110W Possible loss of PRECISION : decimal to FLOAT2 conversion.

Explanation: The decimal field can represent a number with a larger decimal precision than the extended FLOAT2 field.

Unclassified

See also A.14, "Test Translate DECI370 for S/370 on 12/15/91 at 18:32:23" on page 386.

13.23.3 DECI370 CCCCDE3T A1 5/08/92 16:14:58

```
/*---------------------------------------------------------------------------*/
/* REXX PROCEDURE: DECI370      DATE: 12/15/91                               */
/* AUTHOR:  Kenneth M. Sissors                                               */
/* FUNCTION: Translate decimal fields to C/370 representation domain.  These */
/*   are BINARY RADIX(10), PACKED or ZONED.                                  */
/* INPUT:                                                                    */
/*    in.        - input ADLDCLSPC data                                      */
/*    status.    - status information                                        */
/* OUTPUT:                                                                   */
/*    out.       - output ADLDCLSPC data                                     */
/* Initialization Section                                                    */
/*---------------------------------------------------------------------------*/
DECI370  : procedure expose in. out. status.
ec = 0
out.FIT          = default(TRUNCATE)
out.BYTRVS       = default(FALSE)
```

```
/*-----------------------------------------------------------------------*/
/* REXX INLINE PROCEDURE: MAXCPREC     DATE: 06/02/91                    */
/* FUNCTION: Based on SIGNED set maximum precisions for 8, 16, and 32 bit int*/
/* Initialization Section                                                */
/*-----------------------------------------------------------------------*/
MAXCPREC :
IF (in.SIGNED = TRUE) THEN
  DO
    max8prec  = 7                  /* maximum precision for signed char         */
    max16prec = 15                 /* maximum precision for signed short int    */
    max32prec = 31                 /* maximum precision for signed long int     */
  END
ELSE
  DO
    max8prec  = 8                  /* maximum precision for unsigned char       */
    max16prec = 16                 /* maximum precision for unsigned short int  */
    max32prec = 32                 /* maximum precision for unsigned long int   */
  END
/* Termination Section                                                   */
/* END PROCEDURE: MAXCPREC                                               */
effective_precision = status.max_precision - in.SCALE
SELECT
  WHEN (in.COMPLEX = TRUE) THEN
      call COMPLEX                 /* call COMPLEX to map COMPLEX fields        */
  WHEN (in.SCALE > 0) THEN
      IF (in.SCALE > 78) THEN
        DO
          ec = ERROR(E,'0111W  Number is too small to map to FLOAT16 in C/370 representation domain.')
          out.type = ASIS
          out.LENGTH = in.fldsiz/8       /* in.fldsiz is in bits, change to byte       */
          out.UNITLEN = default(8)
          out.term = '<string data definition>'
        END
      ELSE
        DO
          out.RADIX = default(2)
          out.COMPLEX = default(FALSE)
          /**********************************************************************/
          /* SCALE > 0                                                          */
          /*                                                                    */
          /* This must be mapped to a FLOAT16.  Exponent required is determined */
          /* by in.SCALE.  To determine the maximum decimal scale, the scale    */
          /* is compared against the lower limit in the decimal range for FLOAT16 */
          /* exponents.  The FLOAT16 exponent range, for all FLOAT16 sizes is   */
          /* approximately:                                                     */
          /*                                                                    */
          /*     10**-78 <= |x| <= 10**75  => SCALE <= 78                       */
          /*                                                                    */
          /**********************************************************************/
          out.type = FLOAT16             /* fraction, use float                        */
          SELECT
            WHEN (status.max_precision <= 6) THEN
              DO
                out.term = '<float data definition>'
                out.length = 32
              END
```

```
            WHEN (status.max_precision <= 15) THEN
              DO
                out.term = '<double data definition>'
                out.length = 64
              END
            OTHERWISE
                out.term = '<long double data definition>'
                out.length = 128
          END
      END
OTHERWISE
    out.RADIX = default(2)
    out.COMPLEX = default(FALSE)
    SELECT
      WHEN (effective_precision <= FLOOR(max8prec * log10(2))) THEN
        DO
          /*-----------------------------------------------------------------------*/
          /* Translate SCALE <= 0 BINARY to C int                                  */
          /*                                                                       */
          /*   Number is small enough to be represented as a C integer.            */
          /*-----------------------------------------------------------------------*/
          out.type        = BINARY
          out.SCALE       = default(0)
          out.SIGNED      = in.SIGNED
          out.CONSTRAINED = default(FALSE)
          out.term = '<char data definition>'  /* annotated with BINARY          */
          out.LENGTH = 8
          out.PRECISION = max8prec
        END
      WHEN (effective_precision <= FLOOR(max16prec * log10(2))) THEN
        DO
          /*-----------------------------------------------------------------------*/
          /* Translate SCALE <= 0 BINARY to C int                                  */
          /*                                                                       */
          /*   Number is small enough to be represented as a C integer.            */
          /*-----------------------------------------------------------------------*/
          out.term = '<int data definition>'
          out.type        = BINARY
          out.SCALE       = default(0)
          out.SIGNED      = in.SIGNED
          out.CONSTRAINED = default(FALSE)
          out.LENGTH = 16
          out.PRECISION = max16prec
        END
      WHEN (effective_precision <= FLOOR(max32prec * log10(2))) THEN
        DO
          /*-----------------------------------------------------------------------*/
          /* Translate SCALE <= 0 BINARY to C int                                  */
          /*                                                                       */
          /*   Number is small enough to be represented as a C integer.            */
          /*-----------------------------------------------------------------------*/
          out.term = '<int data definition>'
          out.type        = BINARY
          out.SCALE       = default(0)
          out.SIGNED      = in.SIGNED
          out.CONSTRAINED = default(FALSE)
```

Unclassified

```
|       |   |  out.LENGTH = default(32)
|       |   |  out.PRECISION = max32prec
|       |   └END
|       WHEN (effective_precision > 75) THEN
|       |   ┌DO
|       |   |  ec = ERROR(E,'0112W  Number is too large to map to FLOAT16 in C/370 representation domain.')
|       |   |  out.type = ASIS
|       |   |  out.term = '<string data definition>'
|       |   |  out.LENGTH = in.fldsiz
|       |   |  out.UNITLEN = default(8)
|       |   └END
|       OTHERWISE
|       |      /***************************************************************************/
|       |      /* SCALE < 0                                                               */
|       |      /*                                                                         */
|       |      /* This must be mapped to a FLOAT16.  Exponent required is determined     */
|       |      /* by effective_precision.  To determine the maximum decimal scale, the   */
|       |      /* effective_precision is compared against the upper limit in the decimal */
|       |      /* range for FLOAT16 exponents.  The FLOAT16 exponent range, for all      */
|       |      /* FLOAT16 sizes is approximately:                                         */
|       |      /*                                                                         */
|       |      /*     10**-78 <= |x| <= 10**75  => abs(SCALE) <= 75                       */
|       |      /*                                                                         */
|       |      /***************************************************************************/
|       |      out.type = FLOAT16              /* large integer, use float               */
|       |     ┌SELECT
|       |     |  WHEN (status.max_precision <= 6) THEN
|       |     |   ┌DO
|       |     |   |  out.term = '<float data definition>'
|       |     |   |  out.LENGTH = 32
|       |     |   └END
|       |     |  WHEN (status.max_precision <= 15) THEN
|       |     |   ┌DO
|       |     |   |  out.term = '<double data definition>'
|       |     |   |  out.LENGTH = 64
|       |     |   └END
|       |     |  OTHERWISE
|       |     |      out.term = '<long double data definition>'
|       |     |      out.LENGTH = 128
|       |     └END
|       └END
└END
```

one assnee.

```
/* Termination Section                                                      */
/*--------------------------------------------------------------------------*/
/* REXX PROCEDURE: CHKDEFLT     DATE: 05/08/92                              */
/* FUNCTION: Check for representation domain default values.  Attributes    */
/*    which have the same value as a default are not stored in the ADLDCLSPC.*/
/* Initialization Section                                                   */
/*--------------------------------------------------------------------------*/
CHKDEFLT :
IF (out.SIGNED = TRUE) THEN
    out.SIGNED = default(TRUE)     /* C representation domain default          */
IF (out.PRECISION = 31) THEN
    out.PRECISION = default(31)    /* C representation domain default          */
/* Termination Section                                                      */
/* END PROCEDURE: CHKDEFLT                                                  */
return ec                     /* return to caller                           */
/* END PROCEDURE: DEC1370                                                   */
```

13.23.4 Exceptions

0111W Number is too small to map to FLOAT16 in C/370 representation domain.

Explanation: The decimal numeric source field has a SCALE which requires an exponent which exceeds the FLOAT16 target field's limit for negative exponents. The limit for normalized numbers is -78 decimal or -65 hexadecimal.

The field is mapped to ASIS.

0112W Number is too large to map to FLOAT16 in C/370 representation domain.

Explanation: The decimal numeric source field has a combination of SCALE and PRECISION which requires an exponent which exceeds the FLOAT16 target field's limit for positive exponents. The limit for normalized numbers is + 76 decimal or + 63 hexadecimal.

The field is mapped to ASIS.

Unclassified

Unclassified

Chapter 14. Exceptions for Translate Declaration Space

0105E A subtype instance of a bit field must be contained in a SEQUENCE or CASE.

Explanation: A SUBTYPE was translated to a C bit field. The only valid instances of this SUBTYPE are inside of a CASE or SEQUENCE.

Recovery: Change the SUBTYPE to an byte sized char or int, move the instance into a SEQUENCE or CASE, or replace the SUBTYPE instance with a definition of a byte sized char or int.

0106W Fixed-point overflow possible at conversion time.

Explanation: The source reference field is larger than the target reference field. If the source field contains a value which when converted is larger than the target reference field can accept, then a fixed-point overflow error is signaled at conversion time. A fixed-point constraint violation and a fixed-point fit violation may also be signaled at conversion time.

0107W Possible loss of precision in conversion of FLOAT16 to FLOAT2.

Explanation: The PRECISION of the FLOAT16 source field is greater than the PRECISION of the FLOAT2 target field. Some loss of least significant digits is possible at conversion time.

0108W FLOAT2 to FLOAT16 conversion may cause overflow or underflow.

Explanation: The range of exponents for the FLOAT2 source field is larger than the range of exponents for the FLOAT16 target field. Overflow or underflow will occur at conversion time if the result of the conversion is a target exponent which is outside the range of the FLOAT16 target field.

0109W Possible loss of precision in conversion of FLOAT2 to FLOAT16.

Explanation: The PRECISION of the FLOAT2 source field may be greater than the PRECISION of the FLOAT16 target field. Because of normalization of hexadecimal floating point numbers, only 53 bits of PRECISION may be available. Some loss of least significant digits is possible at conversion time.

0110W Possible loss of PRECISION : decimal to FLOAT2 conversion.

Explanation: The decimal field can represent a number with a larger decimal precision than the extended FLOAT2 field.

0111W Number is too small to map to FLOAT16 in C/370 representation domain.

Explanation: The decimal numeric source field has a SCALE which requires an exponent which exceeds the FLOAT16 target field's limit for negative exponents. The limit for normalized numbers is -78 decimal or -65 hexadecimal.

The field is mapped to ASIS.

0112W Number is too large to map to FLOAT16 in C/370 representation domain.

Explanation: The decimal numeric source field has a combination of SCALE and PRECISION which requires an exponent which exceeds the FLOAT16 target field's limit for positive exponents. The limit for normalized numbers is + 76 decimal or + 63 hexadecimal.

The field is mapped to ASIS.

Part 5. C Declaration Translator Generate Source Text

Chapter 15. C Generate Source Text Options . . . . . . . . . . . . . . . . . . 317

Chapter 16. C Declaration Translator Generate Source Text . . . . . . . . . 318
16.1 Generated C Data Description Format . . . . . . . . . . . . . . . . . . . 318
16.2 Order of Declarations . . . . . . . . . . . . . . . . . . . . . . . . . . . . 318
16.3 Generate from CASE declaration . . . . . . . . . . . . . . . . . . . . . . 318
16.4 Generate from ARRAY declaration . . . . . . . . . . . . . . . . . . . . . 319
16.5 Generate from SUBTYPE statement . . . . . . . . . . . . . . . . . . . . 319
16.6 Generate from SUBTYPE Instance . . . . . . . . . . . . . . . . . . . . . 320
16.7 ADL <CONSTANT statement> . . . . . . . . . . . . . . . . . . . . . . 320
16.8 Data Alignment . . . . . . . . . . . . . . . . . . . . . . . . . . . . . . 320
16.9 C Data Description Formatting . . . . . . . . . . . . . . . . . . . . . . 321
16.10 C map_to_pl_id Function . . . . . . . . . . . . . . . . . . . . . . . . . 322
16.11 Generate from ADL <ASIS> . . . . . . . . . . . . . . . . . . . . . . . 323
16.12 Generate from ADL <BINARY> . . . . . . . . . . . . . . . . . . . . . 326
16.13 Generate from ADL <BOOLEAN> . . . . . . . . . . . . . . . . . . . . 332
16.14 Generate from ADL <CHAR> . . . . . . . . . . . . . . . . . . . . . . 333
16.15 Generate from ADL <CHARSFX> . . . . . . . . . . . . . . . . . . . . 336
16.16 Generate from Attributes for a single dimension . . . . . . . . . . . . . 339
16.17 Generate from ADL <ENUMERATION> . . . . . . . . . . . . . . . . 340
16.18 Generate from ADL <FLOAT16> . . . . . . . . . . . . . . . . . . . . 341
16.19 Generate from ADL <FLOAT2> . . . . . . . . . . . . . . . . . . . . . 343

Chapter 17. Some C Style Suggestions for Generate Source Text . . . . . . . 345
17.1 General Guidelines . . . . . . . . . . . . . . . . . . . . . . . . . . . . 345
17.2 In-line Comments . . . . . . . . . . . . . . . . . . . . . . . . . . . . . 346
17.3 Block Comments . . . . . . . . . . . . . . . . . . . . . . . . . . . . . . 347
17.4 Header Descriptions . . . . . . . . . . . . . . . . . . . . . . . . . . . . 347

Chapter 18. Exceptions for Generate Source Text . . . . . . . . . . . . . . . 349

Chapter 15. C Generate Source Text Options

The C declaration translator supports several options on the call to Generate Source Text that affect the results of these functions. Also see Chapter 12, "C Translate Declaration Space Options" on page 267.

Option Description

LIST

For Generate Source Text, LIST specifies that all ADL<SEQUENCE> and ADL<CASE> shall be unraveled into simple fields and be represented by <implied SEQUENCE> and <implied CASE> in a <LIST statement>. All ADL<ARRAY> shall be generated to <implied ARRAY>. PACKED should have been specified on Translate Declaration Space. If padding is found other than that needed to fill out a byte after a bit field, then SKIPs shall be generated for the padding in the <LIST statement>.

MARGINS

Specifies the margins to use in the generated source file. This option can be written in System/370 or OS/2 format. For a complete definition see 5.11.2, "<option MARGINS>" on page 98. The defaults for the C declaration translator are:

System/370 Only

MARGINS(1,72)

End of System/370 Only

OS/2 Only

MARGINS(1,80)

End of OS/2 Only

SEQUENCE

Specifies that the generated source file should include sequence numbers and in what columns they should appear. This option can be written in System/370 or OS/2 format. For a complete definition see 5.11.3, "<option SEQUENCE>" on page 99. The default for the C declaration translator are NOSEQUENCE.

Notes:

1. The generated file shall have a variable record format if NOSEQUENCE. It shall have a fixed record format if SEQUENCE.

Chapter 16. C Declaration Translator Generate Source Text

The following pseudo code procedures specify the mapping from an ADLDCLSPC in C's representation domain to a <C data description>.

These mappings are done when a request is made to generate a <C data description> from an ADLDCLSPC.

16.1 Generated C Data Description Format

The C declaration translator shall generate a <C data description> in the format specified by Chapter 6, "C Data Description Format and Parse Algorithms" on page 102.

The following will not be included in the generated <C data description> :

1. <C OPTIONS annotation>
2. <preprocessor directive>
3. <preprocessor pragma>

16.2 Order of Declarations

Present declarations to Generate Source Text for processing in the following order:

1. Constants
2. Defaults
3. SUBTYPEs
4. Data Declarations

Within Constants, any constant which is assigned the value of another constant must be declared after the declaration of the other constant.

Within SUBTYPEs, any SUBTYPE which is declared with a reference to another SUBTYPE must appear after the declaration of the referenced SUBTYPE.

16.3 Generate from CASE declaration

Generate to a C <union data definition> with the format specified by 8.20, "<union data definition>" on page 190 or to an <implied CASE> with the format specified by 2.3, "<LIST statement>" on page 54, according to the C Generate Source Text options as specified by Chapter 15, "C Generate Source Text Options" on page 317.

16.4 Generate from ARRAY declaration

Generate to a C <array data definition> with the format specified by 8.1, "<array data definition>" on page 111 or to an <implied ARRAY> with the fomrat specified by 2.3, "<LIST statement>" on page 54, according to the C Generate Source Text options as specified by Chapter 15, "C Generate Source Text Options" on page 317.

16.5 Generate from SUBTYPE statement

Generate to a C <typedef data declaration>. This is independant of the Generate Source Text options selected. The ADL<constructors> and ADL<ENUMERATION> are all generated to C <typedef data declaration>s. The C declaration translator never generates a C union, struct, or enum with a <union tag>, <struct tag>, or <enum tag>. The following is a brief specification of generation of these types. See the appropriate sections in Chapter 6, "C Data Description Format and Parse Algorithms" on page 102 for details on the format of the C source text.

SUBTYPE OF ADL<SEQUENCE>

```
x: SUBTYPE OF ADL<SEQUENCE> generates to
typedef struct { <struct member list> } x';

where x is the ADL<subtype identifier>
and   x' is the <PL identifier> mapped from x
```

SUBTYPE OF ADL<CASE>

```
x: SUBTYPE OF ADL<CASE> generates to
typedef union { <union member list> } x';

where x is the ADL<subtype identifier>
and   x' is the <PL identifier> mapped from x
```

SUBTYPE OF ADL<ARRAY>

```
x: SUBTYPE OF ADL<ARRAY> generates to
typedef array x'<subscript declarator>;

where x is the ADL<subtype identifier>
and   x' is the <PL identifier> mapped from x
```

SUBTYPE OF ADL<ENUMERATION>

```
x: SUBTYPE OF ADL<ENUMERATION> generates to
typedef enum { <enumerator list> } x';

where x is the ADL<subtype identifier>
and   x' is the <PL identifier> mapped from x
```

16.6 Generate from SUBTYPE Instance

Generate to a C <typedef instance data definition>.

16.7 ADL<CONSTANT statement>

Generate an ADL<CONSTANT statement> in <ADL annotation>.

16.8 Data Alignment

C's alignment algorithm shall be applied to the ADLDCLSPC to determine the padding requirements for a field. This is used to determine whether the field is aligned and the padding is accounted for by the alignment, or the field is in a packed struct or union, or the field is aligned or packed and some or all of the padding must be generated as unnamed bit fields. See 1.5.7, "User Specified Padding Processing Rules" on page 10 for a general discussion of explicit padding fields.

The following are the general rules for alignment for Generate Source Text:

16.8.1 General Rules

1. Determine the alignment and padding requirements for a field using the appropriate compiler definitions for the C data type being generated for the field. Note that alignment algorithms differ between System/370, OS/2 on a 80386 and OS/2 on a 80486. See 6.2, "Data Alignment" on page 104 for references.
2. If the field is on its correct aligned boundary and there are no preceding SKIP bits, then the field can be considered to be unaligned or aligned.
3. If the field is on its correct aligned boundary and the only preceding SKIP bits are those required to reach the next byte boundary, following a bit field which ended inside of a byte, then the field can be considered to be unaligned or aligned.
4. If the field is on its correct aligned boundary and all of the preceding SKIP bits can be accounted for by the padding required to reach this boundary, starting from the end of the preceding field, then this field is considered to be aligned.
5. If the field is on its correct aligned boundary and there are more preceding SKIP bits than can be accounted for by the padding required to reach this boundary, starting from the end of the preceding field, then this field is considered to be aligned.

The extra SKIP bits are generated as one or more unnamed bit fields. If the number of SKIP bits is greater than the largest unnamed bit field supported by the C declaration translator for this system, then generate a <string data definition> with <SKIP padding annotation>.
6. If the field is not on its correct aligned boundary, then it is considered to be unaligned.
   a. If the only preceding SKIP bits are those required to reach the next byte boundary, following a bit field which ended inside of a byte, then these bits are accounted for by the one byte alignment requirement of unaligned fields.

b. Any other SKIP bits preceding the unaligned field are generated to one or more unnamed bit fields. If the number of SKIP bits is greater than the largest unnamed bit field supported by the C declaration translator for this system, then generate a <string data definition> with <SKIP padding annotation>.

7. Fields generated for SKIP bits shall be named as follows :

PADDINGn

Where n is a number to distinguish the padding fields. For the first padding field generated n equals 1. It is increased by one for each additional padding field generated.

8. For each struct or union which is generated, if all members at the first level are unaligned or can be considered to be unaligned or aligned, then the struct or union is unaligned and is generated with the _Packed attribute.

9. For each struct or union which is generated, if all members at the first level are aligned or can be considered to be unaligned or aligned, then the struct or union is aligned and is generated without the _Packed attribute.

10. It is not valid to have both fields which must be aligned and fields which must be unaligned in the same struct or union.

If this rule is violated the following warning message shall be issued:

0113W The alignment of struct or union in.name violates C rules.

16.8.2 Exceptions

0113W The alignment of struct or union in.name violates C rules.

Explanation: This struct or union has members which were not on the correct aligned byte boundary.

Recovery: There are two alternatives:

1. Parse the generated source to produce a new ADLDCLSPC which matches this source. Re-compile your C application to use this new generated source.
2. Translate the ADLDCLSPC using the C declaration translator and then generate new source from this new ADLDCLSPC. Re-compile your C application to use this new generated source.

16.9 C Data Description Formatting

Formatting of the generated text is not considered in this specification. However, an actual implementation will need to provide output formatted to a consistent style which is generally accepted for C programs. See Chapter 17, "Some C Style Suggestions for Generate Source Text" on page 345 for more information.

16.10 C map_to_pl_id Function

16.10.1.1 Function

Map and ADL identifier to a C identifier. This function must be done for every identifier generated to C. The generate procedures however do not show this function call.

16.10.1.2 Format

See 1.8.3, "map_to_pl_id procedure" on page 27.

16.10.1.3 Processing :

To map an ADL identifier to a C identifier, follow the general algorithm specified by 1.8.3, "map_to_pl_id procedure" on page 27, where steps 1 and 2 are specified as follows :

1. Replace each occurrence of ? | % | & with <underscore>.
2. If the first character of the identifier is a <decimal digit> then append <underscore> to the start of the identifier.

Identifiers cannot duplicate C keywords. An attempt shall be made to modify these as described in the general algorithm. If this does not succeed then call out an error exception.

16.10.1.4 Exceptions :

0114E Generated identifier is a duplicate, i.e. not unique within the first 255 characters.

Explanation: Generate attempts to make any duplicate identifiers it founds by appending or overlaying numbers starting from the right of the identifier. However, because an identifier cannot start with a number there is a finit limit on how many duplicate identifiers can be made unique.

Recovery: Change the identifier so that it is unique within the first 255 characters.

0115E Identifier does not fit on a single line in the source file.

Explanation: An identifier cannot be split across a line boundary.

Recovery: Change file record length, margins, and/or sequence settings to longer than *id_length* or change the ADLDCLSPC to use shorter identifiers.

16.10.1.5 Examples 1. call map_to_pl_id('?TIME%STAMP',,x)

map_to_pl_id sets x to _TIME_STAMP
2. call map_to_pl_id('&Last%Update?Date_',,x)

map_to_pl_id sets x to _Last_Update_Date_

Unclassified

16.11 Generate from ADL<ASIS>

See also B.1, "Test Generate ASIS for S/370 on 08/26/91 at 17:32:48" on page 398.

16.11.1 ASIS CCCCDE3G A1 5/08/92 16:16:42

```
/*------------------------------------------------------------------------*/
/* REXX PROCEDURE: ASIS        DATE: 08/26/91                             */
/* AUTHOR: Kenneth M. Sissors                                             */
/* FUNCTION: Map ADL<ASIS> to C char.                                     */
/* INPUT:                                                                 */
/*    in.       - input ADLDCLSPC data                                    */
/*    status.   - status information                                      */
/* OUTPUT:                                                                */
/*    out.      - output generated C source text                          */
/* Initialization Section                                                 */
/*------------------------------------------------------------------------*/
ASIS    : procedure expose in. out. status.
```

Unclassified

```
/*------------------------------------------------------------------------*/
/* REXX INLINE PROCEDURE: STORCLAS     DATE: 08/27/91                     */
/* Initialization Section                                                 */
/*------------------------------------------------------------------------*/
STORCLAS :
IF ((status.containing /= SEQUENCE) & (status.containing /= CASE)) THEN
    stor_class = 'extern' /* default storage class                        */
ELSE
    stor_class = ''       /* storage class not valid on struct, union memb   ers */
/* Termination Section                                                    */
/*------------------------------------------------------------------------*/
/* REXX INLINE PROCEDURE: STRNGSIZ     DATE: 08/26/91                     */
/* Initialization Section                                                 */
/*------------------------------------------------------------------------*/
IF (in.LENGTH = 'ADL<qualified identifier>') THEN
  DO
    a_length = 'LENGTH('in.LENGTH')'
    out.<string size> = in.MAXLEN
  END
ELSE
  DO
    a_length = ''
    out.<string size> = in.LENGTH
  END
/* Termination Section                                                    */
/* END PROCEDURE: STRNGSIZ                                                */
/*------------------------------------------------------------------------*/
/* REXX INLINE PROCEDURE: CHMAXALC     DATE: 08/25/91                     */
/* Initialization Section                                                 */
/*------------------------------------------------------------------------*/
IF (in.MAXALC = FALSE) THEN
    a_maxalc = 'MAXALC('in.MAXALC')'
ELSE
    a_maxalc = ''
/* Termination Section                                                    */
/* END PROCEDURE: CHMAXALC                                                */
out.<storage class> = storage_class
out.<attribute> = ''
out.<sign adjective> = ''  /* let sign default                            */
out.<subscript declarator> = ''
out.<array annotation> = ''
ec = 0
SELECT
  WHEN (in.UNITLEN = 1) THEN
    DO
      out.term = '<string data definition>'
      out.type_specifier = char
      out.<string annotation> = 'ASIS UNTILEN(1)' a_length a_maxalc
      out.<string size> = out.<string size> / 8
    END
  WHEN (in.UNITLEN = 8) THEN
    DO
      out.type_specifier = char
      out.term = '<string data definition>'
      out.<string annotation> = 'ASIS' a_length a_maxalc
    END
```

```
  WHEN (in.UNITLEN = 16) THEN
    DO
      out.term = '<wide string data definition>'
      out.type_specifier = wchar_t
      out.<wide string annotation> = 'ASIS' a_length a_maxalc
    END
  OTHERWISE
      ec = ERROR(E,'Invalid UNITLEN value')
END
/* Termination Section                                              */
return ec
/* END PROCEDURE: ASIS                                              */
```

16.11.2 Exceptions

1. None

Unclassified

16.12 Generate from ADL<BINARY>

See also B.3, "Test Generate BINARY for S/370 on 08/23/91 at 11:56:12" on page 409 and B.2, "Test Generate BINARY for OS/2 on 08/23/91 at 11:56:41" on page 400.

16.12.1 BINARY CCCCDE3G A1 5/08/92 16:16:38

```
/*------------------------------------------------------------------------*/
/* REXX PROCEDURE: BINARY      DATE: 08/23/91                             */
/* AUTHOR: Kenneth M. Sissors                                             */
/* FUNCTION: Generate C integer types                                     */
/* INPUTS:                                                                */
/*   in.     - input descriptor values                                    */
/*   status.- input descriptor and processing status information          */
/* VARIABLES:                                                             */
/*   out.    - output terminals for BNF definition of C type              */
/* Initialization Section                                                 */
/*------------------------------------------------------------------------*/
BINARY : procedure expose in. out. status.
```

Unclassified

```
/*-------------------------------------------------------------------------*/
/* REXX INLINE PROCEDURE: STORCLAS     DATE: 08/27/91                      */
/* Initialization Section                                                  */
/*-------------------------------------------------------------------------*/
STORCLAS :
IF ((status.containing /= SEQUENCE) & (status.containing /= CASE)) THEN
    stor_class = 'extern' /* default storage class                            */
ELSE
    stor_class = ''       /* storage class not valid on struct, union memb   ers */
/* Termination Section                                                     */
SELECT
  WHEN (in.SIGNED = TRUE) THEN
      IF (in.PRECISION = 7) THEN
        DO
          annotation             = '<char annotation>'
          out.term               = '<char data definition>'
          out.<storage class>    = storage_class
          out.<sign adjective>   = 'signed'
          out.type_specifier     = 'char'
          out.annotation         = 'BINARY'
        END
      ELSE
        DO
          annotation             = '<int annotation>'
          out.annotation         = ''
          SELECT
            WHEN (in.PRECISION = 15) THEN
              DO
                out.term               = '<int data definition>'
                out.<storage class>    = storage_class
                out.<sign adjective>   = 'signed'
                out.<length adjective> = 'short'
                out.type_specifier     = 'int'
              END
            WHEN (in.PRECISION = 31) THEN
              DO
                out.term               = '<int data definition>'
                out.<storage class>    = storage_class
                out.<sign adjective>   = 'signed'
                out.<length adjective> = 'long'
                out.type_specifier     = 'int'
              END
            WHEN (in.LENGTH > 32) THEN
              DO
                ec = EXCEPTION(W,'0116E  C source text could not be generated for field in.name')
                ec = EXCEPTION(E,'0117E  C integer types must be <= 32 bits long')
              END
            OTHERWISE
                out.term               = '<bit-field data definition>'
                out.<sign adjective>   = 'signed'
                out.type_specifier     = 'int'
                out.<bit-field size>   = in.LENGTH
                IF (¬((status.containing = SEQUENCE) | (status.containing=CASE))) THEN
                    ec = EXCEPTION(E,'0118E  A bit field must be a member of a SEQUENCE or CASE')
          END
        END
```

```
  WHEN (in.PRECISION = 8) THEN
    DO
      annotation             = '<char annotation>'
      out.term               = '<char data definition>'
      out.<storage class>    = storage_class
      out.<sign adjective>   = 'unsigned'
      out.type_specifier     = 'char'
      out.annotation         = 'BINARY'
    END
  OTHERWISE
      annotation             = '<int annotation>'
      out.annotation         = ''
     SELECT
       WHEN (in.PRECISION = 16) THEN
         DO
           out.term                = '<int data definition>'
           out.<storage class>     = storage_class
           out.<sign adjective>    = 'unsigned'
           out.<length adjective>  = 'short'
           out.type_specifier      = 'int'
         END
       WHEN (in.PRECISION = 32) THEN
         DO
           out.term                = '<int data definition>'
           out.<storage class>     = storage_class
           out.<sign adjective>    = 'unsigned'
           out.<length adjective>  = 'long'
           out.type_specifier      = 'int'
         END
       WHEN (in.LENGTH > 32) THEN
         DO
           ec = EXCEPTION(W,'0116E  C source text could not be generated for field in.name')
           ec = EXCEPTION(E,'0117E  C integer types must be <= 32 bits long')
         END
       OTHERWISE
           out.term                = '<bit-field data definition>'
           out.<sign adjective>    = 'unsigned'
           out.type_specifier      = 'int'
           out.<bit-field size>    = in.LENGTH
           IF (¬((status.containing = SEQUENCE) | (status.containing=CASE))) THEN
               ec = EXCEPTION(E,'0118E  A bit field must be a member of a SEQUENCE or CASE')
     END
END
/* Termination Section                                                      */
/*------------------------------------------------------------------------*/
/* REXX INLINE PROCEDURE: CHKBIN1      DATE: 06/05/91                        */
/* Initialization Section                                                   */
/*------------------------------------------------------------------------*/
CHKBIN1  :
IF (in.SCALE /= 0) THEN
    ec = EXCEPTION(E,'0119E  SCALE was not zero.  SCALE must be zero for integral types')
IF (in.RADIX /= 2) THEN
    ec = EXCEPTION(E,'0120E  RADIX must be 2 for integral types')
```

```
/* Termination Section                                                   */
/*----------------------------------------------------------------------*/
/* REXX INLINE PROCEDURE: CHKBIN2      DATE: 06/05/91                   */
/* Initialization Section                                                */
/*----------------------------------------------------------------------*/
CHKBIN2  :
┌SELECT
│  WHEN (status.system = 'OS/2'  & in.BYTRVS = FALSE) THEN
│      ec = EXCEPTION(E,'0121E  BYTRVS must be TRUE for OS/2 integral types')
│  WHEN (status.system = 'S/370' & in.BYTRVS = TRUE) THEN
│      ec = EXCEPTION(E,'0122E  BYTRVS must be FALSE for S/370 integral types')
│  OTHERWISE
└END
/* Termination Section                                                   */
/*----------------------------------------------------------------------*/
/* REXX INLINE PROCEDURE: CHKBIN3      DATE: 06/05/91                   */
/* Initialization Section                                                */
/*----------------------------------------------------------------------*/
CHKBIN3  :
┌SELECT
│  WHEN (in.SIGNED = FALSE & in.LENGTH /= in.PRECISION) THEN
│      ec = EXCEPTION(E,'0123E  PRECISION must equal LENGTH for unsigned integral types')
│  WHEN (in.SIGNED = TRUE & in.LENGTH /= (in.PRECISION + 1)) THEN
│      ec = EXCEPTION(E,'0124E  PRECISION must equal (LENGTH - 1) for signed integral types')
│  OTHERWISE
└END
/* Termination Section                                                   */
/*----------------------------------------------------------------------*/
/* REXX INLINE PROCEDURE: CHKBIN4      DATE: 08/20/91                   */
/* Initialization Section                                                */
/*----------------------------------------------------------------------*/
CHKBIN4  :
IF (in.COMPLEX = TRUE) THEN
    ec = EXCEPTION(E,'0125E  COMPLEX must be FALSE for integral types')
/* Termination Section                                                   */
/*----------------------------------------------------------------------*/
/* INLINE REXX PROCEDURE: CHKOPTI      DATE: 06/28/91                   */
/* Initialization Section                                                */
/*----------------------------------------------------------------------*/
CHKOPTI:
IF (in.FIT = ROUND) THEN
    out.annotation = out.annotation || FIT(ROUND)
IF (in.CONSTRAINED = TRUE) THEN
    out.annotation = out.annotation || CONSTRAINED(TRUE)
/* Termination Section                                                   */
/* END PROCEDURE: CHKOPTI                                                */
                            /*                                           */
return ec                   /* return to caller                          */
/* END PROCEDURE: BINARY                                                 */
```

16.12.2 Exceptions

Unclassified

---

0116E C source text could not be generated for field in.name

Explanation: It could not be determined from the field's attributes which C type should be generated. The ADLDCLSPC probably was not translated into the C representation domain.

---

0117E C integer types must be < = 32 bits long

Explanation: The largest C intger is unsigned long int. This is 32 bits long. An ADL BINARY field had a LENGTH greater than this. The ADLDCLSPC probably was not translated into the C representation domain.

---

0118E A bit field must be a member of a SEQUENCE or CASE

Explanation: A bit field is not valid outside of a C struct or union and is not valid as an array element.

Recovery: Move the bit field inside of a struct or union or change the field to an integeral type (char or int).

---

0119E SCALE was not zero. SCALE must be zero for integral types

Explanation: An ADL BINARY had a non-zero SCALE. All C int, char, and bit field, which map to BINARY must have SCALE(0). The ADLDCLSPC probably was not translated into the C representation domain.

---

0120E RADIX must be 2 for integral types

Explanation: An ADL BINARY had RADIX not equal to 2. All C int, char, and bit field, which map to BINARY must have RADIX(2).

---

0121E BYTRVS must be TRUE for OS/2 integral types

Explanation: An ADL BINARY had BYTRVS(FALSE). For IBM C Set/2, short int, int, and long int all must have BYTRVS(TRUE). The ADLDCLSPC probably was not translated into the C representation domain.

---

0122E BYTRVS must be FALSE for S/370 integral types

Explanation: An ADL BINARY had BYTRVS(TRUE). For IBM C/370, short int, int, and long int all must have BYTRVS(FALSE). The ADLDCLSPC probably was not translated into the C tpye domain.

---

0123E PRECISION must equal LENGTH for unsigned integral types

Explanation: An ADL BINARY had LENGTH incorrectly set for C unsigned integeral types (unsigned char, unsigned int). The ADLDCLSPC probably was not translated into the C representation domain.

---

0124E PRECISION must equal (LENGTH - 1) for signed integral types

Explanation: An ADL BINARY had LENGTH incorrectly set for C signed integral types (signed char, signed int). The ADLDCLSPC probably was not translated into the C tpye domain.

0125E COMPLEX must be FALSE for integral types

Explanation: An ADL BINARY had COMPLEX(TRUE). For C integral types (char, int) all must have COMPLEX(FALSE). The ADLDCLSPC probably was not translated into the C tpye domain.

16.13 Generate from ADL<BOOLEAN>

See also B.4, "Test Generate BOOLEAN for S/370 on 08/27/91 at 15:57:51" on page 418.

16.13.1 BOOLEAN CCCCDE3G A1 5/08/92 16:18:37

```
/*--------------------------------------------------------------------------*/
/* REXX PROCEDURE: BOOLEAN      DATE: 05/08/92                              */
/* AUTHOR: Kenneth M. Sissors                                               */
/* FUNCTION: Map BOOLEAN to C representation domain enum with annotation.   */
/* INPUT:                                                                   */
/*   in.       - input ADLDCLSPC data                                       */
/*   status.   - input ADLDCLSPC status and processing status               */
/* OUTPUT:                                                                  */
/*   out.      - output ADLDCLSPC data                                      */
/* Initialization Section                                                   */
/*--------------------------------------------------------------------------*/
BOOLEAN  : procedure expose in. out. status.
/*--------------------------------------------------------------------------*/
/* REXX INLINE PROCEDURE: STORCLAS     DATE: 08/27/91                       */
/* Initialization Section                                                   */
/*--------------------------------------------------------------------------*/
STORCLAS :
IF ((status.containing /= SEQUENCE) & (status.containing /= CASE)) THEN
     stor_class = 'extern' /* default storage class                              */
ELSE
     stor_class = ''       /* storage class not valid on struct, union memb   ers */
/* Termination Section                                                      */
ec = 0
out.term = '<boolean_t data definition>'
out.type_specifier = 'boolean_t'
out.<attribute> = ''
out.<storage class> = stor_class
/* Termination Section                                                      */
return ec                  /* return to caller                              */
/* END PROCEDURE: BOOLEAN                                                   */
```

16.13.2 Exceptions

1. None

16.14 Generate from ADL<CHAR>

See also B.5, "Test Generate CHAR for S/370 on 08/26/91 at 17:36:41" on page 419

16.14.1 CHAR CCCCDE3G A1 5/08/92 16:16:34

```
/*--------------------------------------------------------------------------*/
/* REXX PROCEDURE: CHAR          DATE: 08/26/91                             */
/* AUTHOR: Kenneth M. Sissors                                               */
/* FUNCTION: Generate a C char or wchar_t.                                  */
/* INPUTS:                                                                  */
/*   in.       - input ADLDCLSPC data                                       */
/*   status.  - status information                                          */
/* OUTPUTS:                                                                 */
/*   out.      - generated C source text                                    */
/* Initialization Section                                                   */
/*--------------------------------------------------------------------------*/
CHAR     : procedure expose in. out. status.
```

```
/*-------------------------------------------------------------------------*/
/* REXX INLINE PROCEDURE: STORCLAS     DATE: 08/27/91                      */
/* Initialization Section                                                  */
/*-------------------------------------------------------------------------*/
STORCLAS :
IF ((status.containing /= SEQUENCE) & (status.containing /= CASE)) THEN
    stor_class = 'extern' /* default storage class                              */
ELSE
    stor_class = ''       /* storage class not valid on struct, union memb   ers */
/* Termination Section                                                     */
/*-------------------------------------------------------------------------*/
/* REXX INLINE PROCEDURE: STRNGSIZ     DATE: 08/26/91                      */
/* Initialization Section                                                  */
/*-------------------------------------------------------------------------*/
IF (in.LENGTH = 'ADL<qualified identifier>') THEN
  DO
    a_length = 'LENGTH('in.LENGTH')'
    out.<string size> = in.MAXLEN
  END
ELSE
  DO
    a_length = ''
    out.<string size> = in.LENGTH
  END
/* Termination Section                                                     */
/* END PROCEDURE: STRNGSIZ                                                 */
/*-------------------------------------------------------------------------*/
/* REXX INLINE PROCEDURE: CCSIJUST     DATE: 08/25/91                      */
/* Initialization Section                                                  */
/*-------------------------------------------------------------------------*/
a_ccsid = ''
a_justify = ''
IF (in.CCSID <> 0) THEN
    a_ccsid = 'CCSID('in.CCSID')'
IF (in.JUSTIFY <> '') THEN
    a_justify = 'JUSTIFY('in.JUSTIFY')'
/* Termination Section                                                     */
/* END PROCEDURE: CCSIJUST                                                 */
/*-------------------------------------------------------------------------*/
/* REXX INLINE PROCEDURE: CHMAXALC     DATE: 08/25/91                      */
/* Initialization Section                                                  */
/*-------------------------------------------------------------------------*/
IF (in.MAXALC = FALSE) THEN
    a_maxalc = 'MAXALC('in.MAXALC')'
ELSE
    a_maxalc = ''
/* Termination Section                                                     */
/* END PROCEDURE: CHMAXALC                                                 */
out.<storage class> = storage_class
out.<attribute> = ''
out.<sign adjective> = ''  /* let sign default                             */
out.<subscript declarator> = ''
out.<array annotation> = ''
ec = 0
SELECT
  WHEN (in.UNITLEN = 8) THEN
```

```
      DO
        out.term = '<string data definition>'
        out.type_specifier = 'char'
        out.<string annotation> = a_length a_maxalc a_ccsid a_justify
      END
   WHEN (in.UNITLEN = 16) THEN
      DO
        out.term = '<wide string data definition>'
        out.type_specifier = 'wchar_t'
        out.<wide string annotation> = a_length a_maxalc a_ccsid a_justify
      END
   OTHERWISE
        ec = ERROR(E,'Invalid UNITLEN for CHAR.  Must be 8 or 16.')
 END
 /* Termination Section                                                        */
 return ec                    /* return to caller                              */
 /* END PROCEDURE: CHARFSFX                                                    */
```

16.14.2 Exceptions

1. None

16.15 Generate from ADL<CHARSFX>

See also B.6, "Test Generate CHARSFX for S/370 on 08/26/91 at 17:24:05" on page 420

16.15.1 CHARSFX CCCCDE3G A1 5/08/92 16:14:07

```
/*------------------------------------------------------------------------*/
/* REXX PROCEDURE: CHARSFX     DATE: 08/26/91                              */
/* AUTHOR: Kenneth M. Sissors                                              */
/* FUNCTION: Generate a C char or wchar_t used as a null terminated string. */
/* INPUTS:                                                                 */
/*   in.      - input ADLDCLSPC data                                       */
/*   status.  - status information                                         */
/* OUTPUTS:                                                                */
/*   out.     - generated C source text                                    */
/* Initialization Section                                                  */
/*------------------------------------------------------------------------*/
CHARSFX : procedure expose in. out. status.
```

```
/*------------------------------------------------------------------------*/
/* REXX INLINE PROCEDURE: STORCLAS     DATE: 08/27/91                      */
/* Initialization Section                                                  */
/*------------------------------------------------------------------------*/
STORCLAS :
IF ((status.containing /= SEQUENCE) & (status.containing /= CASE)) THEN
    stor_class = 'extern' /* default storage class                              */
ELSE
    stor_class = ''       /* storage class not valid on struct, union memb  ers */
/* Termination Section                                                     */
/*------------------------------------------------------------------------*/
/* REXX INLINE PROCEDURE: CHMAXALC     DATE: 08/25/91                      */
/* Initialization Section                                                  */
/*------------------------------------------------------------------------*/
IF (in.MAXALC = FALSE) THEN
    a_maxalc = 'MAXALC('in.MAXALC')'
ELSE
    a_maxalc = ''
/* Termination Section                                                     */
/* END PROCEDURE: CHMAXALC                                                 */
/*------------------------------------------------------------------------*/
/* REXX INLINE PROCEDURE: SETCCSID     DATE: 08/25/91                      */
/* Initialization Section                                                  */
/*------------------------------------------------------------------------*/
IF (in.CCSID <> 0) THEN
    a_ccsid = 'CCSID('in.CCSID')'
ELSE
    a_ccsid = ''
/* Termination Section                                                     */
/* END PROCEDURE: SETCCSID                                                 */
out.<storage class> = storage_class
out.<attribute> = ''
out.<sign adjective> = ''  /* let sign default                             */
out.<subscript declorator> = ''
out.<array annotation> = ''
out.<string size> = in.MAXLEN
ec = 0
SELECT
  WHEN (in.UNITLEN = 8) THEN
    DO
      out.term = '<string data definition>'
      out.type_specifier = 'char'
      out.<string annotation> = 'CHARSFX 'a_ccsid a_maxalc
    END
  WHEN (in.UNITLEN = 16) THEN
    DO
      out.term = '<wide string data definition>'
      out.type_specifier = 'wchar_t'
      out.<wide string annotation> = 'CHARSFX 'a_ccsid a_maxalc
    END
  OTHERWISE
      ec = ERROR(E,'Invalid UNITLEN.  Must be 8 or 16 for char or wchar_t')
END
/* Termination Section                                                     */
return ec                   /* return to caller                            */
/* END PROCEDURE: CHARFSFX                                                 */
```

16.15.2 Exceptions

1. None

16.16 Generate from Attributes for a single dimension

16.16.1 DMNATTR CCCCDE3G A1 5/08/92 16:13:54

```
/*------------------------------------------------------------------------*/
/* REXX PROCEDURE: DMNATTR      DATE: 09/04/91                            */
/* AUTHOR: Kenneth M. Sissors                                             */
/* FUNCTION:  Map a single dimension of an array.                         */
/* INPUT:                                                                 */
/*   in.       - input ADLDCLSPC data                                     */
/*   status.   - input ADLDCLSPC status and processing status             */
/* OUTPUT:                                                                */
/*   out.      - output ADLDCLSPC data                                    */
/* Initialization Section                                                 */
/*------------------------------------------------------------------------*/
DMNATTR  : procedure expose in. out. status.
ec = 0
IF (in.DMNSIZE = 'ADL<qualified identifier>') THEN
  DO
    /*********************************************************************     */
    /* in.dimension_annotation is set to out.dimension_annotation from the      */
    /* last call to this procedure.  In this way the complete DMNLST for        */
    /* the annotation can built up for all dimensions.  This does not           */
    /* address all the details of constructing this list.  See the BNF          */
    /* definitions in parse for this.  See <array annotation>.                  */
    /*********************************************************************     */
    out.dimension_annotation = in.dimension_annotation 'DMNSIZE('in.DMNSIZE')'
  END
ELSE
    out.<dimension size> = in.DMNSIZE
/* Termination Section                                                    */
return ec                        /* return to caller                      */
/* END PROCEDURE: DMNATTR                                                 */
```

16.16.2 Exceptions

1. None

Unclassified

16.17 Generate from ADL<ENUMERATION>

See also B.8, "Test Generate ENUMERAT for S/370 on 08/27/91 at 17:09:04" on page 422

16.17.1 ENUMERAT CCCCDE3G A1 5/08/92 16:13:59

```
/*---------------------------------------------------------------------------*/
/* REXX PROCEDURE: ENUMERAT     DATE: 08/27/91                               */
/* AUTHOR: Kenneth M. Sissors                                                */
/* FUNCTION: Map ADL<ENUMERATION> to C's enum type.                          */
/* INPUT:                                                                    */
/*   in.       - input ADLDCLSPC data                                        */
/*   status.   - input ADLDCLSPC status and processing status                */
/* OUTPUT:                                                                   */
/*   out.      - output ADLDCLSPC data                                       */
/* Initialization Section                                                    */
/*---------------------------------------------------------------------------*/
ENUMERAT : procedure expose in. out. status.
/*---------------------------------------------------------------------------*/
/* REXX INLINE PROCEDURE: STORCLAS     DATE: 08/27/91                        */
/* Initialization Section                                                    */
/*---------------------------------------------------------------------------*/
STORCLAS :
IF ((status.containing /= SEQUENCE) & (status.containing /= CASE)) THEN
    stor_class = 'extern' /* default storage class                                */
ELSE
    stor_class = ''       /* storage class not valid on struct, union memb  ers */
/* Termination Section                                                       */
out.<storage class> = stor_class
out.<attribute> = ''
out.<enum tag> = ''
ec = 0
out.term = '<enumeration data definition>'
out.type_specifier = 'enum'
/*********************************************************                   */
/* The in.ENUMERATION_LIST must be mapped to C.  See the                     */
/* BNF for <enumeration data definition>' for the C's                        */
/* source format.                                                            */
/*********************************************************                   */
/* out.<enumeration list> = maptoC(in.ENUMERATION_LIST) */
/* Termination Section                                                       */
return ec                   /* return to caller                              */
/* END PROCEDURE: ENUMERAT                                                   */
```

16.17.2 Exceptions

1. None

Unclassified

16.18 Generate from ADL<FLOAT16>

See also B.9, "Test Generate FLOAT16 for S/370 on 08/27/91 at 15:49:23" on page 423

16.18.1 FLOAT16 CCCCDE3G A1 5/08/92 16:13:52

```
/*--------------------------------------------------------------------------*/
/* REXX PROCEDURE: FLOAT16      DATE:08/27/911                              */
/* AUTHOR: Kenneth M. Sissors                                               */
/* FUNCTION: Generate a C/370 floating point type.                          */
/* INPUT:                                                                   */
/*   in.        - input ADLDCLSPC data                                      */
/*   status.    - input ADLDCLSPC status and processing status              */
/* OUTPUT:                                                                  */
/*   out.       - output ADLDCLSPC data                                     */
/* Initialization Section                                                   */
/*--------------------------------------------------------------------------*/
FLOAT16  : procedure expose in. out. status.
```

Unclassified

```
/*------------------------------------------------------------------------*/
/* REXX INLINE PROCEDURE: STORCLAS     DATE: 08/27/91                     */
/* Initialization Section                                                 */
/*------------------------------------------------------------------------*/
STORCLAS :
IF ((status.containing /= SEQUENCE) & (status.containing /= CASE)) THEN
    stor_class = 'extern' /* default storage class                        */
ELSE
    stor_class = ''       /* storage class not valid on struct, union memb   ers */
/* Termination Section                                                    */
out.<storage class> = stor_class
out.<attribute> = ''
ec = 0
SELECT
  WHEN (in.LENGTH = 32) THEN
    DO
      out.term = '<float data definition>'
      out.type_specifier = 'float'
    END
  WHEN (in.LENGTH = 64) THEN
    DO
      out.term = '<double data definition>'
      out.type_specifier = 'double'
    END
  WHEN (in.LENGTH = 128) THEN
    DO
      out.term = '<long double data definition>'
      out.type_specifier = 'long double'
    END
  OTHERWISE
      ec = ERROR(E,'LENGTH was invalid.  Must be 32, 64, or 128')
END
/* Termination Section                                                    */
/*------------------------------------------------------------------------*/
/* REXX INLINE PROCEDURE: TSTCMPLX     DATE: 08/27/91                     */
/* Initialization Section                                                 */
/*------------------------------------------------------------------------*/
IF (in.COMPLEX = TRUE) THEN
    ec = ERROR(E,'COMPLEX is invalid for floating point in the C domain')
/* Termination Section                                                    */
/* END PROCEDURE: TSTCMPLX                                                */
return ec                    /* return to caller                          */
/* END PROCEDURE: FLOAT16                                                 */
```

16.18.2 Exceptions

1. None

16.19 Generate from ADL<FLOAT2>

See also B.10, "Test Generate FLOAT2 for OS/2 on 08/27/91 at 15:49:39" on page 425

16.19.1 FLOAT2 CCCCDE3G A1 5/08/92 16:16:11

```
/*-------------------------------------------------------------------------*/
/* REXX PROCEDURE: FLOAT2       DATE: 05/08/92                             */
/* AUTHOR: Kenneth M. Sissors                                              */
/* FUNCTION: Map FLOAT2 to the C Set/2 representation domain.              */
/* INPUT:                                                                  */
/*   in.        - input ADLDCLSPC data                                     */
/*   status.    - input ADLDCLSPC status and processing status             */
/* OUTPUT:                                                                 */
/*   out.       - output ADLDCLSPC data                                    */
/* VARIABLES:                                                              */
/*   none       -                                                          */
/* Initialization Section                                                  */
/*-------------------------------------------------------------------------*/
FLOAT2   : procedure expose in. out. status.
```

Unclassified

```
/*------------------------------------------------------------------------*/
/* REXX INLINE PROCEDURE: STORCLAS     DATE: 08/27/91                     */
/* Initialization Section                                                 */
/*------------------------------------------------------------------------*/
STORCLAS :
IF ((status.containing /= SEQUENCE) & (status.containing /= CASE)) THEN
    stor_class = 'extern' /* default storage class                         */
ELSE
    stor_class = ''       /* storage class not valid on struct, union memb  ers */
/* Termination Section                                                    */
out.<storage class> = stor_class
out.<attribute> = ''
ec = 0
SELECT
  WHEN (in.LENGTH = 32) THEN
    DO
      out.term = '<float data definition>'
      out.type_specifier = 'float'
    END
  WHEN (in.LENGTH = 64) THEN
    DO
      out.term = '<double data definition>'
      out.type_specifier = 'double'
    END
  WHEN (in.LENGTH = 128) THEN
    DO
      out.term = '<long double data definition>'
      out.type_specifier = 'long double'
    END
  OTHERWISE
      ec = ERROR(E,'LENGTH was invalid.  Must be 32, 64, or 128')
END
/* Termination Section                                                    */
/*------------------------------------------------------------------------*/
/* REXX INLINE PROCEDURE: TSTCMPLX     DATE: 08/27/91                     */
/* Initialization Section                                                 */
/*------------------------------------------------------------------------*/
IF (in.COMPLEX = TRUE) THEN
    ec = ERROR(E,'COMPLEX is invalid for floating point in the C domain')
/* Termination Section                                                    */
/* END PROCEDURE: TSTCMPLX                                                */
return ec                    /* return to caller                          */
/* END PROCEDURE: FLOAT2                                                  */
```

16.19.2 Exceptions

1. None

Unclassified

Chapter 17. Some C Style Suggestions for Generate Source Text

These are not meant to be complete, rather they provide a few common conventions as a starting point for use in Generate Source Text format. Conventions for program logic are not considered.

17.1 General Guidelines

The file starts with a comment block header. The format of this header is described in 17.4, "Header Descriptions" on page 347.

End all lines within 80 columns whenever possible. This enhances readability of code on a majority of display devices. Further, code should end before column 72.

The following are additional guidelines based on those described in the *C Programming Guidelines* from the Glendale Labs in Endicott, New York.

1. To avoid collision with compiler generated identifiers, no identifiers should begin with an underscore (_).
2. Each variable should be declared on a separate line, in its own statement.
   a. The opening brace of a block follows the statement that opened the block separated by a space, if it falls before the right margin (column 72).

If the brace will not fit within the margins, it should occur on a separate line following the statement. The brace is positioned in the same column below the keyword or function name that created the block.

Alternatively, the opening brace may always occur on a separate line following the statement, positioned in the same column as the opening statement.
   b. The closing brace of the block is on a separate line and is positioned to line up below the opening brace or statement.

The following is an example :

Unclassified

```
struct template /* struct tag annotation */
{
  int  e;
  char f;
} inst /* declarator annotation */

struct alternate /* struct tag annotation */
{
  int  e;
  char f;     /* declarator annotation */
} inst;

struct alternate
  /* struct tag annotation */
{
  int  e;
  char f;
} inst; /* declarator annotation */
```

17.2 In-line Comments

*In-line* comments are comments that describe a statement or two of code[5], usually appearing on the same line as the executable statements.

1. In-line comments only appear to the right of statements.
2. An in-line comment must have one opening and closing delimiter. They do not span lines.
3. The opening delimiter (/*) should have a uniform starting column. It is recommended that this starting column be column 30. The starting column is allowed to be farther to the right only if the statement extends up to or beyond the uniform starting column.
4. The closing delimiter (*/) may follow one space after the rightmost character in the remark or line up in the right margin (column 72).
5. Comment text that cannot be contained in the initial line must be continued beneath the initial line, with the continued text beneath the first character of text in the first line of the remark or indented to the right of that first character.
6. An in-line comment should follow the closing brace of a block, separated by a blank.

```
if (a == b) {
  :
} /* if */
else {                    /* Else do the else stuff        */
  :
} /*else*/
```

[5] The following list of guidelines are based on those described in the *C programming Guidelines, Release 1.05*, distributed by a development group at the Glendale Labs in Endicott, New York.

17.3 Block Comments

*Block* comments are generally used to describe a subsequent series of statements[5].

- A block comment must precede the code that it describes.
- A block comment delimiter (/*) will have the same starting column as the statement(s) or data item(s) being described, or will start in the left margin (column 1).
- A multiple line general comment may be preceded and followed by a comment line of asterisks (*) to emphasize the comment.
- The comment lines begin and end on each line, with all closing delimiters (*/) aligned in the right margin (column 72)[6].

Example:

```
/************************************************************/
/* Data Structure:  MKF segment                             */
/*     Byte 0                                               */
/*        Bit 7   - unused                                  */
/*        Bit 6,5 - Status                                  */
/*        Bit 4,3 - Process flag                            */
/*        Bit 2   - Update property                         */
/*        Bit 1,0 - unused                                  */
/*     Byte 1,2,3 - IIF record number                       */
/************************************************************/
```

Example:

```
/************************************************************
 * Data Structure:  MKF segment
 *     Byte 0
 *        Bit 7   - unused
 *        Bit 6,5 - Status
 *        Bit 4,3 - Process flag
 *        Bit 2   - Update property
 *        Bit 1,0 - unused
 *     Byte 1,2,3 - IIF record number
 ************************************************************/
```

17.4 Header Descriptions

*Header descriptions* are block comments which precede major logical units of code and are aligned in the first column. In particular, header comment blocks are included at the top of each source file that composes the program. For C/370, this means that a header comment block should be included at the beginning of each *.c* and *.h* file.

[6] An alternate method of block commenting is commonly used. The first line has an opening delimiter and asterisks up to the right margin (column 72). Each comment line after the first starts with one asterisk. The last comment line contains asterisks up to the terminating delimiter in the right margin (column 72).

Each source file starts with a header to identify and describe the contents of that file. Different types of files have different types of headers. The essential elements of headers for generated data description files are :

1. Declaration Translator : Title, version, TYPMGRID of declaration translator
2. Date and time processed by Generate Source Text
3. Function : Textual description of the contents or function of the file (blank for user)
4. The list of include files
5. Change History area (blank for user to update)

Unclassified

Chapter 18. Exceptions for Generate Source Text

0113W The alignment of struct or union in.name violates C rules.

Explanation: This struct or union has members which were not on the correct aligned byte boundary.

Recovery: There are two alternatives:

1. Parse the generated source to produce a new ADLDCLSPC which matches this source. Re-compile your C application to use this new generated source.
2. Translate the ADLDCLSPC using the C declaration translator and then generate new source from this new ADLDCLSPC. Re-compile your C application to use this new generated source.

0114E Generated identifier is a duplicate, i.e. not unique within the first 255 characters.

Explanation: Generate attempts to make any duplicate identifiers it founds by appending or overlaying numbers starting from the right of the identifier. However, because an identifier cannot start with a number there is a finit limit on how many duplicate identifiers can be made unique.

Recovery: Change the identifier so that it is unique within the first 255 characters.

0115E Identifier does not fit on a single line in the source file.

Explanation: An identifier cannot be split across a line boundary.

Recovery: Change file record length, margins, and/or sequence settings to longer than *id_length* or change the ADLDCLSPC to use shorter identifiers.

0116E C source text could not be generated for field in.name

Explanation: It could not be determined from the field's attributes which C type should be generated. The ADLDCLSPC probably was not translated into the C representation domain.

0117E C integer types must be < = 32 bits long

Explanation: The largest C intger is unsigned long int. This is 32 bits long. An ADL BINARY field had a LENGTH greater than this. The ADLDCLSPC probably was not translated into the C representation domain.

0118E A bit field must be a member of a SEQUENCE or CASE

Explanation: A bit field is not valid outside of a C struct or union and is not valid as an array element.

Recovery: Move the bit field inside of a struct or union or change the field to an integeral type (char or int).

Unclassified

0119E SCALE was not zero. SCALE must be zero for integral types

Explanation: An ADL BINARY had a non-zero SCALE. All C int, char, and bit field, which map to BINARY must have SCALE(0). The ADLDCLSPC probably was not translated into the C representation domain.

0120E RADIX must be 2 for integral types

Explanation: An ADL BINARY had RADIX not equal to 2. All C int, char, and bit field, which map to BINARY must have RADIX(2).

0121E BYTRVS must be TRUE for OS/2 integral types

Explanation: An ADL BINARY had BYTRVS(FALSE). For IBM C Set/2, short int, int, and long int all must have BYTRVS(TRUE). The ADLDCLSPC probably was not translated into the C representation domain.

0122E BYTRVS must be FALSE for S/370 integral types

Explanation: An ADL BINARY had BYTRVS(TRUE). For IBM C/370, short int, int, and long int all must have BYTRVS(FALSE). The ADLDCLSPC probably was not translated into the C tpye domain.

0123E PRECISION must equal LENGTH for unsigned integral types

Explanation: An ADL BINARY had LENGTH incorrectly set for C unsigned integeral types (unsigned char, unsigned int). The ADLDCLSPC probably was not translated into the C representation domain.

0124E PRECISION must equal (LENGTH - 1) for signed integral types

Explanation: An ADL BINARY had LENGTH incorrectly set for C signed integral types (signed char, signed int). The ADLDCLSPC probably was not translated into the C tpye domain.

0125E COMPLEX must be FALSE for integral types

Explanation: An ADL BINARY had COMPLEX(TRUE). For C integral types (char, int) all must have COMPLEX(FALSE). The ADLDCLSPC probably was not translated into the C tpye domain.

Unclassified

Part 6. Appendices

Appendix A. Translate Declaration Space Test Results

A.1 Test Translate ASIS for S/370 on 08/15/91 at 13:35:52 .......... 353
A.2 Test Translate BINARY for OS/2 on 09/10/91 at 16:09:12 ........ 355
A.3 Test Translate BINARY for S/370 on 09/10/91 at 15:48:56 ........ 360
A.4 Test Translate BIT for S/370 on 08/15/91 at 15:03:12 ........... 366
A.5 Test Translate BITPRE for S/370 on 09/04/91 at 16:23:35 ........ 368
A.6 Test Translate BOOLEAN for S/370 on 08/08/91 at 10:25:51 ...... 369
A.7 Test Translate CHAR for OS/2 on 07/31/91 at 13:30:42 ......... 370
A.8 Test Translate CHAR for S/370 on 08/15/91 at 17:39:09 ......... 374
A.9 Test Translate CHARPRE for S/370 on 09/04/91 at 16:21:45 ...... 378
A.10 Test Translate CHARSFX for S/370 on 08/15/91 at 17:45:27 ...... 379
A.11 Test Translate COMPLEX for OS/2 on 07/31/91 at 13:32:56 ...... 380
A.12 Test Translate COMPLEX for S/370 on 07/31/91 at 13:32:47 ..... 381
A.13 Test Translate DECIOS2 for OS/2 on 09/17/91 at 17:18:20 ....... 382
A.14 Test Translate DECI370 for S/370 on 12/15/91 at 18:32:23 ....... 386
A.15 Test Translate DMNATTR for S/370 on 08/23/91 at 09:49:52 ..... 390
A.16 Test Translate ENUMERAT for S/370 on 12/15/91 at 18:03:41 .... 392
A.17 Test Translate FLOAT16 for S/370 on 09/17/91 at 17:11:36 ...... 393
A.18 Test Translate FLOAT2 for S/370 on 12/15/91 at 18:05:35 ....... 395

These tests provide, at a minimum, complete code segment coverage. They have not been designed to provide complete path coverage.

Unclassified

A.1 Test Translate ASIS for S/370 on 08/15/91 at 13:35:52

```
-------------TEST 1:  Input Variables-------------
Procedure name        = ASIS

IN.TYPE               = ASIS
IN.LENGTH             = ADL<qualified identifier>
IN.MAXLEN             = 77
IN.UNITLEN            = 1
STATUS.SIGNIFICANT_I  = 31
STATUS.SYSTEM         = S/370
```

```
------------TEST 1:  Output Variables-------------
Procedure name        = ASIS ec = 0
OUT.LENGTH            = ADL<qualified identifier>
OUT.MAXALC            = default(TRUE)
OUT.MAXLEN            = 80
OUT.TERM              = <string data definition>
OUT.TYPE              = ASIS
OUT.UNITLEN           = 1
```

```
-------------TEST 2:  Input Variables-------------
Procedure name        = ASIS

IN.TYPE               = ASIS
IN.LENGTH             = ADL<qualified identifier>
IN.MAXLEN             = 55
IN.UNITLEN            = 8
STATUS.SIGNIFICANT_I  = 31
STATUS.SYSTEM         = S/370
```

```
------------TEST 2:  Output Variables-------------
Procedure name        = ASIS ec = 0
OUT.LENGTH            = ADL<qualified identifier>
OUT.MAXALC            = default(TRUE)
OUT.MAXLEN            = 55
OUT.TERM              = <string data definition>
OUT.TYPE              = ASIS
OUT.UNITLEN           = 8
```

```
-------------TEST 3:  Input Variables-------------
Procedure name        = ASIS

IN.TYPE               = ASIS
IN.LENGTH             = *
IN.MAXLEN             = 5
IN.UNITLEN            = 1
STATUS.SIGNIFICANT_I  = 31
STATUS.SYSTEM         = S/370
```

```
------------TEST 3:  Output Variables-------------
Procedure name        = ASIS ec = 0
OUT.LENGTH            = 8
OUT.TERM              = <string data definition>
OUT.TYPE              = ASIS
OUT.UNITLEN           = 1
```

Unclassified

```
-------------TEST 4:  Input Variables-------------
Procedure name       = ASIS

IN.TYPE              = ASIS
IN.LENGTH            = *
IN.MAXLEN            = 5
IN.UNITLEN           = 16
STATUS.SIGNIFICANT_I = 31
STATUS.SYSTEM        = S/370
```

```
-------------TEST 4:  Output Variables-------------
Procedure name       = ASIS ec = 0
OUT.LENGTH           = 5
OUT.TERM             = <string data definition>
OUT.TYPE             = ASIS
OUT.UNITLEN          = 16
```

```
-------------TEST 5:  Input Variables-------------
Procedure name       = ASIS

IN.TYPE              = ASIS
IN.LENGTH            = 18
IN.UNITLEN           = 1
STATUS.SIGNIFICANT_I = 31
STATUS.SYSTEM        = S/370
```

```
------------TEST 5:  Output Variables-------------
Procedure name       = ASIS ec = 0
OUT.LENGTH           = 24
OUT.TERM             = <string data definition>
OUT.TYPE             = ASIS
OUT.UNITLEN          = 1
```

```
-------------TEST 6:  Input Variables-------------
Procedure name       = ASIS

IN.TYPE              = ASIS
IN.LENGTH            = 18
IN.UNITLEN           = 8
STATUS.SIGNIFICANT_I = 31
STATUS.SYSTEM        = S/370
```

```
------------TEST 6:  Output Variables-------------
Procedure name       = ASIS ec = 0
OUT.LENGTH           = 18
OUT.TERM             = <string data definition>
OUT.TYPE             = ASIS
OUT.UNITLEN          = 8
```

A.2 Test Translate BINARY for OS/2 on 09/10/91 at 16:09:12

```
-------------TEST 3:  Input Variables-------------
Procedure name        = BINARY

IN.TYPE               = BINARY
IN.BYTRVS             = TRUE
IN.COMPLEX            = FALSE
IN.CONSTRAINED        = FALSE
IN.FIT                = TRUNCATE
IN.FLDSIZ             =
IN.LENGTH             = 16
IN.PRECISION          = 15
IN.RADIX              = 2
IN.SCALE              = 32
IN.SIGNED             = TRUE
STATUS.MAX_PRECISION  = 15
STATUS.SIGNIFICANT_I  = 31
STATUS.SYSTEM         = OS/2
```

```
------------TEST 3:  Output Variables-------------
Procedure name        = BINARY ec = 0
OUT.BYTRVS            = default(TRUE)
OUT.COMPLEX           = default(FALSE)
OUT.FIT               = default(TRUNCATE)
OUT.LENGTH            = default(32)
OUT.RADIX             = default(2)
OUT.TERM              = <float data definition>
OUT.TYPE              = FLOAT2
```

```
-------------TEST 4:  Input Variables-------------
Procedure name        = BINARY

IN.TYPE               = BINARY
IN.BYTRVS             = TRUE
IN.COMPLEX            = FALSE
IN.CONSTRAINED        = FALSE
IN.FIT                = TRUNCATE
IN.FLDSIZ             =
IN.LENGTH             = 64
IN.PRECISION          = 32
IN.RADIX              = 2
IN.SCALE              = 64
IN.SIGNED             = TRUE
STATUS.MAX_PRECISION  = 63
STATUS.SIGNIFICANT_I  = 31
STATUS.SYSTEM         = OS/2
```

```
------------TEST 4:  Output Variables-------------
Procedure name        = BINARY ec = 0
OUT.BYTRVS            = default(TRUE)
OUT.COMPLEX           = default(FALSE)
OUT.FIT               = default(TRUNCATE)
OUT.LENGTH            = 128
OUT.RADIX             = default(2)
OUT.TERM              = <long double data definition>
OUT.TYPE              = FLOAT2
```

```
-------------TEST 5:  Input Variables-------------
Procedure name        = BINARY

IN.TYPE               = BINARY
IN.BYTRVS             = TRUE
IN.COMPLEX            = FALSE
IN.CONSTRAINED        = FALSE
IN.FIT                = TRUNCATE
IN.FLDSIZ             =
IN.LENGTH             = 64
IN.PRECISION          = 63
IN.RADIX              = 2
IN.SCALE              = 64
IN.SIGNED             = TRUE
STATUS.MAX_PRECISION  = 63
STATUS.SIGNIFICANT_I  = 31
STATUS.SYSTEM         = OS/2
```

```
------------TEST 5:  Output Variables-------------
Procedure name        = BINARY ec = 0
OUT.BYTRVS            = default(TRUE)
OUT.COMPLEX           = default(FALSE)
OUT.FIT               = default(TRUNCATE)
OUT.LENGTH            = 128
OUT.RADIX             = default(2)
OUT.TERM              = <long double data definition>
OUT.TYPE              = FLOAT2
```

Unclassified

| Input | Output |
|---|---|
| -------------TEST 6: Input Variables-------------<br>Procedure name = BINARY<br><br>IN.TYPE = BINARY<br>IN.BYTRVS = TRUE<br>IN.COMPLEX = FALSE<br>IN.CONSTRAINED = FALSE<br>IN.FIT = TRUNCATE<br>IN.FLDSIZ =<br>IN.LENGTH = 32<br>IN.PRECISION = 32<br>IN.RADIX = 2<br>IN.SCALE = -32<br>IN.SIGNED = FALSE<br>STATUS.MAX_PRECISION = 32<br>STATUS.SIGNIFICANT_I = 31<br>STATUS.SYSTEM = OS/2 | ------------TEST 6: Output Variables-------------<br>Procedure name = BINARY ec = 0<br>OUT.BYTRVS = default(TRUE)<br>OUT.COMPLEX = default(FALSE)<br>OUT.FIT = default(TRUNCATE)<br>OUT.LENGTH = 64<br>OUT.RADIX = default(2)<br>OUT.TERM = <double data definition><br>OUT.TYPE = FLOAT2 |
| -------------TEST 7: Input Variables-------------<br>Procedure name = BINARY<br><br>IN.TYPE = BINARY<br>IN.BYTRVS = TRUE<br>IN.COMPLEX = FALSE<br>IN.CONSTRAINED = FALSE<br>IN.FIT = TRUNCATE<br>IN.FLDSIZ =<br>IN.LENGTH = 5<br>IN.PRECISION = 5<br>IN.RADIX = 2<br>IN.SCALE = -3<br>IN.SIGNED = FALSE<br>STATUS.MAX_PRECISION = 5<br>STATUS.SIGNIFICANT_I = 31<br>STATUS.SYSTEM = OS/2 | ------------TEST 7: Output Variables-------------<br>Procedure name = BINARY ec = 0<br>OUT.BYTRVS = default(TRUE)<br>OUT.COMPLEX = default(FALSE)<br>OUT.CONSTRAINED = default(FALSE)<br>OUT.FIT = default(TRUNCATE)<br>OUT.LENGTH = 8<br>OUT.PRECISION = 8<br>OUT.RADIX = default(2)<br>OUT.SCALE = default(0)<br>OUT.SIGNED = FALSE<br>OUT.TERM = <char data definition><br>OUT.TYPE = BINARY |
| -------------TEST 8: Input Variables-------------<br>Procedure name = BINARY<br><br>IN.TYPE = BINARY<br>IN.BYTRVS = TRUE<br>IN.COMPLEX = FALSE<br>IN.CONSTRAINED = FALSE<br>IN.FIT = TRUNCATE<br>IN.FLDSIZ =<br>IN.LENGTH = 12<br>IN.PRECISION = 12<br>IN.RADIX = 2<br>IN.SCALE = -4<br>IN.SIGNED = FALSE<br>STATUS.MAX_PRECISION = 12<br>STATUS.SIGNIFICANT_I = 31<br>STATUS.SYSTEM = OS/2 | ------------TEST 8: Output Variables-------------<br>Procedure name = BINARY ec = 0<br>OUT.BYTRVS = default(TRUE)<br>OUT.COMPLEX = default(FALSE)<br>OUT.CONSTRAINED = default(FALSE)<br>OUT.FIT = default(TRUNCATE)<br>OUT.LENGTH = 16<br>OUT.PRECISION = 16<br>OUT.RADIX = default(2)<br>OUT.SCALE = default(0)<br>OUT.SIGNED = FALSE<br>OUT.TERM = <int data definition><br>OUT.TYPE = BINARY |

Unclassified

```
------------TEST 9:  Input Variables------------
Procedure name      = BINARY

IN.TYPE             = BINARY
IN.BYTRVS           = TRUE
IN.COMPLEX          = FALSE
IN.CONSTRAINED      = FALSE
IN.FIT              = TRUNCATE
IN.FLDSIZ           =
IN.LENGTH           = 32
IN.PRECISION        = 31
IN.RADIX            = 2
IN.SCALE            = 0
IN.SIGNED           = TRUE
STATUS.MAX_PRECISION = 31
STATUS.SIGNIFICANT_I = 31
STATUS.SYSTEM       = OS/2
```

```
-----------TEST 9:  Output Variables------------
Procedure name      = BINARY ec = 0
OUT.BYTRVS          = default(TRUE)
OUT.COMPLEX         = default(FALSE)
OUT.CONSTRAINED     = default(FALSE)
OUT.FIT             = default(TRUNCATE)
OUT.LENGTH          = default(32)
OUT.PRECISION       = default(31)
OUT.RADIX           = default(2)
OUT.SCALE           = default(0)
OUT.SIGNED          = default(TRUE)
OUT.TERM            = <int data definition>
OUT.TYPE            = BINARY
```

```
-----------TEST 10:  Input Variables------------
Procedure name      = BINARY

IN.TYPE             = BINARY
IN.BYTRVS           = TRUE
IN.COMPLEX          = FALSE
IN.CONSTRAINED      = FALSE
IN.FIT              = TRUNCATE
IN.FLDSIZ           =
IN.LENGTH           = 5
IN.PRECISION        = 5
IN.RADIX            = 2
IN.SCALE            = 0
IN.SIGNED           = FALSE
STATUS.CONTAINING   = ARRAY
STATUS.MAX_PRECISION = 5
STATUS.SIGNIFICANT_I = 31
STATUS.SYSTEM       = OS/2
```

```
-----------TEST 10:  Output Variables-----------
Procedure name      = BINARY ec = 0
OUT.BYTRVS          = default(TRUE)
OUT.COMPLEX         = default(FALSE)
OUT.CONSTRAINED     = default(FALSE)
OUT.FIT             = default(TRUNCATE)
OUT.LENGTH          = 8
OUT.PRECISION       = 8
OUT.RADIX           = default(2)
OUT.SCALE           = default(0)
OUT.SIGNED          = FALSE
OUT.TERM            = <char data definition>
OUT.TYPE            = BINARY
```

```
-----------TEST 11:  Input Variables------------
Procedure name      = BINARY

IN.TYPE             = BINARY
IN.BYTRVS           = TRUE
IN.COMPLEX          = FALSE
IN.CONSTRAINED      = FALSE
IN.FIT              = TRUNCATE
IN.FLDSIZ           =
IN.LENGTH           = 11
IN.PRECISION        = 11
IN.RADIX            = 2
IN.SCALE            = 0
IN.SIGNED           = FALSE
STATUS.CONTAINING   = ARRAY
STATUS.MAX_PRECISION = 11
STATUS.SIGNIFICANT_I = 31
STATUS.SYSTEM       = OS/2
```

```
-----------TEST 11:  Output Variables-----------
Procedure name      = BINARY ec = 0
OUT.BYTRVS          = default(TRUE)
OUT.COMPLEX         = default(FALSE)
OUT.CONSTRAINED     = default(FALSE)
OUT.FIT             = default(TRUNCATE)
OUT.LENGTH          = 16
OUT.PRECISION       = 16
OUT.RADIX           = default(2)
OUT.SCALE           = default(0)
OUT.SIGNED          = FALSE
OUT.TERM            = <int data definition>
OUT.TYPE            = BINARY
```

Unclassified

```
------------TEST 12:  Input Variables-------------
Procedure name        = BINARY

IN.TYPE               = BINARY
IN.BYTRVS             = TRUE
IN.COMPLEX            = FALSE
IN.CONSTRAINED        = FALSE
IN.FIT                = TRUNCATE
IN.FLDSIZ             =
IN.LENGTH             = 7
IN.PRECISION          = 6
IN.RADIX              = 2
IN.SCALE              = 0
IN.SIGNED             = TRUE
STATUS.CONTAINING     = ARRAY
STATUS.MAX_PRECISION  = 6
STATUS.SIGNIFICANT_I  = 31
STATUS.SYSTEM         = OS/2
```

```
------------TEST 12:  Output Variables------------
Procedure name        = BINARY ec = 0
OUT.BYTRVS            = default(TRUE)
OUT.COMPLEX           = default(FALSE)
OUT.CONSTRAINED       = default(FALSE)
OUT.FIT               = default(TRUNCATE)
OUT.LENGTH            = 8
OUT.PRECISION         = 7
OUT.RADIX             = default(2)
OUT.SCALE             = default(0)
OUT.SIGNED            = default(TRUE)
OUT.TERM              = <char data definition>
OUT.TYPE              = BINARY
```

```
------------TEST 13:  Input Variables-------------
Procedure name        = BINARY

IN.TYPE               = BINARY
IN.BYTRVS             = TRUE
IN.COMPLEX            = FALSE
IN.CONSTRAINED        = FALSE
IN.FIT                = TRUNCATE
IN.FLDSIZ             =
IN.LENGTH             = 14
IN.PRECISION          = 13
IN.RADIX              = 2
IN.SCALE              = 0
IN.SIGNED             = TRUE
STATUS.CONTAINING     = ARRAY
STATUS.MAX_PRECISION  = 13
STATUS.SIGNIFICANT_I  = 31
STATUS.SYSTEM         = OS/2
```

```
------------TEST 13:  Output Variables------------
Procedure name        = BINARY ec = 0
OUT.BYTRVS            = default(TRUE)
OUT.COMPLEX           = default(FALSE)
OUT.CONSTRAINED       = default(FALSE)
OUT.FIT               = default(TRUNCATE)
OUT.LENGTH            = 16
OUT.PRECISION         = 15
OUT.RADIX             = default(2)
OUT.SCALE             = default(0)
OUT.SIGNED            = default(TRUE)
OUT.TERM              = <int data definition>
OUT.TYPE              = BINARY
```

```
------------TEST 14:  Input Variables-------------
Procedure name        = BINARY

IN.TYPE               = BINARY
IN.BYTRVS             = TRUE
IN.COMPLEX            = FALSE
IN.CONSTRAINED        = FALSE
IN.FIT                = TRUNCATE
IN.FLDSIZ             =
IN.LENGTH             = 13
IN.PRECISION          = 13
IN.RADIX              = 2
IN.SCALE              = 0
IN.SIGNED             = FALSE
STATUS.CONTAINING     = SEQUENCE
STATUS.MAX_PRECISION  = 13
STATUS.SIGNIFICANT_I  = 31
STATUS.SYSTEM         = OS/2
```

```
------------TEST 14:  Output Variables------------
Procedure name        = BINARY ec = 0
OUT.BYTRVS            = default(TRUE)
OUT.COMPLEX           = default(FALSE)
OUT.CONSTRAINED       = default(FALSE)
OUT.FIT               = default(TRUNCATE)
OUT.LENGTH            = 13
OUT.PRECISION         = 13
OUT.RADIX             = default(2)
OUT.SCALE             = default(0)
OUT.SIGNED            = FALSE
OUT.TERM              = <bit-field data definition>
OUT.TYPE              = BINARY
```

Unclassified

```
------------TEST 15:  Input Variables------------
Procedure name        = BINARY

IN.TYPE               = BINARY
IN.BYTRVS             = TRUE
IN.COMPLEX            = FALSE
IN.CONSTRAINED        = FALSE
IN.FIT                = TRUNCATE
IN.FLOSIZ             =
IN.LENGTH             = 14
IN.PRECISION          = 13
IN.RADIX              = 2
IN.SCALE              = 0
IN.SIGNED             = TRUE
STATUS.CONTAINING     = SEQUENCE
STATUS.MAX_PRECISION  = 13
STATUS.SIGNIFICANT_1  = 31
STATUS.SYSTEM         = OS/2
```

```
------------TEST 15:  Output Variables-----------
Procedure name        = BINARY ec = 0
OUT.BYTRVS            = default(TRUE)
OUT.COMPLEX           = default(FALSE)
OUT.CONSTRAINED       = default(FALSE)
OUT.FIT               = default(TRUNCATE)
OUT.LENGTH            = 14
OUT.PRECISION         = 13
OUT.RADIX             = default(2)
OUT.SCALE             = default(0)
OUT.SIGNED            = default(TRUE)
OUT.TERM              = <bit-field data definition>
OUT.TYPE              = BINARY
```

Unclassified

A.3 Test Translate BINARY for S/370 on 09/10/91 at 15:48:56

```
-------------TEST 1:  Input Variables-------------
Procedure name        = BINARY

IN.TYPE               = BINARY
IN.BYTRVS             = TRUE
IN.COMPLEX            = FALSE
IN.CONSTRAINED        = FALSE
IN.FIT                = TRUNCATE
IN.LENGTH             = 16
IN.PRECISION          = 15
IN.RADIX              = 2
IN.SCALE              = 0
IN.SIGNED             = TRUE
STATUS.MAX_PRECISION  = 15
STATUS.SIGNIFICANT_I  = 31
STATUS.SYSTEM         = S/370
```

```
------------TEST 1:  Output Variables-------------
Procedure name        = BINARY ec = 0
OUT.BYTRVS            = default(FALSE)
OUT.COMPLEX           = default(FALSE)
OUT.CONSTRAINED       = default(FALSE)
OUT.FIT               = default(TRUNCATE)
OUT.LENGTH            = 16
OUT.PRECISION         = 15
OUT.RADIX             = default(2)
OUT.SCALE             = default(0)
OUT.SIGNED            = default(TRUE)
OUT.TERM              = <int data definition>
OUT.TYPE              = BINARY
```

```
-------------TEST 2:  Input Variables-------------
Procedure name        = BINARY

IN.TYPE               = BINARY
IN.BYTRVS             = TRUE
IN.COMPLEX            = FALSE
IN.CONSTRAINED        = FALSE
IN.FIT                = TRUNCATE
IN.LENGTH             = 16
IN.PRECISION          = 31
IN.RADIX              = 2
IN.SCALE              = 0
IN.SIGNED             = TRUE
STATUS.MAX_PRECISION  = 15
STATUS.SIGNIFICANT_I  = 31
STATUS.SYSTEM         = S/370
```

```
------------TEST 2:  Output Variables-------------
Procedure name        = BINARY ec = 0
OUT.BYTRVS            = default(FALSE)
OUT.COMPLEX           = default(FALSE)
OUT.CONSTRAINED       = default(FALSE)
OUT.FIT               = default(TRUNCATE)
OUT.LENGTH            = 16
OUT.PRECISION         = 15
OUT.RADIX             = default(2)
OUT.SCALE             = default(0)
OUT.SIGNED            = default(TRUE)
OUT.TERM              = <int data definition>
OUT.TYPE              = BINARY
```

```
-------------TEST 3:  Input Variables-------------
Procedure name        = BINARY

IN.TYPE               = BINARY
IN.BYTRVS             = TRUE
IN.COMPLEX            = FALSE
IN.CONSTRAINED        = FALSE
IN.FIT                = TRUNCATE
IN.LENGTH             = 16
IN.PRECISION          = 15
IN.RADIX              = 2
IN.SCALE              = 30
IN.SIGNED             = TRUE
STATUS.MAX_PRECISION  = 15
STATUS.SIGNIFICANT_I  = 31
STATUS.SYSTEM         = S/370
```

```
------------TEST 3:  Output Variables-------------
Procedure name        = BINARY ec = 0
OUT.BYTRVS            = default(FALSE)
OUT.COMPLEX           = default(FALSE)
OUT.FIT               = default(TRUNCATE)
OUT.LENGTH            = default(32)
OUT.RADIX             = default(2)
OUT.TERM              = <float data definition>
OUT.TYPE              = FLOAT16
```

Unclassified

```
-------------TEST 4:  Input Variables-------------
Procedure name        = BINARY

IN.TYPE               = BINARY
IN.BYTRVS             = TRUE
IN.COMPLEX            = FALSE
IN.CONSTRAINED        = FALSE
IN.FIT                = TRUNCATE
IN.LENGTH             = 54
IN.PRECISION          = 53
IN.RADIX              = 2
IN.SCALE              = 0
IN.SIGNED             = TRUE
STATUS.MAX_PRECISION  = 53
STATUS.SIGNIFICANT_I  = 31
STATUS.SYSTEM         = S/370
```

```
------------TEST 4:  Output Variables-------------
Procedure name        = BINARY ec = 0
OUT.BYTRVS            = default(FALSE)
OUT.COMPLEX           = default(FALSE)
OUT.FIT               = default(TRUNCATE)
OUT.LENGTH            = 64
OUT.RADIX             = default(2)
OUT.TERM              = <double data definition>
OUT.TYPE              = FLOAT16
```

```
-------------TEST 5:  Input Variables-------------
Procedure name        = BINARY

IN.TYPE               = BINARY
IN.BYTRVS             = TRUE
IN.COMPLEX            = FALSE
IN.CONSTRAINED        = FALSE
IN.FIT                = TRUNCATE
IN.LENGTH             = 64
IN.PRECISION          = 63
IN.RADIX              = 2
IN.SCALE              = 0
IN.SIGNED             = TRUE
STATUS.MAX_PRECISION  = 63
STATUS.SIGNIFICANT_I  = 31
STATUS.SYSTEM         = S/370
```

```
------------TEST 5:  Output Variables-------------
Procedure name        = BINARY ec = 0
OUT.BYTRVS            = default(FALSE)
OUT.COMPLEX           = default(FALSE)
OUT.FIT               = default(TRUNCATE)
OUT.LENGTH            = 128
OUT.RADIX             = default(2)
OUT.TERM              = <long double data definition>
OUT.TYPE              = FLOAT16
```

```
-------------TEST 6:  Input Variables-------------
Procedure name        = BINARY

IN.TYPE               = BINARY
IN.BYTRVS             = TRUE
IN.COMPLEX            = FALSE
IN.CONSTRAINED        = FALSE
IN.FIT                = TRUNCATE
IN.LENGTH             = 24
IN.PRECISION          = 23
IN.RADIX              = 2
IN.SCALE              = -100
IN.SIGNED             = TRUE
STATUS.MAX_PRECISION  = 23
STATUS.SIGNIFICANT_I  = 31
STATUS.SYSTEM         = S/370
```

```
------------TEST 6:  Output Variables-------------
Procedure name        = BINARY ec = 0
OUT.BYTRVS            = default(FALSE)
OUT.COMPLEX           = default(FALSE)
OUT.FIT               = default(TRUNCATE)
OUT.LENGTH            = default(32)
OUT.RADIX             = default(2)
OUT.TERM              = <float data definition>
OUT.TYPE              = FLOAT16
```

Unclassified

```
-------------TEST 7:  Input Variables-------------
Procedure name       = BINARY

IN.TYPE              = BINARY
IN.BYTRVS            = TRUE
IN.COMPLEX           = FALSE
IN.CONSTRAINED       = FALSE
IN.FIT               = TRUNCATE
IN.LENGTH            = 53
IN.PRECISION         = 53
IN.RADIX             = 2
IN.SCALE             = -100
IN.SIGNED            = TRUE
STATUS.MAX_PRECISION = 52
STATUS.SIGNIFICANT_I = 31
STATUS.SYSTEM        = S/370
```

```
------------TEST 7:  Output Variables-------------
Procedure name       = BINARY ec = 0
OUT.BYTRVS           = default(FALSE)
OUT.COMPLEX          = default(FALSE)
OUT.FIT              = default(TRUNCATE)
OUT.LENGTH           = 64
OUT.RADIX            = default(2)
OUT.TERM             = <double data definition>
OUT.TYPE             = FLOAT16
```

```
-------------TEST 8:  Input Variables-------------
Procedure name       = BINARY

IN.TYPE              = BINARY
IN.BYTRVS            = TRUE
IN.COMPLEX           = FALSE
IN.CONSTRAINED       = FALSE
IN.FIT               = TRUNCATE
IN.LENGTH            = 64
IN.PRECISION         = 63
IN.RADIX             = 2
IN.SCALE             = -100
IN.SIGNED            = TRUE
STATUS.MAX_PRECISION = 63
STATUS.SIGNIFICANT_I = 31
STATUS.SYSTEM        = S/370
```

```
------------TEST 8:  Output Variables-------------
Procedure name       = BINARY ec = 0
OUT.BYTRVS           = default(FALSE)
OUT.COMPLEX          = default(FALSE)
OUT.FIT              = default(TRUNCATE)
OUT.LENGTH           = 128
OUT.RADIX            = default(2)
OUT.TERM             = <long double data definition>
OUT.TYPE             = FLOAT16
```

```
-------------TEST 9:  Input Variables-------------
Procedure name       = BINARY

IN.TYPE              = BINARY
IN.BYTRVS            = TRUE
IN.COMPLEX           = FALSE
IN.CONSTRAINED       = FALSE
IN.FIT               = TRUNCATE
IN.LENGTH            = 8
IN.PRECISION         = 7
IN.RADIX             = 2
IN.SCALE             = 0
IN.SIGNED            = TRUE
STATUS.MAX_PRECISION = 7
STATUS.SIGNIFICANT_I = 31
STATUS.SYSTEM        = S/370
```

```
------------TEST 9:  Output Variables-------------
Procedure name       = BINARY ec = 0
OUT.BYTRVS           = default(FALSE)
OUT.COMPLEX          = default(FALSE)
OUT.CONSTRAINED      = default(FALSE)
OUT.FIT              = default(TRUNCATE)
OUT.LENGTH           = 8
OUT.PRECISION        = 7
OUT.RADIX            = default(2)
OUT.SCALE            = default(0)
OUT.SIGNED           = default(TRUE)
OUT.TERM             = <char data definition>
OUT.TYPE             = BINARY
```

```
------------TEST 10:  Input Variables-------------
Procedure name        = BINARY

IN.TYPE               = BINARY
IN.BYTRVS             = TRUE
IN.COMPLEX            = FALSE
IN.CONSTRAINED        = FALSE
IN.FIT                = TRUNCATE
IN.LENGTH             = 16
IN.PRECISION          = 16
IN.RADIX              = 2
IN.SCALE              = 0
IN.SIGNED             = FALSE
STATUS.MAX_PRECISION  = 16
STATUS.SIGNIFICANT_I  = 31
STATUS.SYSTEM         = S/370
```

```
------------TEST 10:  Output Variables------------
Procedure name        = BINARY ec = 0
OUT.BYTRVS            = default(FALSE)
OUT.COMPLEX           = default(FALSE)
OUT.CONSTRAINED       = default(FALSE)
OUT.FIT               = default(TRUNCATE)
OUT.LENGTH            = 16
OUT.PRECISION         = 16
OUT.RADIX             = default(2)
OUT.SCALE             = default(0)
OUT.SIGNED            = FALSE
OUT.TERM              = <int data definition>
OUT.TYPE              = BINARY
```

```
------------TEST 11:  Input Variables-------------
Procedure name        = BINARY

IN.TYPE               = BINARY
IN.BYTRVS             = TRUE
IN.COMPLEX            = FALSE
IN.CONSTRAINED        = FALSE
IN.FIT                = TRUNCATE
IN.LENGTH             = 32
IN.PRECISION          = 32
IN.RADIX              = 2
IN.SCALE              = 0
IN.SIGNED             = FALSE
STATUS.MAX_PRECISION  = 32
STATUS.SIGNIFICANT_I  = 31
STATUS.SYSTEM         = S/370
```

```
------------TEST 11:  Output Variables------------
Procedure name        = BINARY ec = 0
OUT.BYTRVS            = default(FALSE)
OUT.COMPLEX           = default(FALSE)
OUT.CONSTRAINED       = default(FALSE)
OUT.FIT               = default(TRUNCATE)
OUT.LENGTH            = default(32)
OUT.PRECISION         = 32
OUT.RADIX             = default(2)
OUT.SCALE             = default(0)
OUT.SIGNED            = FALSE
OUT.TERM              = <int data definition>
OUT.TYPE              = BINARY
```

```
------------TEST 12:  Input Variables-------------
Procedure name        = BINARY

IN.TYPE               = BINARY
IN.BYTRVS             = TRUE
IN.COMPLEX            = FALSE
IN.CONSTRAINED        = FALSE
IN.FIT                = TRUNCATE
IN.LENGTH             = 8
IN.PRECISION          = 8
IN.RADIX              = 2
IN.SCALE              = 0
IN.SIGNED             = FALSE
STATUS.CONTAINING     = ARRAY
STATUS.MAX_PRECISION  = 8
STATUS.SIGNIFICANT_I  = 31
STATUS.SYSTEM         = S/370
```

```
------------TEST 12:  Output Variables------------
Procedure name        = BINARY ec = 0
OUT.BYTRVS            = default(FALSE)
OUT.COMPLEX           = default(FALSE)
OUT.CONSTRAINED       = default(FALSE)
OUT.FIT               = default(TRUNCATE)
OUT.LENGTH            = 8
OUT.PRECISION         = 8
OUT.RADIX             = default(2)
OUT.SCALE             = default(0)
OUT.SIGNED            = FALSE
OUT.TERM              = <char data definition>
OUT.TYPE              = BINARY
```

```
------------TEST 13:  Input Variables-------------
Procedure name        = BINARY

IN.TYPE               = BINARY
IN.BYTRVS             = TRUE
IN.COMPLEX            = FALSE
IN.CONSTRAINED        = FALSE
IN.FIT                = TRUNCATE
IN.LENGTH             = 11
IN.PRECISION          = 11
IN.RADIX              = 2
IN.SCALE              = 0
IN.SIGNED             = FALSE
STATUS.CONTAINING     = ARRAY
STATUS.MAX_PRECISION  = 11
STATUS.SIGNIFICANT_I  = 31
STATUS.SYSTEM         = S/370
```

```
------------TEST 13:  Output Variables------------
Procedure name        = BINARY ec = 0
OUT.BYTRVS            = default(FALSE)
OUT.COMPLEX           = default(FALSE)
OUT.CONSTRAINED       = default(FALSE)
OUT.FIT               = default(TRUNCATE)
OUT.LENGTH            = 16
OUT.PRECISION         = 16
OUT.RADIX             = default(2)
OUT.SCALE             = default(0)
OUT.SIGNED            = FALSE
OUT.TERM              = <int data definition>
OUT.TYPE              = BINARY
```

```
------------TEST 14:  Input Variables-------------
Procedure name        = BINARY

IN.TYPE               = BINARY
IN.BYTRVS             = TRUE
IN.COMPLEX            = FALSE
IN.CONSTRAINED        = FALSE
IN.FIT                = TRUNCATE
IN.LENGTH             = 8
IN.PRECISION          = 7
IN.RADIX              = 2
IN.SCALE              = 0
IN.SIGNED             = TRUE
STATUS.CONTAINING     = ARRAY
STATUS.MAX_PRECISION  = 7
STATUS.SIGNIFICANT_I  = 31
STATUS.SYSTEM         = S/370
```

```
------------TEST 14:  Output Variables------------
Procedure name        = BINARY ec = 0
OUT.BYTRVS            = default(FALSE)
OUT.COMPLEX           = default(FALSE)
OUT.CONSTRAINED       = default(FALSE)
OUT.FIT               = default(TRUNCATE)
OUT.LENGTH            = 8
OUT.PRECISION         = 7
OUT.RADIX             = default(2)
OUT.SCALE             = default(0)
OUT.SIGNED            = default(TRUE)
OUT.TERM              = <char data definition>
OUT.TYPE              = BINARY
```

```
------------TEST 15:  Input Variables-------------
Procedure name        = BINARY

IN.TYPE               = BINARY
IN.BYTRVS             = TRUE
IN.COMPLEX            = FALSE
IN.CONSTRAINED        = FALSE
IN.FIT                = TRUNCATE
IN.LENGTH             = 22
IN.PRECISION          = 21
IN.RADIX              = 2
IN.SCALE              = 0
IN.SIGNED             = TRUE
STATUS.CONTAINING     = ARRAY
STATUS.MAX_PRECISION  = 21
STATUS.SIGNIFICANT_I  = 31
STATUS.SYSTEM         = S/370
```

```
------------TEST 15:  Output Variables------------
Procedure name        = BINARY ec = 0
OUT.BYTRVS            = default(FALSE)
OUT.COMPLEX           = default(FALSE)
OUT.CONSTRAINED       = default(FALSE)
OUT.FIT               = default(TRUNCATE)
OUT.LENGTH            = 24
OUT.PRECISION         = 23
OUT.RADIX             = default(2)
OUT.SCALE             = default(0)
OUT.SIGNED            = default(TRUE)
OUT.TERM              = <int data definition>
OUT.TYPE              = BINARY
```

Unclassified

```
------------TEST 16:  Input Variables-------------
Procedure name        = BINARY

IN.TYPE               = BINARY
IN.BYTRVS             = TRUE
IN.COMPLEX            = FALSE
IN.CONSTRAINED        = FALSE
IN.FIT                = TRUNCATE
IN.LENGTH             = 21
IN.PRECISION          = 21
IN.RADIX              = 2
IN.SCALE              = 0
IN.SIGNED             = FALSE
STATUS.CONTAINING     = SEQUENCE
STATUS.MAX_PRECISION  = 21
STATUS.SIGNIFICANT_I  = 31
STATUS.SYSTEM         = S/370
```

```
------------TEST 16:  Output Variables------------
Procedure name        = BINARY ec = 0
OUT.BYTRVS            = default(FALSE)
OUT.COMPLEX           = default(FALSE)
OUT.CONSTRAINED       = default(FALSE)
OUT.FIT               = default(TRUNCATE)
OUT.LENGTH            = 21
OUT.PRECISION         = 21
OUT.RADIX             = default(2)
OUT.SCALE             = default(0)
OUT.SIGNED            = FALSE
OUT.TERM              = <bit-field data definition>
OUT.TYPE              = BINARY
```

```
------------TEST 17:  Input Variables-------------
Procedure name        = BINARY

IN.TYPE               = BINARY
IN.BYTRVS             = TRUE
IN.COMPLEX            = FALSE
IN.CONSTRAINED        = FALSE
IN.FIT                = TRUNCATE
IN.LENGTH             = 22
IN.PRECISION          = 21
IN.RADIX              = 2
IN.SCALE              = 0
IN.SIGNED             = TRUE
STATUS.CONTAINING     = SEQUENCE
STATUS.MAX_PRECISION  = 21
STATUS.SIGNIFICANT_I  = 31
STATUS.SYSTEM         = S/370
```

```
------------TEST 17:  Output Variables------------
Procedure name        = BINARY ec = 0
OUT.BYTRVS            = default(FALSE)
OUT.COMPLEX           = default(FALSE)
OUT.CONSTRAINED       = default(FALSE)
OUT.FIT               = default(TRUNCATE)
OUT.LENGTH            = 22
OUT.PRECISION         = 21
OUT.RADIX             = default(2)
OUT.SCALE             = default(0)
OUT.SIGNED            = default(TRUE)
OUT.TERM              = <bit-field data definition>
OUT.TYPE              = BINARY
```

Unclassified

A.4 Test Translate BIT for S/370 on 08/15/91 at 15:03:12

```
-------------TEST 1:  Input Variables-------------
Procedure name        = BIT

IN.TYPE               = BIT
IN.LENGTH             = ADL<qualified identifier>
IN.MAXLEN             = 2044
STATUS.SIGNIFICANT_I  = 31
STATUS.SYSTEM         = S/370
```

```
------------TEST 1:  Output Variables-------------
Procedure name       = BIT ec = 0
OUT.LENGTH           = ADL<qualified identifier>
OUT.MAXALC           = default(TRUE)
OUT.MAXLEN           = 2048
OUT.TERM             = <string data definition>
OUT.TYPE             = ASIS
OUT.UNITLEN          = 1
```

```
-------------TEST 2:  Input Variables-------------
Procedure name        = BIT

IN.TYPE               = BIT
IN.LENGTH             = *
IN.MAXLEN             = 77
STATUS.SIGNIFICANT_I  = 31
STATUS.SYSTEM         = S/370
```

```
------------TEST 2:  Output Variables-------------
Procedure name       = BIT ec = 0
OUT.LENGTH           = 10
OUT.TERM             = <string data definition>
OUT.TYPE             = ASIS
OUT.UNITLEN          = 8
```

```
-------------TEST 3:  Input Variables-------------
Procedure name        = BIT

IN.TYPE               = BIT
IN.LENGTH             = 128
IN.MAXLEN             =
STATUS.SIGNIFICANT_I  = 31
STATUS.SYSTEM         = S/370
```

```
------------TEST 3:  Output Variables-------------
Procedure name       = BIT ec = 0
OUT.LENGTH           = 16
OUT.TERM             = <string data definition>
OUT.TYPE             = ASIS
OUT.UNITLEN          = 1
```

Unclassified

| -------------TEST 4: Input Variables------------- | | -----------TEST 4: Output Variables------------- | |
|---|---|---|---|
| Procedure name | = BIT | Procedure name | = BIT ec = 0 |
| | | OUT.LENGTH | = 3 |
| IN.TYPE | = BIT | OUT.TERM | = <string data definition> |
| IN.LENGTH | = 17 | OUT.TYPE | = ASIS |
| IN.MAXLEN | = | OUT.UNITLEN | = 8 |
| STATUS.SIGNIFICANT_I | = 31 | | |
| STATUS.SYSTEM | = S/370 | | |

Unclassified

A.5 Test Translate BITPRE for S/370 on 09/04/91 at 16:23:35

```
------------TEST 1:  Input Variables------------
Procedure name       = BITPRE

IN.TYPE              = BITPRE
IN.MAXLEN            = 2043
IN.NAME              = member_name
IN.PRELEN            = 32
STATUS.GEN_ID_NUM    = 1
STATUS.SIGNIFICANT_I = 31
STATUS.SYSTEM        = OS/2
```

```
------------TEST 1:  Output Variables------------
Procedure name       = BITPRE ec = 0
OUT.1.BYTRVS         = default(TRUE)
OUT.1.COMPLEX        = default(FALSE)
OUT.1.CONSTRAINED    = default(FALSE)
OUT.1.FIT            = default(TRUNCATE)
OUT.1.LENGTH         = 32
OUT.1.NAME           = member_name_LEN
OUT.1.PRECISION      = default(31)
OUT.1.RADIX          = default(2)
OUT.1.SCALE          = default(0)
OUT.1.SIGNED         = default(TRUE)
OUT.1.TERM           = <int data definition>
OUT.1.TYPE           = BINARY
OUT.2.LENGTH         = member_name_LEN
OUT.2.MAXALC         = default(TRUE)
OUT.2.MAXLEN         = 2048
OUT.2.NAME           = member_name
OUT.2.TERM           = <string data definition>
OUT.2.TYPE           = ASIS
OUT.2.UNITLEN        = 1
```

```
------------TEST 2:  Input Variables------------
Procedure name       = BITPRE

IN.TYPE              = BITPRE
IN.MAXLEN            = 77
IN.NAME              = member_name
IN.PRELEN            = 16
STATUS.GEN_ID_NUM    = 1
STATUS.SIGNIFICANT_I = 31
STATUS.SYSTEM        = S/370
```

```
------------TEST 2:  Output Variables------------
Procedure name       = BITPRE ec = 0
OUT.1.BYTRVS         = default(FALSE)
OUT.1.COMPLEX        = default(FALSE)
OUT.1.CONSTRAINED    = default(FALSE)
OUT.1.FIT            = default(TRUNCATE)
OUT.1.LENGTH         = 16
OUT.1.NAME           = member_name_LEN
OUT.1.PRECISION      = 15
OUT.1.RADIX          = default(2)
OUT.1.SCALE          = default(0)
OUT.1.SIGNED         = default(TRUE)
OUT.1.TERM           = <int data definition>
OUT.1.TYPE           = BINARY
OUT.2.LENGTH         = member_name_LEN
OUT.2.MAXALC         = default(TRUE)
OUT.2.MAXLEN         = 80
OUT.2.NAME           = member_name
OUT.2.TERM           = <string data definition>
OUT.2.TYPE           = ASIS
OUT.2.UNITLEN        = 1
```

Unclassified

A.6 Test Translate BOOLEAN for S/370 on 08/08/91 at 10:25:51

```
-------------TEST 1:  Input Variables-------------
Procedure name        = BOOLEAN

IN.TYPE               = BOOLEAN
IN.BLNENC             = LSTBIT
IN.BYTRVS             = FALSE
IN.LENGTH             = 8
IN.NAME               = additional_employee_information
STATUS.SIGNIFICANT_I  = 31
STATUS.SYSTEM         = S/370
```

```
------------TEST 1:  Output Variables-------------
Procedure name        = BOOLEAN ec = 0
OUT.1.BLNENC          = default(LSTBIT)
OUT.1.BYTRVS          = default(FALSE)
OUT.1.LENGTH          = default(8)
OUT.1.NAME            = boolean_t
OUT.1.TERM            = <boolean_t data declaration>
OUT.1.TYPE            = SUBTYPE OF BOOLEAN
OUT.2.NAME            = additional_employee_information
OUT.2.TERM            = <boolean_t data definition>
OUT.2.TYPE            = boolean_t
```

Unclassified

A.7 Test Translate CHAR for OS/2 on 07/31/91 at 13:30:42

```
-------------TEST 1:  Input Variables-------------
Procedure name        = CHAR

IN.TYPE               = CHAR
IN.CCSID              = 0
IN.LENGTH             = *
IN.MAXLEN             = 2048
STATUS.OPTIONS        = ALIGNED
STATUS.SYSTEM         = OS/2
```

```
------------TEST 1:  Output Variables-------------
Procedure name        = G.CHAR ec = 0
OUT.TYPE              = CHARSFX
OUT.MAXALC            = TRUE
OUT.MAXLEN            = 2048
```

```
-------------TEST 2:  Input Variables-------------
Procedure name        = CHAR

IN.TYPE               = CHAR
IN.CCSID              = 0
IN.LENGTH             = ADL<qualified identifier>
IN.MAXLEN             = 65535
STATUS.OPTIONS        = ALIGNED
STATUS.SYSTEM         = OS/2
```

```
------------TEST 2:  Output Variables-------------
Procedure name        = G.CHAR ec = 0
OUT.TYPE              = CHAR
OUT.JUSTIFY           = default(LEFT)
OUT.LENGTH            = ADL<qualified identifier>
OUT.MAXALC            = TRUE
OUT.MAXLEN            = 65535
```

```
-------------TEST 3:  Input Variables-------------
Procedure name        = CHAR

IN.TYPE               = CHAR
IN.CCSID              = 0
IN.HIGH               = 80
IN.LENGTH             =
IN.LOW                = ADL<qualified identifier>
IN.MAXLEN             = 80
STATUS.OPTIONS        = ALIGNED
STATUS.SYSTEM         = OS/2
```

```
------------TEST 3:  Output Variables-------------
Procedure name        = G.CHAR ec = 0
OUT.TYPE              = CHAR
OUT.JUSTIFY           = default(LEFT)
OUT.LENGTH            = ADL<qualified identifier>
OUT.MAXALC            = TRUE
OUT.MAXLEN            = 80
```

Unclassified

```
-------------TEST 4:  Input Variables-------------
Procedure name        = CHAR

IN.TYPE               = CHAR
IN.CCSID              = 0
IN.HIGH               = ADL<qualified identifier>
IN.LENGTH             =
IN.LOW                = 1
IN.MAXLEN             = 1048574
STATUS.OPTIONS        = ALIGNED
STATUS.SYSTEM         = OS/2
```

```
------------TEST 4:  Output Variables-------------
Procedure name        = G.CHAR ec = 0
OUT.TYPE              = CHAR
OUT.JUSTIFY           = default(LEFT)
OUT.LENGTH            = ADL<qualified identifier>
OUT.MAXALC            = TRUE
OUT.MAXLEN            = 1048574
```

```
-------------TEST 5:  Input Variables-------------
Procedure name        = CHAR

IN.TYPE               = CHAR
IN.CCSID              = 0
IN.HIGH               = 80
IN.LENGTH             =
IN.LOW                = 41
IN.MAXLEN             =
STATUS.OPTIONS        = ALIGNED
STATUS.SYSTEM         = OS/2
```

```
------------TEST 5:  Output Variables-------------
Procedure name        = G.CHAR ec = 0
OUT.TYPE              = CHAR
OUT.JUSTIFY           = default(LEFT)
OUT.LENGTH            = 40
```

```
-------------TEST 6:  Input Variables-------------
Procedure name        = CHAR

IN.TYPE               = CHAR
IN.CCSID              = 0
IN.HIGH               =
IN.LENGTH             = 255
IN.LOW                =
IN.MAXLEN             =
STATUS.OPTIONS        = ALIGNED
STATUS.SYSTEM         = OS/2
```

```
------------TEST 6:  Output Variables-------------
Procedure name        = G.CHAR ec = 0
OUT.TYPE              = CHAR
OUT.JUSTIFY           = default(LEFT)
OUT.LENGTH            = 255
```

```
-------------TEST 7:  Input Variables-------------
Procedure name        = CHAR

IN.TYPE               = CHAR
IN.CCSID              = 0
IN.HIGH               =
IN.LENGTH             = *
IN.LOW                =
IN.MAXLEN             = 2048
STATUS.OPTIONS        = LIST
STATUS.SYSTEM         = OS/2
```

```
------------TEST 7:  Output Variables-------------
Procedure name        = G.CHAR ec = 0
OUT.TYPE              = CHARSFX
OUT.MAXALC            = FALSE
OUT.MAXLEN            = 2048
```

Unclassified

| Input | Output |
|---|---|
| -------------TEST 8: Input Variables-------------<br>Procedure name = CHAR<br><br>IN.TYPE = CHAR<br>IN.CCSID = 0<br>IN.HIGH =<br>IN.LENGTH = ADL<qualified identifier><br>IN.LOW =<br>IN.MAXLEN = 65535<br>STATUS.OPTIONS = LIST<br>STATUS.SYSTEM = OS/2 | ------------TEST 8: Output Variables-------------<br>Procedure name = G.CHAR ec = 0<br>OUT.TYPE = CHAR<br>OUT.JUSTIFY = default(LEFT)<br>OUT.LENGTH = ADL<qualified identifier><br>OUT.MAXALC = FALSE<br>OUT.MAXLEN = 65535 |
| -------------TEST 9: Input Variables-------------<br>Procedure name = CHAR<br><br>IN.TYPE = CHAR<br>IN.CCSID = 0<br>IN.HIGH = 80<br>IN.LENGTH =<br>IN.LOW = ADL<qualified identifier><br>IN.MAXLEN = 80<br>STATUS.OPTIONS = LIST<br>STATUS.SYSTEM = OS/2 | ------------TEST 9: Output Variables-------------<br>Procedure name = G.CHAR ec = 0<br>OUT.TYPE = CHAR<br>OUT.JUSTIFY = default(LEFT)<br>OUT.LENGTH = ADL<qualified identifier><br>OUT.MAXALC = FALSE<br>OUT.MAXLEN = 80 |
| ------------TEST 10: Input Variables-------------<br>Procedure name = CHAR<br><br>IN.TYPE = CHAR<br>IN.CCSID = 0<br>IN.HIGH = ADL<qualified identifier><br>IN.LENGTH =<br>IN.LOW = 1<br>IN.MAXLEN = 1048574<br>STATUS.OPTIONS = LIST<br>STATUS.SYSTEM = OS/2 | ------------TEST 10: Output Variables------------<br>Procedure name = G.CHAR ec = 0<br>OUT.TYPE = CHAR<br>OUT.JUSTIFY = default(LEFT)<br>OUT.LENGTH = ADL<qualified identifier><br>OUT.MAXALC = FALSE<br>OUT.MAXLEN = 1048574 |
| ------------TEST 11: Input Variables-------------<br>Procedure name = CHAR<br><br>IN.TYPE = CHAR<br>IN.CCSID = 0<br>IN.HIGH = 80<br>IN.LENGTH =<br>IN.LOW = 41<br>IN.MAXLEN =<br>STATUS.OPTIONS = LIST<br>STATUS.SYSTEM = OS/2 | ------------TEST 11: Output Variables------------<br>Procedure name = G.CHAR ec = 0<br>OUT.TYPE = CHAR<br>OUT.JUSTIFY = default(LEFT)<br>OUT.LENGTH = 40 |

Unclassified

| ------------TEST 12: Input Variables------------- | | ------------TEST 12: Output Variables------------ | |
|---|---|---|---|
| Procedure name | = CHAR | Procedure name | = G.CHAR ec = 0 |
| | | OUT.TYPE | = CHAR |
| IN.TYPE | = CHAR | OUT.JUSTIFY | = default(LEFT) |
| IN.CCSID | = 0 | OUT.LENGTH | = 255 |
| IN.HIGH | = | | |
| IN.LENGTH | = 255 | | |
| IN.LOW | = | | |
| IN.MAXLEN | = | | |
| STATUS.OPTIONS | = LIST | | |
| STATUS.SYSTEM | = OS/2 | | |

A.8 Test Translate CHAR for S/370 on 08/15/91 at 17:39:09

```
-------------TEST 1:  Input Variables-------------
Procedure name         = CHAR

IN.TYPE                = CHAR
IN.CCSID               = 0
IN.JUSTIFY             = LEFT
IN.LENGTH              = *
IN.MAXLEN              = 2048
IN.UNITLEN             = 8
STATUS.OPTIONS         = ALIGNED
STATUS.SIGNIFICANT_I   = 31
STATUS.SYSTEM          = S/370
```

```
------------TEST 1:  Output Variables-------------
Procedure name         = CHAR ec = 0
OUT.MAXALC             = TRUE
OUT.MAXLEN             = 2048
OUT.SFXENC             = default(X00)
OUT.TERM               = <string data definition>
OUT.TYPE               = CHARSFX
OUT.UNITLEN            = 8
```

```
-------------TEST 2:  Input Variables-------------
Procedure name         = CHAR

IN.TYPE                = CHAR
IN.CCSID               = 0
IN.JUSTIFY             = LEFT
IN.LENGTH              = *
IN.MAXLEN              = 1024
IN.UNITLEN             = 16
STATUS.OPTIONS         = ALIGNED
STATUS.SIGNIFICANT_I   = 31
STATUS.SYSTEM          = S/370
```

```
------------TEST 2:  Output Variables-------------
Procedure name         = CHAR ec = 0
OUT.MAXALC             = TRUE
OUT.MAXLEN             = 1024
OUT.SFXENC             = X0000
OUT.TERM               = <string data definition>
OUT.TYPE               = CHARSFX
OUT.UNITLEN            = 16
```

```
-------------TEST 3:  Input Variables-------------
Procedure name         = CHAR

IN.TYPE                = CHAR
IN.CCSID               = 0
IN.JUSTIFY             = LEFT
IN.LENGTH              = ADL<qualified identifier>
IN.MAXLEN              = 65535
IN.UNITLEN             = 16
STATUS.OPTIONS         = ALIGNED
STATUS.SIGNIFICANT_I   = 31
STATUS.SYSTEM          = S/370
```

```
------------TEST 3:  Output Variables-------------
Procedure name         = CHAR ec = 0
OUT.JUSTIFY            = default(LEFT)
OUT.LENGTH             = ADL<qualified identifier>
OUT.MAXALC             = TRUE
OUT.MAXLEN             = 65535
OUT.TERM               = <char data definition>
OUT.TYPE               = CHAR
OUT.UNITLEN            = 16
```

Unclassified

| Input Variables | Output Variables |
| --- | --- |
| ------------TEST 4: Input Variables------------<br>Procedure name = CHAR<br><br>IN.TYPE = CHAR<br>IN.CCSID = 0<br>IN.HIGH = 80<br>IN.JUSTIFY = LEFT<br>IN.LOW = ADL<qualified identifier><br>IN.MAXLEN = 80<br>IN.UNITLEN = 16<br>STATUS.OPTIONS = ALIGNED<br>STATUS.SIGNIFICANT_I = 31<br>STATUS.SYSTEM = S/370 | ------------TEST 4: Output Variables------------<br>Procedure name = CHAR ec = 0<br>OUT.JUSTIFY = default(LEFT)<br>OUT.LENGTH = ADL<qualified identifier><br>OUT.MAXALC = TRUE<br>OUT.MAXLEN = 80<br>OUT.TERM = <char data definition><br>OUT.TYPE = CHAR<br>OUT.UNITLEN = 16 |
| ------------TEST 5: Input Variables------------<br>Procedure name = CHAR<br><br>IN.TYPE = CHAR<br>IN.CCSID = 0<br>IN.HIGH = ADL<qualified identifier><br>IN.JUSTIFY = LEFT<br>IN.LOW = 1<br>IN.MAXLEN = 1048574<br>IN.UNITLEN = 16<br>STATUS.OPTIONS = ALIGNED<br>STATUS.SIGNIFICANT_I = 31<br>STATUS.SYSTEM = S/370 | ------------TEST 5: Output Variables------------<br>Procedure name = CHAR ec = 0<br>OUT.JUSTIFY = default(LEFT)<br>OUT.LENGTH = ADL<qualified identifier><br>OUT.MAXALC = TRUE<br>OUT.MAXLEN = 1048574<br>OUT.TERM = <char data definition><br>OUT.TYPE = CHAR<br>OUT.UNITLEN = 16 |
| ------------TEST 6: Input Variables------------<br>Procedure name = CHAR<br><br>IN.TYPE = CHAR<br>IN.CCSID = 0<br>IN.HIGH = 80<br>IN.JUSTIFY = LEFT<br>IN.LOW = 41<br>IN.UNITLEN = 16<br>STATUS.OPTIONS = ALIGNED<br>STATUS.SIGNIFICANT_I = 31<br>STATUS.SYSTEM = S/370 | ------------TEST 6: Output Variables------------<br>Procedure name = CHAR ec = 0<br>OUT.JUSTIFY = default(LEFT)<br>OUT.LENGTH = IN.LENGTH<br>OUT.TERM = <char data definition><br>OUT.TYPE = CHAR<br>OUT.UNITLEN = 16 |
| ------------TEST 7: Input Variables------------<br>Procedure name = CHAR<br><br>IN.TYPE = CHAR<br>IN.CCSID = 0<br>IN.JUSTIFY = LEFT<br>IN.LENGTH = 255<br>IN.UNITLEN = 16<br>STATUS.OPTIONS = ALIGNED<br>STATUS.SIGNIFICANT_I = 31<br>STATUS.SYSTEM = S/370 | ------------TEST 7: Output Variables------------<br>Procedure name = CHAR ec = 0<br>OUT.JUSTIFY = default(LEFT)<br>OUT.LENGTH = 255<br>OUT.TERM = <char data definition><br>OUT.TYPE = CHAR<br>OUT.UNITLEN = 16 |

Unclassified

| TEST 8: Input Variables | | TEST 8: Output Variables | |
|---|---|---|---|
| Procedure name | = CHAR | Procedure name | = CHAR ec = 0 |
| | | OUT.MAXALC | = FALSE |
| IN.TYPE | = CHAR | OUT.MAXLEN | = 2048 |
| IN.CCSID | = 0 | OUT.SFXENC | = default(X00) |
| IN.JUSTIFY | = LEFT | OUT.TERM | = <string data definition> |
| IN.LENGTH | = * | OUT.TYPE | = CHARSFX |
| IN.MAXLEN | = 2048 | OUT.UNITLEN | = 8 |
| IN.UNITLEN | = 8 | | |
| STATUS.OPTIONS | = LIST | | |
| STATUS.SIGNIFICANT_I | = 31 | | |
| STATUS.SYSTEM | = S/370 | | |

| TEST 9: Input Variables | | TEST 9: Output Variables | |
|---|---|---|---|
| Procedure name | = CHAR | Procedure name | = CHAR ec = 0 |
| | | OUT.MAXALC | = FALSE |
| IN.TYPE | = CHAR | OUT.MAXLEN | = 1024 |
| IN.CCSID | = 0 | OUT.SFXENC | = X0000 |
| IN.JUSTIFY | = LEFT | OUT.TERM | = <string data definition> |
| IN.LENGTH | = * | OUT.TYPE | = CHARSFX |
| IN.MAXLEN | = 1024 | OUT.UNITLEN | = 16 |
| IN.UNITLEN | = 16 | | |
| STATUS.OPTIONS | = LIST | | |
| STATUS.SIGNIFICANT_I | = 31 | | |
| STATUS.SYSTEM | = S/370 | | |

| TEST 10: Input Variables | | TEST 10: Output Variables | |
|---|---|---|---|
| Procedure name | = CHAR | Procedure name | = CHAR ec = 0 |
| | | OUT.JUSTIFY | = default(LEFT) |
| IN.TYPE | = CHAR | OUT.LENGTH | = ADL<qualified identifier> |
| IN.CCSID | = 0 | OUT.MAXALC | = FALSE |
| IN.JUSTIFY | = LEFT | OUT.MAXLEN | = 65535 |
| IN.LENGTH | = ADL<qualified identifier> | OUT.TERM | = <char data definition> |
| IN.MAXLEN | = 65535 | OUT.TYPE | = CHAR |
| IN.UNITLEN | = 16 | OUT.UNITLEN | = 16 |
| STATUS.OPTIONS | = LIST | | |
| STATUS.SIGNIFICANT_I | = 31 | | |
| STATUS.SYSTEM | = S/370 | | |

| TEST 11: Input Variables | | TEST 11: Output Variables | |
|---|---|---|---|
| Procedure name | = CHAR | Procedure name | = CHAR ec = 0 |
| | | OUT.JUSTIFY | = default(LEFT) |
| IN.TYPE | = CHAR | OUT.LENGTH | = ADL<qualified identifier> |
| IN.CCSID | = 0 | OUT.MAXALC | = FALSE |
| IN.HIGH | = 80 | OUT.MAXLEN | = 80 |
| IN.JUSTIFY | = LEFT | OUT.TERM | = <char data definition> |
| IN.LOW | = ADL<qualified identifier> | OUT.TYPE | = CHAR |
| IN.MAXLEN | = 80 | OUT.UNITLEN | = 16 |
| IN.UNITLEN | = 16 | | |
| STATUS.OPTIONS | = LIST | | |
| STATUS.SIGNIFICANT_I | = 31 | | |
| STATUS.SYSTEM | = S/370 | | |

Unclassified

| | |
|---|---|
| ------------TEST 12: Input Variables-------------<br>Procedure name = CHAR<br><br>IN.TYPE = CHAR<br>IN.CCSID = 0<br>IN.HIGH = ADL<qualified identifier><br>IN.JUSTIFY = LEFT<br>IN.LOW = 1<br>IN.MAXLEN = 1048574<br>IN.UNITLEN = 16<br>STATUS.OPTIONS = LIST<br>STATUS.SIGNIFICANT_I = 31<br>STATUS.SYSTEM = S/370 | ------------TEST 12: Output Variables------------<br>Procedure name = CHAR ec = 0<br>OUT.JUSTIFY = default(LEFT)<br>OUT.LENGTH = ADL<qualified identifier><br>OUT.MAXALC = FALSE<br>OUT.MAXLEN = 1048574<br>OUT.TERM = <char data definition><br>OUT.TYPE = CHAR<br>OUT.UNITLEN = 16 |
| ------------TEST 13: Input Variables------------<br>Procedure name = CHAR<br><br>IN.TYPE = CHAR<br>IN.CCSID = 0<br>IN.HIGH = 80<br>IN.JUSTIFY = LEFT<br>IN.LOW = 41<br>IN.UNITLEN = 16<br>STATUS.OPTIONS = LIST<br>STATUS.SIGNIFICANT_I = 31<br>STATUS.SYSTEM = S/370 | ------------TEST 13: Output Variables------------<br>Procedure name = CHAR ec = 0<br>OUT.JUSTIFY = default(LEFT)<br>OUT.LENGTH = IN.LENGTH<br>OUT.TERM = <char data definition><br>OUT.TYPE = CHAR<br>OUT.UNITLEN = 16 |
| ------------TEST 14: Input Variables------------<br>Procedure name = CHAR<br><br>IN.TYPE = CHAR<br>IN.CCSID = 0<br>IN.JUSTIFY = LEFT<br>IN.LENGTH = 255<br>IN.UNITLEN = 16<br>STATUS.OPTIONS = LIST<br>STATUS.SIGNIFICANT_I = 31<br>STATUS.SYSTEM = S/370 | ------------TEST 14: Output Variables------------<br>Procedure name = CHAR ec = 0<br>OUT.JUSTIFY = default(LEFT)<br>OUT.LENGTH = 255<br>OUT.TERM = <char data definition><br>OUT.TYPE = CHAR<br>OUT.UNITLEN = 16 |

A.9 Test Translate CHARPRE for S/370 on 09/04/91 at 16:21:45

```
-------------TEST 1:  Input Variables-------------
Procedure name        = CHARPRE

IN.TYPE               = CHARPRE
IN.MAXLEN             = 201
IN.NAME               = user_name
IN.PRELEN             = 16
IN.UNITLEN            = 16
STATUS.SIGNIFICANT_I  = 31
STATUS.SYSTEM         = OS/2
```

```
------------TEST 1:  Output Variables-------------
Procedure name        = CHARPRE ec = 0
OUT.1.BYTRVS          = default(TRUE)
OUT.1.COMPLEX         = default(FALSE)
OUT.1.CONSTRAINED     = default(FALSE)
OUT.1.FIT             = default(TRUNCATE)
OUT.1.LENGTH          = 16
OUT.1.NAME            = user_name_LEN
OUT.1.PRECISION       = 15
OUT.1.RADIX           = default(2)
OUT.1.SCALE           = default(0)
OUT.1.SIGNED          = default(TRUE)
OUT.1.TERM            = <int data definition>
OUT.1.TYPE            = BINARY
OUT.2.LENGTH          = user_name_LEN
OUT.2.MAXALC          = default(TRUE)
OUT.2.MAXLEN          = 201
OUT.2.NAME            = user_name
OUT.2.TERM            = <string data definition>
OUT.2.TYPE            = CHAR
OUT.2.UNITLEN         = 16
```

```
-------------TEST 2:  Input Variables-------------
Procedure name        = CHARPRE

IN.TYPE               = CHARPRE
IN.MAXLEN             = 63
IN.NAME               = user_name
IN.PRELEN             = 32
IN.UNITLEN            = 8
STATUS.SIGNIFICANT_I  = 31
STATUS.SYSTEM         = S/370
```

```
------------TEST 2:  Output Variables-------------
Procedure name        = CHARPRE ec = 0
OUT.1.BYTRVS          = default(FALSE)
OUT.1.COMPLEX         = default(FALSE)
OUT.1.CONSTRAINED     = default(FALSE)
OUT.1.FIT             = default(TRUNCATE)
OUT.1.LENGTH          = 32
OUT.1.NAME            = user_name_LEN
OUT.1.PRECISION       = default(31)
OUT.1.RADIX           = default(2)
OUT.1.SCALE           = default(0)
OUT.1.SIGNED          = default(TRUE)
OUT.1.TERM            = <int data definition>
OUT.1.TYPE            = BINARY
OUT.2.LENGTH          = user_name_LEN
OUT.2.MAXALC          = default(TRUE)
OUT.2.MAXLEN          = 63
OUT.2.NAME            = user_name
OUT.2.TERM            = <string data definition>
OUT.2.TYPE            = CHAR
OUT.2.UNITLEN         = 8
```

Unclassified

A.10 Test Translate CHARSFX for S/370 on 08/15/91 at 17:45:27

```
-------------TEST 1:  Input Variables-------------
Procedure name       = CHARSFX

IN.TYPE              = CHARSFX
IN.CCSID             = 437
IN.MAXALC            = TRUE
IN.MAXLEN            = 132
IN.NAME              = listing_title_line
IN.NOTE              = CCSID is U.S PC Data ASCII SBCS
IN.SFXENC            = X00
IN.UNITLEN           = 8
STATUS.SIGNIFICANT_I = 31
STATUS.SYSTEM        = S/370
```

```
------------TEST 1:  Output Variables-------------
Procedure name       = CHARSFX ec = 0
OUT.CCSID            = 437
OUT.MAXALC           = default(TRUE)
OUT.MAXLEN           = 132
OUT.SFXENC           = default(X00)
```

```
-------------TEST 2:  Input Variables-------------
Procedure name       = CHARSFX

IN.TYPE              = CHARSFX
IN.CCSID             = 437
IN.MAXALC            = TRUE
IN.MAXLEN            = 132
IN.NAME              = listing_title_line
IN.NOTE              = CCSID is U.S PC Data ASCII SBCS
IN.SFXENC            = X00
IN.UNITLEN           = 16
STATUS.SIGNIFICANT_I = 31
STATUS.SYSTEM        = S/370
```

```
------------TEST 2:  Output Variables-------------
Procedure name       = CHARSFX ec = 0
OUT.CCSID            = 437
OUT.MAXALC           = default(TRUE)
OUT.MAXLEN           = 132
OUT.SFXENC           = X0000
```

Unclassified

A.11 Test Translate COMPLEX for OS/2 on 07/31/91 at 13:32:56

```
-------------TEST 1:  Input Variables-------------
Procedure name        = COMPLEX

IN.TYPE               = COMPLEX
IN.FLDSIZ             = 256
STATUS.SYSTEM         = OS/2
```

```
------------TEST 1:  Output Variables-------------
Procedure name        = COMPLEX ec = 0
OUT.TYPE              = ASIS
OUT.LENGTH            = 256
```

Unclassified

A.12 Test Translate COMPLEX for S/370 on 07/31/91 at 13:32:47

| Input | Output |
| --- | --- |
| -------------TEST 1: Input Variables------------- | ------------TEST 1: Output Variables------------- |
| Procedure name = COMPLEX | Procedure name = COMPLEX ec = 0 |
| | OUT.TYPE = ASIS |
| IN.TYPE = COMPLEX | OUT.LENGTH = 256 |
| IN.FLDSIZ = 256 | |
| STATUS.SYSTEM = S/370 | |

Unclassified

A.13 Test Translate DECIOS2 for OS/2 on 09/17/91 at 17:18:20

```
-------------TEST 2:  Input Variables-------------
Procedure name        = DECIOS2

IN.TYPE               = PACKED
IN.COMPLEX            = FALSE
IN.CONSTRAINED        = FALSE
IN.FIT                = TRUNCATE
IN.PRECISION          = 5
IN.SCALE              = 308
IN.SGNLOC             = DGTLSTBYT
IN.SIGNED             = TRUE
STATUS.MAX_PRECISION  = 5
STATUS.SIGNIFICANT_I  = 31
STATUS.SYSTEM         = OS/2
```

```
------------TEST 2:  Output Variables-------------
Procedure name        = DECIOS2 ec = 0
OUT.BYTRVS            = default(TRUE)
OUT.COMPLEX           = default(FALSE)
OUT.FIT               = default(TRUNCATE)
OUT.LENGTH            = 64
OUT.RADIX             = default(2)
OUT.TERM              = <double data definition>
OUT.TYPE              = FLOAT2
```

```
-------------TEST 3:  Input Variables-------------
Procedure name        = DECIOS2

IN.TYPE               = PACKED
IN.COMPLEX            = FALSE
IN.CONSTRAINED        = FALSE
IN.FIT                = TRUNCATE
IN.PRECISION          = 5
IN.SCALE              = 37
IN.SGNLOC             = DGTLSTBYT
IN.SIGNED             = TRUE
STATUS.MAX_PRECISION  = 5
STATUS.SIGNIFICANT_I  = 31
STATUS.SYSTEM         = OS/2
```

```
------------TEST 3:  Output Variables-------------
Procedure name        = DECIOS2 ec = 0
OUT.BYTRVS            = default(TRUE)
OUT.COMPLEX           = default(FALSE)
OUT.FIT               = default(TRUNCATE)
OUT.LENGTH            = default(32)
OUT.RADIX             = default(2)
OUT.TERM              = <float data definition>
OUT.TYPE              = FLOAT2
```

```
-------------TEST 4:  Input Variables-------------
Procedure name        = DECIOS2

IN.TYPE               = PACKED
IN.COMPLEX            = FALSE
IN.CONSTRAINED        = FALSE
IN.FIT                = TRUNCATE
IN.PRECISION          = 15
IN.SCALE              = 127
IN.SGNLOC             = DGTLSTBYT
IN.SIGNED             = TRUE
STATUS.MAX_PRECISION  = 15
STATUS.SIGNIFICANT_I  = 31
STATUS.SYSTEM         = OS/2
```

```
------------TEST 4:  Output Variables-------------
Procedure name        = DECIOS2 ec = 0
OUT.BYTRVS            = default(TRUE)
OUT.COMPLEX           = default(FALSE)
OUT.FIT               = default(TRUNCATE)
OUT.LENGTH            = 64
OUT.RADIX             = default(2)
OUT.TERM              = <double data definition>
OUT.TYPE              = FLOAT2
```

Unclassified

```
-------------TEST 5:  Input Variables-------------
Procedure name        = DECIOS2

IN.TYPE               = PACKED
IN.COMPLEX            = FALSE
IN.CONSTRAINED        = FALSE
IN.FIT                = TRUNCATE
IN.PRECISION          = 19
IN.SCALE              = 127
IN.SGNLOC             = DGTLSTBYT
IN.SIGNED             = TRUE
STATUS.MAX_PRECISION  = 19
STATUS.SIGNIFICANT_I  = 31
STATUS.SYSTEM         = OS/2
```

```
------------TEST 5:  Output Variables-------------
Procedure name        = DECIOS2 ec = 0
OUT.BYTRVS            = default(TRUE)
OUT.COMPLEX           = default(FALSE)
OUT.FIT               = default(TRUNCATE)
OUT.LENGTH            = 128
OUT.RADIX             = default(2)
OUT.TERM              = <long double data definition>
OUT.TYPE              = FLOAT2
```

```
-------------TEST 6:  Input Variables-------------
Procedure name        = DECIOS2

IN.TYPE               = PACKED
IN.COMPLEX            = FALSE
IN.CONSTRAINED        = FALSE
IN.FIT                = TRUNCATE
IN.PRECISION          = 1
IN.SCALE              = -1
IN.SGNLOC             = DGTLSTBYT
IN.SIGNED             = TRUE
STATUS.MAX_PRECISION  = 1
STATUS.SIGNIFICANT_I  = 31
STATUS.SYSTEM         = OS/2
```

```
------------TEST 6:  Output Variables-------------
Procedure name        = DECIOS2 ec = 0
OUT.BYTRVS            = default(TRUE)
OUT.COMPLEX           = default(FALSE)
OUT.CONSTRAINED       = default(FALSE)
OUT.FIT               = default(TRUNCATE)
OUT.LENGTH            = 8
OUT.PRECISION         = 7
OUT.RADIX             = default(2)
OUT.SCALE             = default(0)
OUT.SIGNED            = default(TRUE)
OUT.TERM              = <char data definition>
OUT.TYPE              = BINARY
```

```
-------------TEST 7:  Input Variables-------------
Procedure name        = DECIOS2

IN.TYPE               = PACKED
IN.COMPLEX            = FALSE
IN.CONSTRAINED        = FALSE
IN.FIT                = TRUNCATE
IN.PRECISION          = 3
IN.SCALE              = -1
IN.SGNLOC             = DGTLSTBYT
IN.SIGNED             = TRUE
STATUS.MAX_PRECISION  = 3
STATUS.SIGNIFICANT_I  = 31
STATUS.SYSTEM         = OS/2
```

```
------------TEST 7:  Output Variables-------------
Procedure name        = DECIOS2 ec = 0
OUT.BYTRVS            = default(TRUE)
OUT.COMPLEX           = default(FALSE)
OUT.CONSTRAINED       = default(FALSE)
OUT.FIT               = default(TRUNCATE)
OUT.LENGTH            = 16
OUT.PRECISION         = 15
OUT.RADIX             = default(2)
OUT.SCALE             = default(0)
OUT.SIGNED            = default(TRUE)
OUT.TERM              = <int data definition>
OUT.TYPE              = BINARY
```

Unclassified

```
-------------TEST 8:  Input Variables-------------
Procedure name        = DECIOS2

IN.TYPE               = PACKED
IN.COMPLEX            = FALSE
IN.CONSTRAINED        = FALSE
IN.FIT                = TRUNCATE
IN.PRECISION          = 5
IN.SCALE              = -3
IN.SGNLOC             = DGTLSTBYT
IN.SIGNED             = FALSE
STATUS.MAX_PRECISION  = 6
STATUS.SIGNIFICANT_I  = 31
STATUS.SYSTEM         = OS/2
```

```
------------TEST 8:  Output Variables-------------
Procedure name        = DECIOS2 ec = 0
OUT.BYTRVS            = default(TRUE)
OUT.COMPLEX           = default(FALSE)
OUT.CONSTRAINED       = default(FALSE)
OUT.FIT               = default(TRUNCATE)
OUT.LENGTH            = default(32)
OUT.PRECISION         = 32
OUT.RADIX             = default(2)
OUT.SCALE             = default(0)
OUT.SIGNED            = FALSE
OUT.TERM              = <int data definition>
OUT.TYPE              = BINARY
```

```
-------------TEST 9:  Input Variables-------------
Procedure name        = DECIOS2

IN.TYPE               = PACKED
IN.COMPLEX            = FALSE
IN.CONSTRAINED        = FALSE
IN.FIT                = TRUNCATE
IN.PRECISION          = 31
IN.SCALE              = -278
IN.SGNLOC             = DGTLSTBYT
IN.SIGNED             = FALSE
STATUS.MAX_PRECISION  = 32
STATUS.SIGNIFICANT_I  = 31
STATUS.SYSTEM         = OS/2
```

```
------------TEST 9:  Output Variables-------------
Procedure name        = DECIOS2 ec = 2
OUT.BYTRVS            = default(TRUE)
OUT.COMPLEX           = default(FALSE)
OUT.FIT               = default(TRUNCATE)
OUT.LENGTH            = 128
OUT.RADIX             = default(2)
OUT.TERM              = <long double data definition>
OUT.TYPE              = FLOAT2
```

0110W Possible loss of PRECISION : decimal to FLOAT2 conversion.

```
------------TEST 10:  Input Variables-------------
Procedure name        = DECIOS2

IN.TYPE               = PACKED
IN.COMPLEX            = FALSE
IN.CONSTRAINED        = FALSE
IN.FIT                = TRUNCATE
IN.PRECISION          = 6
IN.SCALE              = -33
IN.SGNLOC             = DGTLSTBYT
IN.SIGNED             = FALSE
STATUS.MAX_PRECISION  = 6
STATUS.SIGNIFICANT_I  = 31
STATUS.SYSTEM         = OS/2
```

```
------------TEST 10:  Output Variables------------
Procedure name        = DECIOS2 ec = 0
OUT.BYTRVS            = default(TRUE)
OUT.COMPLEX           = default(FALSE)
OUT.FIT               = default(TRUNCATE)
OUT.LENGTH            = default(32)
OUT.RADIX             = default(2)
OUT.TERM              = <float data definition>
OUT.TYPE              = FLOAT2
```

Unclassified

| ------------TEST 11: Input Variables------------- | ------------TEST 11: Output Variables------------ |
|---|---|
| Procedure name = DECIOS2<br><br>IN.TYPE = PACKED<br>IN.COMPLEX = FALSE<br>IN.CONSTRAINED = FALSE<br>IN.FIT = TRUNCATE<br>IN.PRECISION = 15<br>IN.SCALE = -33<br>IN.SGNLOC = DGTLSTBYT<br>IN.SIGNED = TRUE<br>STATUS.MAX_PRECISION = 15<br>STATUS.SIGNIFICANT_I = 31<br>STATUS.SYSTEM = OS/2 | Procedure name = DECIOS2 ec = 0<br>OUT.BYTRVS = default(TRUE)<br>OUT.COMPLEX = default(FALSE)<br>OUT.FIT = default(TRUNCATE)<br>OUT.LENGTH = 64<br>OUT.RADIX = default(2)<br>OUT.TERM = <double data definition><br>OUT.TYPE = FLOAT2 |
| ------------TEST 12: Input Variables------------- | ------------TEST 12: Output Variables------------ |
| Procedure name = DECIOS2<br><br>IN.TYPE = PACKED<br>IN.COMPLEX = FALSE<br>IN.CONSTRAINED = FALSE<br>IN.FIT = TRUNCATE<br>IN.PRECISION = 31<br>IN.SCALE = -33<br>IN.SGNLOC = DGTLSTBYT<br>IN.SIGNED = TRUE<br>STATUS.MAX_PRECISION = 31<br>STATUS.SIGNIFICANT_I = 31<br>STATUS.SYSTEM = OS/2 | Procedure name = DECIOS2 ec = 2<br>OUT.BYTRVS = default(TRUE)<br>OUT.COMPLEX = default(FALSE)<br>OUT.FIT = default(TRUNCATE)<br>OUT.LENGTH = 128<br>OUT.RADIX = default(2)<br>OUT.TERM = <long double data definition><br>OUT.TYPE = FLOAT2<br><br>**0110W Possible loss of PRECISION : decimal to FLOAT2 conversion.** |

Unclassified

A.14 Test Translate DECI370 for S/370 on 12/15/91 at 18:32:23

```
-------------TEST 2:  Input Variables------------
Procedure name       = DECI370

IN.TYPE              = PACKED
IN.COMPLEX           = FALSE
IN.CONSTRAINED       = FALSE
IN.FIT               = TRUNCATE
IN.FLDSIZ            = 32
IN.PRECISION         = 31
IN.SCALE             = 127
IN.SGNLOC            = DGTLSTBYT
IN.SIGNED            = TRUE
STATUS.MAX_PRECISION = 31
STATUS.SIGNIFICANT_I = 31
STATUS.SYSTEM        = S/370
```

```
-----------TEST 2:  Output Variables------------
Procedure name       = DECI370 ec = 3
OUT.BYTRVS           = default(FALSE)
OUT.FIT              = default(TRUNCATE)
OUT.LENGTH           = 4
OUT.TERM             = <string data definition>
OUT.TYPE             = ASIS
OUT.UNITLEN          = default(8)
```

0111W Number is too small to map to FLOAT16 in C/370 representation domain.

```
-------------TEST 3:  Input Variables------------
Procedure name       = DECI370

IN.TYPE              = PACKED
IN.COMPLEX           = FALSE
IN.CONSTRAINED       = FALSE
IN.FIT               = TRUNCATE
IN.FLDSIZ            = 32
IN.PRECISION         = 5
IN.SCALE             = 78
IN.SGNLOC            = DGTLSTBYT
IN.SIGNED            = TRUE
STATUS.MAX_PRECISION = 5
STATUS.SIGNIFICANT_I = 31
STATUS.SYSTEM        = S/370
```

```
-----------TEST 3:  Output Variables------------
Procedure name       = DECI370 ec = 0
OUT.BYTRVS           = default(FALSE)
OUT.COMPLEX          = default(FALSE)
OUT.FIT              = default(TRUNCATE)
OUT.LENGTH           = 32
OUT.RADIX            = default(2)
OUT.TERM             = <float data definition>
OUT.TYPE             = FLOAT16
```

```
-------------TEST 4:  Input Variables------------
Procedure name       = DECI370

IN.TYPE              = PACKED
IN.COMPLEX           = FALSE
IN.CONSTRAINED       = FALSE
IN.FIT               = TRUNCATE
IN.FLDSIZ            = 32
IN.PRECISION         = 15
IN.SCALE             = 40
IN.SGNLOC            = DGTLSTBYT
IN.SIGNED            = TRUE
STATUS.MAX_PRECISION = 15
STATUS.SIGNIFICANT_I = 31
STATUS.SYSTEM        = S/370
```

```
-----------TEST 4:  Output Variables------------
Procedure name       = DECI370 ec = 0
OUT.BYTRVS           = default(FALSE)
OUT.COMPLEX          = default(FALSE)
OUT.FIT              = default(TRUNCATE)
OUT.LENGTH           = 64
OUT.RADIX            = default(2)
OUT.TERM             = <double data definition>
OUT.TYPE             = FLOAT16
```

Unclassified

```
-------------TEST 5:  Input Variables-------------
Procedure name       = DECI370

IN.TYPE              = PACKED
IN.COMPLEX           = FALSE
IN.CONSTRAINED       = FALSE
IN.FIT               = TRUNCATE
IN.FLDSIZ            = 32
IN.PRECISION         = 31
IN.SCALE             = 60
IN.SGNLOC            = DGTLSTBYT
IN.SIGNED            = FALSE
STATUS.MAX_PRECISION = 32
STATUS.SIGNIFICANT_I = 31
STATUS.SYSTEM        = S/370
```

```
------------TEST 5:  Output Variables-------------
Procedure name       = DECI370 ec = 0
OUT.BYTRVS           = default(FALSE)
OUT.COMPLEX          = default(FALSE)
OUT.FIT              = default(TRUNCATE)
OUT.LENGTH           = 128
OUT.RADIX            = default(2)
OUT.TERM             = <long double data definition>
OUT.TYPE             = FLOAT16
```

```
-------------TEST 6:  Input Variables-------------
Procedure name       = DECI370

IN.TYPE              = PACKED
IN.COMPLEX           = FALSE
IN.CONSTRAINED       = FALSE
IN.FIT               = TRUNCATE
IN.FLDSIZ            = 32
IN.PRECISION         = 1
IN.SCALE             = -1
IN.SGNLOC            = DGTLSTBYT
IN.SIGNED            = TRUE
STATUS.MAX_PRECISION = 1
STATUS.SIGNIFICANT_I = 31
STATUS.SYSTEM        = S/370
```

```
------------TEST 6:  Output Variables-------------
Procedure name       = DECI370 ec = 0
OUT.BYTRVS           = default(FALSE)
OUT.COMPLEX          = default(FALSE)
OUT.CONSTRAINED      = default(FALSE)
OUT.FIT              = default(TRUNCATE)
OUT.LENGTH           = 8
OUT.PRECISION        = 7
OUT.RADIX            = default(2)
OUT.SCALE            = default(0)
OUT.SIGNED           = default(TRUE)
OUT.TERM             = <char data definition>
OUT.TYPE             = BINARY
```

```
-------------TEST 7:  Input Variables-------------
Procedure name       = DECI370

IN.TYPE              = PACKED
IN.COMPLEX           = FALSE
IN.CONSTRAINED       = FALSE
IN.FIT               = TRUNCATE
IN.FLDSIZ            = 32
IN.PRECISION         = 3
IN.SCALE             = -1
IN.SGNLOC            = DGTLSTBYT
IN.SIGNED            = TRUE
STATUS.MAX_PRECISION = 3
STATUS.SIGNIFICANT_I = 31
STATUS.SYSTEM        = S/370
```

```
------------TEST 7:  Output Variables-------------
Procedure name       = DECI370 ec = 0
OUT.BYTRVS           = default(FALSE)
OUT.COMPLEX          = default(FALSE)
OUT.CONSTRAINED      = default(FALSE)
OUT.FIT              = default(TRUNCATE)
OUT.LENGTH           = 16
OUT.PRECISION        = 15
OUT.RADIX            = default(2)
OUT.SCALE            = default(0)
OUT.SIGNED           = default(TRUE)
OUT.TERM             = <int data definition>
OUT.TYPE             = BINARY
```

Unclassified

```
-------------TEST 8:  Input Variables-------------
Procedure name        = DECI370

IN.TYPE               = PACKED
IN.COMPLEX            = FALSE
IN.CONSTRAINED        = FALSE
IN.FIT                = TRUNCATE
IN.FLDSIZ             = 32
IN.PRECISION          = 5
IN.SCALE              = -3
IN.SGNLOC             = DGTLSTBYT
IN.SIGNED             = TRUE
STATUS.MAX_PRECISION = 5
STATUS.SIGNIFICANT_I = 31
STATUS.SYSTEM         = S/370
```

```
------------TEST 8:  Output Variables-------------
Procedure name        = DECI370 ec = 0
OUT.BYTRVS            = default(FALSE)
OUT.COMPLEX           = default(FALSE)
OUT.CONSTRAINED       = default(FALSE)
OUT.FIT               = default(TRUNCATE)
OUT.LENGTH            = default(32)
OUT.PRECISION         = default(31)
OUT.RADIX             = default(2)
OUT.SCALE             = default(0)
OUT.SIGNED            = default(TRUE)
OUT.TERM              = <int data definition>
OUT.TYPE              = BINARY
```

```
-------------TEST 9:  Input Variables-------------
Procedure name        = DECI370

IN.TYPE               = PACKED
IN.COMPLEX            = FALSE
IN.CONSTRAINED        = FALSE
IN.FIT                = TRUNCATE
IN.FLDSIZ             = 16
IN.PRECISION          = 15
IN.SCALE              = -100
IN.SGNLOC             = DGTLSTBYT
IN.SIGNED             = TRUE
STATUS.MAX_PRECISION = 15
STATUS.SIGNIFICANT_I = 31
STATUS.SYSTEM         = S/370
```

```
------------TEST 9:  Output Variables-------------
Procedure name        = DECI370 ec = 3
OUT.BYTRVS            = default(FALSE)
OUT.COMPLEX           = default(FALSE)
OUT.FIT               = default(TRUNCATE)
OUT.LENGTH            = 16
OUT.RADIX             = default(2)
OUT.TERM              = <string data definition>
OUT.TYPE              = ASIS
OUT.UNITLEN           = default(8)
```

0112W Number is too large to map to FLOAT16 in C/370 representation domain.

```
------------TEST 10:  Input Variables-------------
Procedure name        = DECI370

IN.TYPE               = PACKED
IN.COMPLEX            = FALSE
IN.CONSTRAINED        = FALSE
IN.FIT                = TRUNCATE
IN.FLDSIZ             = 16
IN.PRECISION          = 5
IN.SCALE              = -50
IN.SGNLOC             = DGTLSTBYT
IN.SIGNED             = TRUE
STATUS.MAX_PRECISION = 5
STATUS.SIGNIFICANT_I = 31
STATUS.SYSTEM         = S/370
```

```
------------TEST 10:  Output Variables------------
Procedure name        = DECI370 ec = 0
OUT.BYTRVS            = default(FALSE)
OUT.COMPLEX           = default(FALSE)
OUT.FIT               = default(TRUNCATE)
OUT.LENGTH            = 32
OUT.RADIX             = default(2)
OUT.TERM              = <float data definition>
OUT.TYPE              = FLOAT16
```

Unclassified

```
------------TEST 11:  Input Variables-------------
Procedure name       = DECI370

IN.TYPE              = PACKED
IN.COMPLEX           = FALSE
IN.CONSTRAINED       = FALSE
IN.FIT               = TRUNCATE
IN.FLDSIZ            = 16
IN.PRECISION         = 15
IN.SCALE             = -60
IN.SGNLOC            = DGTLSTBYT
IN.SIGNED            = TRUE
STATUS.MAX_PRECISION = 15
STATUS.SIGNIFICANT_I = 31
STATUS.SYSTEM        = S/370
```

```
------------TEST 11:  Output Variables------------
Procedure name       = DECI370 ec = 0
OUT.BYTRVS           = default(FALSE)
OUT.COMPLEX          = default(FALSE)
OUT.FIT              = default(TRUNCATE)
OUT.LENGTH           = 64
OUT.RADIX            = default(2)
OUT.TERM             = <double data definition>
OUT.TYPE             = FLOAT16
```

```
------------TEST 12:  Input Variables-------------
Procedure name       = DECI370

IN.TYPE              = PACKED
IN.COMPLEX           = FALSE
IN.CONSTRAINED       = FALSE
IN.FIT               = TRUNCATE
IN.FLDSIZ            = 16
IN.PRECISION         = 31
IN.SCALE             = -40
IN.SGNLOC            = DGTLSTBYT
IN.SIGNED            = TRUE
STATUS.MAX_PRECISION = 31
STATUS.SIGNIFICANT_I = 31
STATUS.SYSTEM        = S/370
```

```
------------TEST 12:  Output Variables------------
Procedure name       = DECI370 ec = 0
OUT.BYTRVS           = default(FALSE)
OUT.COMPLEX          = default(FALSE)
OUT.FIT              = default(TRUNCATE)
OUT.LENGTH           = 128
OUT.RADIX            = default(2)
OUT.TERM             = <long double data definition>
OUT.TYPE             = FLOAT16
```

Unclassified

A.15 Test Translate DMNATTR for S/370 on 08/23/91 at 09:49:52

```
-------------TEST 1:  Input Variables-------------
Procedure name        = DMNATTR

IN.TYPE               = DMNATTR
IN.DMNHIGH            = ADL<qualified identifier>
IN.DMNMAX             = 100
STATUS.SIGNIFICANT_I  = 31
STATUS.SYSTEM         = S/370
```

```
------------TEST 1:  Output Variables-------------
Procedure name        = DMNATTR ec = 0
OUT.DMNLOW            = default(1)
OUT.DMNMAX            = 100
OUT.DMNSIZE           = ADL<qualified identifier>
```

```
-------------TEST 2:  Input Variables-------------
Procedure name        = DMNATTR

IN.TYPE               = DMNATTR
IN.DMNHIGH            =
IN.DMNLOW             = ADL<qualified identifier>
IN.DMNMAX             = 100
STATUS.SIGNIFICANT_I  = 31
STATUS.SYSTEM         = S/370
```

```
------------TEST 2:  Output Variables-------------
Procedure name        = DMNATTR ec = 0
OUT.DMNLOW            = default(1)
OUT.DMNMAX            = 100
OUT.DMNSIZE           = ADL<qualified identifier>
```

```
-------------TEST 3:  Input Variables-------------
Procedure name        = DMNATTR

IN.TYPE               = DMNATTR
IN.DMNHIGH            =
IN.DMNLOW             =
IN.DMNMAX             = 100
IN.DMNSIZE            = ADL<qualified identifier>
STATUS.SIGNIFICANT_I  = 31
STATUS.SYSTEM         = S/370
```

```
------------TEST 3:  Output Variables-------------
Procedure name        = DMNATTR ec = 0
OUT.DMNLOW            = default(1)
OUT.DMNMAX            = 100
OUT.DMNSIZE           = ADL<qualified identifier>
```

Unclassified

```
-------------TEST 4:  Input Variables-------------
Procedure name       = DHNATTR

IN.TYPE              = DHNATTR
IN.DHNHIGH           =
IN.DHNLOW            =
IN.DHNMAX            =
IN.DHNSIZE           = 255
STATUS.SIGNIFICANT_I = 31
STATUS.SYSTEM        = S/370
```

```
------------TEST 4:  Output Variables-------------
Procedure name       = DHNATTR ec = 0
OUT.DHNLOW           = default(1)
OUT.DHNSIZE          = 255
```

```
-------------TEST 5:  Input Variables-------------
Procedure name       = DHNATTR

IN.TYPE              = DHNATTR
IN.DHNHIGH           = 200
IN.DHNLOW            = 101
IN.DHNMAX            = 100
IN.DHNSIZE           =
STATUS.SIGNIFICANT_I = 31
STATUS.SYSTEM        = S/370
```

```
------------TEST 5:  Output Variables-------------
Procedure name       = DHNATTR ec = 0
OUT.DHNLOW           = default(1)
OUT.DHNSIZE          = 100
```

Unclassified

A.16 Test Translate ENUMERAT for S/370 on 12/15/91 at 18:03:41

| Input | Output |
|---|---|
| -------------TEST 1: Input Variables-------------<br>Procedure name = ENUMERAT<br><br>IN.TYPE = ENUMERAT<br>IN.ENUMERATION_LIST = 1, 10, 100, 200<br>IN.LENGTH = 8<br>IN.SIGNED = TRUE<br>STATUS.SIGNIFICANT_I = 31<br>STATUS.SYSTEM = OS/2 | ------------TEST 1: Output Variables-------------<br>Procedure name = ENUMERAT ec = 0<br>OUT.BYTRVS = FALSE<br>OUT.ENUMERATION_LIST = 1, 10, 100, 200<br>OUT.LENGTH = 8<br>OUT.SIGNED = TRUE<br>OUT.TERM = <enumeration data definition><br>OUT.TYPE = ENUMERATION |
| -------------TEST 2: Input Variables-------------<br>Procedure name = ENUMERAT<br><br>IN.TYPE = ENUMERAT<br>IN.ENUMERATION_LIST = 128, 255, 512, 1024 65535<br>IN.LENGTH = 16<br>IN.SIGNED = FALSE<br>STATUS.SIGNIFICANT_I = 31<br>STATUS.SYSTEM = OS/2 | ------------TEST 2: Output Variables-------------<br>Procedure name = ENUMERAT ec = 0<br>OUT.BYTRVS = default(TRUE)<br>OUT.ENUMERATION_LIST = 128, 255, 512, 1024 65535<br>OUT.LENGTH = 16<br>OUT.SIGNED = FALSE<br>OUT.TERM = <enumeration data definition><br>OUT.TYPE = ENUMERATION |
| -------------TEST 3: Input Variables-------------<br>Procedure name = ENUMERAT<br><br>IN.TYPE = ENUMERAT<br>IN.ENUMERATION_LIST = 1, 127, 32767<br>IN.LENGTH = 32<br>IN.SIGNED = TRUE<br>STATUS.SIGNIFICANT_I = 31<br>STATUS.SYSTEM = S/370 | ------------TEST 3: Output Variables-------------<br>Procedure name = ENUMERAT ec = 0<br>OUT.BYTRVS = default(FALSE)<br>OUT.ENUMERATION_LIST = 1, 127, 32767<br>OUT.LENGTH = 32<br>OUT.SIGNED = default(TRUE)<br>OUT.TERM = <enumeration data definition><br>OUT.TYPE = ENUMERATION |

A.17 Test Translate FLOAT16 for S/370 on 09/17/91 at 17:11:36

```
-------------TEST 1:  Input Variables-------------
Procedure name       = FLOAT16

IN.TYPE              = FLOAT16
IN.BYTRVS            = FALSE
IN.COMPLEX           = FALSE
IN.FIT               = TRUNCATE
IN.LENGTH            = 32
IN.RADIX             = 2
STATUS.SIGNIFICANT_1 = 31
STATUS.SYSTEM        = S/370
```

```
------------TEST 1:  Output Variables-------------
Procedure name       = FLOAT16 ec = 0
OUT.COMPLEX          = default(FALSE)
OUT.FIT              = default(TRUNCATE)
OUT.LENGTH           = default(32)
OUT.RADIX            = default(2)
OUT.TERM             = <float data definition>
OUT.TYPE             = FLOAT16
```

```
-------------TEST 2:  Input Variables-------------
Procedure name       = FLOAT16

IN.TYPE              = FLOAT16
IN.BYTRVS            = FALSE
IN.COMPLEX           = FALSE
IN.FIT               = TRUNCATE
IN.LENGTH            = 64
IN.RADIX             = 2
STATUS.SIGNIFICANT_1 = 31
STATUS.SYSTEM        = S/370
```

```
------------TEST 2:  Output Variables-------------
Procedure name       = FLOAT16 ec = 0
OUT.COMPLEX          = default(FALSE)
OUT.FIT              = default(TRUNCATE)
OUT.LENGTH           = 64
OUT.RADIX            = default(2)
OUT.TERM             = <double data definition>
OUT.TYPE             = FLOAT16
```

```
-------------TEST 3:  Input Variables-------------
Procedure name       = FLOAT16

IN.TYPE              = FLOAT16
IN.BYTRVS            = FALSE
IN.COMPLEX           = FALSE
IN.FIT               = TRUNCATE
IN.LENGTH            = 128
IN.RADIX             = 2
STATUS.SIGNIFICANT_1 = 31
STATUS.SYSTEM        = S/370
```

```
------------TEST 3:  Output Variables-------------
Procedure name       = FLOAT16 ec = 0
OUT.COMPLEX          = default(FALSE)
OUT.FIT              = default(TRUNCATE)
OUT.LENGTH           = 128
OUT.RADIX            = default(2)
OUT.TERM             = <long double data definition>
OUT.TYPE             = FLOAT16
```

Unclassified

```
-------------TEST 4:  Input Variables-------------
Procedure name        = FLOAT16

IN.TYPE               = FLOAT16
IN.BYTRVS             = FALSE
IN.COMPLEX            = FALSE
IN.FIT                = TRUNCATE
IN.LENGTH             = 32
IN.RADIX              = 2
STATUS.SIGNIFICANT_I  = 31
STATUS.SYSTEM         = OS/2
```

```
------------TEST 4:  Output Variables-------------
Procedure name        = FLOAT16 ec = 0
OUT.BYTRVS            = default(TRUE)
OUT.COMPLEX           = default(FALSE)
OUT.FIT               = default(TRUNCATE)
OUT.LENGTH            = 64
OUT.RADIX             = default(2)
OUT.TERM              = <double data definition>
OUT.TYPE              = FLOAT2
```

```
-------------TEST 5:  Input Variables-------------
Procedure name        = FLOAT16

IN.TYPE               = FLOAT16
IN.BYTRVS             = FALSE
IN.COMPLEX            = FALSE
IN.FIT                = TRUNCATE
IN.LENGTH             = 64
IN.RADIX              = 2
STATUS.SIGNIFICANT_I  = 31
STATUS.SYSTEM         = OS/2
```

```
------------TEST 5:  Output Variables-------------
Procedure name        = FLOAT16 ec = 2
OUT.BYTRVS            = default(TRUE)
OUT.COMPLEX           = default(FALSE)
OUT.FIT               = default(TRUNCATE)
OUT.LENGTH            = 64
OUT.RADIX             = default(2)
OUT.TERM              = <double data definition>
OUT.TYPE              = FLOAT2
```

0107W Possible loss of precision in conversion of FLOAT16 to

```
-------------TEST 6:  Input Variables-------------
Procedure name        = FLOAT16

IN.TYPE               = FLOAT16
IN.BYTRVS             = FALSE
IN.COMPLEX            = FALSE
IN.FIT                = TRUNCATE
IN.LENGTH             = 128
IN.RADIX              = 2
STATUS.SIGNIFICANT_I  = 31
STATUS.SYSTEM         = OS/2
```

```
------------TEST 6:  Output Variables-------------
Procedure name        = FLOAT16 ec = 2
OUT.BYTRVS            = default(TRUE)
OUT.COMPLEX           = default(FALSE)
OUT.FIT               = default(TRUNCATE)
OUT.LENGTH            = 128
OUT.RADIX             = default(2)
OUT.TERM              = <long double data definition>
OUT.TYPE              = FLOAT2
```

0107W Possible loss of precision in conversion of FLOAT16 to

Unclassified

A.18 Test Translate FLOAT2 for S/370 on 12/15/91 at 18:05:35

```
------------TEST 1:  Input Variables------------
Procedure name        = FLOAT2

IN.TYPE               = FLOAT2
IN.LENGTH             = 32
STATUS.SIGNIFICANT_I  = 31
STATUS.SYSTEM         = OS/2
```

```
------------TEST 1:  Output Variables------------
Procedure name        = FLOAT2 ec = 0
OUT.BYTRVS            = default(TRUE)
OUT.COMPLEX           = default(FALSE)
OUT.FIT               = default(TRUNCATE)
OUT.LENGTH            = default(32)
OUT.RADIX             = default(2)
OUT.TERM              = <float data definition>
OUT.TYPE              = FLOAT2
```

```
------------TEST 2:  Input Variables------------
Procedure name        = FLOAT2

IN.TYPE               = FLOAT2
IN.LENGTH             = 64
STATUS.SIGNIFICANT_I  = 31
STATUS.SYSTEM         = OS/2
```

```
------------TEST 2:  Output Variables------------
Procedure name        = FLOAT2 ec = 0
OUT.BYTRVS            = default(TRUE)
OUT.COMPLEX           = default(FALSE)
OUT.FIT               = default(TRUNCATE)
OUT.LENGTH            = 64
OUT.RADIX             = default(2)
OUT.TERM              = <double data definition>
OUT.TYPE              = FLOAT2
```

```
------------TEST 3:  Input Variables------------
Procedure name        = FLOAT2

IN.TYPE               = FLOAT2
IN.LENGTH             = 80
STATUS.SIGNIFICANT_I  = 31
STATUS.SYSTEM         = OS/2
```

```
------------TEST 3:  Output Variables------------
Procedure name        = FLOAT2 ec = 0
OUT.BYTRVS            = default(TRUE)
OUT.COMPLEX           = default(FALSE)
OUT.FIT               = default(TRUNCATE)
OUT.LENGTH            = 128
OUT.RADIX             = default(2)
OUT.TERM              = <long double data definition>
OUT.TYPE              = FLOAT2
```

Unclassified

```
-------------TEST 4:  Input Variables-------------
Procedure name        = FLOAT2

IN.TYPE               = FLOAT2
IN.LENGTH             = 32
STATUS.SIGNIFICANT_I  = 31
STATUS.SYSTEM         = S/370
```

```
------------TEST 4:  Output Variables-------------
Procedure name        = FLOAT2 ec = 2
OUT.COMPLEX           = default(FALSE)
OUT.FIT               = default(TRUNCATE)
OUT.LENGTH            = default(32)
OUT.RADIX             = default(2)
OUT.TERM              = <float data definition>
OUT.TYPE              = FLOAT16
```

0109W Possible loss of precision in conversion of FLOAT2 to

```
-------------TEST 5:  Input Variables-------------
Procedure name        = FLOAT2

IN.TYPE               = FLOAT2
IN.LENGTH             = 64
STATUS.SIGNIFICANT_I  = 31
STATUS.SYSTEM         = S/370
```

```
------------TEST 5:  Output Variables-------------
Procedure name        = FLOAT2 ec = 2
OUT.COMPLEX           = default(FALSE)
OUT.FIT               = default(TRUNCATE)
OUT.LENGTH            = 64
OUT.RADIX             = default(2)
OUT.TERM              = <double data definition>
OUT.TYPE              = FLOAT16
```

0108W FLOAT2 to FLOAT16 conversion may cause overflow or

```
-------------TEST 6:  Input Variables-------------
Procedure name        = FLOAT2

IN.TYPE               = FLOAT2
IN.LENGTH             = 80
STATUS.SIGNIFICANT_I  = 31
STATUS.SYSTEM         = S/370
```

```
------------TEST 6:  Output Variables-------------
Procedure name        = FLOAT2 ec = 2
OUT.COMPLEX           = default(FALSE)
OUT.FIT               = default(TRUNCATE)
OUT.LENGTH            = 128
OUT.RADIX             = default(2)
OUT.TERM              = <long double data definition>
OUT.TYPE              = FLOAT16
```

0108W FLOAT2 to FLOAT16 conversion may cause overflow or

Appendix B. Generate Source Text Test Results

B.1 Test Generate ASIS for S/370 on 08/26/91 at 17:32:48 . . . . . . . . 398
B.2 Test Generate BINARY for OS/2 on 08/23/91 at 11:56:41 . . . . . . . . 400
B.3 Test Generate BINARY for S/370 on 08/23/91 at 11:56:12 . . . . . . . . 409
B.4 Test Generate BOOLEAN for S/370 on 08/27/91 at 15:57:51 . . . . . . . . 418
B.5 Test Generate CHAR for S/370 on 08/26/91 at 17:36:41 . . . . . . . . 419
B.6 Test Generate CHARSFX for S/370 on 08/26/91 at 17:24:05 . . . . . . . . 420
B.7 Test Generate DMNATTR for S/370 on 08/27/91 at 16:40:38 . . . . . . . . 421
B.8 Test Generate ENUMERAT for S/370 on 08/27/91 at 17:09:04 . . . . . . . . 422
B.9 Test Generate FLOAT16 for S/370 on 08/27/91 at 15:49:23 . . . . . . . . 423
B.10 Test Generate FLOAT2 for OS/2 on 08/27/91 at 15:49:39 . . . . . . . . 425

These tests provide, at a minimum, complete code segment coverage. They have not been designed to provide complete path coverage.

Unclassified

B.1 Test Generate ASIS for S/370 on 08/26/91 at 17:32:48

```
-------------TEST 1:  Input Variables-------------
Procedure name        = ASIS

IN.TYPE               = ASIS
IN.LENGTH             = ADL<qualified identifier>
IN.MAXALC             = FALSE
IN.MAXLEN             = 80
IN.UNITLEN            = 1
STATUS.SIGNIFICANT_I  = 31
STATUS.SYSTEM         = S/370
```

```
------------TEST 1:  OUTPUT VARIABLES-------------
Procedure name        = ASIS ec = 0

OUT.TERM              = <string data definition>
OUT.extern            =
OUT.ARRAY_ANNOTATION  =
OUT.ATTRIBUTE         =
OUT.SIGN_ADJECTIVE    =
OUT.STRING_ANNOTATIO  = ASIS UNITLEN(1) LENGTH(ADL<qualified identifier>) MAXALC(FALSE)
OUT.STRING_SIZE       = 10
OUT.SUBSCRIPT_DECLAR  =
OUT.TYPE_SPECIFIER    = CHAR
```

```
-------------TEST 2:  Input Variables-------------
Procedure name        = ASIS

IN.TYPE               = ASIS
IN.LENGTH             = ADL<qualified identifier>
IN.MAXALC             = FALSE
IN.MAXLEN             = 100
IN.UNITLEN            = 8
STATUS.SIGNIFICANT_I  = 31
STATUS.SYSTEM         = S/370
```

```
------------TEST 2:  OUTPUT VARIABLES-------------
Procedure name        = ASIS ec = 0

OUT.TERM              = <string data definition>
OUT.extern            =
OUT.ARRAY_ANNOTATION  =
OUT.ATTRIBUTE         =
OUT.SIGN_ADJECTIVE    =
OUT.STRING_ANNOTATIO  = ASIS LENGTH(ADL<qualified identifier>) MAXALC(FALSE)
OUT.STRING_SIZE       = 100
OUT.SUBSCRIPT_DECLAR  =
OUT.TYPE_SPECIFIER    = CHAR
```

```
-------------TEST 3:  Input Variables-------------
Procedure name        = ASIS

IN.TYPE               = ASIS
IN.LENGTH             = 4096
IN.MAXALC             = TRUE
IN.UNITLEN            = 16
STATUS.SIGNIFICANT_I  = 31
STATUS.SYSTEM         = S/370
```

```
------------TEST 3:  Output Variables-------------
Procedure name        = ASIS ec = 0

OUT.TERM              = <wide string data definition>
OUT.extern            =
OUT.ARRAY_ANNOTATION  =
OUT.ATTRIBUTE         =
OUT.SIGN_ADJECTIVE    =
OUT.STRING_SIZE       = 4096
OUT.SUBSCRIPT_DECLAR  =
OUT.TYPE_SPECIFIER    = WCHAR_T
OUT.WIDE_STRING_ANNO  = ASIS
```

Unclassified

| -------------TEST 4: Input Variables------------- | -------------TEST 4: Output Variables------------- |
|---|---|
| Procedure name = ASIS | Procedure name = ASIS ec = 3 |
| IN.TYPE = ASIS | OUT.extern = |
| IN.LENGTH = 4096 | OUT.ARRAY_ANNOTATION = |
| IN.MAXALC = TRUE | OUT.ATTRIBUTE = |
| IN.UNITLEN = 32 | OUT.SIGN_ADJECTIVE = |
| STATUS.SIGNIFICANT_I = 31 | OUT.STRING_SIZE = 4096 |
| STATUS.SYSTEM = S/370 | OUT.SUBSCRIPT_DECLAR = |
| | Invalid UNITLEN value |

Unclassified

B.2 Test Generate BINARY for OS/2 on 08/23/91 at 11:56:41

```
-------------TEST 1:  Input Variables-------------
Procedure name        = BINARY

IN.TYPE               = BINARY
IN.BYTRVS             = TRUE
IN.COMPLEX            = FALSE
IN.CONSTRAINED        = FALSE
IN.FIT                = TRUNCATE
IN.LENGTH             = 16
IN.PRECISION          = 15
IN.RADIX              = 2
IN.SCALE              = 127
IN.SIGNED             = TRUE
STATUS.CONTAINING     = SEQUENCE
STATUS.MAX_PRECISION  = 15
STATUS.SIGNIFICANT_I  = 31
STATUS.SYSTEM         = OS/2
```

```
------------TEST 1:  Output Variables-------------
Procedure name        = BINARY ec = 0
OUT.TERM              = <float data definition>

OUT.BYTRVS            = default(FALSE)
OUT.COMPLEX           = default(FALSE)
OUT.FIT               = default(TRUNCATE)
OUT.LENGTH            = default(32)
OUT.RADIX             = default(2)
```

```
-------------TEST 2:  Input Variables-------------
Procedure name        = BINARY

IN.TYPE               = BINARY
IN.BYTRVS             = TRUE
IN.COMPLEX            = FALSE
IN.CONSTRAINED        = FALSE
IN.FIT                = TRUNCATE
IN.LENGTH             = 32
IN.PRECISION          = 31
IN.RADIX              = 2
IN.SCALE              = 127
IN.SIGNED             = TRUE
STATUS.CONTAINING     = SEQUENCE
STATUS.MAX_PRECISION  = 31
STATUS.SIGNIFICANT_I  = 31
STATUS.SYSTEM         = OS/2
```

```
------------TEST 2:  Output Variables-------------
Procedure name        = BINARY ec = 0
OUT.TERM              = <double data definition>

OUT.BYTRVS            = default(FALSE)
OUT.COMPLEX           = default(FALSE)
OUT.FIT               = default(TRUNCATE)
OUT.LENGTH            = 64
OUT.RADIX             = default(2)
```

```
-------------TEST 3:  Input Variables-------------
Procedure name        = BINARY

IN.TYPE               = BINARY
IN.BYTRVS             = TRUE
IN.COMPLEX            = FALSE
IN.CONSTRAINED        = FALSE
IN.FIT                = TRUNCATE
IN.LENGTH             = 64
IN.PRECISION          = 63
IN.RADIX              = 2
IN.SCALE              = 127
IN.SIGNED             = TRUE
STATUS.CONTAINING     = SEQUENCE
STATUS.MAX_PRECISION  = 63
STATUS.SIGNIFICANT_I  = 31
STATUS.SYSTEM         = OS/2
```

```
------------TEST 3:  Output Variables-------------
Procedure name        = BINARY ec = 0
OUT.TERM              = <long double data definition>

OUT.BYTRVS            = default(FALSE)
OUT.COMPLEX           = default(FALSE)
OUT.FIT               = default(TRUNCATE)
OUT.LENGTH            = 128
OUT.RADIX             = default(2)
```

Unclassified

```
-------------TEST 4:  Input Variables-------------
Procedure name        = BINARY

IN.TYPE               = BINARY
IN.BYTRVS             = TRUE
IN.COMPLEX            = FALSE
IN.CONSTRAINED        = FALSE
IN.FIT                = TRUNCATE
IN.LENGTH             = 16
IN.PRECISION          = 15
IN.RADIX              = 2
IN.SCALE              = -128
IN.SIGNED             = TRUE
STATUS.CONTAINING     = SEQUENCE
STATUS.MAX_PRECISION  = 15
STATUS.SIGNIFICANT_I  = 31
STATUS.SYSTEM         = OS/2
```

```
------------TEST 4:  Output Variables-------------
Procedure name        = BINARY ec = 0
OUT.TERM              = <float data definition>

OUT.BYTRVS            = default(FALSE)
OUT.COMPLEX           = default(FALSE)
OUT.FIT               = default(TRUNCATE)
OUT.LENGTH            = default(32)
OUT.RADIX             = default(2)
```

```
-------------TEST 5:  Input Variables-------------
Procedure name        = BINARY

IN.TYPE               = BINARY
IN.BYTRVS             = TRUE
IN.COMPLEX            = FALSE
IN.CONSTRAINED        = FALSE
IN.FIT                = TRUNCATE
IN.LENGTH             = 32
IN.PRECISION          = 31
IN.RADIX              = 2
IN.SCALE              = -128
IN.SIGNED             = TRUE
STATUS.CONTAINING     = SEQUENCE
STATUS.MAX_PRECISION  = 31
STATUS.SIGNIFICANT_I  = 31
STATUS.SYSTEM         = OS/2
```

```
------------TEST 5:  Output Variables-------------
Procedure name        = BINARY ec = 0
OUT.TERM              = <double data definition>

OUT.BYTRVS            = default(FALSE)
OUT.COMPLEX           = default(FALSE)
OUT.FIT               = default(TRUNCATE)
OUT.LENGTH            = 64
OUT.RADIX             = default(2)
```

```
-------------TEST 6:  Input Variables-------------
Procedure name        = BINARY

IN.TYPE               = BINARY
IN.BYTRVS             = TRUE
IN.COMPLEX            = FALSE
IN.CONSTRAINED        = FALSE
IN.FIT                = TRUNCATE
IN.LENGTH             = 64
IN.PRECISION          = 63
IN.RADIX              = 2
IN.SCALE              = -128
IN.SIGNED             = TRUE
STATUS.CONTAINING     = SEQUENCE
STATUS.MAX_PRECISION  = 63
STATUS.SIGNIFICANT_I  = 31
STATUS.SYSTEM         = OS/2
```

```
------------TEST 6:  Output Variables-------------
Procedure name        = BINARY ec = 0
OUT.TERM              = <long double data definition>

OUT.BYTRVS            = default(FALSE)
OUT.COMPLEX           = default(FALSE)
OUT.FIT               = default(TRUNCATE)
OUT.LENGTH            = 128
OUT.RADIX             = default(2)
```

Unclassified

| -------------TEST 7: Input Variables------------- | | -------------TEST 7: Output Variables------------- | |
|---|---|---|---|
| Procedure name | = BINARY | Procedure name | = BINARY ec = 0 |
| | | OUT.TERM | = <char data definition> |
| IN.TYPE | = BINARY | | |
| IN.BYTRVS | = TRUE | OUT.BYTRVS | = default(FALSE) |
| IN.COMPLEX | = FALSE | OUT.COMPLEX | = default(FALSE) |
| IN.CONSTRAINED | = FALSE | OUT.CONSTRAINED | = default(FALSE) |
| IN.FIT | = TRUNCATE | OUT.FIT | = default(TRUNCATE) |
| IN.LENGTH | = 8 | OUT.LENGTH | = 8 |
| IN.PRECISION | = 7 | OUT.PRECISION | = 7 |
| IN.RADIX | = 2 | OUT.RADIX | = default(2) |
| IN.SCALE | = 0 | OUT.SCALE | = default(0) |
| IN.SIGNED | = TRUE | OUT.SIGNED | = default(TRUE) |
| STATUS.CONTAINING | = SEQUENCE | | |
| STATUS.MAX_PRECISION | = 7 | | |
| STATUS.SIGNIFICANT_I | = 31 | | |
| STATUS.SYSTEM | = OS/2 | | |

| -------------TEST 8: Input Variables------------- | | -------------TEST 8: Output Variables------------- | |
|---|---|---|---|
| Procedure name | = BINARY | Procedure name | = BINARY ec = 0 |
| | | OUT.TERM | = <int data definition> |
| IN.TYPE | = BINARY | | |
| IN.BYTRVS | = TRUE | OUT.BYTRVS | = default(FALSE) |
| IN.COMPLEX | = FALSE | OUT.COMPLEX | = default(FALSE) |
| IN.CONSTRAINED | = FALSE | OUT.CONSTRAINED | = default(FALSE) |
| IN.FIT | = TRUNCATE | OUT.FIT | = default(TRUNCATE) |
| IN.LENGTH | = 16 | OUT.LENGTH | = 16 |
| IN.PRECISION | = 15 | OUT.PRECISION | = 15 |
| IN.RADIX | = 2 | OUT.RADIX | = default(2) |
| IN.SCALE | = 0 | OUT.SCALE | = default(0) |
| IN.SIGNED | = TRUE | OUT.SIGNED | = default(TRUE) |
| STATUS.CONTAINING | = SEQUENCE | | |
| STATUS.MAX_PRECISION | = 15 | | |
| STATUS.SIGNIFICANT_I | = 31 | | |
| STATUS.SYSTEM | = OS/2 | | |

| -------------TEST 9: Input Variables------------- | | -------------TEST 9: Output Variables------------- | |
|---|---|---|---|
| Procedure name | = BINARY | Procedure name | = BINARY ec = 0 |
| | | OUT.TERM | = <int data definition> |
| IN.TYPE | = BINARY | | |
| IN.BYTRVS | = TRUE | OUT.BYTRVS | = default(FALSE) |
| IN.COMPLEX | = FALSE | OUT.COMPLEX | = default(FALSE) |
| IN.CONSTRAINED | = FALSE | OUT.CONSTRAINED | = default(FALSE) |
| IN.FIT | = TRUNCATE | OUT.FIT | = default(TRUNCATE) |
| IN.LENGTH | = 32 | OUT.LENGTH | = default(32) |
| IN.PRECISION | = 31 | OUT.PRECISION | = default(31) |
| IN.RADIX | = 2 | OUT.RADIX | = default(2) |
| IN.SCALE | = 0 | OUT.SCALE | = default(0) |
| IN.SIGNED | = TRUE | OUT.SIGNED | = default(TRUE) |
| STATUS.CONTAINING | = SEQUENCE | | |
| STATUS.MAX_PRECISION | = 31 | | |
| STATUS.SIGNIFICANT_I | = 31 | | |
| STATUS.SYSTEM | = OS/2 | | |

Unclassified

| Input | Output |
|---|---|
| ------------TEST 10: Input Variables------------- | ------------TEST 10: Output Variables------------ |
| Procedure name = BINARY | Procedure name = BINARY ec = 0 |
| | OUT.TERM = <char data definition> |
| IN.TYPE = BINARY | |
| IN.BYTRVS = TRUE | OUT.BYTRVS = default(FALSE) |
| IN.COMPLEX = FALSE | OUT.COMPLEX = default(FALSE) |
| IN.CONSTRAINED = FALSE | OUT.CONSTRAINED = default(FALSE) |
| IN.FIT = TRUNCATE | OUT.FIT = default(TRUNCATE) |
| IN.LENGTH = 8 | OUT.LENGTH = 8 |
| IN.PRECISION = 8 | OUT.PRECISION = 8 |
| IN.RADIX = 2 | OUT.RADIX = default(2) |
| IN.SCALE = 0 | OUT.SCALE = default(0) |
| IN.SIGNED = FALSE | OUT.SIGNED = FALSE |
| STATUS.CONTAINING = SEQUENCE | |
| STATUS.MAX_PRECISION = 8 | |
| STATUS.SIGNIFICANT_I = 31 | |
| STATUS.SYSTEM = OS/2 | |
| ------------TEST 11: Input Variables------------- | ------------TEST 11: Output Variables------------ |
| Procedure name = BINARY | Procedure name = BINARY ec = 0 |
| | OUT.TERM = <int data definition> |
| IN.TYPE = BINARY | |
| IN.BYTRVS = TRUE | OUT.BYTRVS = default(FALSE) |
| IN.COMPLEX = FALSE | OUT.COMPLEX = default(FALSE) |
| IN.CONSTRAINED = FALSE | OUT.CONSTRAINED = default(FALSE) |
| IN.FIT = TRUNCATE | OUT.FIT = default(TRUNCATE) |
| IN.LENGTH = 16 | OUT.LENGTH = 16 |
| IN.PRECISION = 16 | OUT.PRECISION = 16 |
| IN.RADIX = 2 | OUT.RADIX = default(2) |
| IN.SCALE = 0 | OUT.SCALE = default(0) |
| IN.SIGNED = FALSE | OUT.SIGNED = FALSE |
| STATUS.CONTAINING = SEQUENCE | |
| STATUS.MAX_PRECISION = 16 | |
| STATUS.SIGNIFICANT_I = 31 | |
| STATUS.SYSTEM = OS/2 | |
| ------------TEST 12: Input Variables------------- | ------------TEST 12: Output Variables------------ |
| Procedure name = BINARY | Procedure name = BINARY ec = 0 |
| | OUT.TERM = <int data definition> |
| IN.TYPE = BINARY | |
| IN.BYTRVS = TRUE | OUT.BYTRVS = default(FALSE) |
| IN.COMPLEX = FALSE | OUT.COMPLEX = default(FALSE) |
| IN.CONSTRAINED = FALSE | OUT.CONSTRAINED = default(FALSE) |
| IN.FIT = TRUNCATE | OUT.FIT = default(TRUNCATE) |
| IN.LENGTH = 32 | OUT.LENGTH = default(32) |
| IN.PRECISION = 32 | OUT.PRECISION = 32 |
| IN.RADIX = 2 | OUT.RADIX = default(2) |
| IN.SCALE = 0 | OUT.SCALE = default(0) |
| IN.SIGNED = FALSE | OUT.SIGNED = FALSE |
| STATUS.CONTAINING = SEQUENCE | |
| STATUS.MAX_PRECISION = 32 | |
| STATUS.SIGNIFICANT_I = 31 | |
| STATUS.SYSTEM = OS/2 | |

Unclassified

```
------------TEST 13:  Input Variables------------
Procedure name        = BINARY

IN.TYPE               = BINARY
IN.BYTRVS             = TRUE
IN.COMPLEX            = FALSE
IN.CONSTRAINED        = FALSE
IN.FIT                = TRUNCATE
IN.LENGTH             = 5
IN.PRECISION          = 5
IN.RADIX              = 2
IN.SCALE              = 0
IN.SIGNED             = FALSE
STATUS.CONTAINING     = ARRAY
STATUS.MAX_PRECISION = 5
STATUS.SIGNIFICANT_I = 31
STATUS.SYSTEM         = OS/2
```

```
------------TEST 13:  Output Variables------------
Procedure name        = BINARY ec = 0
OUT.TERM              = <char data definition>

OUT.BYTRVS            = default(FALSE)
OUT.COMPLEX           = default(FALSE)
OUT.CONSTRAINED       = default(FALSE)
OUT.FIT               = default(TRUNCATE)
OUT.LENGTH            = 8
OUT.PRECISION         = 8
OUT.RADIX             = default(2)
OUT.SCALE             = default(0)
OUT.SIGNED            = FALSE
```

```
------------TEST 14:  Input Variables------------
Procedure name        = BINARY

IN.TYPE               = BINARY
IN.BYTRVS             = TRUE
IN.COMPLEX            = FALSE
IN.CONSTRAINED        = FALSE
IN.FIT                = TRUNCATE
IN.LENGTH             = 12
IN.PRECISION          = 12
IN.RADIX              = 2
IN.SCALE              = 0
IN.SIGNED             = FALSE
STATUS.CONTAINING     = ARRAY
STATUS.MAX_PRECISION = 12
STATUS.SIGNIFICANT_I = 31
STATUS.SYSTEM         = OS/2
```

```
------------TEST 14:  Output Variables------------
Procedure name        = BINARY ec = 0
OUT.TERM              = <int data definition>

OUT.BYTRVS            = default(FALSE)
OUT.COMPLEX           = default(FALSE)
OUT.CONSTRAINED       = default(FALSE)
OUT.FIT               = default(TRUNCATE)
OUT.LENGTH            = 16
OUT.PRECISION         = 16
OUT.RADIX             = default(2)
OUT.SCALE             = default(0)
OUT.SIGNED            = FALSE
```

```
------------TEST 15:  Input Variables------------
Procedure name        = BINARY

IN.TYPE               = BINARY
IN.BYTRVS             = TRUE
IN.COMPLEX            = FALSE
IN.CONSTRAINED        = FALSE
IN.FIT                = TRUNCATE
IN.LENGTH             = 4
IN.PRECISION          = 3
IN.RADIX              = 2
IN.SCALE              = 0
IN.SIGNED             = TRUE
STATUS.CONTAINING     = ARRAY
STATUS.MAX_PRECISION = 3
STATUS.SIGNIFICANT_I = 31
STATUS.SYSTEM         = OS/2
```

```
------------TEST 15:  Output Variables------------
Procedure name        = BINARY ec = 0
OUT.TERM              = <char data definition>

OUT.BYTRVS            = default(FALSE)
OUT.COMPLEX           = default(FALSE)
OUT.CONSTRAINED       = default(FALSE)
OUT.FIT               = default(TRUNCATE)
OUT.LENGTH            = 8
OUT.PRECISION         = 7
OUT.RADIX             = default(2)
OUT.SCALE             = default(0)
OUT.SIGNED            = default(TRUE)
```

Unclassified

```
------------TEST 16:  Input Variables------------
Procedure name       = BINARY

IN.TYPE              = BINARY
IN.BYTRVS            = TRUE
IN.COMPLEX           = FALSE
IN.CONSTRAINED       = FALSE
IN.FIT               = TRUNCATE
IN.LENGTH            = 24
IN.PRECISION         = 23
IN.RADIX             = 2
IN.SCALE             = 0
IN.SIGNED            = TRUE
STATUS.CONTAINING    = ARRAY
STATUS.MAX_PRECISION = 23
STATUS.SIGNIFICANT_I = 31
STATUS.SYSTEM        = OS/2
```

```
------------TEST 16:  Output Variables------------
Procedure name       = BINARY ec = 0
OUT.TERM             = <int data definition>

OUT.BYTRVS           = default(FALSE)
OUT.COMPLEX          = default(FALSE)
OUT.CONSTRAINED      = default(FALSE)
OUT.FIT              = default(TRUNCATE)
OUT.LENGTH           = 24
OUT.PRECISION        = 23
OUT.RADIX            = default(2)
OUT.SCALE            = default(0)
OUT.SIGNED           = default(TRUE)
```

```
------------TEST 17:  Input Variables------------
Procedure name       = BINARY

IN.TYPE              = BINARY
IN.BYTRVS            = TRUE
IN.COMPLEX           = FALSE
IN.CONSTRAINED       = FALSE
IN.FIT               = TRUNCATE
IN.LENGTH            = 4
IN.PRECISION         = 3
IN.RADIX             = 2
IN.SCALE             = 0
IN.SIGNED            = TRUE
STATUS.CONTAINING    = SEQUENCE
STATUS.MAX_PRECISION = 3
STATUS.SIGNIFICANT_I = 31
STATUS.SYSTEM        = OS/2
```

```
------------TEST 17:  Output Variables------------
Procedure name       = BINARY ec = 0
OUT.TERM             = <bit field>

OUT.BYTRVS           = default(FALSE)
OUT.COMPLEX          = default(FALSE)
OUT.CONSTRAINED      = default(FALSE)
OUT.FIT              = default(TRUNCATE)
OUT.LENGTH           = 4
OUT.PRECISION        = 3
OUT.RADIX            = default(2)
OUT.SCALE            = default(0)
OUT.SIGNED           = default(TRUE)
```

```
------------TEST 18:  Input Variables------------
Procedure name       = BINARY

IN.TYPE              = BINARY
IN.BYTRVS            = TRUE
IN.COMPLEX           = FALSE
IN.CONSTRAINED       = FALSE
IN.FIT               = TRUNCATE
IN.LENGTH            = 23
IN.PRECISION         = 23
IN.RADIX             = 2
IN.SCALE             = 0
IN.SIGNED            = FALSE
STATUS.CONTAINING    = CASE
STATUS.MAX_PRECISION = 23
STATUS.SIGNIFICANT_I = 31
STATUS.SYSTEM        = OS/2
```

```
------------TEST 18:  Output Variables------------
Procedure name       = BINARY ec = 0
OUT.TERM             = <bit field>

OUT.BYTRVS           = default(FALSE)
OUT.COMPLEX          = default(FALSE)
OUT.CONSTRAINED      = default(FALSE)
OUT.FIT              = default(TRUNCATE)
OUT.LENGTH           = 23
OUT.PRECISION        = 23
OUT.RADIX            = default(2)
OUT.SCALE            = default(0)
OUT.SIGNED           = FALSE
```

Unclassified

| Input | Output |
|---|---|
| ------------TEST 19: **Input Variables**------------- | ------------TEST 19: **Output Variables**------------ |
| Procedure name = BINARY | Procedure name = BINARY ec = 0 |
| | OUT.TERM = <char data definition> |
| IN.TYPE = BINARY | |
| IN.BYTRVS = TRUE | OUT.BYTRVS = default(FALSE) |
| IN.COMPLEX = FALSE | OUT.COMPLEX = default(FALSE) |
| IN.CONSTRAINED = FALSE | OUT.CONSTRAINED = default(FALSE) |
| IN.FIT = TRUNCATE | OUT.FIT = default(TRUNCATE) |
| IN.LENGTH = 8 | OUT.LENGTH = 8 |
| IN.PRECISION = 7 | OUT.PRECISION = 7 |
| IN.RADIX = 2 | OUT.RADIX = default(2) |
| IN.SCALE = 0 | OUT.SCALE = default(0) |
| IN.SIGNED = TRUE | OUT.SIGNED = default(TRUE) |
| STATUS.CONTAINING = SEQUENCE | |
| STATUS.MAX_PRECISION = 7 | |
| STATUS.SIGNIFICANT_I = 31 | |
| STATUS.SYSTEM = OS/2 | |

| Input | Output |
|---|---|
| ------------TEST 20: **Input Variables**------------- | ------------TEST 20: **Output Variables**------------ |
| Procedure name = BINARY | Procedure name = BINARY ec = 0 |
| | OUT.TERM = <int data definition> |
| IN.TYPE = BINARY | |
| IN.BYTRVS = TRUE | OUT.BYTRVS = default(FALSE) |
| IN.COMPLEX = FALSE | OUT.COMPLEX = default(FALSE) |
| IN.CONSTRAINED = FALSE | OUT.CONSTRAINED = default(FALSE) |
| IN.FIT = TRUNCATE | OUT.FIT = default(TRUNCATE) |
| IN.LENGTH = 16 | OUT.LENGTH = 16 |
| IN.PRECISION = 15 | OUT.PRECISION = 15 |
| IN.RADIX = 2 | OUT.RADIX = default(2) |
| IN.SCALE = 0 | OUT.SCALE = default(0) |
| IN.SIGNED = TRUE | OUT.SIGNED = default(TRUE) |
| STATUS.CONTAINING = SEQUENCE | |
| STATUS.MAX_PRECISION = 15 | |
| STATUS.SIGNIFICANT_I = 31 | |
| STATUS.SYSTEM = OS/2 | |

| Input | Output |
|---|---|
| ------------TEST 21: **Input Variables**------------- | ------------TEST 21: **Output Variables**------------ |
| Procedure name = BINARY | Procedure name = BINARY ec = 0 |
| | OUT.TERM = <int data definition> |
| IN.TYPE = BINARY | |
| IN.BYTRVS = TRUE | OUT.BYTRVS = default(FALSE) |
| IN.COMPLEX = FALSE | OUT.COMPLEX = default(FALSE) |
| IN.CONSTRAINED = FALSE | OUT.CONSTRAINED = default(FALSE) |
| IN.FIT = TRUNCATE | OUT.FIT = default(TRUNCATE) |
| IN.LENGTH = 32 | OUT.LENGTH = default(32) |
| IN.PRECISION = 31 | OUT.PRECISION = default(31) |
| IN.RADIX = 2 | OUT.RADIX = default(2) |
| IN.SCALE = 0 | OUT.SCALE = default(0) |
| IN.SIGNED = TRUE | OUT.SIGNED = default(TRUE) |
| STATUS.CONTAINING = SEQUENCE | |
| STATUS.MAX_PRECISION = 31 | |
| STATUS.SIGNIFICANT_I = 31 | |
| STATUS.SYSTEM = OS/2 | |

Unclassified

```
------------TEST 22:  Input Variables-------------
Procedure name        = BINARY

IN.TYPE               = BINARY
IN.BYTRVS             = TRUE
IN.COMPLEX            = FALSE
IN.CONSTRAINED        = FALSE
IN.FIT                = TRUNCATE
IN.LENGTH             = 8
IN.PRECISION          = 8
IN.RADIX              = 2
IN.SCALE              = 0
IN.SIGNED             = FALSE
STATUS.CONTAINING     = SEQUENCE
STATUS.MAX_PRECISION  = 8
STATUS.SIGNIFICANT_I  = 31
STATUS.SYSTEM         = OS/2
```

```
------------TEST 22:  Output Variables------------
Procedure name        = BINARY ec = 0
OUT.TERM              = <char data definition>

OUT.BYTRVS            = default(FALSE)
OUT.COMPLEX           = default(FALSE)
OUT.CONSTRAINED       = default(FALSE)
OUT.FIT               = default(TRUNCATE)
OUT.LENGTH            = 8
OUT.PRECISION         = 8
OUT.RADIX             = default(2)
OUT.SCALE             = default(0)
OUT.SIGNED            = FALSE
```

```
------------TEST 23:  Input Variables-------------
Procedure name        = BINARY

IN.TYPE               = BINARY
IN.BYTRVS             = TRUE
IN.COMPLEX            = FALSE
IN.CONSTRAINED        = FALSE
IN.FIT                = TRUNCATE
IN.LENGTH             = 16
IN.PRECISION          = 16
IN.RADIX              = 2
IN.SCALE              = 0
IN.SIGNED             = TRUE
STATUS.CONTAINING     = SEQUENCE
STATUS.MAX_PRECISION  = 15
STATUS.SIGNIFICANT_I  = 31
STATUS.SYSTEM         = OS/2
```

```
------------TEST 23:  Output Variables------------
Procedure name        = BINARY ec = 0
OUT.TERM              = <int data definition>

OUT.BYTRVS            = default(FALSE)
OUT.COMPLEX           = default(FALSE)
OUT.CONSTRAINED       = default(FALSE)
OUT.FIT               = default(TRUNCATE)
OUT.LENGTH            = 16
OUT.PRECISION         = 15
OUT.RADIX             = default(2)
OUT.SCALE             = default(0)
OUT.SIGNED            = default(TRUE)
```

```
------------TEST 24:  Input Variables-------------
Procedure name        = BINARY

IN.TYPE               = BINARY
IN.BYTRVS             = TRUE
IN.COMPLEX            = FALSE
IN.CONSTRAINED        = FALSE
IN.FIT                = TRUNCATE
IN.LENGTH             = 32
IN.PRECISION          = 32
IN.RADIX              = 2
IN.SCALE              = 0
IN.SIGNED             = TRUE
STATUS.CONTAINING     = SEQUENCE
STATUS.MAX_PRECISION  = 31
STATUS.SIGNIFICANT_I  = 31
STATUS.SYSTEM         = OS/2
```

```
------------TEST 24:  Output Variables------------
Procedure name        = BINARY ec = 0
OUT.TERM              = <int data definition>

OUT.BYTRVS            = default(FALSE)
OUT.COMPLEX           = default(FALSE)
OUT.CONSTRAINED       = default(FALSE)
OUT.FIT               = default(TRUNCATE)
OUT.LENGTH            = default(32)
OUT.PRECISION         = default(31)
OUT.RADIX             = default(2)
OUT.SCALE             = default(0)
OUT.SIGNED            = default(TRUE)
```

Unclassified

```
------------TEST 25:  Input Variables-------------
Procedure name        = BINARY

IN.TYPE               = BINARY
IN.BYTRVS             = TRUE
IN.COMPLEX            = FALSE
IN.CONSTRAINED        = FALSE
IN.FIT                = TRUNCATE
IN.LENGTH             = 5
IN.PRECISION          = 4
IN.RADIX              = 2
IN.SCALE              = 0
IN.SIGNED             = TRUE
STATUS.CONTAINING     = SEQUENCE
STATUS.MAX_PRECISION  = 4
STATUS.SIGNIFICANT_I  = 31
STATUS.SYSTEM         = OS/2
```

```
------------TEST 25:  Output Variables------------
Procedure name        = BINARY ec = 0
OUT.TERM              = <bit field>

OUT.BYTRVS            = default(FALSE)
OUT.COMPLEX           = default(FALSE)
OUT.CONSTRAINED       = default(FALSE)
OUT.FIT               = default(TRUNCATE)
OUT.LENGTH            = 5
OUT.PRECISION         = 4
OUT.RADIX             = default(2)
OUT.SCALE             = default(0)
OUT.SIGNED            = default(TRUE)
```

```
------------TEST 26:  Input Variables-------------
Procedure name        = BINARY

IN.TYPE               = BINARY
IN.BYTRVS             = TRUE
IN.COMPLEX            = FALSE
IN.CONSTRAINED        = FALSE
IN.FIT                = TRUNCATE
IN.LENGTH             = 3
IN.PRECISION          = 3
IN.RADIX              = 2
IN.SCALE              = 0
IN.SIGNED             = FALSE
STATUS.CONTAINING     = SEQUENCE
STATUS.MAX_PRECISION  = 3
STATUS.SIGNIFICANT_I  = 31
STATUS.SYSTEM         = OS/2
```

```
------------TEST 26:  Output Variables------------
Procedure name        = BINARY ec = 0
OUT.TERM              = <bit field>

OUT.BYTRVS            = default(FALSE)
OUT.COMPLEX           = default(FALSE)
OUT.CONSTRAINED       = default(FALSE)
OUT.FIT               = default(TRUNCATE)
OUT.LENGTH            = 3
OUT.PRECISION         = 3
OUT.RADIX             = default(2)
OUT.SCALE             = default(0)
OUT.SIGNED            = FALSE
```

```
------------TEST 27:  Input Variables-------------
Procedure name        = BINARY

IN.TYPE               = BINARY
IN.BYTRVS             = TRUE
IN.COMPLEX            = FALSE
IN.CONSTRAINED        = FALSE
IN.FIT                = TRUNCATE
IN.LENGTH             = 23
IN.PRECISION          = 23
IN.RADIX              = 2
IN.SCALE              = 0
IN.SIGNED             = FALSE
STATUS.CONTAINING     = SEQUENCE
STATUS.MAX_PRECISION  = 23
STATUS.SIGNIFICANT_I  = 31
STATUS.SYSTEM         = OS/2
```

```
------------TEST 27:  Output Variables------------
Procedure name        = BINARY ec = 0
OUT.TERM              = <bit field>

OUT.BYTRVS            = default(FALSE)
OUT.COMPLEX           = default(FALSE)
OUT.CONSTRAINED       = default(FALSE)
OUT.FIT               = default(TRUNCATE)
OUT.LENGTH            = 23
OUT.PRECISION         = 23
OUT.RADIX             = default(2)
OUT.SCALE             = default(0)
OUT.SIGNED            = FALSE
```

Unclassified

B.3 Test Generate BINARY for S/370 on 08/23/91 at 11:56:12

```
-------------TEST 1:  Input Variables-------------
Procedure name        = BINARY

IN.TYPE               = BINARY
IN.BYTRVS             = FALSE
IN.COMPLEX            = FALSE
IN.CONSTRAINED        = FALSE
IN.FIT                = TRUNCATE
IN.LENGTH             = 16
IN.PRECISION          = 15
IN.RADIX              = 2
IN.SCALE              = 127
IN.SIGNED             = TRUE
STATUS.CONTAINING     = SEQUENCE
STATUS.MAX_PRECISION  = 15
STATUS.SIGNIFICANT_I  = 31
STATUS.SYSTEM         = S/370
```

```
------------TEST 1:  Output Variables-------------
Procedure name        = BINARY ec = 0
OUT.TERM              = <float data definition>

OUT.BYTRVS            = default(FALSE)
OUT.COMPLEX           = default(FALSE)
OUT.FIT               = default(TRUNCATE)
OUT.LENGTH            = default(32)
OUT.RADIX             = default(2)
```

```
-------------TEST 2:  Input Variables-------------
Procedure name        = BINARY

IN.TYPE               = BINARY
IN.BYTRVS             = FALSE
IN.COMPLEX            = FALSE
IN.CONSTRAINED        = FALSE
IN.FIT                = TRUNCATE
IN.LENGTH             = 32
IN.PRECISION          = 31
IN.RADIX              = 2
IN.SCALE              = 127
IN.SIGNED             = TRUE
STATUS.CONTAINING     = SEQUENCE
STATUS.MAX_PRECISION  = 31
STATUS.SIGNIFICANT_I  = 31
STATUS.SYSTEM         = S/370
```

```
------------TEST 2:  Output Variables-------------
Procedure name        = BINARY ec = 0
OUT.TERM              = <double data definition>

OUT.BYTRVS            = default(FALSE)
OUT.COMPLEX           = default(FALSE)
OUT.FIT               = default(TRUNCATE)
OUT.LENGTH            = 64
OUT.RADIX             = default(2)
```

```
-------------TEST 3:  Input Variables-------------
Procedure name        = BINARY

IN.TYPE               = BINARY
IN.BYTRVS             = FALSE
IN.COMPLEX            = FALSE
IN.CONSTRAINED        = FALSE
IN.FIT                = TRUNCATE
IN.LENGTH             = 64
IN.PRECISION          = 63
IN.RADIX              = 2
IN.SCALE              = 127
IN.SIGNED             = TRUE
STATUS.CONTAINING     = SEQUENCE
STATUS.MAX_PRECISION  = 63
STATUS.SIGNIFICANT_I  = 31
STATUS.SYSTEM         = S/370
```

```
------------TEST 3:  Output Variables-------------
Procedure name        = BINARY ec = 0
OUT.TERM              = <long double data definition>

OUT.BYTRVS            = default(FALSE)
OUT.COMPLEX           = default(FALSE)
OUT.FIT               = default(TRUNCATE)
OUT.LENGTH            = 128
OUT.RADIX             = default(2)
```

Unclassified

```
-------------TEST 4:  Input Variables-------------
Procedure name          = BINARY

IN.TYPE                 = BINARY
IN.BYTRVS               = FALSE
IN.COMPLEX              = FALSE
IN.CONSTRAINED          = FALSE
IN.FIT                  = TRUNCATE
IN.LENGTH               = 16
IN.PRECISION            = 15
IN.RADIX                = 2
IN.SCALE                = -128
IN.SIGNED               = TRUE
STATUS.CONTAINING       = SEQUENCE
STATUS.MAX_PRECISION    = 15
STATUS.SIGNIFICANT_I    = 31
STATUS.SYSTEM           = S/370
```

```
------------TEST 4:  Output Variables-------------
Procedure name          = BINARY ec = 0
OUT.TERM                = <float data definition>

OUT.BYTRVS              = default(FALSE)
OUT.COMPLEX             = default(FALSE)
OUT.FIT                 = default(TRUNCATE)
OUT.LENGTH              = default(32)
OUT.RADIX               = default(2)
```

```
-------------TEST 5:  Input Variables-------------
Procedure name          = BINARY

IN.TYPE                 = BINARY
IN.BYTRVS               = FALSE
IN.COMPLEX              = FALSE
IN.CONSTRAINED          = FALSE
IN.FIT                  = TRUNCATE
IN.LENGTH               = 32
IN.PRECISION            = 31
IN.RADIX                = 2
IN.SCALE                = -128
IN.SIGNED               = TRUE
STATUS.CONTAINING       = SEQUENCE
STATUS.MAX_PRECISION    = 31
STATUS.SIGNIFICANT_I    = 31
STATUS.SYSTEM           = S/370
```

```
------------TEST 5:  Output Variables-------------
Procedure name          = BINARY ec = 0
OUT.TERM                = <double data definition>

OUT.BYTRVS              = default(FALSE)
OUT.COMPLEX             = default(FALSE)
OUT.FIT                 = default(TRUNCATE)
OUT.LENGTH              = 64
OUT.RADIX               = default(2)
```

```
-------------TEST 6:  Input Variables-------------
Procedure name          = BINARY

IN.TYPE                 = BINARY
IN.BYTRVS               = FALSE
IN.COMPLEX              = FALSE
IN.CONSTRAINED          = FALSE
IN.FIT                  = TRUNCATE
IN.LENGTH               = 64
IN.PRECISION            = 63
IN.RADIX                = 2
IN.SCALE                = -128
IN.SIGNED               = TRUE
STATUS.CONTAINING       = SEQUENCE
STATUS.MAX_PRECISION    = 63
STATUS.SIGNIFICANT_I    = 31
STATUS.SYSTEM           = S/370
```

```
------------TEST 6:  Output Variables-------------
Procedure name          = BINARY ec = 0
OUT.TERM                = <long double data definition>

OUT.BYTRVS              = default(FALSE)
OUT.COMPLEX             = default(FALSE)
OUT.FIT                 = default(TRUNCATE)
OUT.LENGTH              = 128
OUT.RADIX               = default(2)
```

Unclassified

```
-------------TEST 7:  Input Variables-------------
Procedure name       = BINARY

IN.TYPE              = BINARY
IN.BYTRVS            = FALSE
IN.COMPLEX           = FALSE
IN.CONSTRAINED       = FALSE
IN.FIT               = TRUNCATE
IN.LENGTH            = 8
IN.PRECISION         = 7
IN.RADIX             = 2
IN.SCALE             = 0
IN.SIGNED            = TRUE
STATUS.CONTAINING    = SEQUENCE
STATUS.MAX_PRECISION = 7
STATUS.SIGNIFICANT_I = 31
STATUS.SYSTEM        = S/370
```

```
------------TEST 7:  Output Variables-------------
Procedure name       = BINARY ec = 0
OUT.TERM             = <char data definition>

OUT.BYTRVS           = default(FALSE)
OUT.COMPLEX          = default(FALSE)
OUT.CONSTRAINED      = default(FALSE)
OUT.FIT              = default(TRUNCATE)
OUT.LENGTH           = 8
OUT.PRECISION        = 7
OUT.RADIX            = default(2)
OUT.SCALE            = default(0)
OUT.SIGNED           = default(TRUE)
```

```
-------------TEST 8:  Input Variables-------------
Procedure name       = BINARY

IN.TYPE              = BINARY
IN.BYTRVS            = FALSE
IN.COMPLEX           = FALSE
IN.CONSTRAINED       = FALSE
IN.FIT               = TRUNCATE
IN.LENGTH            = 16
IN.PRECISION         = 15
IN.RADIX             = 2
IN.SCALE             = 0
IN.SIGNED            = TRUE
STATUS.CONTAINING    = SEQUENCE
STATUS.MAX_PRECISION = 15
STATUS.SIGNIFICANT_I = 31
STATUS.SYSTEM        = S/370
```

```
------------TEST 8:  Output Variables-------------
Procedure name       = BINARY ec = 0
OUT.TERM             = <int data definition>

OUT.BYTRVS           = default(FALSE)
OUT.COMPLEX          = default(FALSE)
OUT.CONSTRAINED      = default(FALSE)
OUT.FIT              = default(TRUNCATE)
OUT.LENGTH           = 16
OUT.PRECISION        = 15
OUT.RADIX            = default(2)
OUT.SCALE            = default(0)
OUT.SIGNED           = default(TRUE)
```

```
-------------TEST 9:  Input Variables-------------
Procedure name       = BINARY

IN.TYPE              = BINARY
IN.BYTRVS            = FALSE
IN.COMPLEX           = FALSE
IN.CONSTRAINED       = FALSE
IN.FIT               = TRUNCATE
IN.LENGTH            = 32
IN.PRECISION         = 31
IN.RADIX             = 2
IN.SCALE             = 0
IN.SIGNED            = TRUE
STATUS.CONTAINING    = SEQUENCE
STATUS.MAX_PRECISION = 31
STATUS.SIGNIFICANT_I = 31
STATUS.SYSTEM        = S/370
```

```
------------TEST 9:  Output Variables-------------
Procedure name       = BINARY ec = 0
OUT.TERM             = <int data definition>

OUT.BYTRVS           = default(FALSE)
OUT.COMPLEX          = default(FALSE)
OUT.CONSTRAINED      = default(FALSE)
OUT.FIT              = default(TRUNCATE)
OUT.LENGTH           = default(32)
OUT.PRECISION        = default(31)
OUT.RADIX            = default(2)
OUT.SCALE            = default(0)
OUT.SIGNED           = default(TRUE)
```

Unclassified

```
------------TEST 10:  Input Variables-------------
Procedure name        = BINARY

IN.TYPE               = BINARY
IN.BYTRVS             = FALSE
IN.COMPLEX            = FALSE
IN.CONSTRAINED        = FALSE
IN.FIT                = TRUNCATE
IN.LENGTH             = 8
IN.PRECISION          = 8
IN.RADIX              = 2
IN.SCALE              = 0
IN.SIGNED             = FALSE
STATUS.CONTAINING     = SEQUENCE
STATUS.MAX_PRECISION  = 8
STATUS.SIGNIFICANT_I  = 31
STATUS.SYSTEM         = S/370
```

```
------------TEST 18:  Output Variables------------
Procedure name        = BINARY ec = 0
OUT.TERM              = <char data definition>

OUT.BYTRVS            = default(FALSE)
OUT.COMPLEX           = default(FALSE)
OUT.CONSTRAINED       = default(FALSE)
OUT.FIT               = default(TRUNCATE)
OUT.LENGTH            = 8
OUT.PRECISION         = 8
OUT.RADIX             = default(2)
OUT.SCALE             = default(0)
OUT.SIGNED            = FALSE
```

```
------------TEST 11:  Input Variables-------------
Procedure name        = BINARY

IN.TYPE               = BINARY
IN.BYTRVS             = FALSE
IN.COMPLEX            = FALSE
IN.CONSTRAINED        = FALSE
IN.FIT                = TRUNCATE
IN.LENGTH             = 16
IN.PRECISION          = 16
IN.RADIX              = 2
IN.SCALE              = 0
IN.SIGNED             = FALSE
STATUS.CONTAINING     = SEQUENCE
STATUS.MAX_PRECISION  = 16
STATUS.SIGNIFICANT_I  = 31
STATUS.SYSTEM         = S/370
```

```
------------TEST 11:  Output Variables------------
Procedure name        = BINARY ec = 0
OUT.TERM              = <int data definition>

OUT.BYTRVS            = default(FALSE)
OUT.COMPLEX           = default(FALSE)
OUT.CONSTRAINED       = default(FALSE)
OUT.FIT               = default(TRUNCATE)
OUT.LENGTH            = 16
OUT.PRECISION         = 16
OUT.RADIX             = default(2)
OUT.SCALE             = default(0)
OUT.SIGNED            = FALSE
```

```
------------TEST 12:  Input Variables-------------
Procedure name        = BINARY

IN.TYPE               = BINARY
IN.BYTRVS             = FALSE
IN.COMPLEX            = FALSE
IN.CONSTRAINED        = FALSE
IN.FIT                = TRUNCATE
IN.LENGTH             = 32
IN.PRECISION          = 32
IN.RADIX              = 2
IN.SCALE              = 0
IN.SIGNED             = FALSE
STATUS.CONTAINING     = SEQUENCE
STATUS.MAX_PRECISION  = 32
STATUS.SIGNIFICANT_I  = 31
STATUS.SYSTEM         = S/370
```

```
------------TEST 12:  Output Variables------------
Procedure name        = BINARY ec = 0
OUT.TERM              = <int data definition>

OUT.BYTRVS            = default(FALSE)
OUT.COMPLEX           = default(FALSE)
OUT.CONSTRAINED       = default(FALSE)
OUT.FIT               = default(TRUNCATE)
OUT.LENGTH            = default(32)
OUT.PRECISION         = 32
OUT.RADIX             = default(2)
OUT.SCALE             = default(0)
OUT.SIGNED            = FALSE
```

```
------------TEST 13:  Input Variables-------------
Procedure name         = BINARY

IN.TYPE                = BINARY
IN.BYTRVS              = FALSE
IN.COMPLEX             = FALSE
IN.CONSTRAINED         = FALSE
IN.FIT                 = TRUNCATE
IN.LENGTH              = 5
IN.PRECISION           = 5
IN.RADIX               = 2
IN.SCALE               = 0
IN.SIGNED              = FALSE
STATUS.CONTAINING      = ARRAY
STATUS.MAX_PRECISION   = 5
STATUS.SIGNIFICANT_I   = 31
STATUS.SYSTEM          = S/370
```

```
------------TEST 13:  Output Variables------------
Procedure name         = BINARY ec = 0
OUT.TERM               = <char data definition>

OUT.BYTRVS             = default(FALSE)
OUT.COMPLEX            = default(FALSE)
OUT.CONSTRAINED        = default(FALSE)
OUT.FIT                = default(TRUNCATE)
OUT.LENGTH             = 8
OUT.PRECISION          = 8
OUT.RADIX              = default(2)
OUT.SCALE              = default(0)
OUT.SIGNED             = FALSE
```

```
------------TEST 14:  Input Variables-------------
Procedure name         = BINARY

IN.TYPE                = BINARY
IN.BYTRVS              = FALSE
IN.COMPLEX             = FALSE
IN.CONSTRAINED         = FALSE
IN.FIT                 = TRUNCATE
IN.LENGTH              = 12
IN.PRECISION           = 12
IN.RADIX               = 2
IN.SCALE               = 0
IN.SIGNED              = FALSE
STATUS.CONTAINING      = ARRAY
STATUS.MAX_PRECISION   = 12
STATUS.SIGNIFICANT_I   = 31
STATUS.SYSTEM          = S/370
```

```
------------TEST 14:  Output Variables------------
Procedure name         = BINARY ec = 0
OUT.TERM               = <int data definition>

OUT.BYTRVS             = default(FALSE)
OUT.COMPLEX            = default(FALSE)
OUT.CONSTRAINED        = default(FALSE)
OUT.FIT                = default(TRUNCATE)
OUT.LENGTH             = 16
OUT.PRECISION          = 16
OUT.RADIX              = default(2)
OUT.SCALE              = default(0)
OUT.SIGNED             = FALSE
```

```
------------TEST 15:  Input Variables-------------
Procedure name         = BINARY

IN.TYPE                = BINARY
IN.BYTRVS              = FALSE
IN.COMPLEX             = FALSE
IN.CONSTRAINED         = FALSE
IN.FIT                 = TRUNCATE
IN.LENGTH              = 4
IN.PRECISION           = 3
IN.RADIX               = 2
IN.SCALE               = 0
IN.SIGNED              = TRUE
STATUS.CONTAINING      = ARRAY
STATUS.MAX_PRECISION   = 3
STATUS.SIGNIFICANT_I   = 31
STATUS.SYSTEM          = S/370
```

```
------------TEST 15:  Output Variables------------
Procedure name         = BINARY ec = 0
OUT.TERM               = <char data definition>

OUT.BYTRVS             = default(FALSE)
OUT.COMPLEX            = default(FALSE)
OUT.CONSTRAINED        = default(FALSE)
OUT.FIT                = default(TRUNCATE)
OUT.LENGTH             = 8
OUT.PRECISION          = 7
OUT.RADIX              = default(2)
OUT.SCALE              = default(0)
OUT.SIGNED             = default(TRUE)
```

Unclassified

```
------------TEST 16:  Input Variables-------------
Procedure name        = BINARY

IN.TYPE               = BINARY
IN.BYTRVS             = FALSE
IN.COMPLEX            = FALSE
IN.CONSTRAINED        = FALSE
IN.FIT                = TRUNCATE
IN.LENGTH             = 24
IN.PRECISION          = 23
IN.RADIX              = 2
IN.SCALE              = 0
IN.SIGNED             = TRUE
STATUS.CONTAINING     = ARRAY
STATUS.MAX_PRECISION  = 23
STATUS.SIGNIFICANT_I  = 31
STATUS.SYSTEM         = S/370
```

```
------------TEST 16:  Output Variables------------
Procedure name        = BINARY ec = 0
OUT.TERM              = <int data definition>

OUT.BYTRVS            = default(FALSE)
OUT.COMPLEX           = default(FALSE)
OUT.CONSTRAINED       = default(FALSE)
OUT.FIT               = default(TRUNCATE)
OUT.LENGTH            = 24
OUT.PRECISION         = 23
OUT.RADIX             = default(2)
OUT.SCALE             = default(0)
OUT.SIGNED            = default(TRUE)
```

```
------------TEST 17:  Input Variables-------------
Procedure name        = BINARY

IN.TYPE               = BINARY
IN.BYTRVS             = FALSE
IN.COMPLEX            = FALSE
IN.CONSTRAINED        = FALSE
IN.FIT                = TRUNCATE
IN.LENGTH             = 4
IN.PRECISION          = 3
IN.RADIX              = 2
IN.SCALE              = 0
IN.SIGNED             = TRUE
STATUS.CONTAINING     = SEQUENCE
STATUS.MAX_PRECISION  = 3
STATUS.SIGNIFICANT_I  = 31
STATUS.SYSTEM         = S/370
```

```
------------TEST 17:  Output Variables------------
Procedure name        = BINARY ec = 0
OUT.TERM              = <bit field>

OUT.BYTRVS            = default(FALSE)
OUT.COMPLEX           = default(FALSE)
OUT.CONSTRAINED       = default(FALSE)
OUT.FIT               = default(TRUNCATE)
OUT.LENGTH            = 4
OUT.PRECISION         = 3
OUT.RADIX             = default(2)
OUT.SCALE             = default(0)
OUT.SIGNED            = default(TRUE)
```

```
------------TEST 18:  Input Variables-------------
Procedure name        = BINARY

IN.TYPE               = BINARY
IN.BYTRVS             = FALSE
IN.COMPLEX            = FALSE
IN.CONSTRAINED        = FALSE
IN.FIT                = TRUNCATE
IN.LENGTH             = 23
IN.PRECISION          = 23
IN.RADIX              = 2
IN.SCALE              = 0
IN.SIGNED             = FALSE
STATUS.CONTAINING     = CASE
STATUS.MAX_PRECISION  = 23
STATUS.SIGNIFICANT_I  = 31
STATUS.SYSTEM         = S/370
```

```
------------TEST 18:  Output Variables------------
Procedure name        = BINARY ec = 0
OUT.TERM              = <bit field>

OUT.BYTRVS            = default(FALSE)
OUT.COMPLEX           = default(FALSE)
OUT.CONSTRAINED       = default(FALSE)
OUT.FIT               = default(TRUNCATE)
OUT.LENGTH            = 23
OUT.PRECISION         = 23
OUT.RADIX             = default(2)
OUT.SCALE             = default(0)
OUT.SIGNED            = FALSE
```

```
------------TEST 19:  Input Variables-------------
Procedure name        = BINARY

IN.TYPE               = BINARY
IN.BYTRVS             = FALSE
IN.COMPLEX            = FALSE
IN.CONSTRAINED        = FALSE
IN.FIT                = TRUNCATE
IN.LENGTH             = 8
IN.PRECISION          = 7
IN.RADIX              = 2
IN.SCALE              = 0
IN.SIGNED             = TRUE
STATUS.CONTAINING     = SEQUENCE
STATUS.MAX_PRECISION  = 7
STATUS.SIGNIFICANT_I  = 31
STATUS.SYSTEM         = S/370
```

```
------------TEST 19:  Output Variables------------
Procedure name        = BINARY ec = 0
OUT.TERM              = <char data definition>

OUT.BYTRVS            = default(FALSE)
OUT.COMPLEX           = default(FALSE)
OUT.CONSTRAINED       = default(FALSE)
OUT.FIT               = default(TRUNCATE)
OUT.LENGTH            = 8
OUT.PRECISION         = 7
OUT.RADIX             = default(2)
OUT.SCALE             = default(0)
OUT.SIGNED            = default(TRUE)
```

```
------------TEST 20:  Input Variables-------------
Procedure name        = BINARY

IN.TYPE               = BINARY
IN.BYTRVS             = FALSE
IN.COMPLEX            = FALSE
IN.CONSTRAINED        = FALSE
IN.FIT                = TRUNCATE
IN.LENGTH             = 16
IN.PRECISION          = 15
IN.RADIX              = 2
IN.SCALE              = 0
IN.SIGNED             = TRUE
STATUS.CONTAINING     = SEQUENCE
STATUS.MAX_PRECISION  = 15
STATUS.SIGNIFICANT_I  = 31
STATUS.SYSTEM         = S/370
```

```
------------TEST 20:  Output Variables------------
Procedure name        = BINARY ec = 0
OUT.TERM              = <int data definition>

OUT.BYTRVS            = default(FALSE)
OUT.COMPLEX           = default(FALSE)
OUT.CONSTRAINED       = default(FALSE)
OUT.FIT               = default(TRUNCATE)
OUT.LENGTH            = 16
OUT.PRECISION         = 15
OUT.RADIX             = default(2)
OUT.SCALE             = default(0)
OUT.SIGNED            = default(TRUE)
```

```
------------TEST 21:  Input Variables-------------
Procedure name        = BINARY

IN.TYPE               = BINARY
IN.BYTRVS             = FALSE
IN.COMPLEX            = FALSE
IN.CONSTRAINED        = FALSE
IN.FIT                = TRUNCATE
IN.LENGTH             = 32
IN.PRECISION          = 31
IN.RADIX              = 2
IN.SCALE              = 0
IN.SIGNED             = TRUE
STATUS.CONTAINING     = SEQUENCE
STATUS.MAX_PRECISION  = 31
STATUS.SIGNIFICANT_I  = 31
STATUS.SYSTEM         = S/370
```

```
------------TEST 21:  Output Variables------------
Procedure name        = BINARY ec = 0
OUT.TERM              = <int data definition>

OUT.BYTRVS            = default(FALSE)
OUT.COMPLEX           = default(FALSE)
OUT.CONSTRAINED       = default(FALSE)
OUT.FIT               = default(TRUNCATE)
OUT.LENGTH            = default(32)
OUT.PRECISION         = default(31)
OUT.RADIX             = default(2)
OUT.SCALE             = default(0)
OUT.SIGNED            = default(TRUE)
```

Unclassified

```
------------TEST 22:  Input Variables-------------
Procedure name        = BINARY

IN.TYPE               = BINARY
IN.BYTRVS             = FALSE
IN.COMPLEX            = FALSE
IN.CONSTRAINED        = FALSE
IN.FIT                = TRUNCATE
IN.LENGTH             = 8
IN.PRECISION          = 8
IN.RADIX              = 2
IN.SCALE              = 0
IN.SIGNED             = FALSE
STATUS.CONTAINING     = SEQUENCE
STATUS.MAX_PRECISION  = 8
STATUS.SIGNIFICANT_I  = 31
STATUS.SYSTEM         = S/370
```

```
------------TEST 22:  Output Variables------------
Procedure name        = BINARY ec = 0
OUT.TERM              = <char data definition>

OUT.BYTRVS            = default(FALSE)
OUT.COMPLEX           = default(FALSE)
OUT.CONSTRAINED       = default(FALSE)
OUT.FIT               = default(TRUNCATE)
OUT.LENGTH            = 8
OUT.PRECISION         = 8
OUT.RADIX             = default(2)
OUT.SCALE             = default(0)
OUT.SIGNED            = FALSE
```

```
------------TEST 23:  Input Variables-------------
Procedure name        = BINARY

IN.TYPE               = BINARY
IN.BYTRVS             = FALSE
IN.COMPLEX            = FALSE
IN.CONSTRAINED        = FALSE
IN.FIT                = TRUNCATE
IN.LENGTH             = 16
IN.PRECISION          = 16
IN.RADIX              = 2
IN.SCALE              = 0
IN.SIGNED             = TRUE
STATUS.CONTAINING     = SEQUENCE
STATUS.MAX_PRECISION  = 15
STATUS.SIGNIFICANT_I  = 31
STATUS.SYSTEM         = S/370
```

```
------------TEST 23:  Output Variables------------
Procedure name        = BINARY ec = 0
OUT.TERM              = <int data definition>

OUT.BYTRVS            = default(FALSE)
OUT.COMPLEX           = default(FALSE)
OUT.CONSTRAINED       = default(FALSE)
OUT.FIT               = default(TRUNCATE)
OUT.LENGTH            = 16
OUT.PRECISION         = 15
OUT.RADIX             = default(2)
OUT.SCALE             = default(0)
OUT.SIGNED            = default(TRUE)
```

```
------------TEST 24:  Input Variables-------------
Procedure name        = BINARY

IN.TYPE               = BINARY
IN.BYTRVS             = FALSE
IN.COMPLEX            = FALSE
IN.CONSTRAINED        = FALSE
IN.FIT                = TRUNCATE
IN.LENGTH             = 32
IN.PRECISION          = 32
IN.RADIX              = 2
IN.SCALE              = 0
IN.SIGNED             = TRUE
STATUS.CONTAINING     = SEQUENCE
STATUS.MAX_PRECISION  = 31
STATUS.SIGNIFICANT_I  = 31
STATUS.SYSTEM         = S/370
```

```
------------TEST 24:  Output Variables------------
Procedure name        = BINARY ec = 0
OUT.TERM              = <int data definition>

OUT.BYTRVS            = default(FALSE)
OUT.COMPLEX           = default(FALSE)
OUT.CONSTRAINED       = default(FALSE)
OUT.FIT               = default(TRUNCATE)
OUT.LENGTH            = default(32)
OUT.PRECISION         = default(31)
OUT.RADIX             = default(2)
OUT.SCALE             = default(0)
OUT.SIGNED            = default(TRUE)
```

Unclassified

```
------------TEST 25:  Input Variables-------------
Procedure name        = BINARY

IN.TYPE               = BINARY
IN.BYTRVS             = FALSE
IN.COMPLEX            = FALSE
IN.CONSTRAINED        = FALSE
IN.FIT                = TRUNCATE
IN.LENGTH             = 5
IN.PRECISION          = 4
IN.RADIX              = 2
IN.SCALE              = 0
IN.SIGNED             = TRUE
STATUS.CONTAINING     = SEQUENCE
STATUS.MAX_PRECISION  = 4
STATUS.SIGNIFICANT_I  = 31
STATUS.SYSTEM         = S/370
```

```
------------TEST 25:  Output Variables------------
Procedure name        = BINARY ec = 0
OUT.TERM              = <bit field>

OUT.BYTRVS            = default(FALSE)
OUT.COMPLEX           = default(FALSE)
OUT.CONSTRAINED       = default(FALSE)
OUT.FIT               = default(TRUNCATE)
OUT.LENGTH            = 5
OUT.PRECISION         = 4
OUT.RADIX             = default(2)
OUT.SCALE             = default(0)
OUT.SIGNED            = default(TRUE)
```

```
------------TEST 26:  Input Variables-------------
Procedure name        = BINARY

IN.TYPE               = BINARY
IN.BYTRVS             = FALSE
IN.COMPLEX            = FALSE
IN.CONSTRAINED        = FALSE
IN.FIT                = TRUNCATE
IN.LENGTH             = 3
IN.PRECISION          = 3
IN.RADIX              = 2
IN.SCALE              = 0
IN.SIGNED             = FALSE
STATUS.CONTAINING     = SEQUENCE
STATUS.MAX_PRECISION  = 3
STATUS.SIGNIFICANT_I  = 31
STATUS.SYSTEM         = S/370
```

```
------------TEST 26:  Output Variables------------
Procedure name        = BINARY ec = 0
OUT.TERM              = <bit field>

OUT.BYTRVS            = default(FALSE)
OUT.COMPLEX           = default(FALSE)
OUT.CONSTRAINED       = default(FALSE)
OUT.FIT               = default(TRUNCATE)
OUT.LENGTH            = 3
OUT.PRECISION         = 3
OUT.RADIX             = default(2)
OUT.SCALE             = default(0)
OUT.SIGNED            = FALSE
```

```
------------TEST 27:  Input Variables-------------
Procedure name        = BINARY

IN.TYPE               = BINARY
IN.BYTRVS             = FALSE
IN.COMPLEX            = FALSE
IN.CONSTRAINED        = FALSE
IN.FIT                = TRUNCATE
IN.LENGTH             = 23
IN.PRECISION          = 23
IN.RADIX              = 2
IN.SCALE              = 0
IN.SIGNED             = FALSE
STATUS.CONTAINING     = SEQUENCE
STATUS.MAX_PRECISION  = 23
STATUS.SIGNIFICANT_I  = 31
STATUS.SYSTEM         = S/370
```

```
------------TEST 27:  Output Variables------------
Procedure name        = BINARY ec = 0
OUT.TERM              = <bit field>

OUT.BYTRVS            = default(FALSE)
OUT.COMPLEX           = default(FALSE)
OUT.CONSTRAINED       = default(FALSE)
OUT.FIT               = default(TRUNCATE)
OUT.LENGTH            = 23
OUT.PRECISION         = 23
OUT.RADIX             = default(2)
OUT.SCALE             = default(0)
OUT.SIGNED            = FALSE
```

Unclassified

B.4 Test Generate BOOLEAN for S/370 on 08/27/91 at 15:57:51

```
-------------TEST 1:  Input Variables-------------
Procedure name        = BOOLEAN

IN.TYPE               = BOOLEAN
IN.BLNENC             = LSTBIT
IN.BYTRVS             = FALSE
IN.LENGTH             = 8
STATUS.CONTAINING     = DECLARE
STATUS.SIGNIFICANT_I  = 31
STATUS.SYSTEM         = S/370
```

```
------------TEST 1:  Output Variables-------------
Procedure name        = BOOLEAN ec = 0

OUT.TERM              = <boolean_t data definition>
OUT.ATTRIBUTE         =
OUT.STORAGE_CLASS     = extern
OUT.TYPE_SPECIFIER    = boolean_t
```

Unclassified

B.5 Test Generate CHAR for S/370 on 08/26/91 at 17:36:41

```
-------------TEST 1:  Input Variables-------------
Procedure name        = CHAR

IN.TYPE               = CHAR
IN.CCSID              = 850
IN.JUSTIFY            =
IN.LENGTH             = ADL<qualified identifier>
IN.MAXALC             = FALSE
IN.MAXLEN             = 255
IN.UNITLEN            = 8
STATUS.SIGNIFICANT_I  = 31
STATUS.SYSTEM         = S/370
```

```
------------TEST 1:  OUTPUT VARIABLES-------------
Procedure name        = CHAR ec = 8

OUT.TERM              = <string data definition>
OUT.extern            =
OUT.ARRAY_ANNOTATION  =
OUT.ATTRIBUTE         =
OUT.SIGN_ADJECTIVE    =
OUT.STRING_ANNOTATIO  = LENGTH(ADL<qualified identifier>) MAXALC(FALSE) CCSID(850)
OUT.STRING_SIZE       = 255
OUT.SUBSCRIPT_DECLAR  =
OUT.TYPE_SPECIFIER    = char
```

```
-------------TEST 2:  Input Variables-------------
Procedure name        = CHAR

IN.TYPE               = CHAR
IN.CCSID              = 4396
IN.JUSTIFY            = RIGHT
IN.LENGTH             = 8192
IN.MAXALC             =
IN.MAXLEN             =
IN.UNITLEN            = 16
STATUS.SIGNIFICANT_I  = 31
STATUS.SYSTEM         = S/370
```

```
------------TEST 2:  Output Variables-------------
Procedure name        = CHAR ec = 0

OUT.TERM              = <wide string data definition>
OUT.extern            =
OUT.ARRAY_ANNOTATION  =
OUT.ATTRIBUTE         =
OUT.SIGN_ADJECTIVE    =
OUT.STRING_SIZE       = 8192
OUT.SUBSCRIPT_DECLAR  =
OUT.TYPE_SPECIFIER    = wchar_t
OUT.WIDE_STRING_ANNO  =   CCSID(4396) JUSTIFY(RIGHT)
```

```
-------------TEST 3:  Input Variables-------------
Procedure name        = CHAR

IN.TYPE               = CHAR
IN.CCSID              = 4396
IN.JUSTIFY            = RIGHT
IN.LENGTH             = 8192
IN.MAXALC             =
IN.MAXLEN             =
IN.UNITLEN            = 1
STATUS.SIGNIFICANT_I  = 31
STATUS.SYSTEM         = S/370
```

```
------------TEST 3:  Output Variables-------------
Procedure name        = CHAR ec = 3

OUT.extern            =
OUT.ARRAY_ANNOTATION  =
OUT.ATTRIBUTE         =
OUT.SIGN_ADJECTIVE    =
OUT.STRING_SIZE       = 8192
OUT.SUBSCRIPT_DECLAR  =
```

Invalid UNITLEN for CHAR. Must be 8 or 16.

Unclassified

B.6 Test Generate CHARSFX for S/370 on 08/26/91 at 17:24:05

| Input | Output |
|---|---|
| -------------TEST 1: Input Variables-------------<br>Procedure name = CHARSFX<br><br>IN.TYPE = CHARSFX<br>IN.CCSID = 437<br>IN.MAXALC = TRUE<br>IN.MAXLEN = 133<br>IN.SFXENC = X00<br>IN.UNITLEN = 8<br>STATUS.SIGNIFICANT_I = 31<br>STATUS.SYSTEM = S/370 | -------------TEST 1: Output Variables-------------<br>Procedure name = CHARSFX ec = 0<br><br>OUT.TERM = <string data definition><br>OUT.extern =<br>OUT.ARRAY_ANNOTATION =<br>OUT.ATTRIBUTE =<br>OUT.SIGN_ADJECTIVE =<br>OUT.STRING_ANNOTATIO = CHARSFX CCSID(437)<br>OUT.STRING_SIZE = 133<br>OUT.SUBSCRIPT_DECLAR =<br>OUT.TYPE_SPECIFIER = char |
| -------------TEST 2: Input Variables-------------<br>Procedure name = CHARSFX<br><br>IN.TYPE = CHARSFX<br>IN.CCSID = 0<br>IN.MAXALC = FALSE<br>IN.MAXLEN = 80<br>IN.SFXENC = X00<br>IN.UNITLEN = 16<br>STATUS.SIGNIFICANT_I = 31<br>STATUS.SYSTEM = S/370 | -----------TEST 2: Output Variables-------------<br>Procedure name = CHARSFX ec = 0<br><br>OUT.TERM = <wide string data definition><br>OUT.extern =<br>OUT.ARRAY_ANNOTATION =<br>OUT.ATTRIBUTE =<br>OUT.SIGN_ADJECTIVE =<br>OUT.STRING_SIZE = 80<br>OUT.SUBSCRIPT_DECLAR =<br>OUT.TYPE_SPECIFIER = wchar_t<br>OUT.WIDE_STRING_ANNO = CHARSFX MAXALC(FALSE) |
| -------------TEST 3: Input Variables-------------<br>Procedure name = CHARSFX<br><br>IN.TYPE = CHARSFX<br>IN.CCSID = 0<br>IN.MAXALC = FALSE<br>IN.MAXLEN = 80<br>IN.SFXENC = X00<br>IN.UNITLEN = 1<br>STATUS.SIGNIFICANT_I = 31<br>STATUS.SYSTEM = S/370 | -----------TEST 3: Output Variables-------------<br>Procedure name = CHARSFX ec = 3<br><br>OUT.extern =<br>OUT.ARRAY_ANNOTATION =<br>OUT.ATTRIBUTE =<br>OUT.SIGN_ADJECTIVE =<br>OUT.STRING_SIZE = 80<br>OUT.SUBSCRIPT_DECLAR =<br><br>Invalid UNITLEN. Must be 8 or 16 for char or wchar_t |

Unclassified

B.7 Test Generate DMNATTR for S/370 on 08/27/91 at 16:40:38

| | |
|---|---|
| -------------TEST 1: Input Variables-------------<br>Procedure name = DMNATTR<br><br>IN.TYPE = DMNATTR<br>IN.DMNSIZE = ADL<qualified identifier><br>STATUS.SIGNIFICANT_I = 31<br>STATUS.SYSTEM = S/370 | ------------TEST 1: Output Variables-------------<br>Procedure name = DMNATTR ec = 0<br><br>OUT.DIMENSION_ANNOTA = DMNSIZE(ADL<qualified identifier>) |
| -------------TEST 2: Input Variables-------------<br>Procedure name = DMNATTR<br><br>IN.TYPE = DMNATTR<br>IN.DMNSIZE = 1000<br>STATUS.SIGNIFICANT_I = 31<br>STATUS.SYSTEM = S/370 | ------------TEST 2: Output Variables-------------<br>Procedure name = DMNATTR ec = 0<br><br>OUT.DIMENSION_SIZE = 1000 |

Unclassified

B.8 Test Generate ENUMERAT for S/370 on 08/27/91 at 17:09:04

```
------------TEST 1:  Input Variables------------
Procedure name       = ENUMERAT

IN.TYPE              = ENUMERAT
STATUS.SIGNIFICANT_I = 31
STATUS.SYSTEM        = S/370
```

```
------------TEST 1:  Output Variables------------
Procedure name       = ENUMERAT ec = 0

OUT.TERM             = <enumeration data definition>
OUT.ATTRIBUTE        =
OUT.ENUM_TAG         =
OUT.STORAGE_CLASS    = extern
OUT.TYPE_SPECIFIER   = enum
```

Unclassified

B.9 Test Generate FLOAT16 for S/370 on 08/27/91 at 15:49:23

| Input Variables | Output Variables |
|---|---|
| -------------TEST 1: Input Variables-------------<br>Procedure name = FLOAT16<br><br>IN.TYPE = FLOAT16<br>IN.BYTRVS = FALSE<br>IN.COMPLEX = FALSE<br>IN.FIT = TRUNCATE<br>IN.LENGTH = 32<br>IN.RADIX = 2<br>STATUS.CONTAINING = SEQUENCE<br>STATUS.SIGNIFICANT_I = 31<br>STATUS.SYSTEM = S/370 | ------------TEST 1: Output Variables-------------<br>Procedure name = FLOAT16 ec = 0<br><br>OUT.TERM = <float data definition><br>OUT.ATTRIBUTE =<br>OUT.STORAGE_CLASS =<br>OUT.TYPE_SPECIFIER = float |
| -------------TEST 2: Input Variables-------------<br>Procedure name = FLOAT16<br><br>IN.TYPE = FLOAT16<br>IN.BYTRVS = FALSE<br>IN.COMPLEX = TRUE<br>IN.FIT = TRUNCATE<br>IN.LENGTH = 64<br>IN.RADIX = 2<br>STATUS.CONTAINING = ARRAY<br>STATUS.SIGNIFICANT_I = 31<br>STATUS.SYSTEM = S/370 | ------------TEST 2: Output Variables-------------<br>Procedure name = FLOAT16 ec = 3<br><br>OUT.TERM = <double data definition><br>OUT.ATTRIBUTE =<br>OUT.STORAGE_CLASS = extern<br>OUT.TYPE_SPECIFIER = double<br><br>COMPLEX is invalid for floating point in the C domain |
| -------------TEST 3: Input Variables-------------<br>Procedure name = FLOAT16<br><br>IN.TYPE = FLOAT16<br>IN.BYTRVS = FALSE<br>IN.COMPLEX = FALSE<br>IN.FIT = TRUNCATE<br>IN.LENGTH = 128<br>IN.RADIX = 2<br>STATUS.CONTAINING = DECLARE<br>STATUS.SIGNIFICANT_I = 31<br>STATUS.SYSTEM = S/370 | ------------TEST 3: Output Variables-------------<br>Procedure name = FLOAT16 ec = 0<br><br>OUT.TERM = <long double data definition><br>OUT.ATTRIBUTE =<br>OUT.STORAGE_CLASS = extern<br>OUT.TYPE_SPECIFIER = long double |

Unclassified

| -------------TEST 4: Input Variables------------- | | ------------TEST 4: Output Variables------------ | |
|---|---|---|---|
| Procedure name | = FLOAT16 | Procedure name | = FLOAT16 ec = 3 |
| IN.TYPE | = FLOAT16 | OUT.ATTRIBUTE | = |
| IN.BYTRVS | = FALSE | OUT.STORAGE_CLASS | = |
| IN.COMPLEX | = TRUE | | |
| IN.FIT | = TRUNCATE | LENGTH was invalid. Must be 32, 64, or 128 | |
| IN.LENGTH | = 80 | | |
| IN.RADIX | = 2 | COMPLEX is invalid for floating point in the C domain | |
| STATUS.CONTAINING | = CASE | | |
| STATUS.SIGNIFICANT_I | = 31 | | |
| STATUS.SYSTEM | = S/370 | | |

Unclassified

B.10 Test Generate FLOAT2 for OS/2 on 08/27/91 at 15:49:39

```
-------------TEST 1:  Input Variables-------------
Procedure name       = FLOAT2

IN.TYPE              = FLOAT2
IN.BYTRVS            = TRUE
IN.COMPLEX           = FALSE
IN.FIT               = TRUNCATE
IN.LENGTH            = 32
IN.RADIX             = 2
STATUS.CONTAINING    = SEQUENCE
STATUS.SIGNIFICANT_I = 31
STATUS.SYSTEM        = OS/2
```

```
------------TEST 1:  Output Variables-------------
Procedure name       = FLOAT2 ec = 0

OUT.TERM             = <float data definition>
OUT.ATTRIBUTE        =
OUT.STORAGE_CLASS    =
OUT.TYPE_SPECIFIER   = float
```

```
-------------TEST 2:  Input Variables-------------
Procedure name       = FLOAT2

IN.TYPE              = FLOAT2
IN.BYTRVS            = TRUE
IN.COMPLEX           = TRUE
IN.FIT               = TRUNCATE
IN.LENGTH            = 64
IN.RADIX             = 2
STATUS.CONTAINING    = ARRAY
STATUS.SIGNIFICANT_I = 31
STATUS.SYSTEM        = OS/2
```

```
------------TEST 2:  Output Variables-------------
Procedure name       = FLOAT2 ec = 3

OUT.TERM             = <double data definition>
OUT.ATTRIBUTE        =
OUT.STORAGE_CLASS    = extern
OUT.TYPE_SPECIFIER   = double
```

COMPLEX is invalid for floating point in the C domain

```
-------------TEST 3:  Input Variables-------------
Procedure name       = FLOAT2

IN.TYPE              = FLOAT2
IN.BYTRVS            = TRUE
IN.COMPLEX           = FALSE
IN.FIT               = TRUNCATE
IN.LENGTH            = 128
IN.RADIX             = 2
STATUS.CONTAINING    = DECLARE
STATUS.SIGNIFICANT_I = 31
STATUS.SYSTEM        = OS/2
```

```
------------TEST 3:  Output Variables-------------
Procedure name       = FLOAT2 ec = 0

OUT.TERM             = <long double data definition>
OUT.ATTRIBUTE        =
OUT.STORAGE_CLASS    = extern
OUT.TYPE_SPECIFIER   = long double
```

Unclassified

| ------------TEST 4: Input Variables------------ | | ------------TEST 4: Output Variables------------ | |
|---|---|---|---|
| Procedure name | = FLOAT2 | Procedure name | = FLOAT2 ec = 3 |
| IN.TYPE | = FLOAT2 | OUT.ATTRIBUTE | = |
| IN.BYTRVS | = TRUE | OUT.STORAGE_CLASS | = |
| IN.COMPLEX | = TRUE | | |
| IN.FIT | = TRUNCATE | LENGTH was invalid. Must be 32, 64, or 128 | |
| IN.LENGTH | = 88 | | |
| IN.RADIX | = 2 | COMPLEX is invalid for floating point in the C domain | |
| STATUS.CONTAINING | = CASE | | |
| STATUS.SIGNIFICANT_I | = 31 | | |
| STATUS.SYSTEM | = OS/2 | | |

Appendix C. C Declaration Translator Glossary data definition. A data definition describes a data object and reserves storage. A data definition can also provide an initial value. Definitions appear outside a function or at the beginning of a block statement.

data declaration. A description that makes an external object or function available to a function or a block.

declaration. Same as data declaration.

definition. Same as data definition.

Appendix D. Common Declaration Translator BNF Summary

```
<ADL annotation> ::=
   <opening language comment symbol>
      ADL
         [<PL specific annotation>]
         [<ADL DECLARE annotation>]
       | [<PL OPTIONS annotation>]
   [<closing language comment symbol>]

 <ADL ARRAY annotation> ::=
   [ARRAY]
   [<ADL DMNLST attribute annotation>]
   [ADL<ARRAY defaulted attributes list>]
   [ADL<ARRAY optional attributes list>]
   [OF]
   [<ADL data annotation>]

 <ADL CASE annotation> ::=
   [CASE]
   [ADL<CASE attributes list>]
   [ADL<BEGIN statement>]
   [<ADL WHEN annotation>]...
   [<ADL OTHERWISE annotation>]
   [ADL<END statement>]

 <ADL data annotation> ::=
   {
     [<qualified identifier annotation>:] [<ADL field annotation>]
     ADL<terminator>
   }
 | {
     [<qualified identifier annotation>:] [<ADL ARRAY annotation>]
     ADL<terminator>
   }
 | {[<qualified identifier annotation>:] [<ADL CASE annotation>]}
 | {[<LIST annotation>]}
 | {[<qualified identifier annotation>:] [<ADL SEQUENCE annotation>]}
 | {
     [<qualified identifier annotation>:]
     [<ADL subtype instance annotation>]
     ADL<terminator>
   }
```

Unclassified

```
<ADL DECLARE annotation> ::=
  [<unqualified identifier annotation>:]
  [DECLARE]
  [ADL<DECLARE attributes list>]
  [ADL<BEGIN statement>]
    {
       [ADL<constant statement>]
     | [<SUBTYPE annotation>]
     | [<ADL data annotation>]
    }...
  [ADL<END statement>]

<ADL dimension> ::=
  {
    [ADL<DMNLOW attribute>]
    {
       [ADL<DMNHIGH attribute>]
     | [ADL<DMNSIZE attribute>]
    }
    [ADL<DMNMAX attribute>]
  }!

<ADL DMNLST attribute annotation> ::=
  DMNLST( [<ADL dimension>] [, [<ADL dimension>]]... )

<ADL field annotation> ::=
  {[ASIS] [ADL<ASIS attributes list>]}
| {[BINARY] [ADL<BINARY attributes list>]}
| {[BIT] [ADL<BIT attributes list>]}
| {[BITPRE] [ADL<BITPRE attributes list>]}
| {[BOOLEAN] [ADL<BOOLEAN attributes list>]}
| {[CHAR] [ADL<CHAR attributes list>]}
| {[CHARPRE] [ADL<CHARPRE attributes list>]}
| {[CHARSFX] [ADL<CHARSFX attributes list>]}
| {[ENUMERATION] [ADL<ENUMERATION attributes list>]}
| {[FLOAT16] [ADL<FLOAT16 attributes list>]}
| {[FLOAT2] [ADL<FLOAT2 attributes list>]}
| {[PACKED] [ADL<PACKED attributes list>]}
| {[ZONED] [ADL<ZONED attributes list>]}
| {SKIP[({ADL<positive integer> | ADL<constant identifier>})]}

<ADL OTHERWISE annotation> ::=
  [<unqualified identifier annotation>:]
  [OTHERWISE]
  {
     [ADL<REJECT statement>]
   | [ADL<SKIP statement>]
   | {
       [<unqualified identifier annotation>:]
       [<ADL data annotation>]
       ADL<terminator>
     }
  }
```

Unclassified

```
<ADL SEQUENCE annotation> ::=
  [SEQUENCE]
  [ADL<SEQUENCE attributes list>]
  [ADL<BEGIN statement>]
  {
    [<unqualified identifier annotation>:]
    [<ADL data annotation>]
    ADL<terminator>
  }...
  [ADL<END statement>]

<ADL subtype instance annotation> ::=
  [ADL<subtype identifier>]
  [ADL<subtype instance attributes list>]

<ADL WHEN annotation> ::=
  [<unqualified identifier annotation>:]
  [WHEN]
  [ADL<condition>]
  [THEN]
  {
     [ADL<REJECT statement>]
   | [ADL<SKIP statement>]
   | {
       [<unqualified identifier annotation>:]
       [<ADL data annotation>]
       ADL<terminator>
     }
  }

<BNF escape> ::= ►

<BNF OR symbol> ::= |

<BNF symbols> ::=
     [ | ] | { | } | ! | ... | ::= | < | > | <BNF OR symbol>

  <closing language comment symbol> ::= See syntax rule 1

  <ending position> ::=
       ADL<positive integer>
     | ADL<constant identifier>
     | ADL<qualified identifier>

  <final value> ::=
   {
       ADL<signed integer>
     | ADL<constant identifier>
     | ADL<qualified identifier>
   }
   [ - 1 ]

 <identifier annotation> ::=
     <unqualified identifier annotation>
   | <qualified identifier annotation>
```

```
<implied ARRAY> ::=
      IARRAY
      [ADL<ARRAY optional attributes list>]
      <implied DMNLST> OF
      {
          ADL<qualified identifier> ADL<subscript list>
        | <implied CASE>
        | <implied SEQUENCE>
      }

<implied CASE> ::=
      ICASE
      [ADL<CASE optional attributes list>]
       (
         <implied WHEN list>
         [,<implied OTHERWISE>]
       )

   <implied CASE element>
          ADL<qualified identifier>
        | SKIP(ADL<positive integer>)
        | REJECT
        | { [<unqualified identifier annotation>:] <LIST element> }

   <implied dimension> ::=
      <initial value>
      TO <final value>
      [BY <increment value>]

   <implied DMNLST> ::=
      (
        <implied dimension>
        [,<implied dimension>]...
      )

   <implied OTHERWISE> ::=
      OTHERWISE <implied CASE element>

<implied SEQUENCE> ::=
      ISEQ
      [ADL<SEQUENCE optional attributes list>]
      (
        <implied SEQUENCE element>
        [, <implied SEQUENCE element>]...
      )

   <implied SEQUENCE element> ::=
          ADL<qualified identifier>
        | SKIP(ADL<positive integer>)
        | {[<unqualified identifier annotation>:] <LIST element>}
```

Unclassified

```
<implied SUBSTR> ::=
      ISUBSTR [ADL<CHAR optional attributes list>]
      (
        ADL<qualified identifier>,
        [<starting position>]..
        [<ending position>]
      )

   <implied WHEN> ::=
      [<unqualified identifier annotation>:]
       (
         ADL<condition> THEN
         <implied CASE element>
       )

   <implied WHEN list> ::=
      <implied WHEN>
      [, <implied WHEN>]...

   <increment value> ::=
      ADL<signed integer>
    | ADL<constant identifier>

   <initial value> ::=
      ADL<signed integer>
    | ADL<constant identifier>
    | ADL<qualified identifier>

 <LIST annotation> ::=
   [<LIST statement>]

   <LIST element> ::=
      {
         <implied ARRAY>
       | <implied CASE>
       | <implied SEQUENCE>
       | <implied SUBSTR>
      }

<LIST statement> ::=
      [<unqualified identifier annotation> :]
      <LIST element>
      ADL<terminator>

   <opening language comment symbol> ::= See syntax rule 1

 <option> ::=
   ADL<character>...

   <PL array size> ::= ADL<signed integer>

   <PL high bound> ::= ADL<signed integer>

 <PL identifier> ::= See syntax note 3
```

Unclassified

```
<PL identifier annotation> ::= ADL<qualified identifier>

  <PL low bound> ::= ADL<signed integer>

<PL OPTIONS annotation> ::=
  OPTIONS (<option> [, <option>]...) ADL<terminator>

<PL qualified identifier> ::=
   <PL identifier>[{<PL qualified operator><PL identifier>}...]

<PL qualified operator> ::= See syntax note 1

<PL specific annotation> ::=
  ADL<character>...

<qualified identifier annotation> ::=
    ADL<qualified identifier> :

  <starting position> ::=
       ADL<positive integer>
      | ADL<constant identifier>
      | ADL<qualified identifier>

<SUBTYPE annotation> ::=
  [ADL<subtype identifier>: ]
  [SUBTYPE]
  [OF]
  [<ADL data annotation>]
  ADL<terminator>

<unqualified identifier annotation> ::=
    ADL<identifier> :
  | ADL<positional identifier> :
```

Unclassified

Appendix E. Reference to Related Publications

- *A Data Language*
- *Character Data Representation Architecture, Executive Overview*, GC09-1392-00.
- *Character Data Representation Architecture - Level 1, Reference*, SC09-1390-00.
- *Character Data Representation Architecture, - Level 1, Registry*, SC09-1391-00.
- *System Product Interpreter User's Guide*, VM/XA SP Release 1 and Release 2, SC23-0375.
- *System Product Interpreter Reference*, VM/XA SP Release 1 and Release 2, SC23-0374.
- *IBM System/370 Extended Architecture Principles of Operation*, SA22-7085
- *Common Programming Interface C Reference - Level 2*, SC09-1308-1.
- *IBM C/370 User's Guide, Version 1, Release 2*, SC09-1264-03.
- *IBM C/370 Programming Guide, Version 2, Release 1*, SC09-1384-00.
- *IBM C Set/2 User's Guide, Release 1.0*, SC09-1310-00.
- *Portability Guide for IBM C*, SC09-1405-00.

Unclassified

Index

A

<ADL annotation>
BNF Definition 40
Other References 15, 18, 24, 39, 43, 44, 54, 320
<ADL ARRAY annotation>
BNF Definition 41
BNF Definition References
<ADL data annotation> 41
Other References 44
<ADL CASE annotation>
BNF Definition 42
BNF Definition References
<ADL data annotation> 41
Other References 50
<ADL data annotation>
BNF Definition 41
BNF Definition References
<ADL ARRAY annotation> 41
<ADL DECLARE annotation> 40
<ADL OTHERWISE annotation> 42
<ADL SEQUENCE annotation> 43
<ADL WHEN annotation> 42
<SUBTYPE annotation> 41
Other References 44
<ADL DECLARE annotation>
BNF Definition 40
BNF Definition References
<ADL annotation> 40
<ADL dimension>
BNF Definition 42
BNF Definition References
<ADL DMNLST attribute annotation> 42
<ADL DMNLST attribute annotation>
BNF Definition 42
BNF Definition References
<ADL ARRAY annotation> 41
<ADL field annotation>
BNF Definition 41
BNF Definition References
<ADL data annotation> 41
<ADL OTHERWISE annotation>
BNF Definition 42
BNF Definition References
<ADL CASE annotation> 42
<ADL SEQUENCE annotation>
BNF Definition 43
BNF Definition References
<ADL data annotation> 41
<ADL subtype instance annotation>
BNF Definition 41
<ADL subtype instance annotation> *(continued)*
BNF Definition References
<ADL data annotation> 41
<ADL WHEN annotation>
BNF Definition 42
BNF Definition References
<ADL CASE annotation> 42
<annotation>
BNF Definition 89
Other References 89, 90
<array annotation>
BNF Definition 111
BNF Definition References
<array declarator> 111
<boolean_t declarator> 120
<double declarator> 127
<enumeration data declaration> 131
<enumeration data definition> 136
<enumeration typedef data declaration> 141
<float declarator> 145
<int declarator> 148
<long double declarator> 152
<pointer declarator> 155
<string declarator> 158
<struct declarator> 171
<type specifier annotation> 90
<typedef declarator> 179
<typedef instance declarator> 182
<union declarator> 190
<wide string declarator> 203
Generate DMNATTR Procedure 339
Other References 109, 112, 122, 128, 146, 153, 160, 161, 172, 179, 182, 204
Parse 161, 162, 183, 205, 206
<array data definition>
ADL Mapping 113
BNF Definition 111
BNF Definition References
<data definition> 88
Other References 111, 112, 319
<array declarator>
BNF Definition 111
BNF Definition References
<array data definition> 111
<declarator> 89
ADL <ARRAY defaulted attributes list>
BNF Definition References
<ADL ARRAY annotation> 41
Other References 22
ADL <ARRAY optional attributes list>
BNF Definition References
<ADL ARRAY annotation> 41

Unclassified

ADL <ARRAY optional attributes list> *(continued)*
BNF Definition References *(continued)*
<implied ARRAY> 56
ADL <ARRAY>
Other References 22, 25, 33, 57, 58, 182, 317, 319
Parse 183
Translate DMNATTR Procedure 294
ADL <ASIS attributes list>
BNF Definition References
<ADL field annotation> 41
<ASIS fixed length string annotation>
BNF Definition 159
BNF Definition References
<string annotation> 159
<wide string annotation> 203
Other References 160, 204
<ASIS varying length string annotation>
BNF Definition 159
BNF Definition References
<string annotation> 159
<wide string annotation> 203
Other References 160, 204
ADL <ASIS>
Generate ASIS Procedure 323
Other References 23, 158, 203, 272, 323
Translate ASIS Procedure 272
ASIS
BNF Definition References
<ADL field annotation> 41
<array annotation> 111
<ASIS fixed length string annotation> 159
<ASIS varying length string annotation> 159
<bit-field annotation> 116
<boolean_t annotation> 120
<char annotation> 123
<double annotation> 127
<enumeration annotation> 136
<float annotation> 145
<int annotation> 148
<long double annotation> 152
<struct annotation> 171
<union annotation> 191
<wchar_t annotation> 200
Generate ASIS Procedure 323, 324, 325
Other References 4, 23, 109, 122, 128, 146, 153, 160, 164, 165, 167, 204, 207, 208, 210, 272
Parse 113, 117, 121, 124, 128, 133, 138, 143, 146, 149, 150, 153, 156, 161, 163, 183, 184, 192, 201, 205, 206, 207
Translate ASIS Procedure 272
Translate BIT Procedure 282
Translate BITPRE Procedure 284
Translate COMPLEX Procedure 293
Translate DECI370 Procedure 309, 311

<attribute>
BNF Definition 88
BNF Definition References
<array data definition> 111
<array declarator> 111
<bit-field data definition> 116
<bit-field declarator> 116
<boolean_t data definition> 120
<boolean_t declarator> 120
<char data definition> 123
<char declarator> 123
<double data definition> 127
<double declarator> 127
<enumeration data declaration> 131
<enumeration data definition> 136
<enumeration declarator> 136
<enumeration typedef data declaration> 141
<float data definition> 145
<float declarator> 145
<int data definition> 148
<int declarator> 148
<long double data definition> 152
<long double declarator> 152
<pointer data definition> 155
<pointer declarator> 155
<string data definition> 158
<string declarator> 158
<struct data declaration> 168
<struct data definition> 171
<struct declarator> 171
<struct typedef data declaration> 176
<typedef data declaration> 179
<typedef declarator> 179
<typedef instance data definition> 182
<typedef instance declarator> 182
<union data declaration> 186
<union data definition> 190
<union declarator> 190
<union typedef data declaration> 196
<wchar_t data definition> 200
<wchar_t declarator> 200
<wide string data definition> 203
<wide string declarator> 203
Other References 89

B

<backslash>
BNF Definition 82, 83
BNF Definition References
<escape sequence character> 83
<backspace>
BNF Definition 82
BNF Definition References
<escape sequence character> 83

Unclassified

ADL <B>
Other References 5
ADL <BEGIN statement>
BNF Definition References
<ADL CASE annotation> 42
<ADL DECLARE annotation> 40
<ADL SEQUENCE annotation> 43
Other References 21
BEGIN
Parse 169, 172, 173, 176, 187, 192, 193, 197
<bell>
BNF Definition 82
BNF Definition References
<escape sequence character> 83
ADL <BINARY attributes list>
BNF Definition References
<ADL field annotation> 41
ADL <BINARY>
Other References 22, 52, 116, 125, 270, 273, 326
Translate BINARY Procedure 273, 277
BINARYKWD
BNF Definition References
<ADL field annotation> 41
<char annotation> 123
Generate BINARY Procedure 326, 327, 328, 329
Other References 31, 32, 36, 106, 125, 270, 277
Parse 118, 124, 149
Translate BINARY Procedure 273, 275, 276, 277, 279, 280
Translate BITPRE Procedure 284
Translate CHARPRE Procedure 290
Translate DECI370 Procedure 308, 310
Translate DECIOS2 Procedure 303, 305
ADL <BIT attributes list>
BNF Definition References
<ADL field annotation> 41
<bit-field annotation>
BNF Definition 116
BNF Definition References
<bit-field data definition> 116
<type specifier annotation> 90
<bit-field data definition>
ADL Mapping 117
BNF Definition 116
BNF Definition References
<data definition> 88
Generate BINARY Procedure 327, 328
Other References 116
Translate BINARY Procedure 275, 280
<bit-field declarator>
BNF Definition 116
BNF Definition References
<bit-field data definition> 116
<bit-field size>
BNF Definition 116
<bit-field size> *(continued)*
BNF Definition References
<bit-field declarator> 116
Other References 117
Parse 118
ADL <BIT>
Other References 282
Translate BIT Procedure 282
BIT
BNF Definition References
<ADL field annotation> 41
Other References 282
Translate BIT Procedure 282
ADL <BITPRE attributes list>
BNF Definition References
<ADL field annotation> 41
ADL <BITPRE>
Other References 284
Translate BITPRE Procedure 284
BITPRE
BNF Definition References
<ADL field annotation> 41
Other References 284
Translate BITPRE Procedure 284, 285
ADL <BLNENC attribute>
Other References 46
BLNENC
Parse 121
Translate BOOLEAN Procedure 286
<BNF escape>
BNF Definition 5
<BNF OR symbol>
BNF Definition 5
BNF Definition References
<BNF symbols> 5
<BNF symbols>
BNF Definition 5
ADL <BOOLEAN attributes list>
BNF Definition References
<ADL field annotation> 41
<boolean_t annotation>
BNF Definition 120
BNF Definition References
<boolean_t data definition> 120
<boolean_t data declaration>
ADL Mapping 121
BNF Definition 120
Translate BOOLEAN Procedure 286
<boolean_t data definition>
ADL Mapping 121
BNF Definition 120
Generate BOOLEAN Procedure 332
Other References 120
Translate BOOLEAN Procedure 286

Unclassified

<boolean_t declarator>
BNF Definition 120
BNF Definition References
<boolean_t data definition> 120
<declarator> 89
ADL <BOOLEAN>
Other References 46, 47, 120, 286, 332
Translate BOOLEAN Procedure 286
BOOLEAN
BNF Definition References
<ADL field annotation> 41
Generate BOOLEAN Procedure 332
Other References 46, 286
Translate BOOLEAN Procedure 286
ADL <BYTRVS attribute>
Other References 150
BYTRVS
Generate BINARY Procedure 329
Other References 150
Parse 153
Translate BINARY Procedure 273, 277
Translate BITPRE Procedure 284
Translate BOOLEAN Procedure 286
Translate CHARPRE Procedure 290
Translate DECI370 Procedure 308
Translate DECIOS2 Procedure 303
Translate ENUMERAT Procedure 296
Translate FLOAT16 Procedure 297
Translate FLOAT2 Procedure 299

C

<C data description>
BNF Definition 102
Other References 102, 103, 318
<C option>
BNF Definition 97
BNF Definition References
<C OPTIONS annotation> 97
<C OPTIONS annotation>
BNF Definition 97
BNF Definition References
<C data description> 102
Other References 96, 97, 98, 103, 318
<carriage return>
BNF Definition 83
BNF Definition References
<escape sequence character> 83
<separator> 85
ADL <CASE attributes list>
BNF Definition References
<ADL CASE annotation> 42
Other References 21, 25
ADL <CASE optional attributes list>
BNF Definition References
<implied CASE> 67
<case variant annotation>
BNF Definition 191
BNF Definition References
<annotation> 89
<union member list> 190, 191
ADL <CASE>
Other References 21, 22, 25, 33, 67, 267, 317, 319
CASE
BNF Definition References
<ADL CASE annotation> 42
Other References 23, 68, 105, 268, 269, 270, 318
Parse 193
ADL <CCSID attribute>
BNF Definition References
<char annotation> 123
<CHAR array of single char annotation> 159
<CHAR fixed length string annotation> 160
<CHAR varying length string annotation> 160
<CHARSFX varying length string annotation> 160
<wchar_t annotation> 200
Other References 52, 78
CCSID
Generate CHAR Procedure 334
Generate CHARSFX Procedure 337
Other References 15, 16, 17, 18, 35, 53, 77, 81, 125, 200, 204
Parse 125, 163, 201, 207
Translate CHARSFX Procedure 292
<char annotation>
BNF Definition 123
BNF Definition References
<char data definition> 123
<type specifier annotation> 90
Generate BINARY Procedure 327, 328
Other References 125
<CHAR array of single char annotation>
BNF Definition 159
BNF Definition References
<string annotation> 159
<wide string annotation> 204
Other References 161, 204
ADL <CHAR attributes list>
BNF Definition References
<ADL field annotation> 41
<char data definition>
ADL Mapping 124
BNF Definition 123
BNF Definition References
<data definition> 88
Generate BINARY Procedure 327, 328
Other References 123, 125
Translate BINARY Procedure 275, 279, 280
Translate CHAR Procedure 288
Translate DECI370 Procedure 310

Unclassified

<char data definition> *(continued)*
Translate DECIOS2 Procedure 305
<char declarator>
BNF Definition 123
BNF Definition References
<char data definition> 123
<declarator> 89
<CHAR fixed length string annotation>
BNF Definition 160
BNF Definition References
<string annotation> 159
<wide string annotation> 204
Other References 161, 204
ADL <CHAR optional attributes list>
BNF Definition References
<implied SUBSTR> 71
<char string constant>
BNF Definition 83
BNF Definition References
<string constant> 83
<CHAR varying length string annotation>
BNF Definition 160
BNF Definition References
<string annotation> 159
<wide string annotation> 204
Other References 161, 204
<character>
BNF Definition 81
BNF Definition References
<char string constant> 83
<character constant> 83
<comment> 85
<include directive> 92
<pragma options> 96
<pragma runopts> 96
<wchar_t string constant> 83
Other References 80, 81
<character constant>
BNF Definition 83
BNF Definition References
<integral constant> 84
ADL <character>
BNF Definition References
<option> 43
<PL specific annotation> 40
ADL <CHAR>
Other References 22, 71, 72, 287, 333
Translate CHAR Procedure 287
CHAR
BNF Definition References
<ADL field annotation> 41
<CHAR array of single char annotation> 159
Generate CHAR Procedure 333, 335
Other References 35, 37, 161, 164, 165, 166, 204, 207, 209, 287
CHAR *(continued)*
Parse 124, 125, 161, 162, 163, 201, 205, 206, 207
Translate CHAR Procedure 287, 288, 289
Translate CHARPRE Procedure 290
ADL <CHARPRE attributes list>
BNF Definition References
<ADL field annotation> 41
ADL <CHARPRE>
Other References 22, 49, 50, 71, 290
Translate CHARPRE Procedure 290
CHARPRE
BNF Definition References
<ADL field annotation> 41
Other References 37, 290
Translate CHARPRE Procedure 290, 291
ADL <CHARSFX attributes list>
BNF Definition References
<ADL field annotation> 41
<CHARSFX varying length string annotation>
BNF Definition 160
BNF Definition References
<string annotation> 159
<wide string annotation> 204
Other References 161, 204
ADL <CHARSFX>
Other References 71, 221, 292, 336
Translate CHARSFX Procedure 292
CHARSFX
BNF Definition References
<ADL field annotation> 41
<CHARSFX varying length string annotation> 160
Generate CHARSFX Procedure 336, 337
Other References 161, 166, 204, 209, 292
Parse 163, 207
Translate CHAR Procedure 288
Translate CHARSFX Procedure 292
<closing language comment symbol>
BNF Definition 40
BNF Definition References
<ADL annotation> 40
Other References 43
<comment>
BNF Definition 85
BNF Definition References
<separator> 85
COMPLEX
Generate BINARY Procedure 329
Generate FLOAT16 Procedure 342
Generate FLOAT2 Procedure 344
Other References 22, 293
Parse 118, 125, 128, 146, 150, 153
Translate BINARY Procedure 273, 278
Translate BITPRE Procedure 284
Translate CHARPRE Procedure 290

Unclassified

COMPLEX *(continued)*
Translate COMPLEX Procedure 293
Translate DECI370 Procedure 309, 310
Translate DECIOS2 Procedure 304
Translate FLOAT16 Procedure 298
Translate FLOAT2 Procedure 300
ADL <condition>
BNF Definition References
<ADL WHEN annotation> 42
<implied WHEN> 67
<when annotation> 191
Other References 67
<constant>
BNF Definition 84
BNF Definition References
<constant expression> 87
<nondelimiter token> 85
<operand> 87
Other References 81, 89
<constant expression>
BNF Definition 87
BNF Definition References
<expression> 87
ADL <constant identifier reference>
Other References 9
ADL <constant identifier>
BNF Definition References
<ADL field annotation> 41
<ending position> 71
<final value> 56
<increment value> 56
<initial value> 56
<starting position> 71
Other References 8, 57
ADL <constant statement>
BNF Definition References
<ADL DECLARE annotation> 40
<C data description> 102
Other References 9, 21, 24, 320
ADL <CONSTRAINED attribute>
BNF Definition References
<char annotation> 124
<int annotation> 148
Other References 52, 101, 110
CONSTRAINED
BNF Definition References
<option CONSTRAINED> 101
Generate BINARY Procedure 329
Other References 36, 52, 271
Parse 118, 125, 150
Translate BINARY Procedure 275, 279
Translate BITPRE Procedure 284
Translate CHARPRE Procedure 290
Translate DECI370 Procedure 310
Translate DECIOS2 Procedure 305
ADL <constructors>
Other References 319

D

<data declaration>
BNF Definition 88
BNF Definition References
<C data description> 102
Other References 87, 88, 89, 97, 103
ADL <data declaration statement>
Other References 57, 68, 69, 71
ADL <data declaration statements>
Other References 110
ADL <data declaration>
Other References 109
<data definition>
BNF Definition 88
BNF Definition References
<C data description> 102
<member list> 171
<union member list> 190, 191
Other References 87, 88, 89, 97, 98, 102, 103, 109, 149, 160, 168, 172, 176, 186, 191, 196
Parse 114, 169, 172, 173, 176, 187, 192, 193, 197
<decimal constant>
BNF Definition 82
BNF Definition References
<integer constant> 82
<string size> 158
Other References 84
<decimal digit>
BNF Definition 80
BNF Definition References
<character> 81
<decimal constant> 82
<hexadecimal digit> 80
<remaining identifier characters> 84
Other References 322
<declarator>
BNF Definition 89
Other References 109, 110, 112
<DECLARE annotation>
BNF Definition 102
BNF Definition References
<annotation> 89
<C data description> 102
ADL <DECLARE attributes list>
BNF Definition References
<ADL DECLARE annotation> 40
ADL <DECLARE statement>
Other References 20, 23, 24, 45
DECLARE
BNF Definition References
<ADL DECLARE annotation> 40
<DECLARE annotation> 102

Unclassified

DECLARE *(continued)*
Other References 11, 33
Default Plans 11
ADL <DEFAULT statement>
Other References 3, 10, 15, 20, 21, 23, 24
DEFAULT
Other References 24, 106
<delimiter token>
BNF Definition 85
BNF Definition References
<token> 85
Other References 86
DGTLSTBYT
Other References 36
<dimension size>
BNF Definition 89
BNF Definition References
<subscript declarator> 89
Other References 112
Parse 161, 205
ADL <dimension>
Other References 57
ADL <DMNHIGH attribute>
BNF Definition References
<ADL dimension> 42
Other References 57
DMNHIGH
Translate DMNATTR Procedure 294
ADL <DMNLOW attribute>
BNF Definition References
<ADL dimension> 42
Other References 57, 269
Translate DMNATTR Procedure 294
DMNLOW
Translate DMNATTR Procedure 294
ADL <DMNLST attribute>
Other References 22, 25, 33, 47
Translate DMNATTR Procedure 294
DMNLST
BNF Definition References
<ADL DMNLST attribute annotation> 42
<array annotation> 112
Generate DMNATTR Procedure 339
Other References 164, 207
Parse 113, 162, 183, 205, 206
ADL <DMNMAX attribute>
BNF Definition References
<ADL dimension> 42
ADL <DMNMAX>
Other References 57
DMNMAX
Translate DMNATTR Procedure 294
ADL <DMNSIZE attribute>
BNF Definition References
<ADL dimension> 42
ADL <DMNSIZE attribute> *(continued)*
Other References 57, 111, 112, 270
DMNSIZE
BNF Definition References
<array annotation> 112
Generate DMNATTR Procedure 339
Parse 113, 162, 205, 206
Translate DMNATTR Procedure 294
<double annotation>
BNF Definition 127
BNF Definition References
<double data definition> 127
<type specifier annotation> 90
<double data definition>
ADL Mapping 128
BNF Definition 127
BNF Definition References
<data definition> 88
Generate FLOAT16 Procedure 342
Generate FLOAT2 Procedure 344
Other References 127
Translate BINARY Procedure 274, 278, 279
Translate DECI370 Procedure 310, 311
Translate DECIOS2 Procedure 304, 306
Translate FLOAT16 Procedure 297
Translate FLOAT2 Procedure 299, 300
<double declarator>
BNF Definition 127
BNF Definition References
<declarator> 89
<double data definition> 127
<double quotation>
BNF Definition 82
BNF Definition References
<escape sequence character> 83

E

ADL <END statement>
BNF Definition References
<ADL CASE annotation> 42
<ADL DECLARE annotation> 40
<ADL SEQUENCE annotation> 43
Other References 21
<ending position>
BNF Definition 71
BNF Definition References
<implied SUBSTR> 71
Other References 71, 72
<enum tag>
BNF Definition 136
BNF Definition References
<enumeration data declaration> 131
<enumeration data definition> 136
Other References 131, 141, 319

Unclassified

<enum tag> *(continued)*
Parse 139
<enumeration annotation>
BNF Definition 136
BNF Definition References
<enumeration data declaration> 131
<enumeration data definition> 136
<enumeration typedef data declaration> 141
<type specifier annotation> 90
Other References 132, 142
ADL <ENUMERATION attributes list>
BNF Definition References
<ADL field annotation> 41
<enumeration constant>
BNF Definition 83
BNF Definition References
<enumerator> 136
<integral constant> 84
Other References 84
Parse 132, 138, 142
<enumeration data declaration>
ADL Mapping 132
BNF Definition 131
BNF Definition References
<data declaration> 88
Other References 131
Parse 139
<enumeration data definition>
ADL Mapping 137
BNF Definition 136
BNF Definition References
<data definition> 88
Generate ENUMERAT Procedure 340
Other References 84, 136
Translate ENUMERAT Procedure 296
<enumeration declarator>
BNF Definition 136
BNF Definition References
<enumeration data definition> 136
<enumeration list>
BNF Definition 136
BNF Definition References
<enumeration data declaration> 131
<enumeration data definition> 136
<enumeration typedef data declaration> 141
Generate ENUMERAT Procedure 340
Other References 131, 142
Parse 133, 139, 143
<enumeration typedef data declaration>
ADL Mapping 142
BNF Definition 141
BNF Definition References
<data declaration> 88
Other References 141
ADL <ENUMERATION>
Generate ENUMERAT Procedure 340
Other References 46, 296, 319, 340
Parse 133, 139, 143
ENUMERATION
BNF Definition References
<ADL field annotation> 41
Generate ENUMERAT Procedure 340
Parse 139
Translate ENUMERAT Procedure 296
<enumerator>
BNF Definition 136
BNF Definition References
<enumeration list> 136
Parse 139, 143
<escape sequence>
BNF Definition 83
BNF Definition References
<char string constant> 83
<character constant> 83
<wchar_t string constant> 83
<escape sequence character>
BNF Definition 83
BNF Definition References
<escape sequence> 83
Other References 84
<expression>
BNF Definition 87
BNF Definition References
<initializer> 89
Other References 86
<external storage class>
BNF Definition 88
BNF Definition References
<storage class> 88

F

FALSE
BNF Definition References
<boolean_t data declaration> 120
Other References 36, 120
Parse 121, 132, 138, 142
Translate CHAR Procedure 288
<field size>
BNF Definition 112
Other References 114
Parse 183, 184
<file name>
BNF Definition 92
BNF Definition References
<include directive> 92
Other References 92
<final value>
BNF Definition 56

Unclassified

<final value> *(continued)*
BNF Definition References
<implied dimension> 56
Other References 57
<first identifier character>
BNF Definition 84
BNF Definition References
<identifier> 84
ADL <FIT attribute>
BNF Definition References
<char annotation> 124
<int annotation> 148
Other References 52, 100, 110
FIT
BNF Definition References
<option FIT> 100
Generate BINARY Procedure 329
Parse 118, 125, 128, 146, 150, 153
Translate BINARY Procedure 273, 277
Translate BITPRE Procedure 284
Translate CHARPRE Procedure 290
Translate DECI370 Procedure 308
Translate DECIOS2 Procedure 303
Translate FLOAT16 Procedure 298
Translate FLOAT2 Procedure 300
<float annotation>
BNF Definition 145
BNF Definition References
<float data definition> 145
<type specifier annotation> 90
<float data definition>
ADL Mapping 146
BNF Definition 145
BNF Definition References
<data definition> 88
Generate FLOAT16 Procedure 342
Generate FLOAT2 Procedure 344
Other References 145
Translate BINARY Procedure 274, 278, 279
Translate DECI370 Procedure 309, 311
Translate DECIOS2 Procedure 304, 306
Translate FLOAT16 Procedure 297
Translate FLOAT2 Procedure 299
<float declarator>
BNF Definition 145
BNF Definition References
<declarator> 89
<float data definition> 145
ADL <FLOAT16 attributes list>
BNF Definition References
<ADL field annotation> 41
ADL <FLOAT16>
Other References 297, 341
Translate FLOAT16 Procedure 297
FLOAT16
BNF Definition References
<ADL field annotation> 41
Generate FLOAT16 Procedure 341, 342
Other References 6, 297
Parse 128, 146, 153
Translate BINARY Procedure 278, 279
Translate DECI370 Procedure 309, 311
Translate FLOAT16 Procedure 297, 298
Translate FLOAT2 Procedure 299
ADL <FLOAT2 attributes list>
BNF Definition References
<ADL field annotation> 41
ADL <FLOAT2>
Other References 299, 343
Translate FLOAT2 Procedure 299
FLOAT2
BNF Definition References
<ADL field annotation> 41
Generate FLOAT2 Procedure 343, 344
Other References 6, 299
Parse 128, 146, 153
Translate BINARY Procedure 274
Translate DECIOS2 Procedure 304, 305, 306
Translate FLOAT16 Procedure 297
Translate FLOAT2 Procedure 299, 300
<form feed>
BNF Definition 83
BNF Definition References
<escape sequence character> 83
<separator> 85

G

<graphic character>
BNF Definition 81
BNF Definition References
<character> 81

H

ADL <HELP attribute>
BNF Definition References
<array annotation> 111, 112
<ASIS fixed length string annotation> 159
<ASIS varying length string annotation> 159
<bit-field annotation> 117
<boolean_t annotation> 120
<char annotation> 123, 124
<CHAR array of single char annotation> 159
<CHAR fixed length string annotation> 160
<CHAR varying length string annotation> 160
<CHARSFX varying length string annotation> 160
<double annotation> 127
<enumeration annotation> 137

Unclassified

ADL <HELP attribute> *(continued)*
BNF Definition References *(continued)*
<float annotation> 145
<int annotation> 148
<long double annotation> 152
<pointer annotation> 155
<struct annotation> 171
<union annotation> 191
<wchar_t annotation> 200
Other References 21, 24
HELP
Other References 269
Parse 113, 118, 121, 125, 128, 133, 139, 143, 146, 150, 153, 156, 161, 162, 164, 169, 172, 173, 176, 184, 187, 192, 193, 197, 201, 205, 206, 207
<hexadecimal constant>
BNF Definition 82
BNF Definition References
<integer constant> 82
<hexadecimal digit>
BNF Definition 80
BNF Definition References
<escape sequence> 83
<hexadecimal constant> 82
HIGH
Translate CHAR Procedure 288
<horizontal tab>
BNF Definition 82, 83
BNF Definition References
<escape sequence character> 83
<separator> 85

I
<identifier>
BNF Definition 84
BNF Definition References
<array declarator> 111
<bit-field declarator> 116
<boolean_t declarator> 120
<char declarator> 123
<double declarator> 127
<enum tag> 136
<enumeration constant> 83
<enumeration declarator> 136
<float declarator> 145
<int declarator> 148
<long double declarator> 152
<nondelimiter token> 85
<operand> 87
<pointer declarator> 155
<string declarator> 158
<struct declarator> 171
<struct tag> 171
<typedef identifier> 179
<typedef instance declarator> 182

<identifier> *(continued)*
BNF Definition References *(continued)*
<union declarator> 190
<union tag> 190
<wchar_t declarator> 200
<wide string declarator> 203
Other References 84, 86, 109
Parse <array data definition> 113
Parse <bit-field data definition> 117
Parse <boolean_t data declaration> 121
Parse <boolean_t data definition> 121
Parse <char data definition> 124
Parse <double data definition> 128
Parse <enumeration data declaration> 132
Parse <enumeration data definition> 137
Parse <enumeration typedef data declaration> 142
Parse <float data definition> 146
Parse <int data definition> 149
Parse <long double data definition> 153
Parse <pointer data definition> 156
Parse <string data definition> 161
Parse <typedef instance data definition> 182
Parse <union data declaration> 187
Parse <union data definition> 192
Parse <union typedef data declaration> 197
Parse <wchar_t data definition> 201
Parse <wide string data definition> 205
<identifier annotation>
BNF Definition 40
BNF Definition References
<annotation> 89
<array data definition> 111
<bit-field data definition> 116
<boolean_t data definition> 120
<char data definition> 123
<double data definition> 127
<enumeration data declaration> 131
<enumeration data definition> 136
<enumeration typedef data declaration> 141
<float data definition> 145
<int data definition> 149
<long double data definition> 152
<pointer data definition> 155
<string data definition> 158
<struct data declaration> 168
<struct data definition> 171
<struct typedef data declaration> 176
<typedef data declaration> 179
<typedef instance data definition> 182
<union data declaration> 186
<union data definition> 190
<union typedef data declaration> 196
<wchar_t data definition> 200
<wide string data definition> 203

Unclassified

<identifier annotation> *(continued)*
Other References 109, 160
ADL <identifier>
BNF Definition References
<unqualified identifier annotation> 40
Other References 11, 12, 21, 23, 24, 25, 27, 28, 29, 31
<implied ARRAY>
BNF Definition 56
BNF Definition References
<LIST element> 54
Other References 56, 57, 58, 111, 317, 319
<implied CASE>
BNF Definition 67
BNF Definition References
<implied ARRAY> 56
<LIST element> 54
Other References 57, 67, 317, 318
<implied CASE element>
BNF Definition 67
BNF Definition References
<implied OTHERWISE> 67
<implied WHEN> 67
Other References 67, 68
<implied dimension>
BNF Definition 56
BNF Definition References
<implied DMNLST> 56
Other References 57, 58
<implied DMNLST>
BNF Definition 56
BNF Definition References
<implied ARRAY> 56
<implied OTHERWISE>
BNF Definition 67
BNF Definition References
<implied CASE> 67
Other References 67
<implied SEQUENCE>
BNF Definition 69
BNF Definition References
<implied ARRAY> 56
<LIST element> 54
Other References 57, 69, 317
<implied SEQUENCE element>
BNF Definition 69
BNF Definition References
<implied SEQUENCE> 69
Other References 69
<implied SUBSTR>
BNF Definition 71
BNF Definition References
<LIST element> 54
Other References 71, 72
<implied WHEN>
BNF Definition 67
BNF Definition References
<implied WHEN list> 67
Other References 67
<implied WHEN list>
BNF Definition 67
BNF Definition References
<implied CASE> 67
<include directive>
BNF Definition 92
BNF Definition References
<preprocessor directive> 91
Other References 92, 102
<increment value>
BNF Definition 56
BNF Definition References
<implied dimension> 56
Other References 57, 58
<indirection>
BNF Definition 86
BNF Definition References
<unary operator> 87
<initial value>
BNF Definition 56
BNF Definition References
<implied dimension> 56
Other References 57
<initializer>
BNF Definition 89
BNF Definition References
<array data definition> 111
<bit-field data definition> 116
<boolean_t data definition> 120
<char data definition> 123
<double data definition> 127
<enumeration data definition> 136
<float data definition> 145
<int data definition> 149
<long double data definition> 152
<pointer data definition> 155
<string data definition> 158
<struct data definition> 171
<typedef instance data definition> 182
<union data definition> 190
<wchar_t data definition> 200
<wide string data definition> 203
<int annotation>
BNF Definition 148
BNF Definition References
<int data definition> 149
<type specifier annotation> 90
Generate BINARY Procedure 327, 328
<int data definition>
ADL Mapping 149

Unclassified

<int data definition> *(continued)*
BNF Definition 148
BNF Definition References
<data definition> 88
Generate BINARY Procedure 327, 328
Other References 148
Translate BINARY Procedure 275, 279
Translate BITPRE Procedure 284
Translate CHARPRE Procedure 290
Translate DECI370 Procedure 310
Translate DECIOS2 Procedure 305
<int declarator>
BNF Definition 148
BNF Definition References
<declarator> 89
<int data definition> 149
<integer constant>
BNF Definition 82
BNF Definition References
<bit-field size> 116
<integral constant> 84
<left col> 94
<right col> 94
<integral constant>
BNF Definition 84
BNF Definition References
<constant> 84
<field size> 112
<integral constant expression> 87
Other References 84
<integral constant expression>
BNF Definition 87
BNF Definition References
<dimension size> 89
<enumerator> 136
<expression> 87
<internal storage class>
BNF Definition 88
BNF Definition References
<int data definition> 149
<storage class> 88
Other References 149

J

ADL <JUSTIFY attribute>
BNF Definition References
<CHAR fixed length string annotation> 160
<CHAR varying length string annotation> 160
JUSTIFY
Generate CHAR Procedure 334
Parse 125, 164, 207
Translate CHAR Procedure 288

K

ADL <key word>
Other References 8
<keyword>
BNF Definition 85
BNF Definition References
<nondelimiter token> 85
Other References 86

L

<left col>
BNF Definition 94
BNF Definition References
<option MARGINS> 98
<option SEQUENCE> 99
<pragma margins> 95
<pragma sequence> 94
Other References 94, 95, 98, 99, 100
<length adjective>
BNF Definition 148
BNF Definition References
<int data definition> 149
Other References 148, 149
ADL <LENGTH attribute>
Other References 105, 268, 270
LENGTH
BNF Definition References
<ASIS varying length string annotation> 159
<CHAR varying length string annotation> 160
Generate ASIS Procedure 324
Generate BINARY Procedure 327, 328
Generate CHAR Procedure 334
Generate FLOAT16 Procedure 342
Generate FLOAT2 Procedure 344
Other References 22, 36
Parse 113, 117, 118, 121, 124, 125, 128, 133, 138, 139, 143, 146, 149, 150, 153, 156, 161, 163, 201, 205, 207
Translate ASIS Procedure 272
Translate BINARY Procedure 274, 275, 276, 278, 279, 280
Translate BIT Procedure 282
Translate BITPRE Procedure 284, 285
Translate BOOLEAN Procedure 286
Translate CHAR Procedure 288
Translate CHARPRE Procedure 290, 291
Translate COMPLEX Procedure 293
Translate DECI370 Procedure 309, 310, 311
Translate DECIOS2 Procedure 305, 306
Translate ENUMERAT Procedure 296
Translate FLOAT16 Procedure 297, 298
Translate FLOAT2 Procedure 299, 300

Unclassified

<letter>
BNF Definition 80
BNF Definition References
<character> 81
<first identifier character> 84
<remaining identifier characters> 84
<line continuation character>
BNF Definition 83
BNF Definition References
<escape sequence character> 83
Other References 84
<LIST annotation>
BNF Definition 42
BNF Definition References
<ADL data annotation> 41
Other References 53, 54, 212, 224
<LIST element>
BNF Definition 54
BNF Definition References
<implied CASE element> 67
<implied SEQUENCE element> 69
<LIST statement> 54
Other References 54
<LIST statement>
BNF Definition 54
BNF Definition References
<LIST annotation> 42
<LIST statement annotation> 90
Other References 11, 12, 44, 54, 56, 58, 71, 72, 78, 111, 212, 224, 317
<LIST statement annotation>
BNF Definition 90
BNF Definition References
<annotation> 89
<C data description> 102
Other References 102, 103, 105
<long double annotation>
BNF Definition 152
BNF Definition References
<long double data definition> 152
<type specifier annotation> 90
<long double data definition>
ADL Mapping 153
BNF Definition 152
BNF Definition References
<data definition> 88
Generate FLOAT16 Procedure 342
Generate FLOAT2 Procedure 344
Other References 152
Translate BINARY Procedure 274, 275, 279
Translate DEC1370 Procedure 310, 311
Translate DECIOS2 Procedure 305, 306
Translate FLOAT16 Procedure 297, 298
Translate FLOAT2 Procedure 299, 300
<long double declarator>
BNF Definition 152
BNF Definition References
<declarator> 89
<long double data definition> 152
<lower case letter>
BNF Definition 80
BNF Definition References
<letter> 80
LOW
Translate CHAR Procedure 288

M

ADL <MAXALC attribute>
BNF Definition References
<array annotation> 112
<ASIS varying length string annotation> 159
<CHAR varying length string annotation> 160
<CHARSFX varying length string annotation> 160
<union annotation> 191
Other References 112, 268
Translate DMNATTR Procedure 294
MAXALC
Generate ASIS Procedure 324
Generate CHAR Procedure 334
Generate CHARSFX Procedure 337
Other References 50, 67, 112, 113, 186, 187, 190, 193, 196, 197, 212, 221
Parse 163, 187, 192, 193, 197, 207
Translate ASIS Procedure 272
Translate BIT Procedure 282
Translate BITPRE Procedure 285
Translate CHAR Procedure 288
Translate CHARPRE Procedure 291
Translate CHARSFX Procedure 292
ADL <MAXLEN attribute>
Other References 22, 25
MAXLEN
Generate ASIS Procedure 324
Generate CHAR Procedure 334
Generate CHARSFX Procedure 337
Other References 9, 22, 25
Parse 163, 207
Translate ASIS Procedure 272
Translate BIT Procedure 282
Translate BITPRE Procedure 285
Translate CHAR Procedure 288
Translate CHARPRE Procedure 291
Translate CHARSFX Procedure 292
<member list>
BNF Definition 171
BNF Definition References
<struct data declaration> 168
<struct data definition> 171

Unclassified

<member list> *(continued)*
BNF Definition References *(continued)*
<struct typedef data declaration> 176
Other References 168, 172, 176
Parse 169, 172, 173, 176
MVS Only Information
<left col> 94, 95, 98, 100
<right col> 94, 95, 98, 100

N

<new line>
BNF Definition 82
BNF Definition References
<escape sequence character> 83
<separator> 85
Other References 82, 84
<nondelimiter token>
BNF Definition 85
BNF Definition References
<token> 85
Other References 86
<NOT symbol>
BNF Definition 80
BNF Definition References
<graphic character> 81
ADL <NOTE attribute>
BNF Definition References
<array annotation> 111, 112
<ASIS fixed length string annotation> 159
<ASIS varying length string annotation> 159
<bit-field annotation> 117
<boolean_t annotation> 120
<char annotation> 123, 124
<CHAR array of single char annotation> 159
<CHAR fixed length string annotation> 160
<CHAR varying length string annotation> 160
<CHARSFX varying length string annotation> 160
<DECLARE annotation> 102
<double annotation> 127
<enumeration annotation> 137
<float annotation> 145
<int annotation> 148
<long double annotation> 152
<pointer annotation> 155
<struct annotation> 171
<union annotation> 191
<wchar_t annotation> 200
Other References 21, 24
NOTE
Other References 45, 116, 269
Parse 113, 118, 121, 125, 128, 133, 139, 143, 146, 150, 153, 156, 161, 162, 164, 169, 172, 173, 176, 184, 187, 192, 193, 197, 201, 205, 206, 207
NOT
Other References 68, 69

O

<octal constant>
BNF Definition 82
BNF Definition References
<integer constant> 82
Other References 84
<octal digit>
BNF Definition 80
BNF Definition References
<decimal digit> 80
<escape sequence> 83
<octal constant> 82
OF
BNF Definition References
<ADL ARRAY annotation> 41
<implied ARRAY> 56
<SUBTYPE annotation> 41
Other References 196
Parse 113, 114, 161, 162, 163, 183, 205, 206
<opening language comment symbol>
BNF Definition 40
BNF Definition References
<ADL annotation> 40
Other References 43
<operand>
BNF Definition 87
BNF Definition References
<unary expression> 87
<operator>
BNF Definition 87
<option>
BNF Definition 43
BNF Definition References
<PL OPTIONS annotation> 43
<option CONSTRAINED>
BNF Definition 101
BNF Definition References
<C option> 97
Other References 101
<option FIT>
BNF Definition 100
BNF Definition References
<C option> 97
Other References 100
<option MARGINS>
BNF Definition 98
BNF Definition References
<C option> 97
Other References 98
<option SEQUENCE>
BNF Definition 99

Unclassified

<option SEQUENCE> *(continued)*
BNF Definition References
<C option> 97
Other References 99
<OR symbol>
BNF Definition 80
BNF Definition References
<graphic character> 81
OS/2 Only Information
<backslash> 83
<backspace> 82
<bell> 82
ADL <BINARY> 116
ADL <BYTRVS attribute> 150
<character> 81
<horizontal tab> 83
<new line> 82
<NOT symbol> 80
<OR symbol> 80
<single quotation> 83
<space> 81
<otherwise annotation>
BNF Definition 191
BNF Definition References
<annotation> 89
<union member list> 191
ADL <OTHERWISE statement>
Other References 25, 186, 190, 196

P

ADL <PACKED attributes list>
BNF Definition References
<ADL field annotation> 41
ADL <PACKED>
Other References 270, 301
Translate PACKED Procedure 301
PACKED
BNF Definition References
<ADL field annotation> 41
Other References 36, 267, 317
Translate PACKED Procedure 301
<PL array size>
BNF Definition 57
Other References 57
<PL high bound>
BNF Definition 56
Other References 57
<PL identifier>
BNF Definition 18
BNF Definition References
<PL qualified identifier> 18
Other References 18, 23, 27, 28
<PL identifier annotation>
BNF Definition 18
<PL identifier annotation> *(continued)*
Other References 18, 27
<PL low bound>
BNF Definition 56
Other References 57
<PL OPTIONS annotation>
BNF Definition 43
BNF Definition References
<ADL annotation> 40
Other References 43, 53, 97
<PL qualified identifier>
BNF Definition 18
Other References 18, 19, 27
<PL qualified operator>
BNF Definition 18
BNF Definition References
<PL qualified identifier> 18
Other References 18
<PL specific annotation>
BNF Definition 40
BNF Definition References
<ADL annotation> 40
PLAN
Other References 11
<pointer annotation>
BNF Definition 155
BNF Definition References
<pointer data definition> 155
<type specifier annotation> 90
<pointer data definition>
ADL Mapping 156
BNF Definition 155
BNF Definition References
<data definition> 88
Other References 155
<pointer declarator>
BNF Definition 155
BNF Definition References
<declarator> 89
<pointer data definition> 155
ADL <positional identifier>
BNF Definition References
<unqualified identifier annotation> 40
Other References 11, 12, 19, 27, 28, 31, 44
ADL <positive integer>
BNF Definition References
<ADL field annotation> 41
<ending position> 71
<implied CASE element> 67
<implied SEQUENCE element> 69
<starting position> 71
<pragma chars>
BNF Definition 96
BNF Definition References
<preprocessor pragma> 93

Unclassified

<pragma chars> *(continued)*
Other References 95
<pragma margins>
BNF Definition 95
BNF Definition References
<preprocessor pragma> 93
Other References 95
<pragma options>
BNF Definition 96
BNF Definition References
<preprocessor pragma> 93
Other References 96
<pragma runopts>
BNF Definition 96
BNF Definition References
<preprocessor pragma> 93
Other References 96
<pragma sequence>
BNF Definition 94
BNF Definition References
<preprocessor pragma> 93
Other References 94
ADL <PRECISION attribute>
Other References 101
PRECISION
Generate BINARY Procedure 327, 328
Other References 36
Parse 118, 124, 125, 149, 150
Translate BINARY Procedure 274, 275, 276, 278, 279, 280
Translate BITPRE Procedure 284
Translate CHARPRE Procedure 290
Translate DECI370 Procedure 310, 311, 312
Translate DECIOS2 Procedure 305, 306
<preprocessor directive>
BNF Definition 91
Other References 91, 318
<preprocessor pragma>
BNF Definition 93
BNF Definition References
<C data description> 102
Other References 93, 97, 103, 318

Q

<qualified identifier annotation>
BNF Definition 40
BNF Definition References
<ADL data annotation> 41
<identifier annotation> 40
Other References 44, 54
ADL <qualified identifier>
BNF Definition References
<array annotation> 112
<ASIS varying length string annotation> 159
<CHAR varying length string annotation> 160
ADL <qualified identifier> *(continued)*
BNF Definition References *(continued)*
<ending position> 71
<final value> 56
<implied ARRAY> 56
<implied CASE element> 67
<implied SEQUENCE element> 69
<implied SUBSTR> 71
<initial value> 56
<otherwise annotation> 191
<PL identifier annotation> 18
<qualified identifier annotation> 40
<starting position> 71
<when annotation> 191
Generate ASIS Procedure 324
Generate CHAR Procedure 334
Generate DMNATTR Procedure 339
Other References 12, 18, 19, 22, 25, 27, 57, 68, 69, 71, 72, 160, 161, 204
Parse 113, 163, 207
Parse <array data definition> 113
Parse <bit-field data definition> 117
Parse <boolean_t data declaration> 121
Parse <boolean_t data definition> 121
Parse <char data definition> 124
Parse <double data definition> 128
Parse <enumeration data declaration> 132
Parse <enumeration data definition> 137
Parse <enumeration typedef data declaration> 142
Parse <float data definition> 146
Parse <int data definition> 149
Parse <long double data definition> 153
Parse <pointer data definition> 156
Parse <string data definition> 161
Parse <typedef data declaration> 179
Parse <typedef instance data definition> 182
Parse <union data declaration> 187
Parse <union data definition> 192
Parse <union typedef data declaration> 197
Parse <wchar_t data definition> 201
Parse <wide string data definition> 205
Translate ASIS Procedure 272
Translate BIT Procedure 282
Translate CHAR Procedure 288
Translate DMNATTR Procedure 294

R

ADL <RADIX attribute>
Other References 101
RADIX
Generate BINARY Procedure 328
Other References 36, 303
Parse 118, 125, 128, 146, 150, 153

Unclassified

RADIX *(continued)*
Translate BINARY Procedure 273, 278
Translate BITPRE Procedure 284
Translate CHARPRE Procedure 290
Translate DECI370 Procedure 309, 310
Translate DECIOS2 Procedure 304
Translate FLOAT16 Procedure 298
Translate FLOAT2 Procedure 300
<record size>
BNF Definition 78
Other References 78
ADL <REJEC statement>
Parse 187, 192, 193, 197
ADL <REJECT statement>
BNF Definition References
<ADL OTHERWISE annotation> 42
<ADL WHEN annotation> 42
<case variant annotation> 191
REJECT
BNF Definition References
<implied CASE element> 67
<remaining identifier characters>
BNF Definition 84
BNF Definition References
<identifier> 84
<right col>
BNF Definition 94
BNF Definition References
<option MARGINS> 98
<option SEQUENCE> 99
<pragma margins> 95
<pragma sequence> 94
Other References 94, 95, 98, 99, 100

S

ADL <SCALE attribute>
Other References 101
SCALE
Generate BINARY Procedure 328
Parse 118, 125, 150
Translate BINARY Procedure 273, 274, 275, 277, 278, 279
Translate BITPRE Procedure 284
Translate CHARPRE Procedure 290
Translate DECI370 Procedure 309, 310, 311
Translate DECIOS2 Procedure 304, 305, 306
<separator>
BNF Definition 85
BNF Definition References
<delimiter token> 85
Other References 86, 92
ADL <SEQUENCE attributes list>
BNF Definition References
<ADL SEQUENCE annotation> 43
ADL <SEQUENCE optional attributes list>
BNF Definition References
<implied SEQUENCE> 69
ADL <SEQUENCE>
Other References 21, 24, 33, 69, 267, 317, 319
SEQUENCE
BNF Definition References
<ADL SEQUENCE annotation> 43
<option SEQUENCE> 99
Generate ASIS Procedure 324
Generate BINARY Procedure 327, 328
Generate BOOLEAN Procedure 332
Generate CHAR Procedure 334
Generate CHARSFX Procedure 337
Generate ENUMERAT Procedure 340
Generate FLOAT16 Procedure 342
Generate FLOAT2 Procedure 344
Other References 11, 20, 51, 65, 69, 99, 103, 104, 105, 270, 317
Parse 173
Translate BINARY Procedure 275, 280
SFXENC
Parse 163, 207
Translate CHAR Procedure 288
Translate CHARSFX Procedure 292
SGNLOC
Other References 35, 36
<sign adjective>
BNF Definition 148
BNF Definition References
<bit-field data definition> 116
<char data definition> 123
<int data definition> 148
<string data definition> 158
<wide string data definition> 203
Other References 125, 148, 149
ADL <SIGNED attribute>
Other References 125
ADL <signed integer>
BNF Definition References
<final value> 56
<increment value> 56
<initial value> 56
<PL array size> 57
<PL high bound> 56
<PL low bound> 56
Other References 57
SIGNED
Generate BINARY Procedure 327, 329
Other References 31, 32, 36
Parse 118, 124, 125, 133, 139, 143, 149, 150
Translate BINARY Procedure 273, 275, 276, 278, 279, 280
Translate BITPRE Procedure 284
Translate CHARPRE Procedure 290

Unclassified

SIGNED *(continued)*
Translate DECI370 Procedure 309, 310, 312
Translate DECIOS2 Procedure 304, 305, 306
Translate ENUMERAT Procedure 296
<single quotation>
BNF Definition 82, 83
BNF Definition References
<escape sequence character> 83
<size of an object>
BNF Definition 87
BNF Definition References
<unary operator> 87
ADL <SKIP attribute>
Other References 105, 269
<SKIP padding annotation>
BNF Definition 159
BNF Definition References
<string annotation> 159
Other References 160, 164, 320, 321
ADL <SKIP statement>
BNF Definition References
<ADL OTHERWISE annotation> 42
<ADL WHEN annotation> 42
<case variant annotation> 191
Other References 10, 21, 25, 104, 118
Parse 117, 187, 192, 193, 197
SKIP
BNF Definition References
<ADL field annotation> 41
<implied CASE element> 67
<implied SEQUENCE element> 69
<SKIP padding annotation> 159
Other References 10, 68, 69, 164, 270, 317, 320, 321
Parse 117, 118
<space>
BNF Definition 81
BNF Definition References
<character> 81
<separator> 85
Other References 81, 86
<special symbol>
BNF Definition 85
BNF Definition References
<delimiter token> 85
<starting position>
BNF Definition 71
BNF Definition References
<implied SUBSTR> 71
Other References 71, 72
<storage class>
BNF Definition 88
BNF Definition References
<array data definition> 111
<boolean_t data definition> 120
<char data definition> 123
<storage class> *(continued)*
BNF Definition References *(continued)*
<double data definition> 127
<enumeration data definition> 136
<float data definition> 145
<int data definition> 148
<long double data definition> 152
<pointer data definition> 155
<string data definition> 158
<struct data declaration> 168
<struct data definition> 171
<typedef instance data definition> 182
<union data declaration> 186
<union data definition> 190
<wchar_t data definition> 200
<wide string data definition> 203
Other References 168, 172, 176, 186, 191, 196
<string annotation>
BNF Definition 159
BNF Definition References
<string data definition> 158
<type specifier annotation> 90
Other References 160, 161, 204
Parse 163
<string constant>
BNF Definition 83
BNF Definition References
<constant> 84
Other References 86
<string data definition>
ADL Mapping 161
BNF Definition 158
BNF Definition References
<data definition> 88
Generate ASIS Procedure 324
Generate CHAR Procedure 335
Generate CHARSFX Procedure 337
Other References 158, 160, 164, 320, 321
Parse 113
Translate ASIS Procedure 272
Translate BIT Procedure 282
Translate BITPRE Procedure 284
Translate CHAR Procedure 288
Translate CHARPRE Procedure 290
Translate DECI370 Procedure 309, 311
<string declarator>
BNF Definition 158
BNF Definition References
<declarator> 89
<string data definition> 158
<string size>
BNF Definition 158
BNF Definition References
<string data definition> 158
<wide string data definition> 203

Unclassified

<string size> *(continued)*
Other References 164, 204
Parse 162, 205
<struct annotation>
BNF Definition 171
BNF Definition References
<struct data declaration> 168
<struct data definition> 171
<struct typedef data declaration> 176
<type specifier annotation> 90
Other References 168, 176
<struct data declaration>
ADL Mapping 168
BNF Definition 168
BNF Definition References
<data declaration> 88
Other References 168
Parse 172, 173
<struct data definition>
ADL Mapping 172
BNF Definition 171
BNF Definition References
<data definition> 88
Other References 109, 171
<struct declarator>
BNF Definition 171
BNF Definition References
<declarator> 89
<struct data definition> 171
Other References 172
<struct tag>
BNF Definition 171
BNF Definition References
<struct data declaration> 168
<struct data definition> 171
Other References 168, 176, 319
Parse 172, 173
<struct typedef data declaration>
ADL Mapping 176
BNF Definition 176
BNF Definition References
<data declaration> 88
Other References 176
<subscript declarator>
BNF Definition 89
BNF Definition References
<array declarator> 111
<boolean_t declarator> 120
<double declarator> 127
<enumeration declarator> 136
<float declarator> 145
<int declarator> 148
<long double declarator> 152
<pointer declarator> 155
<string declarator> 158
<struct declarator> 171
<subscript declarator> *(continued)*
BNF Definition References *(continued)*
<typedef declarator> 179
<typedef instance declarator> 182
<union declarator> 190
<wide string declarator> 203
Other References 109, 112, 122, 128, 146, 153, 161, 172, 182, 204
Parse 113, 161, 205
ADL <subscript list>
BNF Definition References
<implied ARRAY> 56
Other References 57
<SUBTYPE annotation>
BNF Definition 41
BNF Definition References
<ADL DECLARE annotation> 40
ADL <subtype identifier>
BNF Definition References
<ADL subtype instance annotation> 41
<SUBTYPE annotation> 41
Parse 183
ADL <subtype instance attributes list>
BNF Definition References
<ADL subtype instance annotation> 41
ADL <subtype instance>
Other References 9, 31, 182, 227
Parse 121, 139, 172, 173, 183, 184, 192, 193
ADL <SUBTYPE statement>
Other References 9, 20, 23, 31
Parse 139
ADL <SUBTYPE>
Other References 131, 141, 168, 176, 227
Parse 172, 173, 192, 193
SUBTYPE
BNF Definition References
<SUBTYPE annotation> 41
Other References 9, 186, 196, 268, 269, 318, 319, 320
Parse 121, 133, 139, 143, 169, 172, 176, 180, 183, 187, 192, 197
Translate BOOLEAN Procedure 286
System/370 Only Information
<backslash> 82
<backspace> 82
<bell> 82
ADL <BYTRVS attribute> 150
<character> 81, 96
<double quotation> 82
<horizontal tab> 82
<identifier> 117
<new line> 82
<NOT symbol> 80
<OR symbol> 80
<pragma options> 96

Unclassified

System/370 Only Information *(continued)*
<pragma runopts> 96
ADL <qualified identifier> 117
<single quotation> 82
<space> 81

T

ADL <terminator>
BNF Definition References
<ADL data annotation> 41
<ADL OTHERWISE annotation> 42
<ADL SEQUENCE annotation> 43
<ADL WHEN annotation> 42
<array annotation> 112
<boolean_t annotation> 120
<case variant annotation> 191
<char annotation> 124
<double annotation> 127
<enumeration annotation> 137
<float annotation> 145
<int annotation> 148
<LIST statement> 54
<long double annotation> 152
<PL OPTIONS annotation> 43
<pointer annotation> 155
<string annotation> 159
<struct annotation> 171
<SUBTYPE annotation> 41
<union annotation> 191
<wide string annotation> 204
Parse 187, 192, 193, 197
ADL <TEXT attribute>
BNF Definition References
<DECLARE annotation> 102
ADL <THEN statement>
Other References 25
ADL <TITLE attribute>
BNF Definition References
<array annotation> 111, 112
<ASIS fixed length string annotation> 159
<ASIS varying length string annotation> 159
<bit-field annotation> 117
<boolean_t annotation> 120
<char annotation> 123, 124
<CHAR array of single char annotation> 159
<CHAR fixed length string annotation> 160
<CHAR varying length string annotation> 160
<CHARSFX varying length string annotation> 160
<DECLARE annotation> 102
<double annotation> 127
<enumeration annotation> 137
<float annotation> 145
<int annotation> 148
<long double annotation> 152

ADL <TITLE attribute> *(continued)*
BNF Definition References *(continued)*
<pointer annotation> 155
<struct annotation> 171
<union annotation> 191
<wchar_t annotation> 200
Other References 20, 24
TITLE
Other References 45, 269
Parse 113, 118, 121, 125, 128, 133, 139, 143, 146, 150, 153, 156, 161, 162, 164, 169, 172, 173, 176, 184, 187, 192, 193, 197, 201, 205, 206, 207
<token>
BNF Definition 85
Other References 85, 86
TRUE
Other References 8, 31, 36, 51, 67, 268, 293
Parse 132, 133, 137, 138, 142, 143
Translate CHAR Procedure 288
<type specifier>
BNF Definition 155
BNF Definition References
<array data definition> 111
<pointer data definition> 155
<typedef data declaration> 179
Other References 112, 114, 156, 179, 182
Parse 114
<type specifier annotation>
BNF Definition 90
BNF Definition References
<annotation> 90
<array data definition> 111
<typedef data declaration> 179
<typedef instance data definition> 182
Other References 112, 179, 182
Parse 183, 184
<typedef data declaration>
ADL Mapping 179
BNF Definition 179
BNF Definition References
<data declaration> 88
Other References 179, 319
<typedef declarator>
BNF Definition 179
BNF Definition References
<declarator> 89
<typedef data declaration> 179
<typedef identifier>
BNF Definition 179
BNF Definition References
<enumeration typedef data declaration> 141
<struct typedef data declaration> 176
<typedef declarator> 179
<typedef instance data definition> 182
<union typedef data declaration> 196

Unclassified

<typedef identifier> *(continued)*
Other References 176, 182, 196
Parse 183
Parse <typedef data declaration> 179
Parse <typedef instance data definition> 182
<typedef instance data definition>
ADL Mapping 182
BNF Definition 182
BNF Definition References
<data definition> 88
Other References 182, 320
Parse 183, 184
<typedef instance declarator>
BNF Definition 182
BNF Definition References
<declarator> 89
<typedef instance data definition> 182

U

<unary expression>
BNF Definition 87
BNF Definition References
<expression> 87
<unary minus>
BNF Definition 86
BNF Definition References
<unary operator> 87
<unary operator>
BNF Definition 87
BNF Definition References
<constant expression> 87
<integral constant expression> 87
<operator> 87
<unary expression> 87
<unary plus>
BNF Definition 86
BNF Definition References
<unary operator> 87
<underscore>
BNF Definition 80
BNF Definition References
<first identifier character> 84
<graphic character> 81
<remaining identifier characters> 84
Other References 322
<union annotation>
BNF Definition 191
BNF Definition References
<type specifier annotation> 90
<union data declaration> 186
<union data definition> 190
<union typedef data declaration> 196
Other References 186, 196
<union data declaration>
ADL Mapping 187
BNF Definition 186
BNF Definition References
<data declaration> 88
Other References 186
Parse 192, 193
<union data definition>
ADL Mapping 192
BNF Definition 190
BNF Definition References
<data definition> 88
Other References 109, 190, 318
<union declarator>
BNF Definition 190
BNF Definition References
<declarator> 89
<union data definition> 190
<union member list>
BNF Definition 190
BNF Definition References
<union data declaration> 186
<union data definition> 190
<union typedef data declaration> 196
Other References 186, 191, 196
Parse 187, 192, 193, 197
<union tag>
BNF Definition 190
BNF Definition References
<union data declaration> 186
<union data definition> 190
Other References 186, 196, 319
Parse 192, 193
<union typedef data declaration>
ADL Mapping 197
BNF Definition 196
BNF Definition References
<data declaration> 88
Other References 196
ADL <UNITLEN attribute>
BNF Definition References
<ASIS varying length string annotation> 159
<unqualified identifier annotation>
BNF Definition 40
BNF Definition References
<ADL DECLARE annotation> 40
<ADL OTHERWISE annotation> 42
<ADL SEQUENCE annotation> 43
<ADL WHEN annotation> 42
<DECLARE annotation> 102
<identifier annotation> 40
<implied CASE element> 67
<implied SEQUENCE element> 69
<implied WHEN> 67
<LIST statement> 54

Unclassified

<unqualified identifier annotation> *(continued)*
Other References 44
<upper case letter>
BNF Definition 80
BNF Definition References
<letter> 80

V

<vertical tab>
BNF Definition 83
BNF Definition References
<escape sequence character> 83
<separator> 85
VM/CMS Only Information
<left col> 94, 95, 98, 100
<right col> 94, 95, 98, 100

W

<wchar_t annotation>
BNF Definition 200
BNF Definition References
<type specifier annotation> 90
<wchar_t data definition> 200
<wchar_t data definition>
ADL Mapping 201
BNF Definition 200
BNF Definition References
<data definition> 88
Other References 200
<wchar_t declarator>
BNF Definition 200
BNF Definition References
<declarator> 89
<wchar_t data definition> 200
<wchar_t string constant>
BNF Definition 83
BNF Definition References
<string constant> 83
<when annotation>
BNF Definition 191
BNF Definition References
<annotation> 89
<union member list> 190, 191
ADL <WHEN clause>
BNF Definition References
<array annotation> 111, 112
<ASIS fixed length string annotation> 159
<ASIS varying length string annotation> 159
<boolean_t annotation> 120
<char annotation> 123, 124
<CHAR array of single char annotation> 159
<CHAR fixed length string annotation> 160
<CHAR varying length string annotation> 160
<CHARSFX varying length string annotation> 160

ADL <WHEN clause> *(continued)*
BNF Definition References *(continued)*
<double annotation> 127
<enumeration annotation> 137
<float annotation> 145
<int annotation> 148
<long double annotation> 152
<pointer annotation> 155
<struct annotation> 171
<union annotation> 191
Other References 21, 24, 25, 51
ADL <WHEN statement>
Other References 186, 190, 196
<wide string annotation>
BNF Definition 203
BNF Definition References
<type specifier annotation> 90
<wide string data definition> 203
Other References 204
Parse 206
<wide string data definition>
ADL Mapping 205
BNF Definition 203
BNF Definition References
<data definition> 88
Generate ASIS Procedure 325
Generate CHAR Procedure 335
Generate CHARSFX Procedure 337
Other References 203, 204
Parse 113
<wide string declarator>
BNF Definition 203
BNF Definition References
<declarator> 89
<wide string data definition> 203

Z

ADL <ZONED attributes list>
BNF Definition References
<ADL field annotation> 41
ADL <ZONED>
Other References 35, 270, 302
Translate ZONED Procedure 302
ZONED
BNF Definition References
<ADL field annotation> 41
Other References 36
Translate ZONED Procedure 302
ZONENC
Other References 35

Data Description and Conversion Architecture

February 19, 1992

R. A. Demers
K. Yamaguchi

Rochester, MN
RCHVMV(DEMERS)

Abstract

A data description and conversion architecture (DD&C) has been defined by IBM to enhance data interchange among SAA programming languages and systems. The components of DD&C are 1) A Data Language (ADL), a programming language for describing data and specifying what data conversions are to be performed, 2) an object-oriented method of encoding ADL for efficient machine storage, transmission and processing, and 3) programs that translate the data declarations of other programming languages to or from ADL. Also discussed is the application of DD&C architecture to record-oriented files for SAA Distributed File Management.

This is a draft of a paper being prepared for publication. Please do not distribute copies outside of IBM.

Contents

Data Description and Conversion Architecture . . . . . 1
Overview . . . . . 1
Objectives . . . . . 3
  General Objectives . . . . . 3
  Data Description Objectives . . . . . 3
  Data Conversion Objectives . . . . . 4
Alternatives Considered . . . . . 5
  Programming Language Data Description and Conversion . . . . . 5
  Sun eXternal Data Representation - XDR . . . . . 6
  OSI Abstract Syntax Notation 1 - ASN.1 . . . . . 7
  Network Interface Data Language - NIDL . . . . . 7
  Formatted Data: Object Content Architecture - FD:OCA . . . . . 8
  Data Description Specifications - DDS . . . . . 8
DD&C Concepts . . . . . 8
  Foundations . . . . . 9
    Programming Language Data Representations . . . . . 9
    Character Data Representation Architecture . . . . . 9
    Numeric Representation Architectures . . . . . 10
  Language Layer . . . . . 10
    A Data Language . . . . . 10
    ADL Annotation of Programming Languages . . . . . 14
  Services Layer . . . . . 15
    Interactive Data Description . . . . . 15
    Type Managers . . . . . 15
    Object-Oriented Encoding of ADL . . . . . 17
    The ADL Compiler . . . . . 18
    Conversion Programs . . . . . 19
  Data Interchange Layer . . . . . 19
    File Access DD&C . . . . . 19
    Program Call DD&C . . . . . 21
Summary . . . . . 22
Acknowledgements . . . . . 22
Bibliography . . . . . 23
Biographies . . . . . 23

Figures . . . . . 25

Data Description and Conversion Architecture

Overview

Many different programming languages are in use today, on a wide variety of computers and operating systems. Each programming language is best suited for a specific range of tasks and has language features and data types designed for those tasks. For example, FORTRAN was designed for scientific computing, COBOL for commercial data processing, and C for systems programming. But this is not to say that commercial programs cannot be written in FORTRAN, or scientific programs in C. In fact, there is considerable overlap of features and data types among programming languages, the result of evolution and the adoption of features from each other.

It is a cliche that programmers should use the best language for the task at hand, but this is often ignored. Programmers tend to use the languages that they know best, or that are mandated by their employers. One often hears of "COBOL shops" or "C shops," for example. An important benefit of this standardization is that the programs of a COBOL shop, for example, can exchange data among themselves. A COBOL program can *export* data by writing it to a file, sending it in a message, or calling another COBOL program and passing data as arguments. A second COBOL program can *import* data by reading it from a file, receiving a message, or accepting arguments to its parameters. All that is necessary is that the exporting and importing COBOL programs use matching interfaces, consisting of the same COBOL data declarations and complementary COBOL export/import statements (WRITE/READ, SEND/RECEIVE, etc.).

But today, as business entities are continually reshuffled, applications are increasingly mixtures of different languages. And therein lies the rub; these languages were not designed to communicate with each other. In particular, the data exported by programs of one language often cannot be used when imported into programs of other languages. The exporting and importing programs simply have no agreements regarding the type, representation, aggregation, and alignment of data.

When the exporting and importing programs are on different systems, the number of incompatibilities increases further. Each implementation of a language deals with these representation issues in the ways best suited for its target hardware and operating environment. The methods used often vary even for different implementations of the same language.

Figure 1 on page 26 illustrates the diversity of methods used for even a simple data structure. In this figure, a simple data structure called RECORD, consisting of a three-character field called INITIALS and a two-byte binary field called NUMBER, is shown as represented by C programs and by COBOL programs on OS/2 systems and on MVS systems. The character data is ASCII encoded in the OS/2 systems, but EBCDIC encoded in the MVS system. And, it is null-terminated in C programs, but not in COBOL programs. The binary data is byte reversed in the OS/2 systems, but not in the MVS systems. And, the binary field is aligned on a two-byte boundary in MVS COBOL, but not in OS/2 COBOL. Considering the diversity found in this simple example, it is easy to imagine the representation incompatibilities that would be found in more complex cases.

Data incompatibility problems can be handled by application logic but this can be very difficult to achieve because of the numerous technical details to be considered. It would be far better if these incompatibilities could be overcome by conversion logic automatically invoked by system services as data is imported or exported.

This paper describes a Data Description and Conversion archite[illegible]ed DD&C architecture), that has been defined by IBM for data interchange among SAA programs. Designed for SAA Distributed File Management (DFM) products, DD&C has been applied to record-oriented file access, and can be applied to data interchange through other mechanisms. As an architecture, DD&C is a set of specifications for the construction of products that implement the functions and interfaces defined by DD&C. In this paper, we do not describe any particular products built to the DD&C specifications. It will be up to IBM and other software vendors to incorporate DD&C capabilities into products as they see fit.

A key concept of DD&C architecture is that data conversions must be performed whenever data flows between *type domains*. The concept of type domains is introduced by DD&C to help categorize data representations in terms of the methods used by a particular language implementation. For example, OS/2 C, MVS C, OS/2 COBOL, and MVS COBOL are four different type domains because of differences in data types between C and COBOL, and because of representation differences for the OS/2 and MVS systems. This is illustrated by Figure 2 on page 27. The programs that perform these conversions are defined by a new programming language, called *A Data Language* or *ADL* (5 on page 23), designed specifically for describing how data is represented by different type domains and for converting data as it flows between type domains.

The top of Figure 3 on page 28 shows the data declaration statements used by C and COBOL programs to describe the simple data structure illustrated in Figure 1 on page 26. The C and COBOL declarations have little in common beyond the names programmers used for the structure (RECORD) and its variables (INITIALS and NUMBER). It is not possible to compare the C and COBOL declarations to determine what conversions are needed as data flows between a C program and a COBOL program. Not only are there syntactic differences, but neither declaration is complete in regard to data representation. Language data declarations are deliberately abstract so that programmers need not be concerned with details that can be more easily handled by language compilers.

In contrast, the ADL declarations at the bottom of Figure 3 on page 28, corresponding to the C and COBOL declarations, are each complete for a particular type domain because they fully describe the representations of the structure and its variables. They are comparable to each other because they are expressed in a common language - ADL. There are many differences between the ADL declarations for the OS/2 C and MVS COBOL type domains, but clearly, an ADL compiler, as shown in Figure 4 on page 29, can identify these differences and generate an appropriate conversion program. Then, when data is to flow from a MVS COBOL program to an OS/2 C program, as shown in Figure 5 on page 29, the compiled ADL program can perform the necessary conversions.

But where do the ADL declarations come from? They can, of course, be written by a programmer, but that programmer would need to understand all of the details of both a language's data declarations and a type domain's methods of representing data. This defeats the whole point of abstract data types in programming languages. Language compilers are already capable of handling all of these details, but compilers do not make this information available outside of themselves in a consistent and usable fashion. And it would be practically impossible to get them to do so. Some other mechanism is needed.

DD&C architecture defines a new kind of program called a *Type Manager*. As shown in Figure 3 on page 28, a Type Manager for a particular type domain can *parse* the data declarations of its associated programming language and create an ADL declaration with all representation details filled in. A COBOL programmer needs only to pass valid COBOL data declarations to this Type Manager function. A Type Manager can also reverse this process and *generate* a data declaration for its associated language from an ADL description that is correct for its type domain. These language declarations can then be included in programs as part of their export/import interface. For example, a COBOL programmer can include COBOL data declarations generated from ADL in any COBOL program that needs to export or import the data described by an ADL declaration. And thirdly, Type Managers can *translate* ADL descriptions appropriate to a different type domain into ADL appropriate to their own type domain. For example, if there is an ADL description of data that was written to a file by an MVS COBOL program, then the OS/2 C Type Manager can translate it into an ADL description correct for the OS/2 C type domain. Together, these three Type Manager capabilities (parse, generate, and translate), provide a rich set of tools in support of multi-language programming.

What remains is to decide when an ADL program needs to be called. This depends on the export/import mechanism being used. For example, as shown in Figure 9 on page 33, if an MVS COBOL program has written records to a file and an OS/2 C program needs to read them, then the OS/2 READ service can call an ADL conversion program as each record is read. DD&C architecture is not concerned with why or when ADL programs are called, but IBM's Distributed File Management products deal with these issues for record-oriented files.

In the remainder of this paper, we consider the objectives of DD&C architecture, discuss the alternatives considered in its design, examine the major concepts of DD&C in more depth, and finally, we discuss the application of DD&C to file access and to program calls.

Objectives

General Objectives

The general objective of DD&C architecture is to enable programs written in any of the SAA programming languages (C, COBOL, CSP, FORTRAN, PL/I and RPG), as implemented on any of the SAA system types (MVS/ESA, VM/ESA, OS/400, and OS/2), to interchange data. This is not to say that all data exported by any of these programs can be imported by other programs of the set. There are entirely too many language and implementation peculiarities to allow for a fully general solution. For example, numeric data formatted as character strings can only be interchanged as character data; conversion to the numeric data types is not supported. Instead, DD&C defines a practical solution that allows most SAA data to be interchanged by most SAA programs. Further, the initial design of DD&C is focused on the interchange of data stored in record-oriented files.

Data Description Objectives

Innumerable record oriented files, created by a wide range of applications, exist in midrange and mainframe systems. Providing work stations with access to the data in this "data jail" is a prime objective of the SAA Distributed File Management products.[1] But the differences between the languages and data representations typically used in work stations and those used in midrange and mainframe systems must be bridged to make this feasible.

Programmers can write ADL descriptions of the data stored in files, but this can be quite difficult to do correctly because each implementation of a programming language has its own ways of representing, aligning, and aggregating data. Programmers would have to be fully aware of all of them. Even in the initial scope of DD&C, ADL is quite complex and supports many options. Requiring programmers to learn and correctly use ADL would not be acceptable to them. Instead, an objective of DD&C is to make use of existing data declarations specified in the syntax of a SAA programming language, and provide automatic translation into ADL via Type Managers for each SAA type domain.

[1] The SAA Distributed File Management products provide access to and management of distributed, record-oriented files, as defined by IBM's Distributed Data Management architecture (DDM). For more information on DDM, see 2 on page 23.

Data Conversion Objectives

The key objective of DD&C in converting data can be stated in one word: performance. Data conversion is always viewed as a necessary evil, something required to get a job done, but which contributes nothing to the application itself. Therefore, DD&C seeks to minimize the amount of data conversion that must be performed and to perform it as efficiently as possible.

The initial focus of DD&C on record oriented files substantially affected its design. During file access, we are often dealing with a large number of records, each with a potentially large number of fields. Each record must be converted as efficiently as possible, with as little overhead as possible, and affecting as few fields of the record as possible.

The fundamental approach of DD&C is to preplan the conversions that will be required for each record by comparing the descriptions of the file's records with a description of how a program is designed to view those records. Differences in data representation, alignment, and aggregation can then be accommodated by a single invocation of an optimized conversion program for each record, performing only necessary conversions with minimal overhead.

A second data conversion objective is that all conversions allowed by DD&C produce the same results wherever these conversions are performed. For example, a conversion from IEEE Floating Point to Hexadecimal Floating point should produce exactly the same result whether the conversion is performed on OS/2 or on MVS. To this end, the specifications for ADL carefully define the results to be produced for all conversions allowed by ADL.

A third data conversion objective of DD&C is enhanced data interchange. Many differences in programming language data types exist for historical reasons but are of little importance to programs seeking to interchange data. For example, a number is a number is a number! The fact that one language represents numbers in binary format while another represents them in zoned decimal format or floating-point format is often not relevant to an application. What is important, however, are the precision, scaling, and radix of the number. The ADL descriptions of data account for these differences, and ADL supports conversions among all numeric data types. ADL then goes one step further by ensuring that only data valid for the target data variable is actually assigned to it. Interchange is further supported by the translate function of Type Managers that each attempt to map any ADL described data into the data types of their associated programming language.

A fourth data conversion objective of DD&C is support of application development. ADL is a programming language whose programs are invoked to convert data, but these conversions are not limited to simple data format conversions. Depending on how an application's view of the data is described, other conversions required by the application can also be performed. As examples, only certain records of a file can be selected, the fields of selected records can be reordered, and the fields of exported records can be validated.

And as a final data conversion objective, we must consider reversible conversions. If a program writes a record to a file of a different type domain, that record must be converted to the representations required by the file's type domain. If the same program subsequently reads the same record from the file, it must be converted back to the representations of the program's type domain. Ideally, the record read should be identical to the record written, but this is not always the case. In numeric conversions, significant digits can be lost during conversions because of rounding and truncation. And in character conversions, best-fit character substitutions are used in some cases, with no best-fit on the return trip. Known solutions to these problems all involve canonical data formats that are incompatible with the other objectives of DD&C, or require application programmers to account for reversibility in their designs.

Alternatives Considered

Throughout the design of DD&C, the architects were continually being asked questions like "Why did you do X this way?" or "Why didn't you use the Y architecture?" Indeed, many other alternatives were studied and considered. In this section, a few of the more more important alternatives are discussed.

Programming Language Data Description and Conversion

Most programming languages (PLs) include facilities for describing the data contained in variables, and for converting data as variables are assigned to other variables. Why aren't these PL descriptions and conversions sufficient to allow data interchange between programs of different type domains? The short answer is that each PL implementation is self-contained with no consideration given in its design to data interchange with other PLs. A programmer must use matching interfaces of the same PL implementation when exporting data from the variables of a program and then importing data into the variables of another program.

Conversions of the representations used by different implementations of the same PL are possible if the associated PL data types are unaffected. So it would be acceptable, for example, for an OS/2 C program to access data stored in an MVS C file as long as representation conversions are somehow performed. However, the position is often taken that these conversions should be performed by implementations of the language that recognize when programs are being compiled for an environment consisting of heterogeneous systems. Using data descriptions embedded within program text, an approach to data conversion similar to that outlined in "Network Interface Data Language - NIDL" on page 7, then becomes feasible. After all, that approach was designed for a single language environment to begin with; that of C.

This uni-language restriction is often eased to allow a certain amount of inter-language data communications. But a requirement is imposed that the data types and interfaces of the exporting and importing PLs be "similar." This approach, in effect, calls for pair-wise agreements to be reached between PLs as to what types of data can be interchanged between those languages; agreements that have not yet been negotiated or documented for most PL pairs.

As an alternative to pair-wise agreements, programs that require inter-language communications can be written within the constraints of a *Common Data Model (CDM)*, such as the one espoused by AD/Cycle (4 on page 23). If only the data types of a PL that match the data types of the CDM are used in communications with other programs, then inter-language communications are assured. This alternative, however, has severe limitations. First, the data types of the CDM are, by necessity, the lowest common denominator of the data types found in the PLs covered by the CDM. Communications is restricted between any two PLs to the types held in common with the CDM, even when those PLs may well be able to interchange additional data types. And second, this alternative only applies to new programs and ignores the wealth of data locked up in the records of existing files; records that were written using the full expressive capabilities of some PL.

At the heart of this alternative is the view that the data types of a language are "owned" by that language and that only implementations of the PL should be allowed to operate on their instances. Any other operations on them could potentially result in bad data that cannot be processed by programs of the PL. But all that is really necessary is to understand the range of values that a variable can hold, as defined by its data type, and ensure that no value is passed to a program that is outside of that range.

Looking specifically at data stored in files, this alternative ignores historic realities. Most files residing in mainframes or midrange systems were typically written by COBOL, FORTRAN, PL/I, or RPG programs. But the programs executing in work stations that seek access to the data in those files are typically written in C, BASIC, PASCAL, or other languages. No pair-wise inter-language data conversion agreements exist, and few compilers have been designed for a heterogeneous systems environment.

The use of PL data conversion capabilities when accessing files on heterogeneous systems was rejected as being unrealistic, impractical, and premised on an outdated view of data processing.

Sun eXternal Data Representation - XDR

Sun XDR (8 on page 23) is one of several methods of interchanging data based on the use of canonical data formats; that is, based on rules specifying how data is to be represented when it is transmitted between systems. For example, when character data is to be transmitted, XDR specifies precisely how it is to be encoded, when floating-point data is to be transmitted, XDR specifies how it is to be encoded, and so forth.

The sending program must convert each data item to be transmitted to the format required by XDR for its data type. These conversions are accomplished by calling special XDR subroutines for each data item. These subroutines convert the value of a program variable to the canonical format, if necessary, and copy it to the message. When all such data items have been copied, the program calls another XDR subroutine to transmit the message via network pipes.

The receiving program issues an XDR call to receive the message and then, for each data item to be received, the program must issue an XDR call to a subroutine that extracts the next value from the message, converts it to local representation if necessary, and returns it to a program variable. It is the programmer's responsibility to issue the correct XDR calls in the correct order to properly receive each value.

While conceptually simple, this approach also has some disadvantages:

- For each type domain, a set of XDR subroutines must be provided that converts local data representations to or from canonical formats.
- If the local representations of data are not the same as the canonical representation, conversions must be performed, even if the sending and receiving type domains use the same local representations.
- XDR provides no support for constructor data types, such as arrays or nested structures. The sending program must decompose the constructor into a series of simple data elements by using program logic, and the receiving program must reconstruct them via program logic.
- XDR provides no means of communicating metadata between the sending and receiving programs. Side information, in the form of program listings and specifications, must be passed between the programmers of the sending and receiving programs. There is no means, for example, of recording the description of the data in a file with the file itself so that it is available to all users of the file.
- XDR provides no means of performing structural conversions of the messages transmitted, such as reordering or omitting of fields or whole messages. Structural conversions are an application responsibility.
- XDR applies primarily to new programs because it requires them to be written in a certain way. Using XDR for communications between existing programs would require substantial changes to be made to the sending and receiving programs.
- And finally, XDR cannot be made to apply to the data in existing files because that data is not in the XDR canonical format.

All in all, there is sufficient justification for looking at other alternatives.

OSI Abstract Syntax Notation 1 - ASN.1

ASN.1 (9 on page 23) is a language defined by the Open Systems Interconnect standard of the International Standards Organization for describing data transferred between heterogeneous systems. Along with ASN.1 are the OSI Basic Encoding Rules (BER) (10 on page 23) that specify a canonical format in which the data described by ASN.1 can be transferred.

The text of ASN.1 data descriptions is written primarily as a way for one programmer to tell another how data is to be transmitted. It is up to the sending program to encode data as required by the BER, performing whatever data conversions are necessary. It is up to the receiving program to decode this data from the BER format and convert it to local representations. In some cases, utility programs have been developed to interpret ASN.1 descriptions and convert data between local representations and BER. However, the ASN.1, being an abstract data description, requires additional (unstandardized) annotations in order to correctly describe local representations. That is, programmers must learn how the PL they are using actually represents data, learn how to write ASN.1, and then learn how to annotate it to specify how the PL actually represents data.

The OSI BER specifies how data is to be represented when it is transferred between systems. For each item of data, the length of the data and a tag corresponding to an identifier specified in ASN.1 are transmitted along with the canonical representation of the data. While this approach is robust, it too has some clear disadvantages:

1. The length and tag associated with each data item are superfluous. This metadata isn't needed, because the sending and receiving programs must be written to process matching data anyway. It does allow conversions to be performed by the OSI Presentation Level, but not enough information is available to really match PL representation requirements. And if the data being transferred consists of repetitions of the same formats, as it does for the records of a file, then there is no need to transmit metadata more than once.
2. The canonical representation formats of BER were designed for universal interpretability and do not match the representations actually used on any system. Therefore, all data must be converted twice, once to the canonical format, and once from the canonical format, even if the sending and receiving representations are the same. Few applications can afford this overhead, so data must be transmitted as unencoded byte strings, with real conversions performed by applications as necessary.
3. The data stored in existing files is not encoded as required by BER, and ASN.1 is not capable of describing it without extensive annotations.

While other, more efficient, canonical interchange languages than BER are possible, the need for any such interchange format was questioned during the design of DD&C. Instead, the DD&C approach is based on detected differences in data descriptions in a language capable of completely specifying how data is actually represented.

Network Interface Data Language - NIDL

The Network Interface Data Language (NIDL) of the Open Software Foundation's Distributed Computing Environment (3 on page 23) is another language for describing data transferred between heterogeneous systems. NIDL is actually C language data descriptions with annotations that specify descriptive information not expressible in pure C. Thus, there is a clear relationship between NIDL and at least one PL, thereby making available at least C's data description capabilities. But of course, not all programs are written in C.

Associated with NIDL are the rules of Network Data Representation (NDR) for multi-canonical data representation. NDR effectively overcomes the problems of OSI BER. No length or tag fields are transmitted, and each data type can be represented in one of several ways. A single tag is transmitted once to specify which representation will be used for each data type, allowing the sending system to specify the representations used, and requiring it to perform the minimum conversions. The target then only has to convert items that differ from its local representations. For example, if a receiving program expects an IEEE Binary Floating-Point number, but is informed that a Hexadecimal Floating-Point number has been sent, then it knows to perform that conversion.

The key problem with NIDL is its single language focus. Not designed to accommodate the needs of multiple languages, NIDL is not rich enough to describe the full range of data types and representations actually used by communicating programs. Nor would its C-language syntax be acceptable to programmers of other languages, even if it could be enhanced to meet the data description requirements of other languages.

Formatted Data: Object Content Architecture - FD:OCA

FD:OCA (11 on page 23) is an IBM document content architecture that was designed as a means of describing tabular data included in documents. IBM's Distributed Relational Database Architecture (DRDA) (7 on page 23) uses FD:OCA to describe database tables transmitted between systems. DD&C architecture initially attempted to enhance FD:OCA so that it could be used to encode ADL. This proved undesirable for two major reasons. First, the design of FD:OCA was not flexible enough to accommodate the changes required by ADL. And secondly, the performance objectives of DD&C did not allow the overhead of building and parsing FD:OCA data streams.

Data Description Specifications - DDS

The IBM System/38 and its successor the IBM AS/400 provide a programming language independent way to describe the data stored in some of the record-oriented files of those systems. Compilers can request the DDS descriptions from a file and generate appropriate data declarations within the programs that access a file. Programs compiled with common DDS data descriptions can easily interchange data, even if written in different programming languages.

There are two reasons why DDS works on these systems. First, the various IBM supplied compilers for these systems have all been written to exist within a common language execution environment. Data representation is standardized for similar language data types. And second, DDS is restricted to describing records that are simple collections of fields. None of the constructor types of the programming languages, such as arrays or nested structures, can be described. Unfortunately, these factors do not prevail in general; there is no universal common language execution environment, and many existing files do contain constructor type data. In fact, System/38's and AS/400's usually contain many files that are not described by DDS and are not easily interchanged with other type domains.

Consideration was given to extending DDS, but this was rejected because of the rigid, forms-oriented nature of DDS. However, many aspects of the relationship of DDS to files was adopted by DD&C (see "File Data Description" on page 19). AS/400 DDS is considered to be a separate type domain and its requirements have been accommodated in the design of ADL.

DD&C Concepts

The conceptual layers of DD&C architecture are shown in Figure 6 on page 30. These layers are not part of DD&C architecture, as such.

Foundations

This layer of DD&C architecture is concerned with the ways in which data is represented, aligned, and aggregated by various type domains.

Programming Language Data Representations

In Assembler languages, program variables are described in terms of their representation in a computer system. Historically, this approach made sense. Hardware architects are primarily interested in the representation of data as part of the operational specifications of a system, and the designers of Assembler languages are interested in making those data representations available to programmers. But the programmer is burdened with the tasks of selecting the best representation schemes for values and of mapping variables onto memory for optimal processing.

Programming language designers attempted to remove these burdens by defining a set of abstract data types that the programmer can use to describe variables. Each data type of a programming language defines a set of possible values and the operations that can be performed on those values. Examples of numeric data types are COBOL numeric PICTUREs, PL/I FIXED BINARY, and C integers. Numeric data types support arithmetic operations and character data types support string operations. Programming languages support both simple data types concerned with single values and more complex data types, such as arrays and structures, concerned with aggregations of data.

For each of its data types, a programming language also defines a set of type attributes that can be specified by programmers to complete the description of a variable. For example, the PL/I FIXED BINARY data type also allows the programmer to specify the precision and scaling factor of the number, how the variable is to be initialized, and whether it is to be aligned or not.

The problem is that each programming language handles the representation, mapping and attribute issues in its own way. Each compiler for a language is designed for a specific system architecture and its representation and mapping techniques. Thus, a COBOL program developed and tested on a PC may not work exactly the same on a S/370 because of data representation differences. And data written to a file by a PC program cannot be directly read by the same program running on the S/370.

A difficult aspect of the design of DD&C was deciding what type domains should be formally considered in the scope of ADL. There was a strong temptation to make ADL as broad as possible, encompassing the representations used by as many IBM and other vendor systems as possible. However, this was countered by the difficulty of concurrently defining ADL and a set of Type Managers. Experts could be found within IBM for work on Type Managers for each of the SAA PLs and systems, but to go beyond this scope was not practical. We believe, however, much of ADL is useful for other type domains, and that it is possible to formally extend DD&C architecture to other type domains in the future.

Character Data Representation Architecture

A special case of data representation is that of character data. A large number of different schemes have been developed, because the number of different graphic characters that can be represented by a single byte is limited (a maximum of 256 characters), Many national languages require special characters (e.g., accented vowels or punctuation) or entirely unique sets of graphic characters (e.g., Farsi). Some programming languages require special characters (e.g., APL). Some disciplines require special characters (e.g., mathematics). Various devices have been designed to support only limited graphic characters (e.g., printers and displays). And, different standards groups have promulgated a variety of encoding schemes (e.g., ASCII vs EBCDIC). Additionally, double-byte encoding schemes have been adopted for national languages requiring thousands of graphic characters (e.g., Chinese, Japanese, and Korean), along with a number of schemes for intermixing single-byte and double-byte encodings.

The result is a nightmare of complexity that greatly inhibits data communication. Fortunately, this complexity has been addressed by the IBM SAA Character Data Representation Architecture (CDRA) (6 on page 23). CDRA defines a comprehensive means of identifying the scheme by which a given character string has been encoded. A single *tag* called a Coded Character Set Identifier (CCSID) can be associated with each character string. CDRA also defines the set of all possible valid conversions of character strings from one CCSID to other CCSIDs and provides the conversion tables required to perform them.

ADL associates CCSID tags with character strings, as required by CDRA, and depends on CDRA conversion services for performing character conversions.

Numeric Representation Architectures

The representation of numeric values falls into two major categories, the representation of exact numbers and the representation of approximate numbers. Again for a variety of historic reasons, a number of representation methods are in common use in each of these categories.

Exact numbers can be encoded in either binary or decimal format. Binary formats are often used because they are natively supported by most machine architectures, and therefore can be processed most efficiently. Decimal formats exist because they are a better match to the ways in which numbers were encoded in the punched card devices of early systems. Not all decimal values can be accurately encoded in binary encodings because of inherent number system differences.

Approximate numbers are based on the concepts of scientific notation, which allows very small or very large numbers to be encoded with only a limited amount of precision. Based on exponential notation, various *floating-point* encoding schemes have been devised, based on either binary or hexadecimal encodings of the characteristic and mantissa of the value.

Conversions between exact and approximate encodings of a numeric value are often possible, but may result in data loss through truncation or rounding. ADL defines comprehensive rules for performing conversions of numeric encodings.

Language Layer

This layer is concerned with ADL and its relationship to the SAA programming languages.

A Data Language

ADL provides a means of describing the representation of data exported and imported by a wide variety of programming languages, as implemented on a variety of systems, so that efficient data conversion programs can be generated.

A module is the compilation unit of ADL, consisting of a DECLARE statement for each view of the data and PLAN statements for each required conversion program. See Figure 7 on page 31 and Figure 10 on page 34 for examples of ADL modules. (Parenthesized numbers, such as (100) in the following text, refer to portions of those figures.)

Each DECLARE statement (100) corresponds to a single type domain and consists of:

- DEFAULT statements (101) each specify the default values to be used for the attributes of a single ADL data type. These statements can be included from a library containing the DEFAULT statements for each type domain, greatly reducing the number of details that must be specified in data declaration statements.
- CONSTANT statements (102) that associate a literal with an identifier. The identifier can then be referenced wherever the literal can be specified.
- SUBTYPE statements (103), that define subtypes of the ADL defined types, or of another subtype.

Subtypes can be defined for each of the data types of a PL, with the subtype identifier identical to a PL type. For example, an *integer* subtype of the ADL BINARY type can be defined to be equivalent to the *integer* type of C. A set of SUBTYPE statements in a file, along with appropriate DEFAULT and CONSTANT statements, can ease the task of creating ADL descriptions of data, if no Type Manager is available for a PL.

Subtypes can also be defined for application types. For example, a *gameBoard* subtype of the ADL ARRAY type could be defined for use by all 8 by 8 game programs. These statements can also be included from a dictionary of common data descriptions.
- Data declaration statements(104). These are the statements that actually describe data. Each consists of a keyword that names a data type, followed by attributes appropriate to the data type. For constructor types, this is followed by a clause that defines the elements of the constructor, such as the elements of an ARRAY.

A WHEN clause can also be specified in data declaration statements. In any assignment of data to the declared variable, the predicate expression[2] of the WHEN clause must evaluate to TRUE or the assignment statement and the plan are terminated with an exception. For files, two primary uses are seen for this capability: data selection and data validation. A WHEN clause (105) in the file's declaration ensures that only valid data is written to the file. And a WHEN clause (106) in the program's declaration selects the records to be presented to the program.

Each PLAN statement (200) defines the parameters that can be passed to a conversion program, as INPUT parameters (201) or as OUTPUT parameters (202). Each parameter is specified by the identifier of a data item declared in one of the DECLARE sections of the module. The parameter is thereby associated with an expected representation.

For file conversion programs, a single record is passed as an input parameter (203), and a single area is passed as an output parameter (204) to receive the converted record. Other input parameters specify the

[2] ADL predicate expressions are syntactically the same as those of Structured Query Language (SQL). Comparison predicates and the BETWEEN, LIKE and IN predicates can be specified in expressions with Boolean operators. In ADL, however, they are used in several language constructs and do not have the set selection semantics of SQL predicates.

length and CCSID of the input record and the maximum length and required CCSID of the output record. The parameter lists of these conversion programs are fixed in format because file conversion programs are called by access method services. But for other applications, such as CALL/RETURN conversions between programs, other parameters can be specified, as in Figure 10 on page 34.

The ASSIGNMENT statements (205) of a PLAN request conversions as data is copied from a source variable to a target variable. The conversions allowed by ADL are defined by a matrix of conversions from one ADL type to other ADL types. In addition to scalar type conversions, ADL includes powerful conversions of constructor types that greatly simplify the writing of conversion plans. In fact, default plans are defined for most file data conversions, so that programmers need only be concerned with describing the data in files, and not with writing ADL plans.

An ADL PLAN can also CALL (206 in Figure 10 on page 34) other programs and pass and receive parameter values. These programs can be called for several reasons. One reason to call programs is to perform conversions not otherwise supported by ADL. Another reason is to allow an ADL PLAN to act as a *glue program* between otherwise incompatible programs, as shown in Figure 10 on page 34. And a third is to allow an ADL PLAN to perform conversions as part of a larger function, such as a remote procedure call. All ADL PLANs and all programs called by ADL PLANs conform to the program calling conventions established by the SAA AD/Cycle Common Execution Environment (see 4 on page 23).

The scalar data types supported by ADL are the following:

ASIS A bit string of unknown encoding. Assignment to any other ADL data type is allowed. When an ASIS field is the data source, the assumption is made that ASIS data is already represented as required by the target field and can be copied to it. When an ASIS field is the assignment target, the bit representation of the source field is simply copied to the ASIS target.

BINARY A binary encoded number. Conversions to or from any other ADL numeric data type are defined.

BIT A bit string. Conversions to or from the ADL BITPRE data type are defined.

BITPRE A bit string with a length prefix. Conversions to or from the ADL BIT data type are defined.

BOOLEAN An encoding of TRUE or FALSE.

CHAR A string of characters encoded as specified by the associated Coded Character Set Identifier attribute. Conversions to or from any other ADL character data type are defined.

CHARPRE A character string with a length prefix. Conversions to or from any other ADL character data type are defined.

CHARSFX A zero terminated character string. Conversions to or from any other ADL character data type are defined.

ENUMERATION An association of identifiers with integers. Conversions between ENUMERATION fields are performed such that the identifiers associated with the BINARY encodings of the ENUMERATIONs are preserved. Numeric conversions to or from the ADL BINARY, PACKED and ZONED data types are also defined.

FLOAT A floating-point number. An attribute specifies which IBM hexadecimal format (single, double, or extended) or IEEE format (single, double, or extended) is used. Conversions among all formats are defined. Conversions to or from any other ADL numeric data type are defined.

PACKED A packed decimal number. Conversions to or from any other ADL numeric data type are defined.

ZONED A zoned decimal number. Conversions to or from any other ADL numeric data type are defined.

Attributes of each type specify metadata that describes how an instance of a type is represented and used. For the BINARY scalar type, for example, the following attributes can be specified: PRECISION, SCALE, RADIX, SIGNED, COMPLEX, CONSTRAINED, LENGTH, BYTRVS, FIT, TITLE, HELP, and NOTE. Some of these attributes, such as TITLE and HELP, can be optionally specified, but a value must be specified for other attributes in a data declaration statement or through inheritance from a SUBTYPE statement or a DEFAULT statement.

The constructor data types supported by ADL are the following:

ARRAY A uni-dimensional or multi-dimensional collection of elements. The bounds of each dimension can be specified by a LOW bound and either a HIGH bound or SIZE. Type Managers can map between PLs that specify array bounds in either way. The bounds can be any signed integer as long as the LOW bound is less than the HIGH bound. Further, the bounds of each dimension can be specified by integers, constants, or by reference to other integer fields passed in a record or as parameters.

The elements of an ARRAY can be of any scalar or constructor type or subtype except ARRAY. ADL requires arrays of arrays to be described as a single multi-dimensional array, which is easily accomplished by the Type Managers of languages that do not support multi-dimensional arrays directly (such as COBOL).

When an array is assigned to another array, the number of dimensions and the number of elements in each dimension must conform in the source (exported) and target (importing) arrays named in the assignment statement. Dimensionality is preserved because each dimension has semantic meaning to applications. However, the index values associated with each dimension for each element of the array are not preserved if the low bounds of a dimension differ. Some PLs allow negative low bounds, while others require the low bound to be 0 or 1. The ADL goal of data interchange takes precedence over preservation of dimension cardinality.

CASE A declaration of a multi-format data element; for example, when a file's records can be of several formats. A CASE declaration consists of a set of WHEN statements and an optional OTHERWISE statement. The predicate expressions of the WHEN statements are evaluated in the order specified until one evaluates to TRUE. The data declaration associated with that WHEN statement is then selected. If no WHEN statement evaluates TRUE, then the data declaration of the optional OTHERWISE statement is selected.

For files, it is expected that predicate expressions will be used to evaluate *discriminator* fields within the records to determine their format. But in other cases, the discriminator can be passed to the PLAN as a separate parameter; for example when converting the messages of a mapped conversation, the map name can be passed to the PLAN as a parameter.

The selected data declaration of a WHEN statement can be of any scalar or constructor type or subtype.

When a CASE is assigned to another CASE, the WHEN clauses of the source are first evaluated to identify the source format. The data declaration of the target WHEN statement with a matching identifier is then selected as the target format. If the assignment statement completes successfully, then the predicate expressions of the selected target WHEN statements are evaluated to ensure that the target format is valid for its discriminators.

SEQUENCE An ordered collection of data items, each with its own declaration. The elements of a SEQUENCE can be of any scalar or constructor type or subtype.

When a SEQUENCE is assigned to another SEQUENCE, the identifier of each declaration of the target sequence is matched to the identifiers of the source sequence. When a match is found, the corresponding source declaration is selected for assignment to the target. The target can be a subset of the source, and the data items of the target sequence can be in a different order than those of the source sequence.

The ability to declare constructors whose elements are constructors is a powerful feature of ADL. This allows, for example, the declaration of ARRAYs of SEQUENCEs, SEQUENCEs of SEQUENCEs, one or more CASEs or ARRAYs within a SEQUENCE, or ARRAYs of CASEs. For example, it is possible to describe an array in which the format of each element is unique.

ADL Annotation of Programming Languages

While ADL text can be written to fully describe data exported by the SAA PLs, a DD&C objective is to use existing descriptions specified in the syntax of the SAA PLs to the extent possible. In many cases, PL text provides sufficient information to allow an ADL description to be produced without any further considerations by programmers. However, additional information is sometimes required, especially if data is to be exported to other PLs or imported from other PLs. While it would be desirable to enhance the PLs so that the additional information could be specified natively in each PL, this is not a realistic expectation given the rigidity of language standards. Instead, this information can be provided as ADL annotation to PL text.

A general model of ADL annotation of PL text was designed by the developers of the Type Managers for the SAA PLs. Seeing common problems across the PLs led them to generalizations about what kinds of annotation are required and how they can be incorporated in PL text. A description of the general annotation model is beyond the scope of this paper, but some examples of its use will illustrate its power.

In general, ADL annotation consists of special comments intermixed with standard PL text to provide additional information about data. The first non-blank symbol after the opening comment symbol of the PL comment is the symbol ADL. Following this symbol is text consisting of ADL statements or segments of ADL statements. This ADL annotation can be intermixed with PL text in whatever way is considered optimal by the Type Manager designers for each PL. Some simple examples of ADL annotation are the following:

- ADL includes certain optional attributes that affect neither the representation nor the conversion of data. Examples are TITLE, HELP, or NOTE. They only provide programmer or application commentary. These attributes can be specified in ADL annotation of PL variable declarations. In the following PL/I text, the ADL TITLE attribute is specified as an ADL annotation comment within a PL/I declaration statement.

```
DCL num
    /* ADL TITLE('Employee serial number')*/
    FIXED BINARY(31);
```

PL/I compilers ignore the comment, but a PL/I Type Manager uses it to add the specified TITLE attribute to its ADL declaration of *num*:

```
num: BINARY PRECISION(31) TITLE('Employee serial number');
```

A Type Manager generate function reverses this process, making the TITLE attribute an ADL annotation comment.

- ADL annotations are also used when a PL declaration can be mapped to ADL in more than one way, depending on the programmer's intended use. For example, a C char declaration would normally be mapped by a C Type Manager to the ADL CHARSFX data type, but the C language also allows a char variable to be used as an integer. If it is the programmer's intent to actually treat it as an integer, then the following ADL annotation can be used to indicate it is being used as a single byte signed binary count field:

```
signed char checked_out_books /* ADL BINARY; */;
```

The C Type Manager, being familiar with the peculiarities of the C language, is then able to create the following ADL:

```
checked_out_books : BINARY PRECISION(7) SIGNED(TRUE);
```

- Complex numbers are important for scientific applications, but are not supported by commercial programming languages, such as COBOL. If it is necessary to import a complex number into a COBOL program, then the real and imaginary portions of the complex number must be declared as separate variables within a containing COBOL structure, as in:

```
*ADL D_06: COMPLEX(TRUE);
    15 D-06.
      20 REAL      PIC S99V99 COMP-4.
      20 IMAGINARY PIC S99V99 COMP-4.
```

An ADL annotation comment precedes the COBOL structure declaration to specify that the structure is really just a single complex number. The COBOL Type Manager, being familiar with this convention, is able to create the following ADL that allows correct ADL conversion programs to be constructed:

```
D_06: BINARY COMPLEX(TRUE) LENGTH(16) PRECISION(4) SCALE(2) RADIX(10);
```

The concurrent design of ADL and of the SAA Type Managers allowed many such considerations to be discussed and appropriate changes made to both ADL and the Type Managers. Consideration was given to all three Type Manager functions (parse, generate, and translate).

Services Layer

This layer is concerned with the services that must be provided when implementing DD&C architecture.

Interactive Data Description

One of the objectives of DD&C is to make it as painless as possible for programmers to describe data for ADL conversion programs. As previously discussed, having them manually write ADL data declarations wouldn't be acceptable to them. Instead, DD&C defines tools called Type Managers that allow them to use existing PL data declarations. But to be used properly, these tools should be used within the context of a Computer Aided Software Engineering (CASE) environment that knows how PL data declarations are stored, how to use Type Manager functions, and how to relate ADL declarations to various interchange mechanisms, such as files or program calls.

Relating DD&C services to CASE environments is properly the task of CASE vendors, and is outside of the scope of DD&C architecture.

Type Managers

Associated with each type domain is a software component called a Type Manager that understands the following things about its type domain:

- The syntax used by programmers for describing data in the PL of that domain.
- The data types supported by the PL.
- The attributes of the PL used to qualify the data types.
- The representations used by the compiler for each data type.
- The method used by the compiler for aligning data in memory.
- The methods used by the compiler for mapping constructor types to memory.

Type Managers provide programmers with the following three functions for using PL data descriptions:

PARSE Parses a PL data description to produce an ADL data description. This function fills in the details of the encodings used by the type domain for each of the PL's data types.

The result of PARSE is an encoded form of ADL. An ADL Type Manager allows programmers to describe data in ADL itself. This capability is provided for PLs for which no Type Manager is otherwise provided.

GENERATE Generates PL text from an ADL data description. This function produces PL data descriptions that can be included in programs, thereby facilitating program development. ADL annotation is included as required to allow a subsequent invocation of the type domain's PARSE function.

The input to GENERATE is an encoded form of ADL. The ADL Type Manager's GENERATE can be used to produce ADL text for any type domain, a valuable debugging aid.

TRANSLATE Translates the ADL description of data originally created for any other type domain to produce an ADL description of data suitable for its own type domain. This function helps programmers to make productive use of data exported by other type domains by examining the encoding details of the other type domain and filling in the encoding details of the target type domain. The input and output of TRANSLATE are an encoded form of ADL.

Referring to the ADL declarations in Figure 3 on page 28, the translation performed by the OS/2 C Type Manager on the ADL data declaration for MVS COBOL is the following:

1. The declaration of RECORD as a SEQUENCE is copied because this is identical to the ADL used to describe C structures.
2. A declaration of character data for OS/2 C data differs from that of MVS COBOL in both data type and attributes. Since C character strings are typically zero-terminated, INITIALS must be described in ADL as an ADL CHARSFX (character with a suffix) data type. MAXLEN(4) is specified to allow for the null-terminator byte plus the three bytes of character data. MAXALC(TRUE) is specified because the CHARSFX field does not need to vary in length. And CCSID(850) is specified because OS/2 C character data is ASCII encoded.
3. The SKIP(8) specification of the ADL declaration for MVS COBOL is ignored because the OS/2 C declaration does not require pad bits to force alignment of the NUMBER field.

4. The declaration of NUMBER is copied but the BYTRVS attribute is changed to TRUE to reflect how short integers are encoded by OS/2 C.

Type manager transformations, plus additional editing of programming language text, provide great flexibility. Using ADL and an appropriate set of Type Managers, inter-language communications between programmers and between tools, and conversions of data between native representations, becomes relatively easy. Programmers can use their normal languages and tools. They have to learn how to annotate PL descriptions with ADL, but this is only a small delta from their existing PL knowledge base.

The following interfaces for requesting Type Manager functions have also been defined:

- List Type Managers
- List Type Manager Attributes
- Parse PL Source Text File
- Generate PL Source Text File
- Translate Descriptor A final point regarding Type Managers is that we believe they should be implemented in a highly portable fashion so that they can be used wherever application programming is done. It would make little sense to separately implement each Type Manager for individual systems, because of the cost, and because of the inevitable inconsistencies that would result. Further, we expect a great deal of sharing of internal components and logic among Type Managers. While there must be a separate Type Manager for each COBOL type domain, for example, clearly there is much in common among all COBOL Type Managers. For both of these reasons, portability and commonality of components, an object-oriented design with a common class library would make sense for Type Manager implementations.

Object-Oriented Encoding of ADL

The syntax of ADL was designed for human reading and writing. It consists of free-format textual tokens that must obey the rules of ADL grammar, while giving programmers considerable freedom of expression. As with other programming languages, ADL trades off processing efficiency for programmer ease of use.

The obvious solution to this conflict is to process ADL text and generate an encoded form of the language that is more suitable for storing, processing and transmission. In fact, this is often a first step in the compilation process for many programming languages. For ADL, however, the encoded form of ADL is not just an internal form of the language, of no concern outside of each implementation. The encoded form of ADL is the primary means of communications among a set of software engineering tools residing on one or more heterogeneous systems. Among these tools are the ADL compiler (as shown in Figure 4 on page 29) and Type Managers.

The design requirements for the ADL encodings were the following:

- Isomorphism with ADL. The encodings of ADL are just another form of the language. Anything that can be expressed in ADL can be expressed in its encodings, and all relationships specified in ADL are maintained in the encodings. This led to the adoption of object-oriented technology in the encodings. The objects of the encodings are instances of classes that model each aspect of the language. For example, instances of the ADLBINARY class represent descriptions of variables of the ADL BINARY data type.

- Processing efficiency. The ADL encodings are directly processable, without any need for parsing or other forms of analysis. Any indirection allowed by ADL, such as named references to variables, are fully resolved in the ADL encodings. Optimization information that can be inferred from ADL, such as field lengths and offsets, is explicitly encoded.

- Extendibility. ADL covers a large number of type domains, but many additional languages and systems exist that were not considered in the initial design of ADL. Further, ADL was designed to meet only the requirements of IBM SAA Distributed File Management. It is anticipated that additional data types, attributes, and features will be required in ADL as additional type domains and areas of application are considered. Therefore, the method of encoding ADL also allows for extensions in all of the directions in which ADL is likely to be extended. This effectively rules out control-block forms of encoding, and points to the use of linked-object structures.

- Transmission efficiency. The efficiency with which a data structure can be transmitted between systems is affected by its size and by the transformations required to linearize it as a data stream. Most ADL descriptions are relatively small, so size was not considered an important factor. The primary concern, here, was the design of a data stream architecture that linearized the linked-object structure selected for ADL encodings.

ADL encoding objects are created within a single space-type object, with all relationships among the ADL encoding objects specified by offsets from the beginning of the space. In this way, the entire space can be transmitted and received without any further processing of its contents by the sender or the receiver.

- Malleability. Various aspects of an ADL data description are subject to change over time, when a description is initially being created and subsequently modified as application requirements change. To allow this level of malleability, it must be possible to add, delete, and modify the objects of the space that encode an ADL description. All objects of the encoding (except for an anchor object) are independent of their location in the space.

- Integrity. As changes are made to an ADL description, errors introduced by failing tools becomes a possibility. These errors can be avoided by allowing only proven tools, invoked through well-defined interfaces to make changes. Encapsulation can be enforced for the space containing the description and for each class of object contained within the space. This further justifies the use of object-oriented programming techniques in the encoding of ADL.

- Storage efficiency. As with transmission efficiency, the size of a data structure is only one aspect of storage efficiency. In a paged memory environment, locality of reference is of great importance. That is, objects that are frequently used together (especially small objects) should be in close proximity in the space, while large, infrequently used objects should be stored where they do not interfere with normal reference patterns. The location independence of objects in a space is the prime requirement for this.

The encoded form of ADL are specified and controlled through formal architecture specifications that can be published and thereby made available to the developers of CASE tools.

The ADL Compiler

An ADL compiler consists of two components, a parser capable of converting ADL source text into encoded objects, and a program generator that creates conversion programs for each specified plan of a module. Unlike most other compilers, these are separate DD&C components. The ADL parser is actually the parse function of an ADL Type Manager, and what is called the ADL compiler is actually just the program generator. This division makes sense in DD&C for several reasons:

- A full ADL Type Manager was needed anyway, to support type domains without their own Type Managers.
- Any number of Type Managers can be created that produce the object encoding of ADL as the output of their parse function.
- It is possible for other CASE tools to generate or use the information in the object encodings of ADL.
- The object encodings of ADL for files are stored with the files and can be used in multiple ADL modules.
- In Distributed File Management, it is occasionally necessary to regenerate conversion programs on the fly, so it is desirable to avoid the parse phases.

As with Type Managers, it is likely that ADL compilers will be needed on many different types of systems, and the programs produced by them must convert data identically on all systems. These are strong arguments for the development of a single, highly portable compiler. And since the inputs to the compiler consist of encoded objects, an object-oriented compiler design would also be appropriate.

Conversion Programs

The output of the ADL compiler is a program that can be called to perform data conversions. Consideration was given to both interpreted programs and directly executable programs. Initially, interpreted programs were favored because they could be easily transmitted between DFM systems. The system best able to perform conversions could then be dynamically selected to do them. However, this was rejected because it led to considerable complexity in the DDM flows defined for DFM, because the dynamic selection of the conversion system proved less important than initially thought, and because the performance of interpreted programs is generally inferior to that of directly executed code.

Further, we believe that it is important for ADL compilers to generate as much in-line conversion logic as possible. Run-time subroutines will be used for many conversions, especially complex numeric conversions and CDRA character conversions, but in general, in-line logic should be used because it allows more optimization to be done. This is especially true for predicate logic, for the conversions of constructors, and for simple scalar conversions.

Data Interchange Layer

This conceptual layer is concerned with how application programs are developed for interchange, how ADL conversion programs are created, and how they are invoked. The DFM answers to these questions for record-oriented files are discussed, but similar considerations apply to other interchange mechanisms.

File Access DD&C

The following sections describe how DD&C is used by SAA DFM for the record-oriented files. For more information on SAA DFM, see (1 on page 23).

File Data Description: Record-oriented file systems evolved as repositories of data produced and used by programs written in a variety of programming languages. Each programming language includes interfaces for reading, writing, and updating records. When matching interfaces are used, the records written to a file by one program can be read by another program of the same language. These interfaces consist of PL statements for accessing records, such as READ and WRITE statements, and statements for describing the data contained in the records.

The declaration statements can be specified within a program's source text, but for important files, they are often stored in a library and dynamically included in the program by the PL compiler. This ensures that all programs that include the declaration statements share a common definition of the file's records. However, it is not a complete solution. First, it works only for programs of a single programming language. Second, if any change is made to the stored data declarations for any one program, then all programs that include it must be recompiled. Without adequate support tools, it can be difficult to determine which programs need to be recompiled, especially when the file is accessed by programs on remote systems. And third, there is no managed relationship between the data declarations and the file they describe. Even if all programs that access a file included the same data declarations, there is nothing to guarantee that the file actually matches those descriptions.

These problems are solved by the IBM System/38 and its successor the IBM AS/400 for their common language environment. Language-independent, *external* data descriptions, called Data Description Specifications (DDS) (see "Data Description Specifications - DDS" on page 8), are created by programmers during application development. These descriptions are stored with a file when the file is created. Compilers can request these descriptions from a file and generate appropriate data declarations within programs that access the file.

Another concept of the AS/400 pertinent to DD&C is that of *logical files*. A logical file is one that contains no records of its own, but instead provides an alternate view of the data in a *physical file*. In the alternate view, the format of the records, their representation, or order can differ from those of the base physical file. If a program needs the data view or access path defined by the logical file, then it opens the logical file. Any operations requested on logical file records are actually performed on the base physical file.

*VIEW files* are the means by which ADL conversion programs are managed and used for files. A view file is similar to an AS/400 logical file in that a program opens a view file when it needs data conversion services to use a base file. Conversion programs produced by the ADL compiler are stored with the view file, and called as needed to convert records. View Files can be managed the same as any other files in a file system in regards to naming, directory services, security and locking.

These concepts, of language-independent data descriptions stored with files, and of view files, are central to the DD&C approach to file data interchange. This is illustrated by Figure 8 on page 32, with the following steps keyed to that figure. Note that these steps are assumed to occur within the context of CASE tools that guide and aid programmers in performing them.

(1) When a file is created, an ADL description of its records can be specified as an attribute of the file. This description is specified in terms of the type domain of the primary set of programs that will work with the file, MVS COBOL in this example. The COBOL declaration of the records is obtained from a library of program source text, and passed to the parse function of the MVS COBOL Type Manger.

(2) The resulting ADL description is passed to the file system's Create File function to be stored as an attribute of the file.

(3) When it is time to compile a program of the same type domain as the file (an MVS COBOL program), the ADL description stored with the file is requested and passed to the generate function of the MVS COBOL Type Manager.

(4) The resulting COBOL declarations can then be included in the COBOL program and compiled. While it would be possible to use the original COBOL declarations from the source text library, it is better to use the declarations generated from the file's ADL description. The source library declarations could have been changed and therefore be out of sync with the file.

(5) When it is time to compile a program from a different type domain, (an OS/2 C program in this example) the ADL declaration stored with the file can be used to create appropriate declarations for the new program. The file's ADL declaration is passed to the translate function of the OS/2 C Type Manager.

(6) The resulting ADL declarations can then be passed to the generate function of the OS/2 C Type Manager to produce C declarations.

(7) The C declarations can then be edited by a programmer as needed for the program being developed. For example, the programmer could reverse the order of the NUMBER and INITIALS fields, change the declaration of the NUMBER field from short integer to integer, change the CCSID (in the ADL annotation) of the INITIALS field, delete one of the field declarations, or add WHEN clauses to field declarations (as ADL annotation) to select the records of the file to be processed by the OS/2 C program. While this is a very simple example, a variety of changes would be possible in more complex cases to allow the new program to work with the data as it requires. However, the fewer changes made from the declaration produced by the Type Manager translate function, the easier it is to keep data declarations up to date with the original COBOL declaration of the file's records.

(8) The edited C declarations can then be included in a new C program and compiled.

(9) The edited C declaration can also be passed to the parse function of the OS/2 C Type Manager to produce an updated ADL description of the program's view of the data.

(10) The final task is to create a view file that can be used by the OS/2 C program to access the records in the MVS COBOL file. The ADL declaration stored with the MVS COBOL file and the new ADL declaration for the OS/2 C program's view of the file's records are both passed to the Create View function of the file system. Default ADL PLANs for converting records read from the file (similar to the GetPlan in Figure 7 on page 31) and for converting records written to the file (similar to the PutPlan in Figure 7 on page 31) are provided by the file system.

(11) The ADL compiler is called by the Create View function and passed the ADL declarations and plans.

(12) The resulting GetPlan and PutPlan conversion programs are stored with the new View file for later use during data access.

(13) The ADL description of the OS/2 C view is stored as an attribute of the view file so that it can be used by other OS/2 C programs (via step 3, above).

File Data Conversion: Figure 9 on page 33 shows how data is converted by ADL conversion programs as records are accessed through a view file.

(1) When a program opens a file by name, the file system creates a bound path to the file that its access method services can use to efficiently work with the records of the file. Since a MVS COBOL program is opening a file that is also in the MVS COBOL type domain, there is no need for conversion services.

(2) The MVS COBOL program can assign values to the fields of RECORD in its process memory and then use the COBOL WRITE statement to call access method write services to add the record to the file. Note that the record is written to the file essentially as it was mapped to process memory by the MVS COBOL compiler.

(3) When a program opens a view file by name, the file system creates a bound path through the view file to its base file. Since an OS/2 C program needs to access an MVS COBOL file, a view file must be opened to provide the necessary conversion services.

(4) When the OS/2 C program reads records from the view file, the access method read service obtains the record from the base file and calls the GetPlan of the view file.

(5) The GetPlan converts the record to the form required by the OS/2 C program. The converted record is returned to the access method and is then presented to the OS/2 C program.

(6) When the OS/2 C program writes a record to the view file, the access method write service calls the PutPlan of the view file.

(7) The PutPlan converts the record to the form required by the MVS COBOL base file, and returns it to the access method.

(8) The access method writes the converted record to the base file.

Program Call DD&C

While DD&C has been designed for data interchange through files, the need for data conversion support when using other data interchange mechanisms is readily apparent. Without going to the depths of explanation provided for files, the application of DD&C to program calls is illustrated in Figure 10 on page 34. An ADL conversion program is used as an intermediary when a program of one type domain (OS/2 COBOL) calls a program of a different type domain (OS/2 C).

The ADL module consists of the following:

- The first DECLARE statement describes the variables of the OS/2 COBOL program being passed as arguments to the OS/2 C program.
- The second DECLARE statement describes the variables of the OS/2 C program that are defined as its parameters.
- The PLAN statement, named gluePlan, must be called by PGMA, instead of PGMB. The input parameter, INITIALS, is converted to the representation required by PGMB, and space is allocated for the output argument returned by PGMB, NUMBER. The gluePlan calls PGMB, passing it the converted INITIALS argument and the address of the space for the returned NUMBER argument. On return from PGMB, the value of NUMBER returned is converted to the representation required by PGMA, and the gluePlan terminates. If PGMB had failed, any exceptions would have been forwarded to PGMA from PGMB.

The primary issues to be resolved are the kinds of programming issues discussed for files in "File Data Description" on page 19, namely how the declarations of interfaces are to be stored, translated, and managed. These issues are best considered within the context of a CASE system. As with files, considerable benefit can be derived from Type Manager parse, generate and translate functions.

The concept shown in this example can be easily extended to inter-language remote procedure calls.

Summary

Within its initial scope of the SAA languages and systems, DD&C architecture enhances the interchange of data stored in record oriented files. In the design of DD&C, equal consideration was given to the problems of describing data and of converting it. While initially designed for record oriented files, DD&C can also be applied to other areas of data interchange.

Acknowledgements

Many other people participated in the design of DD&C architecture, including:

- Marsha Brown, Elaine Patry, Kenneth Sissors, William Remay, Steven Osborne, and Bijan Katebini of IBM Manassas, VA.
- David Cole, Susan Carswell-Hurdis, Brian Cromwell, Scott Gallimore, Joseph Mesa, and Ejuana Vasquez of IBM Cary, NC.
- Paul Arevalo and Takahsi Hasegawa of IBM Toronto, Ont., Canada.
- Langdon Beeck and Robert Moyer of IBM Santa Teresa, CA.
- William Nettles, Felix Nunez, Lorenzo Falcon, and Thomas Frayne of IBM San Jose, CA.
- Heinz Graalfs of IBM Sindelfingen, Germany.
- James Diephuis, Jan David Fisher, Sunil Gaitonde, James Wacholz and David Weber of IBM Rochester, MN.
- David Thomas, James McGugan, and Gregory Adams of Object Technology International Inc., Ottawa, Ont., Canada.

Bibliography

1. Demers, R. A., *Distributed Files for SAA*, IBM Systems Journal, Vol. 27, No. 3, 1988, pages 348-361.

2. Demers, R. A., Fisher, J. D., Gaitonde, S. S., Sanders, R. R., *Inside IBM's Distributed Data Management Architecture*, IBM Systems Journal, Vol. ??, No. ??, 199?, pages ???-???.

3. Hinxman, A., and Simmons, A., *Functional Specification of the NIDL Language*, Digital Equipment Corp., 1989.

4. Mercurio, V. J., Meyers, B. F., Nisbit, A. M., and Radin, G., *AD/Cycle Strategy and Architecture*, IBM Systems Journal, Vol. 29, No. 2, 1990, page 170.

5. *Distributed Data Management Architecture: Specifications for A Data Language Level 1*, IBM Order Number SC21-8286.

6. *Character Data Representation Architecture Level 1, Reference*, IBM Order Number SC09-1390.

7. *Distributed Relational Database Architecture Reference* IBM Order Number SC26-4651.

8. *External Data Representation Protocol Specification*, SUN Microsystems, Inc., Feb., 1986.

9. *Information Processing - Open Systems Interconnection - Specification of Abstract Syntax Notation One (ASN.1)*, ISO/DIS 8824.

10. *Information Processing - Open Systems Interconnection - Specification of Basic Encoding Rules for Abstract Syntax Notation One (ASN.1)*, ISO/DIS 8825.

11. *Formatted Data: Object Content Architecture Reference*, IBM Order Number SC31-6806.

Biographies

Richard A. Demers

IBM Application Business Systems,

3605 Highway 52 North, Rochester, MN

Mr. Demers is a Senior Programmer working on systems architecture for the AS/400. In 1968 he joined IBM as an applications programmer in White Plains, NY. He received a BA Degree in Philosophy from Canisius College, Buffalo, NY in 1969. In 1972, he moved to Endicott, NY where he worked on systems software for the IBM 3895 Optical Check Reader. Mr. Demers moved to Rochester, MN in 1975 to design the message handling and service components of the IBM System/38 operating system. From 1982 to 1991, he was the lead architect in the design of IBM's Distributed Data Management architecture, participated in the design of IBM's Distributed Relational Database architecture, and was the lead architect for IBM's Data Description and Conversion architecture. He has received IBM Outstanding Innovation awards for his work on DDM (1987) and DRDA (1991). A member of the Association for Computing Machinery, his professional interests include operating systems, distributed processing, data management, programming languages, and object-oriented programming.

K. (Koko) Yamaguchi

IBM Storage Systems Products Division,

5600 Cottle Road, San Jose, California 95193

Dr. Yamaguchi is a Senior Programmer in the architecture and strategy group in the IBM San Jose Storage Products programming laboratory. He joined IBM at Palo Alto, California in 1974. Since then he has held numerous technical and managerial positions in the areas of high level language development, internal tools development, and technical strategy. In 1988, he joined the San Jose programming laboratory to define and develop architectures and strategies for distributed structures. He received his Ph.D. from the University of Michigan in Industrial and Operations Engineering in 1975. His major field of research was automated information system development.

Figures

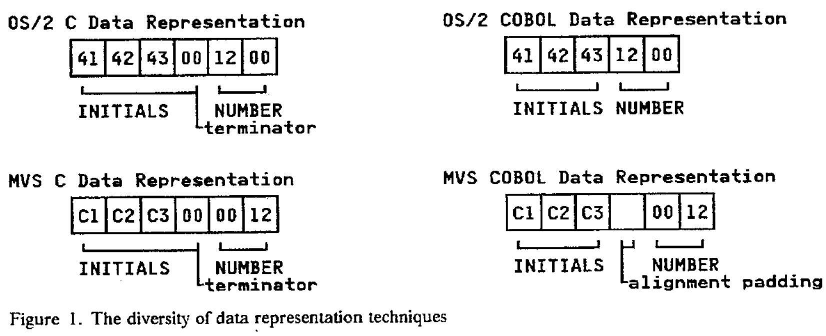
Figure 1. The diversity of data representation techniques

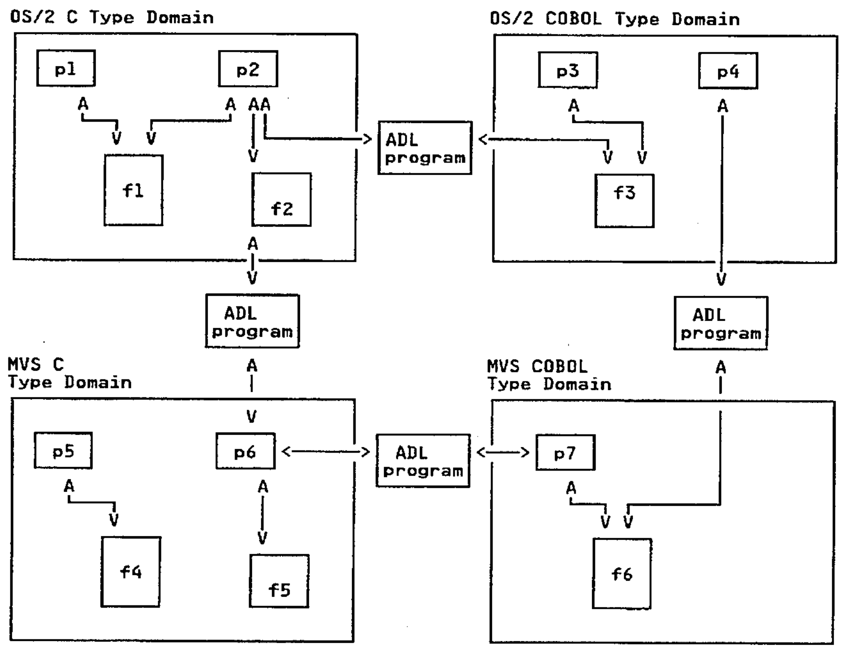
Figure 2. ADL programs bridge between type domains

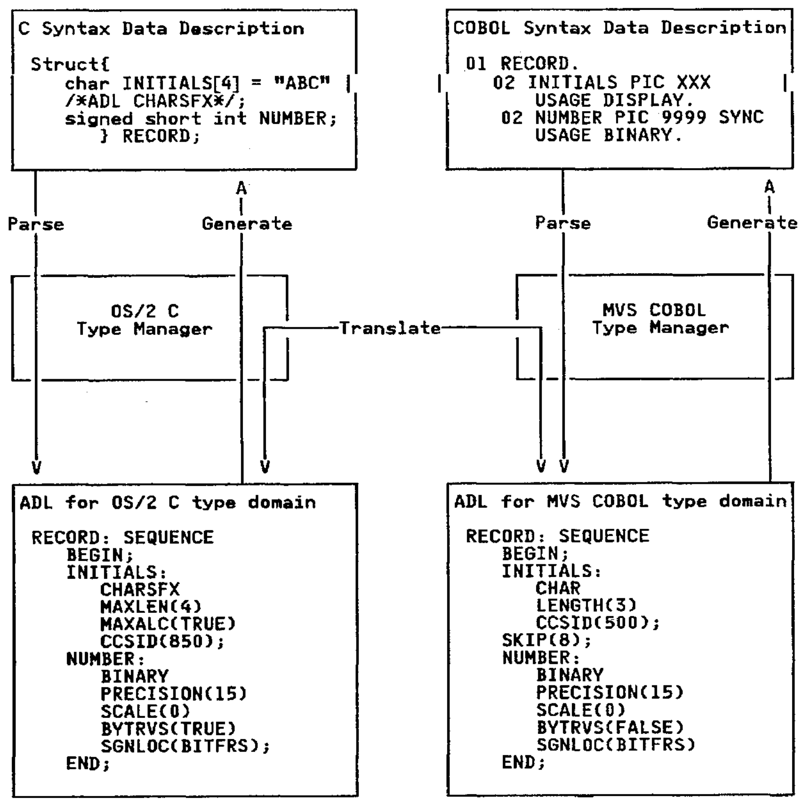
Figure 3. Type Manager Functions

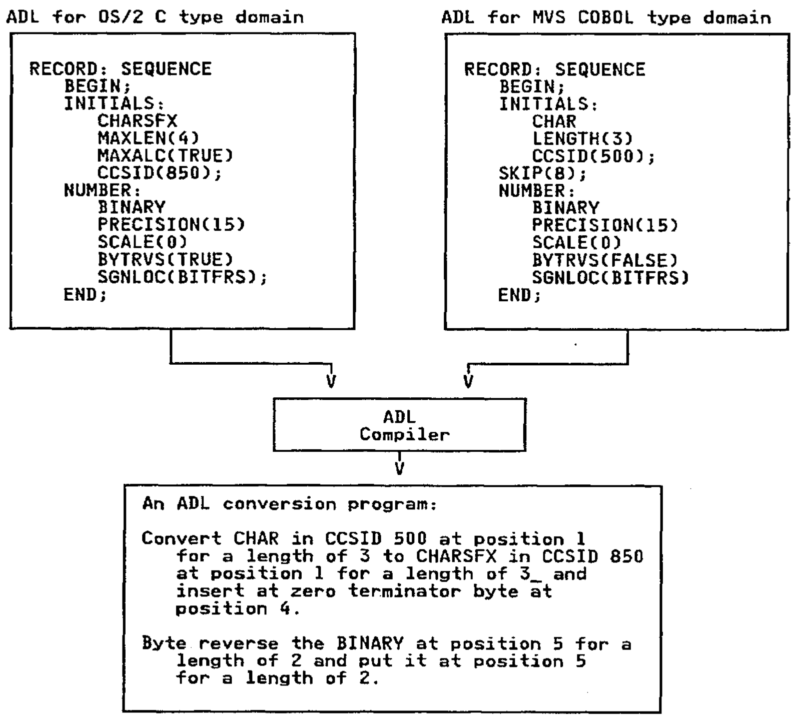
Figure 4. Creating conversion programs from ADL declarations
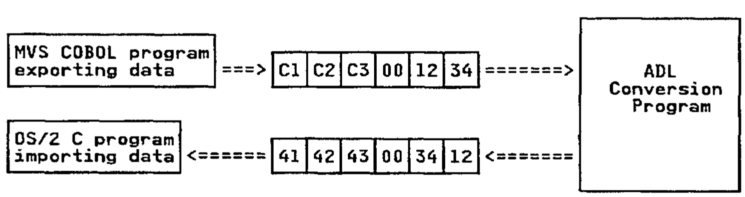
Figure 5. Converting data

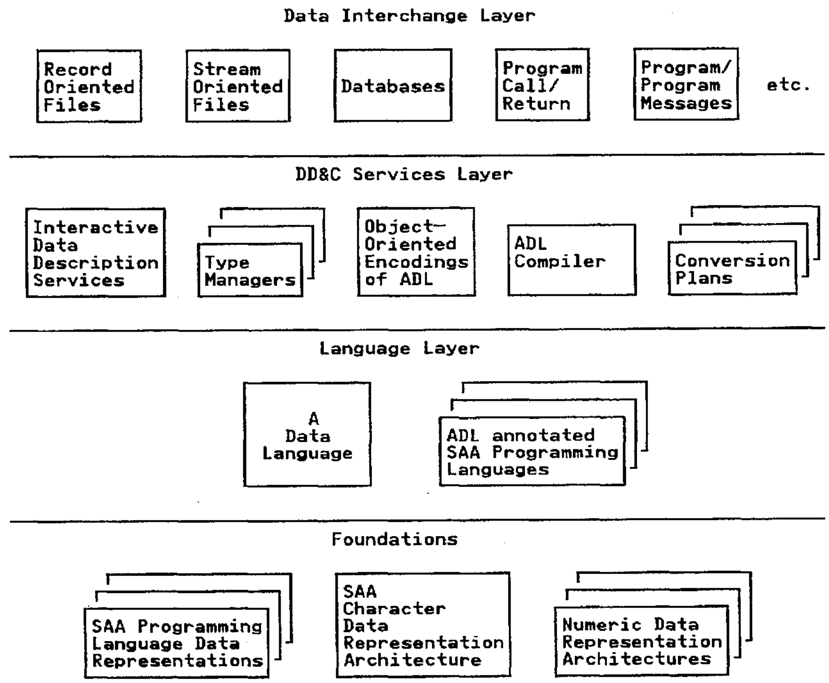
Figure 6. The conceptual layers of DD&C

```
(100)      FILE: /* declarations corresponding to file data */
|                DECLARE
|                BEGIN;
| (104)          RECORD: SEQUENCE
| |                      BEGIN;
| |                                INCLUDE 'DEFAULTS.MVS.COBOL';
| | (104)                INITIALS: CHAR LENGTH(3)
| | | (105)                        WHEN INITIALS BETWEEN 'A' AND 'Z';
| | (104)                NUMBER:   BINARY PRECISION(15)
| | | (105)                        WHEN NUMBER < 99;
| |                      END;
|                END;

(100)      VIEW: /* declarations corresponding to program variables */
|                DECLARE
|                BEGIN;
| (104)          RECORD: SEQUENCE
| |                      BEGIN;
| |                                INCLUDE 'DEFAULTS.OS2.C';
| | (104)                INITIALS: CHARSFX MAXLEN(4)
| | | (106)                        WHEN INITIALS IN ('A', 'B', 'C');
| | (104)                NUMBER:   BINARY PRECISION(15);
| |                      END;
|                END;

(100)      ACCESS_METHOD: /* declarations of additional Access Method */
|                         /* variables passed to ADL plans */
|                DECLARE
|                BEGIN;
| (101)          DEFAULT BINARY BYTRVS(FALSE) COMPLEX(FALSE) CONSTRAINED(FALSE)
| |                             RADIX(2) SCALE(0) SIGNED(TRUE) FIT(ROUND);
| (102)          word:      CONSTANT 31;
| (103)          ccsid:     SUBTYPE OF BINARY PRECISION(32) SIGNED(FALSE);
| (104)          inlen:     BINARY PRECISION(word);
| |              inccsid:   ccsid;
| |              outmaxlen: BINARY PRECISION(word);
| |              outccsid:  ccsid;
| |              outlen:    BINARY PRECISION(word);
|                END;

(200)      getPlan: /* Plan to convert records read from the file */
|                   PLAN (
|                            inlen:       INPUT,
| (201)                      inccsid:     INPUT,
| (201) (203)                FILE.RECORD: INPUT LENGTH(inlen) CCSID(inccsid),
| (201)                      outmaxlen:   INPUT,
| (201)                      outccsid:    INPUT,
| (202) (204)                VIEW.RECORD: OUTPUT MAXLEN(outmaxlen) CCSID(outccsid),
| (202)                      outlen:      OUTPUT)
|                        BEGIN;
| (205)                      VIEW.RECORD <- FILE.RECORD;
| (205)                      outlen <- LENGTH(VIEW.RECORD);
|                        END;

(200)      putPlan: /* Plan to convert records to be written to the file */
|                   PLAN (
| (201)                      inlen:       INPUT,
| (201)                      inccsid:     INPUT,
| (201) (203)                VIEW.RECORD: INPUT LENGTH(inlen) CCSID(inccsid),
| (201)                      outmaxlen:   INPUT,
| (201)                      outccsid:    INPUT,
| (202) (204)                FILE.RECORD: OUTPUT MAXLEN(outmaxlen) CCSID(outccsid),
| (202)                      outlen:      OUTPUT)
|                        BEGIN;
| (205)                      FILE.RECORD <- VIEW.RECORD;
| (205)                      outlen <- LENGTH(FILE.RECORD);
|                        END;
```

Figure 7. ADL program for file data conversions

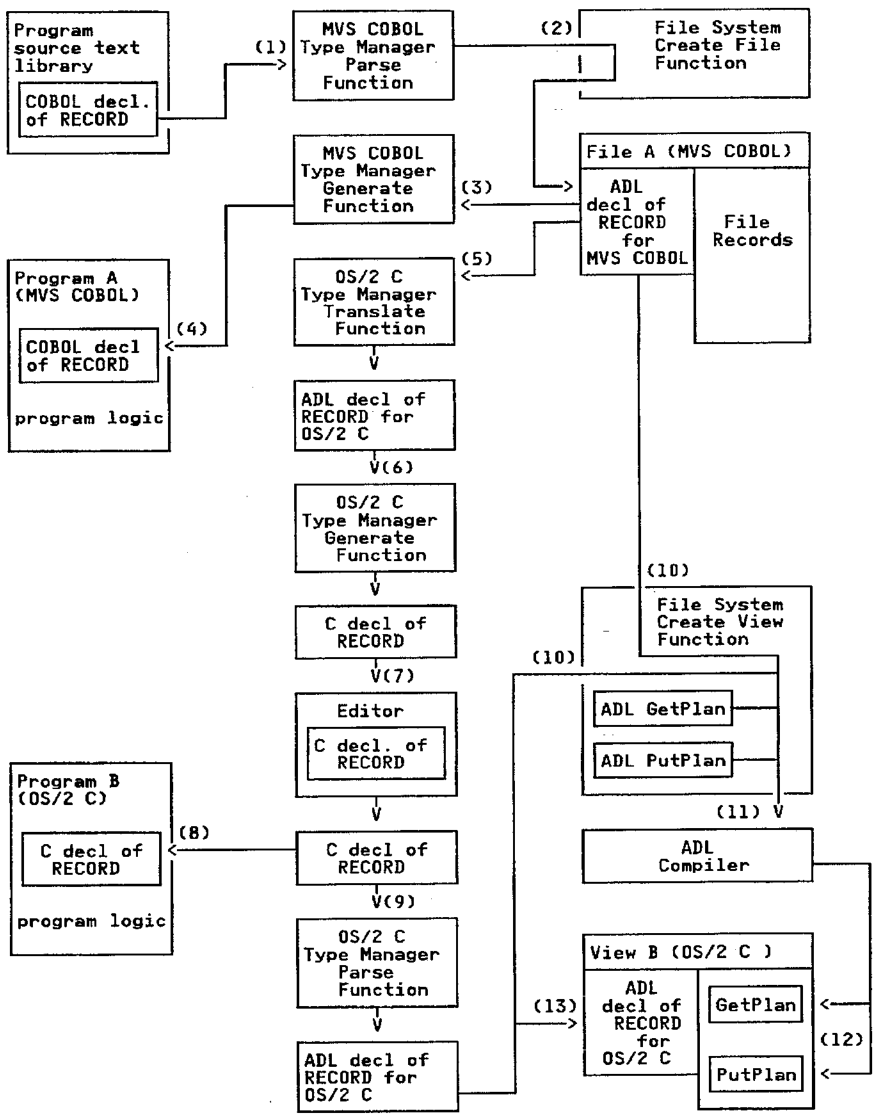
Figure 8. Application development process

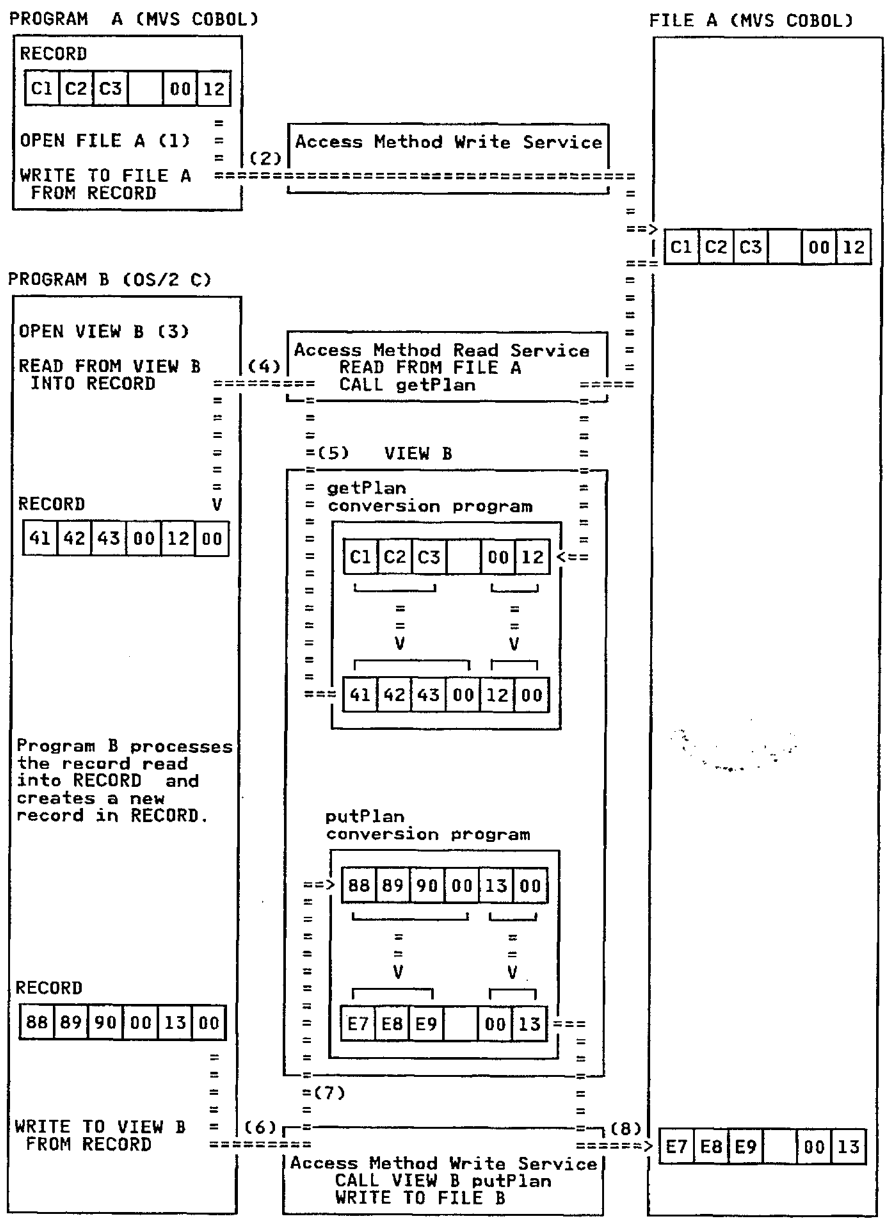
Figure 9. File data conversions.

```
(100)     PGMA: /* declarations corresponding to the OS/2 COBOL compiler's
                    representations of PGMA program variables */
                DECLARE
                BEGIN;
  (104)         INITIALS: CHAR LENGTH(3) CCSID(850) JUSTIFY(LEFT) UNITLEN(8);
  (104)         NUMBER:   BINARY PRECISION(3) BYTRVS(TRUE) COMPLEX(FALSE)
                                 CONSTRAINED(TRUE) RADIX(10) SCALE(0)
                                 SIGNED(TRUE) FIT(ROUND);
                END;

(100)     PGMB: /* declarations corresponding to the OS/2 C compiler's
                    representations of PGMB program variables */
                DECLARE
                BEGIN;
  (104)         INITIALS: CHARSFX MAXLEN(4) CCSID(850) MAXALC(TRUE) SFXENC(X'00'
                                  UNITLEN(8);
  (104)         NUMBER:   BINARY PRECISION(15) BYTRVS(TRUE) COMPLEX(FALSE)
                                 CONSTRAINED(TRUE) RADIX(2) SCALE(0)
                                 SIGNED(TRUE) FIT(ROUND);
                END;

(200)     gluePlan: /* Plan to convert records read from the file */
                    PLAN (
  (201)                   PGMA.INITIALS: INPUT,
  (202)                   PGMA.NUMBER:   OUTPUT)
                       BEGIN;
  (205)                   PGMB.INITIALS <- PGMA.INITIALS;
  (206)                   CALL PGMB (PGMB.INITIALS, PGMB.NUMBER);
  (205)                   PGMA.NUMBER <- PGMB.NUMBER;
                       END;
```

Figure 10. ADL module for program call conversions

What is claimed is:

1. A computer system having a first program environment and a second program environment, said system comprising:

a creating mechanism, said creating mechanism comprising means for creating a data description and conversion module, said data description and conversion module comprising first program environment data describing means and second program environment data describing means and means for converting data described by said second program environment data describing means into data described by said first program environment data describing means;

a compiler, said compiler comprising means for compiling said data description and conversion module to create an executable conversion program;

an invoking mechanism, said invoking mechanism comprising means for invoking said executable conversion program, said executable conversion program being invoked by a first program from said first program environment to share data stored by a second program from said second program environment;

a parsing mechanism for parsing data descriptions from a particular program environment into source ADL (A Data Language) data descriptions; and a translating mechanism for translating said source ADL data descriptions into target data descriptions, said source data descriptions being ADL data descriptions for a program environment different from said particular program environment.

2. A method for sharing data between computer programs in first and second program environments, said method comprising the machine executed steps of:

creating a data description and conversion module, said data description and conversion module comprising first program environment data descriptions and second program environment data descriptions and means for converting data described by said second program environment data descriptions into data described by said first program environment data descriptions;

compiling said data description and conversion module into a conversion program; and executing said conversion program to allow a first computer program from said first program environment to share data with a second computer program from said second program environment;

parsing data descriptions from a particular program environment into source ADL data descriptions; and translating said source ADL data descriptions into target data descriptions, said source data descriptions being ADL (A Data Language) data descriptions for a program environment different from said particular program environment.

3. The method of claim 2 wherein said parsing step comprises the machine executed steps of:

generating said data descriptions from an existing ADL data description;

annotating said data descriptions with ADL statements; and parsing said annotated data descriptions into ADL data descriptions.

* * * * *